US011537268B2

(12) United States Patent
Kim et al.

(10) Patent No.: US 11,537,268 B2
(45) Date of Patent: Dec. 27, 2022

(54) ELECTRONIC DEVICE COMPRISING MULTIPLE DISPLAYS AND METHOD FOR OPERATING SAME

(71) Applicant: Samsung Electronics Co., Ltd., Gyeonggi-do (KR)

(72) Inventors: Joon-Hwan Kim, Gyeonggi-do (KR); Yo-Han Lee, Seoul (KR); Hyun-Yeul Lee, Seoul (KR); Kyung-Wha Hong, Gyeonggi-do (KR); Sun-Hee Moon, Gyeonggi-do (KR); Won-Sik Lee, Seongnam-si (KR); Seung-Yeon Chung, Seoul (KR); Hye-Min Ha, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 5 days.

(21) Appl. No.: 17/120,477

(22) Filed: Dec. 14, 2020

(65) Prior Publication Data

US 2021/0173533 A1 Jun. 10, 2021

Related U.S. Application Data

(63) Continuation of application No. 16/075,347, filed as application No. PCT/KR2017/001212 on Feb. 3, 2017, now Pat. No. 10,866,694.

(30) Foreign Application Priority Data

Feb. 5, 2016 (KR) ........................ 10-2016-0015210
Feb. 11, 2016 (KR) ........................ 10-2016-0015903

(51) Int. Cl.
*G06F 3/0482* (2013.01)
*H04M 1/02* (2006.01)
(Continued)

(52) U.S. Cl.
CPC .......... *G06F 3/0482* (2013.01); *G06F 1/1618* (2013.01); *G06F 1/1647* (2013.01);
(Continued)

(58) Field of Classification Search
CPC .... G06F 1/1647; G06F 3/0482; G06F 3/0488; G06F 3/1423; G06F 3/04886;
(Continued)

(56) References Cited

U.S. PATENT DOCUMENTS 7,502,950 B1 * 3/2009 Brands .................. G06F 3/1446 713/340
7,917,179 B2 * 3/2011 Kokubo ............ H04M 1/72469 345/169
(Continued)

FOREIGN PATENT DOCUMENTS

AU 2010339636 A1 * 8/2012 ........... G06F 3/0481
AU 2015100115 B4 * 5/2015
(Continued)

OTHER PUBLICATIONS http://prod.danawa.com/info/?pcode=3508122.
(Continued)

*Primary Examiner* — Vinh T Lam
(74) *Attorney, Agent, or Firm* — Cha & Reiter, LLC

(57) ABSTRACT

An electronic device according to various embodiments of the present invention comprises: a first main body including a first surface and a second surface which faces the opposite direction to the first surface; a second main body including a third surface which faces the first surface of the first main body part when being folded in a first direction, and a fourth surface which faces the second surface of the first main body part when being folded in a second direction; a rotatable connection unit which connects at least a part of one side of the first main body part and at least a part of one side of the
(Continued)

second main body part; a first display which is exposed to the first surface of the first main body part; a second display which is exposed to the third surface of the second main body part; a processor which is electrically connected to the first display and the second display; and a memory which is electrically connected to the processor. The memory, when being executed, may store instructions for instructing the processor to display the first screen and the second screen on the first display and the second display, respectively, when an angle between the first main body and the second main body is included in a first range, and to display at least one from among the third screen and the fourth screen on at least one from among the first display and the second display when an angle between the first main body and the second main body is out of the first range and is included in a second range due to the first main body and the second main body being folded in the second direction.

29 Claims, 290 Drawing Sheets

(51) Int. Cl.
*G06F 1/16* (2006.01)
*G06F 3/04886* (2022.01)
*G06F 3/14* (2006.01)
*G06F 3/04817* (2022.01)
*G06F 3/0488* (2022.01)
*H04M 1/725* (2021.01)
*G09G 5/14* (2006.01)

(52) U.S. Cl.
CPC .......... *G06F 1/1649* (2013.01); *G06F 3/0488* (2013.01); *G06F 3/04817* (2013.01); *G06F 3/04886* (2013.01); *G06F 3/1423* (2013.01); *G06F 3/1446* (2013.01); *H04M 1/02* (2013.01); *H04M 1/0243* (2013.01); *H04M 1/725* (2013.01); *G06F 2203/04803* (2013.01); *G09G 5/14* (2013.01); *G09G 2340/0492* (2013.01); *G09G 2354/00* (2013.01); *G09G 2356/00* (2013.01); *H04M 1/0216* (2013.01); *H04M 2250/16* (2013.01)

(58) Field of Classification Search
CPC .... G06F 1/1618; G06F 1/1649; G06F 3/1446; G06F 3/04817; G06F 2203/04803; H04M 1/02; H04M 1/725; H04M 1/0243; H04M 1/0216; H04M 2250/16; G09G 2356/00; G09G 5/14; G09G 2340/0492; G09G 2354/00
See application file for complete search history.

(56) References Cited

U.S. PATENT DOCUMENTS 8,539,384 B2 9/2013 Hinckley et al.
8,712,478 B2 4/2014 Inami
8,803,816 B2 8/2014 Kilpatrick, II et al.
8,836,611 B2 9/2014 Kilpatrick, II et al.
8,860,632 B2 10/2014 Kilpatrick, II et al.
8,860,765 B2 10/2014 Kilpatrick, II et al.
8,863,038 B2 10/2014 King et al.
8,866,840 B2 10/2014 Dahl et al.
8,928,551 B2 1/2015 Ebey et al.
8,933,874 B2 1/2015 Lundqvist et al.
8,934,229 B2 1/2015 Thorson
8,947,320 B2 2/2015 King et al.
8,947,361 B2 2/2015 Oakley
8,984,440 B2 3/2015 Sirpal et al.
8,994,713 B2 3/2015 Sirpal et al.
9,001,103 B2 4/2015 Sirpal et al.
9,019,214 B2 4/2015 Sirpal et al.
9,026,923 B2 5/2015 Sirpal et al.
9,047,047 B2 6/2015 Visosky
9,052,801 B2 6/2015 Sirpal et al.
9,077,792 B1 7/2015 Alhaidar
9,128,659 B2 9/2015 Kretz
9,128,660 B2 9/2015 Kretz
9,152,179 B2 10/2015 Sirpal et al.
9,152,371 B2 10/2015 Sirpal et al.
9,152,404 B2 10/2015 Reeves
9,158,494 B2 10/2015 Sirpal et al.
9,176,701 B2 11/2015 Beczw
9,182,788 B2 11/2015 Sirpal et al.
9,189,018 B2 11/2015 Sirpal et al.
9,195,335 B2 11/2015 Sirpal et al.
9,207,717 B2 12/2015 Sirpal et al.
9,213,365 B2 12/2015 Sirpal et al.
9,292,114 B2 3/2016 Adamson et al.
9,317,242 B2 4/2016 Shin
9,335,793 B2 5/2016 Rothkopf
9,377,944 B2 6/2016 Yokoyama et al.
9,575,948 B2 * 2/2017 Neugebauer .......... G06F 40/171
9,774,721 B2 9/2017 Jouin
9,933,819 B2 4/2018 Kim et al.
9,959,030 B2 5/2018 Sang et al.
9,983,771 B2 * 5/2018 Martin .................. G06F 3/0488
10,095,346 B2 10/2018 Gao et al.
10,171,720 B2 * 1/2019 Lohan ....................... G06F 9/52
10,503,370 B2 * 12/2019 Claux ................... G06F 3/0481
10,592,061 B2 3/2020 Sirpal et al.
2002/0039914 A1 4/2002 Hama et al.
2002/0094826 A1 7/2002 Lee
2003/0026068 A1 2/2003 Tsai et al.
2007/0268264 A1 11/2007 Aarras et al.
2007/0279315 A1 * 12/2007 Laves .................. G06F 1/1677
345/1.1
2008/0227505 A1 * 9/2008 Jang .................... H04M 1/0245
455/575.1
2009/0289958 A1 * 11/2009 Kim .................... G06F 3/04886
345/156
2010/0017872 A1 * 1/2010 Goertz ................ G06F 3/04883
726/16
2010/0120470 A1 * 5/2010 Kim .................... G06F 3/04883
715/830
2010/0248788 A1 * 9/2010 Yook ................... G06F 3/04886
455/566
2010/0302179 A1 * 12/2010 Ahn ................. H04M 1/72403
345/173
2010/0302219 A1 * 12/2010 Kitashou ............... G06F 3/1431
345/204
2011/0109567 A1 5/2011 Kim
2011/0199361 A1 8/2011 Shin
2012/0129581 A1 5/2012 Choi et al.
2013/0080956 A1 3/2013 Sirpal et al.
2013/0135236 A1 5/2013 Yano
2013/0169545 A1 7/2013 Eaton et al.
2013/0217443 A1 8/2013 Lim et al.
2013/0321340 A1 12/2013 Seo et al.
2014/0028596 A1 * 1/2014 Seo ......................... G06F 3/033
345/173
2014/0191926 A1 7/2014 Mathew et al.
2015/0015513 A1 1/2015 Kwak et al.
2015/0097755 A1 4/2015 Kim
2015/0116364 A1 * 4/2015 Aurongzeb ........... G06F 1/1649
345/659
2015/0130725 A1 * 5/2015 Knepper ................ G06F 3/017
345/173
2015/0130738 A1 5/2015 Park
2015/0138041 A1 5/2015 Hirakata et al.
2015/0186096 A1 * 7/2015 Hall ...................... G06F 1/1601
345/1.3
2015/0220243 A1 8/2015 Fang et al.
2015/0261259 A1 9/2015 Endo et al.
2015/0286457 A1 * 10/2015 Kim ...................... G06F 3/1446
345/1.3
2015/0324162 A1 11/2015 Kim et al.

(56) References Cited

U.S. PATENT DOCUMENTS

| | | | | |
|---|---|---|---|---|
| 2015/0331593 | A1 | 11/2015 | Lee et al. | |
| 2015/0338882 | A1* | 11/2015 | Yun | G06F 3/04886 345/173 |
| 2015/0346899 | A1 | 12/2015 | Jung et al. | |
| 2016/0007441 | A1* | 1/2016 | Matsueda | H04M 1/0268 361/749 |
| 2016/0026381 | A1 | 1/2016 | Kim et al. | |
| 2016/0041805 | A1* | 2/2016 | Joo | G06F 3/1446 345/205 |
| 2016/0085319 | A1 | 3/2016 | Kim et al. | |
| 2016/0103476 | A1* | 4/2016 | Kim | G06F 3/1423 345/1.3 |
| 2016/0116944 | A1* | 4/2016 | Lee | G06F 1/1681 361/679.26 |
| 2016/0139748 | A1* | 5/2016 | Iwaizumi | G06F 3/04845 715/838 |
| 2016/0147362 | A1 | 5/2016 | Eim et al. | |
| 2016/0239190 | A1 | 8/2016 | Forutanpour et al. | |
| 2016/0241686 | A1 | 8/2016 | Zhang et al. | |
| 2016/0313964 | A1 | 10/2016 | de Paz et al. | |
| 2016/0321969 | A1* | 11/2016 | Kambhatla | G09G 3/035 |
| 2016/0372083 | A1* | 12/2016 | Taite | G06F 3/04886 |
| 2017/0004803 | A1 | 1/2017 | Bostick et al. | |
| 2017/0075389 | A1 | 3/2017 | Yeom et al. | |
| 2017/0171821 | A1 | 6/2017 | Agrawal | |
| 2017/0221424 | A1 | 8/2017 | Sanders et al. | |
| 2018/0348881 | A1 | 12/2018 | Chung | |
| 2021/0216332 | A1* | 7/2021 | Li | G06F 3/0488 |
| 2021/0286509 | A1* | 9/2021 | Tyler | G06F 3/0488 |
| 2021/0342785 | A1* | 11/2021 | Mann | G06F 16/116 |

FOREIGN PATENT DOCUMENTS

| | | | | | |
|---|---|---|---|---|---|
| CN | 1366439 | A | | 8/2002 | |
| CN | 1592325 | A | | 3/2005 | |
| CN | 101064737 | A | | 10/2007 | |
| CN | 100417980 | C | * | 9/2008 | G06F 1/1616 |
| CN | 201765536 | U | | 3/2011 | |
| CN | 202261427 | U | | 5/2012 | |
| CN | 102957801 | A | | 3/2013 | |
| CN | 103259886 | A | | 8/2013 | |
| CN | 103477304 | A | | 12/2013 | |
| CN | 104423879 | A | * | 3/2015 | G06F 3/04883 |
| EP | 1408673 | A2 | * | 4/2004 | H04B 1/3833 |
| EP | 2 532 094 | | | 8/2011 | |
| EP | 2919108 | A1 | * | 9/2015 | G06F 1/3265 |
| EP | 2 977 850 | A1 | | 1/2016 | |
| EP | 3023862 | A2 | * | 5/2016 | G06F 1/1616 |
| EP | 3118732 | A1 | * | 1/2017 | G06F 3/0346 |
| FR | 3036220 | A1 | * | 11/2016 | |
| JP | 2012174217 | A | * | 9/2012 | G06F 1/1641 |
| KR | 10-2011-0069803 | A | | 6/2011 | |
| KR | 10-2011-0120858 | A | | 11/2011 | |
| KR | 10-2012-0053685 | A | | 5/2012 | |
| KR | 10-2014-0128709 | A | | 11/2014 | |
| KR | 10-2015-0132918 | A | | 11/2015 | |
| KR | 10-2016-0033507 | A | | 3/2016 | |
| WO | 2011/096675 | A3 | | 8/2011 | |
| WO | WO-2021255712 | A1 | * | 12/2021 | |
| WO | WO-2022025720 | A1 | * | 2/2022 | |

OTHER PUBLICATIONS https://writerofsky.tistory.com/1228.

Chinese Search Report dated Nov. 10, 2021.

European Search Report dated Mar. 10, 2022.

Chinese Search Report dated Jul. 5, 2021.

Master Dual (Samsung Master Dual 2G Folder Phone (SM-B520S1) Spec Review.

Samsung Electronics Anycall Goara Phone SPH-W2700, unused phone (preliminary opening/used).

* cited by examiner

| type | Mark | description |
|---|---|---|
| Tap | | select item or run function,<br>if application of other touch interaction is absent |
| Double Tap | | Return from zooming to default view level |
| Hold | | Initiate context-specific option menu.<br>Enter to edit mode on home screen |
| Move | | Scroll list or item. Run primary function<br>if applied to individual list item. |
| Flick | | Initiate or scroll option menu |
| Drag and Drop | | Drag object to desired position using<br>finger by touching,holding, and releasing |
| Pinch Zoom in | | Hold and drag to desired position<br>(Pinch Zoom in) |
| Pinch Zoom out | | Zoom out |

FIG.6

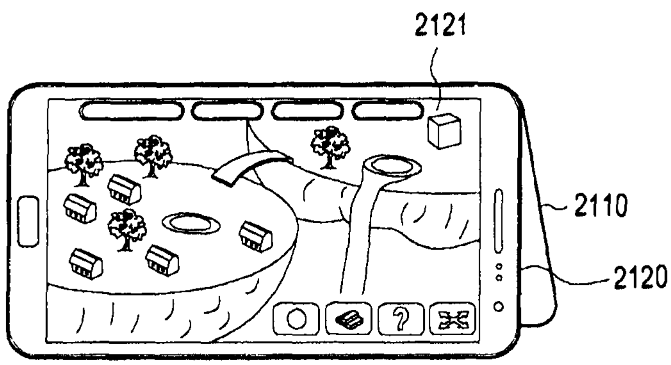
(a)
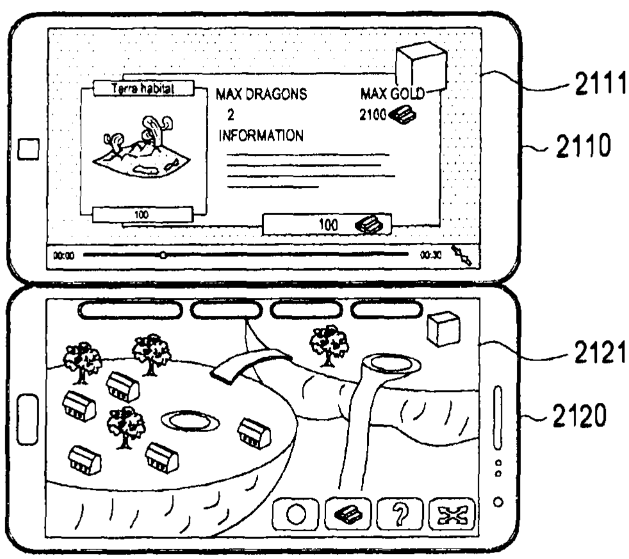
(b)
FIG.21F

| Sub | Main |
|---|---|
| off | on |

S - Use 2 screens / Use 1 screen (8 apps)
F- Fix the app on sub screen (support on sub screen only)
Swap - Swap between sub & main app Mimicking tilting a book shows recommended information (part of information that would be seen if rotated) up on hinge

| | |
|---|---|
| Sub | 1.1 Preview_Folded_S |
| Main | – |

Main screen upon dual preview turned on 1.1 Preview_Folded_M

Outspread type (Landscape)

2.1.1 Landscape - Controller_Exp_M

ELECTRONIC DEVICE COMPRISING MULTIPLE DISPLAYS AND METHOD FOR OPERATING SAME

This application is a Continuation of U.S. patent application Ser. No. 16/075,347 filed on Aug. 3, 2018 which claims priority of National Phase Entry of PCT International Application No. PCT/KR2017/001212 filed on Feb. 3, 2017, and claims priority to Korean Patent Application No. 10-2016-0015903 filed on Feb. 11, 2016 and Korean Patent Application No. 10-2016-0015210 filed on Feb. 5, 2016, the entire disclosure of which is hereby incorporated by reference in its entirety.

BACKGROUND

1. Field

Various embodiments relate to electronic devices, e.g., electronic devices including a plurality of displays.

The development of mobile communication technology has been affording electronic devices various data communication functions as well as voice call. Electronic devices, e.g., mobile devices or user equipment, may offer a variety of services through diverse applications. Electronic device may provide network-based communication services, such as multimedia services including music services, video services, or digital broadcast services, call or wireless Internet services, short message services (SMSs), multimedia messaging services (MMSs), etc.

In addition to provide various services, electronic devices may also be used to show the users' personality. As such, electronic devices may allow the users to stand out themselves, not just providing services. Display is regarded as an essential element enabling such various features, and various capabilities and types of displays are coming into being.

SUMMARY

As increased utility of electronic devices leads to their roles being diversified, a need exists for applying multiple displays to an electronic device to provide the user with a more convenient user environment.

An electronic device with multiple displays may display an application execution screen or content through each display. Thus, the multi-display electronic device, if operated in the same manner as is an electronic device with a single display, might not enjoy advantages that it otherwise may in use of the multiple displays.

In contrast to single-display electronic devices, multi-display electronic devices need to control the multiple displays to display a screen fitting the user's intention or the manner in which the user uses the electronic device. Further, an arrangement of the plurality of displays in the electronic device may also need to be taken into account in controlling the plurality of displays.

According to an embodiment of the present disclosure, an electronic device may include a first body, a second body rotatably hinged to the first body, a first display disposed in the first body, a second display disposed in the second body, and a processor. The processor may be configured to, when an angle between the first body and the second body falls within a first range, determine that a form type of the electronic device is an outspread mode to display a first screen and a second screen corresponding to the outspread mode on the first display and the second display, respectively, when the angle between the first body and the second body falls outside the first range and within a second range so that the first display and the second display face in different directions, determine that the form type changes from the outspread mode to a folded mode to display at least one of a third screen and a fourth screen corresponding to the folded mode on at least one of the first display and the second display, and when a direction in which the electronic device is positioned changes from a first direction to a second direction in the folded mode, adjust a screen displayed on at least one of the first display and the second display.

According to an embodiment of the present disclosure, a method for controlling an electronic device including a first body where a first display is disposed and a second body where a second display is disposed may include determining an angle between the first body and the second body, when the angle falls within a first range, determining that a form type of the electronic device is an outspread mode to display a first screen and a second screen corresponding to the outspread mode on the first display and the second display, respectively, when the angle falls outside the first range and within a second range, determining that the form type changes from the outspread mode to a folded mode to display at least one of a third screen and a fourth screen corresponding to the folded mode on at least one of the first display and the second display, and when a direction in which the electronic device is positioned changes from a first direction to a second direction in the folded mode, adjusting a screen displayed on at least one of the first display and the second display.

According to an embodiment of the present disclosure, the electronic device may provide various functions according to its arrangement, relationship in position between two displays, and the way the user grasps the electronic device.

BRIEF DESCRIPTION OF THE DRAWINGS

FIG. 6 is a view illustrating a table for describing gestures according to an embodiment of the present disclosure;

FIGS. 20*a* to 20*c* and 21*a* to 21*i* are views illustrating an example of changing form types according to an embodiment of the present disclosure;

DETAILED DESCRIPTION

Figure 1:
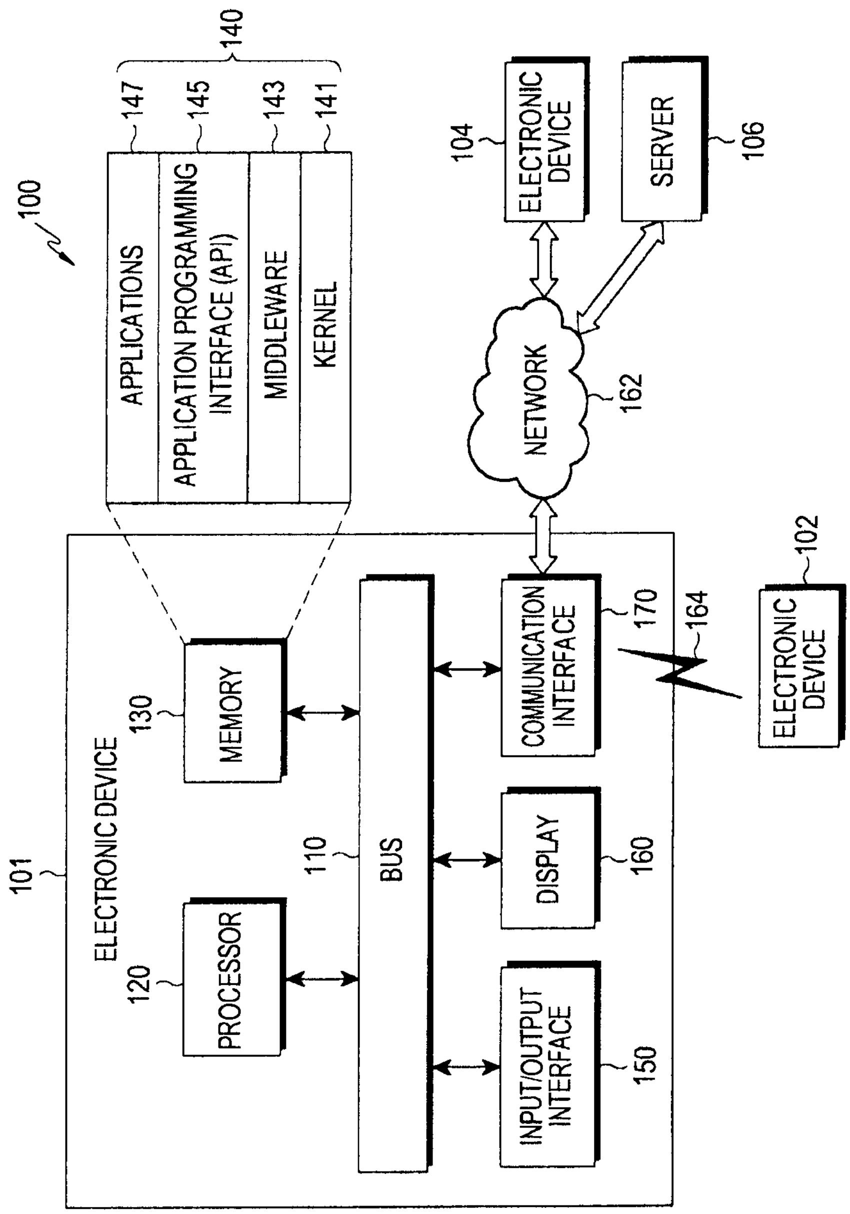
FIG. 1 is a view illustrating a network environment including an electronic device according to an embodiment of the present disclosure.

Chapter 1—Description of Hardware Parts, Devices, or Mechanism

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms “first” and “second” may modify various components regardless of importance and/or order and are used to distinguish a component from another without limiting the components. It will be understood that when an element (e.g., a first element) is referred to as being (operatively or communicatively) “coupled with/to,” or “connected with/to” another element (e.g., a second element), it can be coupled or connected with/to the other element directly or via a third element.

As used herein, the terms “configured to” may be interchangeably used with other terms, such as “suitable for,” “capable of,” “modified to,” “made to,” “adapted to,” “able to,” or “designed to” in hardware or software in the context. Rather, the term “configured to” may mean that a device can perform an operation together with another device or parts. For example, the term “processor configured (or set) to perform A, B, and C” may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term “user” may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or “application”) 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), Bluetooth, Bluetooth low power (BLE), ZigBee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system(hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
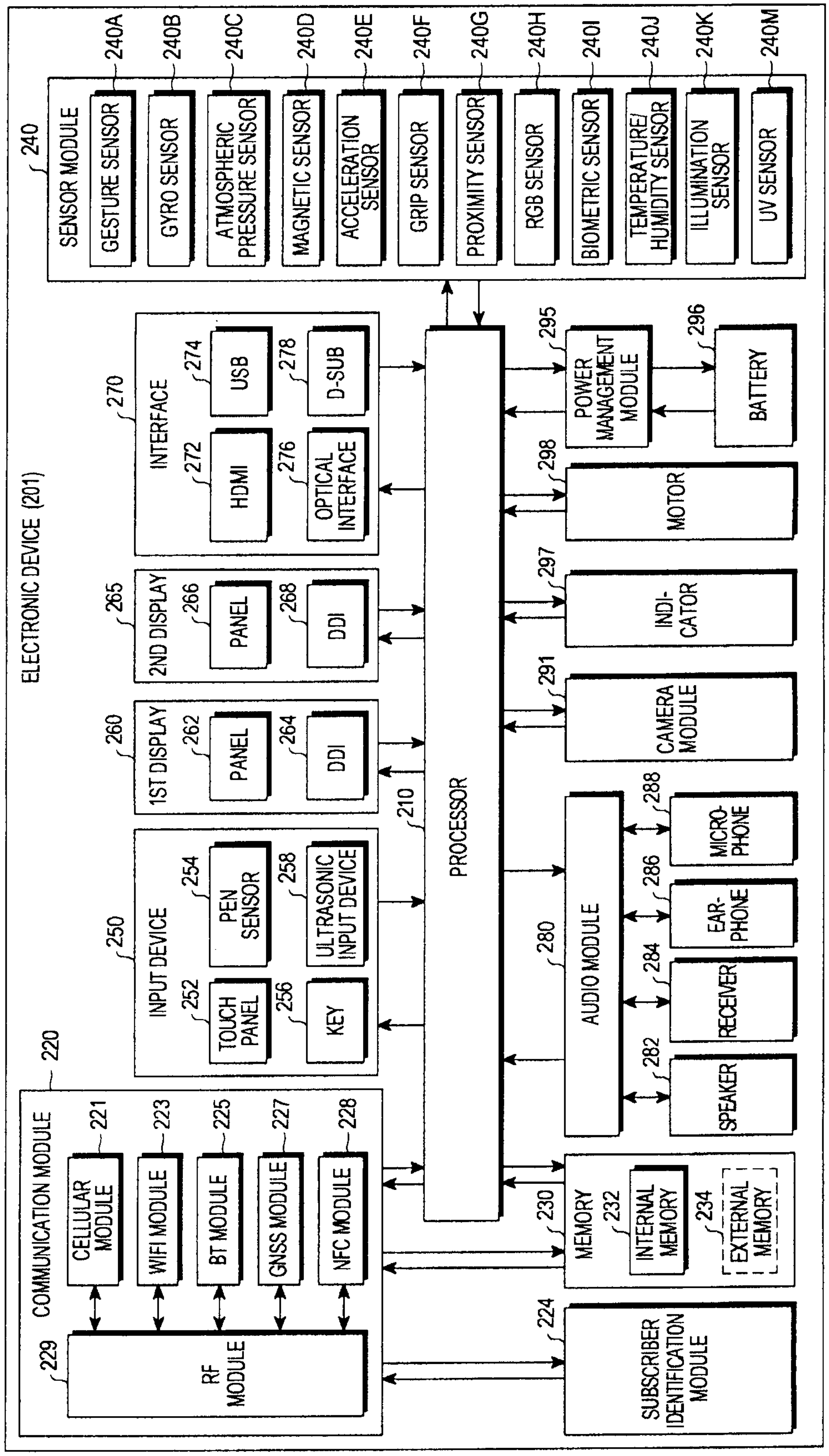
FIG. 2 is a block diagram illustrating an electronic device according to an embodiment of the present disclosure.

FIG. 2 is a block diagram illustrating an electronic device 201 according to an embodiment of the present disclosure; The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

According to an embodiment of the present disclosure, the displays (e.g., the display 160) may include a first display 260 and a second display 265. The first display may include a first panel 262 and a first display driving circuit (also referred to herein as a display driver integrated circuit (DDI)) 264 configured to control the first panel 262. The first panel 262 has a plurality of pixels, each of which may include subpixels displaying three primary colors, i.e., red, green, and blue (RGB), of light. Each subpixel may include at least one transistor. The intensity of light emitted from each subpixel may be adjusted depending on the magnitude of a voltage (or current) applied to the transistor. As the light intensity of each subpixel is adjusted, a color combination may be determined, enabling a desired color to be displayed. The first DDI 264 may include a gate driver circuit unit 940 controlling the turnon or turnoff the gate of the subpixel (RGB) and a source driver circuit unit 950 adjusting an image signal for the subpixel (RGB) to create a color difference, and the first DDI 264 may provide a full screen by adjusting the transistors of the subpixels in the first panel 262. The first DDI 264 may be operated to receive first image data from the processor 210 so that an image is displayed on the first panel 262.

The second display may include a second panel 266 and a second display driving circuit (also referred to herein as a display driver integrated circuit (DDI)) 268 configured to control the second panel 266. The second panel 266 has a plurality of pixels, each of which may include subpixels displaying three primary colors, i.e., red, green, and blue (RGB), of light. Each subpixel may include at least one transistor. The intensity of light emitted from each subpixel may be adjusted depending on the magnitude of a voltage (or current) applied to the transistor. As the light intensity of each subpixel is adjusted, a color combination may be determined, enabling a desired color to be displayed. The second DDI 268 may include a gate driver circuit unit 940 controlling the turnon or turnoff the gate of the subpixel (RGB) and a source driver circuit unit 950 adjusting an image signal for the subpixel (RGB) to create a color difference, and the second DDI 268 may provide a full screen by adjusting the transistors of the subpixels in the second panel 266. The second DDI 268 may be operated to receive second image data, the same or different from the first image data, from the processor 210 so that an image is displayed on the second panel 266.

At least one of the first panel 262 or the second panel 266 may be flexible, stretchable, or bendable, according to an embodiment of the present disclosure. Thus, the first panel 262 or the second panel 266 may be flat or bent in shape. At least one of the first panel 262 or the second panel 266 may include one or more modules including a touch panel 252 and/or a pen sensor 254. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252.

The first and second display 260 and 265 (e.g., the display 160) may include another image output scheme (e.g., a hologram device or projector not shown here) and/or a control circuit for controlling the same.

In an embodiment for implementing a device including multiple displays, at least part of contents (e.g., image data or image data streams) varied in several modules of the electronic device 201 may be processed by the processor 210. The processor 210 may determine that the varied content is displayed on at least one of the first display 260 or the second display 265. For example, the electronic device 201 may enable the first display 260 to output a command received from the communication module 220 and the second display 265 to output a command received from the sensor module 240. According to an embodiment of the present disclosure, the electronic device 201 may perform a switch so that a content outputted on the first display 260 is displayed on the second display 265 or may enable a content outputted on the first display 260 to be displayed on both the first display 260 and the second display 265. The electronic device 201 may perform a switch so that a content outputted on the second display 265 is displayed on the screen of the first display 260 or may enable a content outputted on the second display 265 to be displayed on both the first display 260 and the second display 265.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as a light emitting diode (LED) or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a graphics processing unit (GPU)) that may process media data as per, e.g., digital multimedia broadcasting (DMB), digital video broadcasting (DVB), or MediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3A:
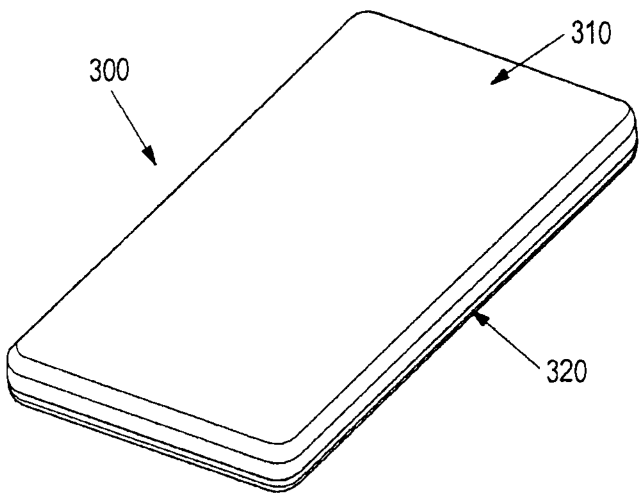
FIG. 3*a*, FIG. 3*b*, FIG. 3*c*, FIG. 3*d*, FIG. 3*e*, and FIG. 3*f* are concept views illustrating an electronic device according to embodiments of the present disclosure.

FIG. 3*a* is a concept view illustrating an electronic device 300 according to an embodiment of the present disclosure.

According to an embodiment of the present disclosure, the electronic device 300 may have a plurality of displays 310 and 320 as shown in FIG. 3*a*. The plurality of displays 310 and 320, respectively, may be arranged on the front and rear surface of the electronic device 300. The display disposed on a surface of the electronic device 300 may be denoted a first display 310, and the display disposed on an opposite surface of the electronic device 300 may be denoted a second display 320.

Figure 3B:
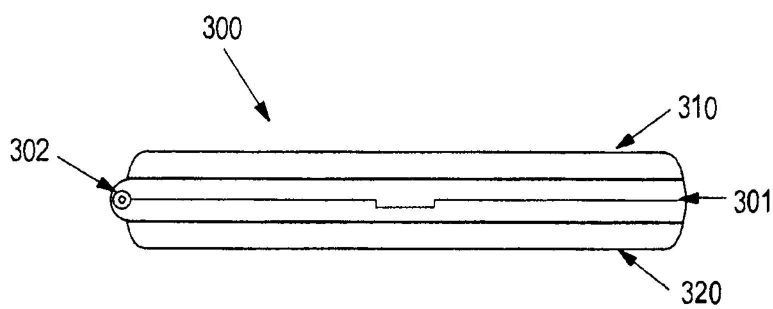

FIG. 3*b* is a side view illustrating an electronic device 300 according to an embodiment of the present disclosure. Of the displays respectively disposed on the front and rear surface of the electronic device 300 the first display 310 may be fastened in the housing 301, and the second display 320 may pivot on the housing 301 through a separate hinge module 302. In FIG. 3*b*, the angle between the first display 310 and the second display 320 may be substantially 0 degrees, and this position may be denoted a closed state of the second display 320. Further, when the second display 320 pivots on the hinge module 302 so that the angle between the first display 310 and the second display 320 exceeds 0 degrees, this position may be denoted an opened state of the second display 320. As set forth above, since the second display 320 pivots on the housing 301, it may be the second display 320 that is closed or opened.

Figure 3C:
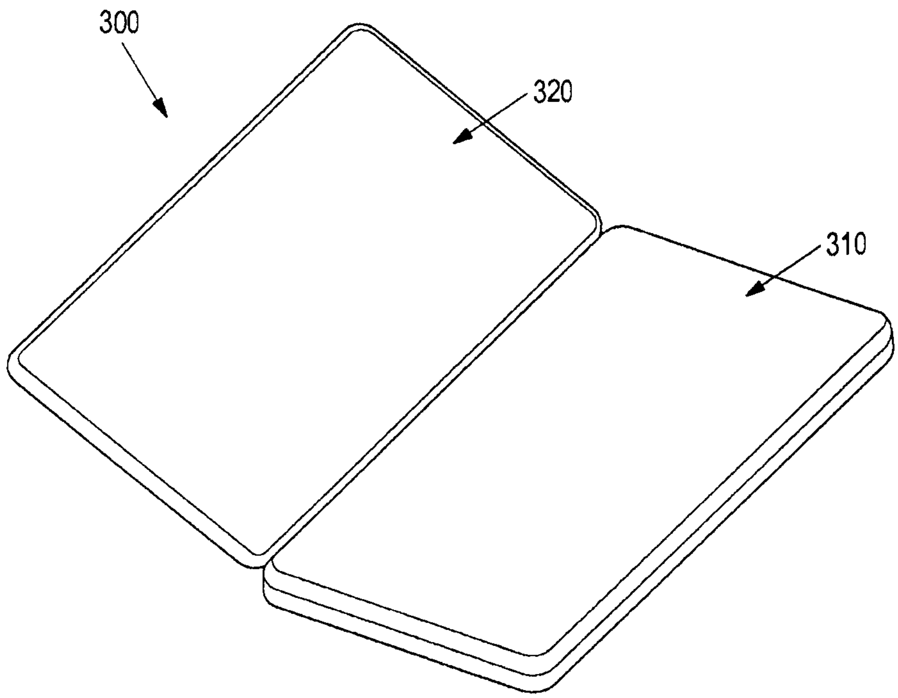
Figure 3D:
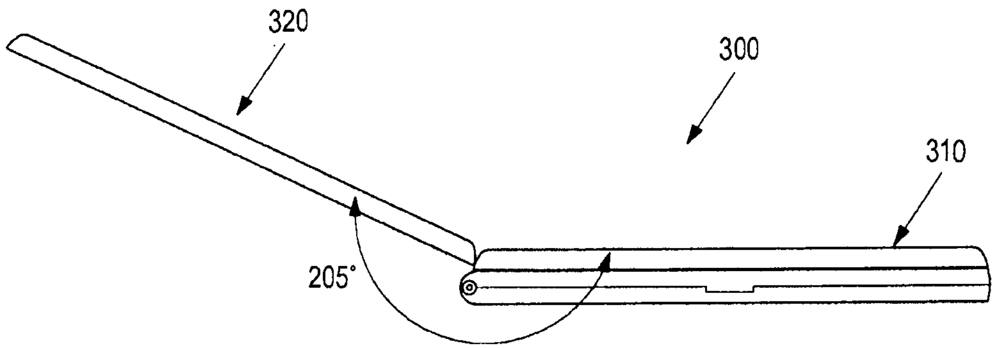

FIGS. 3*c* and 3*d* illustrate a state in which the second display 320 is in a fully opened position, according to an embodiment of the present disclosure. According to an embodiment of the present disclosure, when the second display 320 is fully opened, the angle between the displays 310 and 310 may reach up to 205 degrees. However, the angle, 205 degrees, is merely an example, and the maximum angle that may be obtained between the displays 310 and 320 is not limited thereto. Although the displays 310 and 320 are arranged to face in different directions when they are in the fully closed position, the displays 310 and 320 may be arranged to face in the same direction when the second display 320 is in the fully opened position.

Meanwhile, the maximum angle at which the second display 320 may be opened may be 180 degrees, 205 degrees, or more depending on the hinge module 302 to which the second display 320 is connected. Further, the angle at which the second display 320 is opened is not limited to one angle—for example, the second display 320 may be opened at 30 degrees, 60 degrees, 90 degrees, 120 degrees, 150 degrees, or 180 degrees. Or, the second display 300 may be opened freely at any unspecified angle.

Figure 3E:
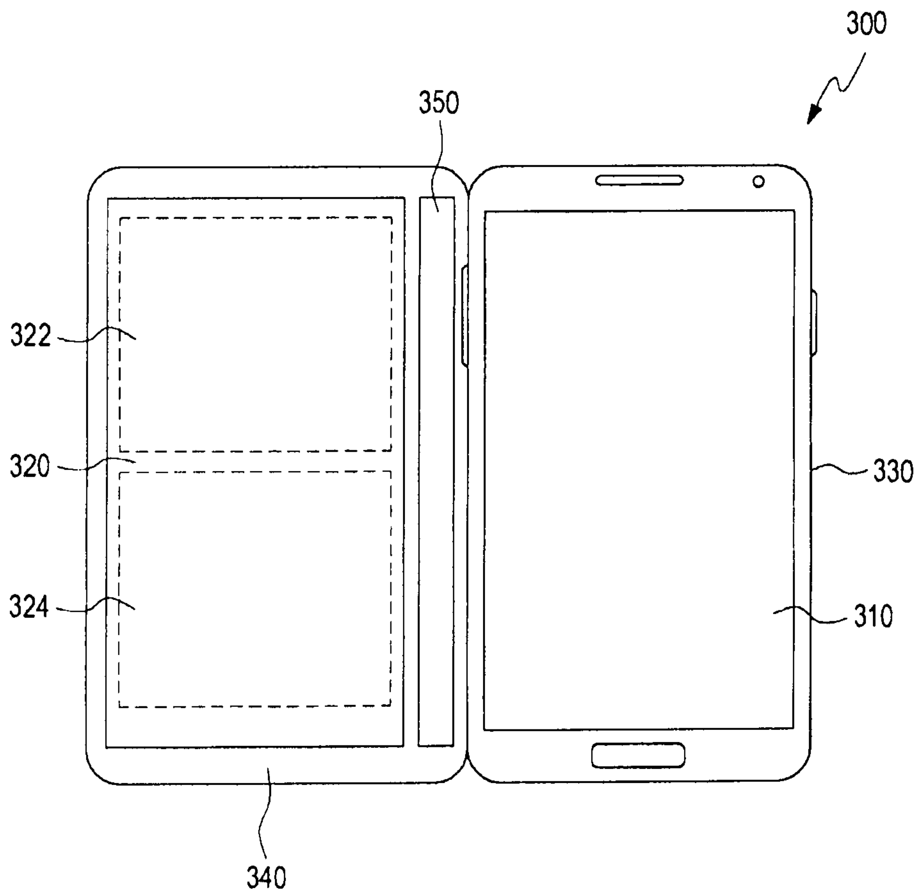
Figure 3F:
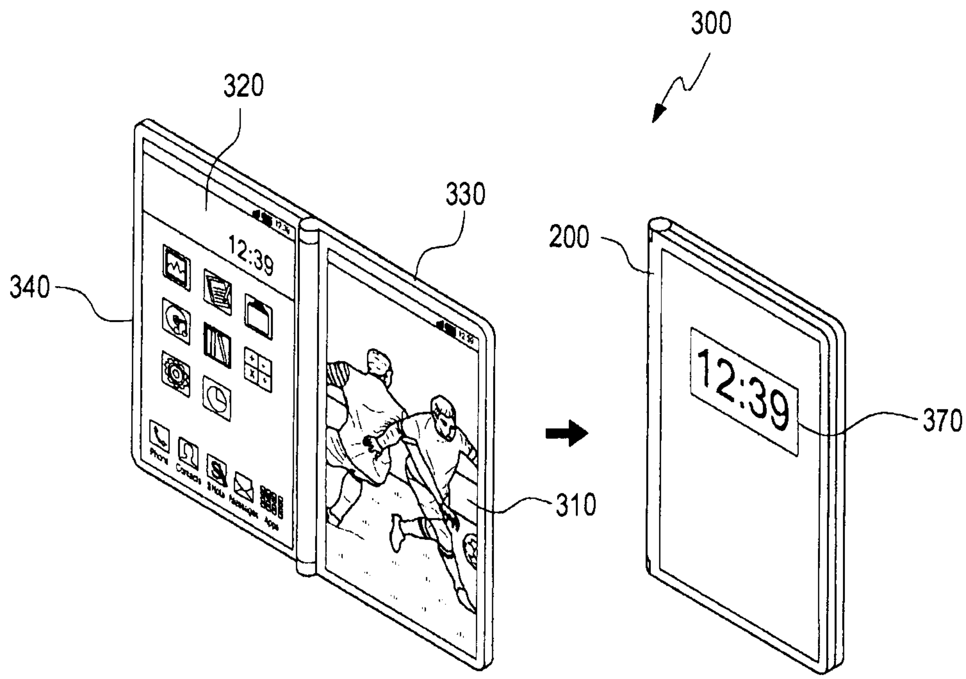

FIGS. 3*e* and 3*f* are views illustrating an electronic device functionally connected with a plurality of displays according to an embodiment of the present disclosure. Referring to FIG. 3*e*, the electronic device 300 (e.g., the electronic device 101) may include a plurality of displays, at least, including, e.g., the first display 310 and the second display 320. The first display 310 may be formed in at least a portion (e.g., the front surface) of the body 330 of the electronic device 300, for example. The second display 320 may be formed in at least a portion of a cover 340 that is able to cover at least a portion (e.g., the first display 310) of the body 330 of the electronic device 300. According to an embodiment of the present disclosure, the second display 320 may include, e.g., a transparent display area or a mirror display area.

According to an embodiment of the present disclosure, the second display 320 may include additional display areas 322 and 324. The additional display area 324 may have a different attribute than that of the display area 322—the attribute here may include, e.g., size, shape, brightness, color, chroma or saturation, sharpness, contrast, transmittance, gamma, resolution, brightness-darkness contrast ratio, color gamut, view angle, color temperature, gray level linearity, or transparency. Independent of the transparent display area 322, the attribute (e.g., size, shape, brightness, color, chroma or saturation, sharpness, contrast, transmittance, gamma, resolution, contrast ratio, view angle, color gamut, color temperature, gray level linearity, or transparency) of the additional display area 324 may be adjusted. According to an embodiment of the present disclosure, the additional display area 324 may be at least one of the transparent display area or the mirror display area.

According to an embodiment of the present disclosure, the electronic device 300 may further include a third display 350. The third display 350 may be formed in another portion of the cover 340 of the electronic device 300. According to an embodiment of the present disclosure, where the second display 320 is formed in at least a portion of a top surface of the cover 340, the third display 350 may be formed in, e.g., another portion of the top cover of the cover 340, at least a portion of a bottom surface of the cover 340, or in one or more of at least a portion of a top surface or bottom surface of a portion of the cover 340 covering at least a portion of a side surface of the body. According to an embodiment of the present disclosure, the third display 350 may include, e.g., a transparent display area or a mirror display area.

Referring to FIG. 3*f*, according to an embodiment of the present disclosure, at least one (e.g., the second display 320) of the plurality of displays of the electronic device 300 may be positioned on an internal surface of the cover 340. For example, where the cover 340 is closed on the electronic device 300, the second display 320 may be formed to face in an opposite direction of the first display 310 of the body 330. Specifically, where the cover 340 closes so that the cover 340 contacts a rear or back surface of the body 330, the plurality of displays 310 and 320 of the electronic device 300 may be positioned on both surfaces, respectively, thereof. When the cover 340 is folded contacting the body 330, a screen displayed on one (e.g., the second display 320) of the plurality of displays may be changed into a screen displayed on another display (e.g., a fifth display 370).

According to an embodiment of the present disclosure, the plurality of displays 310 and 320 of the electronic device 300 may be folded in opposite directions. At least one display (e.g., the second display 320) may be formed on an internal surface of the cover 340, e.g., the surface in an opposite direction of the direction facing the first display 310 with respect to the body 330 when the cover 340 is closed on the electronic device 300. Another display (e.g., the fifth display 370) of the plurality of displays of the electronic device 300 may be formed on an external surface of the cover 340, e.g., a surface in the direction of facing the outside of the body when the cover 340 is closed.

According to an embodiment of the present disclosure, the fifth display 370 may be driven at a lower power level as compared with the other(s) of the plurality of displays. The fifth display 370, e.g., when driven at lower power to consume less battery power, may be configured to stay on to display predetermined information (e.g., current time, battery status, electronic field status, or various notification information (e.g., message alert or missed calls) before until receiving a predetermined input (e.g., a screen lock key input). According to an embodiment of the present disclosure, the fifth display 370 may be configured to be driven by a processor (e.g., the processor 120) controlling the overall function of the electronic device 300. Or, the electronic device 300 may include a separate low-power processor for driving the fifth display 370 at a lower power level. When the electronic device 300 includes a low-power processor, the function of displaying predetermined information through the fifth display 370 may be performed by the low-power processor.

According to an embodiment of the present disclosure, the electronic device 300 may determine a display to display predetermined information (e.g., current time, battery status, electronic field status, or various notification information (e.g., message alert or missed calls) among the plurality of displays depending on the opening or closing of the cover 340. The electronic device 300 may display the predetermined information through the fifth display 370, e.g., when the cover 340 is closed. E.g., when the cover 340 is opened, the electronic device 300 may display the predetermined information through the second display 320 or the display (e.g., the first display 310) formed in the body 330.

Figure 4:
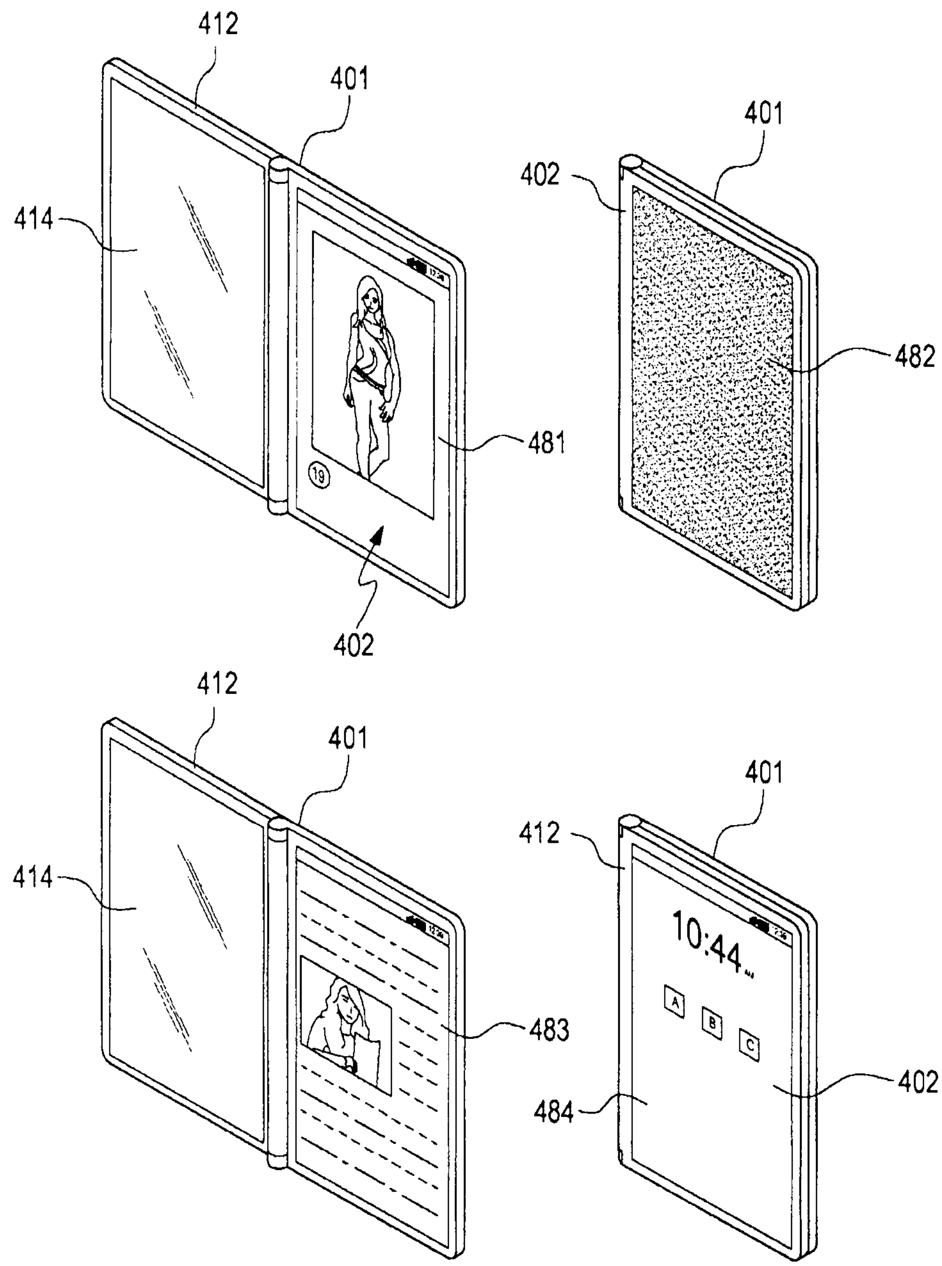
FIG. 4 is a concept view illustrating a display screen of an electronic device according to an embodiment of the present disclosure.

Referring to FIG. 4, according to an embodiment of the present disclosure, the processor may display a first function screen 481 corresponding to a particular function through the first display 402 when the first display 402 and the second display 412 are in an unfolded position. The first function screen 481 may be, e.g., a webpage screen received from a server connected upon accessing a particular website.

Referring to FIG. 4, according to an embodiment of the present disclosure, the processor may display a second function screen 414 corresponding to a particular function through the second display 412 when the first display 402 and the second display 412 are in an unfolded position. The second function screen 414 may be, e.g., a webpage screen received from a server connected upon accessing a particular website.

According to an embodiment of the present disclosure, the processor may display a third function screen 484 corresponding to a particular function through the first display 402 in response to the operation that at least a portion of the second display 412 covers the rear surface of the first display 402—e.g. a pivot operation of the second display. For example, the third function screen 484 may be a preset standby screen. The third function screen 484 may be displayed on at least one of the first display 402 or the second display 412 and may be a screen corresponding to another screen mode of each display.

According to an embodiment of the present disclosure, the processor may display a second function screen 483 corresponding to a particular function through the first display 402 in response to the operation that at least a portion of the second display 412 is opened from the first display 402—e.g. a pivot operation of the second display. The second function screen 483 may be, e.g., a webpage screen received from a preset particular server.

According to an embodiment of the present disclosure, the processor may adjust a screen 483 of the first display 402 in response to the operation that at least a portion of the second display 412 of the electronic device 401 covers the first display 402—e.g. a pivot operation of the second display. A screen 414 displayed on the second display 412 may simultaneously be adjusted into a screen (e.g., screen 482) different from the existing screen.

According to an embodiment of the present disclosure, the electronic device 401 may determine the third function screen 484 based on at least one of, e.g., the type of a particular application or function running on the electronic device 401, type of information (e.g., a screen or page) displayed through the first display 402 and/or second display 414, or the opened or closed state of the cover on the body of the electronic device 401. The third function screen 484 may be displayed on at least one of the first display 402 or the second display 412 or may be displayed on another external display.

Figure 5:
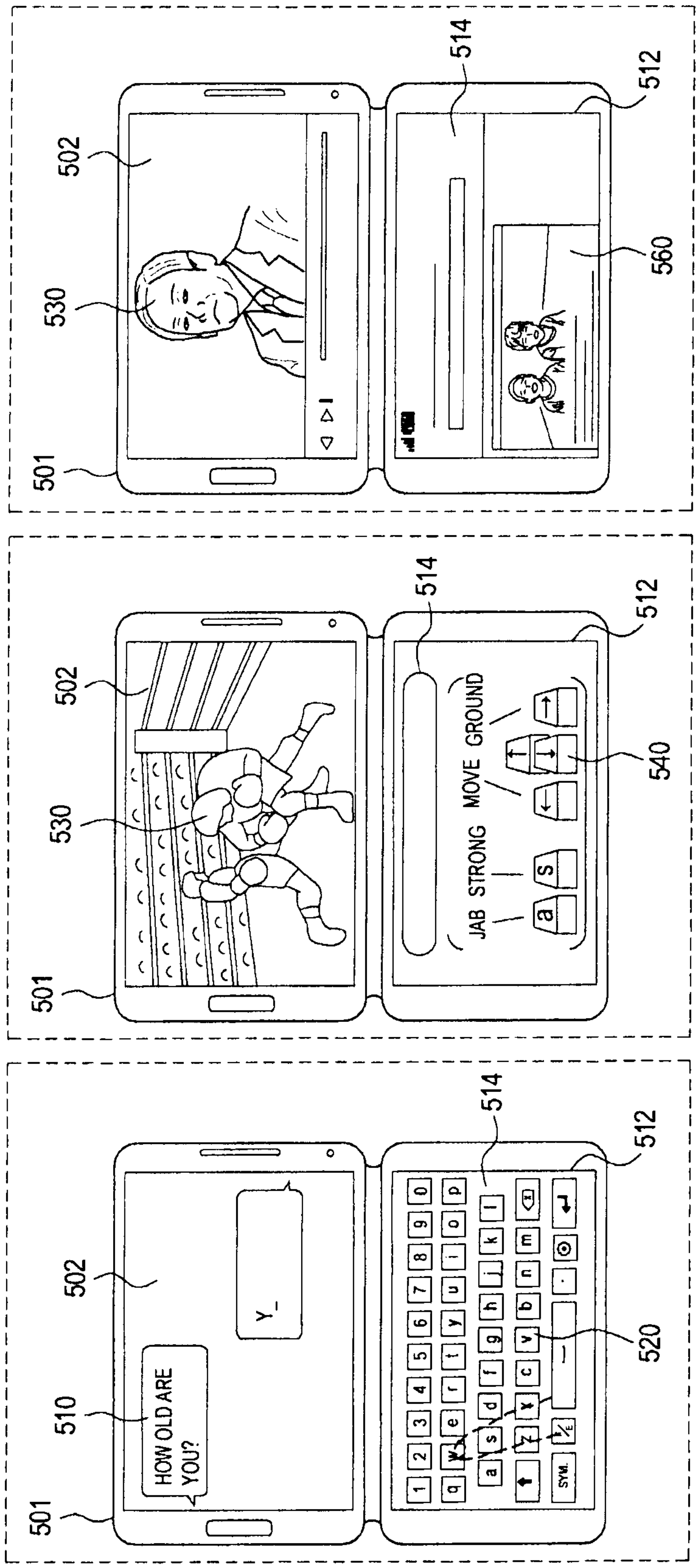
FIG. 5 is a concept view illustrating a display screen of an electronic device according to an embodiment of the present disclosure.

FIG. 5 illustrates an example in which a display area formed in at least a portion (e.g., the second display 4312) of the plurality of displays is used as an input means with the cover of the electronic device 501 opened according to an embodiment of the present disclosure The electronic device 501 may include, e.g., a sensor (e.g., a touch sensor, a digitizer, a gesture sensor, a proximity sensor, an image sensor, or a three-dimensional (3D) sensor) capable of sensing a single-surface touch input, a double-surface touch input, a gesture input, or proximity input (e.g., a hovering) associated with the display area 514.

Referring to FIG. 5, according to an embodiment of the present disclosure, in the state where a first body (e.g., a cover portion) of the electronic device 501 is opened at least partially, based on an input obtained using, as an input means, the display area formed in the display (e.g., the second display 512) positioned in the first body, a function or information displayed on another display (e.g., the first display 502) positioned in a second body (e.g., a body portion) of the electronic device 501 may be controlled. The electronic device 501 (e.g., the electronic device 101) may include a plurality of displays, at least, including, e.g., the first display 502 and the second display 512. The second display 512 may include, e.g., a display area 514. The electronic device 501 may further include, e.g., a sensor (e.g., a touch sensor, a digitizer, a gesture sensor, a proximity sensor, an image sensor, or a three-dimensional (3D) sensor) capable of sensing a touch input or proximity input (e.g., a hovering) associated with the display area 514.

According to an embodiment of the present disclosure, the electronic device 501 may display, through at least a portion (e.g., the display area 514) of the second display 512, a virtual input tool (e.g., a virtual keyboard 520 or gamepad 540) for an application (e.g., a chat program 510 or game 530) or function displayed through, e.g., the first display 502.

According to an embodiment of the present disclosure, the electronic device 501 may run, e.g., a text input application (e.g., the chat program 510, web browser 560, or messaging (SMS/MMS) program) and may display its running screen through the first display 502. The electronic device 501, upon sensing a user input (e.g., a touch, gesture, swipe, hovering, or pen input) on at least a portion of the first display 502 where the execution screen of the text input application is displayed, may display the virtual input tool (e.g., the virtual keyboard 520 or text input window) for the text input application through the second display 512. The electronic device 101 may allocate a corresponding text to the text input application using the position of a touch detected from the virtual input tool. Further, the electronic device 101 may reflect the inputted text on the execution screen of the text input application displayed through the first display 502.

According to an embodiment of the present disclosure, the electronic device 501 may display, through at least a portion (e.g., the display area 514) of the second display 512, a function or application (e.g., the web browser 560) different from a function or application (e.g., a video play program 550) displayed on, e.g., the first display 502.

Chapter 2—Description of User Interface (UI)

2.1. Overview

The present chapter discloses various embodiments and relevant drawings relating to user interfaces (UIs) of an electronic device having a plurality of displays. According to an embodiment of the present disclosure, the electronic device may respond to various sensor inputs, e.g., a touch or motion. Further, the electronic device may display various UIs on the plurality of displays depending on contexts.

2.2. Description of Basic Interaction

As mentioned above, in this chapter, operations as per user inputs in an electronic device with multiple displays are described with reference to various embodiments.

FIG. 6 illustrates a touch interaction that is of a basic type in an electronic device according to an embodiment of the present disclosure. The marks shown in the drawings may be used, and their corresponding operations may be performed as are described therein.

2.3. Description of Basic Hardware 2.3.1. Description of Hardware Buttons

Figure 7:
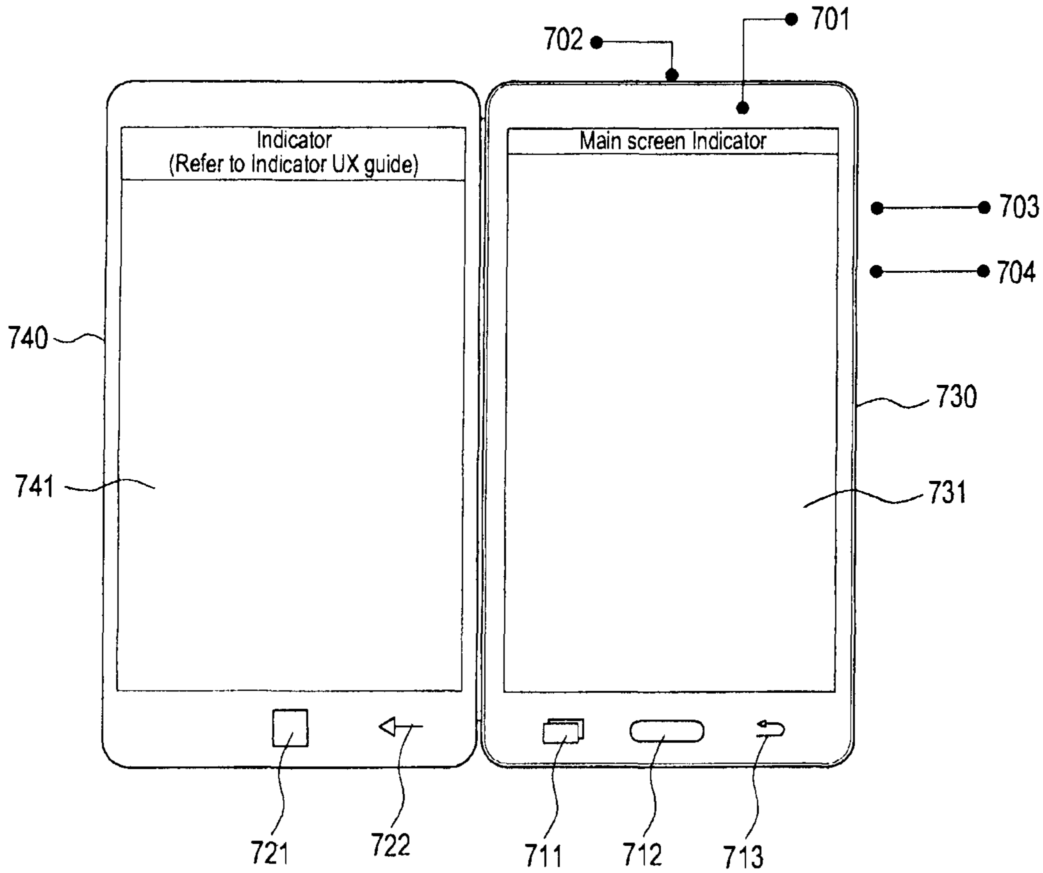
FIG. 7 is a concept view illustrating an electronic device in an outspread mode according to an embodiment of the present disclosure.

According to an embodiment of the present disclosure, an electronic device with a plurality of displays may have hardware buttons in the respective bodies of the plurality of displays. FIG. 7 illustrates an embodiment of hardware buttons corresponding to each of a main display and a sub display.

According to an embodiment of the present disclosure, a power key 703 and a volume control key 704 may be arranged on a side surface of a first body 730 including a first display 731, and a key 711 for calling up a list of applications run recently (simply, recently run application list calling key 711), a key 712 for calling up a home screen (simply home screen calling key 712), and a backward function key 713 may be arranged on a lower end of the surface of the first body 730. A screen displayed on the first display 731 may be termed a main screen.

According to an embodiment of the present disclosure, two touch buttons (e.g., a home screen calling key 721 and backward function key 722) may be disposed on a lower end of the surface of the second body 740 including the second display 741. The electronic device, upon simultaneously touching the two buttons 721 and 722, may perform a function of calling up a list of applications recently run. A screen displayed on the second display 741 may be termed a sub screen.

According to an embodiment of the present disclosure, a camera 701 and a receiver 702 may be arranged on a surface of the first body 730. Alternatively, each of the two bodies 730 and 740 may have at least one or more of a receiver and a camera.

According to an embodiment of the present disclosure, the home screen calling keys 712 and 721 respectively arranged on the bodies 730 and 740 may individually be operated to control screens respectively displayed on the displays 731 and 741.

According to an embodiment of the present disclosure, the receiver 702 may be disposed in the first body 730, and accordingly, some functions using the receiver 702 may be performed on the main screen executed on the first display 731, but not on the sub screen. For example, an execution screen of a call application using a call function, upon execution, may be displayed on the first display 731, but not on the second display 741.

2.3.2. Description of Form Types

According to an embodiment of the present disclosure, an electronic device may have various form types. FIGS. **8*a* and 9** illustrate some of various examples of various form types of the electronic device.

Referring to FIG. **8*a***, the "folded mode" means a state in which two displays are in a position of having been folded outwards. In the folded mode, one of the displays which is in use may be in an on state, and the other not in use may remain in an off state. Depending on the user's manipulation or a particular application, the electronic device may use both the displays, and the display maintaining the on state may be changed by the user's selection. The electronic device may process a user input entered to the display maintaining the off state which is one positioned opposite the on-state display. Such function may be referred to as a backside touch function. Additionally, the electronic device may be operated in an outspread mode. The outspread mode refers to a state in which the display of the sub screen is in an opened position, meaning that the two displays maintain the on state while displaying the screen. The outspread mode may break down into a dual mode and an expand mode depending on operational states of an application. The dual mode means that the displays are occupied by different applications, respectively, and the expand mode means a state where one application occupies both the displays.

Figure 8A:
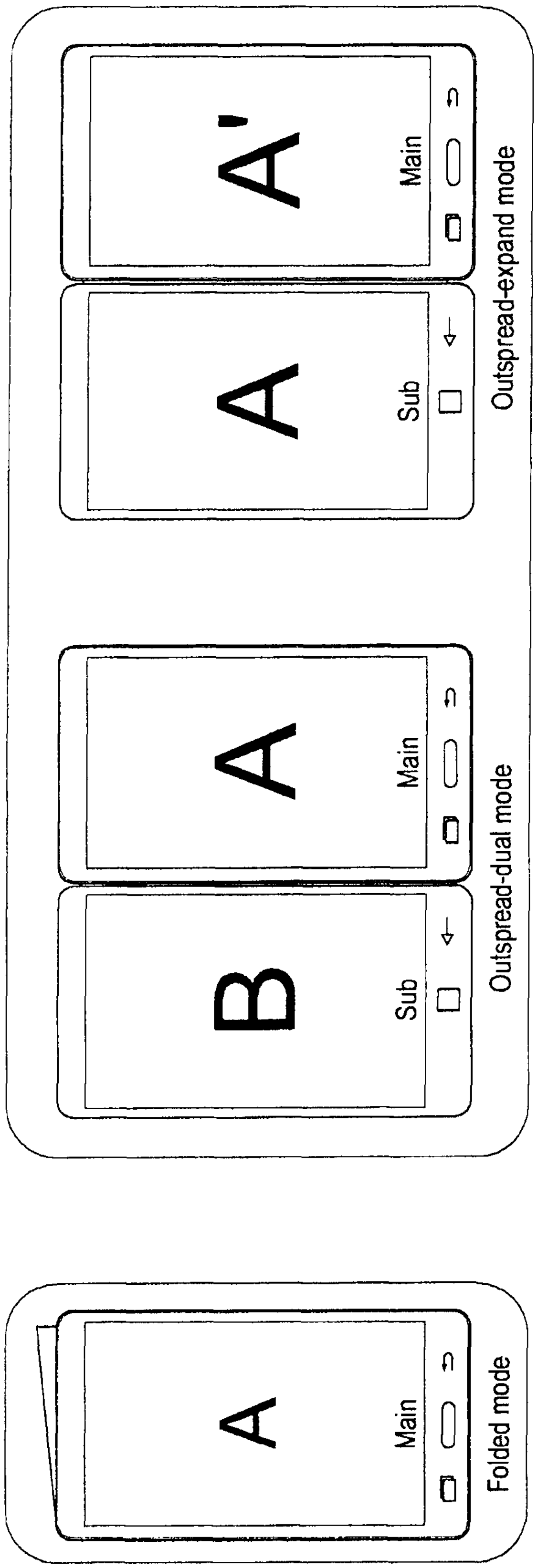
FIGS. 8*a* to 8*c* are concept views illustrating an electronic device in a folded mode and outspread mode according to an embodiment of the present disclosure.
Figure 8B:
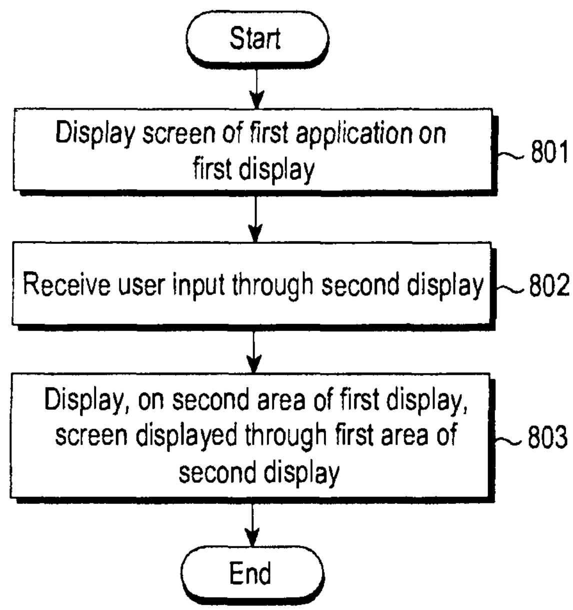

FIG. 8*b* is a flowchart illustrating a method for operating an electronic device according to an embodiment of the present disclosure. Now, the backside touch function is described in greater detail.

In operation 801, the electronic device 101 may display an execution screen of a first application on the first display. The electronic device 101 may display a screen of an application now running on the first display.

Further, the electronic device 101 may display, through a second application, another running screen of the first application, an execution screen of the second application, and an image or information associated with the first application or a first content run through the first application.

In operation 802, the electronic device 101 may receive a user input through the second display at an angle between the first body and the second body that is a predetermined threshold angle or less.

When the angle between the first body and the second body is the predetermined angle or less, and the user looks at the first display, the user cannot see the second display.

In operation 803, the electronic device 101 may display a screen displayed through a first area of the second display corresponding to the user input received through the second display through a second area of the first display.

The position and size of the first area may variably be determined depending on the user input, and the position and size of the second area of the first display may be the same as the position and size of the first area of the second display or may be different depending on, e.g., user settings.

Figure 8C:
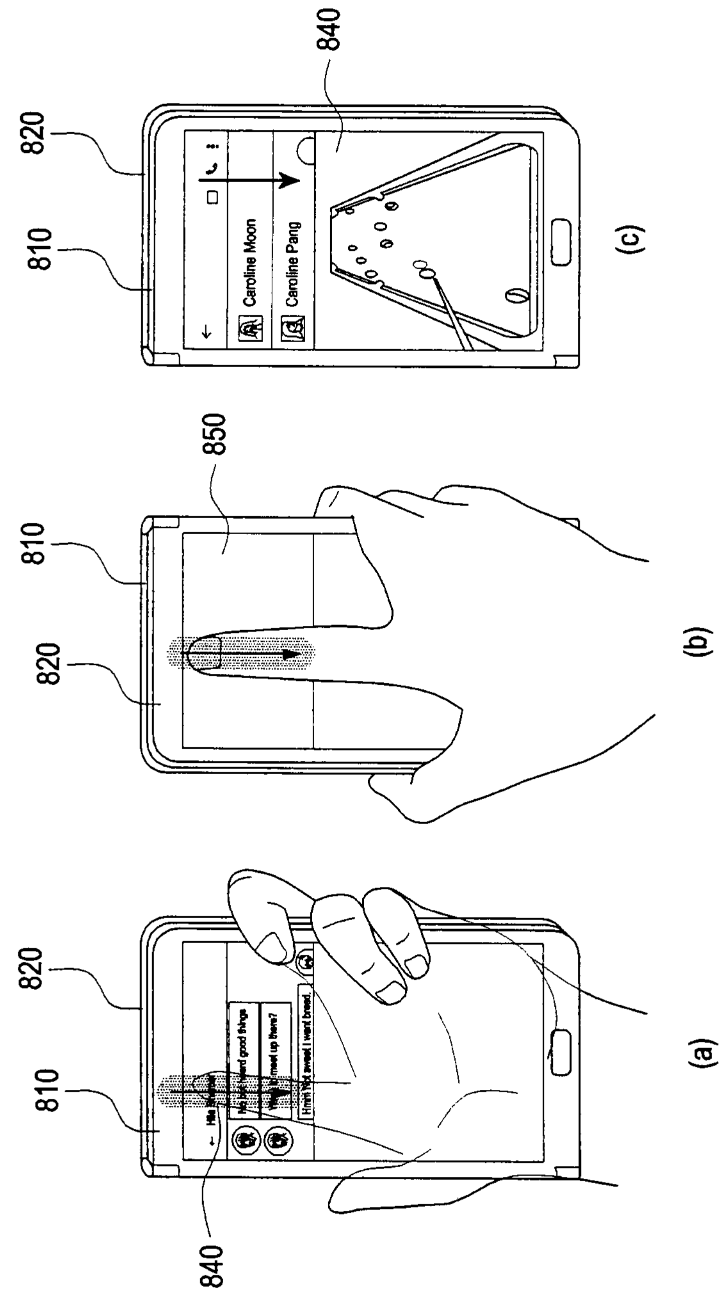

FIG. 8*c* is a view illustrating a process of displaying, through the first display, at least an area of a screen displayed on the second display, according to an embodiment of the present disclosure.

Referring to FIG. 8*c*(*a*), the user may fulfill a downward touch-and-drag input on the second display to identify the screen displayed through the second display 820, with the execution screen of the first application displayed through the first display 810.

As shown in FIG. 8*c*(*a*), the second area 840 of the first display 810 corresponding to the first area 850 of the second display 820 may be determined to have the same position and size as those of the first area 850 of the display 820.

Although not shown, the second area 840 of the first display 810 may have a different size and position from those of the first area of the display 820 depending on, e.g., characteristics of the application running or the user's settings.

Referring to FIG. 8*c*(*b*), a touch-and-drag input may be received on the second display 820 from the user, and the first area 850 of the second display 820 corresponding to the user input may be determined based on the point where the touch input is received and the position where the drag input is received.

Although the input for identifying the screen displayed through the second display 820 is described to be a touch-and-drag input as shown in FIG. 8*c*, embodiments of the present disclosure are not limited thereto, and various inputs may rather be used to identify the screen displayed through the second display 820.

Referring to FIG. 8*c*(*c*), upon reception of an input for identifying the screen displayed through the second display 820, the electronic device 101 may display the screen displayed on the first area 8450 of the second display 820 through the second area 840 of the first display 810. Thus, the user, although not performing the operation of flipping the electronic device 101 to identify the screen displayed on the second display 820, may identify the screen displayed on the second display 820 only with an input for identifying the screen displayed through the second display 820.

Further, according to an embodiment of the present disclosure, the electronic device 101 may display the screen displayed through the first area 850 of the second display 820 through the second area 840 of the first display 810 while the user input is maintained. Therefore, when the user input expires, the processor 120 may stop displaying, through the second area 840 of the first display 810, the screen displayed through the first area 850 of the second display 820.

Further, according to an embodiment of the present disclosure, the processor 120 may display, through the second area 840 of the first display 810, the screen displayed through the first area 850 of the second display 820, regardless until a separate user input is received to terminate the display on the first area 850 of the second display 820.

Figure 9:
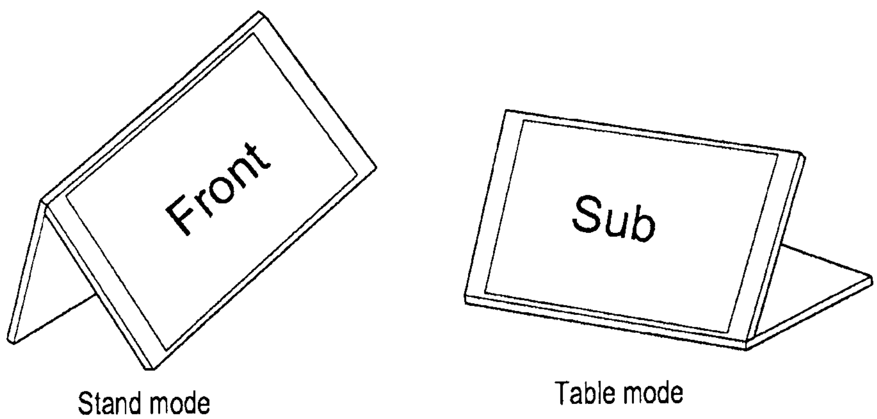
FIG. 9 is a concept view illustrating an electronic device in a table mode according to an embodiment of the present disclosure.

Referring to FIG. 9, according to an embodiment of the present disclosure, the stand mode may mean a state in which an angle is formed by a hinge between the two displays so that the electronic device may stand against the surface (also referred to as an underneath surface or contact surface) contacted by the respective side surfaces of the bodies including the two displays. Thus, one of the displays contacts the underneath surface, and the other display may be rendered to stand at a predetermined angle with respect to the display contacting the underneath surface. In a default state of the stand mode, one display is in an on state, and the other may maintain an off state. Here, the display maintaining the on state may be one being currently used by the user—this display may be termed an active display. A screen displayed on the active display may be referred to as an active screen. Meanwhile, when the electronic device runs a particular application, e.g., a video player or video conference call, the two displays both may be controlled under the on state, or the on-state display may be changed by the user's selection.

According to an embodiment of the present disclosure, the table mode may mean a state in which one of the two displays is in contact with the underneath surface (e.g., a floor), and the other display stands against the underneath surface. The electronic device may recognize the table mode using a proximity sensor and gyro sensor included in the body of the main display and operate in such mode. In the table mode, the display standing against the contact surface may remain in the on state and display an execution screen of an application.

Figure 10:
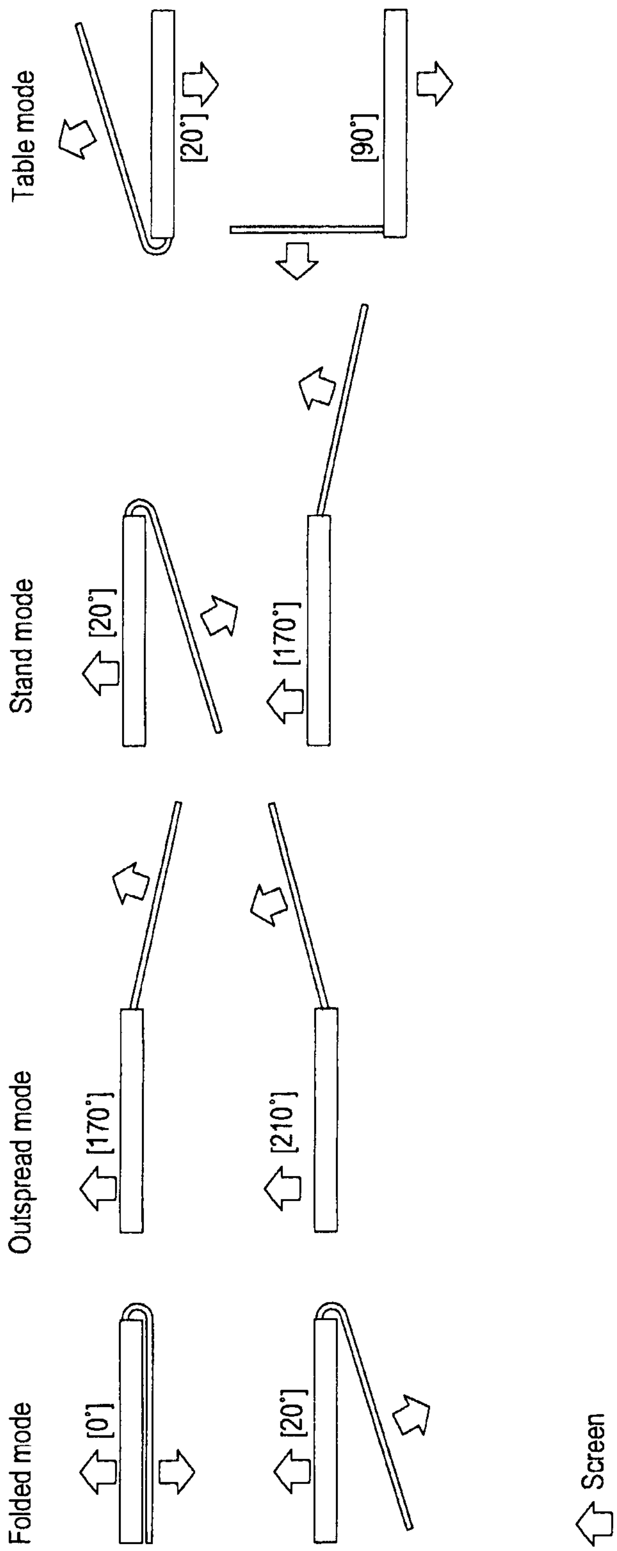
FIG. 10 is a side view illustrating an electronic device for describing a form type according to an embodiment of the present disclosure.

Such form type may be implemented at various angles. FIG. 10 illustrates examples associated with form type angles. For example, when the folded mode is defined as a state where both the displays are in a fully folded position so that the angle between the two displays is 0 degrees while the outspread mode is defined as a state where the two displays are spread out with the angle between the two displays being 180 degrees, the following modes may come up based on the angle between the two displays formed by the hinge:

Folded mode: 0 degrees to 20 degrees

Outspread mode: 170 degrees to 210 degrees

Stand mode: 20 degrees to 170 degrees

Table mode: 20 degrees to 90 degrees, where a contact of the bottom of the main display may further be recognized by the gyro sensor or proximity sensor.

2.3.3. Description of Screen

Figure 11:
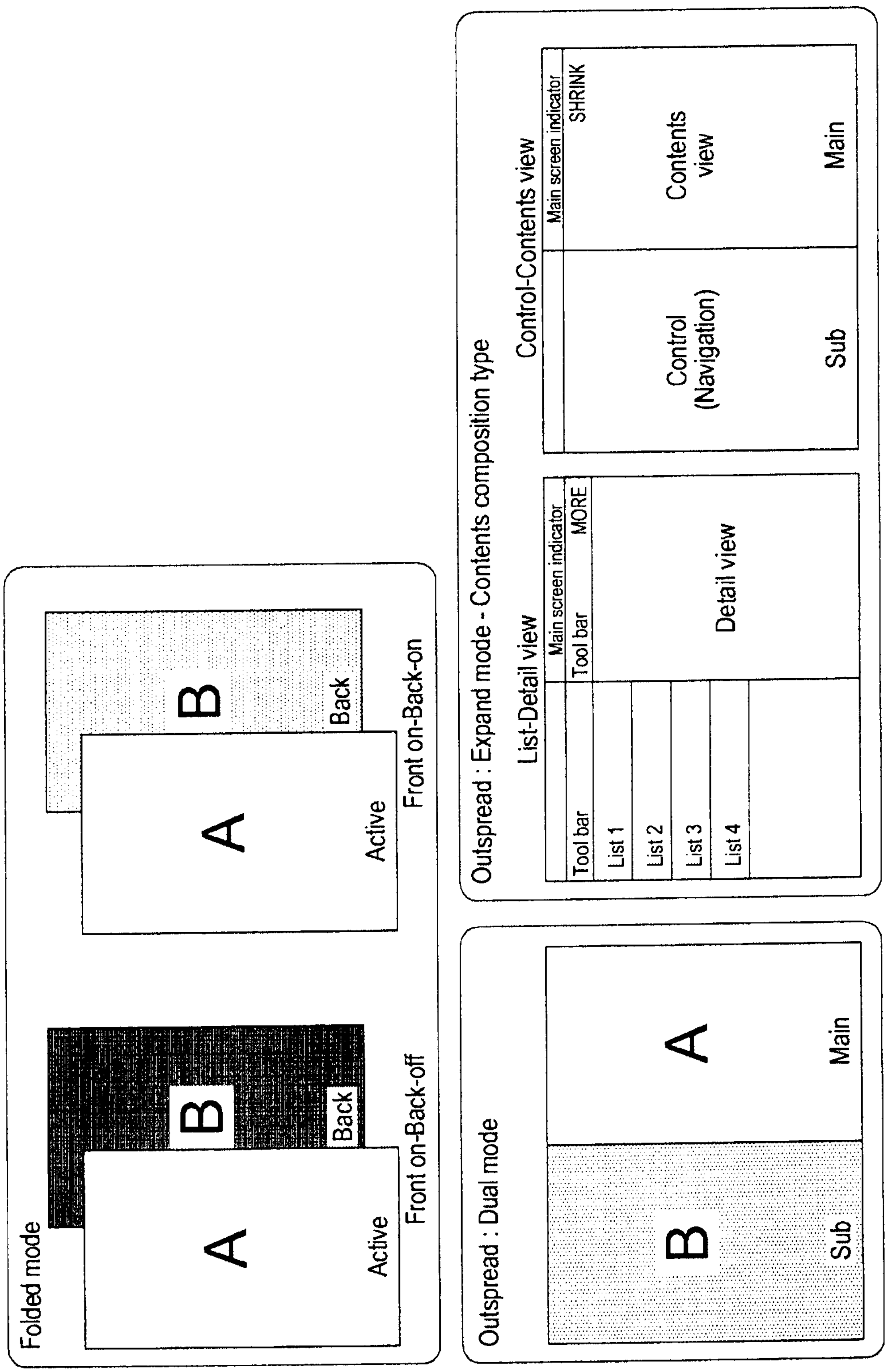
FIG. 11 is a concept view illustrating an electronic device in a folded mode and outspread mode according to an embodiment of the present disclosure.
Figure 12:
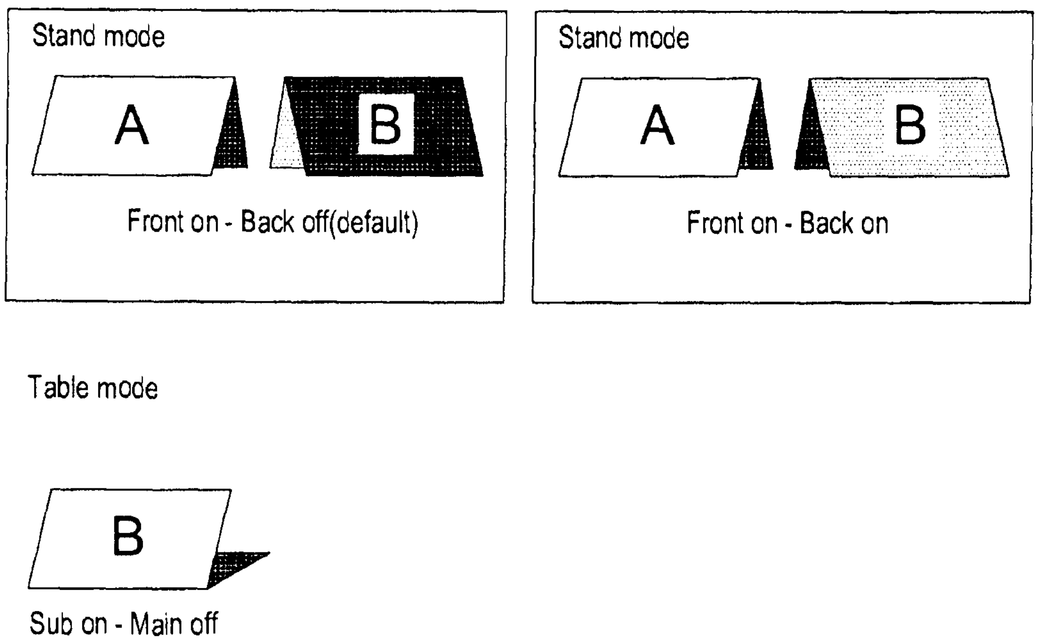
FIG. 12 is a concept view illustrating an electronic device in a stand mode and table mode according to an embodiment of the present disclosure.

According to an embodiment of the present disclosure, a screen of each display of an electronic device having multiple displays may be displayed in various fashions. FIGS. 11 and 12 illustrate various default display types that may be displayed on the multiple displays. Detailed types and scenarios are shown and described at the end of this disclosure.

2.3.4. Description of Portrait Mode and Landscape Mode

Figure 13:
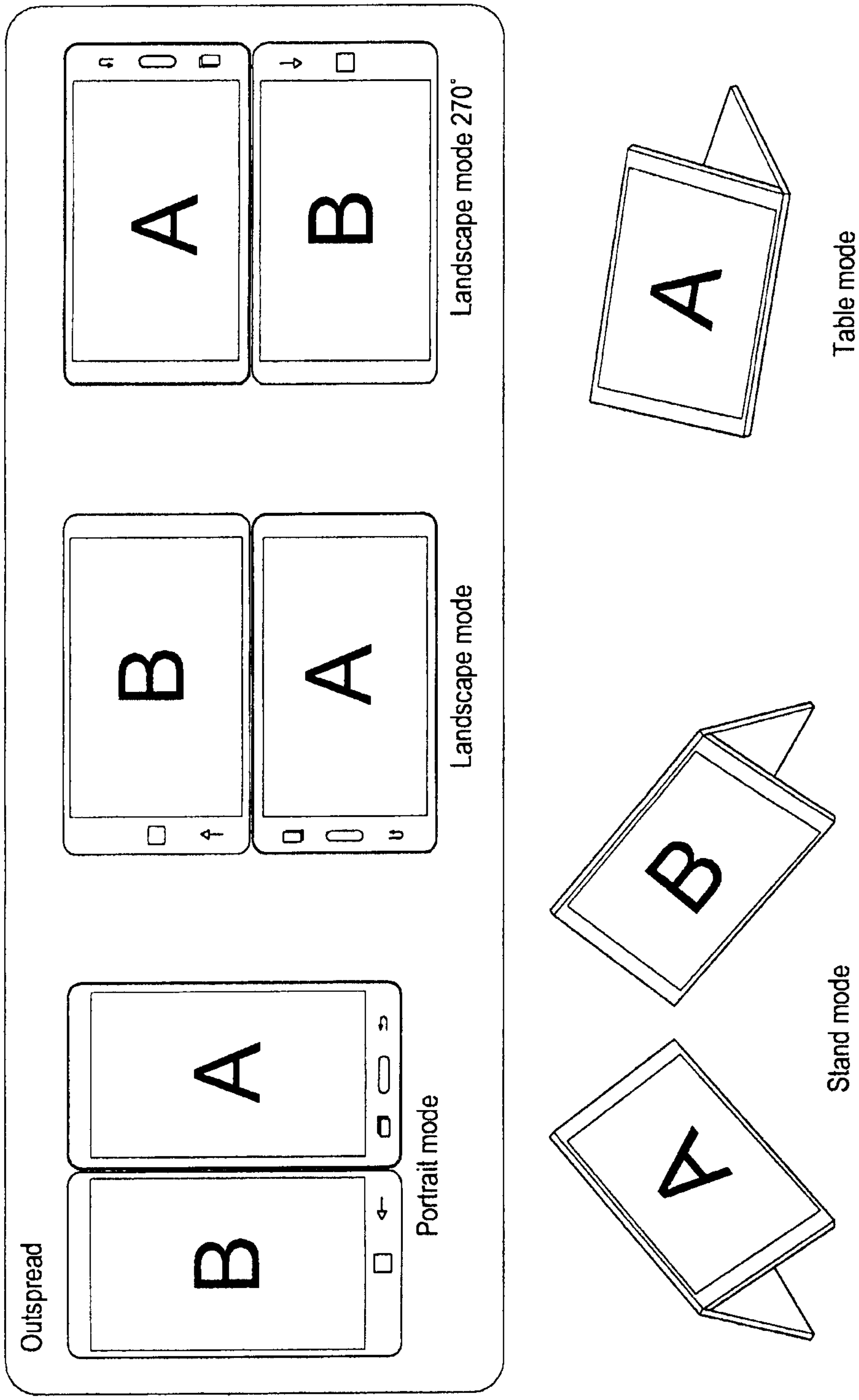
FIG. 13 is a concept view illustrating an electronic device in a landscape mode and portrait mode according to an embodiment of the present disclosure.

According to an embodiment of the present disclosure, an electronic device having multiple displays may display screens in various forms in each of the landscape mode and portrait mode. FIG. 13 illustrates an example screen display form in each of the landscape mode and the portrait mode, according to an embodiment of the present disclosure.

In an embodiment, the two screens in the folded/outspread mode may follow the same rotation setting. According to an embodiment of the present disclosure, when operated in the dual mode of the outspread modes, each application running screen may follow its independent rotation setting, so that the two application running screens may rotate independently.

For example, in the stand/table mode, the landscape mode alone may be provided, but the portrait mode is not. In the stand mode, the bodies including the displays are supported by the underneath surface in the horizontal direction, and thus, the electronic device supports the landscape mode to rotate the screen, allowing the screen rotated toward the user to be viewed in both the directions.

2.3.5. Description of Booting Animation

Figure 14:
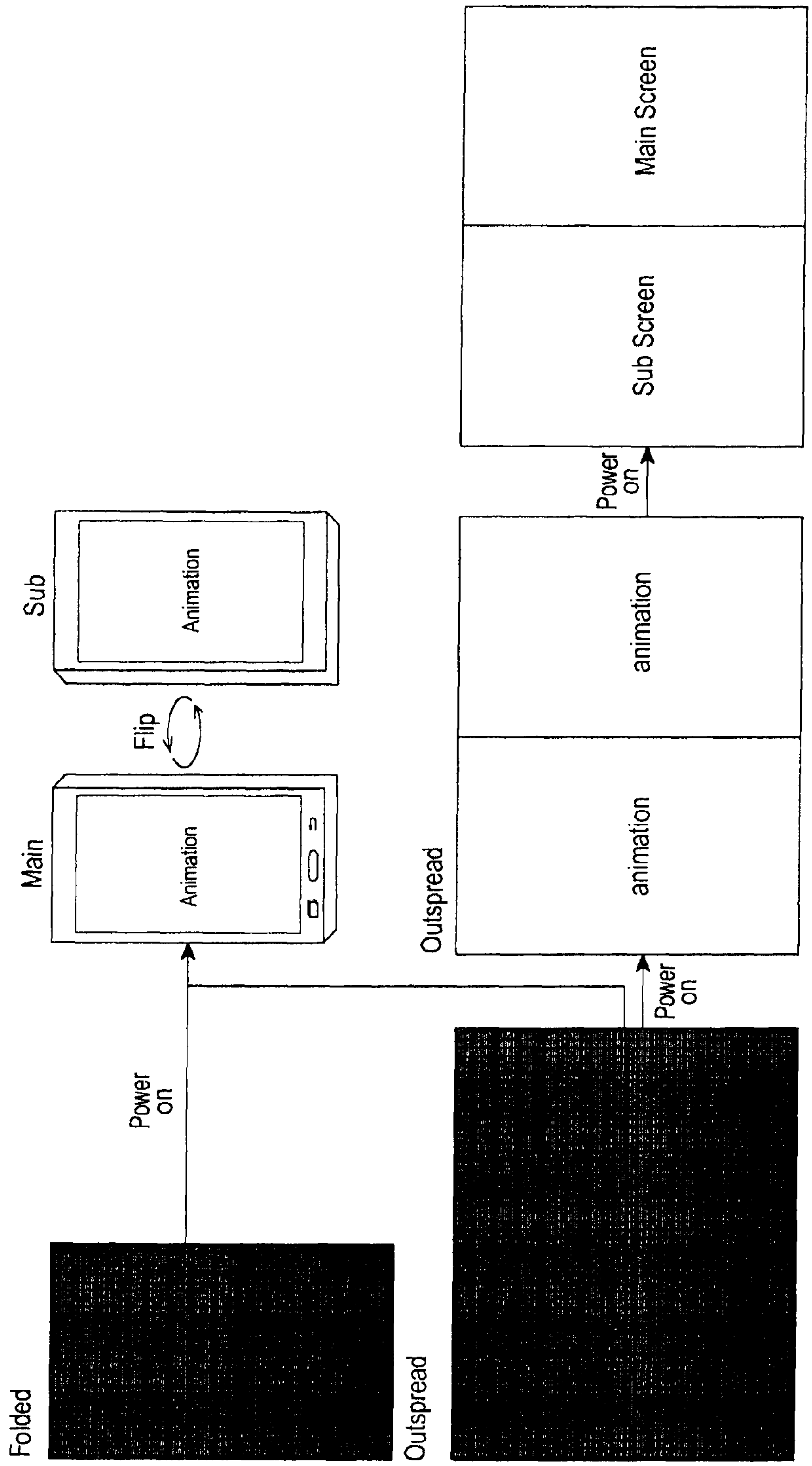
FIG. 14 is a concept view illustrating a booting animation according to an embodiment of the present disclosure.

According to an embodiment of the present disclosure, various forms of booting animations for the electronic device may be provided depending on the above-described form types. Here, the booting animation may mean an application displayed while the electronic device is powered on to boot up. FIG. 14 illustrates an example booting animation of an electronic device having multiple displays.

According to an embodiment of the present disclosure, the booting animation displayed upon first power on may be implemented to use both the displays regardless of form types of the electronic device. According to an embodiment of the present disclosure, the electronic device may determine the display being currently used by the user by a method of using a camera, such as facial recognition or iris recognition, a method of using various built-in sensors, e.g., a gyro sensor or gravity sensor, or in a combination thereof, and may display the booting animation only on the display determined to be in use by the user.

2.3.6. Description of Display On/Off

According to an embodiment of the present disclosure, the display on/off of the electronic device may be provided in a different manner that do legacy single-display electronic devices. For example, when a booting image or booting animation is provided to an individual display depending on the form type of the electronic device, the other display may be controlled in an on or off state. For example, in the folded mode, the main display alone may be controlled in the on state, and in the table mode, the display contacting the underneath surface may be controlled in the off state.

2.3.6.1. Description of Post-Booting Operations

Figure 15:
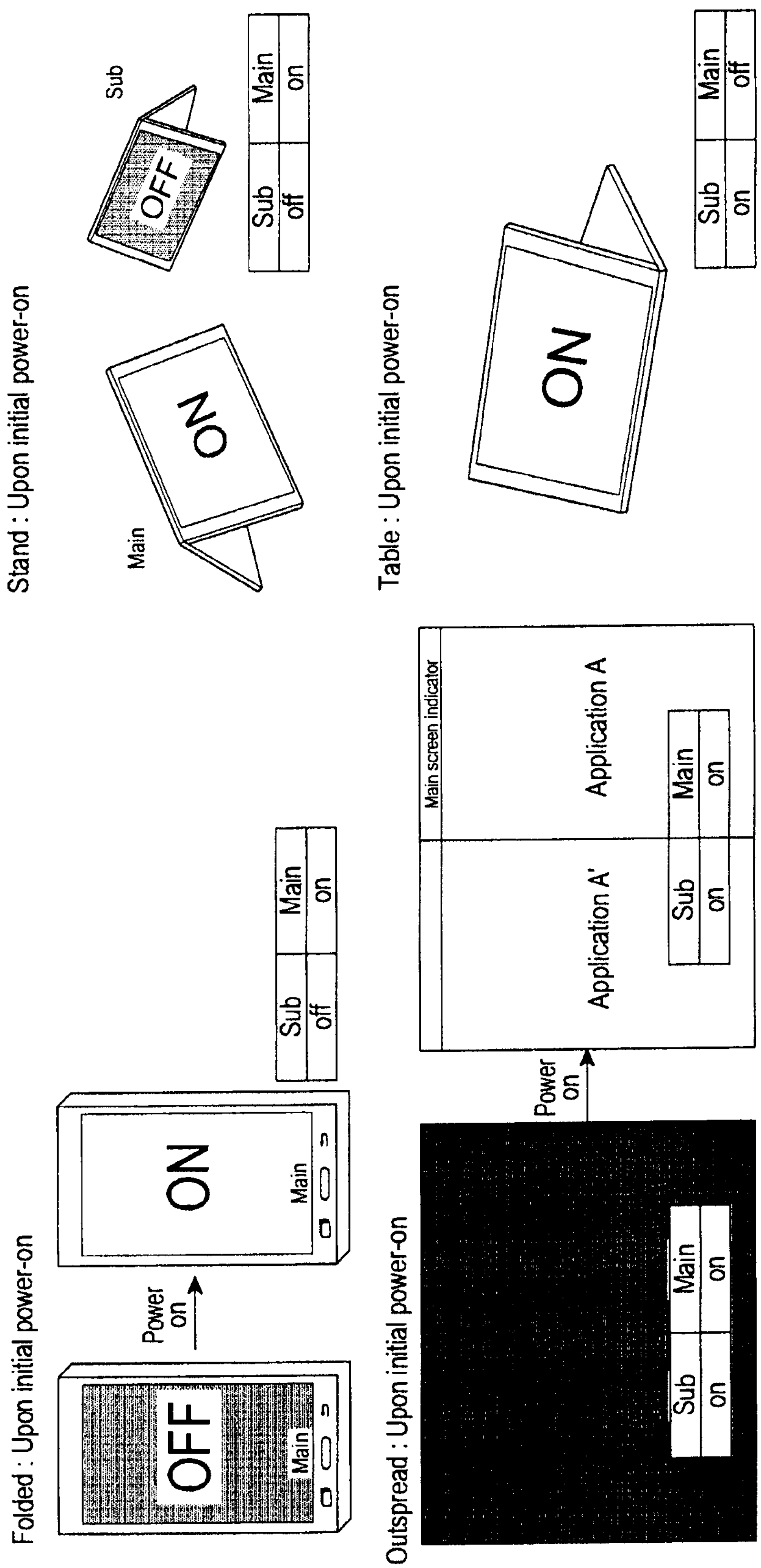
FIG. 15 is a concept view illustrating an electronic device after booting according to an embodiment of the present disclosure.

According to an embodiment of the present disclosure, the display on/off of the electronic device is briefly described after booting. FIG. 15 illustrates the display on/off after booting the electronic device having a plurality of displays. According to an embodiment of the present disclosure, when booting images are displayed on the two displays, and the display of the booting images is terminated, the display on/off may be controlled according to each mode. For example, in the folded mode, the display facing the user may be recognized, and the display alone may be controlled in the on state while the other may be controlled in the off state.

2.3.6.2. Description of Folded Mode

Figure 16:
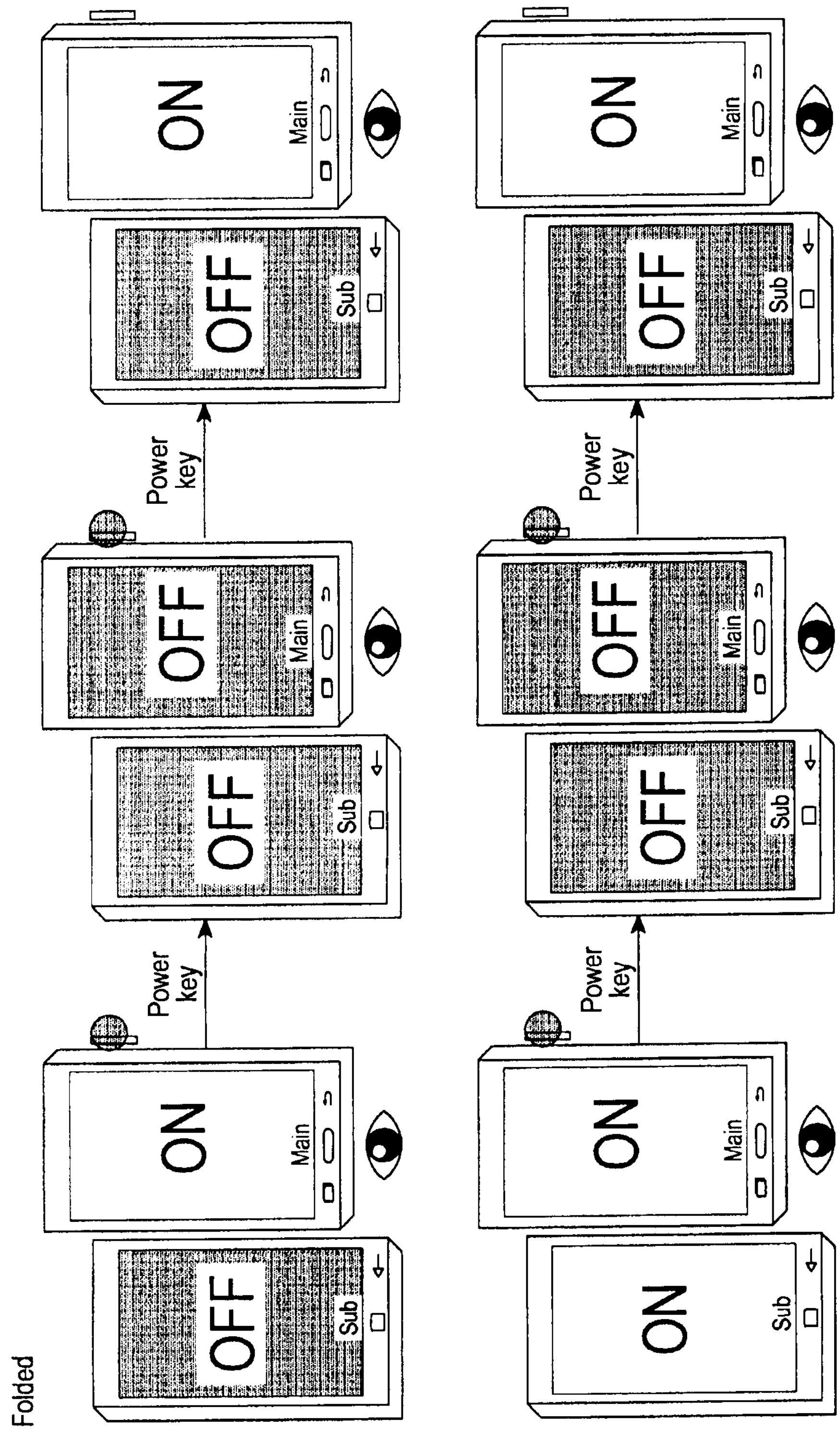
FIG. 16 is a concept view illustrating an electronic device in a folded mode according to an embodiment of the present disclosure.

FIG. 16 illustrates a configuration related to a display on/off in the folded mode of an electronic device having multiple displays according to an embodiment of the present disclosure. Although the two displays are shown in FIG. 16 as if they are spread out like in the outspread mode, this is merely for ease of description, and the two displays are assumed to be in a position folded outwards as in the folded mode. In the folded mode, the user may basically view only one screen—here, the screen viewed by the user may be termed an active screen. The electronic device may control the display displaying the active screen in the on state, but not the other screen. However, according to an embodiment of the present disclosure, since various information (e.g., advertisements or book covers) may be provided through the display not in use while the user is using the one screen, the electronic device may control not only the active screen but also the display displaying the other screen (e.g., the sub screen) in the on state.

2.3.6.3. Description of Outspread Mode

Figure 17:
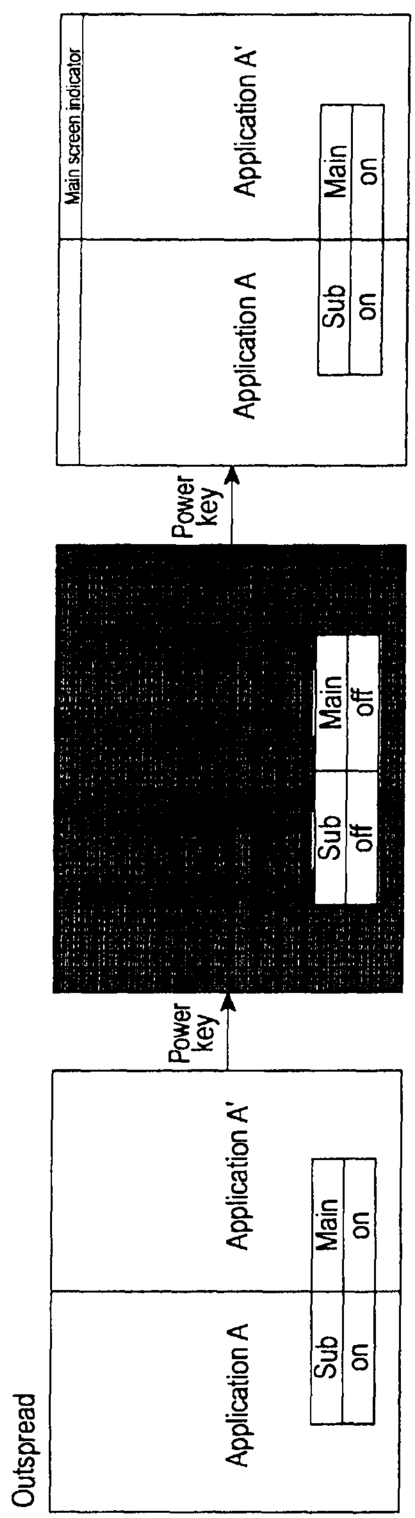
FIG. 17 is a concept view illustrating an electronic device in an outspread mode according to an embodiment of the present disclosure.

FIG. 17 illustrates the display on/off control in the outspread mode according to an embodiment of the present disclosure. The on/off state control per display may differ in the outspread mode and folded mode. This is why, in the outspread mode, the main display and the sub display both may, as default, display the active screen. In other words, the user may view both the main display and sub display. Accordingly, upon power-off, the electronic device may control both the displays in the off state, and upon powering back on, the electronic device may control the two displays in the on state.

2.3.6.4. Description of Stand Mode

Figure 18:
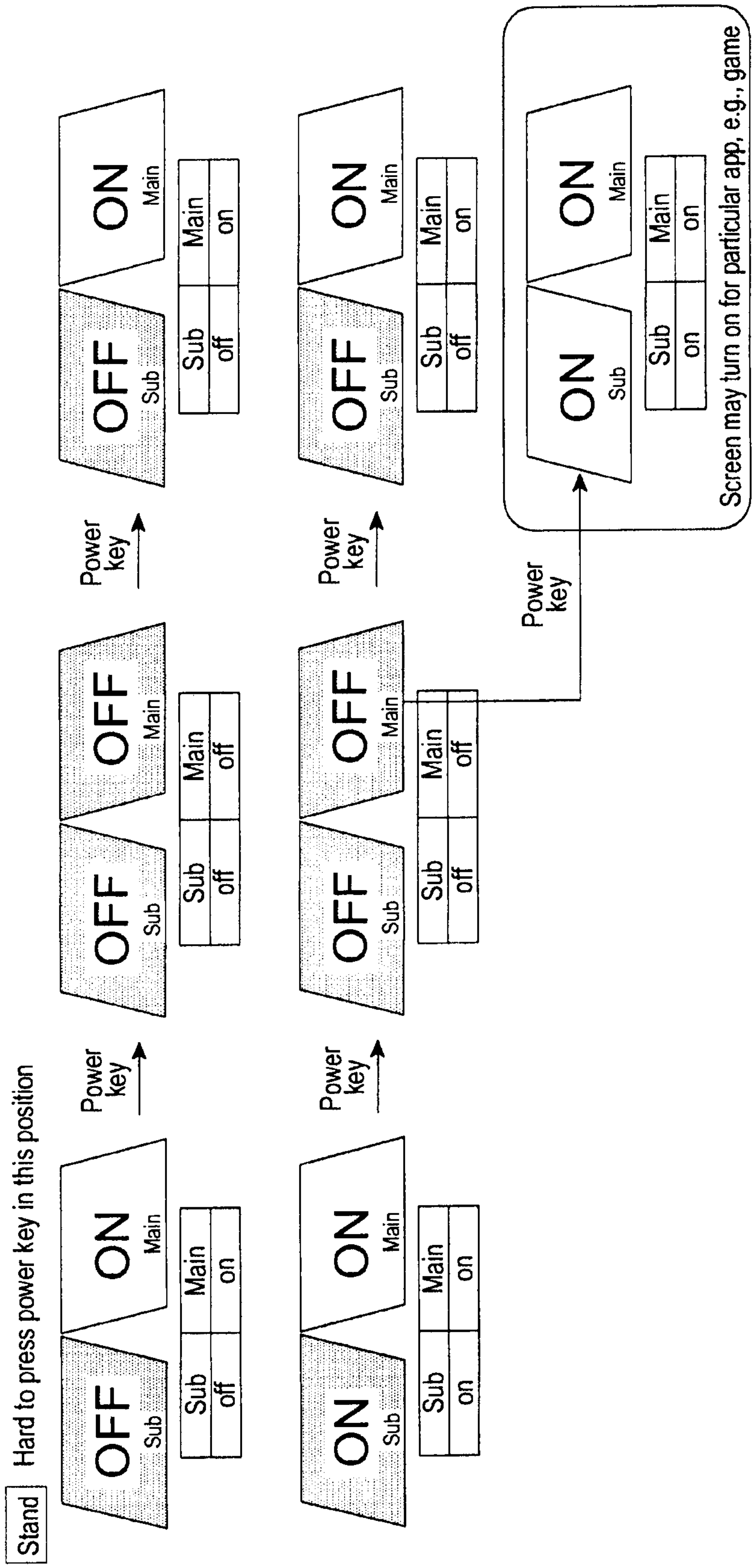
FIG. 18 is a concept view illustrating an electronic device in a stand mode according to an embodiment of the present disclosure.

FIG. 18 illustrates the display on/off in the stand mode according to an embodiment of the present disclosure. Where the electronic device having the multiple displays has a form type of, among others, the stand mode, various display on/off scenarios may come into being. In the stand mode, the display on/off control may basically be similar to the display on/off control in the folded mode. However, in some scenarios where multiple users share the electronic device or the electronic device uses some applications, since the stand mode may be similar in type to the outspread mode, various display on/off scenarios may be implemented. Some applications may include, but is not limited in type to, an application capable of displaying substantially the same content on both the displays, such as a video conference call.

For example, upon switching from power-off to power-on as shown in FIG. 18, one display alone may be controlled in the on state, or both the displays may be controlled in the on state.

2.3.6.5. Description of Table Mode

Figure 19:
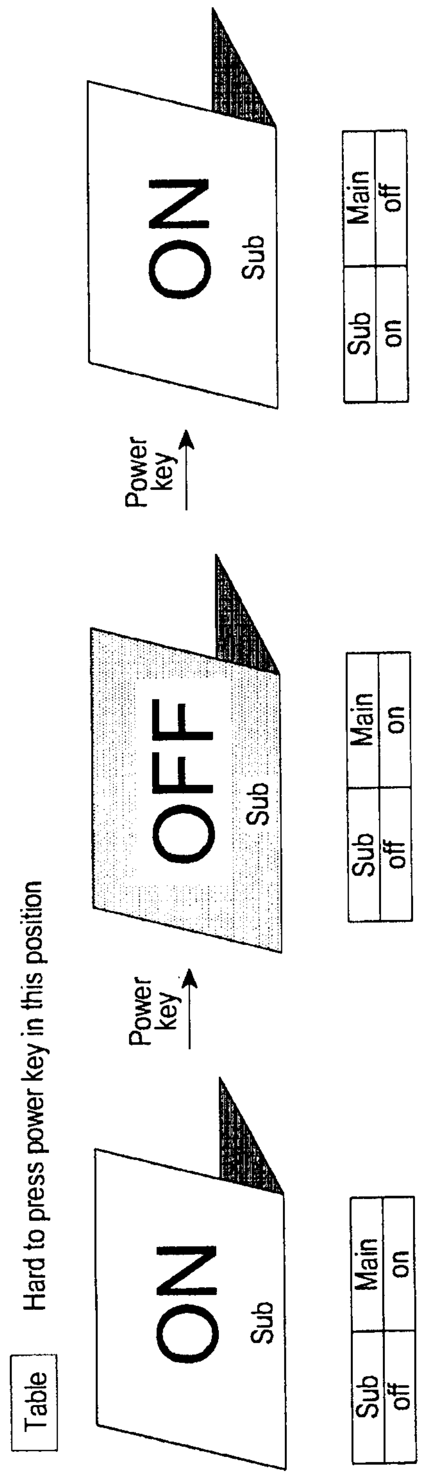
FIG. 19 is a concept view illustrating an electronic device in a table mode according to an embodiment of the present disclosure.

FIG. 19 illustrates the display on/off in the table mode according to an embodiment of the present disclosure. The display on/off control in the table mode may be similar to the display on/off control in the folded mode. Given the examples shown in FIG. 9 or FIG. 19, the sub display is highly likely to display the active screen. Further, unlike in the folded mode, the electronic device may perform on/off control only on the sub display displaying the active screen because there is little or no likelihood that the display contacting the underneath surface, e.g., the main display, is exposed to the outside. In other words, the electronic device may keep the main display contacting the contact surface in the off state.

2.3.6.6. Description of Form Type Change

Figure 20A:
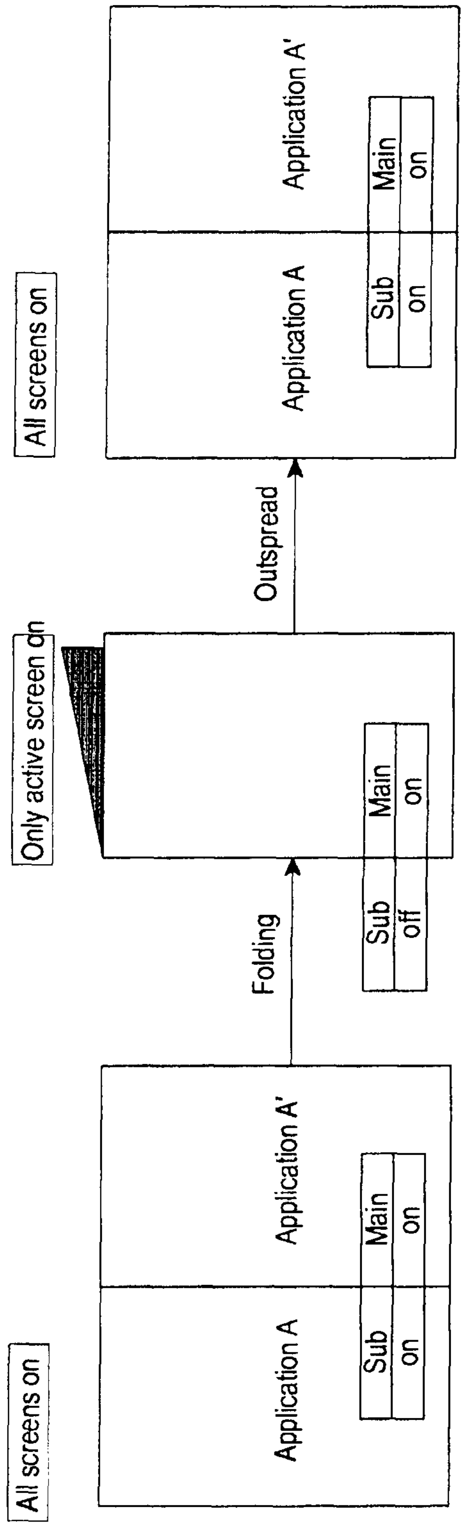

FIG. 20*a* illustrates various display on/off examples upon changing form types according to an embodiment of the present disclosure. The modes mentioned above may be subject to changes in form in the electronic device. For example, a switch may be made from the outspread mode to the folded mode or from the folded mode to the outspread mode, or to the stand mode or table mode.

Figure 20B:
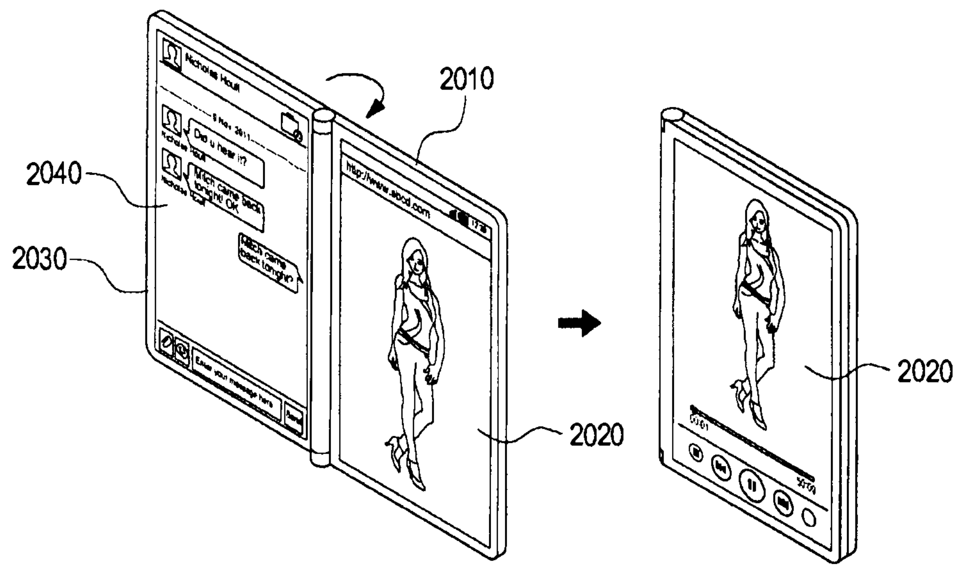
Figure 20C:
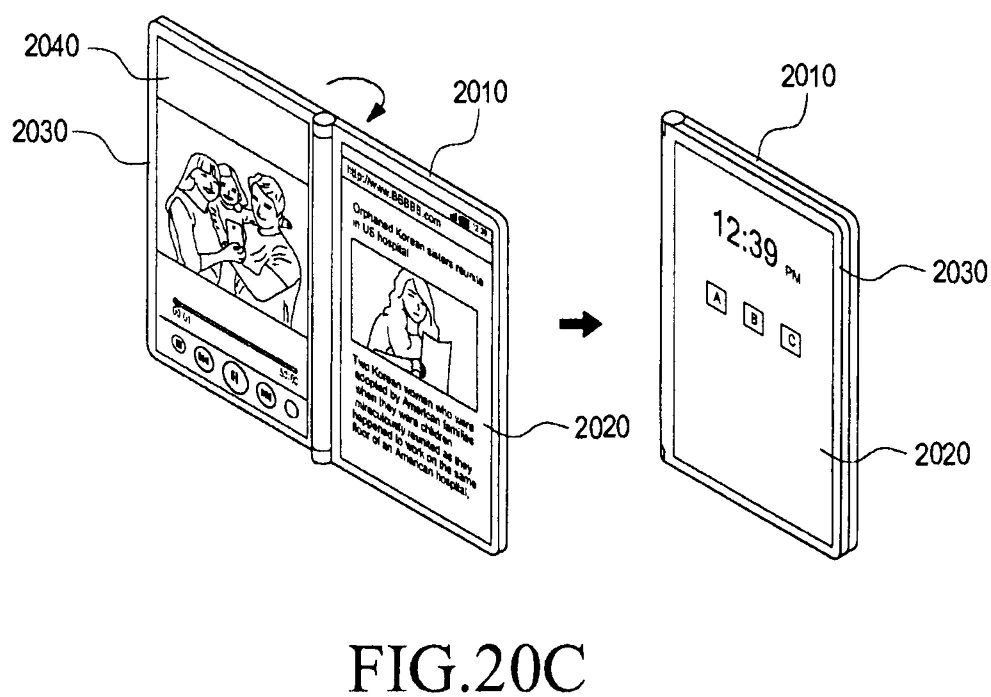

FIGS. 20*b* and 20*c* are views illustrating an electronic device according to an embodiment of the present disclosure.

According to an embodiment of the present disclosure, the electronic device 101 may include a first body 2010 and a second body 2030. The first body 2010 and the second body 2030 may be pivotally coupled together. Referring to FIG. 20*b*, the bodies 2010 and 203 may be hinged together so that a surface of the first body 2010 and a surface of the second body 2030 may abut each other. The first body 2010 and the second body 2030 may be connected together via a hinge member.

Alternatively, the first body 2010 and the second body 2020 may be configured in a single body with no separate connecting member, and the single body may be configured so that the first body 2010 and the second body 2020 may pivot on each other.

Referring to FIG. 20*b*, a first display 2020 may be disposed on an opposite surface of the first body 2010, and a second display 2040 may be disposed on an opposite surface of the second body 2030. Displays may be arranged on the two opposite surfaces, respectively, of the first body 2010, and displays may be arranged on the two opposite surfaces, respectively, of the second body 2030.

According to an embodiment of the present disclosure, the processor of the electronic device may display an execution screen of a first application through the first display 2020 disposed on the first body 2010, with the first body 2010 and the second body 2030 spread out. The state in which the first body 2010 and the second body 2030 are spread out may denote a state allowing the user to simultaneously view the first display 2020 disposed on the first body 2010 and the second display 2040 disposed on the second body 2030 without moving the electronic device 101.

For example, the outspread state of the first body 2010 and the second body 2030 may be a state in which the user may view both the first display 2020 and the second display 2040, e.g., as if the angle between the first body 2010 and the second body 2030 is 180 degrees or within a preset angle with respect to 180 degrees.

For example, the first application may be a web browser application, and a screen of a particular website accessed through the web application may be displayed on the first display 2020.

Further, the processor may display, the second display 2040 disposed on the second body 2030, an execution screen of a second application or an execution screen of the first application, with the first body 2010 and the second body 2030 spread out. Further, the processor may display the execution screen of the first application on all of the first display 2020 and the second display 2040 or may display the respective running screens of the first application and the second application through the first display 2020 and the second display 2040, respectively.

According to an embodiment of the present disclosure, when at least one of the first body 2010 and the second body 2030 pivots leaving a surface of the first body 2010 to abut a surface of the second body 2030, the first display 2020 disposed on the opposite surface of the first body 2010 and the second display 2040 disposed on the opposite surface of the second body 2030 may face in directions where the electronic device 101 directs outwards as shown in FIG. 20*b*.

When the surface of the first body 2010 abuts the surface of the second body 2030, the screen displayed through the first display 2020 may still remain as it is. Further, the screen displayed through the second display 2040 may also remain as it is, and the second display 2040 may power off to save power.

Referring to FIG. 20*b*, the form type of the electronic device may switch into the folded mode, in which case, the electronic device may maintain the screen displayed on the active display (e.g., the first display 2020).

According to an embodiment of the present disclosure, although not shown in FIG. 20*b*, when at least one of the first body 2010 and the second body 2030 pivots leaving the opposite surface of the first body 2010 to abut the opposite surface of the second body 2030, the first display 2020 disposed on the opposite surface of the first body 2010 and the second display 2040 disposed on the opposite surface of the second body 2030 may face each other. In this case, the first display 2020 and the second display 2040 may not be exposed to the outside.

Further, referring to FIG. 20*c*, when at least one of the first body 2010 and the second body 2030 pivots leaving the opposite surface of the first body 2010 to abut the opposite surface of the second body 2030, the screen displayed through the first display 2020 before the first body 2010 and the second body 2030 abut each other may be changed into a preset screen or an execution screen of a third application. Further, for power saving, the preset screen may be displayed through some, not whole, portion of the first display 2020. Thus, the electronic device 101 may display the preset screen at a lower power level than when it displays the screen through the whole first display 2020. For example, the preset screen may include a lock screen, home screen, or standby screen, or a screen set by the user.

According to an embodiment of the present disclosure, the direction of the electronic device 101 may be determined based on direction information obtained through a sensor included in the electronic device 101, and the preset screen or running screen of the third application may be displayed through the second display 2040 according to information about the determined direction of the electronic device 101. For example, the electronic device 101 may determine the display being viewed by the user according to the direction of the electronic device 101 and may display the preset screen or the execution screen of the third application through the display determined to be viewed by the user.

As such, the screen displayed through at least one of the first display 2020 and the second display 2040 may be maintained or changed or whether the display is operated or not may be determined depending on whether the first body 2010 and the second body 2030 abut each other. Further, although the first body 2010 and the second body 2030 do not abut each other, a screen change or determination as to whether to operate may be performed depending on the angle between the first body 2010 and the second body 2030.

According to an embodiment of the present disclosure, not only when the first body 2010 and the second body 2030 abut but also when the first body 2010 and the second body 2030 approach each other, e.g., when they are positioned close at a preset angle or less, the screen displayed through the first display 2020 and the second display 2040 may be changed or whether to operate may be determined.

However, this is merely an example for illustration purposes, and embodiments of the present disclosure are not limited thereto. For example, a screen displayed through the first display 2020 and the second display 2040 may be determined depending on the user's settings or applications to run, as well as the angle between the first body 2010 and the second body 2030. Further, whether to operate the first display 2020 and the second display 2040 may also be varied depending on the user's settings or applications to run.

Although not shown, a third display may be disposed on a surface of the first body 2010. In this case, when the first body 2010 and the second body 2030 abut together at their opposite surfaces, the third display may face in an opposite direction of the direction that the first display 410 faces—e.g., the third display may face to the outside of the electronic device 101.

The third display may be driven at a lower power level than the first display 2020 and the second display 2040. Thus, the third display may be configured to stay on to display predetermined information (e.g., current time, battery status, electronic field status, or various notification information (e.g., message alert or missed calls) before until receiving a predetermined input (e.g., a screen lock key input).

According to an embodiment of the present disclosure, the third display may be controlled by the processor (e.g., the processor 120) controlling the overall function of the electronic device 101. Further, the electronic device 101 may include a separate low-power processor for driving the third display at a lower power level. When the electronic device 101 includes a low-power processor, the function of displaying predetermined information through the third display may be performed by the low-power processor.

According to an embodiment of the present disclosure, the electronic device 101 may determine a display to display the predetermined information among the plurality of displays depending on whether the respective first surfaces of the first body 2010 and the second body 2030 abut each other or the respective second, opposite surfaces of the first body 2010 and the second body 2030 abut each other. As set forth above, when the second surface of the first body 2010 abuts the second surface of the second body 2030, the predetermined information may be displayed through the third display. Where the first surface of the first body 2010 abuts the first surface of the second body 2030, the electronic device 101 may display the predetermined information on at least one of the first display 2020 and the second display 2040.

According to an embodiment of the present disclosure, the electronic device 101 may determine a display to display the predetermined information among the plurality of displays depending on the angle between the first body 2010 and the second body 2030. For example, where the angle between the first body 2010 and the second body 2030 is a preset angle or less under the assumption that the first surface of the first body 2010 abuts the first surface of the second body 2030 at 0 degrees, the electronic device 101 may display the predetermined information on at least one of the first display 2020 and the second display 2040.

According to an embodiment of the present disclosure, when the angle between the first body 2010 and the second body 2030 exceeds the preset angle, the electronic device 101 may display the predetermined information on the third display.

Figure 21A:
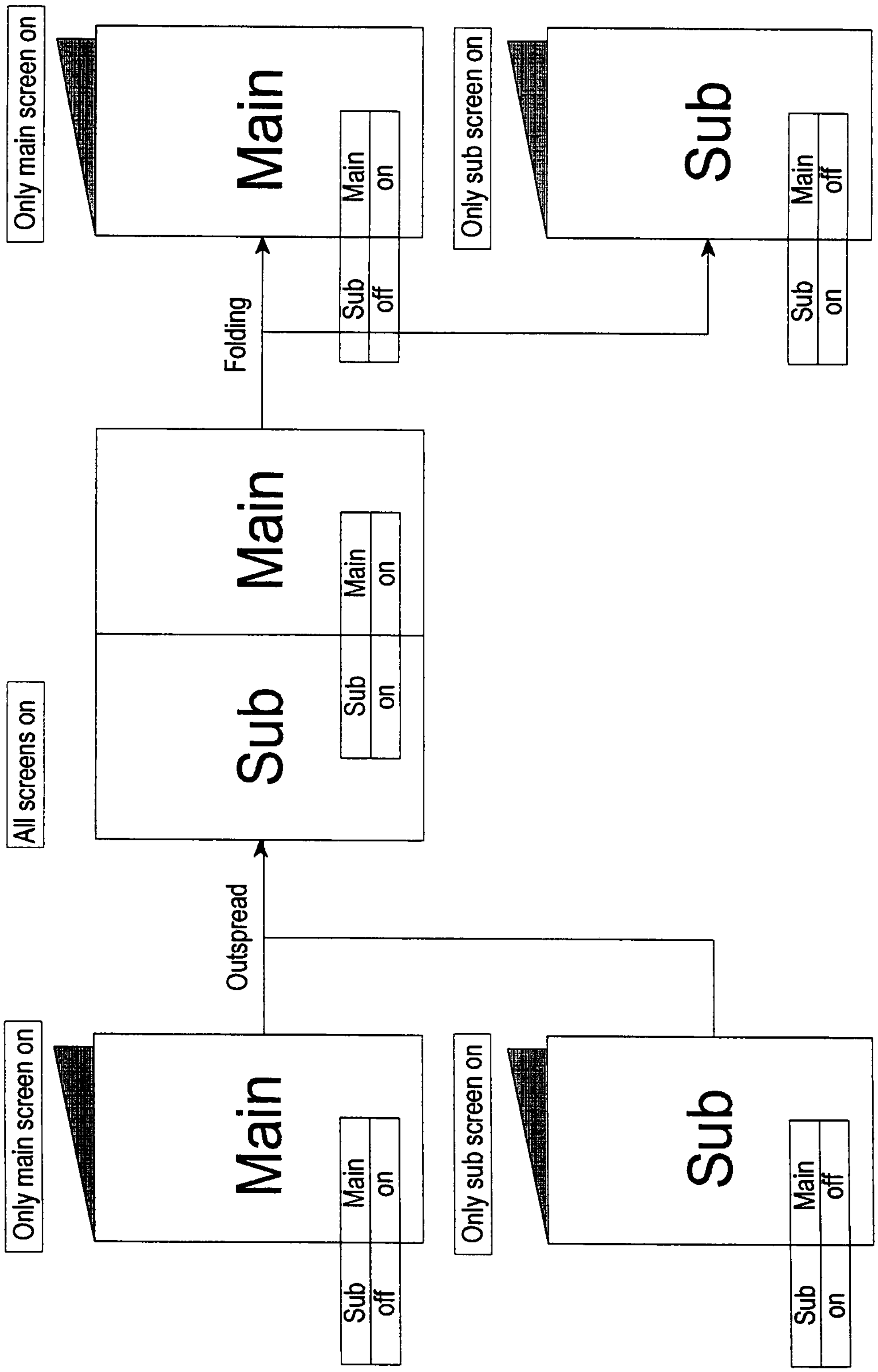

According to an embodiment of the present disclosure, when there is a form type (or mode) change as shown in FIG. 21*a*, the electronic device may control the screen of the unused display, i.e., the inactive display, in the off state, but prevents the application running from terminating. For example, upon changing from the outspread mode to the folded mode or stand mode, the display displaying the active screen may remain in the on state, but the opposite display may switch into the off state. According to an embodiment of the present disclosure, in the case where an application running screen is displayed in the expand mode, upon switching into the folded mode, the electronic device may display a shrunken application running screen on the active display and control the opposite display in the off state. According to an embodiment of the present disclosure, upon switching from the outspread mode, folded mode, or stand mode to the table mode, the electronic device may keep the sub display in the on state and switch the main display, i.e., the display contacting the contact surface, into the off state.

Figure 21B:
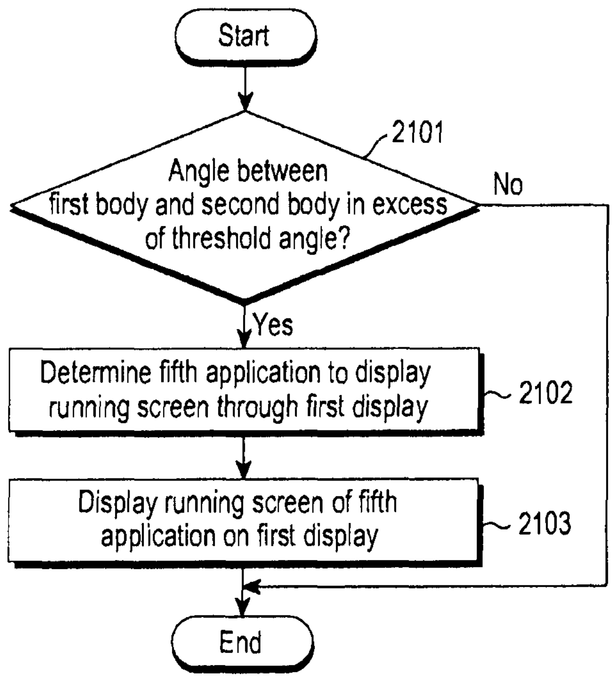

FIG. 21*b* is a flowchart illustrating a method for determining an application for displaying an execution screen through each of a plurality of displays with the first body and the second body spread out, according to an embodiment of the present disclosure.

In operation 2101, according to an embodiment of the present disclosure, the electronic device may determine whether the angle between the first body and the second body exceeds a preset threshold angle.

As set forth supra, the preset threshold angle may be set to be within a range where the user may view the screen of a first application displayed through the first display but not the screen displayed through the second display. In this case, the preset threshold angle may be set to be within a range from 0 degrees to 90 degrees. Accordingly, where the angle between the first body and the second body exceeds the preset threshold angle, the user may view both the screens respectively displayed through the first display and the second display.

In operation 2102, according to an embodiment of the present disclosure, when the angle between the first body and the second body exceeds the preset threshold angle, the electronic device may determine a fifth application for displaying an execution screen through the first display among the plurality of applications.

After the electronic device is flipped, the user may view the screen displayed through the second display, but not the screen displayed through the first display, and when the angle between the first body and the second body exceeds the preset threshold angle, the user may view both the first display and the second display. Thus, the user needs to determine the fifth application.

In operation 2103, according to an embodiment of the present disclosure, the electronic device may display a screen of the determined fifth application on the first display 511.

FIGS. 21*c* to 21*i* illustrate an electronic device displaying the respective running screens of a plurality of applications through a plurality of displays, respectively, with the first body and the second body spread out, according to an embodiment of the present disclosure.

Figure 21C:
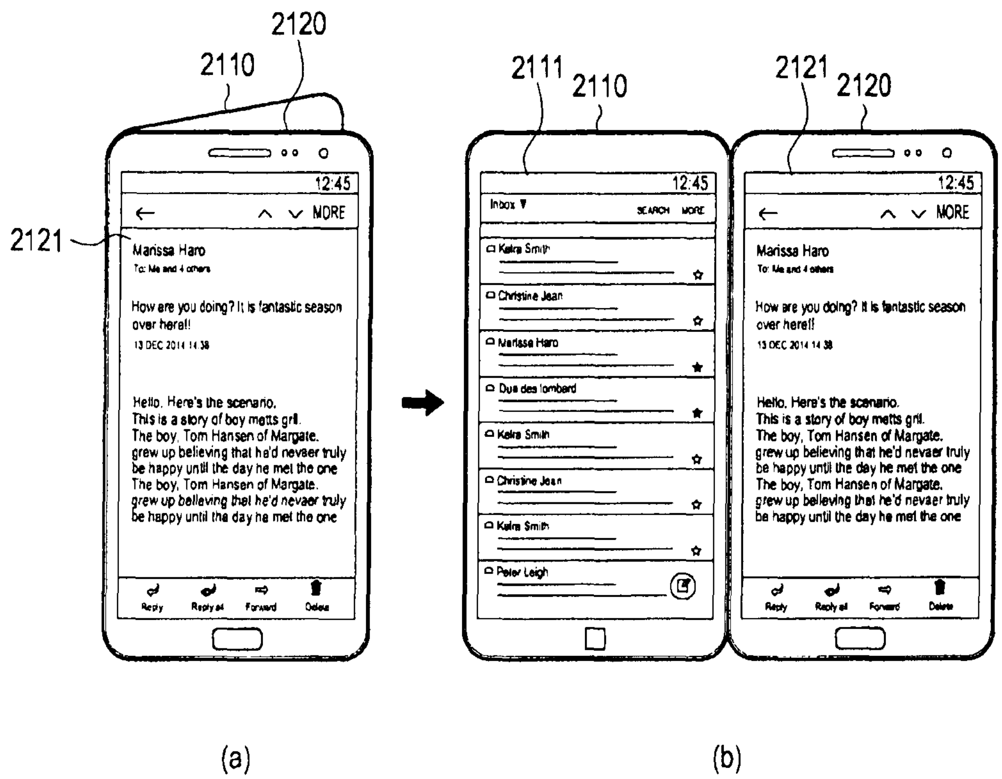

Referring to FIG. 21*c*(*a*), according to an embodiment of the present disclosure, the electronic device displays an email application screen through the second display 521 when the angle between the first body and the second body is a preset threshold angle or less.

Thereafter, when the angle between the first body and the second body is rendered by the user to exceed the preset threshold angle, the electronic device may display a second running screen of the email application displaying an email list through the first display 2111 as shown in FIG. 21*c*(*b*).

As such, as the angle between the first body and the second body is caused to exceed the preset threshold angle by the user, another running screen of the second application whose running screen is displayed through the second display 2121 may be displayed through the first display 2111.

Figure 21D:
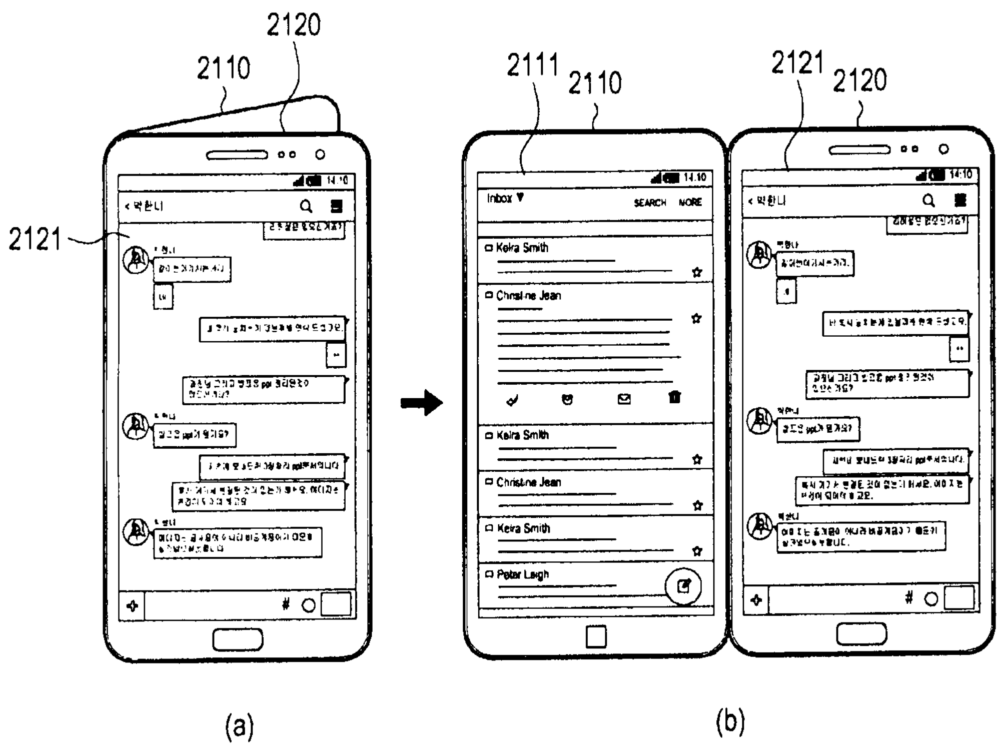

Referring to FIG. 21*d*(*a*), according to an embodiment of the present disclosure, the electronic device displays an instant messenger application screen through the second display 2121 when the angle between the first body and the second body is a preset threshold angle or less.

Thereafter, when the angle between the first body and the second body is rendered by the user to exceed the preset threshold angle, the electronic device may display, through the first display 2111, an email application set to be associated with the instant messenger application, as shown in FIG. 21*d*(*b*).

Thus, the user may enable the associated application to be displayed through the first display 511 through a mere operation of rotating at least one of the first body and the second body, even without performing selection or entry for running the associated application.

Figure 21E:
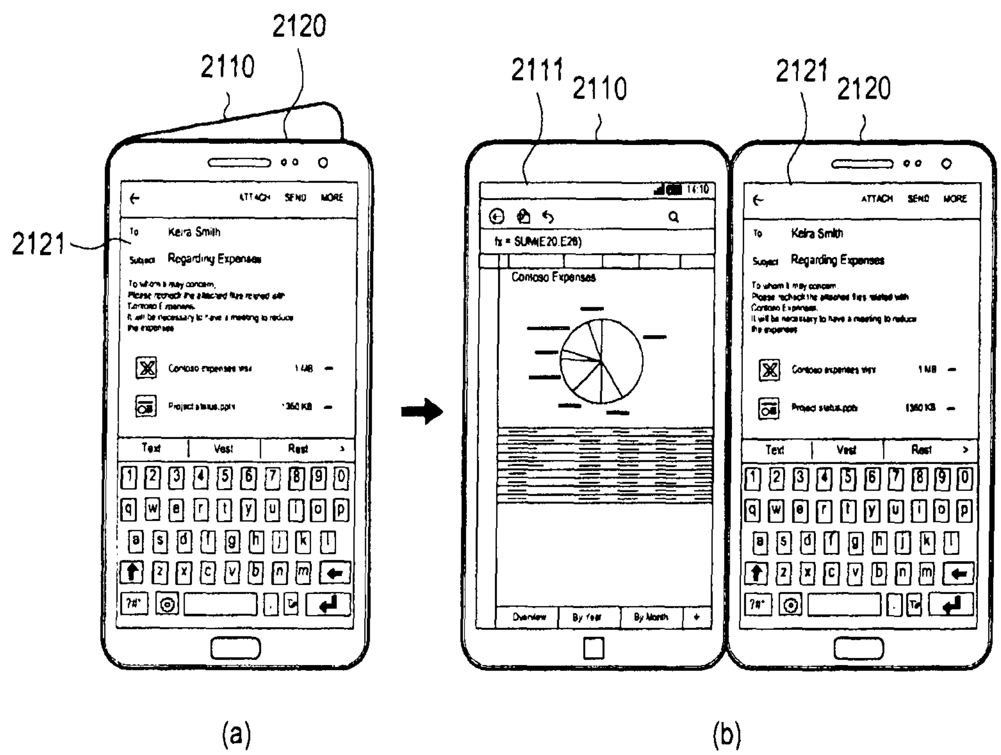

Referring to FIG. 21*e*(*a*), according to an embodiment of the present disclosure, the electronic device displays a screen of the email application through the second display 2121 at the angle between the first body and the second body which is the preset threshold angle or less.

Thereafter, when the angle between the first body and the second body is rendered by the user to exceed the preset threshold angle, the electronic device may display, on the first display 2111, an execution screen of an application associated with an attachment of an email, as shown in FIG. 21*e*(*b*). The electronic device may display the attachment on the first display 2111 through the application associated with the attachment.

Therefore, the user may enable the attachment to be displayed through the first display 511 by simply rotating at least one of the first body and the second body even without selection or entry for identifying the attachment.

Referring to FIG. 21*f*(*a*), according to an embodiment of the present disclosure, the electronic device displays a screen of a game application through the second display 2121 at the angle between the first body and the second body which is the preset threshold angle or less.

Thereafter, when the angle between the first body and the second body is rendered by the user to exceed the preset threshold angle, the electronic device may display, through the first display 2111, an execution screen of a video player application for running a video associated with the game application, as shown in FIG. 21*f*(*b*).

Hence, the user may play the game while simultaneously viewing the video associated with the game.

Figure 21G:
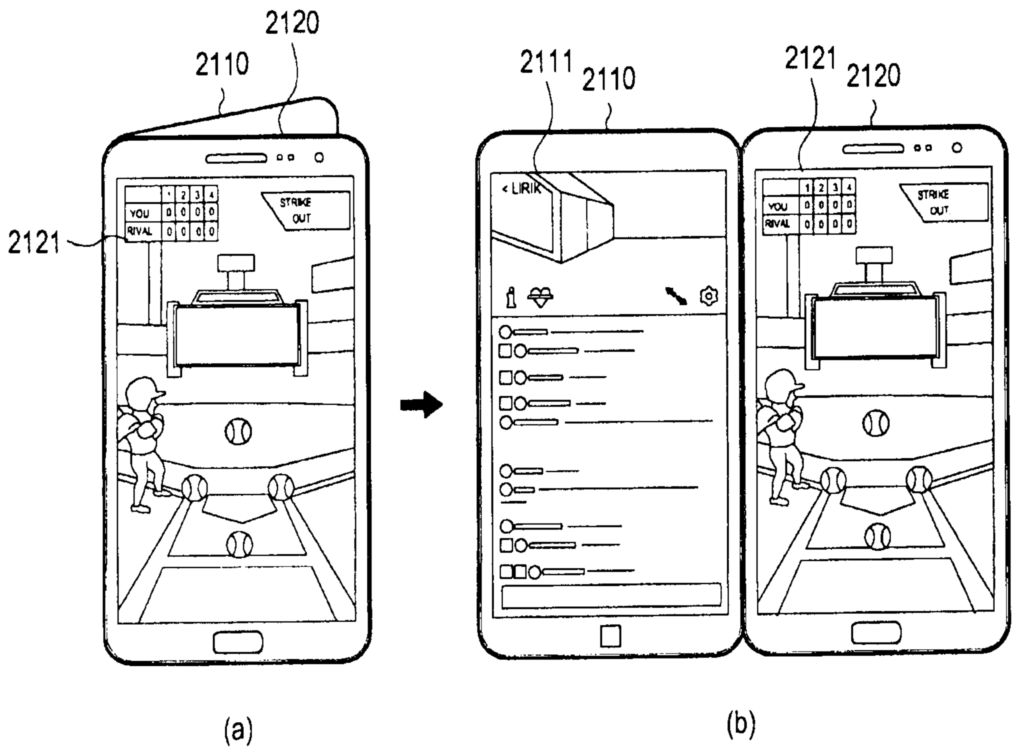

Referring to FIG. 21*g*(*a*), according to an embodiment of the present disclosure, the electronic device displays a screen of a game application through the second display 2121 at the angle between the first body and the second body which is the preset threshold angle or less.

Thereafter, when the angle between the first body and the second body is rendered by the user to exceed the preset threshold angle, the electronic device may display, through the first display 2111, an execution screen of a broadcast application for displaying a broadcast associated with the game application, as shown in FIG. 21*g*(*b*).

Hence, the user may play the game while simultaneously viewing the broadcast associated with the game.

Figure 21H:
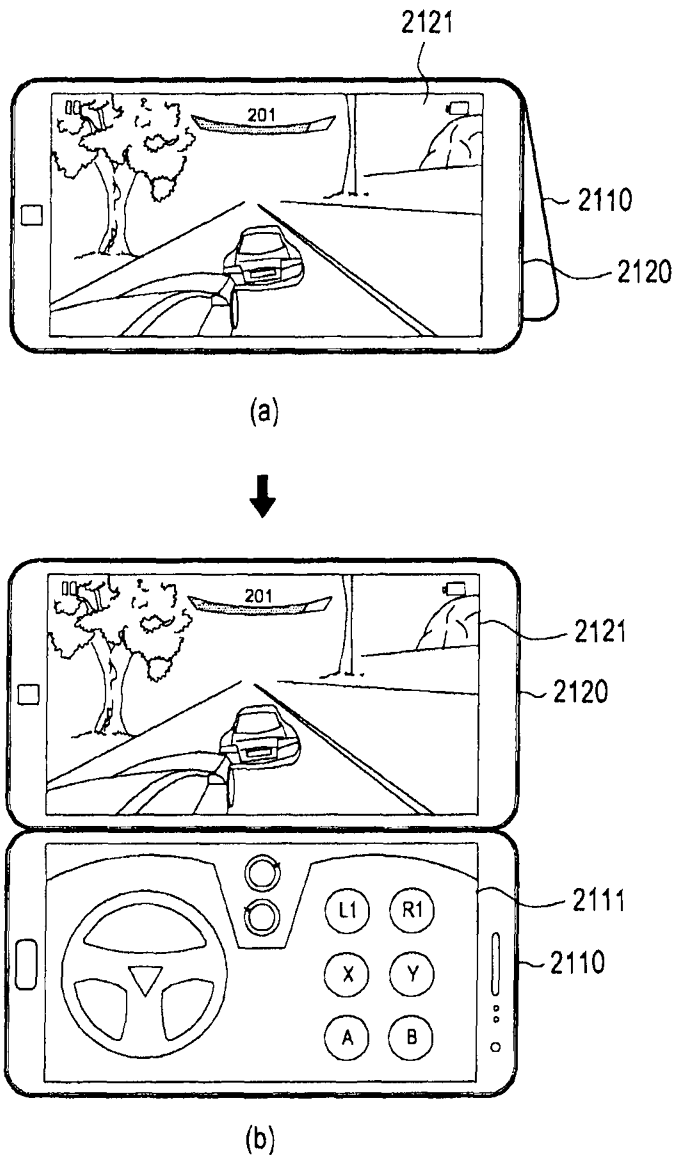

Referring to FIG. 21*h*(*a*), according to an embodiment of the present disclosure, the electronic device displays a screen of a game application through the second display 2121 at the angle between the first body and the second body which is the preset threshold angle or less.

Thereafter, when the angle between the first body and the second body is rendered by the user to exceed the preset threshold angle, the electronic device may display, through the first display 2111, an execution screen of a game controller application for providing an input to the game application, as shown in FIG. 21*h*(*b*). The game controller application may be configured as a separate application from the game application. Further, the electronic device may display, through the first display 2111, an input interface provided to allow the user to perform a game input in the game application in a more convenient way.

Figure 21I:
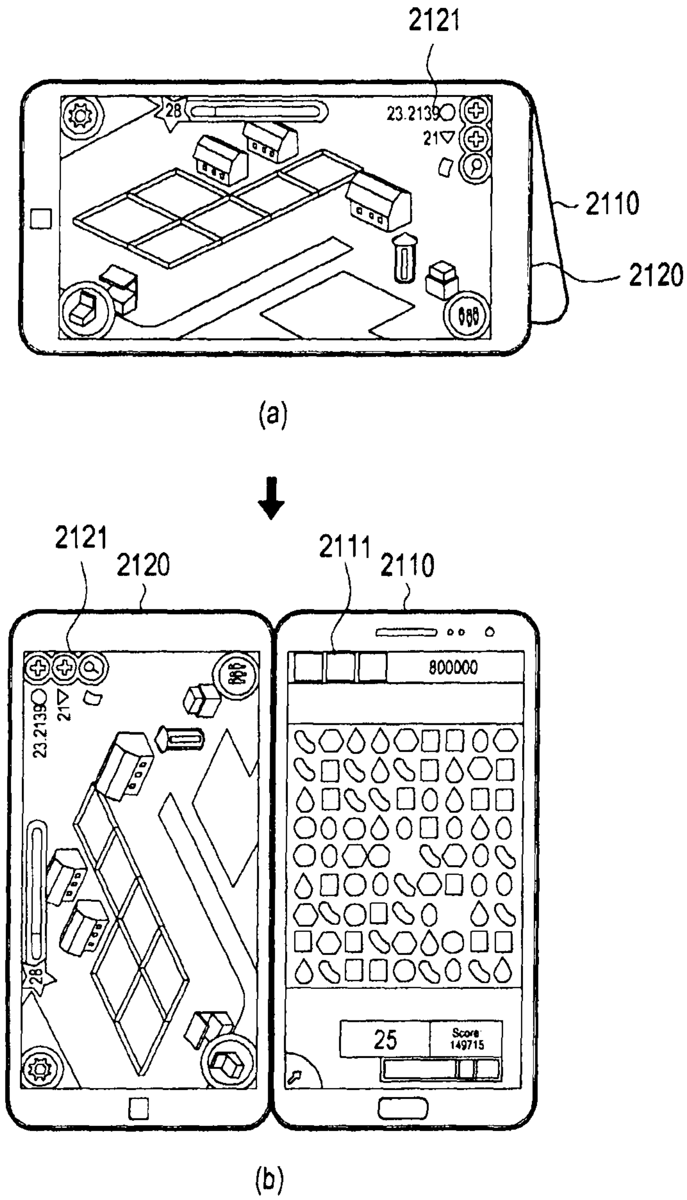

Referring to FIG. 21*i*(*a*), according to an embodiment of the present disclosure, the electronic device displays a screen of a first game application through the second display 2121 at the angle between the first body and the second body which is the preset threshold angle or less.

Thereafter, when the angle between the first body and the second body is rendered by the user to exceed the preset threshold angle, the electronic device may display, through the first display 2111, a screen of a second game application, as shown in FIG. 21*i*(*b*).

The second game application may be a game application associated with the first game application or may be a different type of game application run by the user simultaneously with the first game application.

2.3.7. Description of Display State Change

Figure 22:
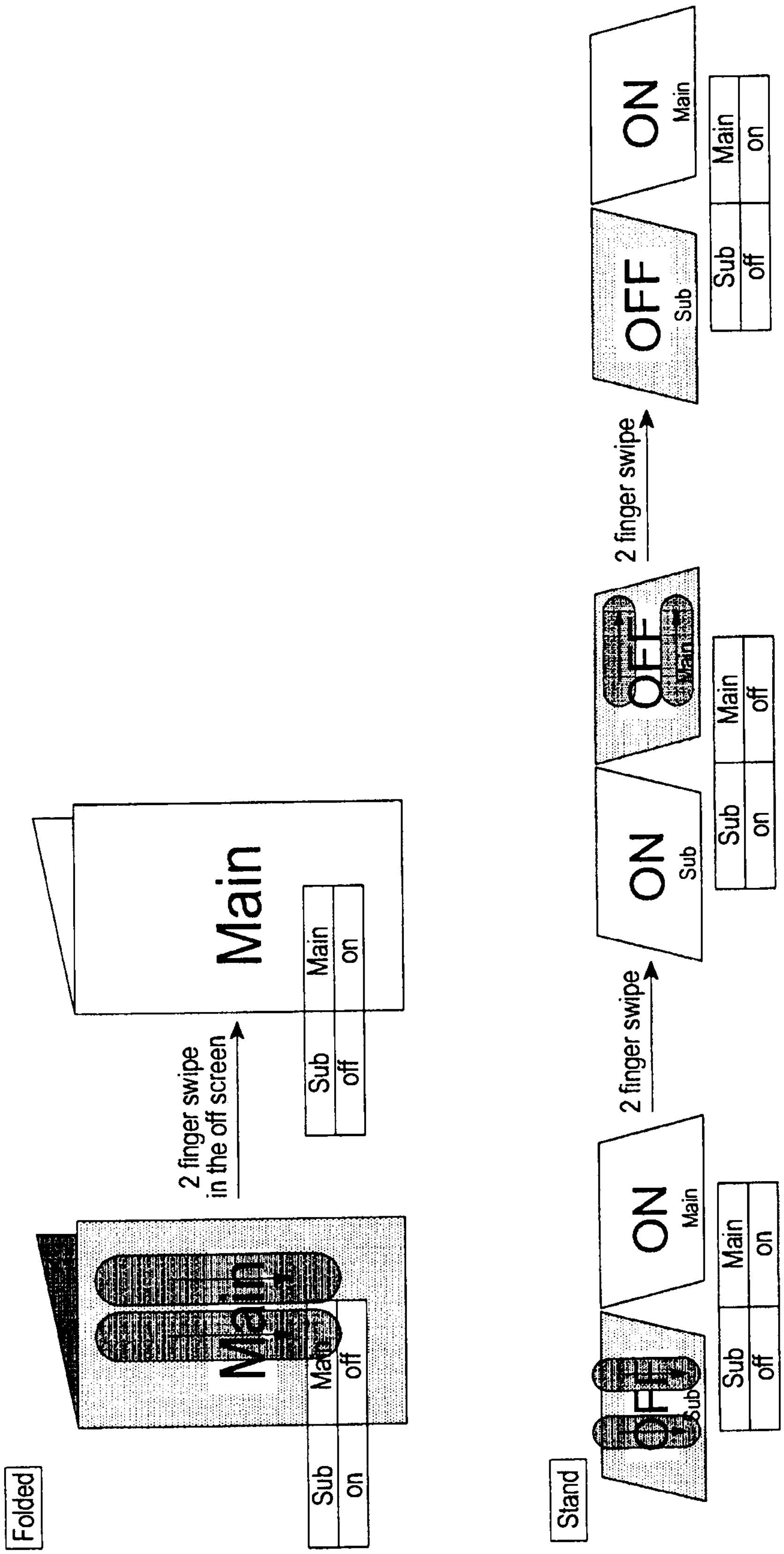
FIG. 22 is a view illustrating an example of varying screen states according to an embodiment of the present disclosure.

The above-described display on/off control may be varied depending on changes in the state of the display by user inputs. According to an embodiment of the present disclosure, when a display that remains on or off receives a swipe gesture left/right or up/down using two fingers, the electronic device may switch the state of the display from on to off or from off to on, control the display staying off in the on state, or may perform other various operations. FIG. 22 illustrates an example of a display on/off switch depending on a change in the state of the display by a user input, according to an embodiment of the present disclosure. As shown in FIG. 22, in the folded mode or stand mode, the electronic device may control the active display in the on state and the inactive display in the off state. Meanwhile, upon detecting a swipe gesture on the inactive display, the electronic device may switch the inactive display from the off state into the on state and the active display from the on state to the off state.

1.1.2. Description of Notification of State of Opposite Display

Figure 23:
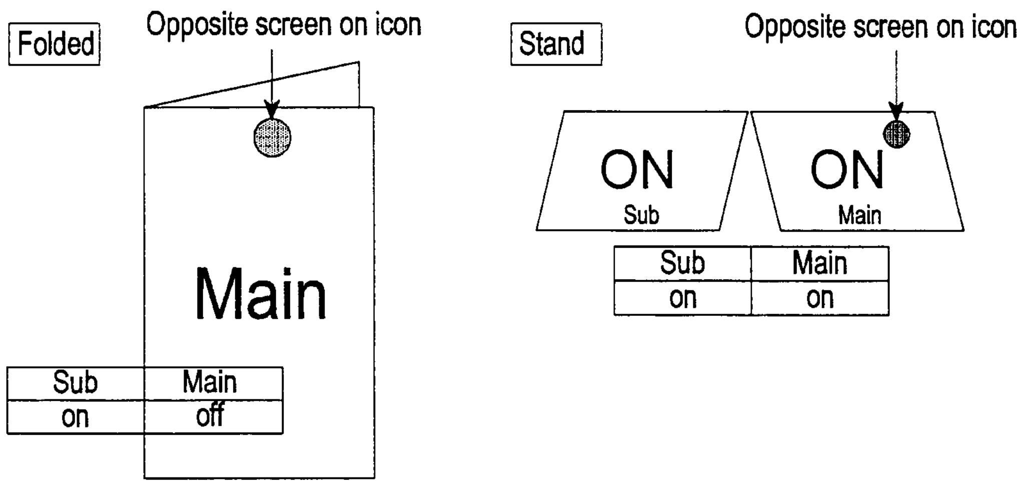
FIG. 23 is a view illustrating an example of displaying a state of an opposite screen according to an embodiment of the present disclosure.

According to an embodiment of the present disclosure, in the folded mode or stand mode among the various modes of the electronic device having multiple displays, the user cannot help viewing one display alone, but the display not viewed may oftentimes remain in the on state. As shown in FIG. 23, the electronic device may display, on the active display, an icon to indicate that the opposite display is in the on state.

Figure 24:
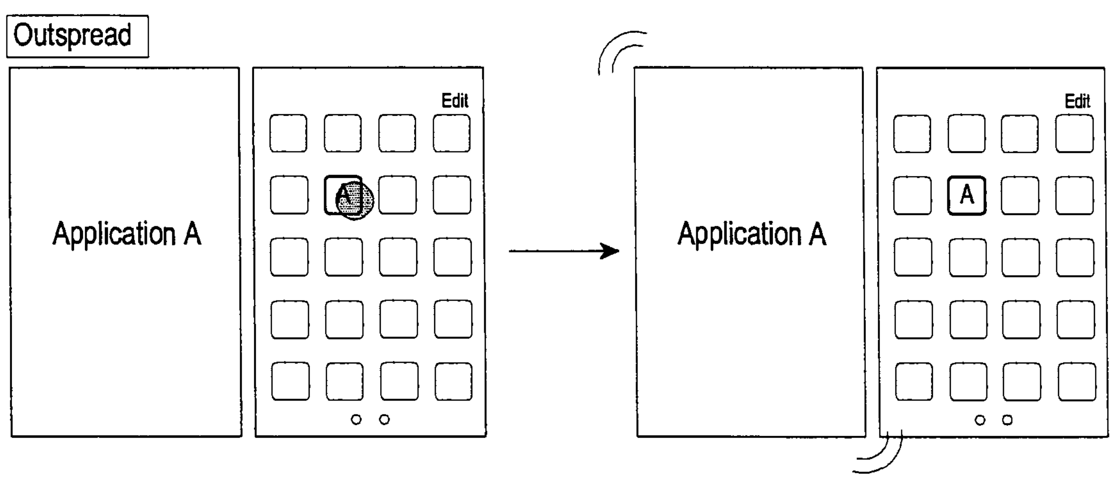
FIGS. 24 and 25 are concept views illustrating an electronic device for describing a method for running an application according to an embodiment of the present disclosure.

2.4 Description of Global Interaction 2.4.1. Description of Application Running on the Other Application Where an application is displayed on the foreground of the opposite display, the electronic device, according to an embodiment of the present disclosure, may keep displaying, without dimming, the icon of the application displayed on the foreground of the opposite display. The "dimming" here may mean the process of rendering the icon in gray or adjusting the chroma of the icon and displaying the chroma-adjusted icon. For example, upon selecting the icon of the application displayed on the foreground of the opposite display as shown in FIG. 24, the electronic device may generate such an effect as if the screen shakes, notifying the user that the corresponding application runs and is displayed on the opposite display. Alternatively, the electronic device may generate an instantaneous tension, e.g., such an effect as if the screen momentarily shrinks and then recovers its original size, indicating that the application runs and is displayed on the other display (e.g., the sub display).

According to an embodiment of the present disclosure, when a particular application runs in the outspread mode and is displayed on the background of the opposite display or an application assigned to be displayed on the off-state display in the folded mode runs, the electronic device may display the icon of the application, without the icon dimmed.

Figure 25:
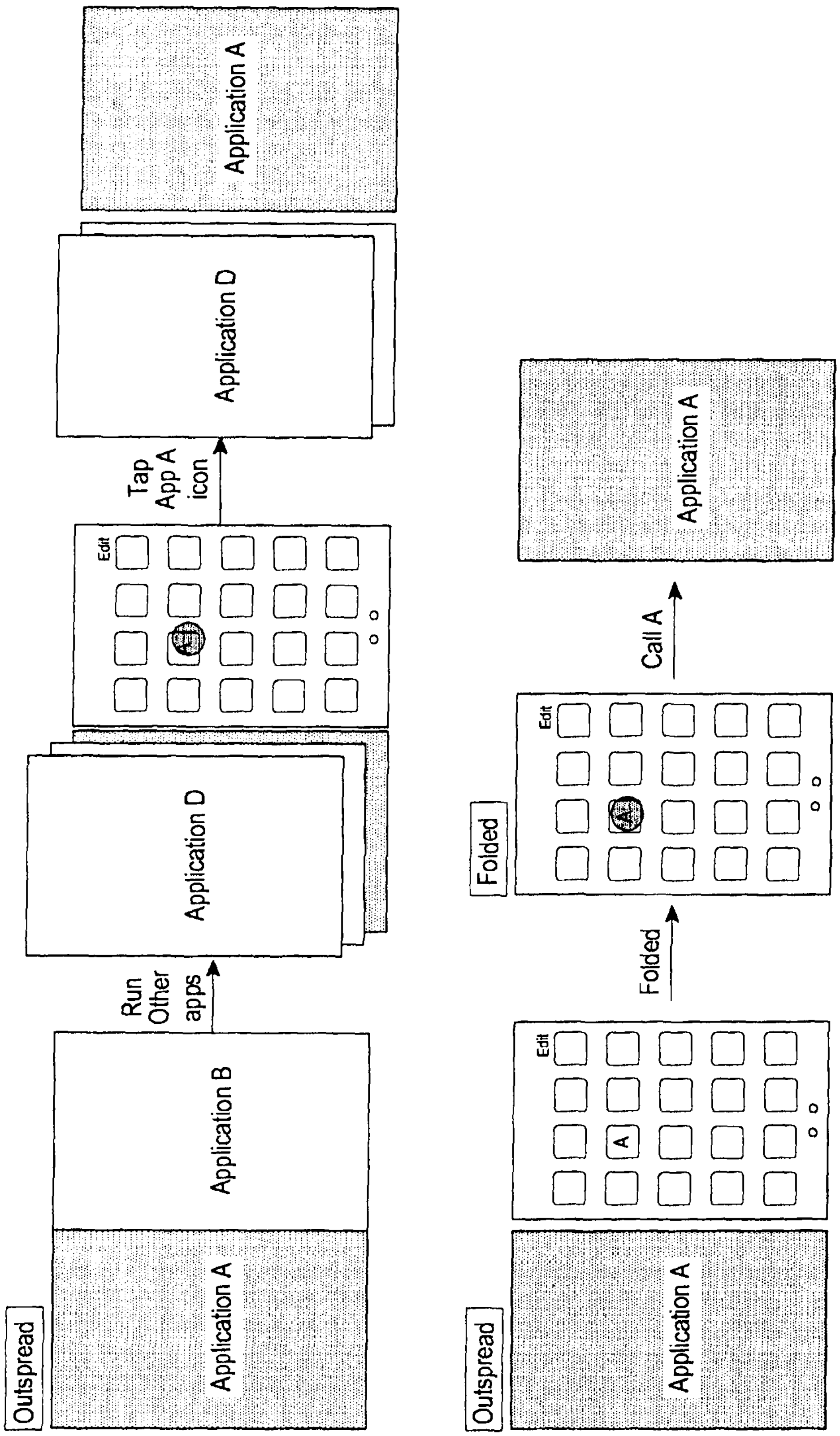

FIG. 25 illustrates a screen switch according to an embodiment of the present disclosure. In the outspread mode, the electronic device may display an execution screen of application B on the main display and an execution screen of an application A on the sub display. Meanwhile, the electronic device may run application D and display an execution screen of application D on the sub display. Thus, application A may run on the background. Meanwhile, the electronic device may detect a designation of an icon to run for application A and in response may display application A on the foreground. In such case, the electronic device may assign the display of application A to the main, rather than sub, display, and the execution screen of application A may be displayed on the main display. According to an embodiment of the present disclosure, as shown on a lower part of FIG. 25, the electronic device in the outspread mode may display the icon on the main display and the execution screen of application A on the sub display. Meanwhile, when the form type changes from the outspread mode to the folded mode, the electronic device may maintain the on state of the main display and switch the sub display into the off state. Upon detecting a designation of a running icon for application A, the electronic device may assign the display of application A to the main, rather than sub, display, and the execution screen of application A may be displayed on the main display.

2.4.2. Description of Notification Panel

Figure 26:
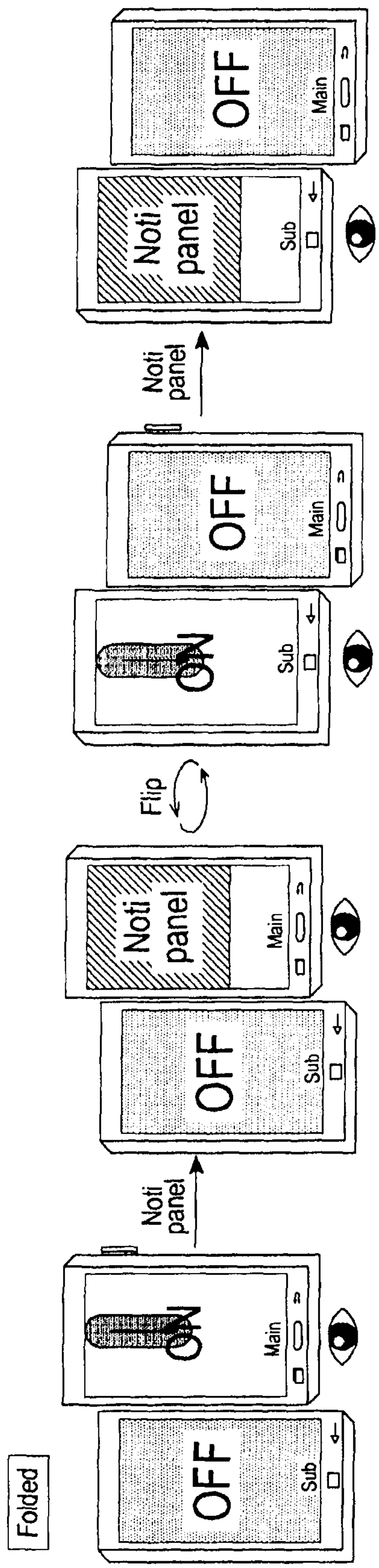
FIGS. 26 to 29 are views illustrating a notification panel according to an embodiment of the present disclosure.
Figure 27:
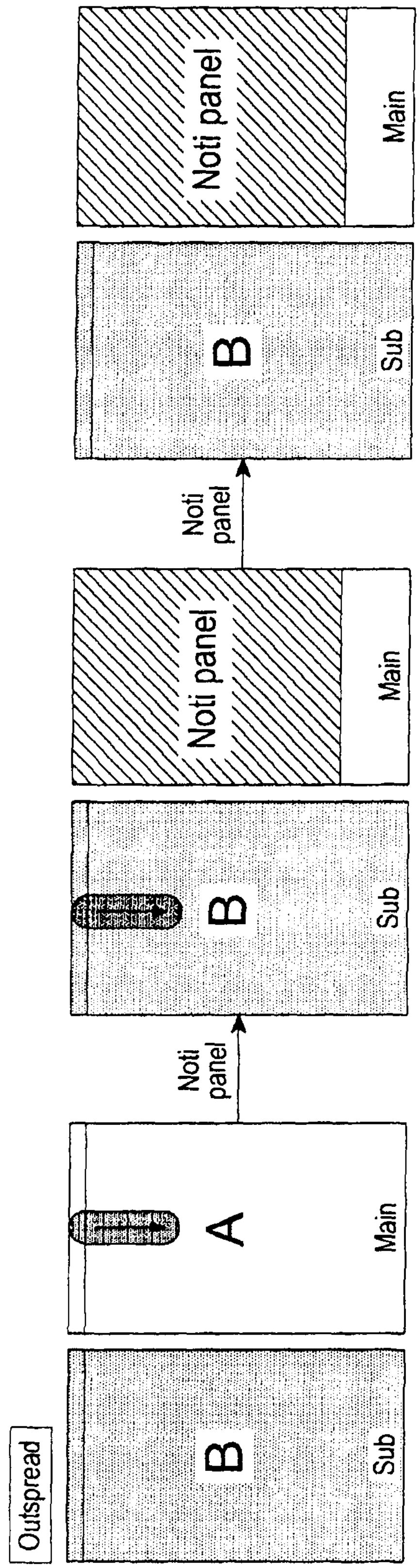

FIG. 26 illustrates a configuration for displaying a notification panel according to an embodiment of the present disclosure. In the folded mode, a notification panel (also referred to as Noti Panel) may be provided on each of the two displays. For example, the electronic device may be previously configured to display a notification panel in response to a gesture input of dragging down from an upper end of the display. As shown in FIG. 26, the electronic device may display a notification panel on the main display in response to the downward drag gesture on the main display. Further, the electronic device may display a notification panel on the sub display in response to a downward drag gesture on the sub display. According to an embodiment of the present disclosure, when a notification panel is provided on one of the displays as shown in FIG. 27, the electronic device may stop displaying the notification panel that has been displayed on the other display. The electronic device, upon the display switching into the off state, may also stop displaying the notification panel that has been displayed on the display that switches into the off state.

According to an embodiment of the present disclosure, the electronic device may enable a notification panel to be displayed on the main display but not on the sub display in the outspread mode or stand mode.

Figure 28:
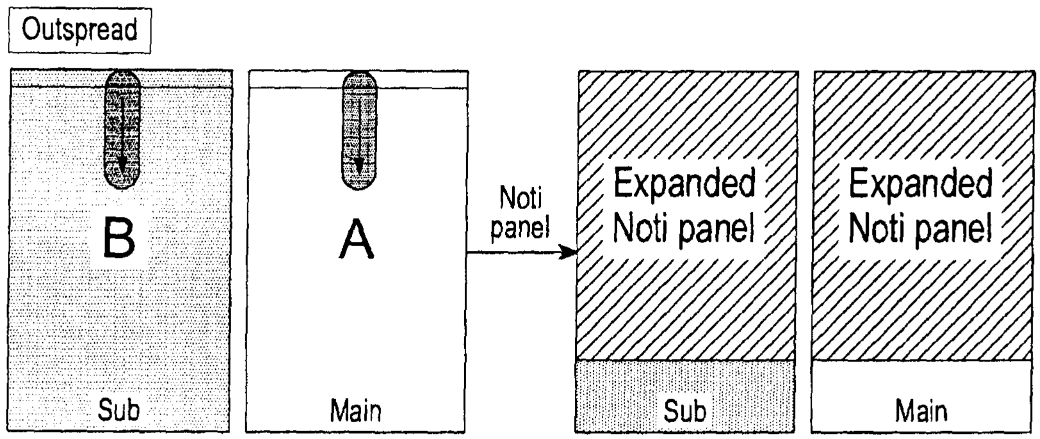

According to an embodiment of the present disclosure, as shown in FIG. 28, the electronic device in the outspread mode may provide an expanded notification panel by the user's settings or selection. The expanded notification panel may mean a notification panel that may be displayed over all of the two displays. According to an embodiment of the present disclosure, upon detecting a downward drag that begins at an upper end from both the displays, the electronic device may display the expanded notification panel over both the displays. The expanded notification panel may include more setting information, e.g., weather and time information in addition to setting buttons that are displayed on a legacy notification panel.

According to an embodiment of the present disclosure, the expanded notification panel may also include information expanded from default notification panel information. For example, when the default notification panel provides only current weather information, the expanded notification panel may further provide per-time weather, weekly weather, or weather of area of interest.

According to an embodiment of the present disclosure, in the table mode, the electronic device may enable the notification panel to be provided on the sub display, but not on the main display. This is why the main display in the table mode is in contact with the underneath surface and may thus not be required to provide a notification panel.

Figure 29:
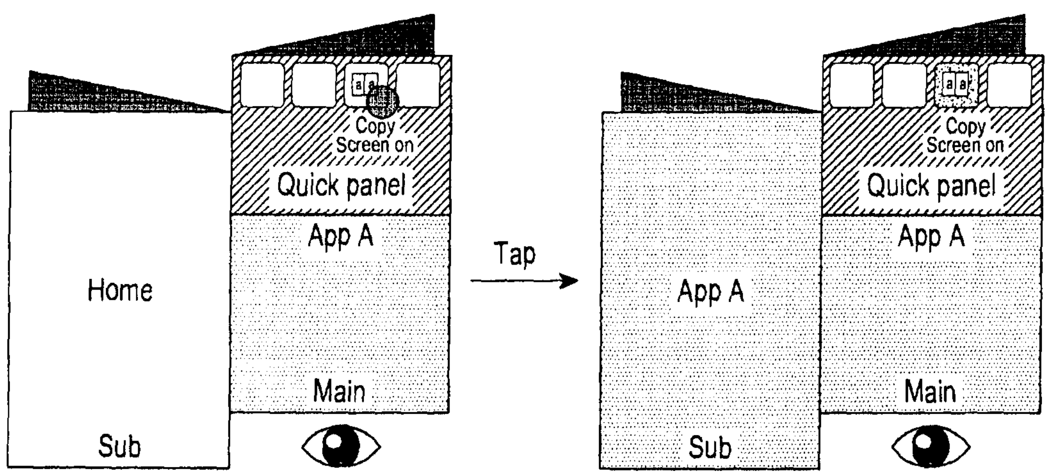
Figure 30:
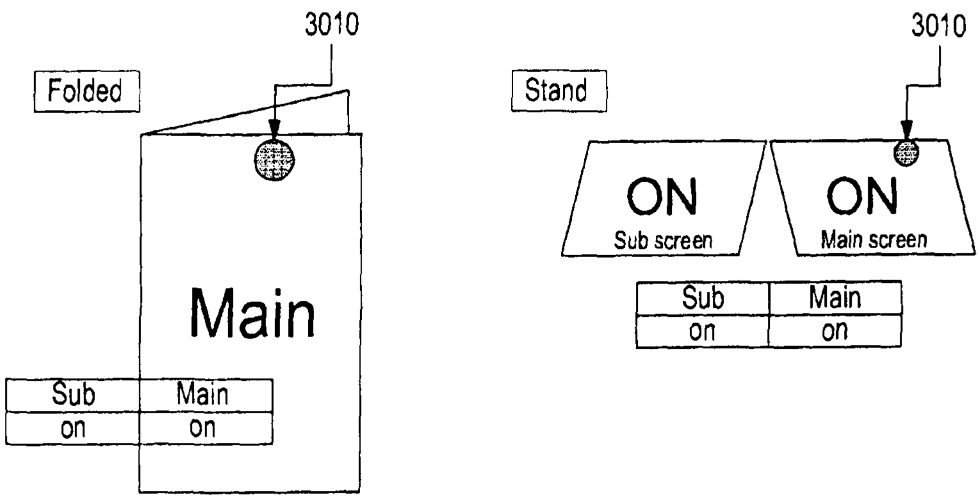
FIG. 30 is a view illustrating an example of displaying a state of an opposite screen according to an embodiment of the present disclosure.

According to an embodiment of the present disclosure, the electronic device may provide a quick panel including a button for controlling screen as shown in FIG. 29. The button for controlling screen may be manipulated on the main display, but not on the sub display, as shown in FIG. 29, and the button may be set to be disabled when the quick panel is called on the sub display in the folded mode.

When 'Copy screen' is controlled to be on through the screen control button, the electronic device may enable the screen, which is being displayed on the main display, to also be displayed on the sub display. Upon controlling 'Copy screen' in the on state, the electronic device may control both the displays in the on state irrespective of form types. When the form type changes into the landscape mode of the folded modes while 'Copy screen' is on, the electronic device may turn around the screens of the two displays in opposite directions, allowing the same screen to be viewed in the two directions.

When 'Copy screen' is controlled in the on state, the expanded application running screen may shrink to the main display.

2.4.3. Description of Notification of Opposite Display

According to an embodiment of the present disclosure, when the two displays in the folded mode are in the on state, the electronic device may display, on the main display, an indicator 3010 indicating that the opposite display is in the on state. Such indicator 3010 may include at least one of an icon and a character and this may be displayed in the display. Or, the electronic device may output an alarm indicating that the opposite display is in the on state through an external component, e.g., a light emitting diode (LED), connected with the electronic device.

2.4.4. Description of Fixing Screen on Sub Display

Figure 31:
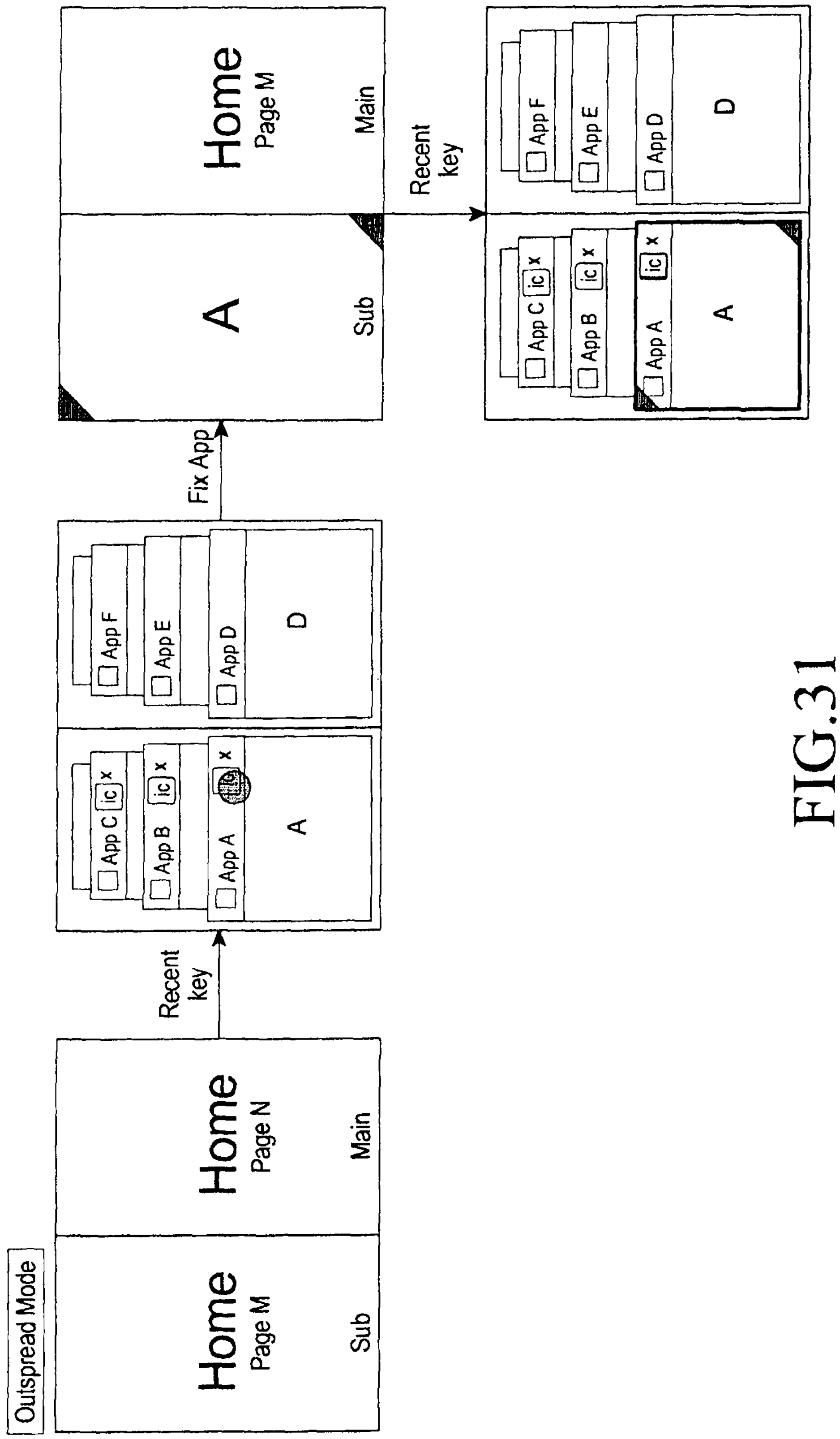
FIGS. 31 to 36 are views illustrating a screen hold function according to an embodiment of the present disclosure.

According to an embodiment of the present disclosure, the electronic device may provide the function of fixing, on the sub screen, an execution screen of an application selected from an application stack entered through a function of calling up a list of applications recently run. As shown in FIG. 31, the electronic device, when the recent-run application list calling key is designated, may display, on each display, a list of applications recently run which has been assigned to be displayed on each display. It is assumed in FIG. 31 that application A is selected for fixing screen on the sub display. The electronic device may fix the display of an execution screen of application A selected on the sub display. Meanwhile, upon designating the recent-run application list calling key, the electronic device may redisplay the list of applications recently run, and the user may enter an unfix command on the application stack in which case the screen may be unfixed.

According to an embodiment of the present disclosure, an icon for fixing/unfixing may be provided only for applications that are assigned to be displayed on the sub display, and the icon for fixing/unfixing may be implemented to be toggled. The fix screen function may be provided per application, and when the application terminates, the fix screen function set by the user may also be released. According to an embodiment of the present disclosure, the electronic device may provide a visual cue for an application having a fix screen function to the sub display or the application stack. The fix screen function may be provided only for applications that are assigned to be displayed on the sub display. The electronic device may release the fix screen function through selection of the unfix screen icon toggled upon selecting the fix screen icon. According to an embodiment of the present disclosure, even when all of the applications run latest are stopped from running by designating a stop-all-applications icon, the electronic device may keep displaying the execution screen of the screen-fixed application.

Figure 32:
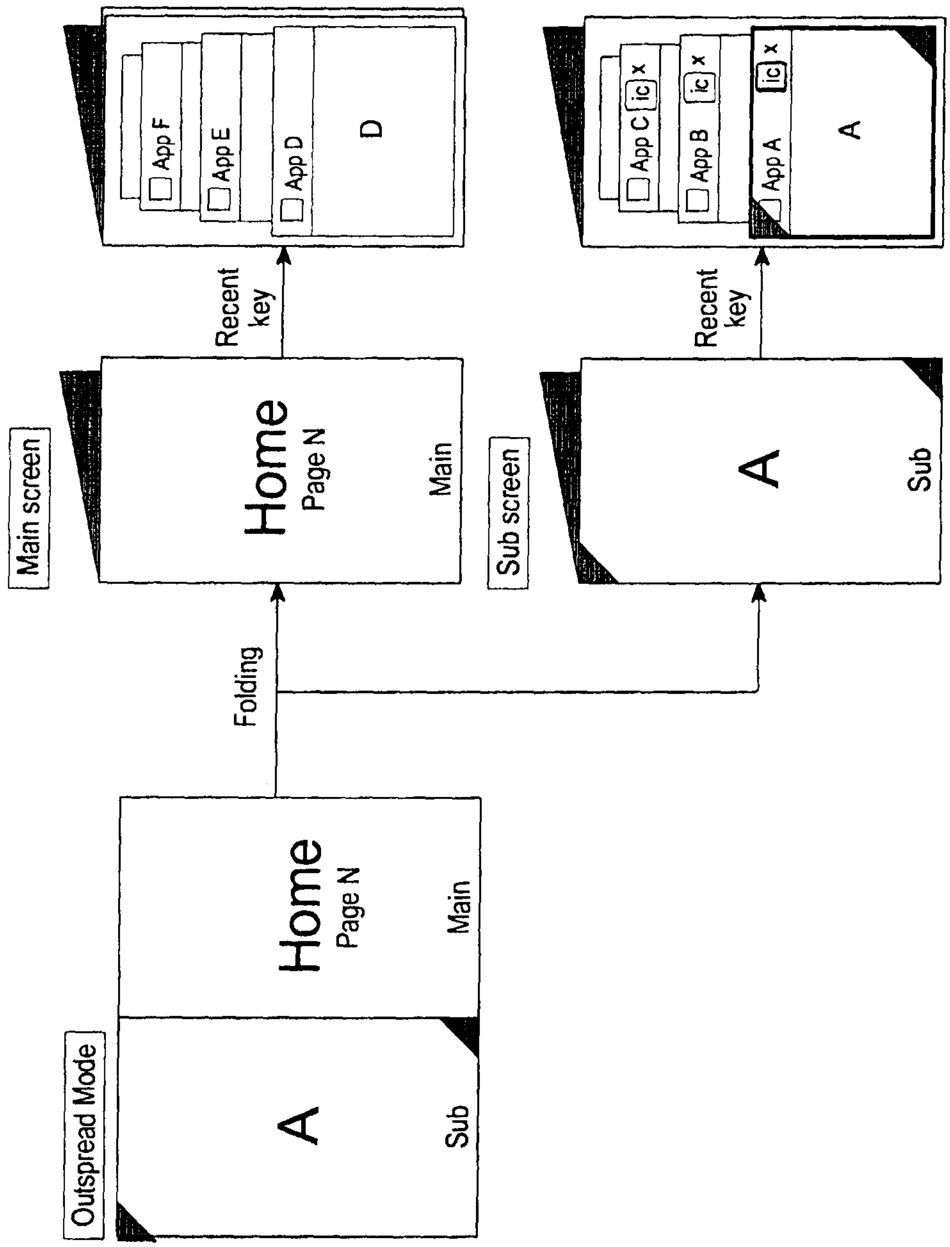

According to an embodiment of the present disclosure, even when the fix screen function is set in the outspread mode that then switches into the folded mode, the electronic device may maintain the fix screen function. For example, when application A is screen-fixed as shown in FIG. 32, although the form type changes into the folded mode, the electronic device may fix the display of the execution screen of application A on the sub display. Thus, when the recent-run application list calling key is designated, an application stack containing a visual key indicating that application A has been screen-fixed may be displayed.

Figure 33:
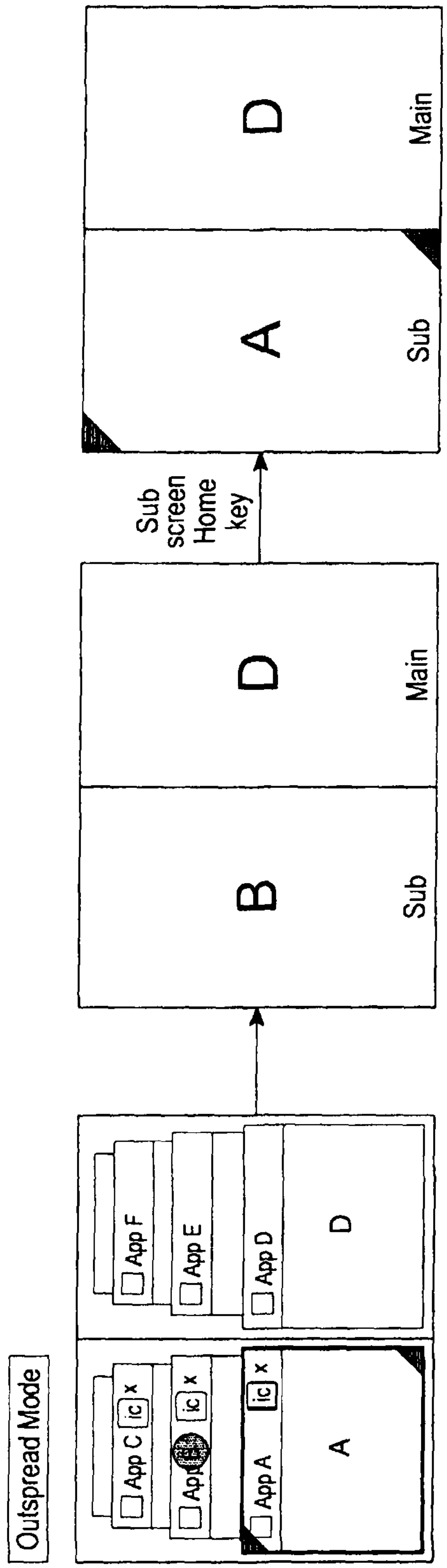

According to an embodiment of the present disclosure, the electronic device may run and display another application above the screen-fixed application even in which case, however, the screen-fixed application may not terminate but run on the background. Meanwhile, when a home key corresponding to the sub display is designated, the electronic device may display the screen-fixed application on the foreground as shown in FIG. 33.

Figure 34:
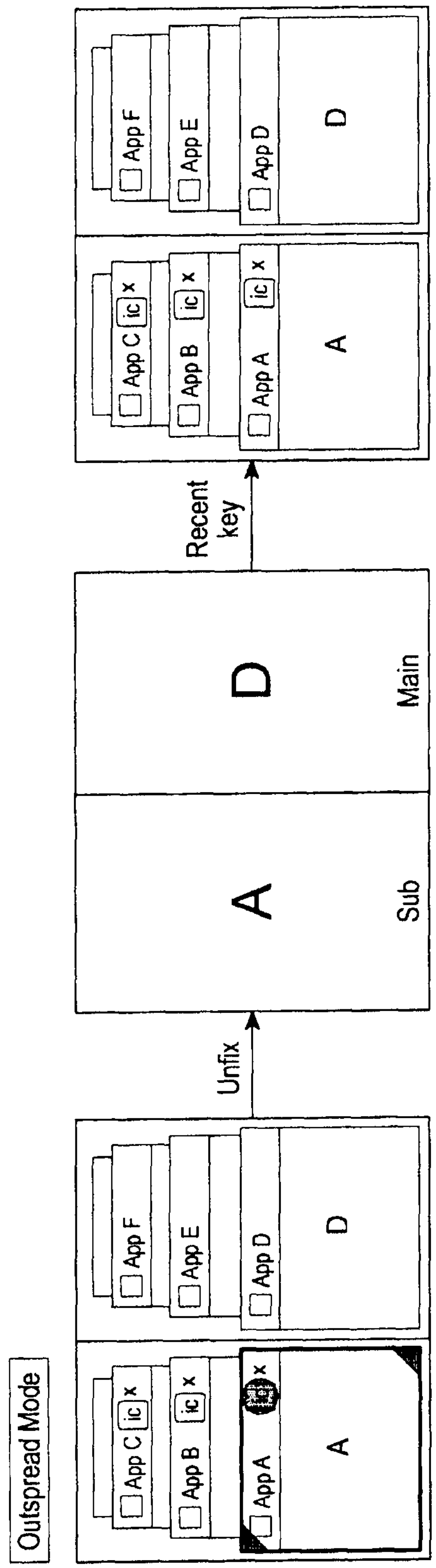

FIG. 34 illustrates a unfix screen function according to an embodiment of the present disclosure. Referring to FIG. 34, the electronic device may detect designation of an unfix screen icon and unfix the screen. For example, when the recent-run application list calling function is designated, the electronic device may display an application stack that includes a visual cue for fixing screen and an unfix screen icon. The user may select the unfix screen icon, and the electronic device may unfix the screen in response to the user's selection.

Figure 35:
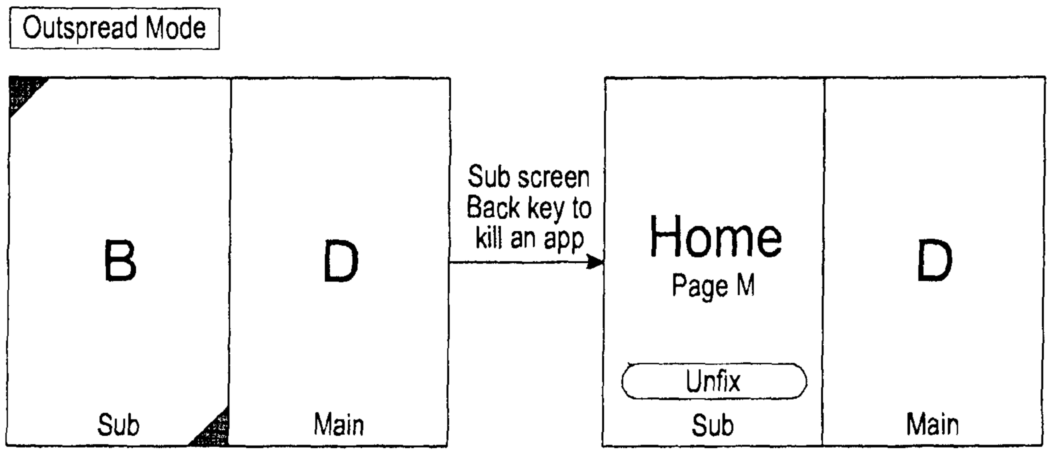

FIG. 35 illustrates an unfix screen function according to an embodiment of the present disclosure. Referring to FIG. 35, the electronic device, upon detecting a designation of a back key at 1 depth of the screen-fixed application, may release the fixing screen of the application. Here, 1 depth is a value that may indicate a step of an initial screen where the application runs. For example, upon entry of a user interaction to the application, the electronic device may display an application screen reflecting the user interaction, and such user interaction-reflected application screen may be referred to as being at 2 depth. Where the electronic device displays an application screen at 2 depth, upon detecting a designation of a back key, the electronic device may make a switch into a 1 depth application screen and display the same. Meanwhile, the electronic device may display, with it, a toast popup indicating the unfixing of the screen and the termination of the application in order to notify the user of the unfixing of the screen of the application.

Figure 36:
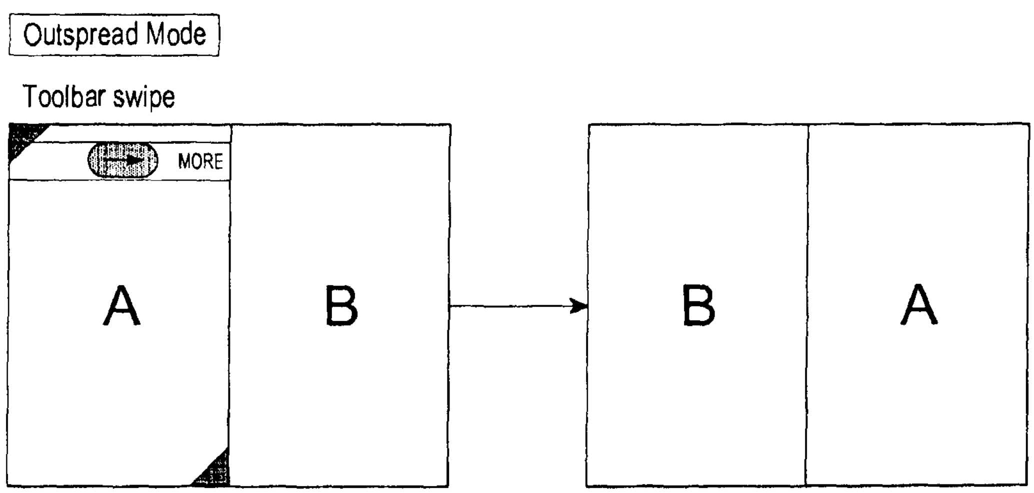

FIG. 36 illustrates an example of unfixing screen according to an embodiment of the present disclosure. The electronic device may move the display of a screen-fixed application to the main display. For example, the electronic device may display an execution screen of the screen-fixed application on the sub display as shown in FIG. 36. The electronic device may detect a tool bar swipe on the sub display, and in response to the detection, the electronic device may move the execution screen of the screen-fixed application that used to be displayed on the sub display to the main display and display the same on the main display. The electronic device may release the screen fixing in order to move the application running screen.

Figure 37A:
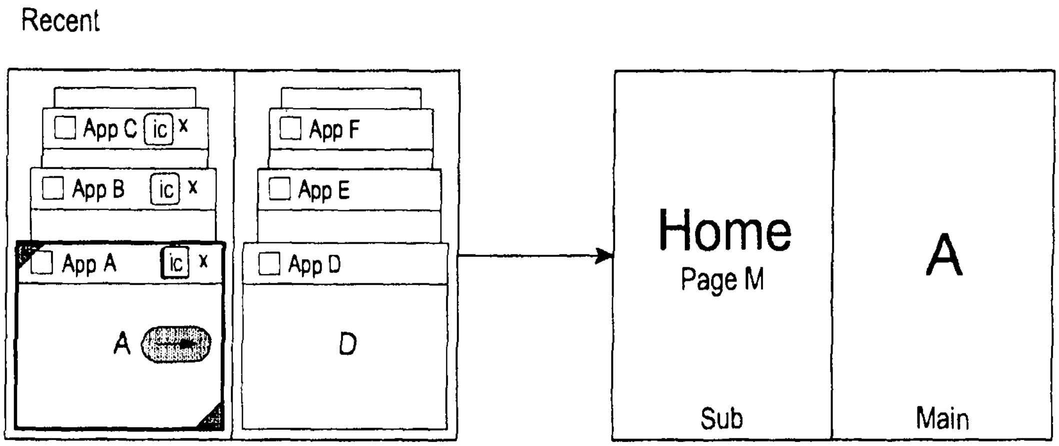
FIGS. 37*a* to 37*e* are views illustrating an example of editing an application screen according to an embodiment of the present disclosure.

The method for unfixing screen for movement an application running screen between displays as described above may similarly apply to circumstances where an application stack is displayed as shown in FIG. 37*a*. As shown in FIG. 37*a*, the electronic device may display an application stack on the sub display and may additionally display a visual cue for the screen-fixed application (e.g., application A). The electronic device may detect a command to move the application running screen—e.g., a swipe—and in response to the command, may display a corresponding application (e.g., application A) on the main display. The electronic device may release the screen fixing of the application subject to the movement in order to move the application running screen.

Figure 37B:
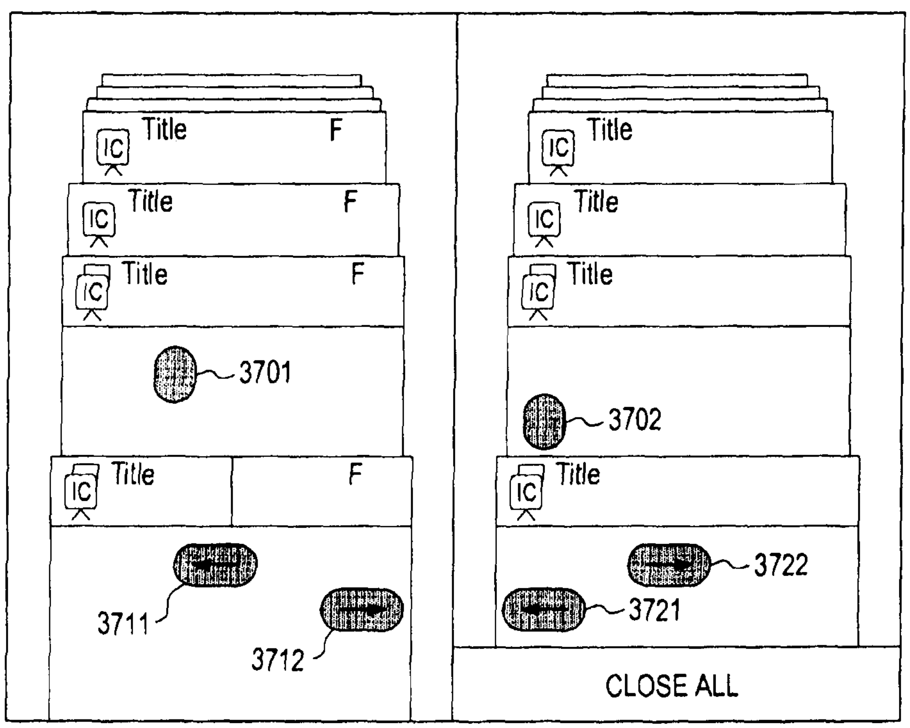

FIG. 37*b* illustrates an example of managing an application on an application stack according to an embodiment of the present disclosure. Upon detecting a designation 3701 or 3702 of an execution screen of a particular application on the application stack, the electronic device may display the designated application on a corresponding display. When the designated application is in the expand mode, the electronic device may display an expanded running screen of the designated application over both the displays. Meanwhile, upon entry of a backward function key, the electronic device may display an application running screen that used to be displayed before.

Upon detecting an outward drag gesture 3711 or 3722 for the particular application running screen on the application stack, the electronic device may remove the application from the application stack. Here, the term "outward" may mean being directed to the right of the main display or the left of the sub display.

Upon detecting an inward drag gesture 3712 or 3721 for the particular application running screen on the application stack, the electronic device may move the application to the opposite display and display the same on the opposite display. Here, the term "inward" may mean being directed to the left of the main display or the right of the sub display. For example, upon detecting a rightward drag gesture 3721 on the sub display, the electronic device may move the application to the main display and display on the main display.

Figure 37C:
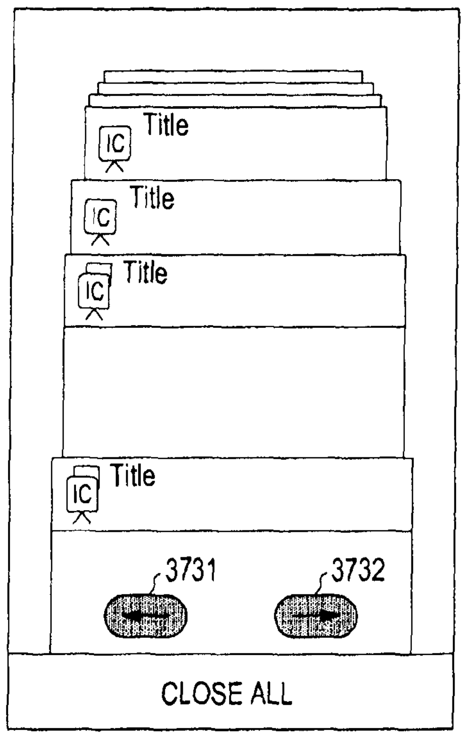

FIG. 37*c* illustrates an example of editing an application stack in the folded mode according to an embodiment of the present disclosure The electronic device may display an application stack on the active display in the folded mode. Upon detecting an inward drag gesture 3731 for one application running screen of the application stack, the electronic device needs to move the application which is however impossible in the folded mode. Thus, the electronic device may perform no operation. On the other hand, upon detecting an outward drag gesture 3732 for one application running screen of the application stack, the electronic device may terminate the application.

Figure 37D:
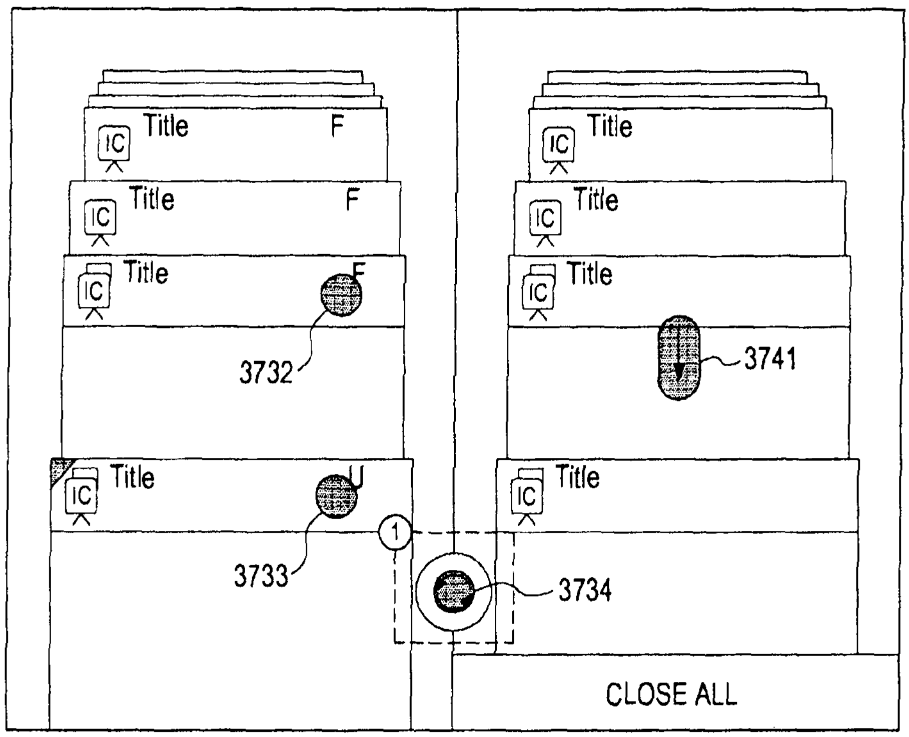

FIG. 37*d* illustrates processes of fixing and unfixing an execution screen according to an embodiment of the present disclosure. Referring to FIG. 37*d*, the electronic device may display an application stack while displaying a fix running screen (F) function key 3732 and an unfix running screen (U) function key 3733 on the individual application running screen. Upon detecting the fix running screen (F) function key 3732, the electronic device may fix the display of the execution screen of the application. Further, the electronic device may display a visual cue indicating that the execution screen has been fixed on the execution screen of the application in the application stack. The electronic device may display the unfix running screen (U) function key 3733, instead of the fix running screen function key, for the fixed application in the application stack.

Figure 37E:
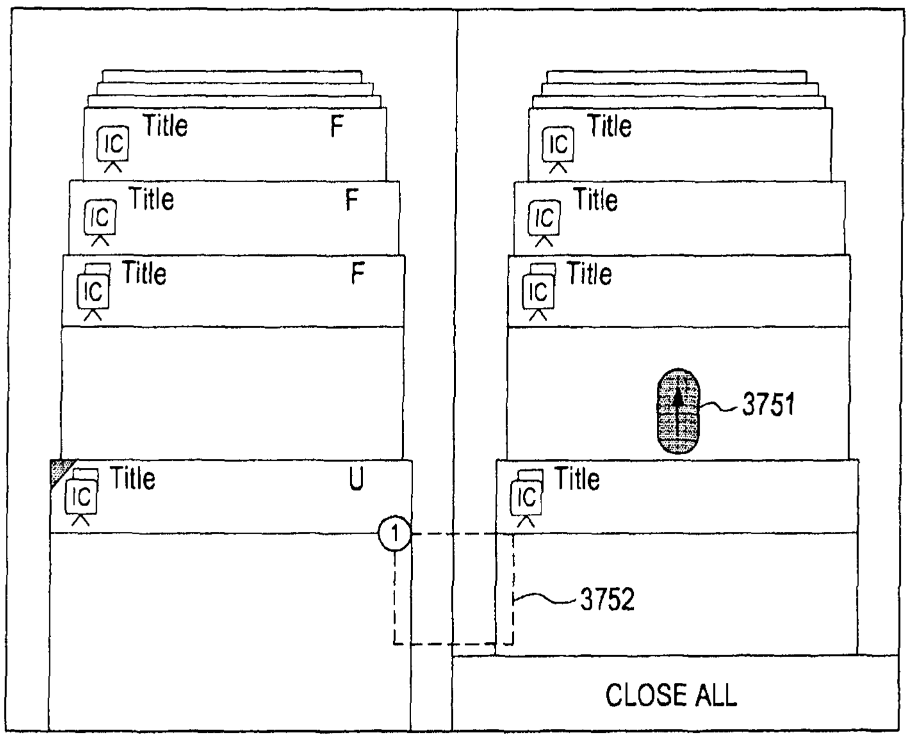

Meanwhile, according to an embodiment of the present disclosure, the electronic device may display a swap applications function key 3734, upon designation of which the electronic device may swap between the topmost application on the application stack of the sub display and the topmost application on the application stack of the main display. Upon detecting an upward or downward drag gesture 3741 for one in the application stack, the electronic device may provide a navigation function of changing application running screens focused. in response to detection of the drag gesture 3741, the electronic device may display a moved stack as shown in FIG. 37*e*, in which case the swap applications function key 3734 may be avoided from being displayed (3752). This may step from the non-display of the topmost application running screen of the application stack. Meanwhile, the electronic device may change application running screens focused of the application stack in response to the upward drag gesture 3751, and may redisplay, e.g., the application stack as shown in FIG. 37*d*. Upon detecting the release of the drag gesture 3741 or 3751 for the navigation function, the electronic device may apply the concept of a snap to display the application stack in a designated layout.

2.4.5. Description of Coupled Applications

According to an embodiment of the present disclosure, the electronic device may generate coupled applications and simultaneously call up two or more applications set for each of the two displays and run them on each display. Upon running the coupled applications, two preset applications, respectively, may simultaneously be launched on the two displays. The coupled applications may be run regardless of form types and may be executed even on a turned-off display. Specifically, the electronic device may run multiple corresponding applications on the execution screen of the coupled applications and may assign the display of at least one of the applications to the display that is in the off state.

Figure 38:
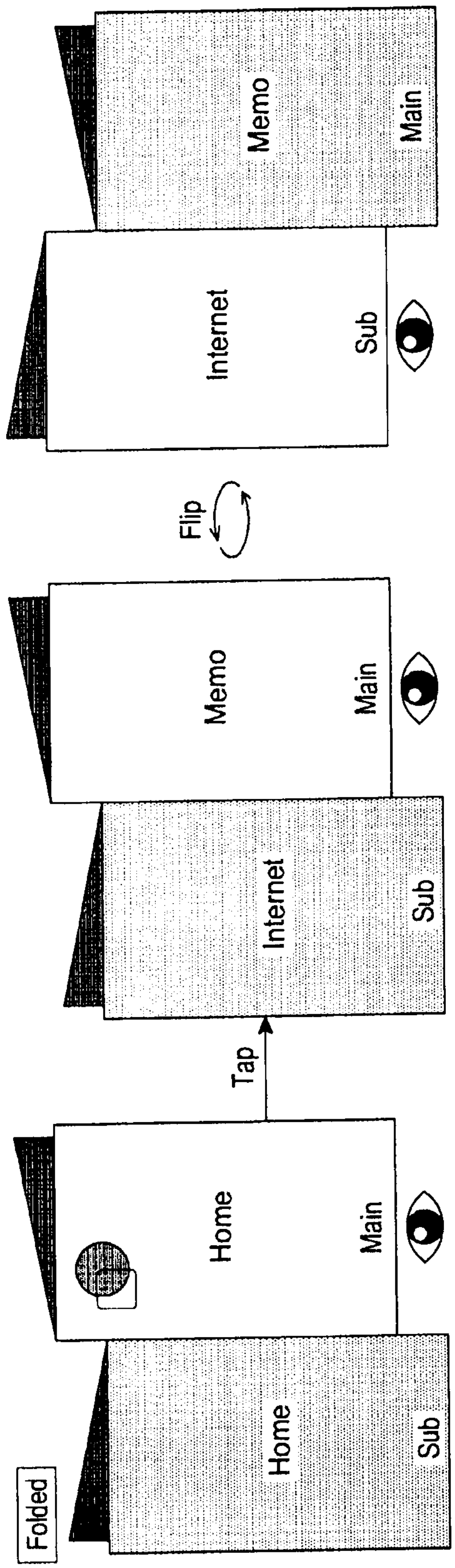
FIGS. 38 and 39 are concept views illustrating coupled applications according to an embodiment of the present disclosure.
Figure 39:
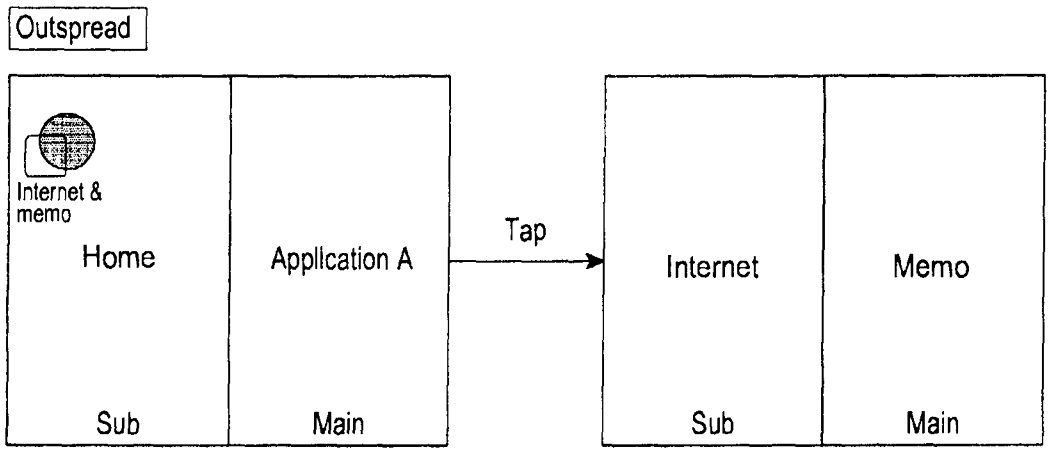

According to an embodiment of the present disclosure, the coupled applications may be generated through an edit mode of the home screen. For example, when the electronic device enters the home screen edit mode, it may display a coupled application area. Upon detecting the drag-and-drop of two icons to the coupled application area from the user, the electronic device may generate and display a coupled application icon. According to an embodiment of the present disclosure, the electronic device may detect a move and overlap of an icon in the edit mode, and in response to this, it may generate and display a coupled application icon. FIGS. 38 and 39 illustrate an example of running coupled applications. As shown in FIGS. 38 and 39, when a coupled application icon is designated, the electronic device may run the plurality of applications included in the coupled applications. The electronic device may display the respective running screens of the applications run on the plurality of displays, respectively, as shown in FIGS. 38 and 39.

2.5 Description of Folded Mode 2.5.1. Overview of Folded Mode

Figure 40:
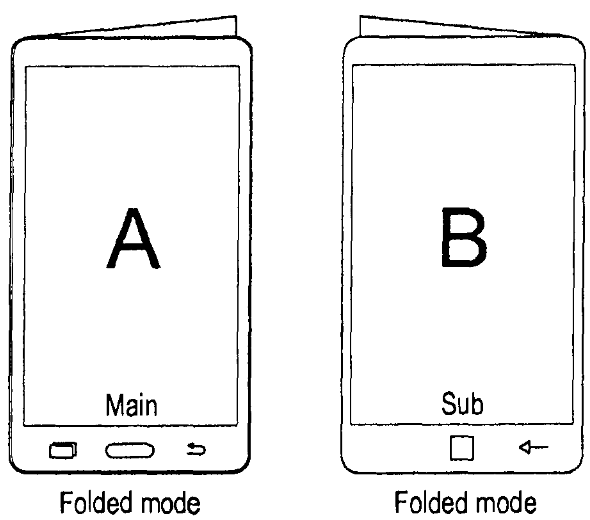
FIGS. 40 to 56 are concept views illustrating an electronic device in a folded mode according to an embodiment of the present disclosure.

According to an embodiment of the present disclosure, the folded mode may mean a state in which the two displays are folded outwards as shown in FIG. 40 in which case the electronic device may, as a default, control one (i.e., the active display) of the two displays in the on state and the other display (i.e., the inactive display) in the off state. The electronic device may control both the displays in the on state depending on manipulation by the user or a particular application or may control the opposite display in the on state but not the display that the user is viewing. The display not in use by the user may be turned off, but the application assigned to be displayed on the turned-off display does not terminate but may keep running. The electronic device may change the on-state display depending on the user's manipulation and use the opposite display of the display that the user is viewing for a backside touch function. For example, a touch detected on the opposite display may be assigned to the application displayed on the active display. Thus, the application displayed on the active display may be controlled or manipulated by a touch on the opposite display. The home key, back key, or other touch keys arranged on the body including the off-state display may be disabled, and thus, the back light of a touch key may also be controlled in the off state.

2.5.2. Turn Over

When a call-related function (e.g., an incoming or outgoing function) runs while the sub display is in use, the electronic device according to an embodiment of the present disclosure may provide information instructing to use the main display. In an embodiment of such method, a turn-over button, rather than an accept/reject button, may be displayed corresponding to the call-related function.

2.5.3. Description of Splash Effects on Opposite Display of Screen in Use

Figure 41:
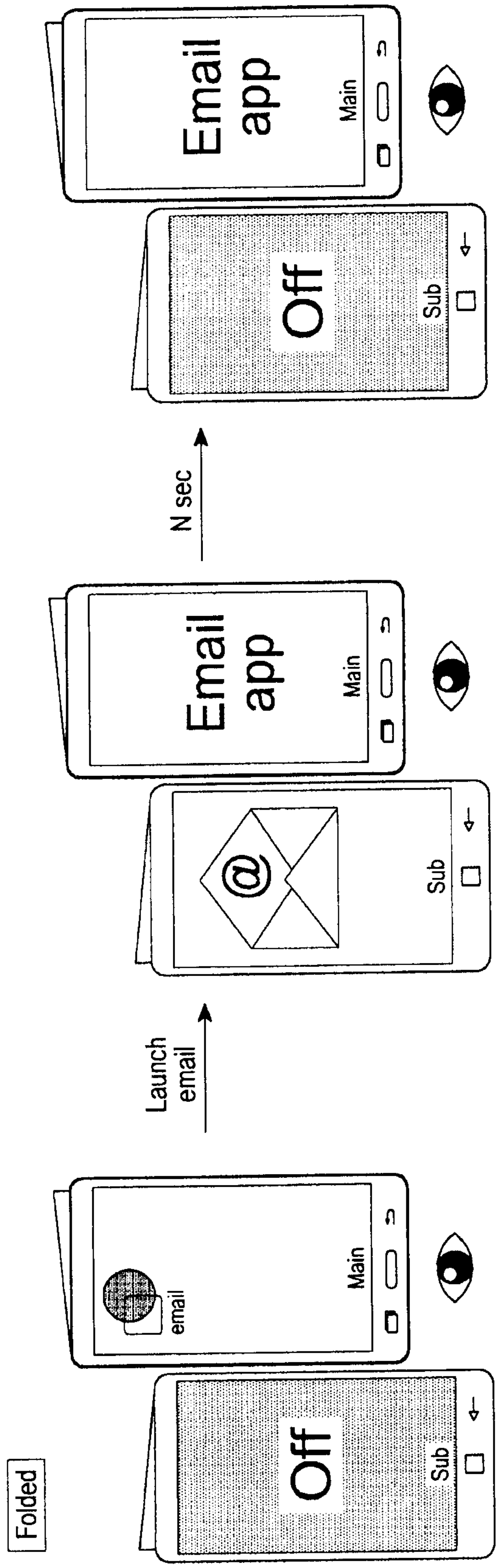

According to an embodiment of the present disclosure, the electronic device may run an application and display an execution screen of the running application on the main display. Here, the electronic device may determine that the main display is one in use by the user. Upon running the application, the electronic device may provide a splash associated with the running application on the opposite display for N seconds as shown in FIG. 41. The splash may be an image or video representing the running application. The electronic device may use a splash of another application. For example, upon running a game application, the electronic device may display a splash of an e-book application. When the electronic device overturns or its form type changes while the splash is displayed, the electronic device may stop displaying the splash immediately or after a preset time. The function of providing a splash may be turned on/off by the user's settings.

2.5.4. Description of State of Both Displays Being on

Figure 42:
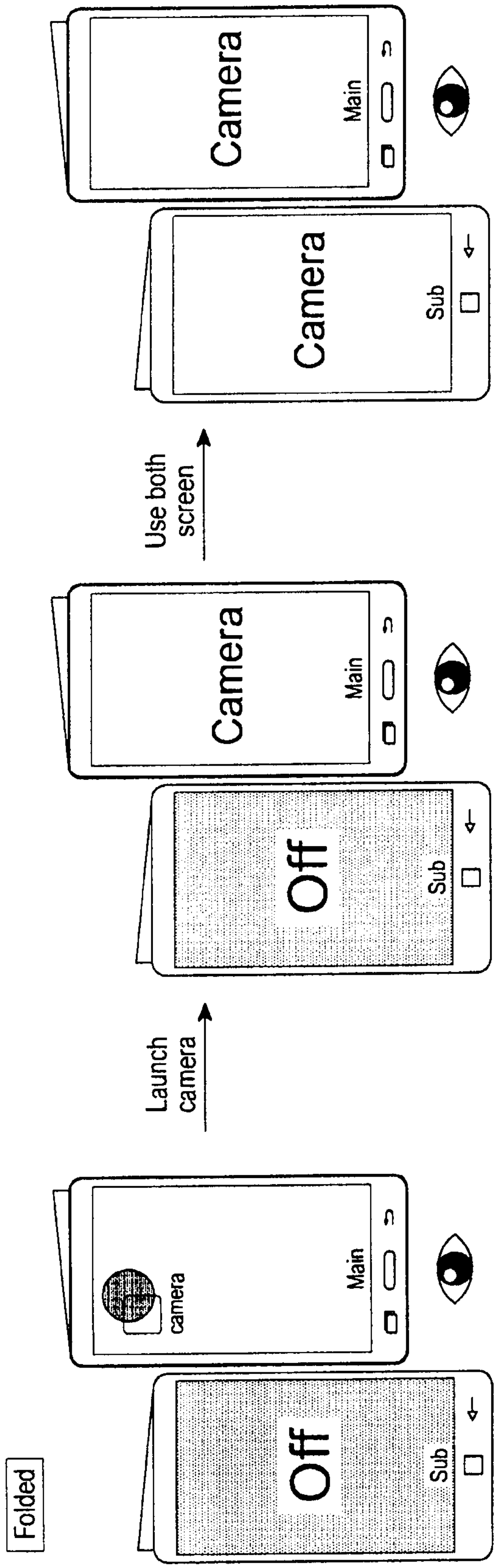

When a particular application runs, the electronic device according to an embodiment of the present disclosure may display an execution screen of the running application using both the displays. According to an embodiment of the present disclosure, when a camera application runs, the electronic device may display a camera application running screen on both the displays as shown in FIG. 42.

2.5.5. Flip Interaction

Figure 43A:
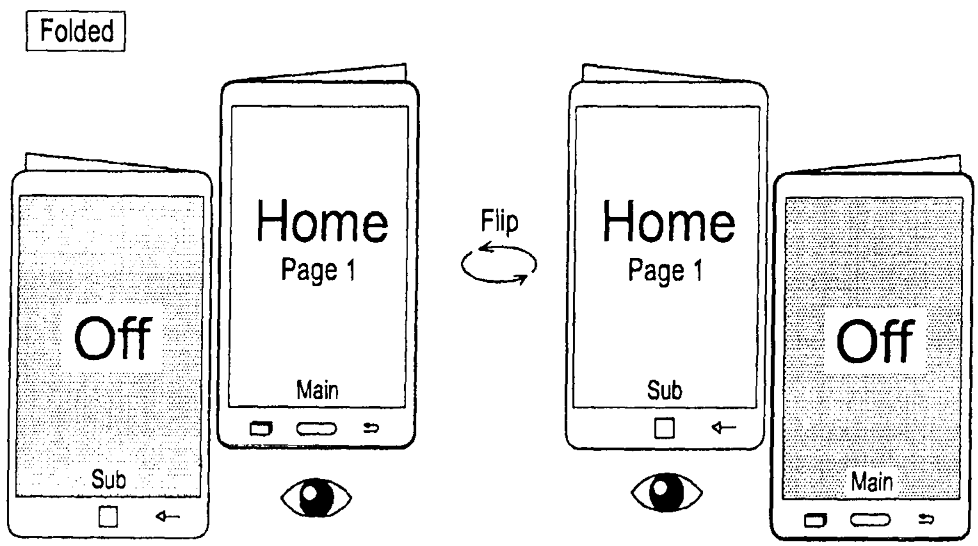

According to an embodiment of the present disclosure, when no application runs, the electronic device may display the same home screen on an on-state controlled display, whichever of the two displays the electronic device controls in the on state. In the embodiment of FIG. 43*a*, the electronic device may detect a flip interaction or two-finger swipe with no application running. The electronic device may switch screens in response to the detection, i.e., change on-state displays, in which case the same home screen may be displayed on the on-state display. Meanwhile, the flip interaction may be an interaction by which the orientation of the electronic device overturns, i.e., a change in the orientation of the electronic device from a first direction to a second direction. For example, while the main display faces in the first direction in the folded mode, the sub display may be rendered to face in the first direction by a flip interaction. The electronic device may detect a flip interaction based on data from a motion sensor, e.g., a gyro sensor or acceleration sensor.

Figure 43B:
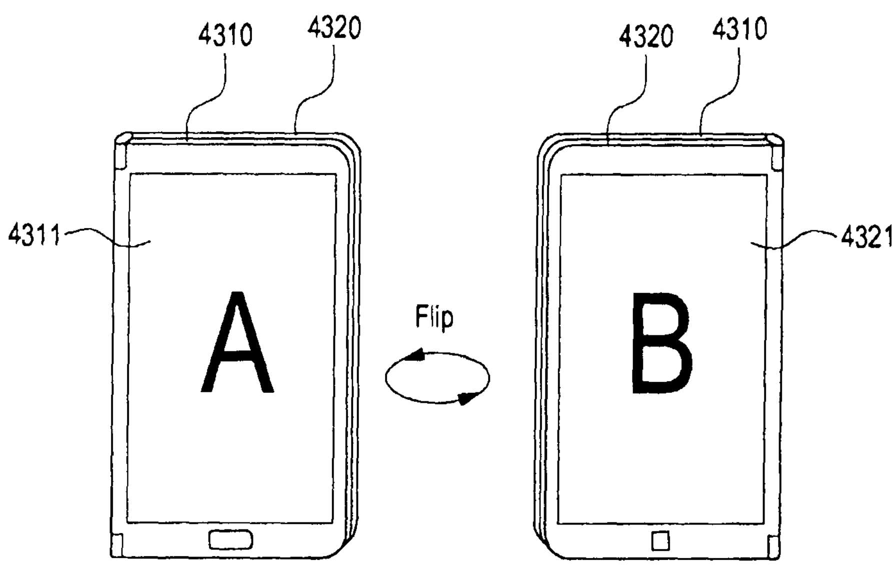

Referring to FIG. 43*b*, the electronic device according to an embodiment of the present disclosure may be flipped by the user. The electronic device being flipped may denote that the electronic device overturns. The electronic device may include a sensor for obtaining direction information about the electronic device and may determine whether the electronic device is flipped using the direction information about the electronic device obtained from the sensor.

For example, as shown in FIG. 43*b*, according to an embodiment of the present disclosure, the electronic device may determine at least one of a direction in which the first display 4311 disposed in the first body 4310 faces and a direction in which the second display 4321 disposed in the second body 4320 faces according to the direction information about the electronic device obtained through the sensor, with the first body 4310 and the second body 4320 abutting each other.

According to an embodiment of the present disclosure, the electronic device may determine whether the electronic device is flipped based on at least one of the determined direction in which the first display 4311 faces and the determined direction in which the second display 4321 faces. When at least one of the determined direction in which the first display 4311 faces and the determined direction in which the second display 4321 faces is changed to an opposite direction, the electronic device may determine that the electronic device has been flipped.

For example, the electronic device may determine the angle between at least one of the determined direction in which the first display 4311 faces and the determined direction in which the second display 4321 faces and the existing direction in which the first display 4311 faces and the existing direction in which the second display 4321 faces, and depending on the determined angle, determine whether the electronic device has been flipped.

Figure 43C:
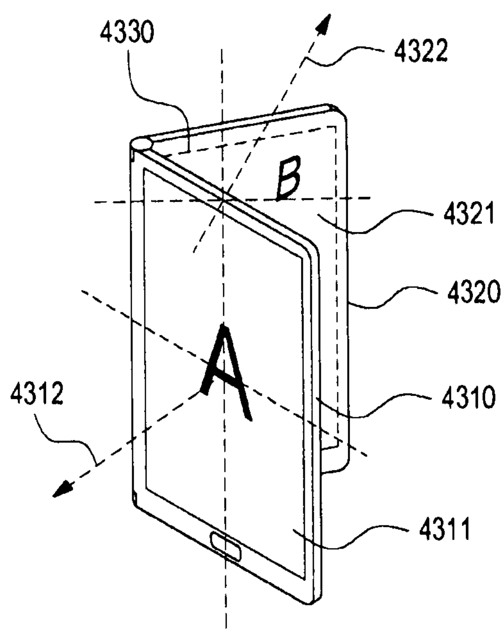

Referring to FIG. 43*c*, the direction 4321 in which the first display 4311 disposed in the first body 4310 faces may be perpendicular to the first display 4311. Likewise, the direction 4322 in which the second display 4321 disposed in the second body 4320 faces may be perpendicular to the second display 4321.

However, this is merely one for description purposes but should not be limited thereto. The directions in which the first display 4311 and the second display 4321 face may be set by various methods in order to determine a movement of the electronic device.

Figure 43D:
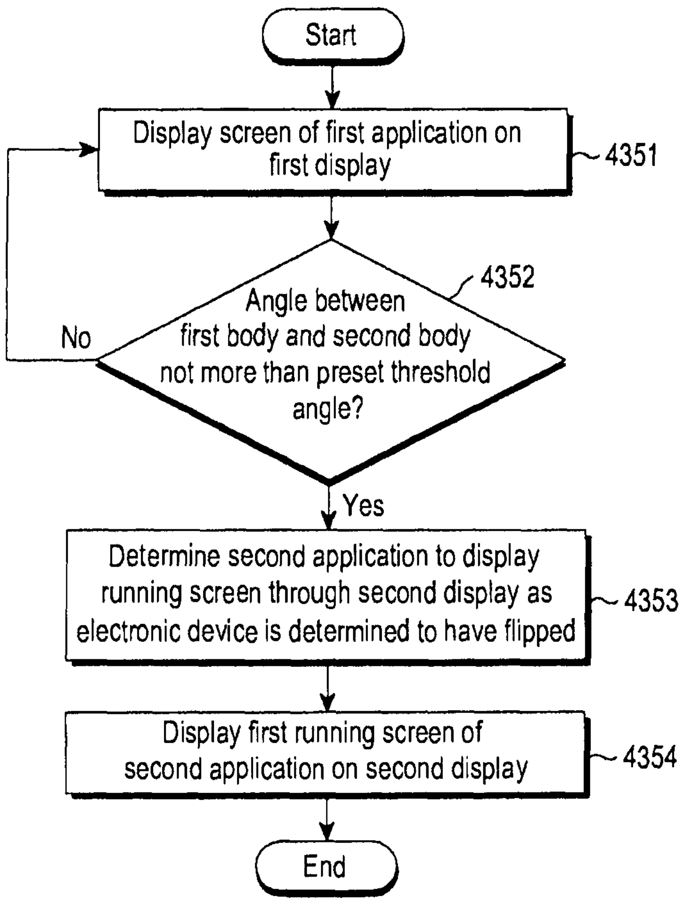

FIG. 43*d* is a flowchart illustrating a method for operating an electronic device according to an embodiment of the present disclosure.

In operation 4351, the electronic device may display a screen of a first application on the first display. The electronic device may display a screen of an application now running on the first display.

In operation 4352, the electronic device may determine whether the angle between the first body and the second body is a preset threshold angle or less. The preset threshold angle may be set to be within a range where the user may view the screen of a first application displayed through the first display but not the screen displayed through the second display. Further, the preset threshold angle may be set to be within a range where the user may view the screen of a first application displayed through the first display but not the overall screen displayed through the second display.

In operation 4353, as the electronic device determines that the electronic device has been flipped at an angle not more than the preset threshold angle between the first body and the second body, the electronic device may determine a second application for displaying an execution screen through the second display among a plurality of applications stored in the electronic device. A specific method for determining the second application is described below.

In operation 4354, the electronic device may display a first running screen of the second application on the second display.

Figure 43E:
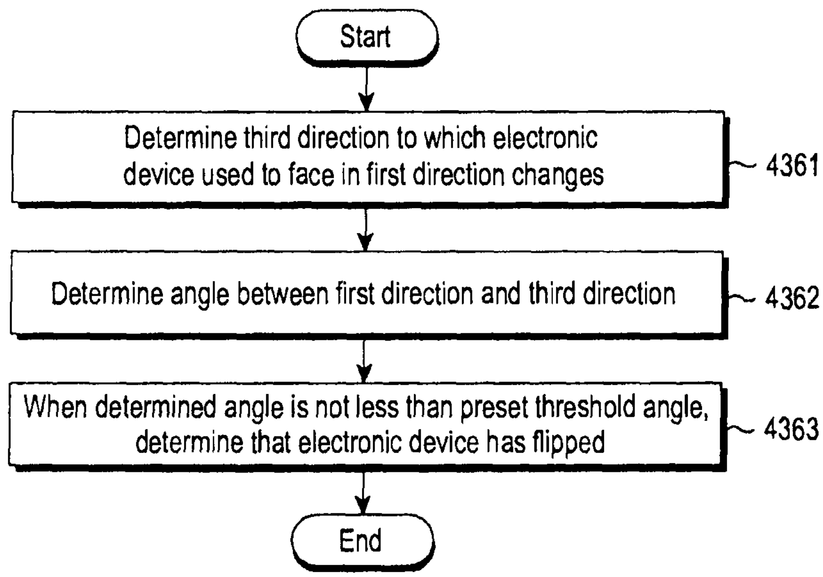

FIG. 43*e* is a flowchart illustrating a method for determining, by an electronic device, whether the electronic device is flipped according to an embodiment of the present disclosure.

In operation 4361, the electronic device, upon sensing a change in the direction of the electronic device, may determine a third direction that the first display faces, which has been changed from the first direction due to the change in the direction of the electronic device.

In operation 4362, the electronic device may determine the angle between the first direction and the third direction based on a result of the determination.

In operation 4363, the electronic device may determine that the electronic device has been flipped when the angle between the first direction and the second direction is a preset threshold value or more.

The threshold value may be set based on an angle for determining whether the electronic device is flipped. For example, assuming that the electronic device is in a position fully flipped when the angle between the first direction and the second direction is 180 degrees, with a surface of the first body and a surface of the second body abutting each other, the threshold value may be set to be an angle close to 180 degrees, e.g., in a range from 160 degrees to 180 degrees.

Further, the threshold value may be set according to the current state of the first body and the second body, e.g., the angle between the first body and the second body.

Although a method of using the direction in which the first display faces to determine, by the electronic device, whether the electronic device is flipped has been described above, embodiments of the present disclosure are not limited thereto. The electronic device may also determine a direction in which the second display faces, as well as the direction in which the first display faces, and the electronic device may determine whether the electronic device is flipped using at least one of the direction in which the first display faces and the direction in which the second display faces.

Figure 43F:
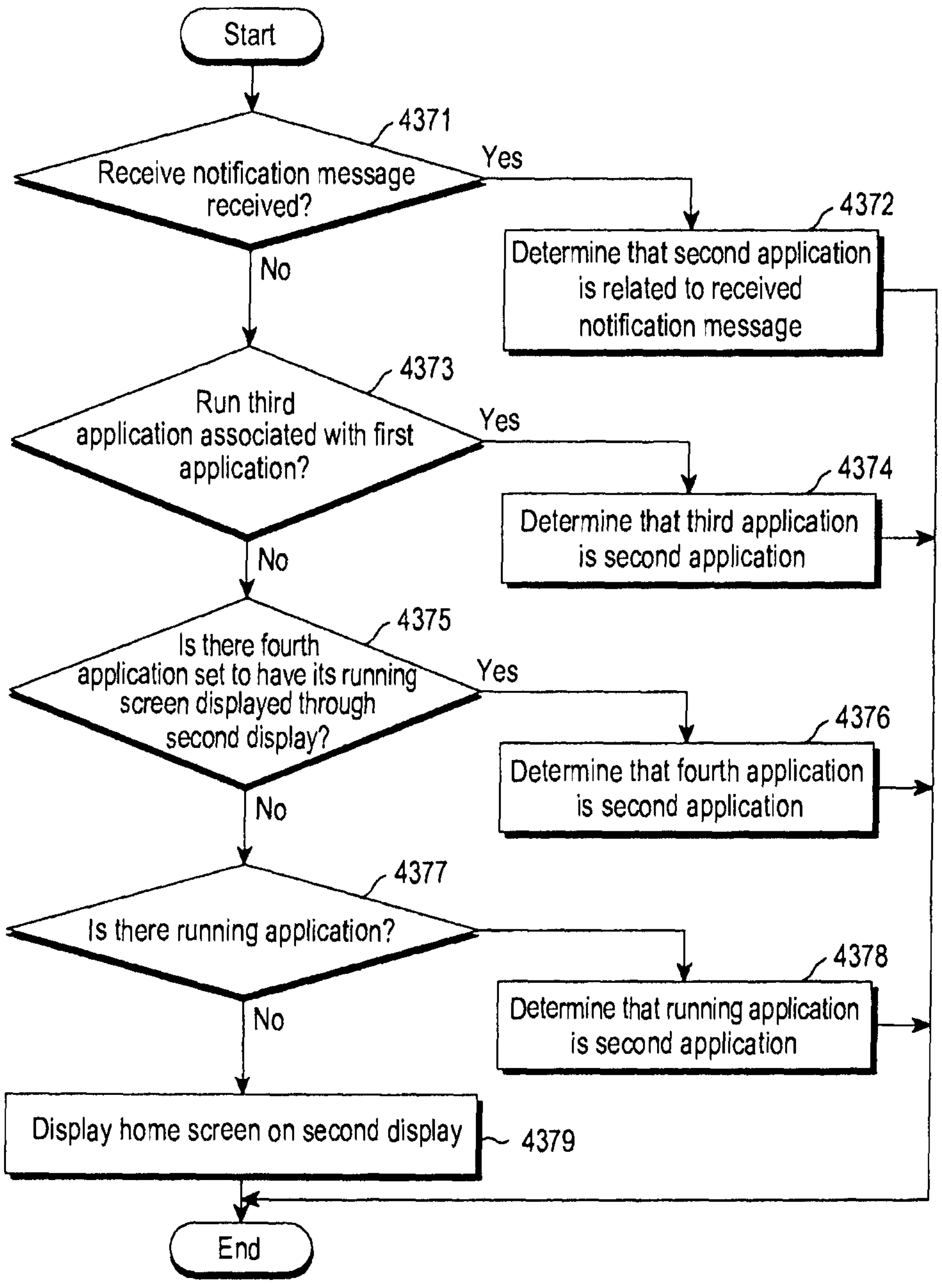

FIG. 43*f* is a flowchart illustrating a method for determining a second application for displaying an execution screen through the second display by the electronic device according to an embodiment of the present disclosure.

In operation 4371, the electronic device may identify whether to receive a notification message to determine the second application.

For example, the notification message may include messages indicating that an event occurs from each of the plurality of applications, such as an notification of reception of an SMS message, email, or instant message, addition of a friend through an instant messenger application, an update status of social network service (SNS) postings, or provision of a coupon.

In operation 4372, the electronic device, upon receiving the notification message, may determine that the second application is an application associated with the received notification message. For example, the electronic device may determine that an SMS message application is the second application when an SMS message is received and may determine that an email application is the second application when an email is received.

In operation 4373, the electronic device may identify whether a third application associated with the first application runs upon failing to receive the notification message. The third application may be an application set to be associated with the first application and may be used paired with the first application.

In operation 4374, the electronic device may determine that the third application is the second application for displaying an execution screen through the second display when the third application set to be associated with the first application is running.

In operation 4375, when the third application does not run, the electronic device may identify whether there is a fourth application set so that its running screen is displayed through the second display.

In operation 4376, the electronic device may determine that the second application is the fourth application when there is the fourth application.

In operation 4377, the electronic device may determine whether there is at least one running application among a plurality of applications included in the electronic device when the fourth application is absent.

In operation 4378, when the, at least one, running application is present, the electronic device may determine that one of the at least one application is the second application.

The electronic device may arbitrarily select one application of the at least one running application and may select one application according to a user input and determine that the application is the second application.

In operation 4379, when there is no running application among the plurality of applications, the electronic device may display a home screen on the second display.

The method for determining the second application is merely an example but is not limited thereto. The description above has been made in the order that the processor 120 identifies the notification message, then identifies whether the third application runs, then identifies whether there is the fourth application, and then identifies a running application, but is not limited thereto.

For example, the processor 120 may determine that the third application is the second application regardless of whether to receive the notification message and may determine that the fourth application is the second application regardless of whether to receive the notification message or whether the third application runs. In other words, the methods for determining the second application may be performed independently from each other, and the order of applying the methods of determining the second application may be changed depending on, e.g., the user's settings.

Figure 43G:
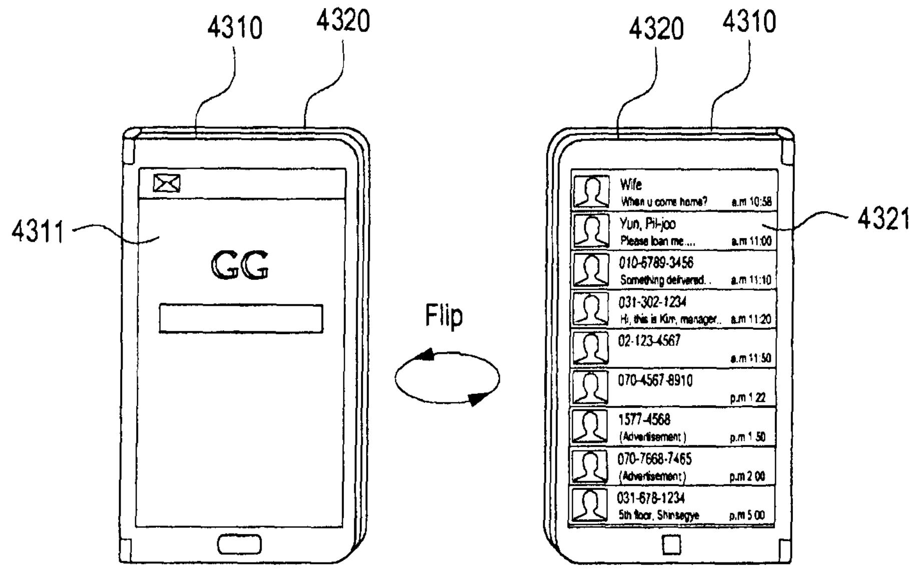

FIG. 43*g* illustrates an electronic device displaying an execution screen of an application associated with a notification message through the second display according to an embodiment of the present disclosure.

Referring to FIG. 43*g*(*a*), according to an embodiment of the present disclosure, the electronic device displays an execution screen of a web browser application through the first display 4311. While displaying the execution screen of the web browser application through the first display 4311, the electronic device may receive an SMS message. The reception of the SMS message may be displayed through the first display 4311.

Referring to FIG. 43*g*(*b*), when the electronic device is flipped by the user, the electronic device according to an embodiment of the present disclosure may sense whether the electronic device is flipped and may display an execution screen of an SMS message application through the second display 4321.

The electronic device may identify whether the SMS message is received by sensing whether the electronic device is flipped, and since the SMS message has been received, the electronic device may determine that the SMS message application is the second application for displaying an execution screen through the second display 4321. As the electronic device displays the execution screen of the SMS message application through the second display 4321, the user may identify the received SMS message by simply flipping the electronic device without a separate, additional input for identifying the SMS message.

Figure 43H:
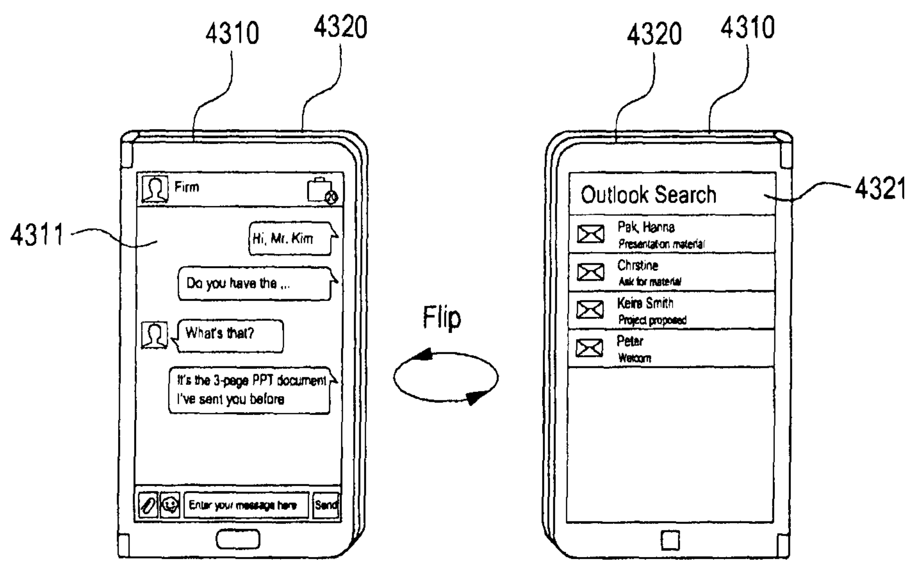

FIG. 43*h* illustrates an electronic device displaying an execution screen of the third application associated with the first application through the second display according to an embodiment of the present disclosure.

Referring to FIG. 43*h*(*a*), according to an embodiment of the present disclosure, the electronic device displays an execution screen of an instant messenger application through the first display 4311. An application associated with the instant messenger application is assumed to be an email application.

Referring to FIG. 43*h*(*b*), when the electronic device is flipped by the user, the electronic device may sense whether the electronic device is flipped and may display an execution screen of an email application associated with the instant messenger application through the second display 4321.

As the electronic device senses whether the electronic device is flipped, the electronic device may identify whether the email application associated with the instant messenger application runs. When the email application is running, the electronic device may determine that the email application is the second application for displaying an execution screen through the second display 4321.

Further, when the email application is not running, the electronic device may display a message for identifying whether the email application is running through the second display 4321. Thereafter, upon receiving an input for running the email application from the user, the email application may be displayed through the second display 4321.

Further, when the email application is not running, although no user input for running the email application is received, the electronic device may run the email application and display a screen of the email application through the second display 4321.

Figure 43I:
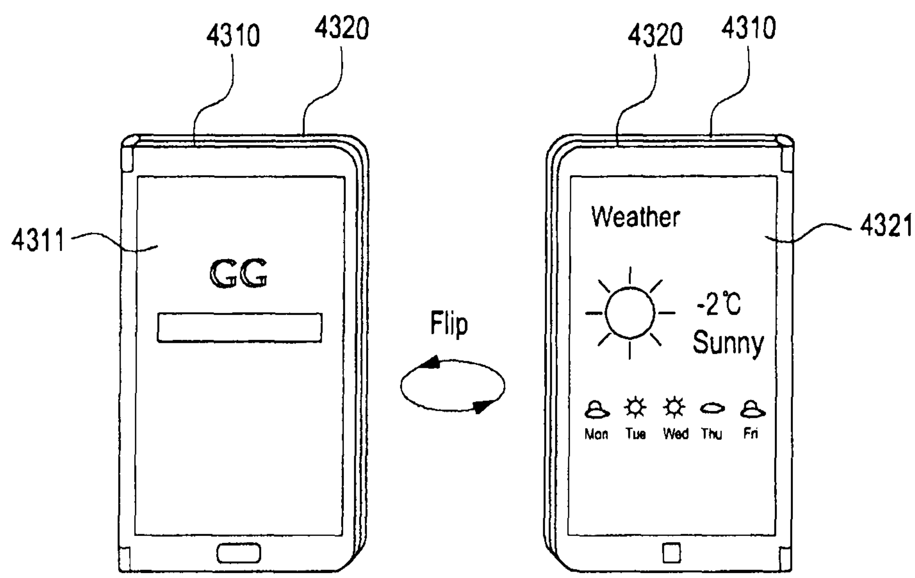

FIG. 43*i* illustrates an electronic device displaying an execution screen of the fourth application set so that its running screen is displayed through the second display according to an embodiment of the present disclosure.

Referring to FIG. 43*i*(*a*), according to an embodiment of the present disclosure, the electronic device displays an execution screen of a web browser application through the first display 4311. The application set so that its running screen is displayed through the second display 4321 is assumed to be a weather information application.

Referring to FIG. 43*i*(*b*), when the electronic device is flipped by the user, the electronic device may sense whether the electronic device is flipped and may display an execution screen of the weather information application set so that its running screen is displayed through the second display 4321 through the second display 4321.

As the electronic device senses whether the electronic device is flipped, the electronic device may identify whether there is the weather information application which is an application set so that its running screen is displayed through the second display 4321. Upon identifying that there is the weather information application, the electronic device may determine that the weather information application is the second application for displaying an execution screen through the second display 4321 and may display the execution screen of the weather information application through the second display 4321.

Figure 43J:
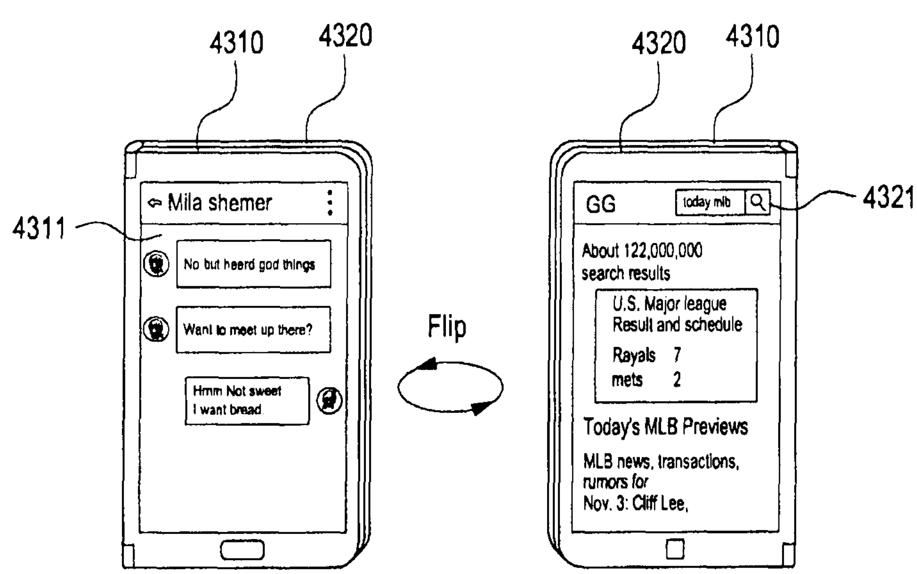

FIG. 43*j* illustrates an electronic device displaying a running application through the second display according to an embodiment of the present disclosure.

Referring to FIG. 43*j*(*a*), according to an embodiment of the present disclosure, the electronic device displays an execution screen of an instant messenger application through the first display 4311. The application running through the electronic device is assumed to be a web browser application.

Referring to FIG. 43*j*(*b*), when the electronic device is flipped by the user, the electronic device may sense whether the electronic device is flipped and may display an execution screen of the running web browser application through the second display 4321.

As the electronic device senses whether the electronic device is flipped, the electronic device may identify whether there is the running application. Upon identifying that the web browser application is running, the electronic device may determine that the web browser application is the second application for displaying an execution screen through the second display 4321 and may display the execution screen of the web browser application through the second display 4321.

Figure 43K:
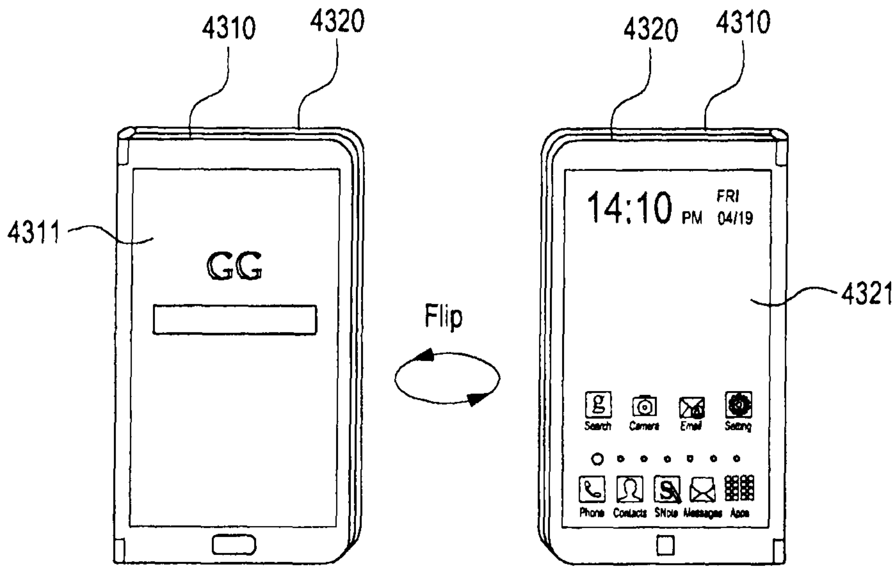

FIG. 43*k* illustrates an electronic device displaying a home screen through the second display according to an embodiment of the present disclosure.

Referring to FIG. 43*k*(*a*), according to an embodiment of the present disclosure, the electronic device displays an execution screen of a web browser application through the first display 4311.

When the electronic device is flipped by the user, the electronic device may sense whether the electronic device is flipped and may determine the second application for displaying an execution screen through the second display 4321.

However, when the electronic device fails to determine the second application for displaying an execution screen through the second display 4321, the electronic device may display a preset screen.

The preset screen may be a home screen, lock screen, or standby screen, as shown in FIG. 14(*b*).

Figure 43L:
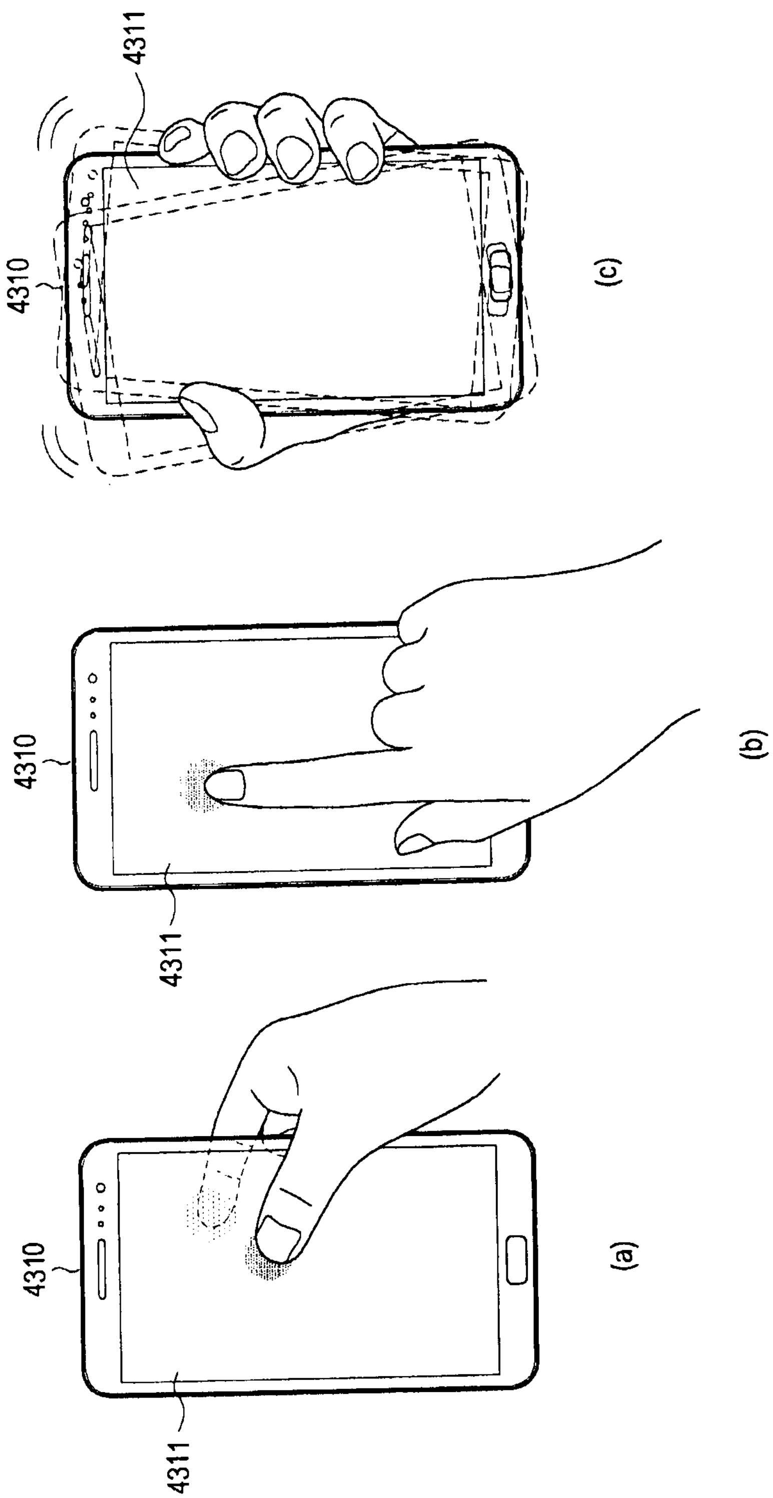

FIG. 43*l* illustrates a type of input for displaying information about an application received from the user according to an embodiment of the present disclosure.

According to an embodiment of the present disclosure, when the angle between the first body and the second body is a preset threshold angle or less, and a preset input is received from the user through the input interface, the electronic device is determined to be flipped, and thus, information associated with information obtained through the electronic device, the first application, or a first content running through the first application may be displayed on the second display.

Referring to FIG. 43*l*(*a*), the preset input may be a touch input touching both the first display 4311 and the second display 4310. Further, referring to FIG. 43*l*(*b*), the preset input may be a touch input touching the first display 4311 alone. Further, referring to FIG. 43*l*(*c*), the preset input may be an input for a motion of the electronic device, e.g., an input of shaking the electronic device.

Although not shown, various inputs made possible through the input means of the electronic device depending on, e.g., the user's settings may be used as the preset input.

Figure 43M:
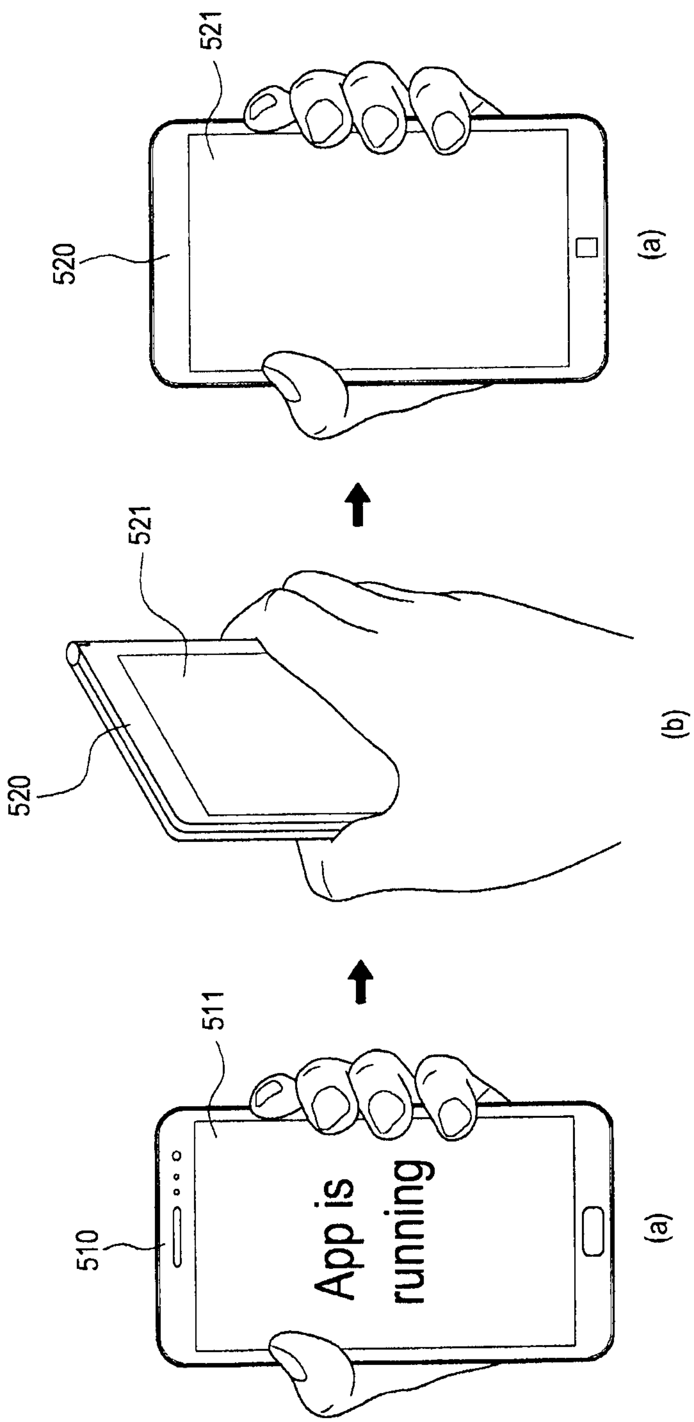

FIG. 43*m* is a view illustrating a process in which a display included in an electronic device changes according to an embodiment of the present disclosure.

A process in which the electronic device 101 is flipped by the user is described in connection with FIG. 43*m*. As shown in FIG. 43*m*(*a*), the user may view the screen of the first application displayed through the first display 4311 with the electronic device 101 in his hand.

When the user desires to check the screen displayed through the second display 4321 while viewing the first application displayed through the first display 4311, the user may rotate, but not fully flipping, the electronic device 101 as shown in FIG. 43*m*(*b*). In this case, the electronic device 101 may sense the change in the direction of the electronic device 101 depending on the direction information about the electronic device 101 obtained through a sensor. Upon sensing the change in the direction of the electronic device 101, the electronic device 101 may determine a third direction in which the first display 4311 faces as shown in FIG. 43*m*(*b*), which has been changed from a first direction in which the first display 4311 uses to face as shown in FIG. 43*m*(*a*) due to the direction change in the electronic device 101. Further, the electronic device 101 may determine the angle between the first direction and the third direction and may determine, depending on the determined angle, whether the electronic device 101 has fully been flipped or not fully flipped but slightly rotated.

For example, when the determined angle is a first threshold value or more and less than a second threshold value, the electronic device 101 may determine that the electronic device 101 has been rotated but not fully flipped, and when the determined angle is the second threshold value or more, the electronic device 101 may determine that the electronic device 101 has fully be flipped as shown in FIG. 43*m*(*c*).

The first threshold value may be set based on an angle at which the user may view the second display. Further, the second threshold may be set based on an angle for determining whether the electronic device 101 is flipped.

Upon determining that the electronic device 101 has been rotated but not fully flipped, the electronic device 101 may simultaneously display information associated with a first content running through a first application, the first application, or an image displayed through the second display 4321 on the second display 4321.

When the electronic device 101 is determined to have fully been flipped, the electronic device 101 may display information associated with the first content or the first application on the second display.

According to an embodiment of the present disclosure, the electronic device 101 may determine the type in which the user grasps the electronic device 101 through a sensor and may determine whether the electronic device 101 has moved depending on the determined type of grasp. Further, the electronic device 101 may also determine whether the electronic device 101 has fully been flipped depending on the determined type of grasp.

For example, the electronic device 101 may detect, through the sensor, one contacted or approached by the user's hand of the first display 4311 and the second display 4321. Further, the electronic device 101 may identify the area contacted or approached by the user's hand in the detected display.

When the display contacted or approached by the user's hand changes or the identified area contacted or approached by the user's hand changes, the electronic device 101 may determine that the electronic device 101 has moved and may determine whether the electronic device 101 has been flipped based on the changed display contacted or approached by the user's hand or the changed area contacted or approached by the user's hand.

FIGS. 43*n* to 43*q* illustrate screens respectively displayed on a plurality of displays when the electronic device is flipped according to an embodiment of the present disclosure.

Figure 43N:
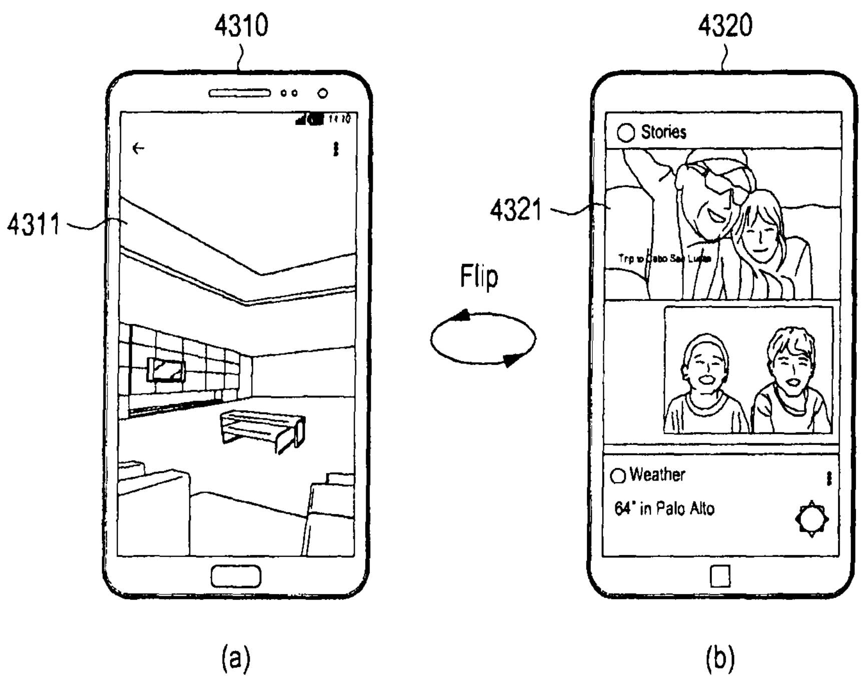

Referring to FIG. 43*n*, according to an embodiment of the present disclosure, the electronic device 101 may display an image content through an image viewer application through the first display 4311 as shown in FIG. 43*n*(*a*). In this case, when the electronic device 101 is determined to have been flipped, the electronic device 101 may display information associated with the image content through the second display 4321.

For example, other image contents associated with the image content, image contents displayed as a result of doing a search through the image content, and a webpage corresponding to the image content may be displayed through the second display 4321.

Figure 43O:
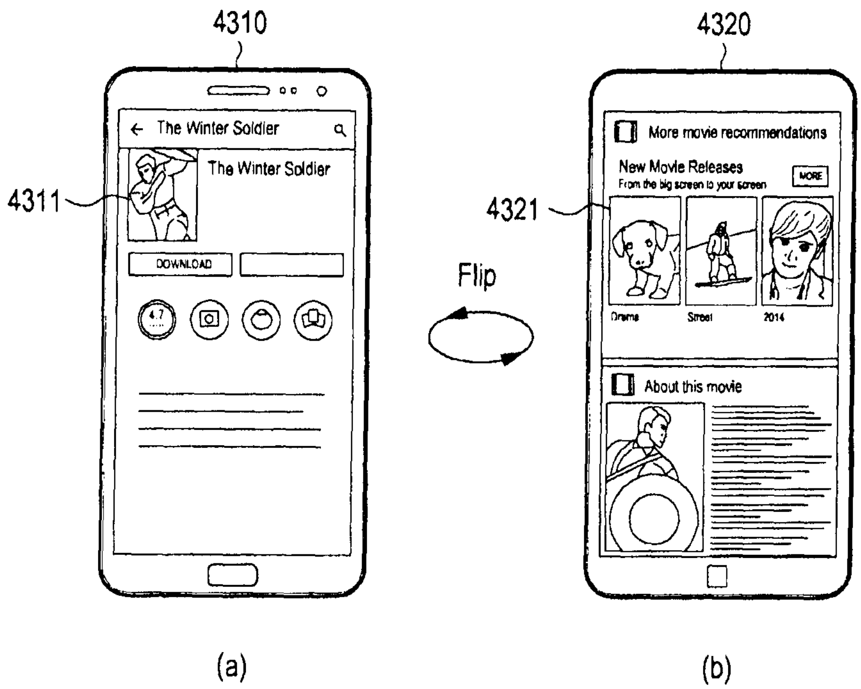

Referring to FIG. 43*o*, according to an embodiment of the present disclosure, the electronic device 101 may display a screen for downloading a first video through an application for downloading video. In this case, when the electronic device 101 is determined to have been flipped, the electronic device 101 may display information associated with the first video through the second display 4321.

For example, recommendation information about other videos associated with the first video, information about a review for the first video, or information about the story or casts of the first video may be displayed through the second display 4321.

Figure 43P:
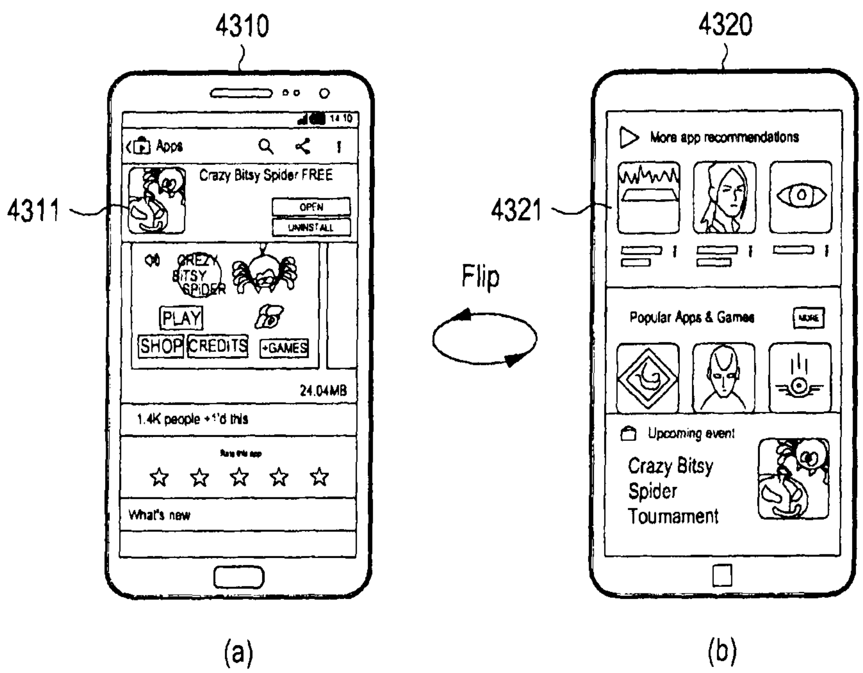

Referring to FIG. 43*p*, according to an embodiment of the present disclosure, the electronic device 101 may display a screen for downloading the first application through an application downloading application. In this case, when the electronic device 101 is determined to have been flipped, the electronic device 101 may display information associated with the first application through the second display 4321.

For example, recommendation information about other applications associated with the first application, information about a review for the first application, or information about an execution screen of the first application may be displayed through the second display 4321.

Figure 43Q:
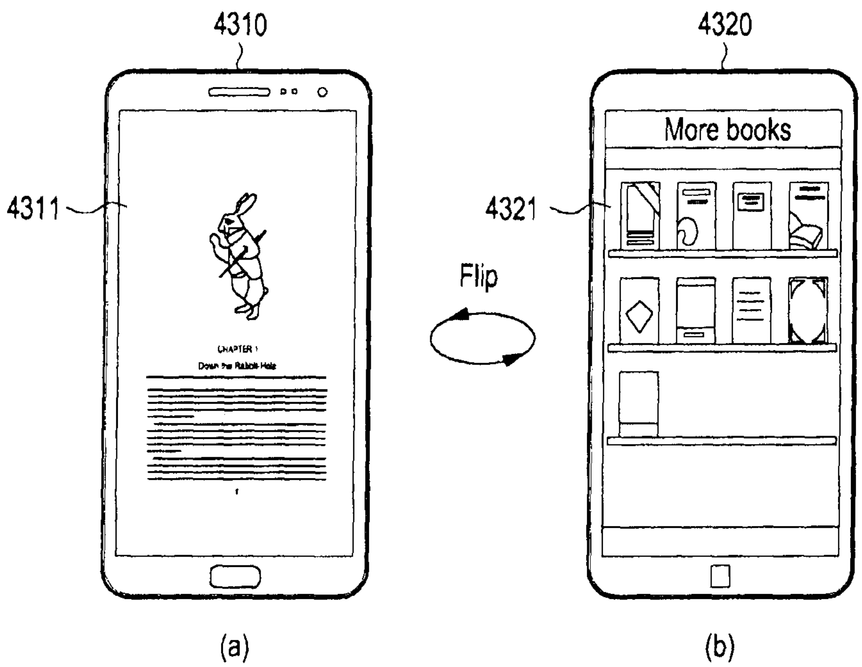

Referring to FIG. 43*q*, according to an embodiment of the present disclosure, the electronic device 101 may display an e-book content running through an e-book application. In this case, when the electronic device 101 is determined to have been flipped, the electronic device 101 may display information associated with the e-book content through the second display 4321.

For example, recommendation information about other e-book contents associated with the e-book content, information about a review for the e-book content, and information about a website for purchasing e-book contents may be displayed through the second display 4321.

The above-described information displayed through the second display 4321 is one provided for description purposes alone and is not limited thereto. Various information associated with the first content running through the first application or the first application may be displayed through the second display 4321 as the electronic device 101 is flipped.

Figure 44:
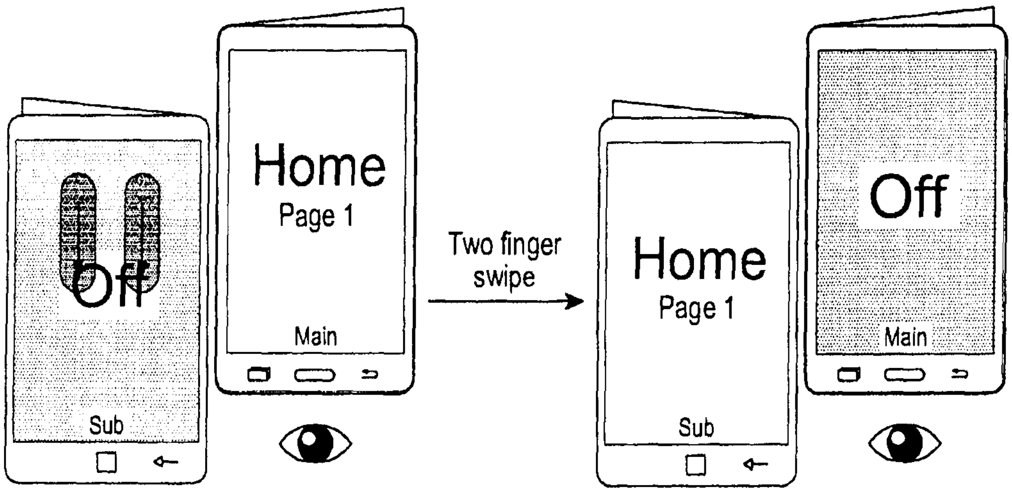
Figure 45:
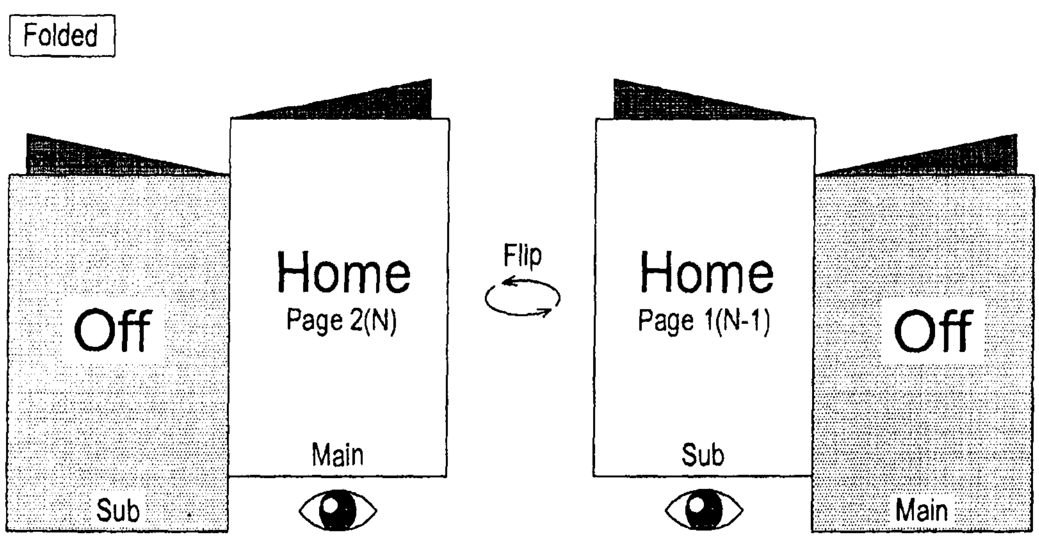

According to an embodiment of the present disclosure, the electronic device may switch the active display in response to a flip interaction. For example, when the main display is the active display, the electronic device, upon detecting a flip interaction, may determine that the sub display is the active display and may control the sub display, which used to be in the off state, in the on state. Further, the electronic device may control the main display, which used to be in the on state, in the off state. When no application runs, the electronic device displays the same home screen as active screen on the active display. According to an embodiment of the present disclosure, the electronic device may change the active display in response to a two-finger swipe as shown in FIG. 44, as well as a flip interaction. According to an embodiment of the present disclosure, the electronic device may set different home screens as ones respectively displayed on the plurality of displays as shown in FIG. 45. For example, the electronic device may display a second page of the home screen on the main display, and upon detecting a flip interaction, the electronic device may display a first page of the home screen on the sub display. In other words, the electronic device may make a setting so that the home screens respectively displayed on the main display and the sub display are ones for different pages.

Figure 46:
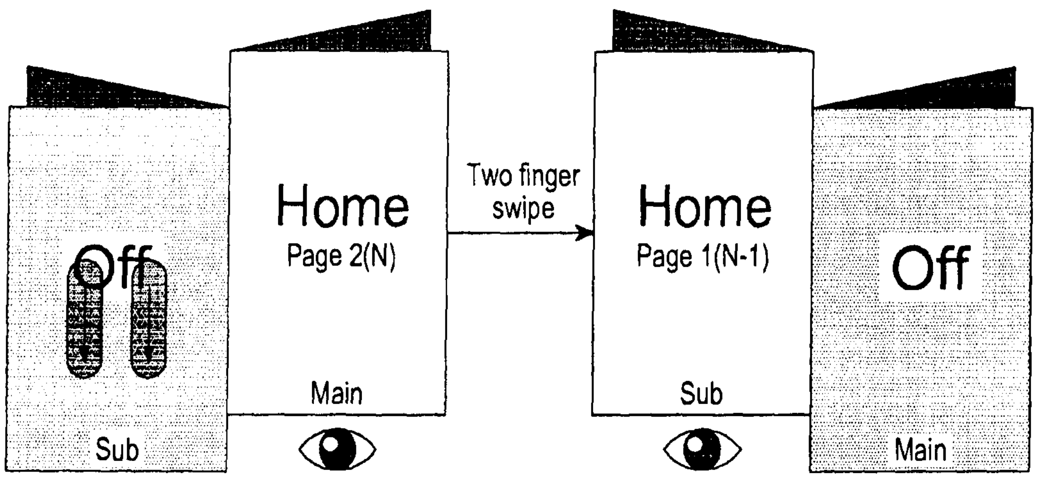

According to an embodiment of the present disclosure, the electronic device may change the active display in response to a two-finger swipe as shown in FIG. 46, as well as a flip interaction.

Figure 47:
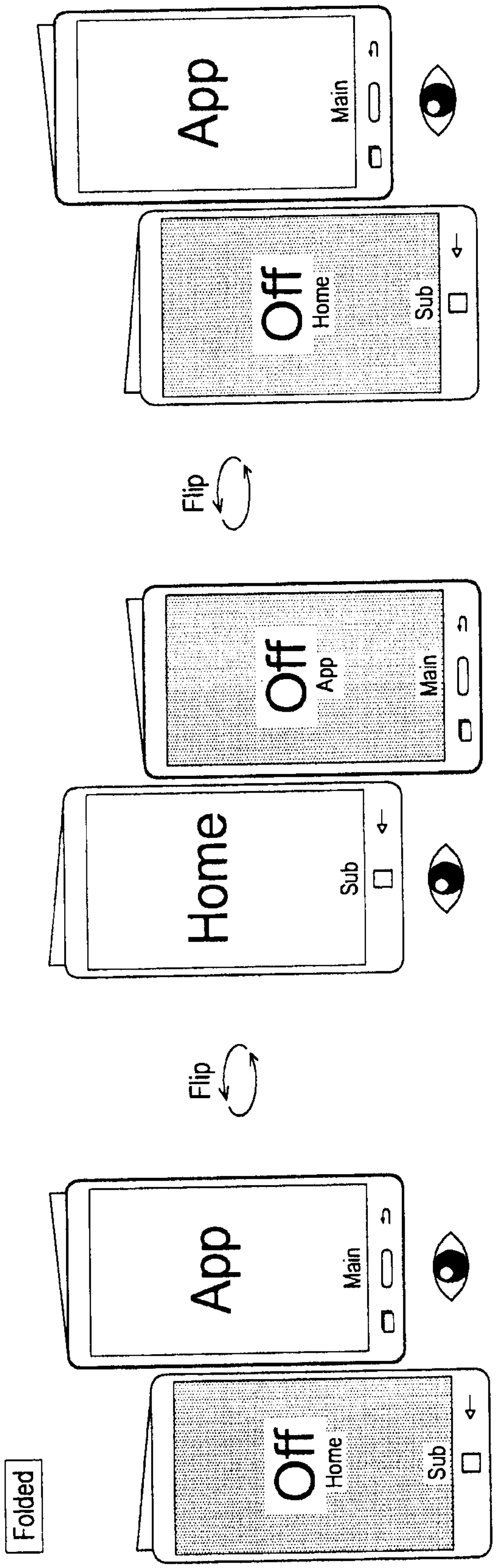

When an application is being displayed on either or both of the displays, the electronic device may display an application running screen or home screen. FIG. 47 is a view illustrating a method for switching screens by a flip interaction when an application is being displayed on one display alone, according to an embodiment of the present disclosure For example, upon detecting a flip interaction while displaying an application running screen on the main display, the electronic device may change the active display into the sub display. The electronic device may display the home screen, rather than the application running screen, on the sub display which is the active display. Upon detecting a flip interaction, the electronic device may switch the active display between the sub display to the main display and may display the application running screen on the main display.

2.5.6. Description of Form Type Change

Figure 48:
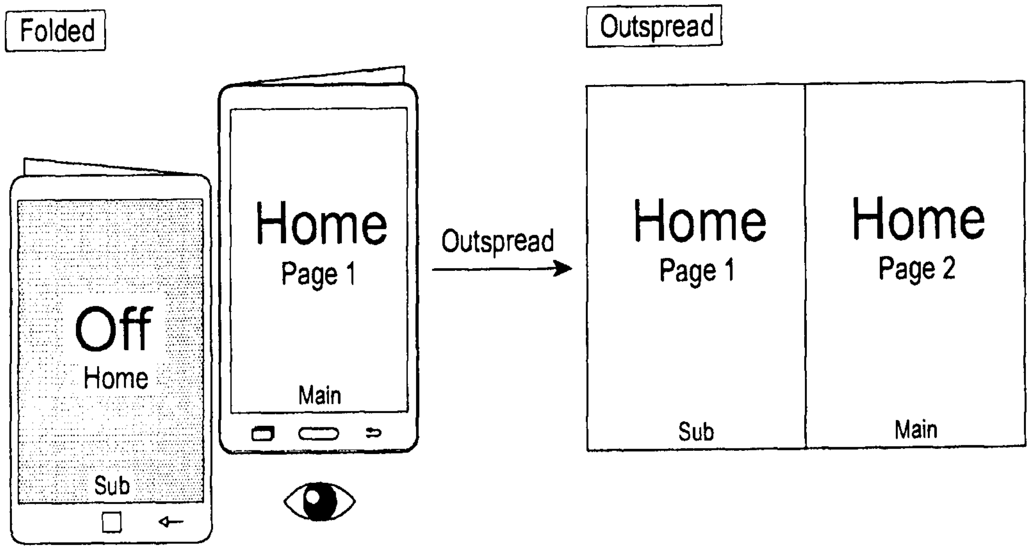

According to an embodiment of the present disclosure, the form type may change from the folded mode to the outspread mode while both the displays are displaying their home screen, as shown in FIG. 48. The electronic device, upon detecting the form type change, may expand and display the home screen. Specifically, the electronic device may display the first page of the home screen on the main display in the folded mode. Thereafter, upon detecting a change from the folded mode to the outspread mode, the electronic device may display the first page of the home screen on the sub display. Further, the electronic device may display the second page of the home screen on the main display.

Figure 49:
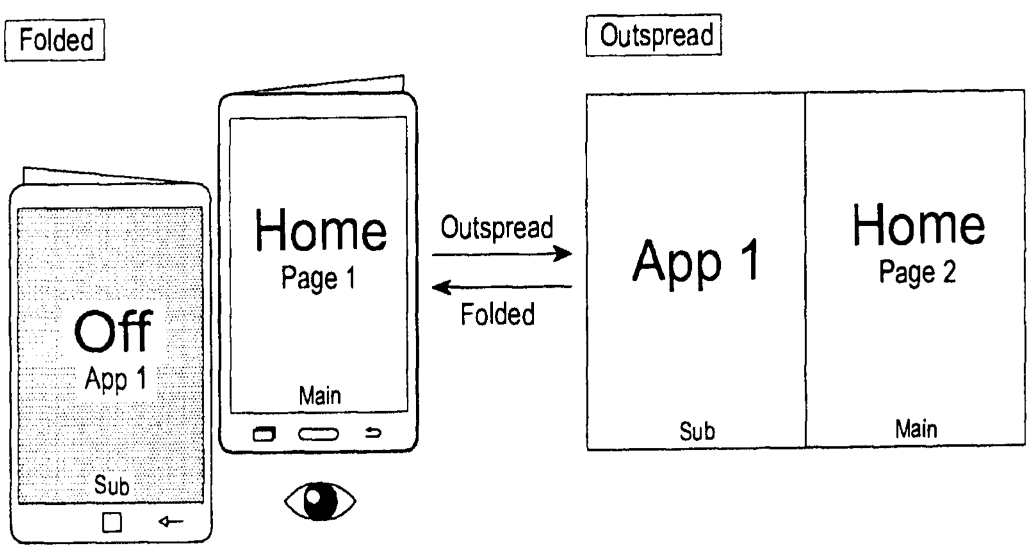

According to an embodiment of the present disclosure, the electronic device may detect a form type change (e.g., a change from the folded mode to the outspread mode) while displaying the home screen on the main display as shown in FIG. 49. Upon detecting the form type change, the electronic device may control the sub display, which used to be in the off state, in the on state and may display an application running screen on the sub display. Here, the application displayed on the sub display may be an application that was run and displayed on the sub display before.

Figure 50:
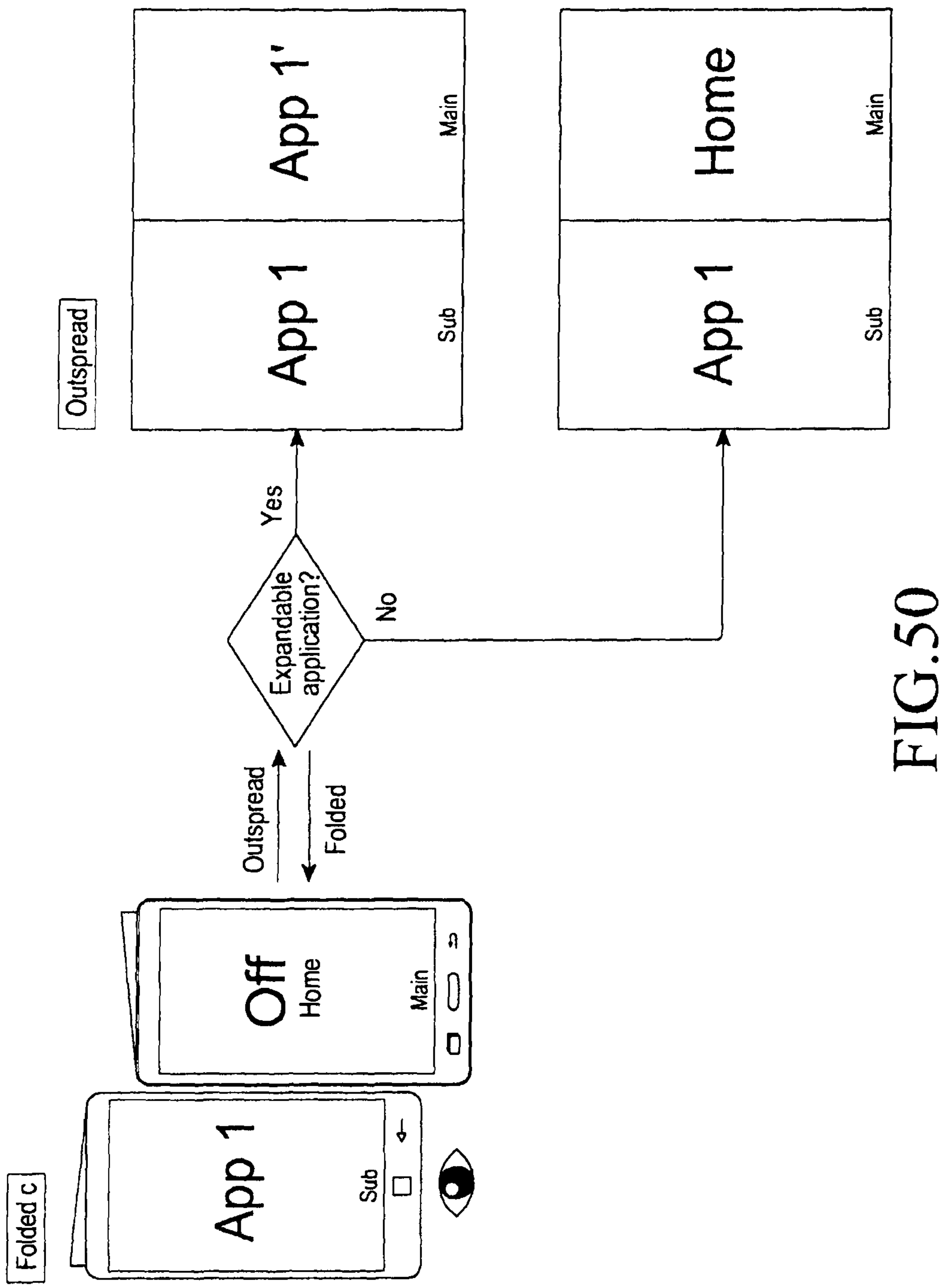

According to an embodiment of the present disclosure, the electronic device may display an application running screen on the sub display in the folded mode, as shown in FIG. 50. The electronic device may detect a change in form type between the folded mode to the outspread mode. The electronic device may determine whether the application displayed on the sub display is an expandable application or not. Here, the expandable application may mean an application that may be displayed on all of the two displays. Some applications might not be expanded. When the application displayed on the sub display is an expandable application, the electronic device may display the execution screen of the application on both the displays in response to the form type change. Unless the application displayed on the sub display is an expandable application, the electronic device may display the home screen on the main display in response to the form type change and may keep displaying the execution screen of the application on the sub display.

Figure 51:
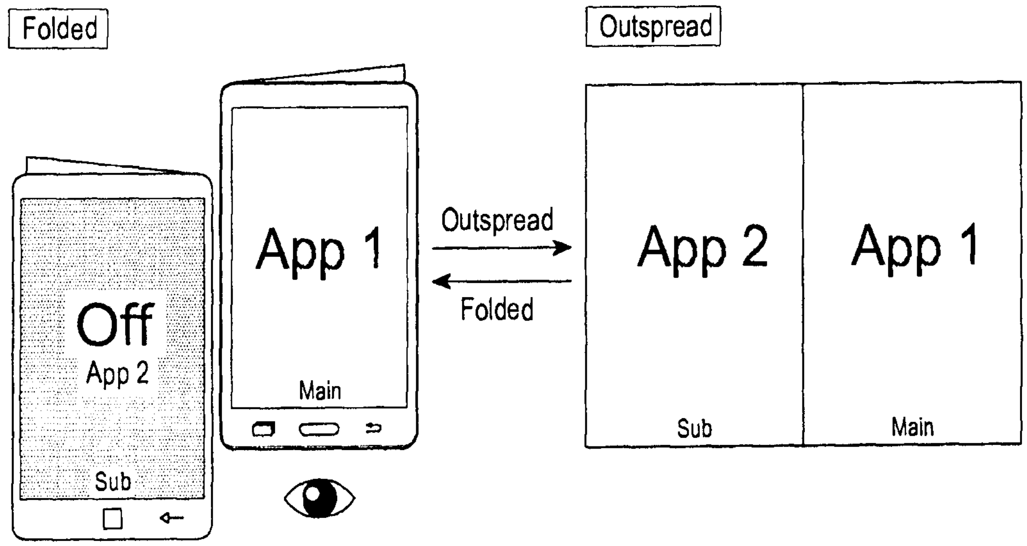

According to an embodiment of the present disclosure, the electronic device may control the sub display in the off state in the folded mode as shown in FIG. 51. Meanwhile, the electronic device may assign the display of the second application (App2) to the sub display. In other words, the electronic device, although running the second application (App2), may abstain from displaying the display screen of the second application (App2) depending on the sub display being in the off state. The electronic device may display the display screen of the first application (App1) on the main display. The electronic device may detect a change in form type between the folded mode to the outspread mode and may control the sub display in the on state in response to this. In this case, the electronic device may display the display screen of the second application (App2) assigned to be displayed on the sub display on the sub display.

2.5.7. Description of Call Function on Sub Display

Figure 52:
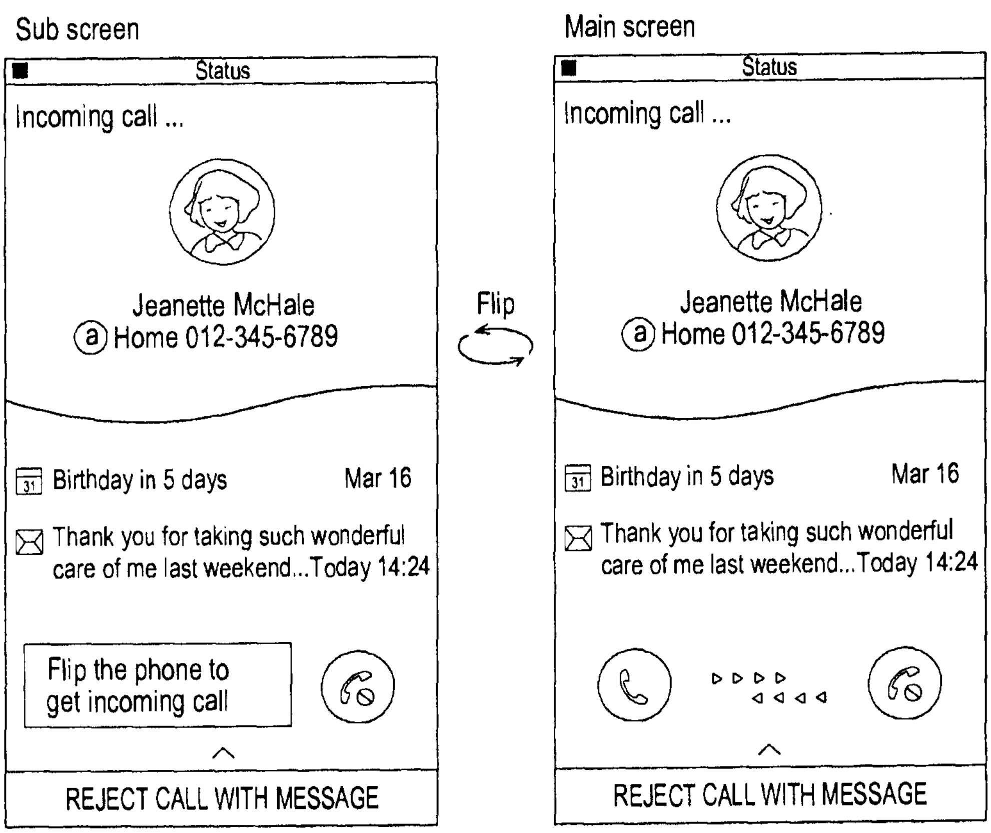

When the sub display is the active display in the folded mode, and a call-related function (e.g., an outgoing or incoming call) occurs, the electronic device, according to an embodiment of the present disclosure, may provide information indicating that the call be received through the body having the receiver (e.g., the body having the main display). As shown in FIG. 52, the electronic device may display information indicating that the main display be used, such as "Flip the phone to get incoming call," i.e., information indicating that the electronic device be flipped. Upon detecting a flip of the electronic device, the electronic device may set the main display as active display and display an execution screen of a call application on the main display.

Figure 53:
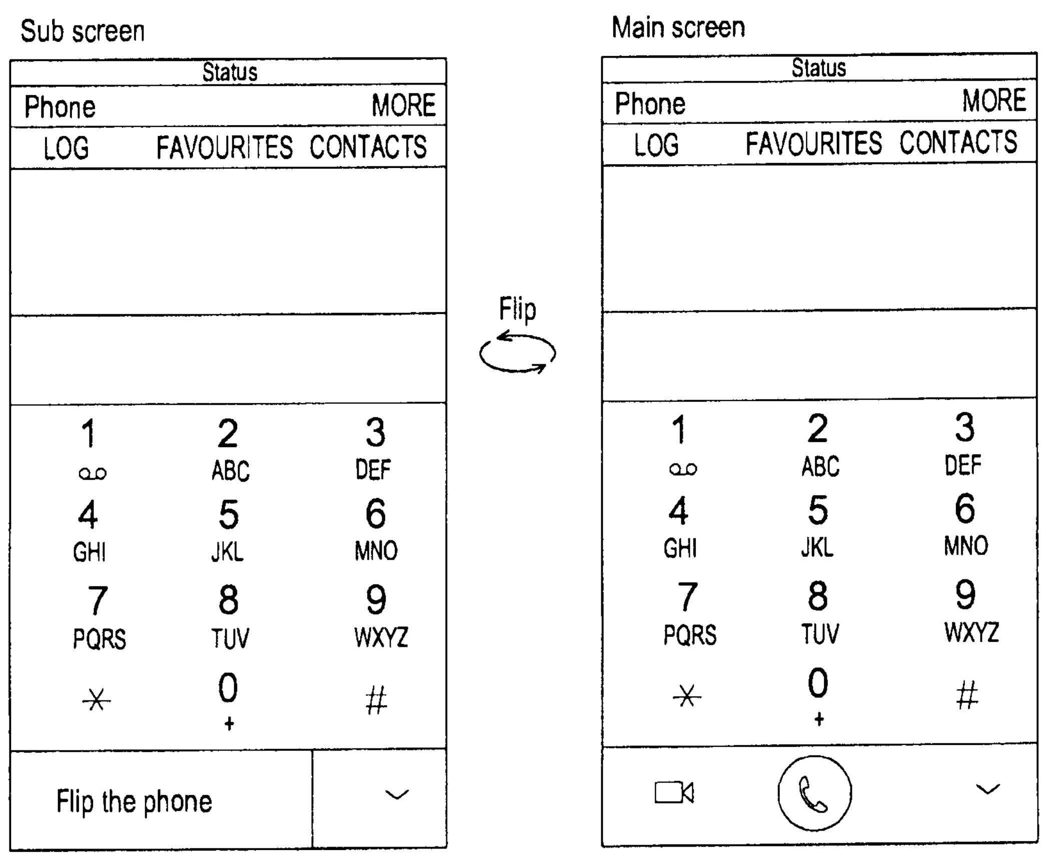

According to an embodiment of the present disclosure, as shown in FIG. 53, an outgoing call function may also be implemented on the sub display through a dialer, but in this case, information indicating that the main display be used, instead of a call button, may be provided. Upon detecting a flip of the electronic device, the electronic device may provide a call button.

Figure 54A:
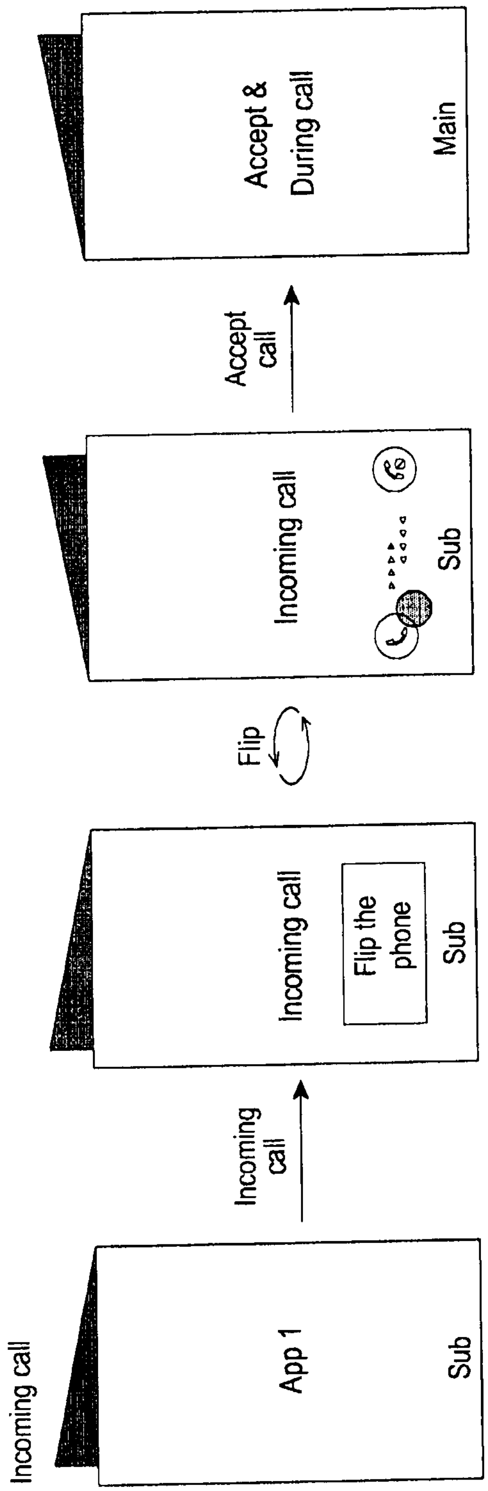

FIG. 54*a* is a view illustrating UI operations when an electronic device having a receiver in the body having the main display, but not in the body of the sub display receives a voice call/video call through the sub display. In this case, it is assumed that the form type of the electronic device is the folded mode, and the sub display is the active display. As shown in FIG. 54, when there is an incoming call, the electronic device may indicate the occurrence of the incoming call using the sub display or other means. Further, the electronic device requests a flip interaction for receiving the call. When the user flips the electronic device, the electronic device may detect the flip and display a call reception button on the main display in response to this. When the user designates a call reception button, the electronic device may receive the call. According to an embodiment of the present disclosure, upon detecting the flip of the electronic device, the electronic device may be rendered to automatically receive the call in response to this.

Figure 54B:
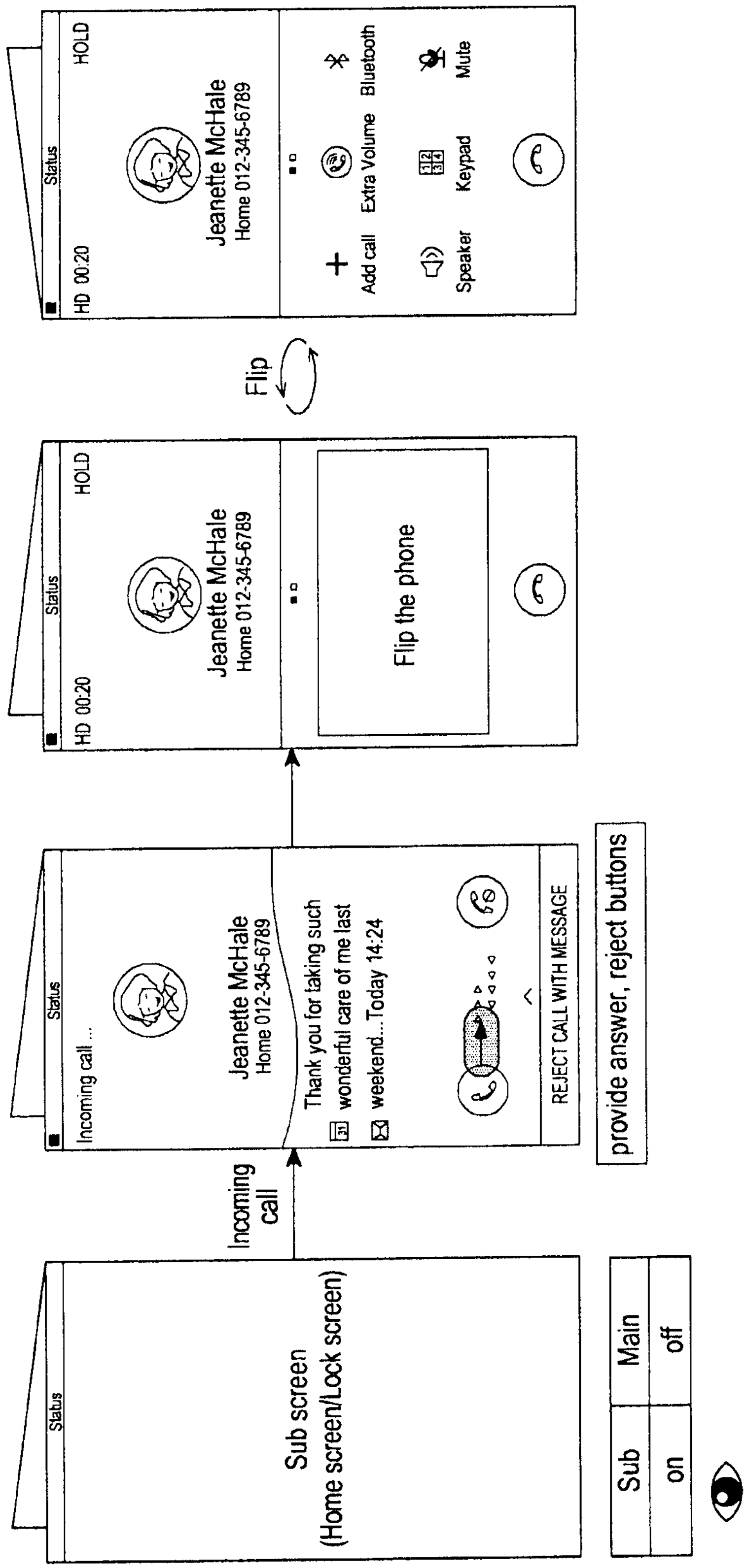

FIG. 54*b* is a view illustrating a screen displayed on the electronic device in the folded mode according to an embodiment of the present disclosure. In the embodiment shown in FIG. 54*b*, the sub display is assumed to initially be the active display. Thus, the electronic device may control the sub display in the on state and the main display, which is the inactive display, in the off state. Initially, the electronic device may display a home screen or lock screen on the sub display. Or, the electronic device may display an application running screen on the sub display. In this case, the electronic device may receive a signal indicating an incoming call from an external electronic device. The electronic device may display information (e.g., the caller's name or phone number) about the caller on the sub display and display a user interface (UI) for receiving the call. In the present embodiment, the UI for receiving the call may be set to receive the call in response to a drag gesture from a left-hand icon to a right-hand icon and reject the call in response to a drag gesture from the right-hand icon to the left-hand icon. The electronic device is assumed to detect a drag gesture from the left-hand icon to the right-hand icon through the UI to receive the call. As set forth above, according to an embodiment of the present disclosure, the electronic device may include a receiver in the body having the main display, but not in the body having the sub display. Thus, calling is impossible through the sub display-side body. Therefore, the electronic device may display a message indicating that the phone be flipped on the sub display. Upon detecting a flip of the electronic device, the electronic device may display a screen for calling on the main display and receive the call. The electronic device may process a user voice received through the receiver included in the body of the main display and send the processed user voice to an external electronic device, thereby performing a call function.

Figure 54C:
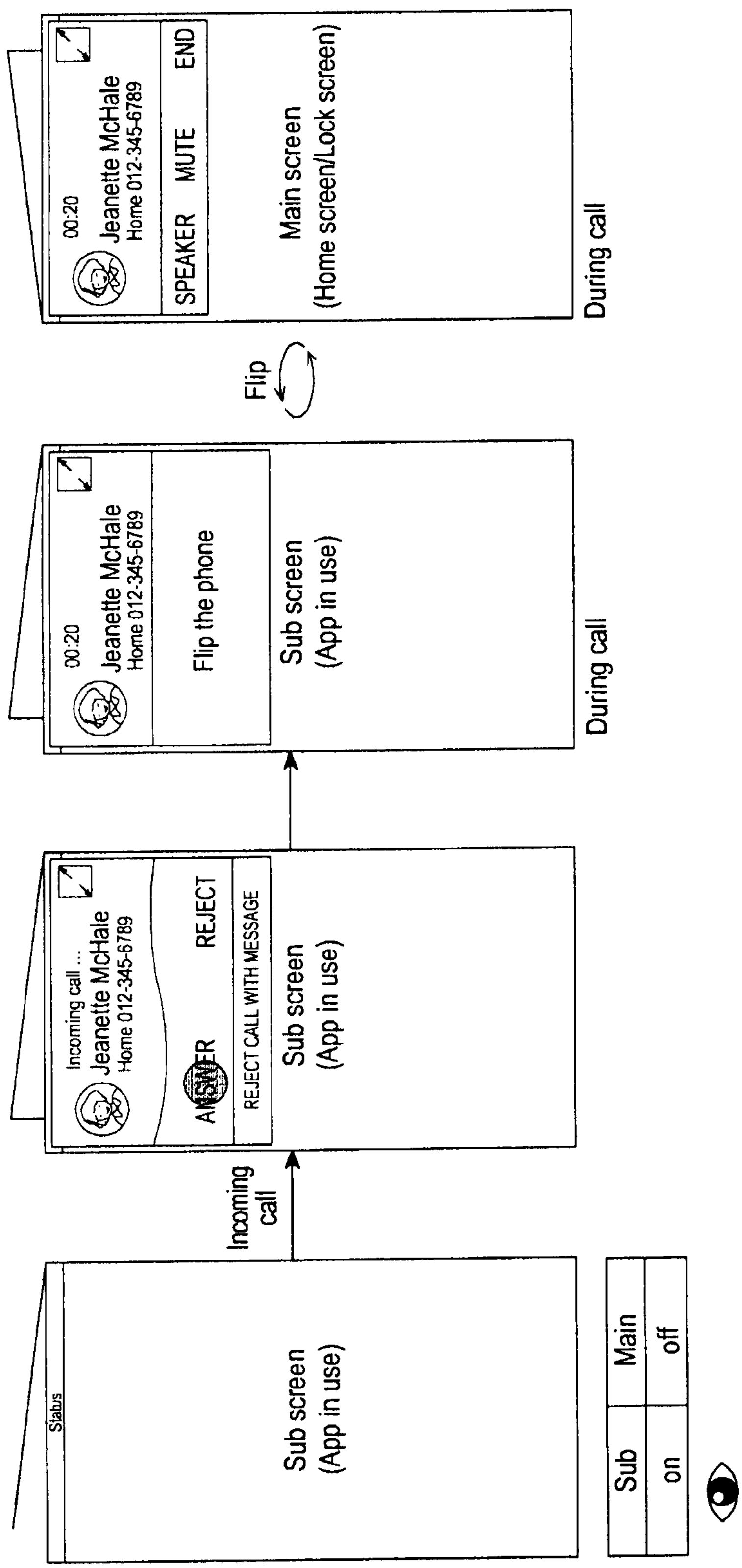

FIG. 54*c* is a view illustrating a screen displayed on the electronic device in the folded mode according to an embodiment of the present disclosure. In the embodiment shown in FIG. 54*c*, the sub display is assumed to initially be the active display. Thus, the electronic device may control the sub display in the on state and the main display, which is the inactive display, in the off state. Initially, the electronic device may display an application running screen on the sub display. In this case, the electronic device may receive a signal indicating an incoming call from an external electronic device. The electronic device may display information (e.g., the caller's name or phone number) about the caller on the sub display and display a user interface (UI) for receiving the call. In the instant embodiment, the UI for receiving the call may be set to select to answer or reject the call. The electronic device may display the UI for receiving the call to cover the application running screen. Upon detecting the selection of "answer," the electronic device may display a message indicating that the phone be flipped on the sub display. Upon detecting a flip of the electronic device, the electronic device may display a screen for calling on the main display and receive the call. The electronic device may display the screen for call to cover the home screen or lock screen displayed on the main screen.

Figure 54D:
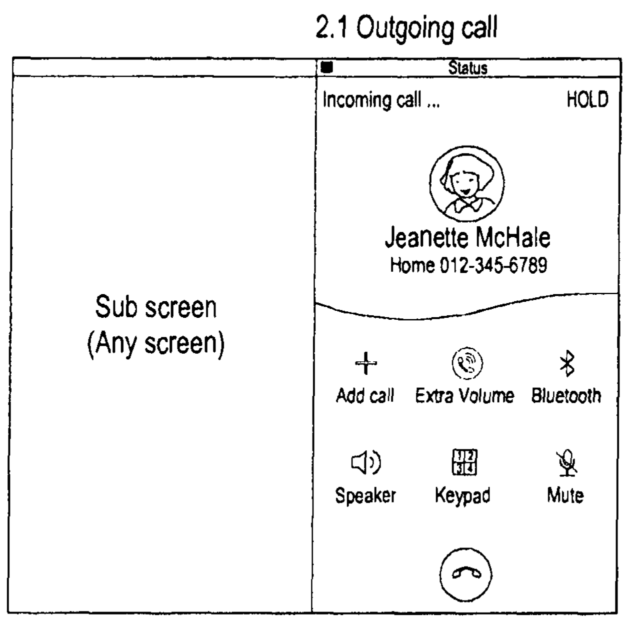

FIG. 54*d* illustrates a screen for sending a call in the portrait mode of the outspread modes according to an embodiment of the present disclosure. The electronic device may display an execution screen (sub screen) of an application displayed on the sub display on the sub display and a screen for sending a call on the main display. The screen for sending a call may include information about the recipient (e.g., the recipient's name and phone number) and function keys (e.g., add call, extra volume, bluetooth, speaker, keypad, mute, etc.) related to sending a call.

Figure 54E:
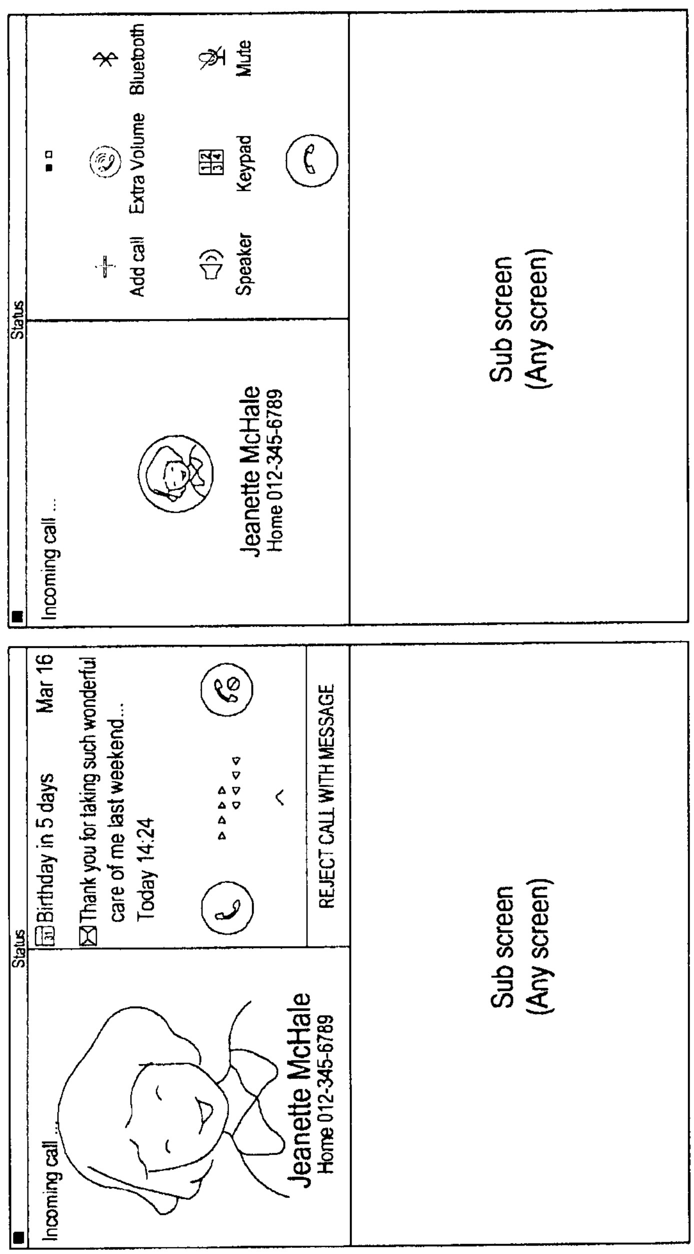

FIG. 54*e* illustrates a screen for receiving and sending a call in the landscape mode of the outspread modes according to an embodiment of the present disclosure As shown on the left-hand part of FIG. 54*e*, the electronic device may display a screen for receiving call on the main display. Specifically, the electronic device may display the caller's information on a portion of the main display and display a screen for receiving call on another portion of the main display. Referring to the right-hand part of FIG. 54*e*, the electronic device may display a screen for sending call on the main display. Specifically, the electronic device may display the recipient's information on a portion of the main display and display a screen for sending call on another portion of the main display. In both the cases, the electronic device may display a different screen independent from the call application on the sub display, which is not limited in type.

Figure 55A:
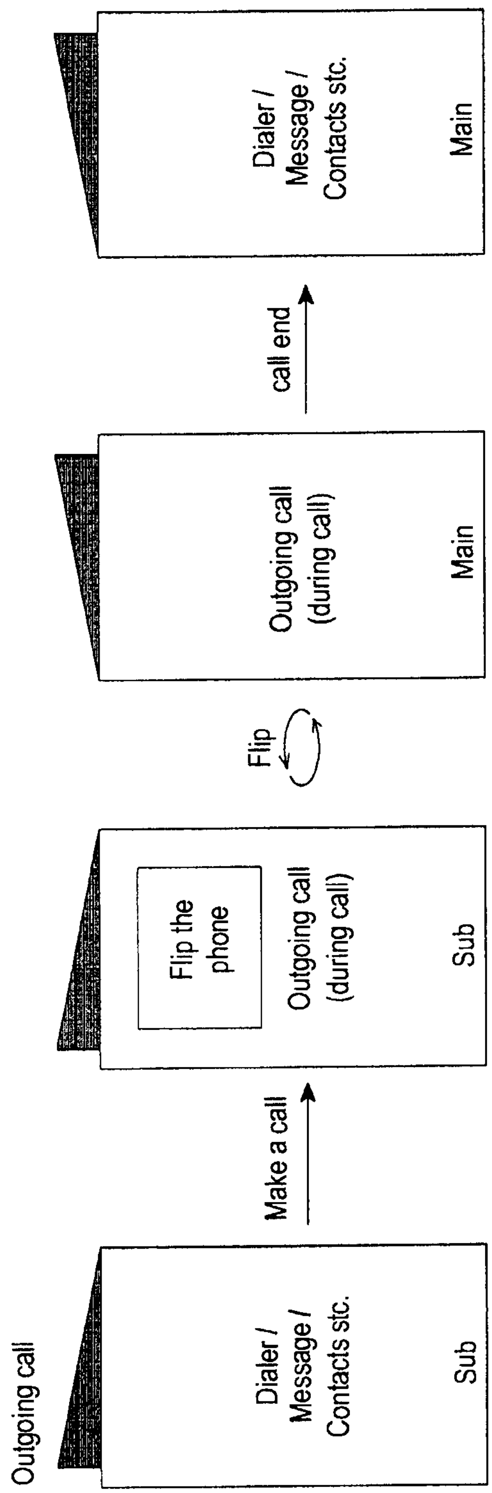

As shown in FIG. 55*a*, when there is an outgoing call, the electronic device, according to an embodiment of the present disclosure, may provide all UIs necessary for the call, such as a dialer/message/contact, on the sub display and may display a guide that the electronic device be flipped upon occurrence of a call.

Figure 55B:
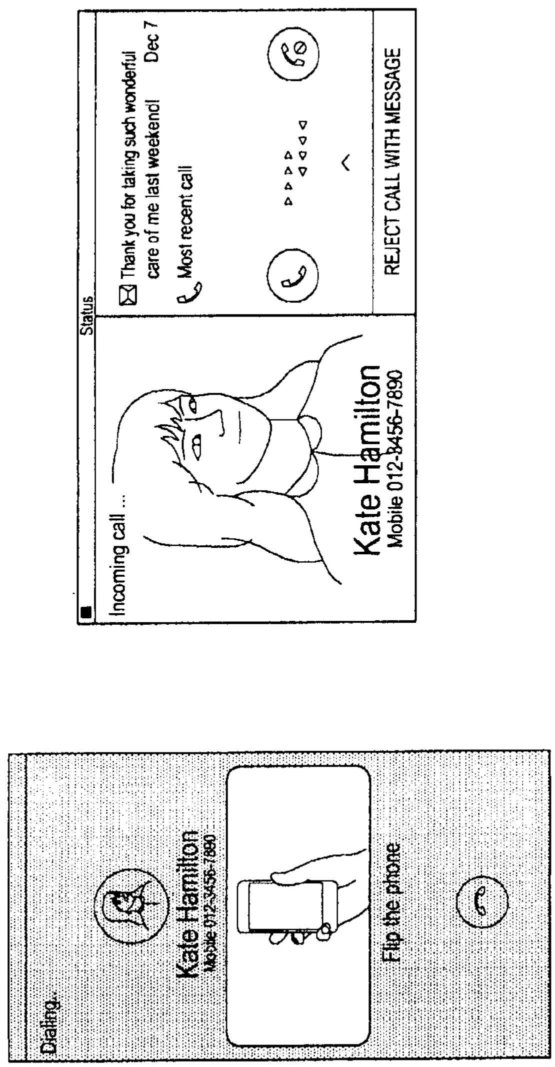

FIG. 55*b* illustrates an example implementation according to an embodiment of the present disclosure. As shown on the left-hand part of FIG. 55*b*, according to an embodiment of the present disclosure, when the sub display is the active display in the folded mode, the electronic device may output a message indicating that the phone be flipped on the sub display, allowing the user to flip the electronic device so that the user carries out calling through the body having the receiver. Further, as shown on the right-hand part of FIG. 55*b*, the electronic device may display the caller's information (e.g., his/her name or phone number) on the sub display in the outspread mode and may display a user interface for receiving call on the main display.

Figure 56:
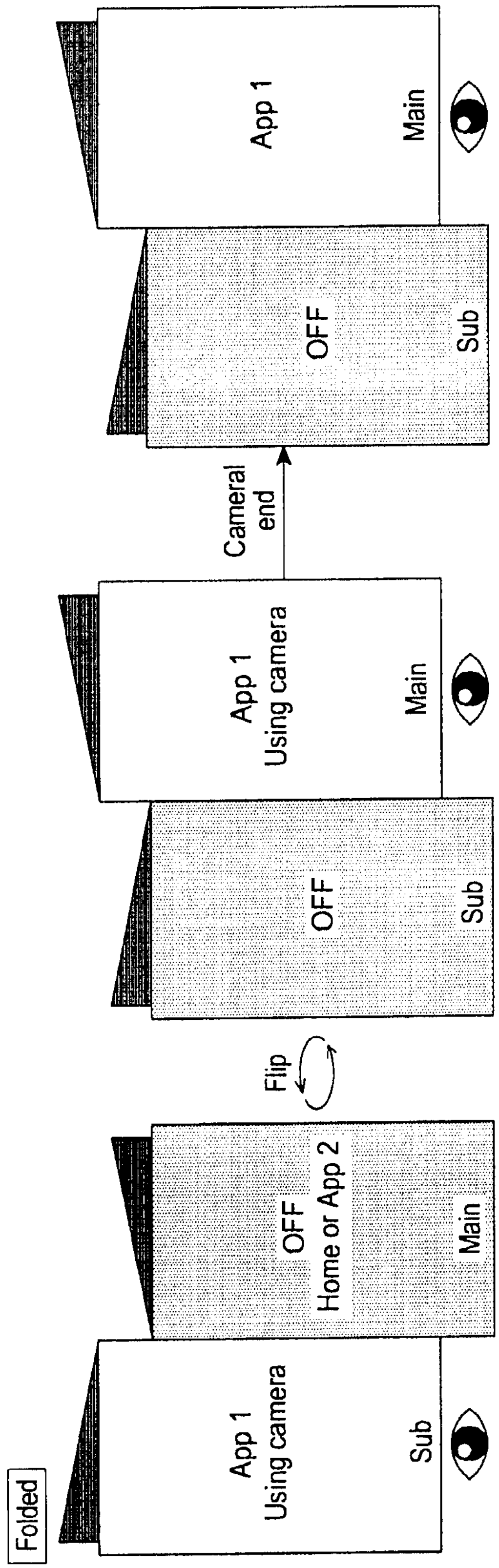

Referring to FIG. 56, when a camera application—the camera includes a native and a third party—runs, the electronic device, according to an embodiment of the present disclosure, may enable an execution screen of the camera application to move to the main display in response to the user's flip interaction. Here, the camera application may mean an application using a camera resource. In other words, the electronic device may display the execution screen of the camera application on the application screen or the home screen, which used to be displayed on the main display. In this case, when the application being displayed on the main display is a call-related application, the electronic device may prevent the execution screen of the camera application from being displayed on the execution screen of the call-related application. When the camera application terminates, the electronic device may display the home screen or the last running screen that used to be displayed on the main display.

2.6 Description of Stand Mode 2.6.1. Overview of Stand Mode

Figure 57:
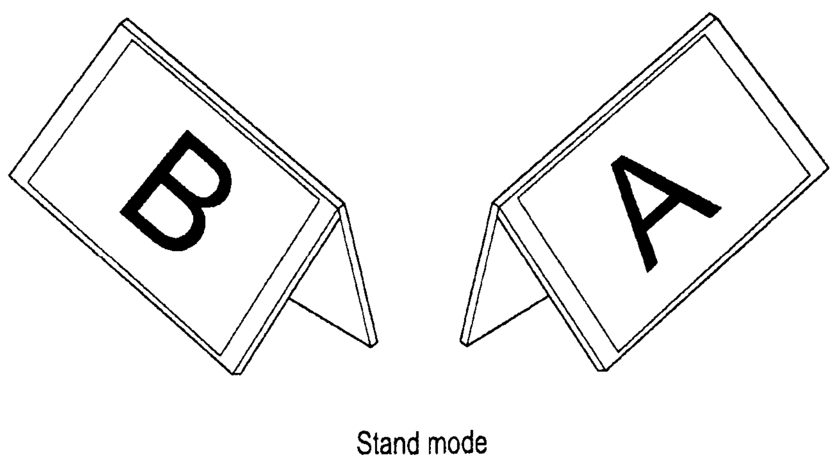
FIGS. 57 to 59 are concept views illustrating an electronic device in a stand mode according to an embodiment of the present disclosure.

According to an embodiment of the present disclosure, 'stand mode' may basically mean a mode in which the two displays each are used in a standing position using a hinge as shown in FIG. 57. Specifically, the angle between the two bodies respectively including the two displays may be left at an angle which is not 0 degrees by the hinge, and the respective side surfaces of the two bodies come in contact with the contact surface (e.g., the underneath surface, e.g., floor), preventing the displays from contacting the contact surface. In the stand mode, the electronic device may, as default, control the active display in the on state and the opposite display (i.e., the inactive display) in the off state. When a particular application, such as a video player or video conference, runs, the electronic device may control both the main display and the sub display in the on state or may change the on-state display based on the user's manipulation.

Such stand mode may also be set to be included in the form type of the folded mode in which the displays are folded outwards. In other words, upon detecting, by a sensor, the electronic device being left in the standing position as shown in FIG. 57, while remaining in a particular angle range which is less than an angle range in which the form type is recognized as the folded mode, the electronic device may determine that the form type is the stand mode and operate a UX or UI corresponding to the stand mode.

2.6.2. Description of Splash

Figure 58:
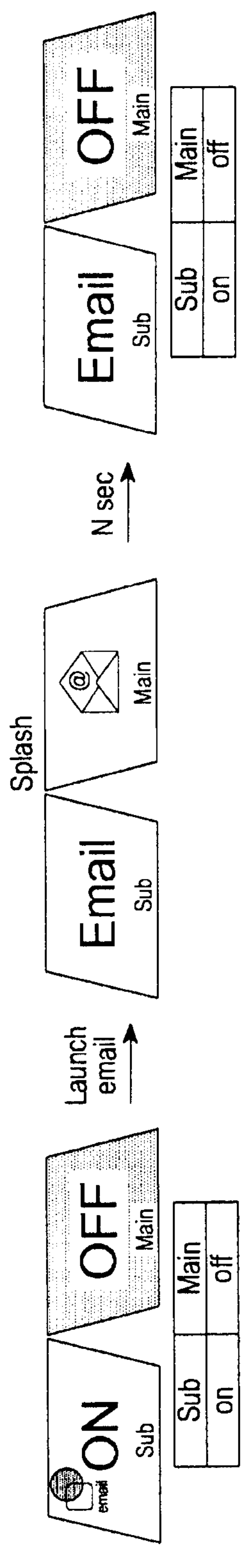

According to an embodiment of the present disclosure, when an application runs in the stand mode, the electronic device may assign the display of an application to run to the main display. In this case, the electronic device may provide a splash associated with the application for N seconds on the opposite display, as shown in FIG. 58. The splash may be an image or video representing the running application. The electronic device may use a splash of another application. For example, upon running a game application, the electronic device may display a splash of an e-book application. When the electronic device overturns or its form type changes while the splash is displayed, the electronic device may stop displaying the splash immediately or after a preset time. The function of providing a splash may be turned on/off by the user's settings.

Figure 59:
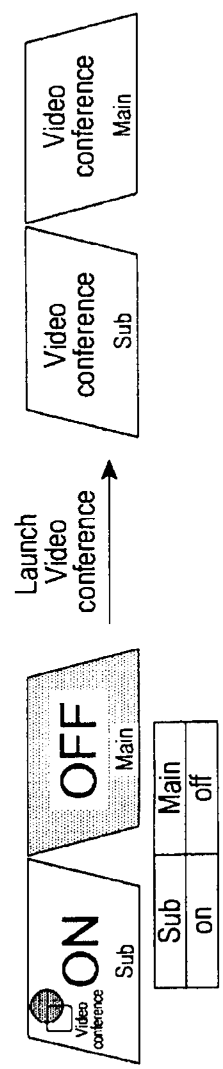

2.6.3. Description of On-State Control of Both Displays

Where a particular application, such as a video player or video conference, runs, the electronic device, according to an embodiment of the present disclosure, may control the main display and the sub display both in the on state as shown in FIG. 59.

2.7 Description of Table Mode 2.7.1. Overview of Table Mode

Figure 60:
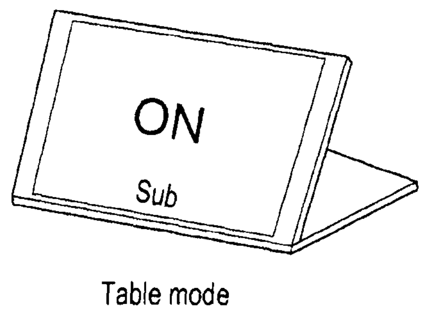
FIG. 60 is a concept view illustrating an electronic device in a table mode according to an embodiment of the present disclosure.

According to an embodiment of the present disclosure, 'table mode' may mean a form type in which the main display contacts its underneath surface or contact surface (e.g., a floor), and the sub display is in a position standing against the contact surface. For example, the angle between the main display and the sub display may be 0 degrees or higher, and the main display may support the overall electronic device while the sub display stands against the contact surface. Using sensor information obtained from, e.g., a proximity sensor or gyro sensor, included in the body having the main display, the electronic device may recognize that the form type is the table mode and perform operations corresponding to the table mode. In the table mode, the electronic device may control the sub display alone in the on state and display an application running screen on the sub display as shown in FIG. 60. The electronic device may abstain from providing a splash on the main display upon running an application. Specifically, the electronic device may control the main display in the off state which may be based on the fact that the main display contacts the contact surface and is thus not viewable.

The table mode may be set to fall within the form type of the outward folded mode. In other words, upon detecting, by a sensor, the electronic device being left with the sub display being in the standing position and the main display being in contact with the contact surface, while remaining in a particular angle range which is less than an angle range in which the form type is recognized as the folded mode, the electronic device may determine that the form type is the stand mode and operate a UX or UI corresponding to the table mode.

2.8 Description of Outspread Mode 2.8.1. Overview of Outspread Mode

Figure 61:
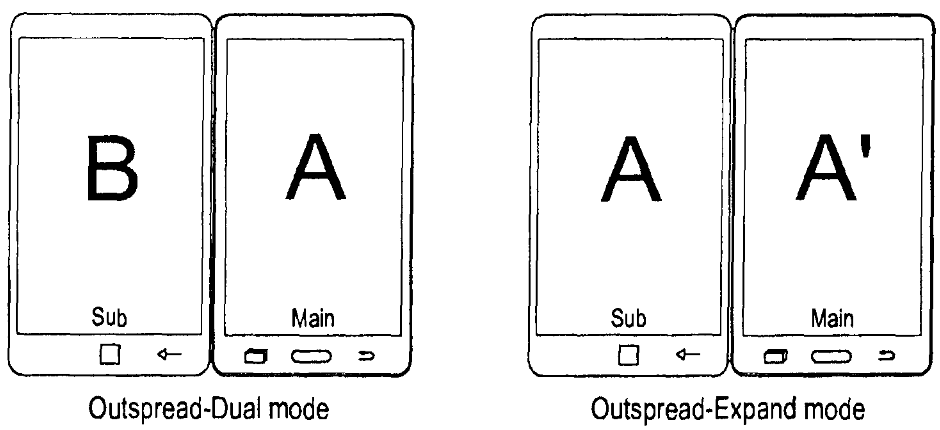
FIGS. 61 to 106 are concept views illustrating an electronic device in an outspread mode according to an embodiment of the present disclosure.

According to an embodiment of the present disclosure, 'outspread mode' may mean a state in which the sub display remains open, and the electronic device may control both the displays in the on state. According to an embodiment of the present disclosure, the electronic device may set the outspread mode to a state in which the two displays are opened at 150 degrees to 210 degrees by rotation on the hinge. The outspread mode may come into a dual mode and an expand mode depending on contents and their configuration. The dual mode may mean a mode in which two different application running screens are displayed on the two displays, respectively, as shown in FIG. 61. The electronic device may run the two different applications. For example, the electronic device may assign the display of application A to the main display and the display of application B to the sub display. Thus, an execution screen of application A may be displayed on the main display, and an execution screen of application B may be displayed on the sub display. The expand mode may mean a mode in which one application running screen is displayed on both the displays as shown in FIG. 61. Specifically, the electronic device may run application A and display its running screen on the main display and the sub display both. In this case, the electronic device may display a portion of the overall application running screen on the sub display and another portion on the main display. For example, the portion of the application running screen displayed on the sub display may be continuous to the portion of the application running screen displayed on the main display. Or, the portion of the application running screen displayed on the sub display may be discrete from the portion of the application running screen displayed on the main display.

2.8.2. Description of Form Type Change

Figure 62:
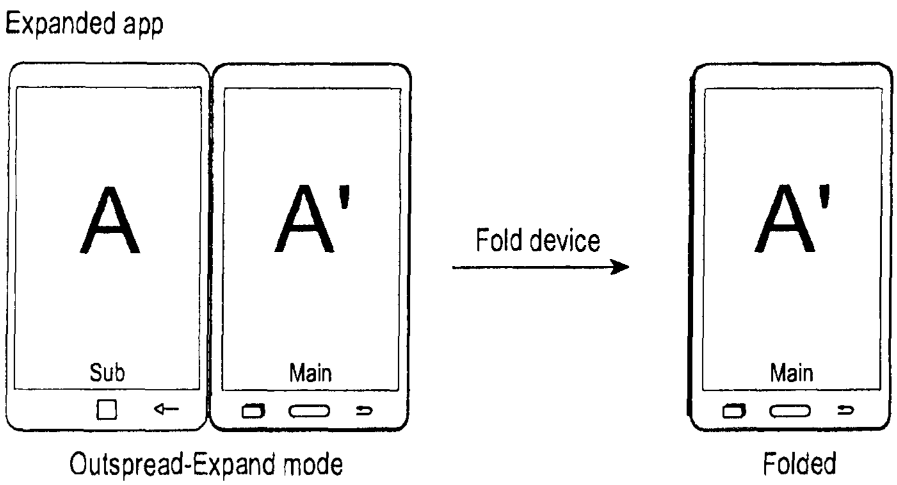

When the form type changes from the outspread mode to the folded mode, the electronic device, according to an embodiment of the present disclosure, may keep the active display in the on state and may control the opposite display, i.e., the inactive display, in the off state. For an application capable of supporting the expand mode, the electronic device may display a shrunken running screen of the application on the active display while keeping the active display in the on state as shown in FIG. 62.

2.8.3. Description of Running on Other Display

Figure 63:
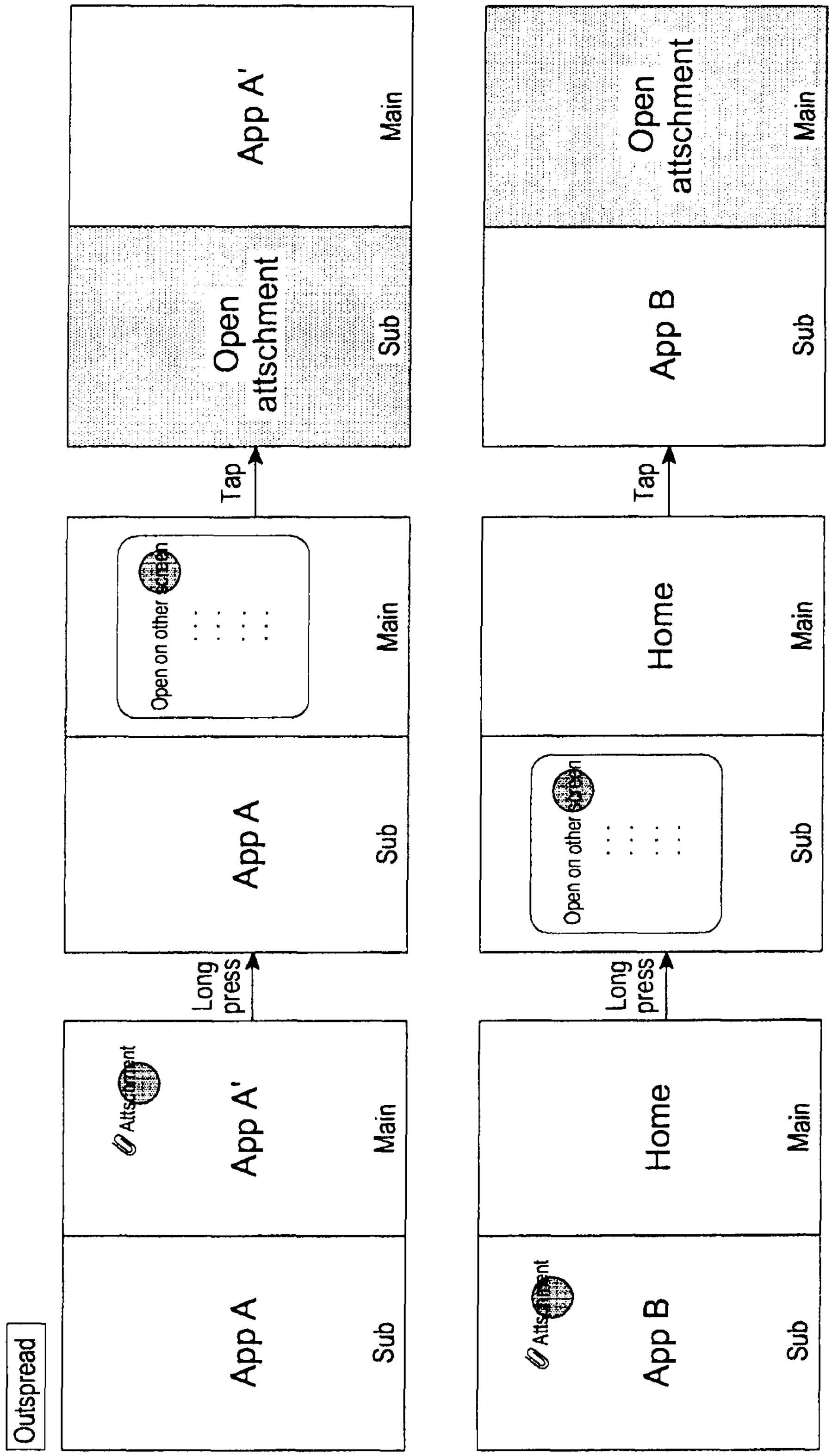

According to an embodiment of the present disclosure, the electronic device may provide an "Open on other screen" menu when the user selects a particular object as defined in an individual application. For example, as shown in FIG. 63, the electronic device may display an execution screen of application A on the main display. The execution screen of application A may contain an "Attachment," i.e., an object indicating an attachment. The object indicating an attachment may be associated with a function downloaded or run for an attachment sent from another user. Where the user designates the object indicating an attachment, the electronic device may display an "Open on other screen," i.e., an object inquiring whether to display a screen associated with the object on other display. According to an embodiment of the present disclosure, upon detecting a long press on the object indicating an attachment, the electronic device may display the object inquiring whether to display on other display. When the object is designated, the electronic device may display, on the sub display, not on the main display, an execution screen of a function associated with the first object, e.g., the object indicating an attachment. What has been described supra may also apply even where an input for running on other display is received on the sub display, which is shown on the lower part of FIG. 63.

2.8.4. Description of Application Control

When a recent-run application list is requested to be called up, the electronic device, according to an embodiment of the present disclosure, may provide an application stack and support application control (e.g., moving an application running screen between displays, terminating an application, swapping application running screens, and fixing an application running screen). Regarding fixing an execution screen, the electronic device may fix an execution screen of an application on a corresponding display until before the application terminates or fixing the execution screen is released. In this case, although the form type changes to the outspread mode, the electronic device may keep the application running screen fixed, abstaining from displaying an expanded home screen or coupled application running screen. Fixing running screen may be provided to the application running screen, alone, which is displayed on the sub display, and the electronic device may release the fixing of the execution screen upon detecting a command to do so. Meanwhile, despite detecting a command to terminate all the applications, the electronic device may keep a particular application screen-fixed. The electronic device may display another application running screen on the screen-fixed application running screen. Further, upon detecting a command (e.g., a command to move an application running screen) to display the other application running screen used to be in display on the main display, the electronic device may display the other application running screen on the main display and display a screen-fixed application running screen, but not the home screen, on the sub display.

According to an embodiment of the present disclosure, the electronic device may provide a visual cue indicating that the application is one whose screen is to be fixed, and upon detecting a designation of the back key on the 1 depth running screen of the screen-fixed application, the electronic device may release the screen fixing for the application and terminate the application. When the application terminates the electronic device may display, e.g., the home screen.

Figure 64:
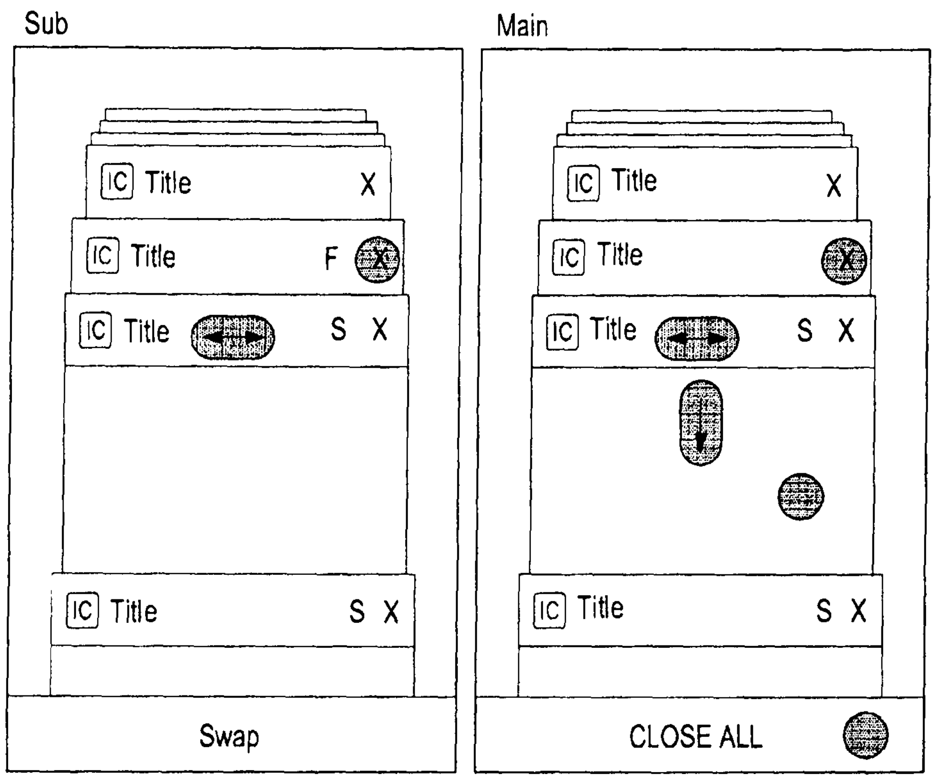

Referring to FIG. 64, when swapping running screens is designated, the electronic device, according to an embodiment of the present disclosure, may swap the respective positions of the application running screen displayed on the main display and the application running screen displayed on the sub display. Upon detecting a command to move an application running screen (e.g., a flick or drag gesture to the left or right), the electronic device may change the execution screen of the target application into other display.

2.8.5. Description of Dual Mode 2.8.5.1. Overview of Dual Mode

Figure 65:
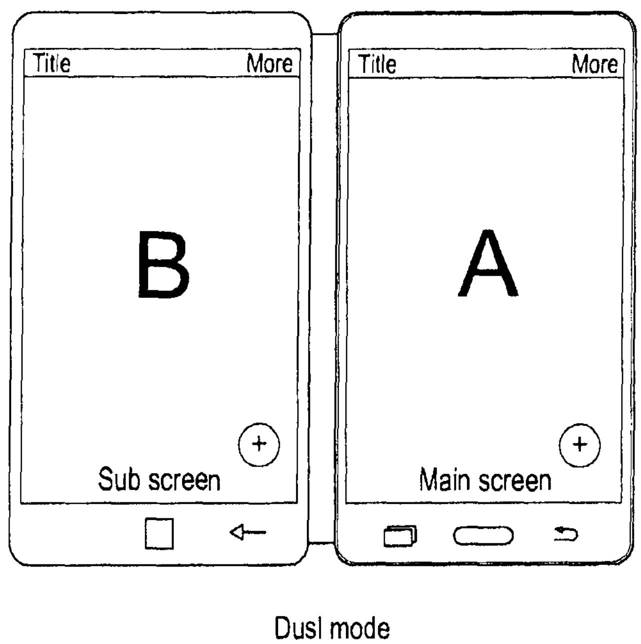

According to an embodiment of the present disclosure, 'dual mode' may mean where, as shown in FIG. 65, two different application running screens are displayed on the two displays, respectively, in the outspread mode. The operation of the application on each display is independent from the operation of the application on the other display, and thus, the UX in the dual mode may be similar to the UX for two single phones. However, when the applications are linked together, the two applications may interwork.

2.8.5.2. Description of Linked Applications and Activities

Figure 66:
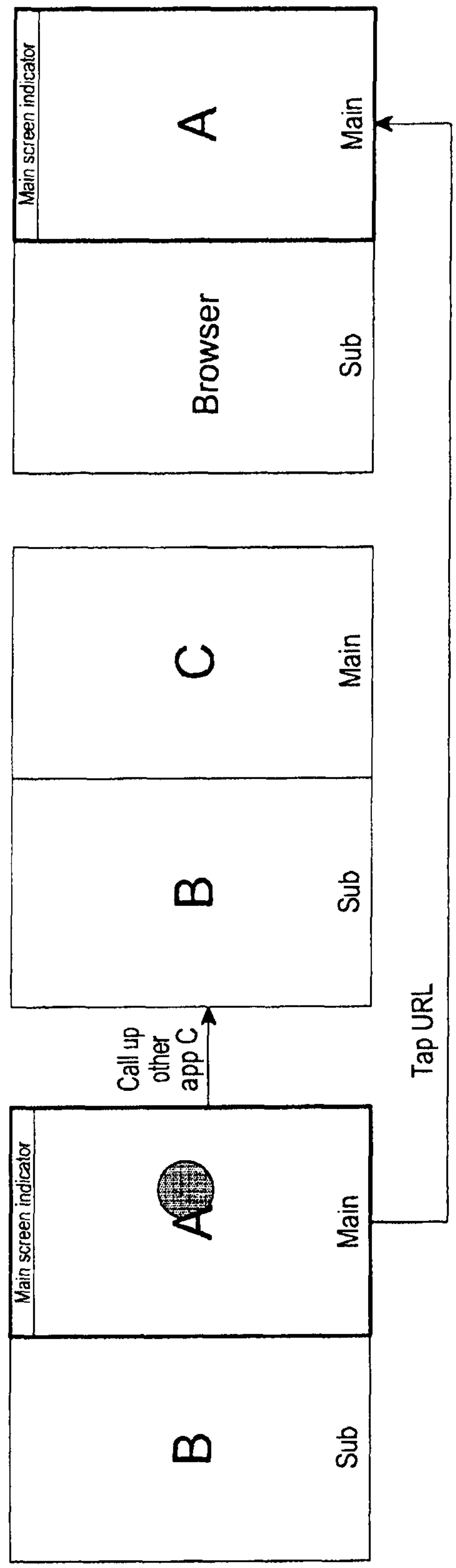

When linked applications run, the electronic device, according to an embodiment of the present disclosure, may, as default, assign the display of the applications to the display requested to be run on. According to an embodiment of the present disclosure, as shown in FIG. 66, the electronic device, when a web browser application is called on through a uniform resource locator (URL) to run on the main display, may display an execution screen of the web browser application on the opposite display, i.e., the sub display. Here, the web browser application may be set to an application linked with, e.g., application A.

Figure 67:
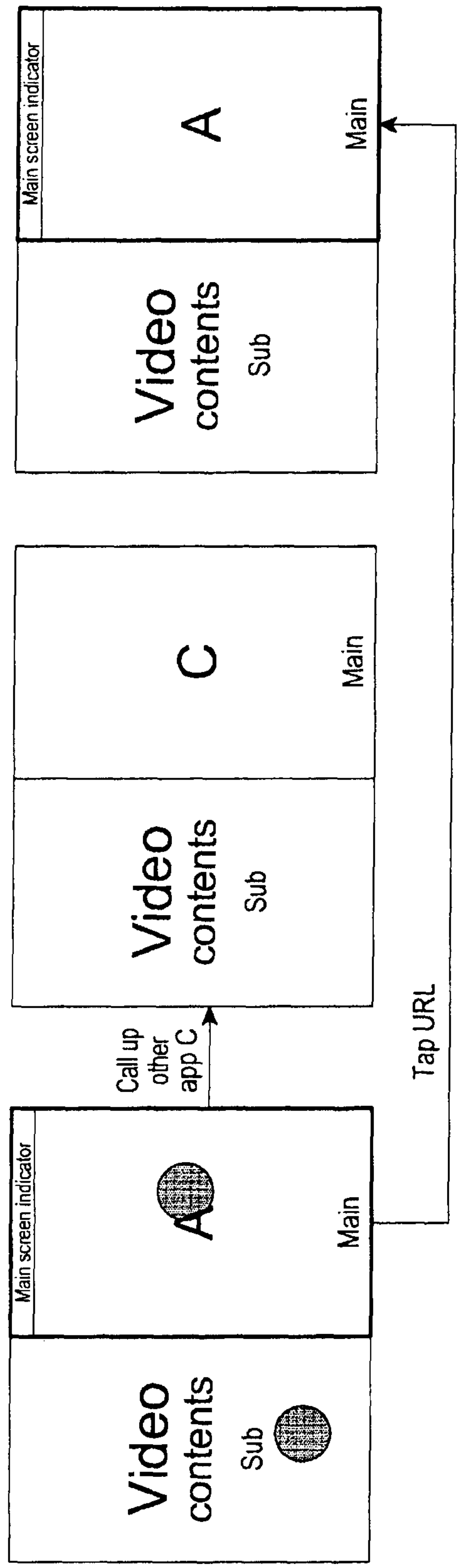

According to an embodiment of the present disclosure, as shown in FIG. 67, where an execution screen of an application, such as a video player, YouTube, or Vimeo, is displayed on one display to provide video content, the electronic device may display, on the opposite display, an execution screen of an application newly run or the web browser application accessed through a URL link.

Figure 68:
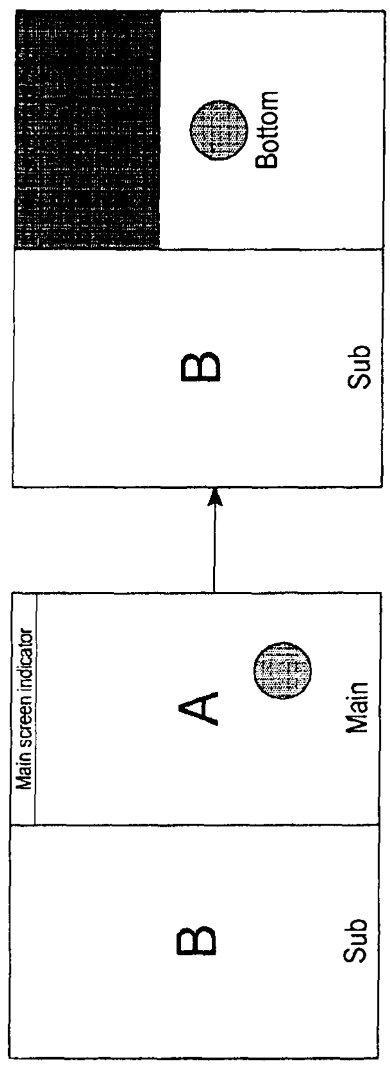

According to an embodiment of the present disclosure, the electronic device may display an activity run through an application running screen on the corresponding display. For example, as shown in FIG. 68, the electronic device may display an activity, such as "bottom sheet," on the display to which running the same has been inputted, e.g., the main display.

2.8.5.3. Description of Folded Mode

When the form type changes from the dual mode to the folded mode, the electronic device, according to an embodiment of the present disclosure, may control the inactive display in the off state. Meanwhile, the electronic device may keep running the application displayed on the inactive display but does not terminate the application. In other words, the electronic device may keep running the application displayed on the inactive display while displaying no running screen. Accordingly, when the form type changes from the folded mode back to the dual mode, the electronic device may control the display, which has been in the off state, in the on state. The electronic device may display an execution screen of the running application on the corresponding display. Where the execution screen of the application kept running in the folded mode is displayed back, the electronic device may display the final state of running screen, which had to be run in the prior dual mode.

Figure 69:
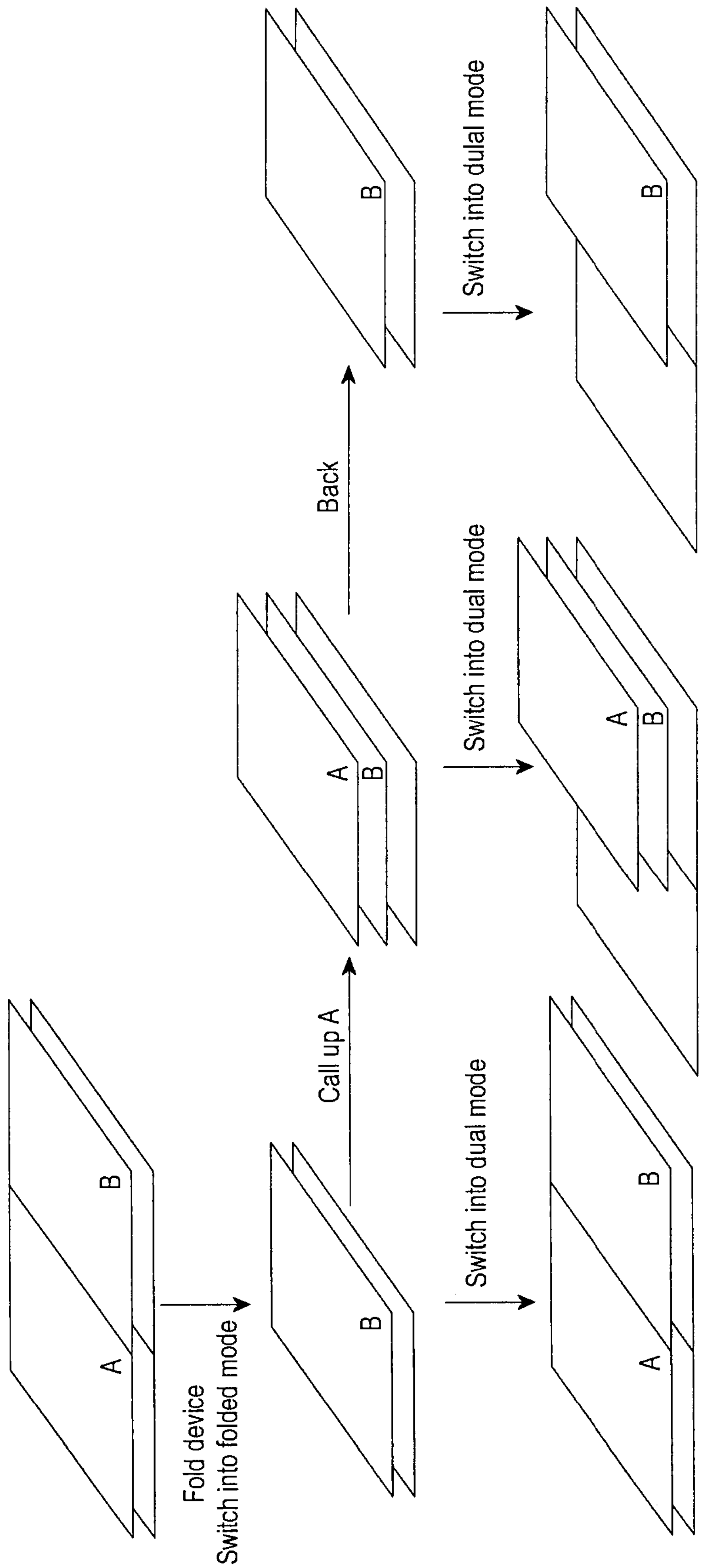

FIG. 69 illustrates a state of an application according to a change in form type between the folded mode and the outspread mode, according to an embodiment of the present disclosure.

2.8.6. Expand Mode 2.8.6.1. Overview of Expand Mode

According to an embodiment of the present disclosure, 'expand mode of outspread mode' denotes where the display of an execution screen of one application is assigned to both the displays. In other words, in the expand mode, one application running screen may be displayed on the displays both. Here, the two displays may display one continuous content (e.g., a full view image), and contents respectively displayed on the two displays may be ones of different depths or different tasks. Even an expandable application may also be displayed in a shrunken form, or may alternatively be run in the expand mode from the beginning of its running.

Whether a command to run an expandable application is inputted to the sub display or the main display, the same running screen of the expandable application may be displayed.

Upon displaying an execution screen of an expandable application, the two displays may be configured in a single layer, and the electronic device may cancel the last activity or return to the previous screen in response to detecting a back button, according to an embodiment of the present disclosure. An expandable application may be rendered to provide a shrinking or expanding function at some or all stages for running the application.

Figure 70A:
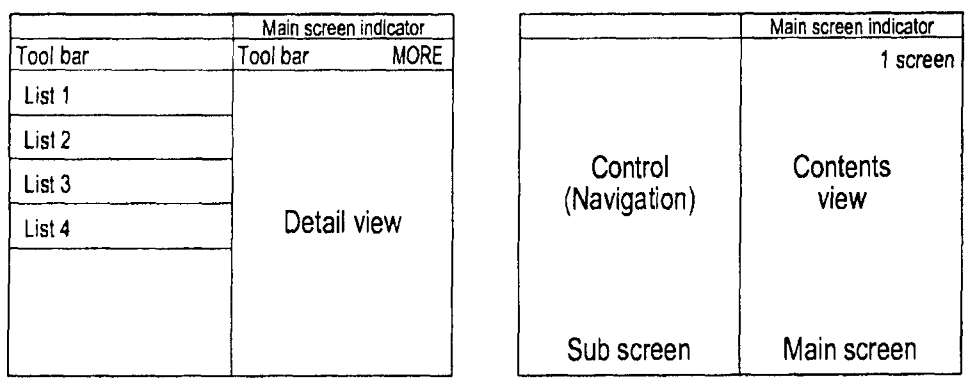

According to an embodiment of the present disclosure, as shown in FIG. 70*a*, the electronic device may display a list on the sub display. In this case, a first list item may automatically be focused in the same manner as in the list focus or tablet split structure. The electronic device may allow a detail view of the list-focused item to be displayed on the main display. No auto-focusing may be set depending on applications. For example, an email application may be free of autofocusing on a particular item, e.g., in order to prevent a read process from being performed concurrently with focusing.

In the case, alone, where a particular application (simply "app") is used in a single view, when there is an inter-detail movement in the detail view of the main display, the same operation may be performed as if there is an inter-view focus movement that Android operating system (OS) would provide.

Figure 70B:
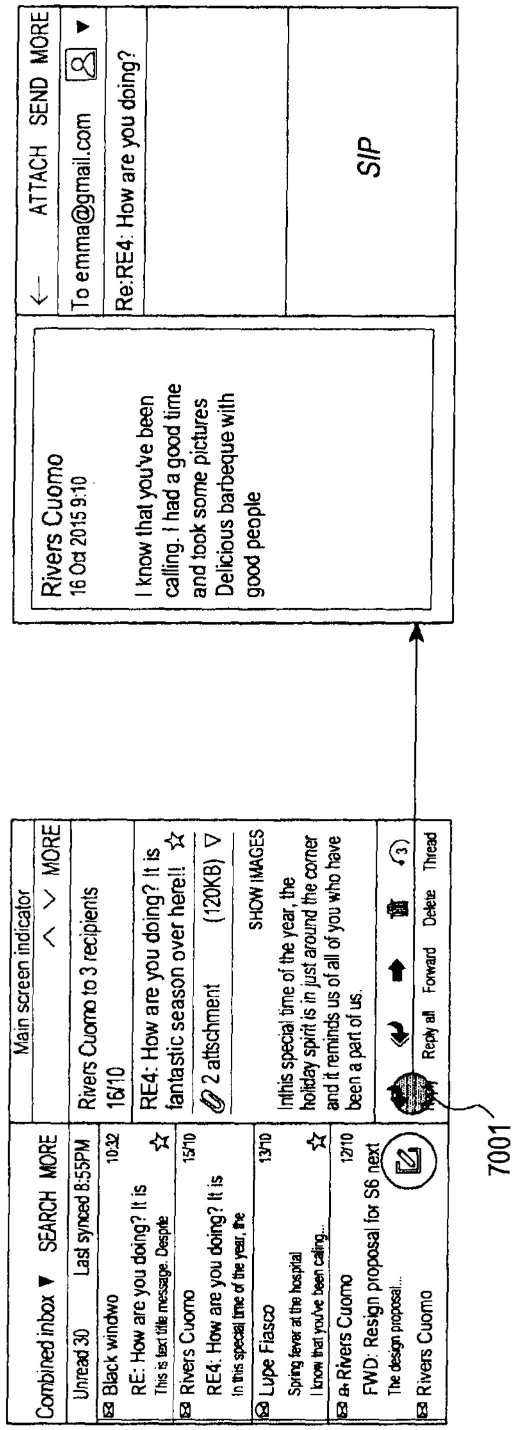

Referring to FIG. 70*b*, the electronic device, according to an embodiment of the present disclosure, may display a list on the sub display while displaying a detail view on the main display. Upon detecting a designation of a reply function key that used to be displayed on the main display, the electronic device may display an email draft screen on the main display. In this case, the electronic device may display the body of an email which to be replied to on the sub display. Thus, the user may draft a reply while checking the body of a certain email.

2.8.6.2. Description of Sub Back Key in Expand Mode

Figure 71:
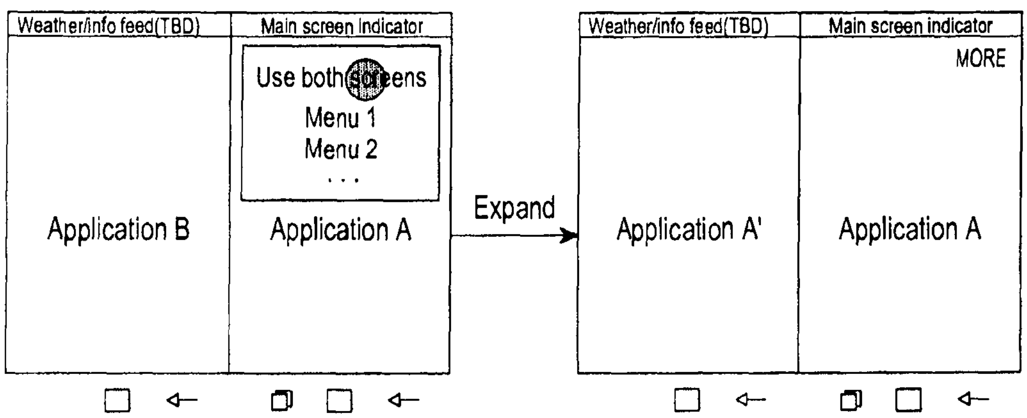

According to an embodiment of the present disclosure, where an application is displayed expanded, the electronic device may disable the back key corresponding to the sub display as shown in FIG. 71. In this case, the electronic device may control a function associated with the application displayed or other functions using a key corresponding to the main display.

2.8.6.3. Description of Launching Application

Figure 72:
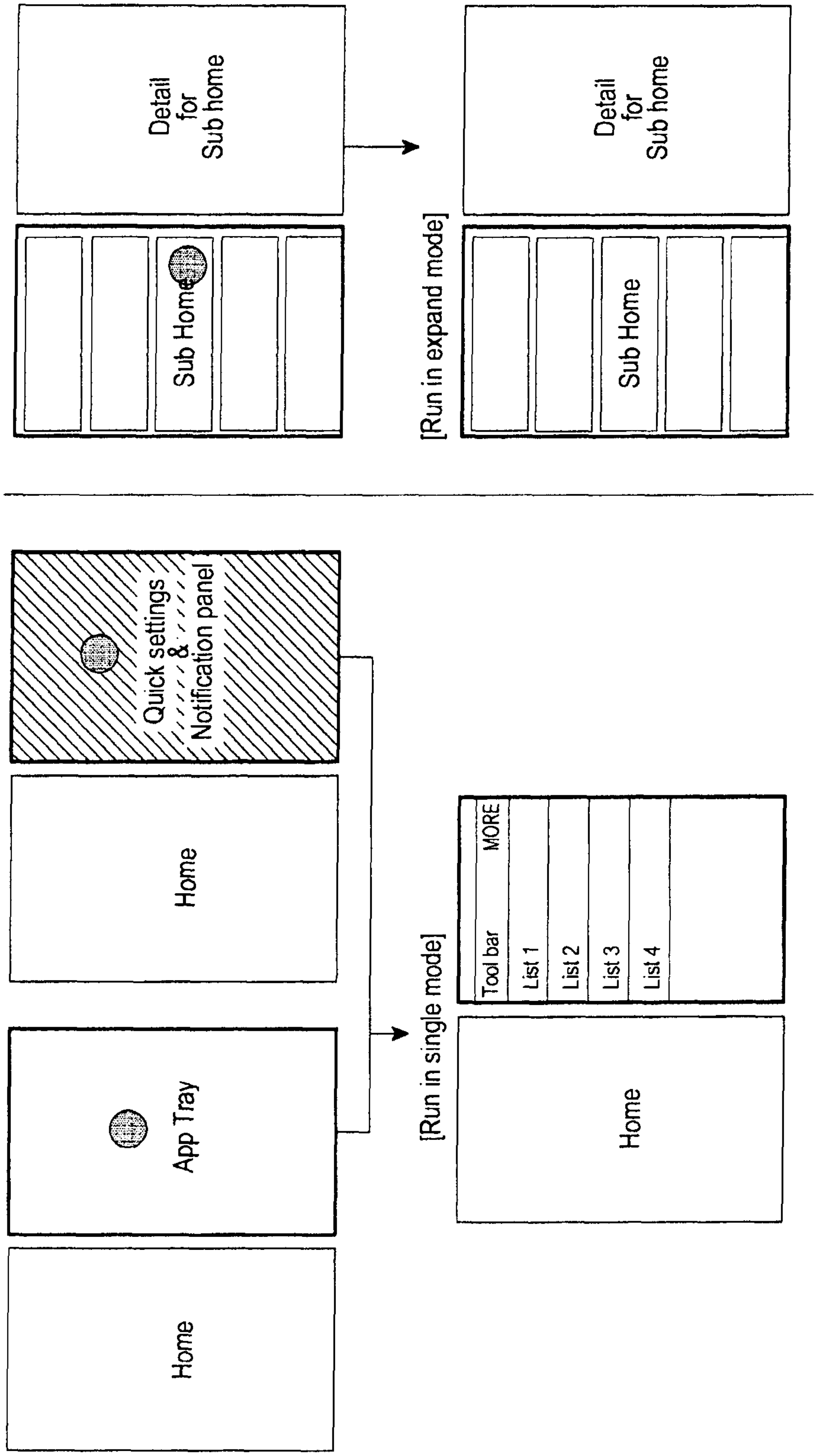

According to an embodiment of the present disclosure, the electronic device may perform control so that the main display and the sub display each operate as an independent, separate display in the portrait mode. Referring to FIG. 72, when an application runs on an application tray (App tray) or quick panel, and the running application is an expandable application, the electronic device may identify whether the application displayed on the opposite display operates and determine whether it is to display the application running screen in the expand mode or displays only either of the displays. For example, where the application running on the opposite display (e.g., the sub display) operates, the electronic device may display a shrunken running screen of the expandable application on only one of the two displays.

Referring to FIG. 72, according to an embodiment of the present disclosure, the electronic device may run an application through a toolbox/Quick panel (setting/notification). In this case, an application newly run may be displayed on a top window of the display, and the application running on the other display may remain in its current state.

2.8.6.4. Description of Home Button

Figure 73:
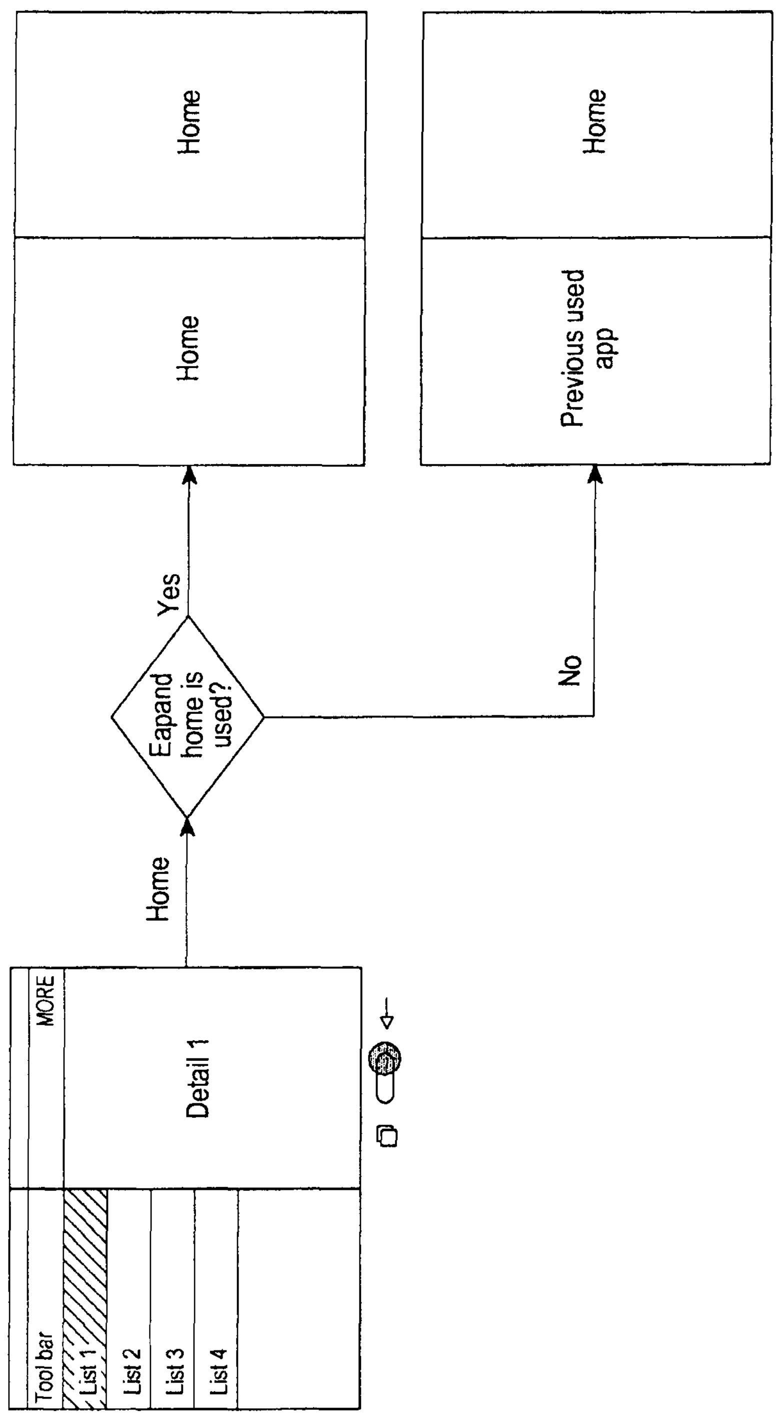

According to an embodiment of the present disclosure, where an expandable application runs, the home button may be operated in a different manner than it used to. For example, upon detecting a designation of the home button, the electronic device may differently operate depending on home screen settings as shown in FIG. 73. According to an embodiment of the present disclosure, in the folded mode, the electronic device may display the home screen on the main display and an execution screen of the application being in use on the sub display. Where an expanded home screen is set, the electronic device may display the home screen on both the displays.

2.8.6.5. Description of Expanded/Shrunken Menu

According to an embodiment of the present disclosure, the electronic device may make such setting that a shrunken screen for an application is displayed at the first running although the application is expandable. When an expanding function is selected at the 1st depth of the shrunken form, the electronic device may display a 1st depth application running screen on the sub display and a 2nd depth content corresponding to the first list of the 1st depth application running screen on the main display. Such operation may or may not apply to applications. Regarding an email application, message application, or such type of applications, no item may be displayed on the main display. The reasons is as follows. Applying autofocusing to an email application or message application may result in the corresponding item being immediately read-processed, which needs to be prevented, as described above.

Figure 74:
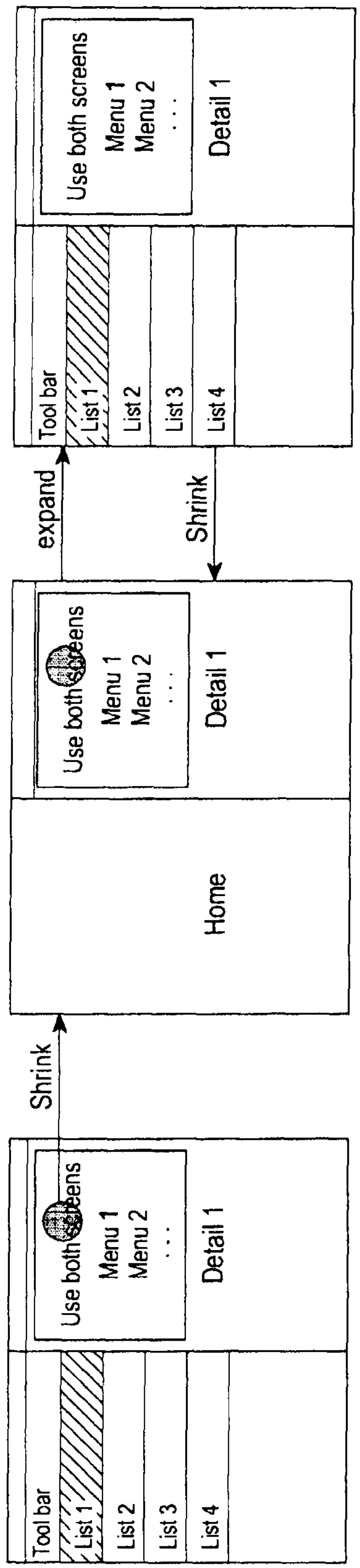

For example, as shown in FIG. 74, according to an embodiment of the present disclosure, the electronic device may display a list on the sub display and a detail view for an item selected from the list on the main display. Further, the electronic device may display a window, e.g., a popup window, for inquiring whether to use this screen only on the main display. Upon detecting a tap on the window, the electronic device may stop displaying the list on the sub display and display the home screen on the sub display. Further, the electronic device may display a window, e.g., a popup window, for inquiring whether to use both screens on the main display. Upon detecting a tap on the window, the electronic device may display the list back on the sub display.

According to an embodiment of the present disclosure, where the form type switches to the folded mode or where the sub display turns off, the electronic device may shrink the application running screen and display the same on one display.

Figure 75:
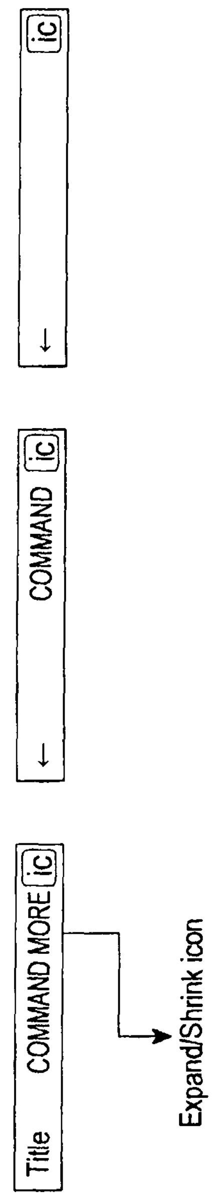

According to an embodiment of the present disclosure, the electronic device may add an icon for the expanding/shrinking operation to the tool bar to indicate the expandable application. Referring to FIG. 75, an icon for the expanding/shrinking operation may be provided at a right-hand side of the tool bar, for example. Where the overall screen is used as is done by a multi-media application, the electronic device may place the icon at the position which the tool bar used to originally be in.

Figure 76:
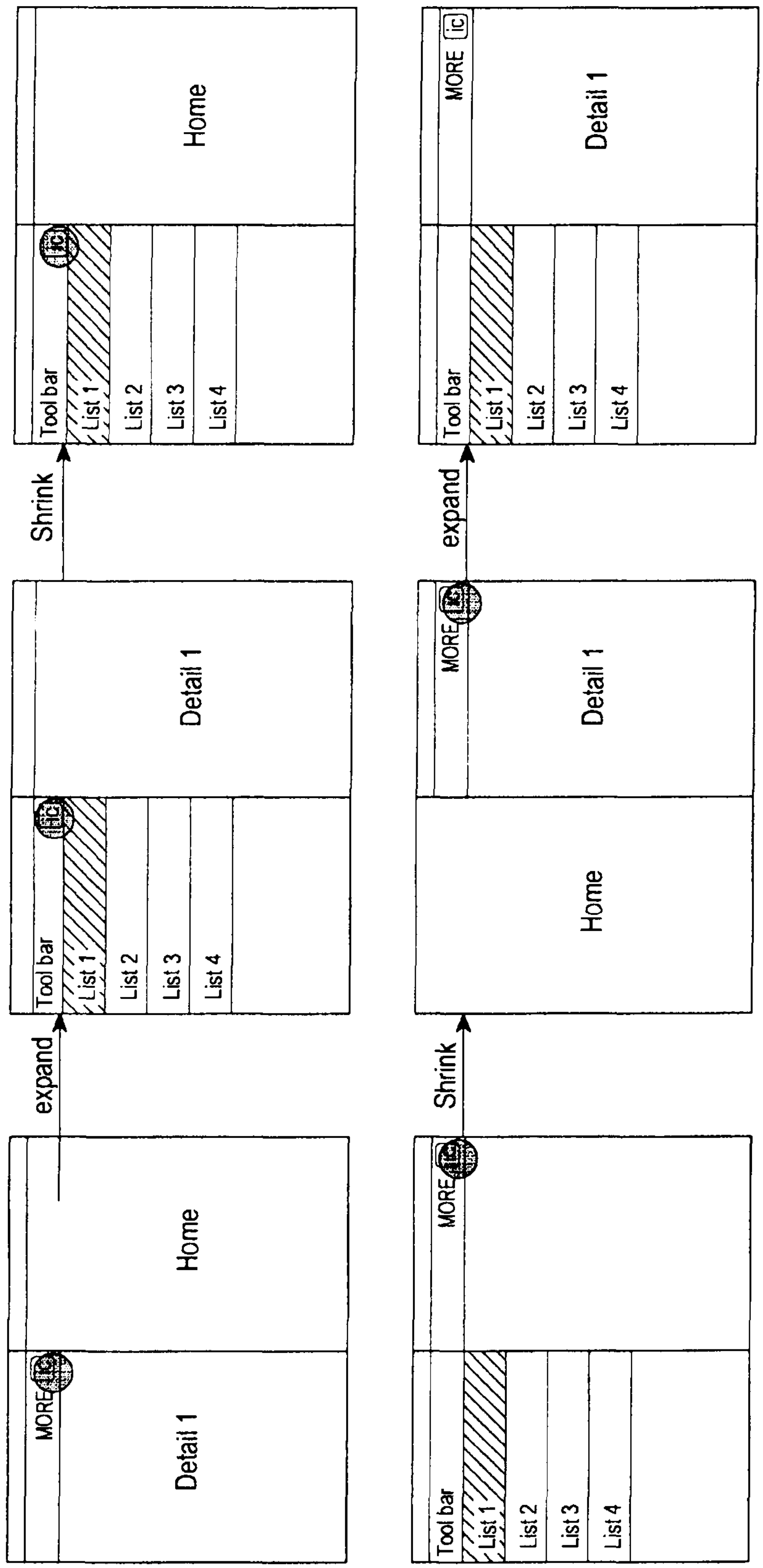

According to an embodiment of the present disclosure, as shown in FIG. 76, the electronic device may detect the selection of the expand icon to display an expanded running screen of the application. The electronic device may display the shrink button only on the display that used to first display the shrunken running screen. Upon detecting a designation of the shrink icon, the electronic device may abstain from displaying the application running screen displayed on the other display except for the execution screen on the display where the shrink button is located, thereby performing a shrinking operation.

Figure 77:
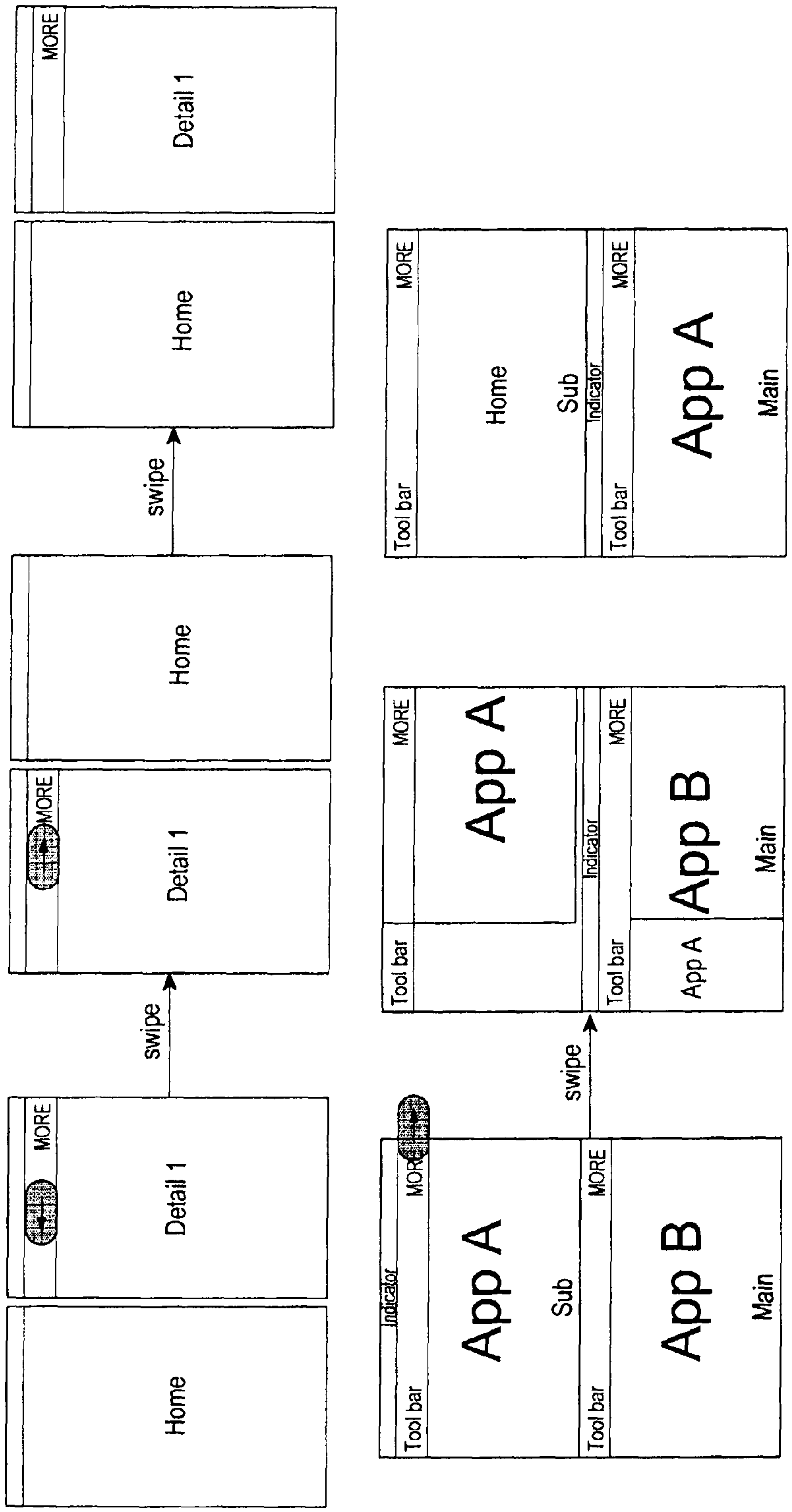

2.8.6.6. Description of Movement of Application Running Screen Using a Tool Bar Swipe Referring to FIG. 77, according to an embodiment of the present disclosure, the electronic device may support the functions of detecting a swipe on the tool bar area and moving the application running screen to the other display in response to the detection. At least one menu displayed on the tool bar may be provided first one time when an application runs. According to an embodiment of the present disclosure, the electronic device may not provide the moving function for applications expanded and displayed. In the landscape mode, the electronic device may perform control to move the application running screen in the corresponding display while displaying a portion not displayed by the movement on the opposite display, in response to a tool bar swipe.

2.8.6.7. Description of Go-Back Function Upon Expanding/Shrinking

Figure 78:
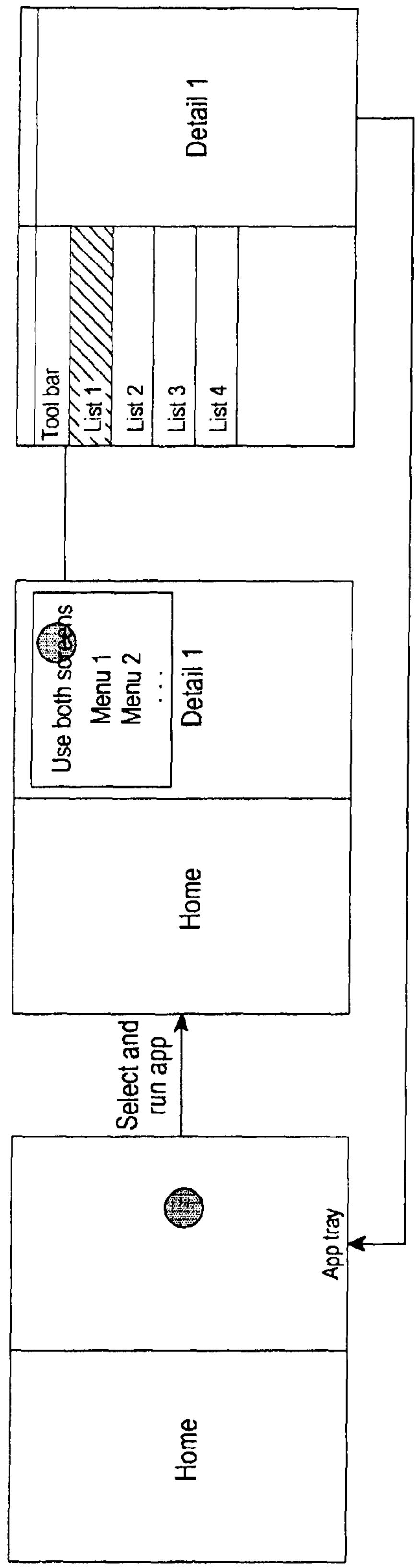

According to an embodiment of the present disclosure, the expanding/shrinking function may not apply to the go-back function. In other words, as shown in FIG. 78, the electronic device may display a shrunken application running screen selected from an application on the main display. The electronic device may detect an expanding function command to display the expanded application running screen on the whole display. In this case, when the go-back function runs, the electronic device may terminate the application and display the application tray, rather than displaying the shrunken running screen on the main display as it used to do.

Figure 79:
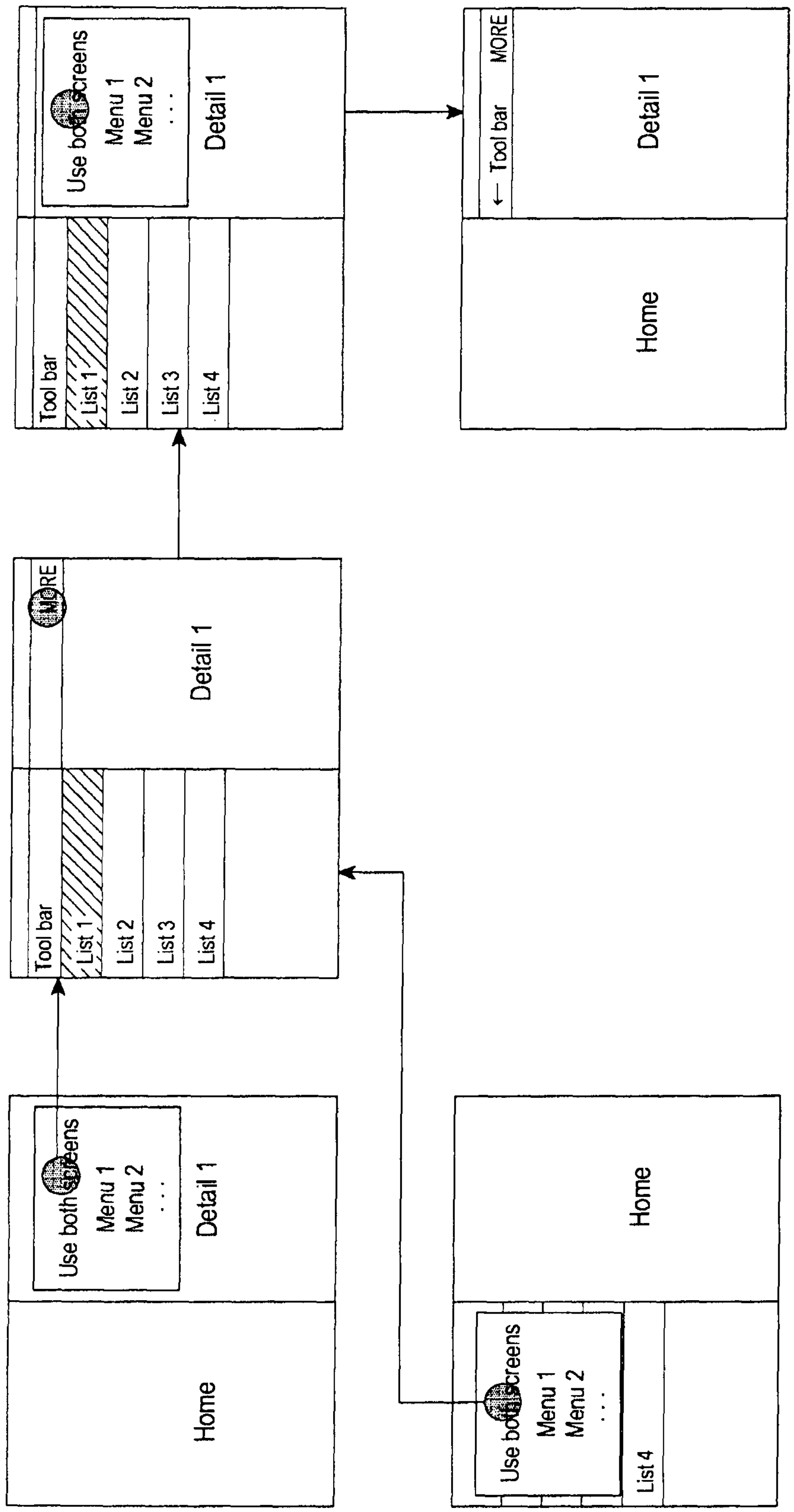

2.8.6.8. Description of Expanded/Shrunken Menu

Where an expandable application runs, the electronic device, according to an embodiment of the present disclosure, may display an expand-related menu on a list (1st depth) or a detail view (2nd depth). Upon detecting an expand command, the electronic device may display shrink-related menus, respectively, on the respective menus of the two displays. Upon detecting a shrink command, the electronic device may display a shrunken application running screen only on the display where the shrink command is detected while stopping displaying on the main display, as shown in FIG. 79. The electronic device may shrink a unique control into a single view.

2.8.6.9. Description of Other Options

Figure 80:
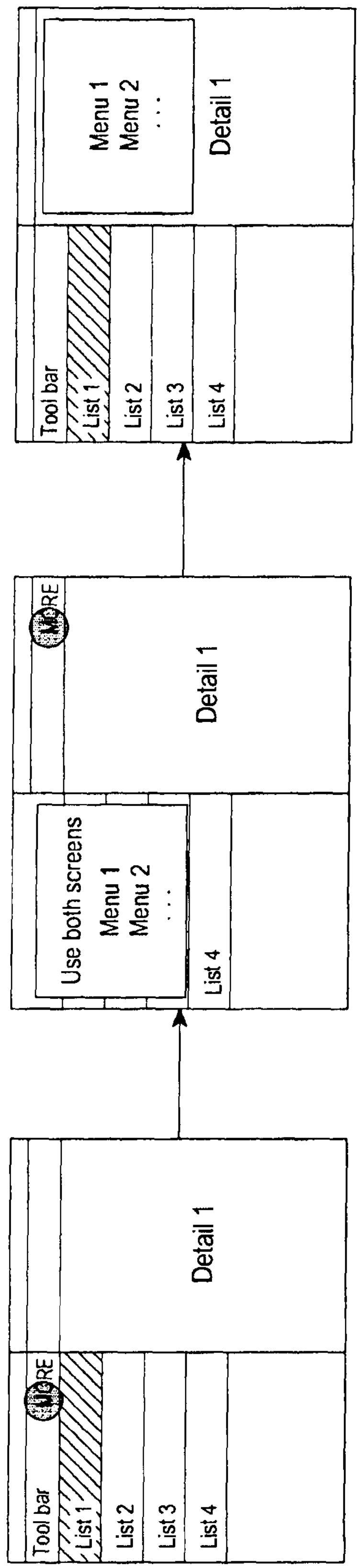

While displaying an application in the expand mode, the electronic device, according to an embodiment of the present disclosure, may provide a menu for other options on only one of the displays as shown in FIG. 80. Upon detecting a command to initiate the menu for other operations (More) on the opposite display, the electronic device may stop displaying the More menu having already begun while displaying the More menu on the display where the initiate command has been detected.

2.8.6.10. Description of Change from Expand Mode to Single Mode

Figure 81:
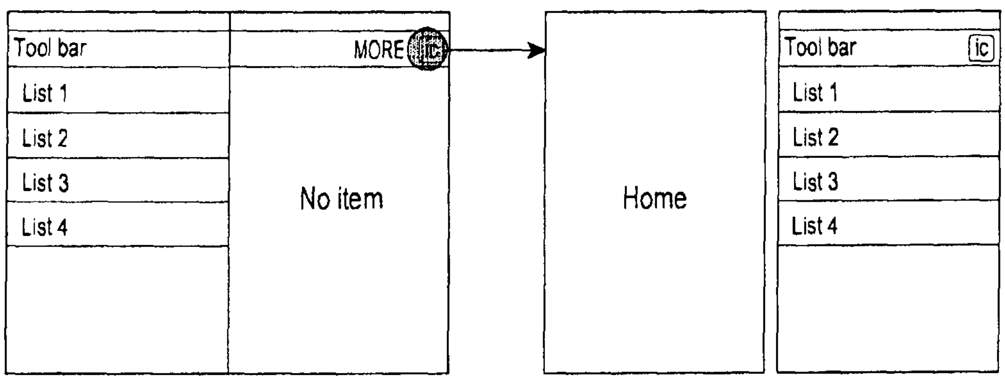

Referring to FIG. 81, according to an embodiment of the present disclosure, the electronic device may display an expanded running screen of an application on both the displays. The expanded running screen may include a list on one display. Meanwhile, no other items may be displayed on the main display, but a shrink icon alone is. When the shrink icon is designated, the electronic device may display a shrunken screen (e.g., a list) on the main display where the shrink icon has been designated. As described above, the electronic device needs to display the screen where the shrink icon has been designated. However, when the shrink icon-designated screen does not contain other items as shown in FIG. 81*i*, the electronic device may display the screen used to be displayed on the other display as the shrunken running screen.

When the form type changes from the expand mode to the folded mode, the sub display turns off, or the shrink icon is designated, the electronic device, according to an embodiment of the present disclosure, stop displaying on the display where the expanded running screen used to be displayed while displaying the shrunken running screen on the other display.

Figure 82:
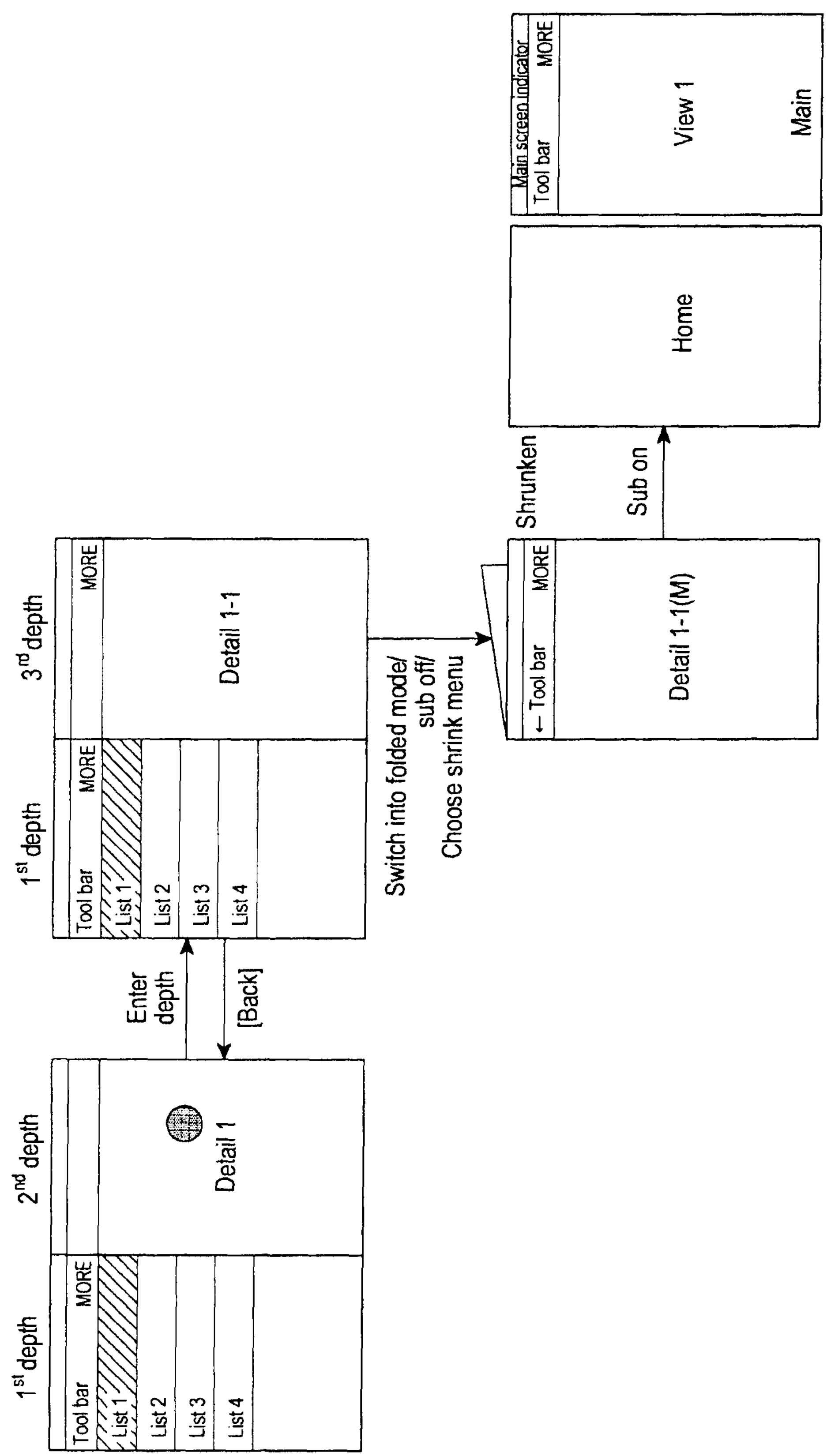

Referring to FIG. 82, according to an embodiment of the present disclosure, the electronic device may display an expanded running screen of an application on the main display and the sub display both. According to an embodiment of the present disclosure, the electronic device may display a list containing items on the sub display. The list may be at a 1st depth. The electronic device may display a detail view (detail1) for one item of the list on the main display. The detail view (detail1) may be at a 2nd depth. When the user enters an interaction to the main display, the electronic device may display an interaction-reflected screen (detail 1-1) which may be at a 3rd depth. The electronic device may detect a change in form type from the outspread mode to the folded mode, and the electronic device may turn off the sub display while keeping displaying on the main display. In other words, the electronic device may display the interaction-reflected screen (detail 1-1), as the shrunken running screen, on the display. The electronic device may detect a change in form type between the folded mode to the outspread mode, and in response to the detection, may control the sub display back in the on state. The electronic device may display the home screen on the on-state sub display and the shrunken application running screen (detail 1-1) on the main display.

2.8.6.11. Description of Web Browser Application

Figure 83:
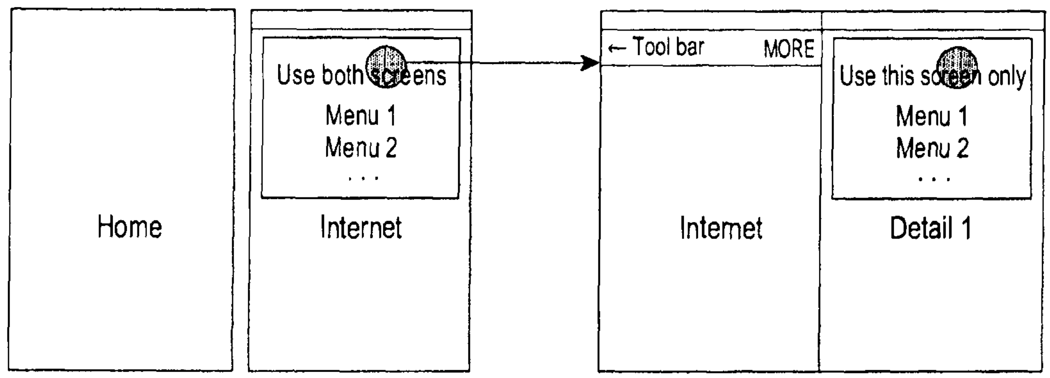

Referring to FIG. 83, according to an embodiment of the present disclosure, upon running a web browser application, the electronic device may display a first web browsing screen and a second web browsing screen, respectively, on the two displays when displaying an expanded running screen.

2.8.6.12. Description of FAB Button

Figure 84:
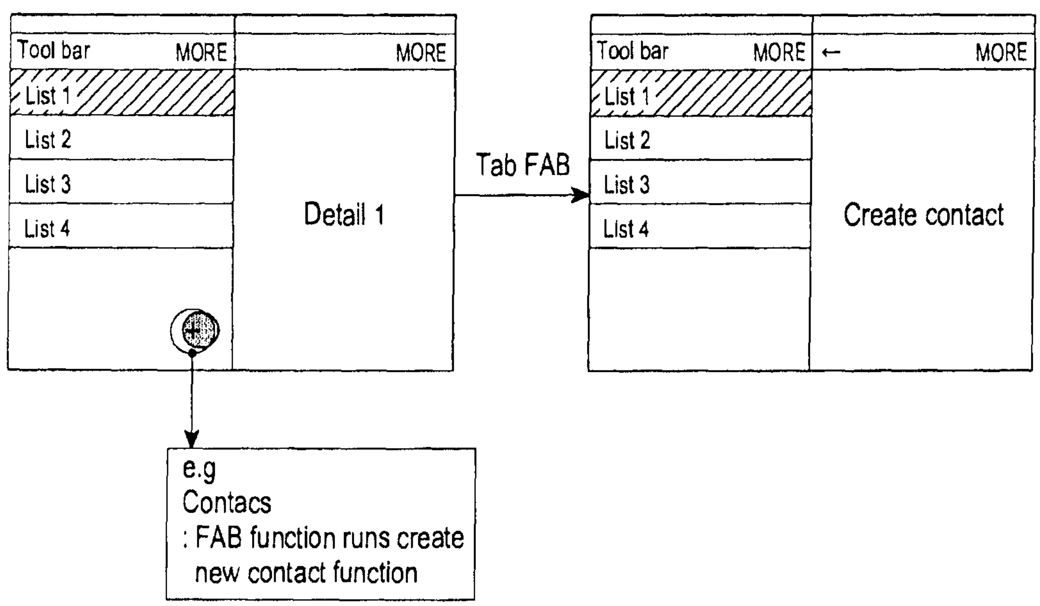

According to an embodiment of the present disclosure, the electronic device may enable a FAB button for a critical function per application to stay on the screen as shown in FIG. 84. Where a function to be run in the FAB has already been so on the opposite display, the electronic device may abstain from displaying the FAB button on the active display.

2.8.6.13. Description of Landscape Mode

Figure 85:
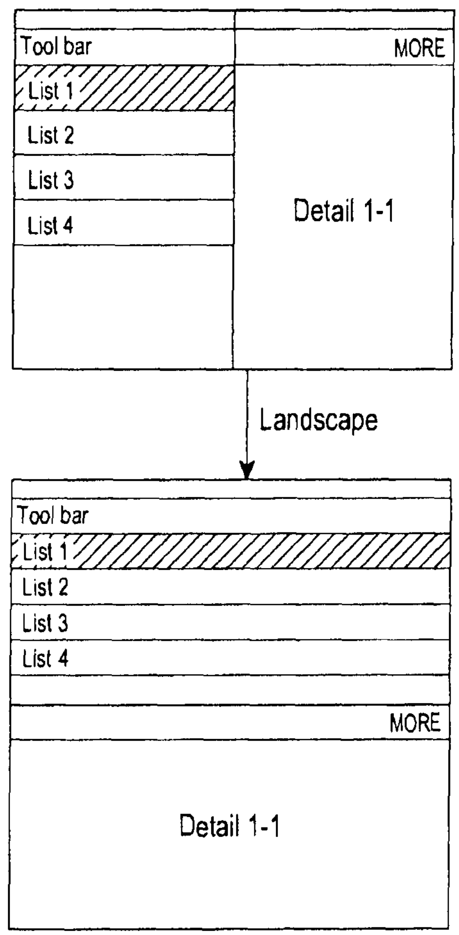

According to an embodiment of the present disclosure, an expanded application running screen in the landscape mode may include two expanded forms, which allows for configuration of a layout optimized for a dual screen. The list-detail view has the advantages of reducing an inter-application depth switch as shown in FIG. 85.

Figure 86:
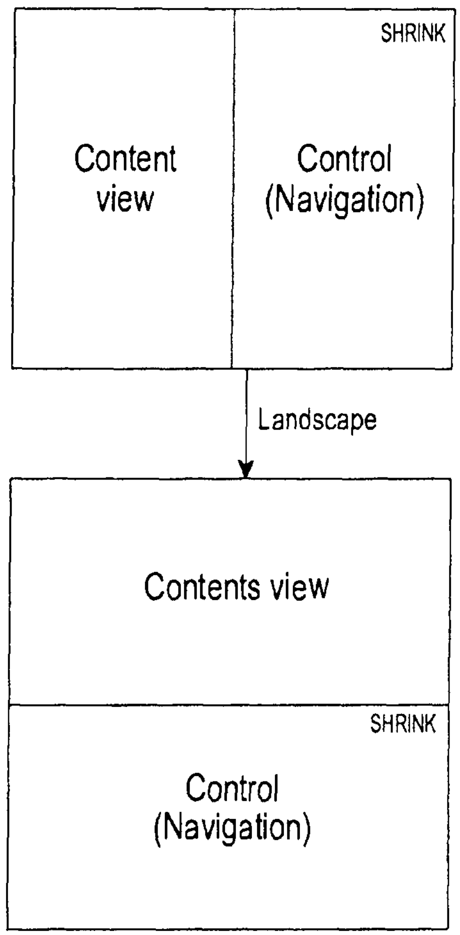

The content-control view may be represented in the form shown in FIG. 86, which allows the user to focus on the task, eliminating distractions.

Figure 87:
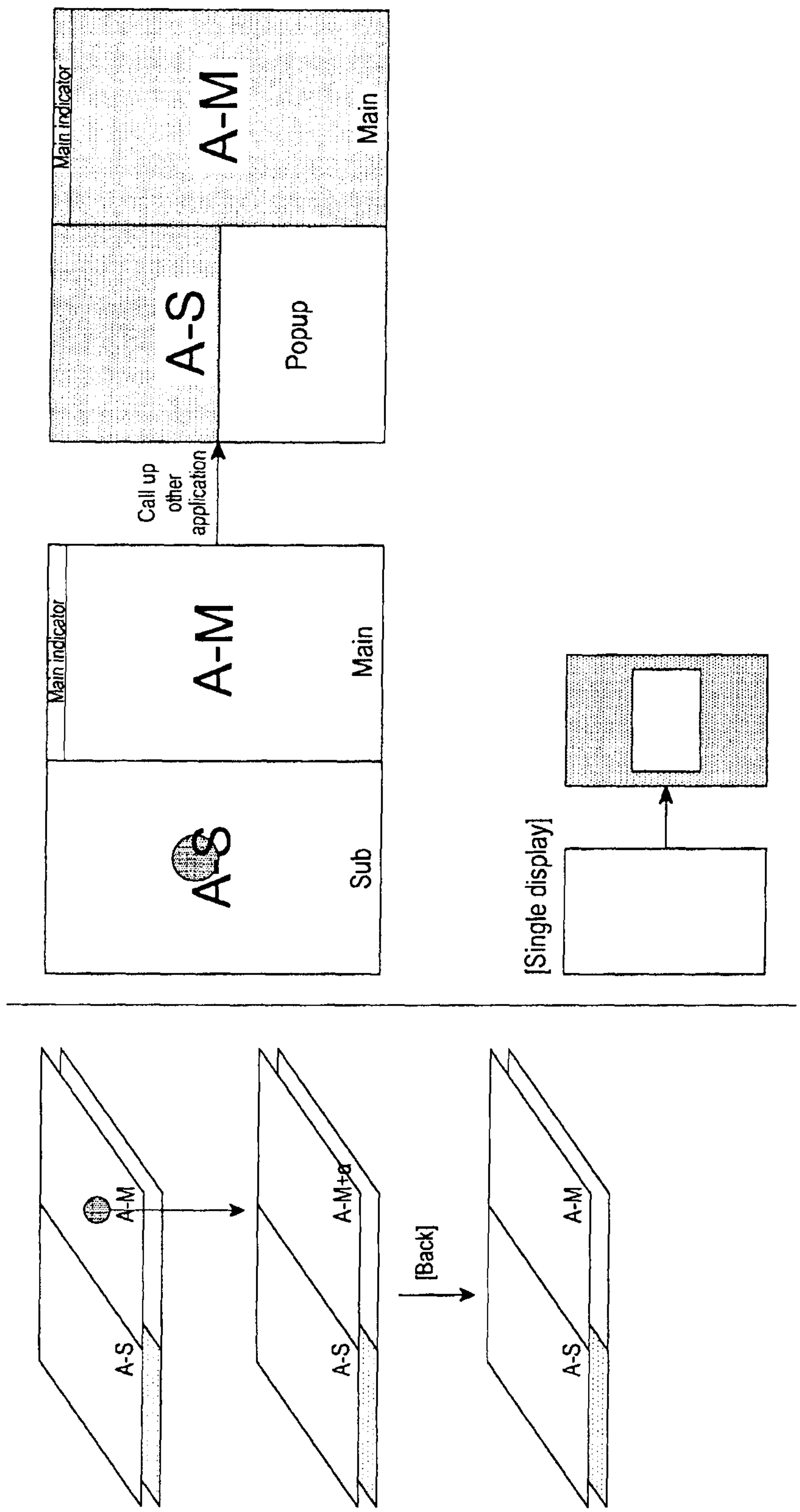

2.8.6.14. Description of Entry Into Depth 2.8.6.14.1. Description of In-Screen Activity Where an in-screen activity or on-screen overlay is selected, such as search, select mode, edit, popup, or dialog picker, the electronic device may display the corresponding operation on the display where the selection has been selected, as shown in FIG. 87, according to an embodiment of the present disclosure. Specifically, as shown in FIG. 87, the electronic device may display an A-S depth application running screen on the sub display and may display an A-M depth application running screen on the main display. Upon detecting an activity on the main display, the electronic device may display an activity-reflected application running screen on the main display. The activity-reflected application may be at an A-M+a depth. Upon detecting the selection of a back function, the electronic device may display the application running screen before reflecting the activity back on the main display. The application running screen may be at an A-M depth as before. Further, upon detecting a call of another application on the sub display, the electronic device may display a popup window associated with the other application on the sub display. This may be similar to displaying a popup window in a single-display electronic device.

Figure 88:
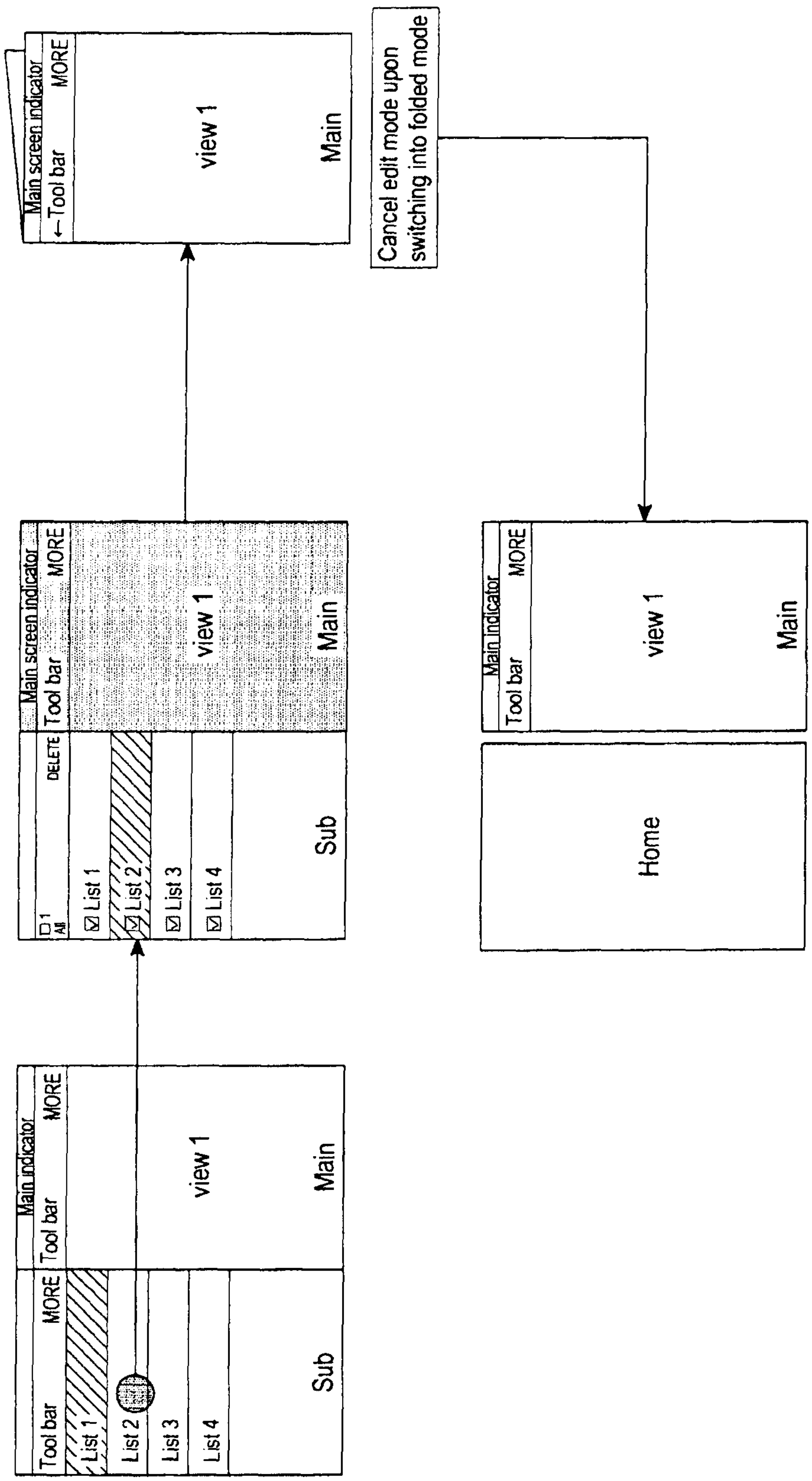

For example, for objects changed in screen or overlaid on screen, such as a selection mode, popup window, the screen displayed on one display may enter into an edit or select mode. In this case, the electronic device, according to an embodiment of the present disclosure, may perform a dimming process on the screen displayed on the other display as shown in FIG. 88.

Further, where the screen displayed on one display enters into the edit or select mode, the electronic device may abstain from providing a shrink/expand screen.

Figure 89:
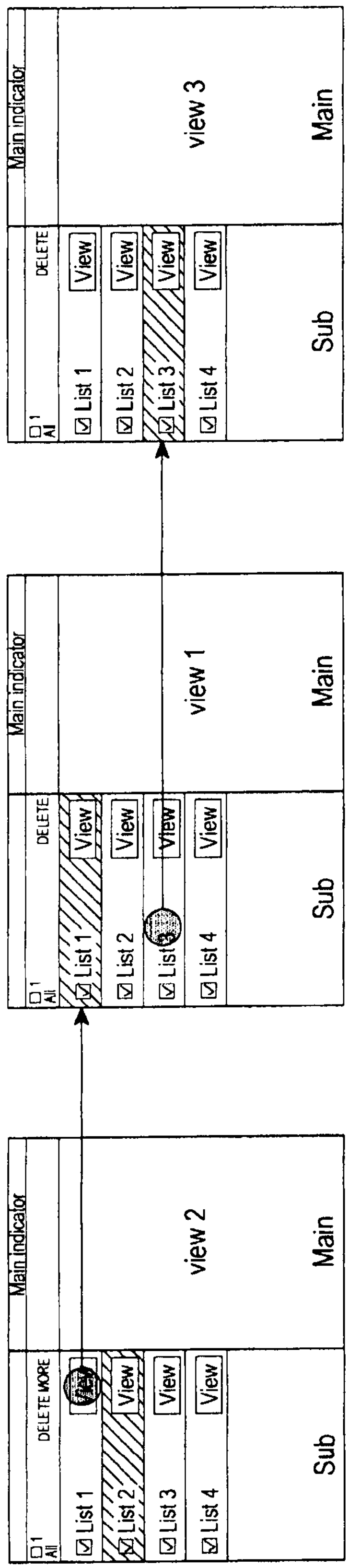

According to an embodiment of the present disclosure, as shown in FIG. 89, when entering into a select mode supportive of a view button or preview, the electronic device may maintain, without dimming, the view screen displayed on the main display. Where the screen displayed on one display enters in the select mode, the electronic device may enable the tool bar menu to disappear from the screen displayed on the other display. When the select button is designated, the electronic device performs control so that a view function and select function are also operated. When the view button is designated, the electronic device may enable the view function alone to operate, and the electronic device may perform control so that a content on the list displayed on the view function-applied sub display is focused.

Figure 90:
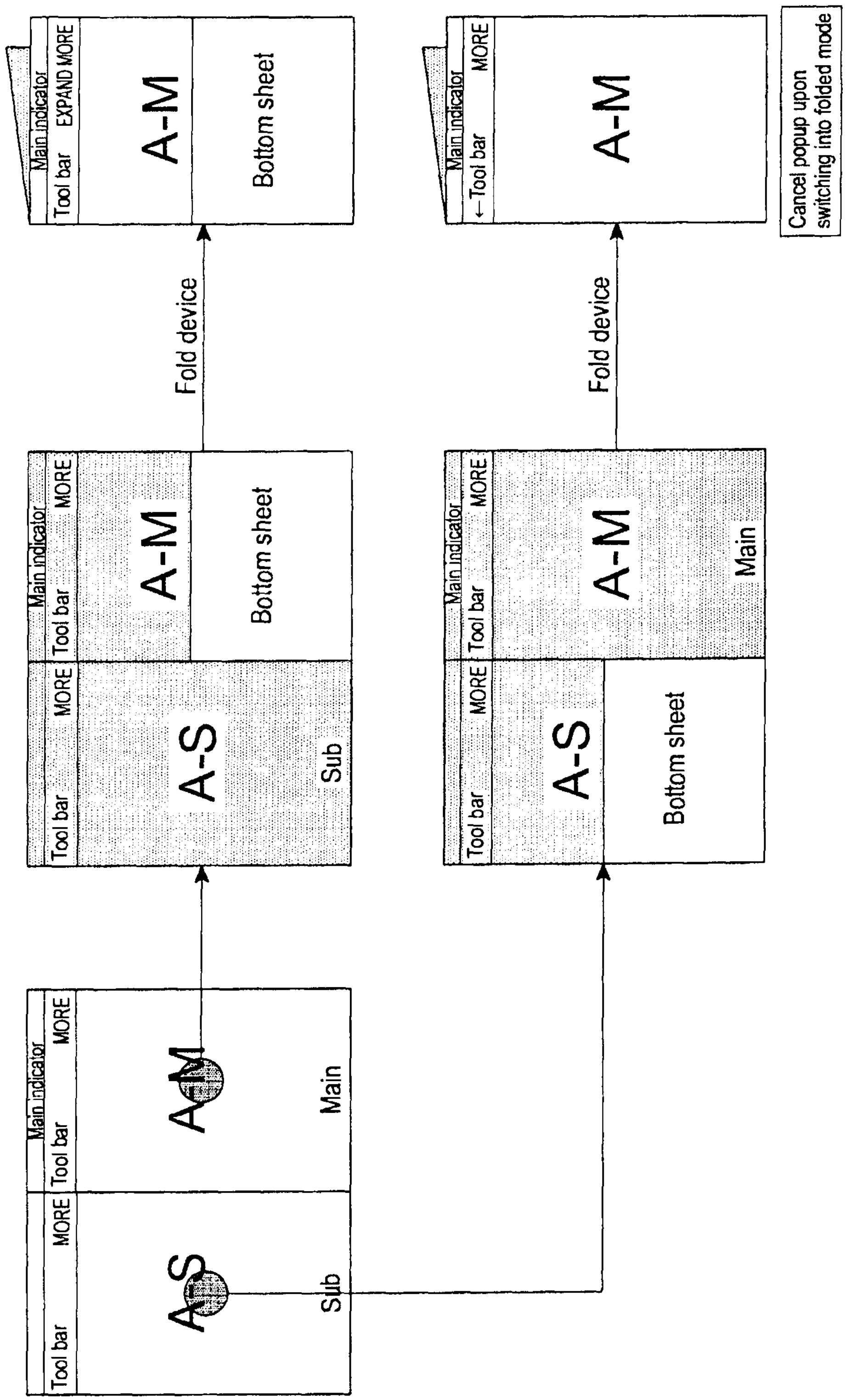
Figure 91:
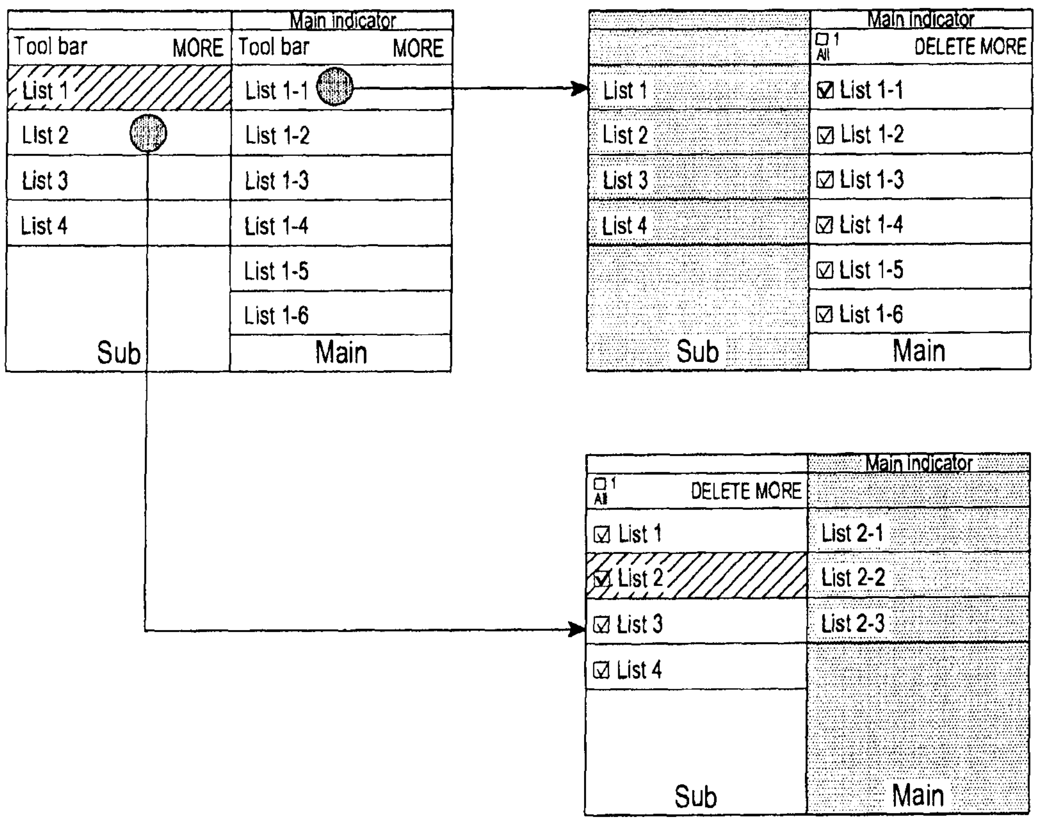

According to an embodiment of the present disclosure, as shown in FIG. 90, the electronic device may provide a popup in the display having called up a popup, bottom sheet, or picker in the operation of the popup, bottom sheet, or picker. Here, all the screen may be subject to a dimming process that may be maintained despite a change in the form type.

Where the left-hand and right-hand displays both support the select mode, the electronic device may provide a check box only on the display having called up the select mode while dimming the screen displayed on the other display as shown in FIG. 91. Upon detecting a list view tab, the electronic device may abstain from shifting to the detail.

2.8.6.14.2. Description of Displaying Screen in Portrait Mode

Figure 92:
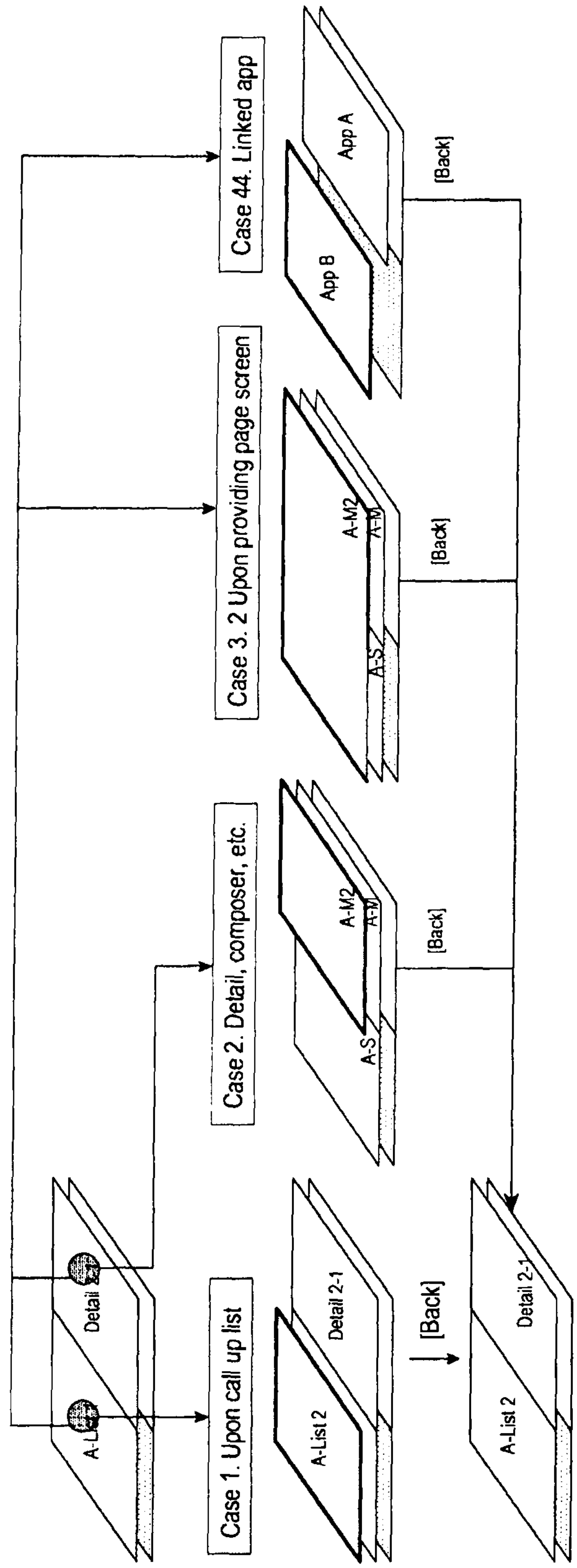

Referring to FIG. 92, where the screen is displayed (e.g., as a popup) in the portrait mode when the application running screen enters a 2nd depth or higher depth, the electronic device, according to an embodiment of the present disclosure, may generally display a list on the sub display and a detail view on the main screen. Other various implementations may also be made depending on the attribute of the list. Here, the corresponding item may be focused and displayed on the uppermost end of each list. One item on the list screen being focused may be denoted a detail page. Such an action as a composer or detail view corresponding to the list may be displayed on the main display. Where a screen using both the screens is called up, the electronic device may display the screen on the two displays both. Where an associated application is called up, the electronic device may enable application running screens to be displayed on the two displays, respectively.

Figure 93:
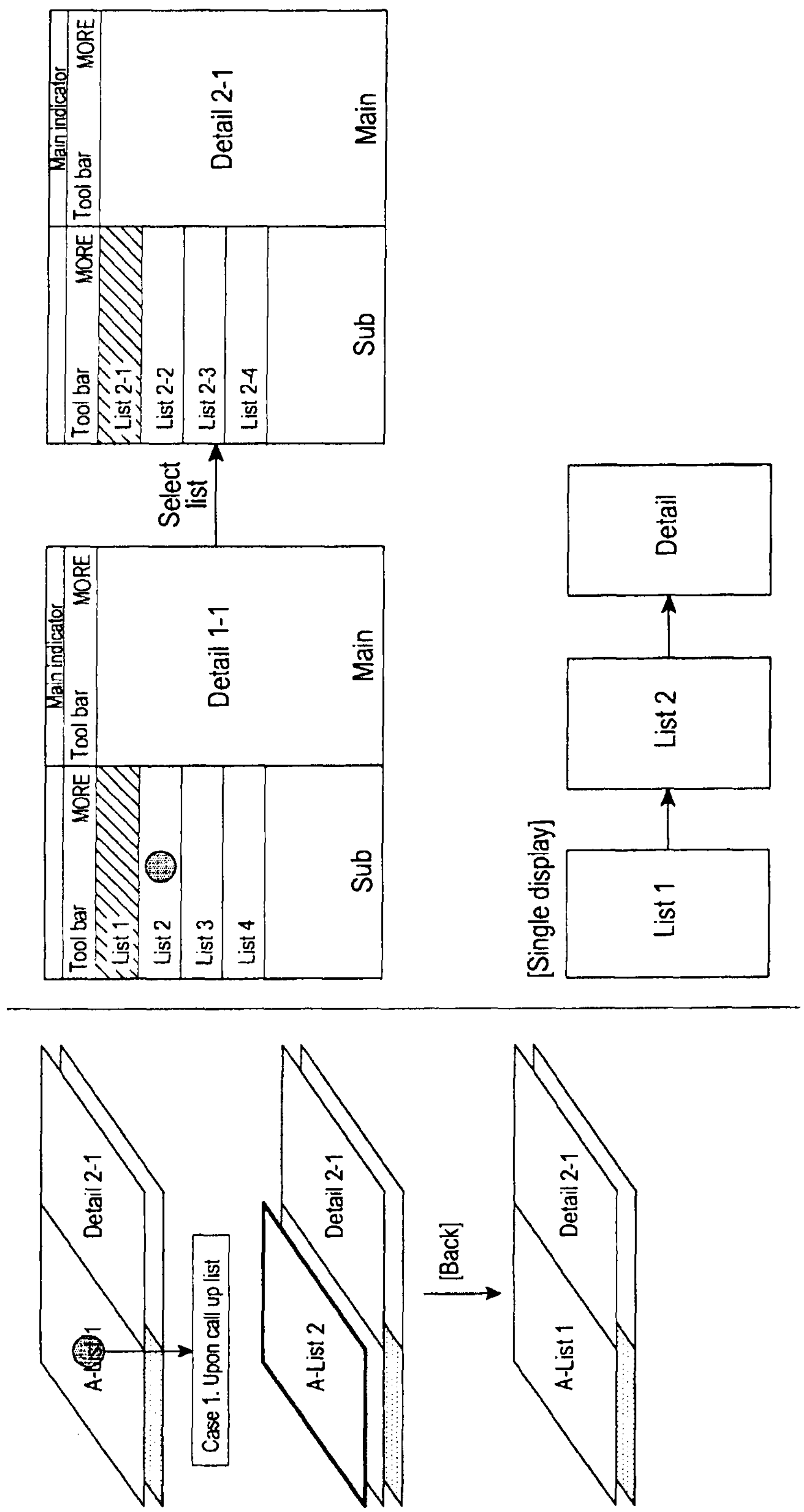

Referring to FIG. 93, where the application running screen enters into a 3rd depth or higher, the electronic device, according to an embodiment of the present disclosure, may generally display a list on the sub display and a detail screen on the main display. A content associated with the focused item on the uppermost end of each list may be displayed on the detail screen. Other various implementations may also be made possible depending on the attribute of the list.

Figure 94:
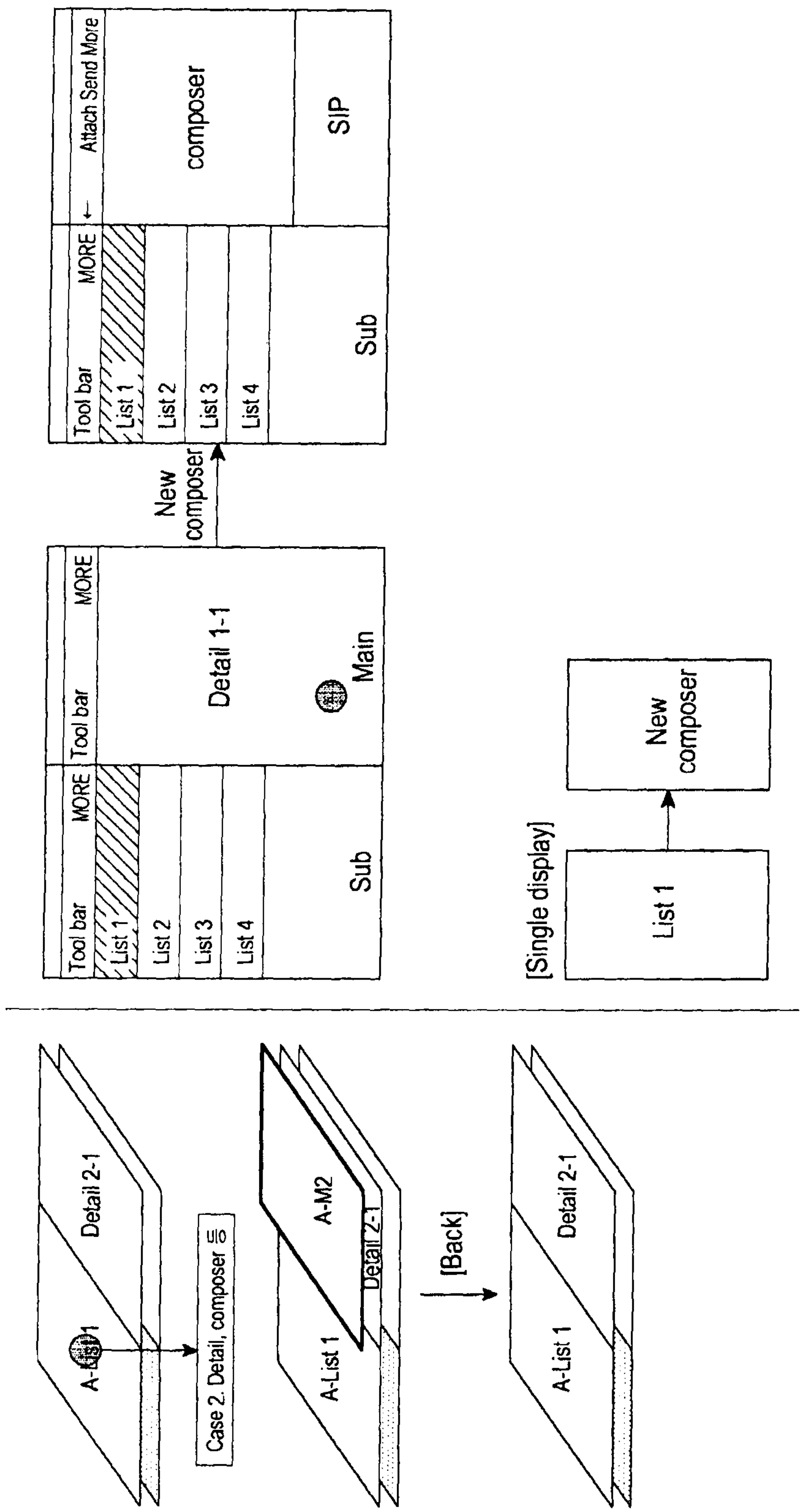

Referring to FIG. 94, according to an embodiment of the present disclosure, where the application running screen enters into a 3rd depth or higher, the electronic device may display an action, such as a composer or detail screen, corresponding to the list on the main display.

Figure 95:
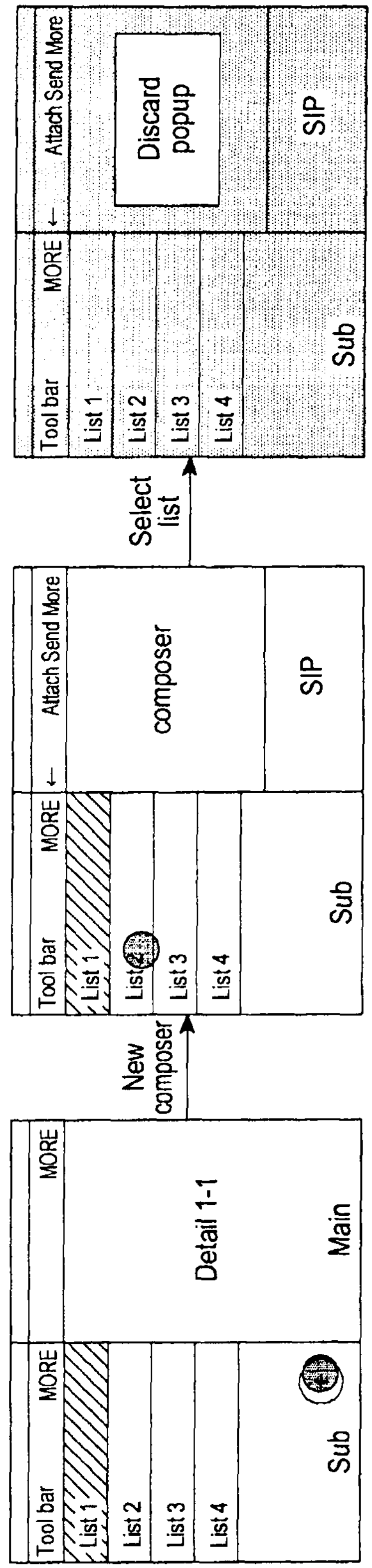

Referring to FIG. 95, according to an embodiment of the present disclosure, where the edit or composer task used to be displayed on the sub display is not done but canceled (e.g., detecting a command to display the list on the sub display while at task), the electronic device may perform the same process as a single-display electronic device processes a discard case.

Figure 96:
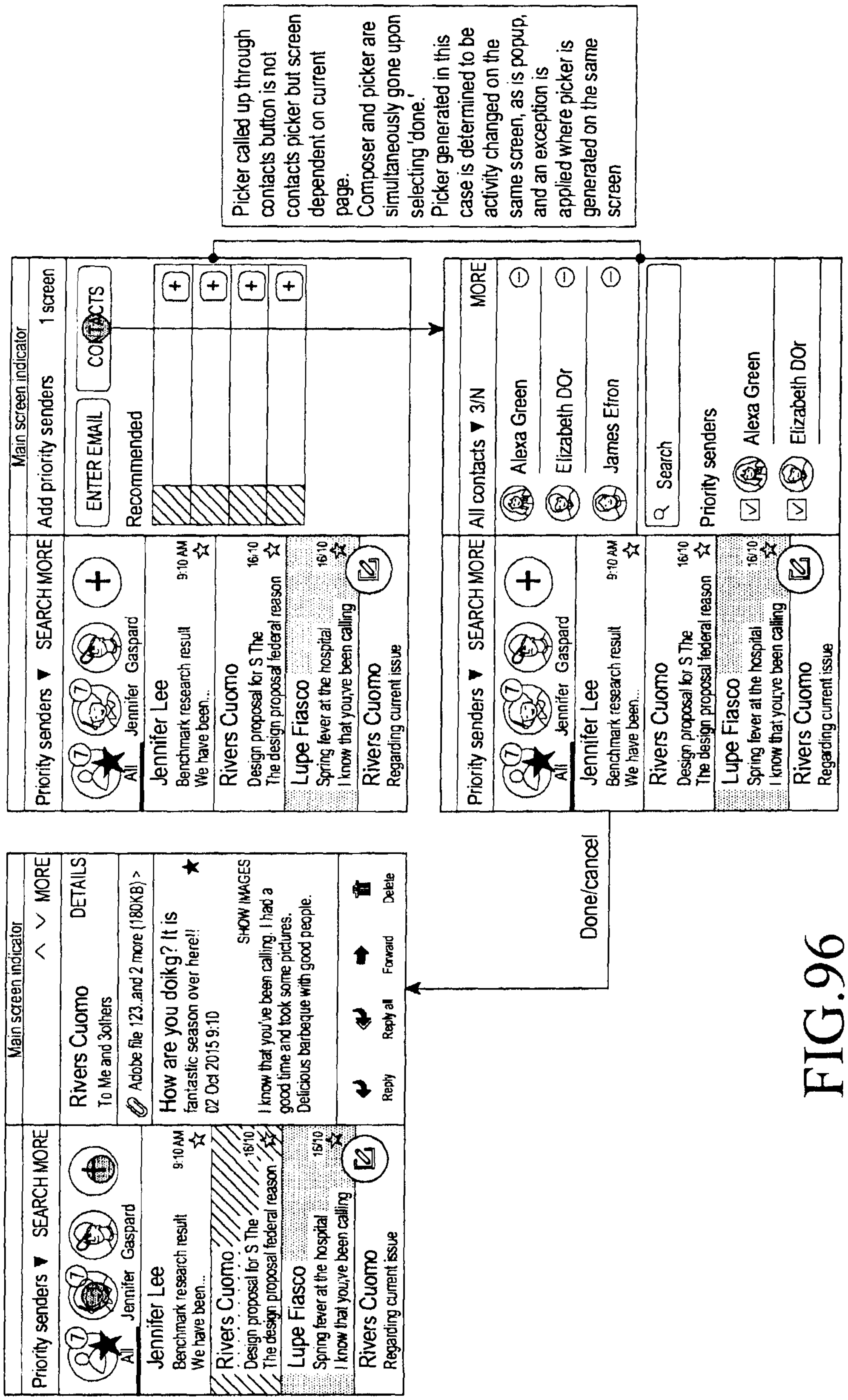

Referring to FIG. 96, according to an embodiment of the present disclosure, an exception may be made to an email application according to an embodiment of the present disclosure. For example, where a picker is called up in a composer, and the picker's depth is the same as the composer's depth as shown in FIG. 96, the electronic device may exceptionally display the composer and the picker on the same screen (i.e., the same display).

Figure 97:
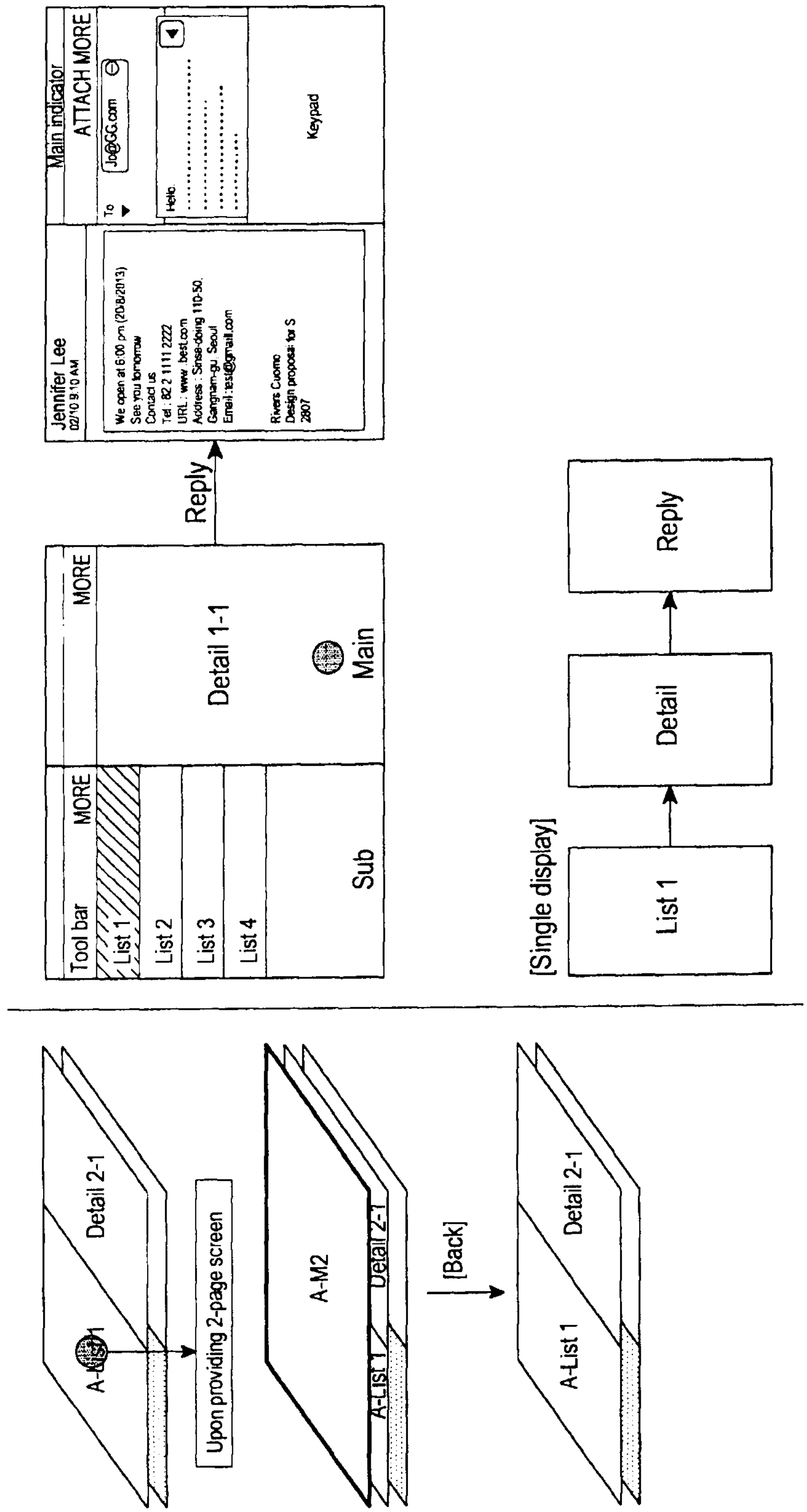

Referring to FIG. 97, according to an embodiment of the present disclosure, under the context where a screen is provided over both the displays, where the application display screen enters into a 3rd depth or higher, the electronic device, if able to use both the displays, may display a new screen on the displays both. Here, the electronic device may display the list on the sub display and the detail screen on the main display. The detail screen may include contents associated with the focused item on the uppermost end of the list. Other various implementations may also be made possible depending on the attribute of the list.

Figure 98:
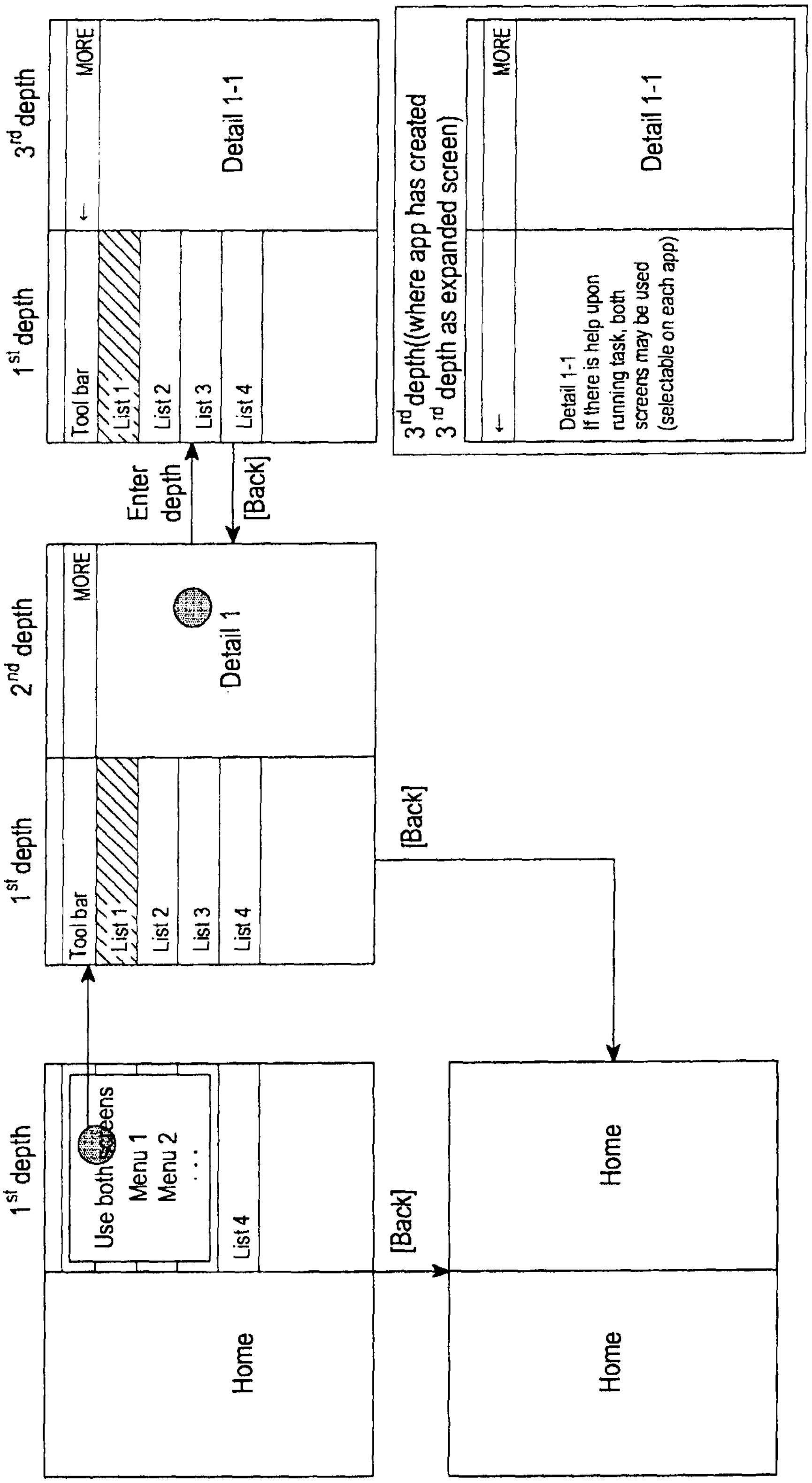

Referring to FIG. 98, according to an embodiment of the present disclosure, in connection with the layout when configuring two or more screens, the electronic device may enable the user to select the number of displays for use, e.g., one or two. When the use of two displays is selected, the electronic device may optimize the dual layout by displaying, on the sub display, useful information (2nd depth information) for the screen displayed on the main display.

Figure 99:
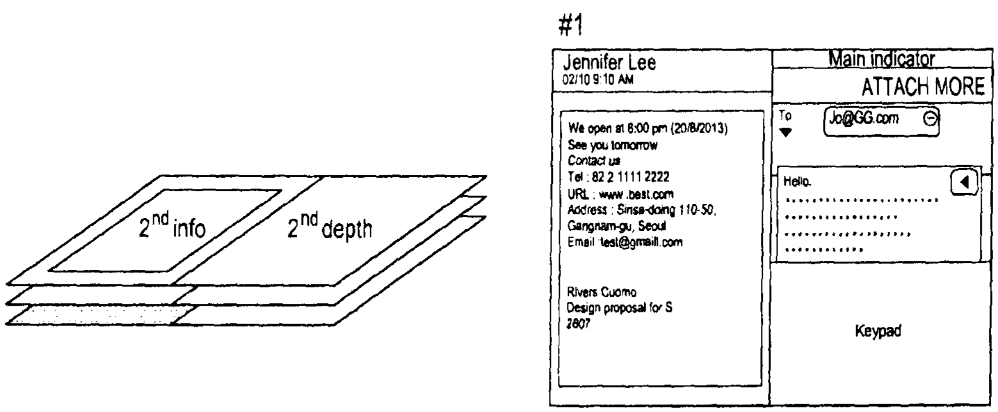

Specifically, e.g., when operating in the expand mode of the outspread modes, if a replay compose UI is displayed on the main display as shown in FIG. 99, with an email draft screen displayed on the two displays, the electronic device may display original reply email-related information on the sub display.

Figure 100:
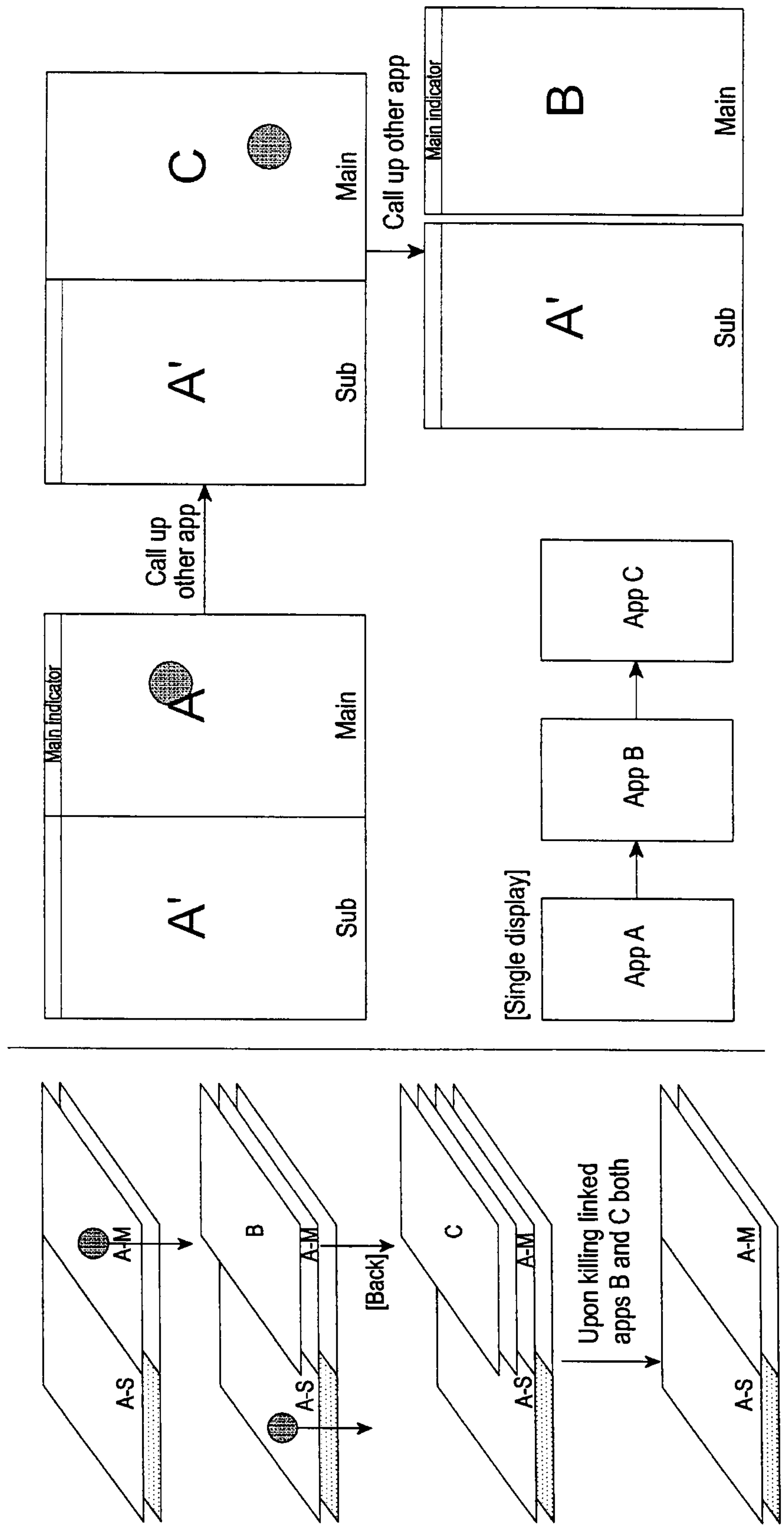

Referring to FIG. 100, according to an embodiment of the present disclosure, upon running another application, such as a linked application, the electronic device may display the existing application running screen, which used to be displayed, in a shrunken running screen. The shrunken running screen may be positioned in the display where calling up the other application has been detected. For example, where a web browser application is called up through a linked application call up command, the electronic device may display a shrunken running screen on the display where the call up has been detected. However, the electronic device may keep the application displayed shrunken in the expanded state.

According to an embodiment of the present disclosure, where a particular linked application runs, the electronic device may, rather displaying the called application on the same screen, display the execution screen of the linked application on the other display. For example, where a web browser application linked to a particular URL is called up, the electronic device may display an execution screen of the web browser application on the opposite display, not the display where the call up has been detected.

Figure 101:
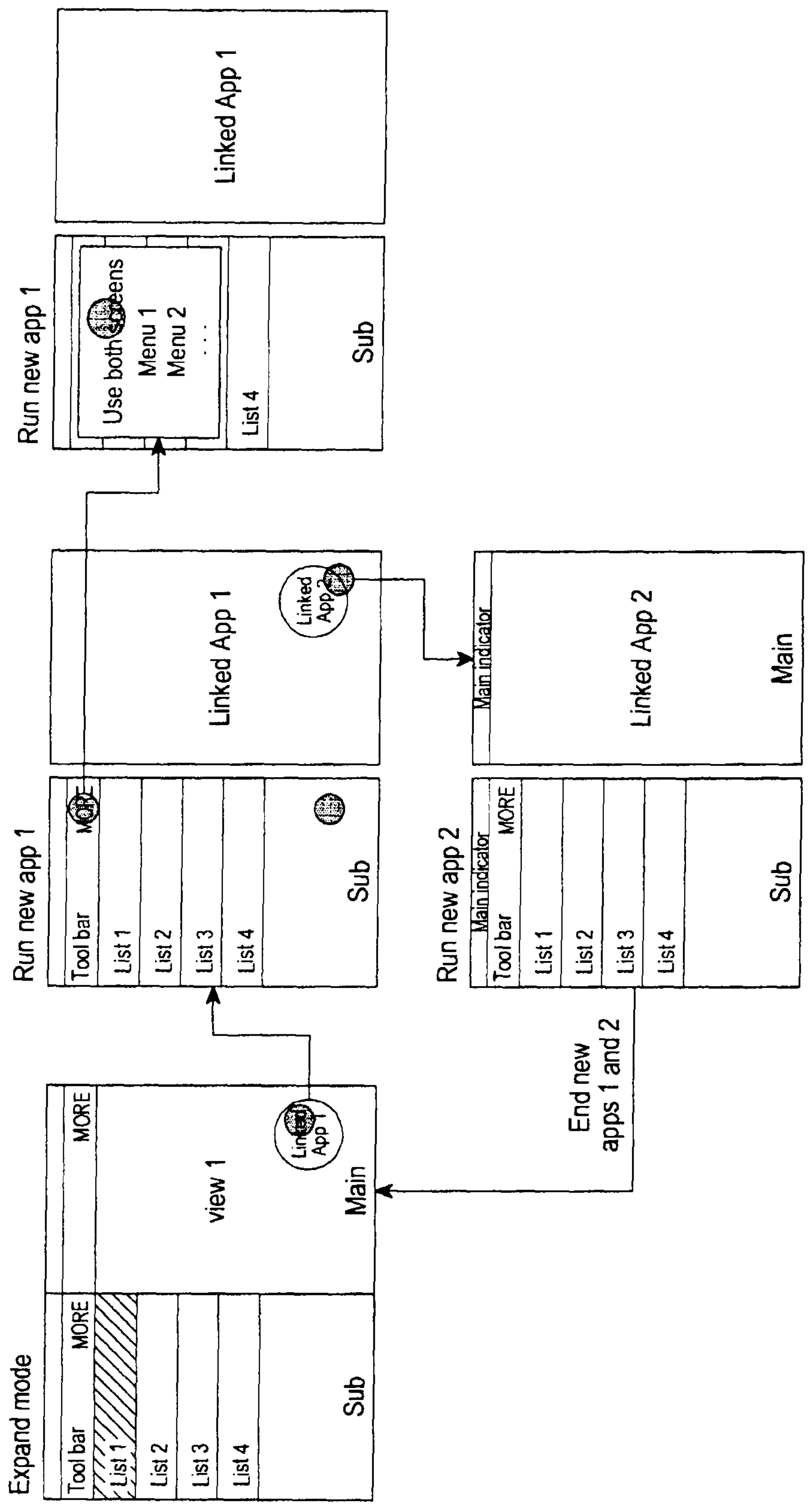

2.8.6.14.3. Description of Calling Up New Application

Where calling up a new application is detected in the expand mode, as shown in FIG. 101, the electronic device, according to an embodiment of the present disclosure, may call and display an execution screen of the linked application called up, as a screen corresponding to a shrunken mode, on the display where the call up has been detected. According to an embodiment of the present disclosure, the electronic device may display an execution screen of the web browser application accessed through a URL, on the opposite display of the display where the call up has been detected, as an exception for calling up the web browser application. Here, the existing application running screen being displayed may automatically be reduced into a shrunken screen. In this case, the shrunken application is freed from the focusing, and the electronic device, if any content being drafted, may provide a discard pop-up.

Figure 102:
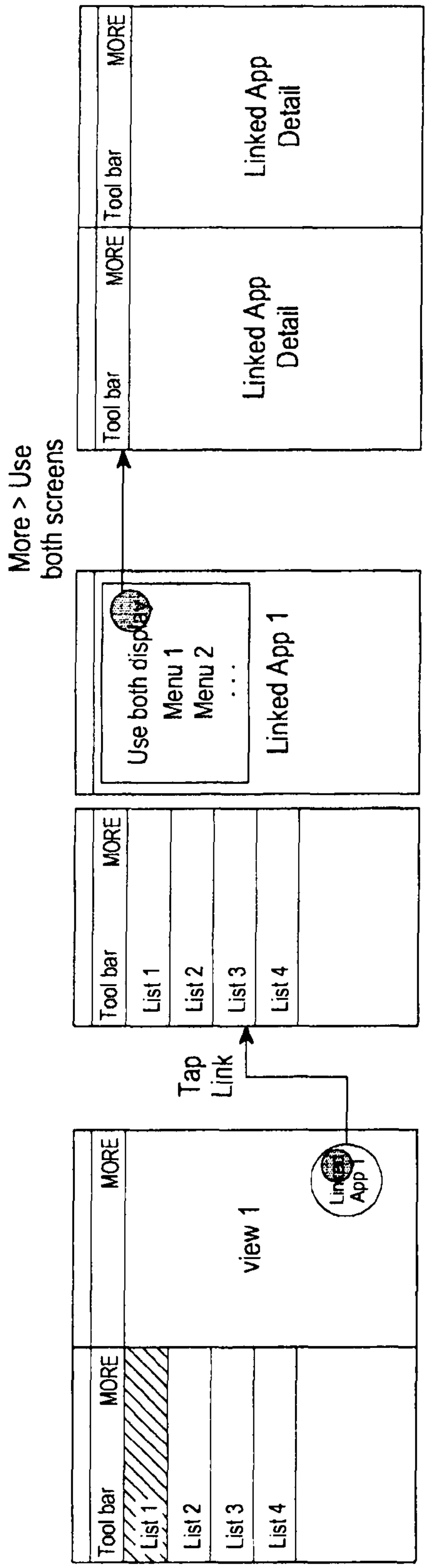

When the linked application terminates, the electronic device, according to an embodiment of the present disclosure, may keep the existing application running screen being used in the shrunken state. Here, the execution screen of the new application called up may be expanded as shown in FIG. 102.

2.8.6.15. Description of Control-Content View

Figure 103:
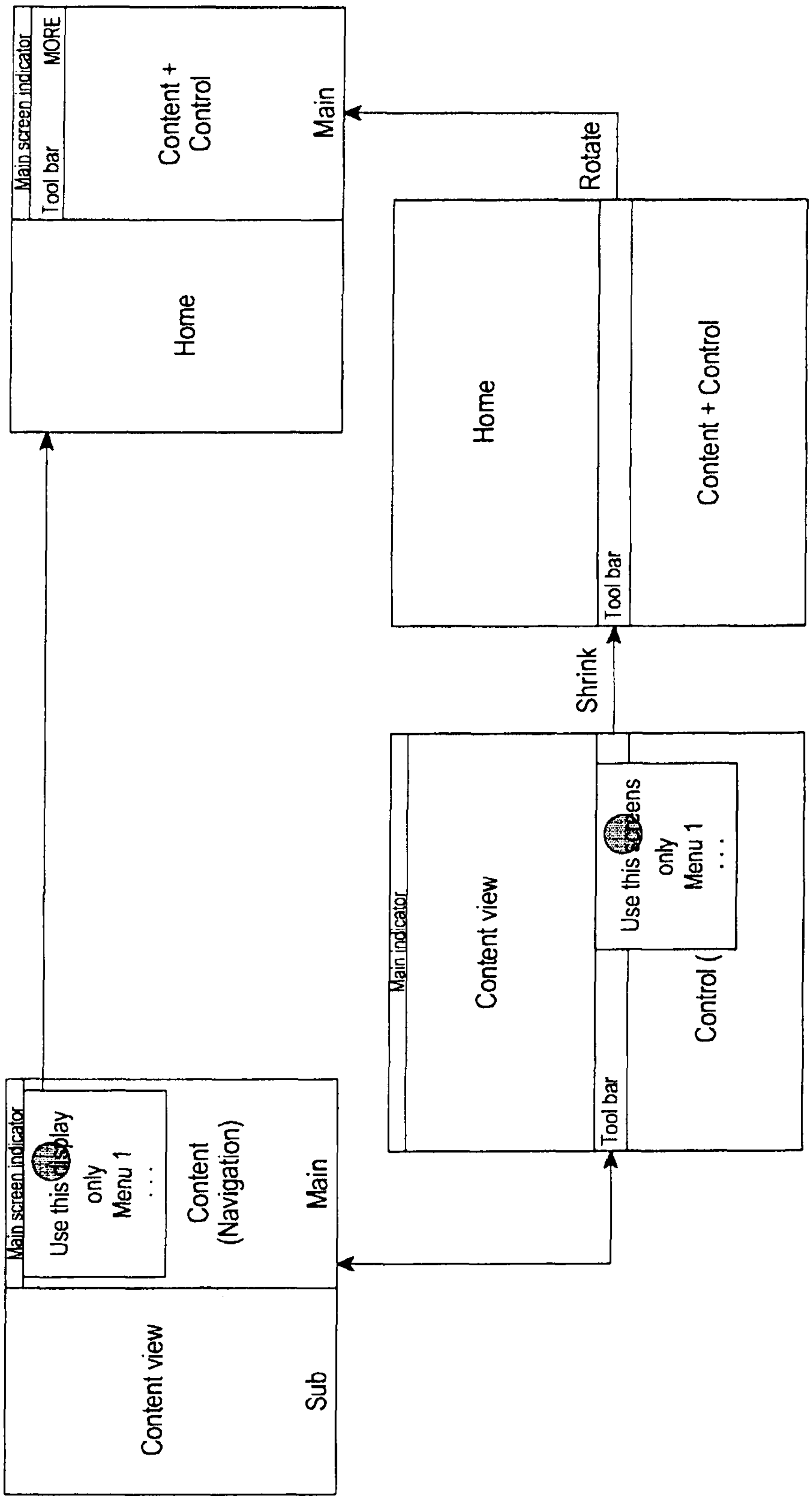

'Control-content view type' may mean when screens respectively displayed on the left-hand and right-hand displays are not in the depth relation and may come primarily into content/control (e.g., navigation) functions. Referring to FIG. 103, according to an embodiment of the present disclosure, whether to support the landscape mode/portrait mode of the control-content view rests on application contexts, and when the control-content view is not supported, a corresponding expand menu may not be displayed. A tool bar may be positioned on the control screen—e.g., the tool bar may be displayed on the main display. In the embodiment of FIG. 103, the content/control view is displayed on each display in the portrait mode, and when a rotate is detected, the electronic device may display content/control views on the displays, respectively, in the landscape mode. In this case, the electronic device may display a single shrunken screen including the content/content on only one of the displays while displaying another screen (e.g., the home screen) on the other display. Upon detecting another rotate, the electronic device may display a shrunken screen on one of the displays (e.g., the main display) and display another screen (e.g., the home screen) on the other display in the portrait mode. According to an embodiment of the present disclosure, the electronic device may display a portrait-mode shrunken screen directly on the portrait-mode expanded screen.

Figure 104:
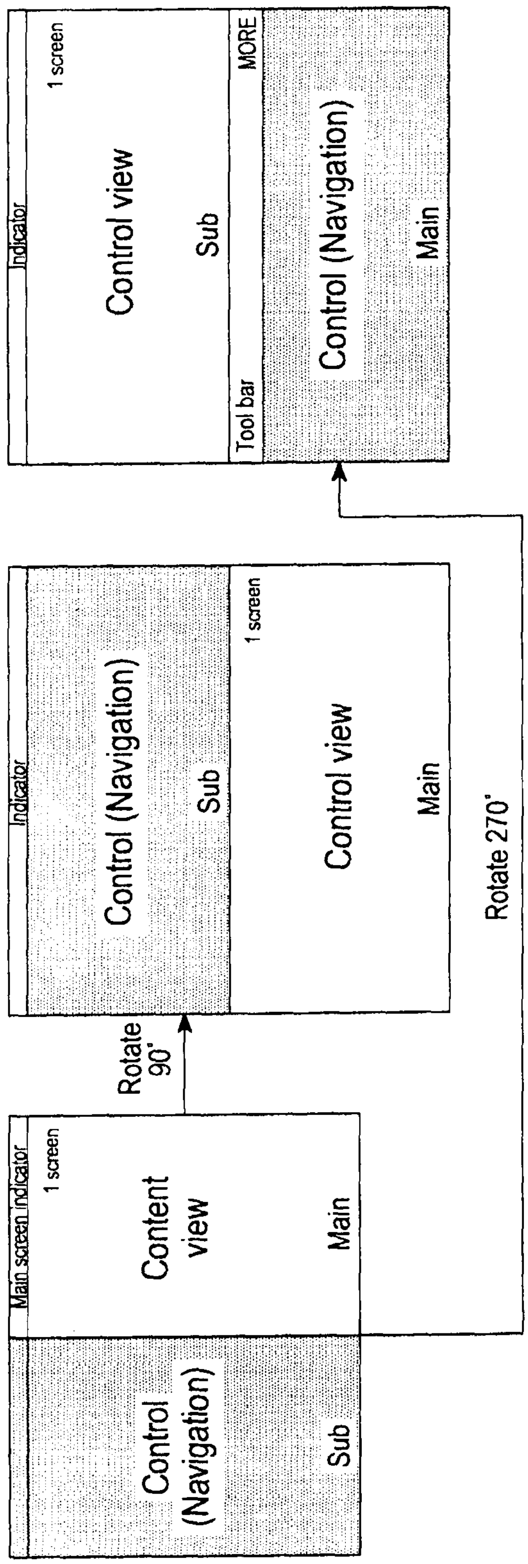

FIG. 104 illustrates a screen configuration according to an embodiment of the present disclosure. For example, where an application requiring preview as does a camera runs, the electronic device may display a content view on the main display and display a control view (e.g., a navigation) on the sub display depending on application settings.

Figure 105:
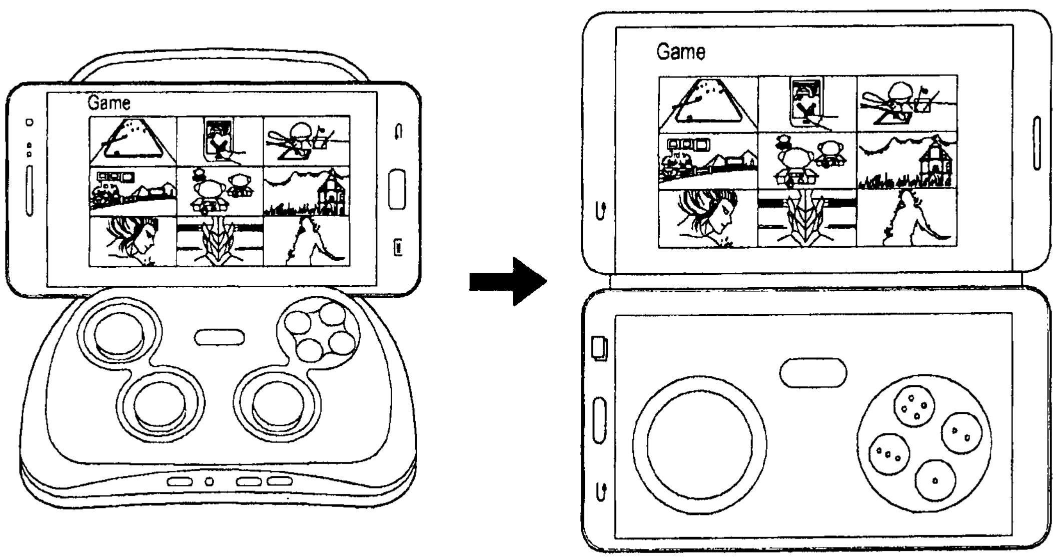
Figure 106:
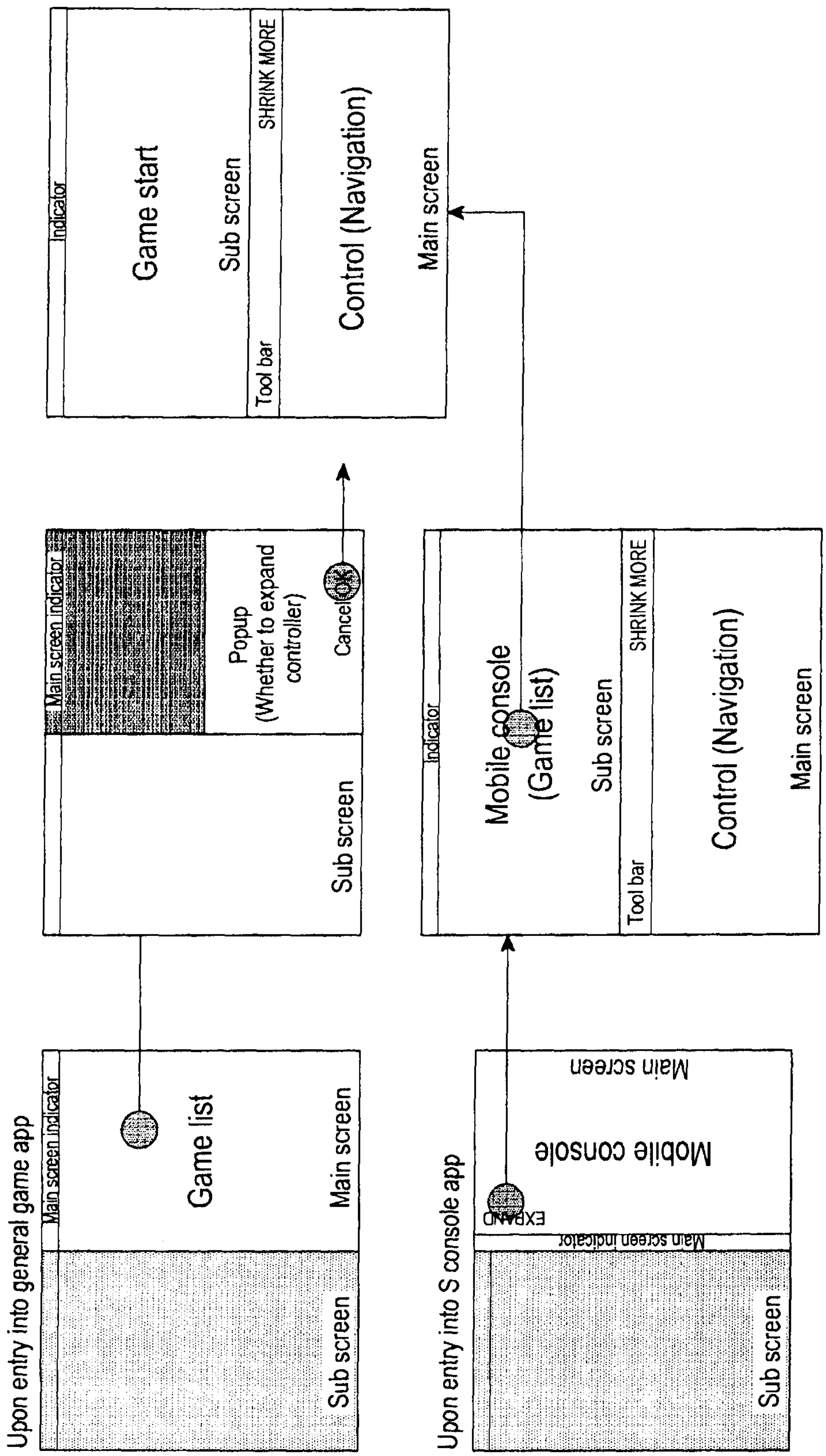

As another example, for a game as shown in FIGS. 105 and 106, where the expansion is not supported in the portrait mode, and no expand button can be added in the application produced by a third party, the electronic device may enable whether to expand controller to be selected through a popup. A scenario for forced expansion is unavailable due to unawareness of the content of the screen displayed on the sub display, but the electronic device may enable the game to proceed while chatting on through the sub display.

2.9 Description of Popup 2.9.1. Description of System Popup

Figure 107:
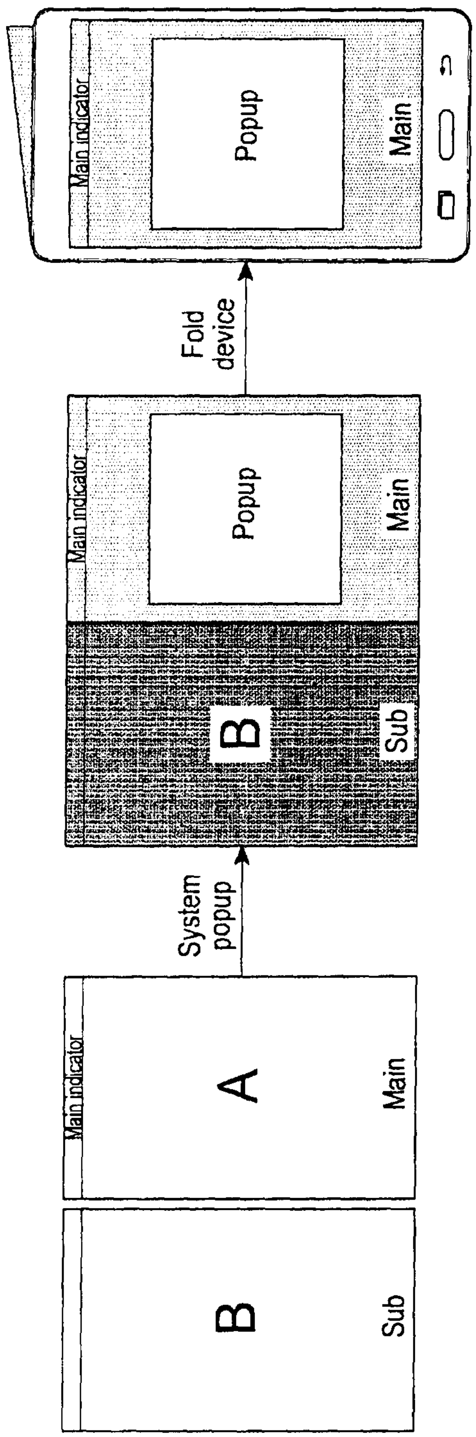
FIGS. 107 to 112 concept views illustrating a pop-up according to an embodiment of the present disclosure.

According to an embodiment of the present disclosure, the electronic device may, as default, generate a system popup on the main display. Referring to FIG. 107, upon detecting a change in form type from the dual mode to the folded mode with a popup generated, the electronic device may keep the popup in the position, and thus, it may display the popup on the active display.

Figure 108:
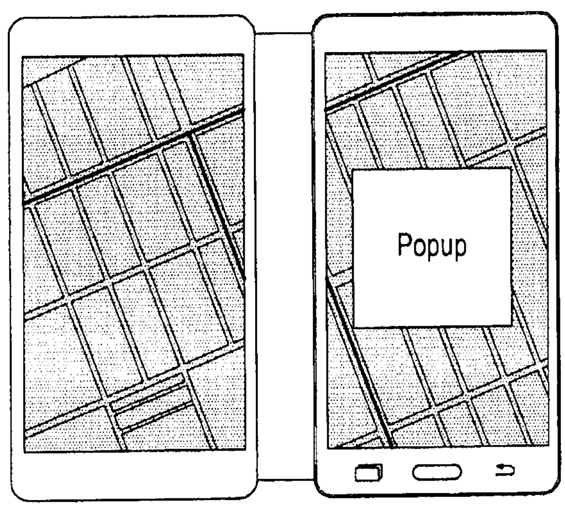

2.9.2. Description of Popup on Full Screen (or Full View)

Where one content is displayed on two displays both, the electronic device, according to an embodiment of the present disclosure, may enable a popup to be generated on the main display as shown in FIG. 108.

2.9.3. Description of Dual Mode

According to an embodiment of the present disclosure, the electronic device in the dual mode may enable a per-application popup to be generated on each of the displays respectively displaying application running screens. In the expand mode, the electronic device may enable a popup associated with an individual application to be generated on the display where a corresponding action is detected or displayed, and a system popup to be generated always on the main display.

Figure 109:
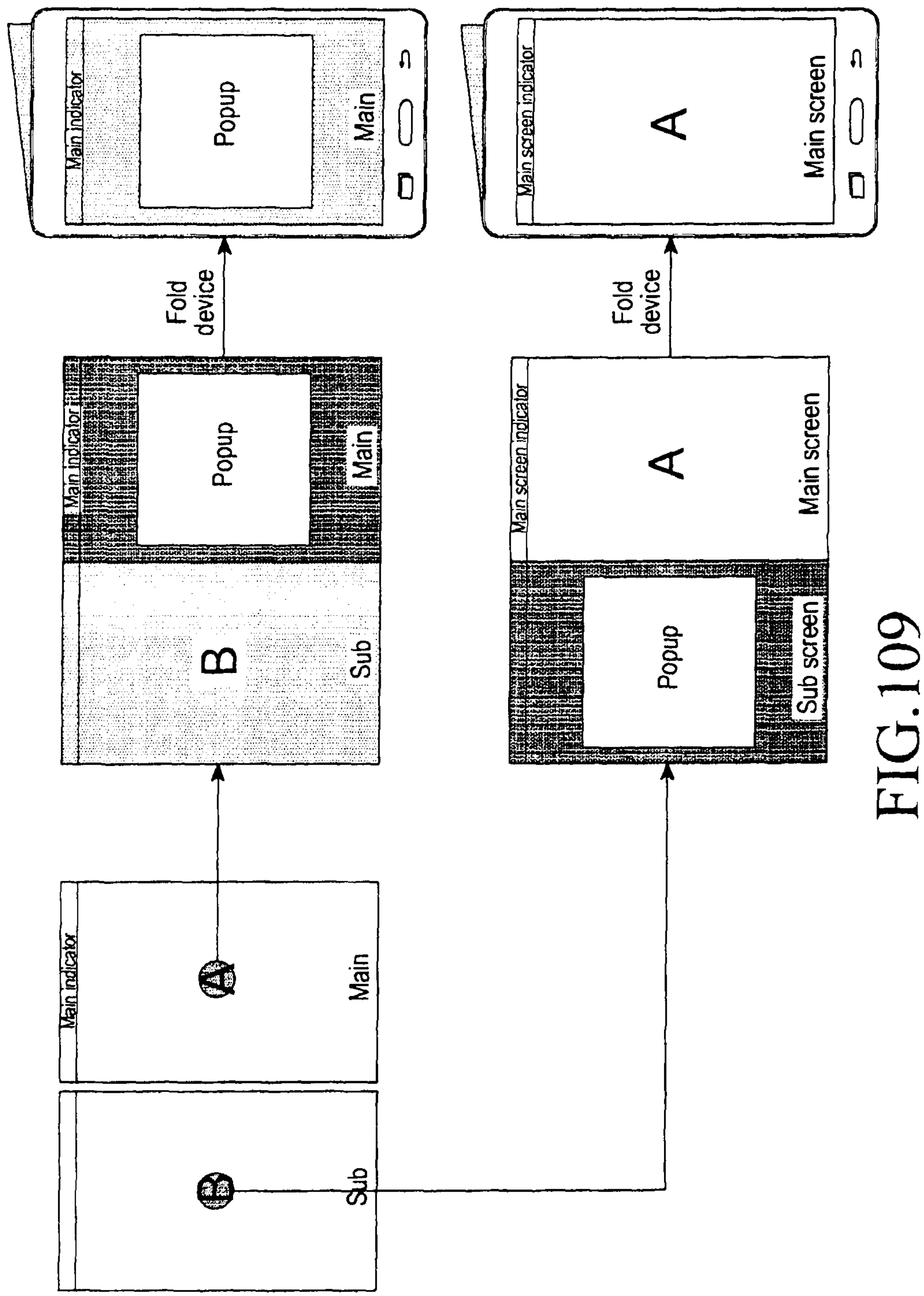

Referring to FIG. 109, according to an embodiment of the present disclosure, even detecting a change in form type from the dual mode to the folded mode with a popup generated, the electronic device may keep displaying the popup, and the application displayed on either display may make a switch corresponding to the folded mode.

Where the display where the popup has been generated is turned off by the change in form type, the electronic device may release the popup or display a popup on the active display.

2.9.4. Description of Alert

Figure 110:
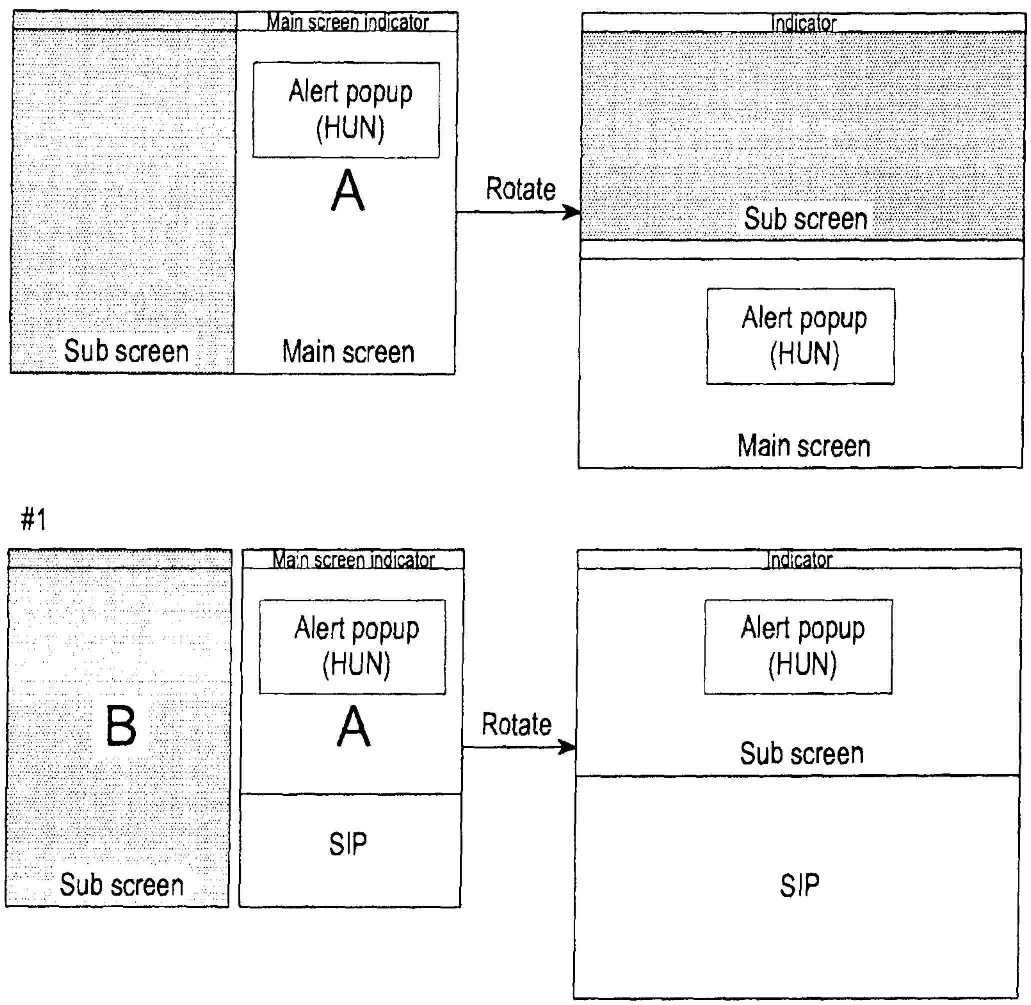

According to an embodiment of the present disclosure, an alert may be provided as a heads up notification (HUN) as shown in FIG. 110 in order to minimize interference with the user's view to the screen. According to an embodiment of the present disclosure, the electronic device may, as default, display an alert on the main display. Where an alert is called up on an individual application, the electronic device may display an alert on the display displaying the execution screen of the individual application. However, when a keyboard in the landscape mode is called up, the electronic device may display an alert hiding the execution screen of the focused application in order to minimize the interference with the called-up keyboard. Here, the electronic device may display the alert on the sub display.

Figure 111:
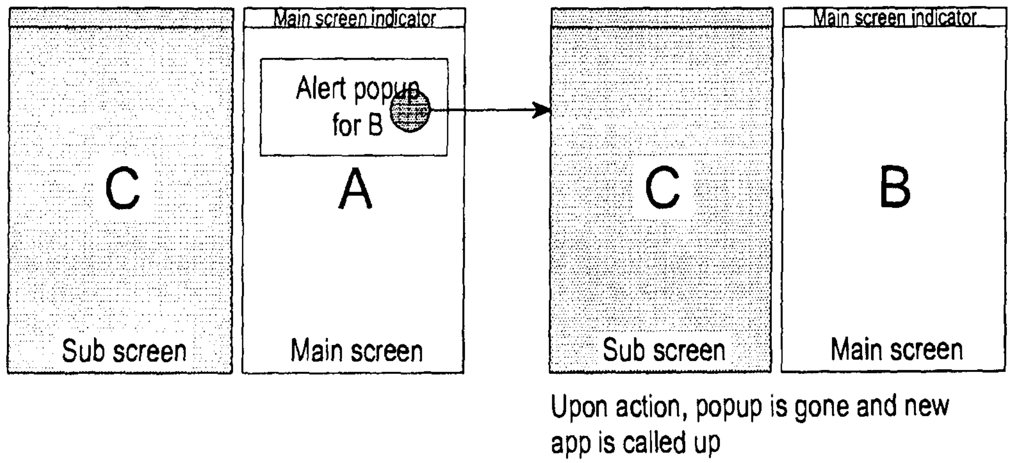
Figure 112:
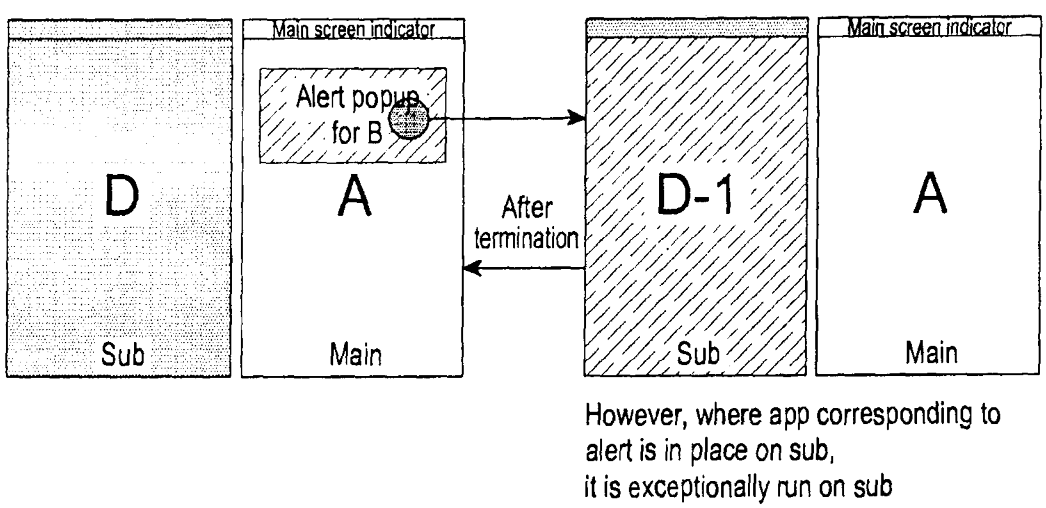

Referring to FIG. 111, where the alert has a function for performing a next action (i.e., a second action), the electronic device, according to an embodiment of the present disclosure, may provide the function on the same display. For example, where an alert popup provides operations, such as accept call or replay, and the user selects one, the electronic device may display an image associated with the corresponding function on the display where the alert has been displayed.

Where an application corresponding to the alert or an application to be performed by the user's selection in the alert is displayed on the opposite display of the display where the alert popup is displayed, the execution screen of the application may also be run on the sub display. For example, where the alert popup provides an operation, such as accept call or reply, and a call application is in display on the sub display as shown in FIG. 112, the electronic device may display an image associated with the function selected through the sub display, not the main display.

2.10 Description of Gesture Interaction Mode 2.10.1. Description of Move

Figure 113:
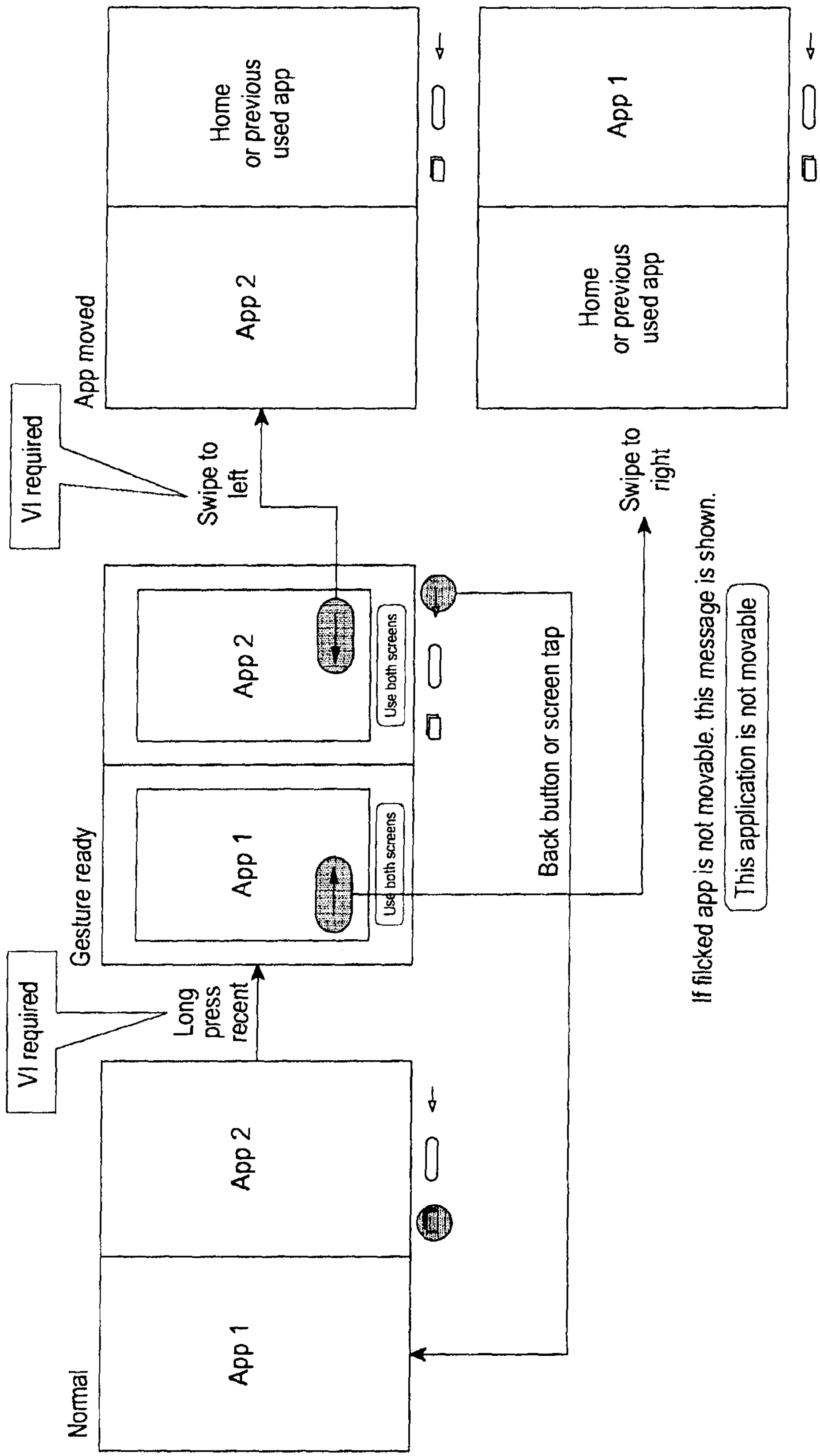
FIGS. 113 to 121 are views illustrating a gesture interaction mode according to an embodiment of the present disclosure.

Upon detecting a long press gesture input for a recent-run application list call key, the electronic device, according to an embodiment of the present disclosure, may enter a move ready mode. Here, as shown in FIG. 113, the electronic device may apply a capture operation to both the screens respectively displayed on the two displays to obtain images and may display both the images in a reduced size than that of the original images. The electronic device may make a switch so that the reduced images float. Thereafter, the electronic device may detect a left/right swipe gesture to the inside with respect to the application stack, and in response to the detection, the electronic device may move the position where the execution screen is displayed. In the move ready mode, upon detecting a designation of a back button, a tap gesture on the screen, or the movement of the application is done, the electronic device may terminate the move ready mode and go back to the normal mode.

According to an embodiment of the present disclosure, the electronic device may keep a particular immovable application, e.g., a phone application, from moving. Upon detecting a swipe on the immovable application, the electronic device may enable the application to be dragged and may provide a graphic enabling the application to go back to its original position when a release of the dragging is detected. Further, the electronic device may display a toast popup indicating that the application is immovable. The electronic device may abstain from displaying the home screen in a gesture mode, e.g., the move ready mode.

2.10.2. Description of Immovable Cases

Figure 114:
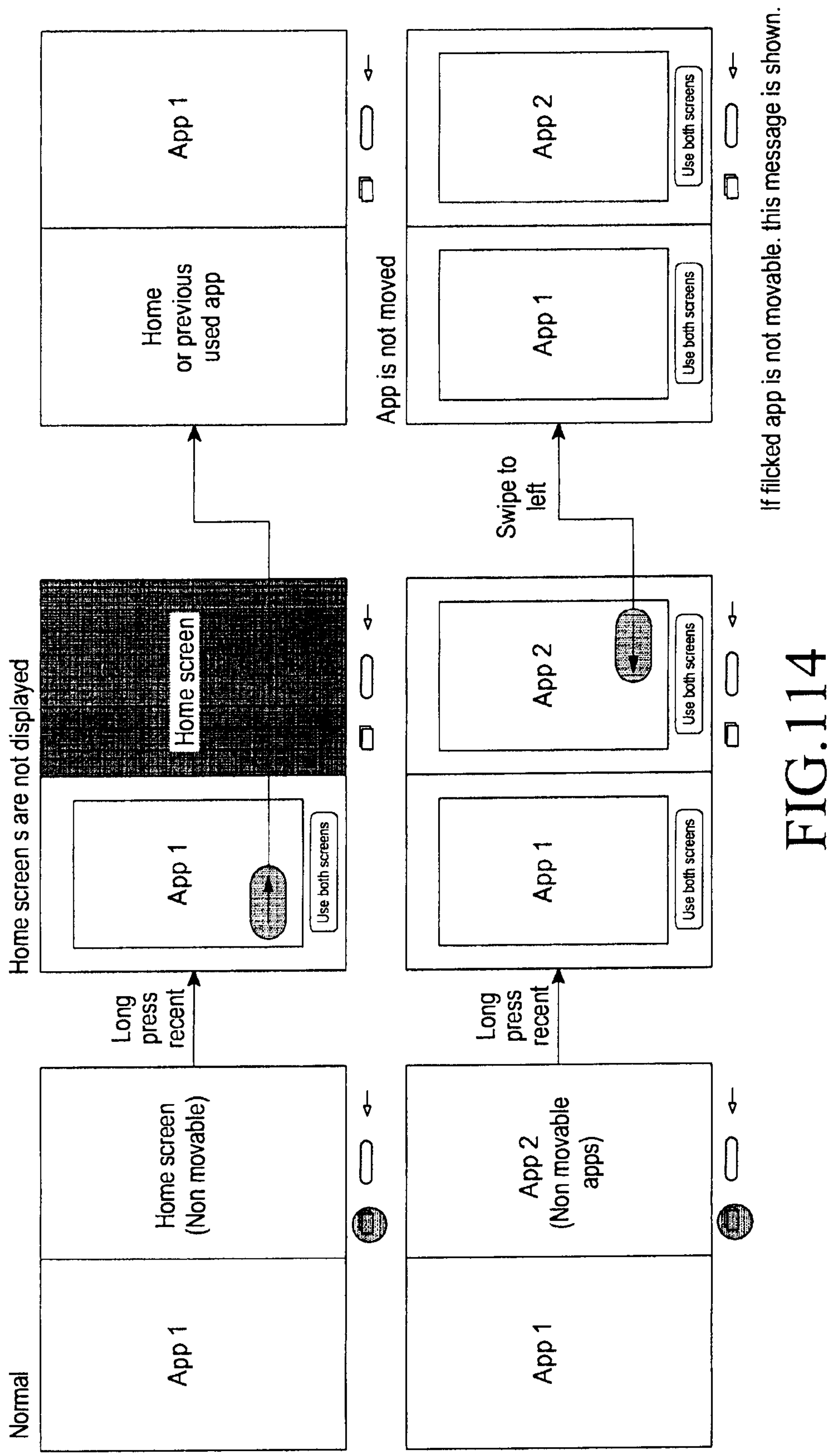

Referring to FIG. 114, upon entering a gesture mode, the electronic device, according to an embodiment of the present disclosure, may display the home screen as 'Home screen." Where the home screen is displayed on both the displays, the electronic device may display both the displays as 'home screen,' without performing other operations.

Where an immovable application, e.g., a phone application, runs, the electronic device, according to an embodiment of the present disclosure, may abstain from moving the phone application, and when a swipe gesture is entered, display such a graphic effect as if the phone application moves but goes back to its original position, together with a toast popup indicating that the application is immovable.

2.10.3. Description of Termination of Application

Figure 115:
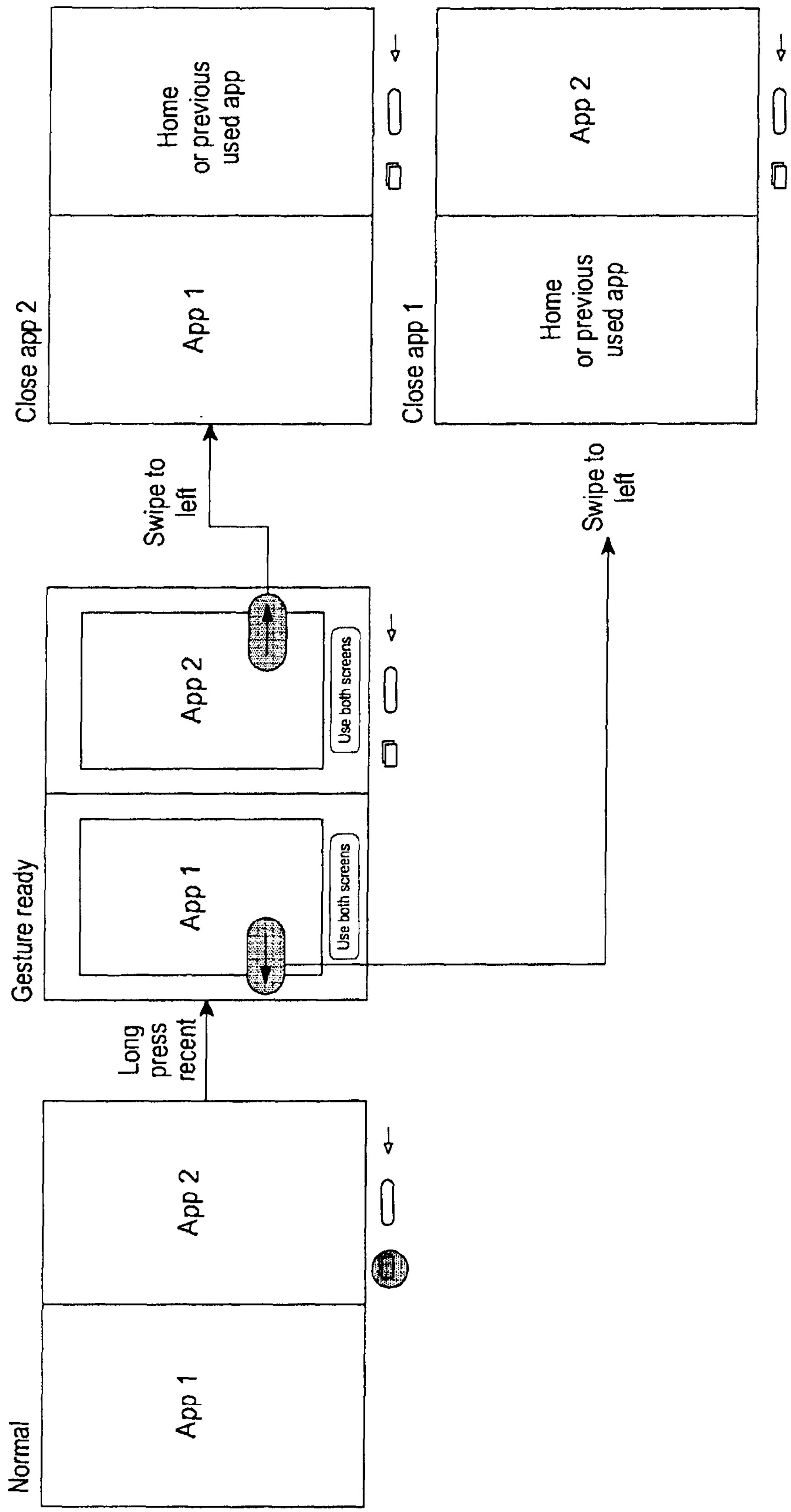

Referring to FIG. 115, according to an embodiment of the present disclosure, upon detecting a swipe gesture made outwards for the application running screen displayed as if it is floated, the electronic device may terminate the application.

2.10.4. Description of Returning to Home Screen

Figure 116:
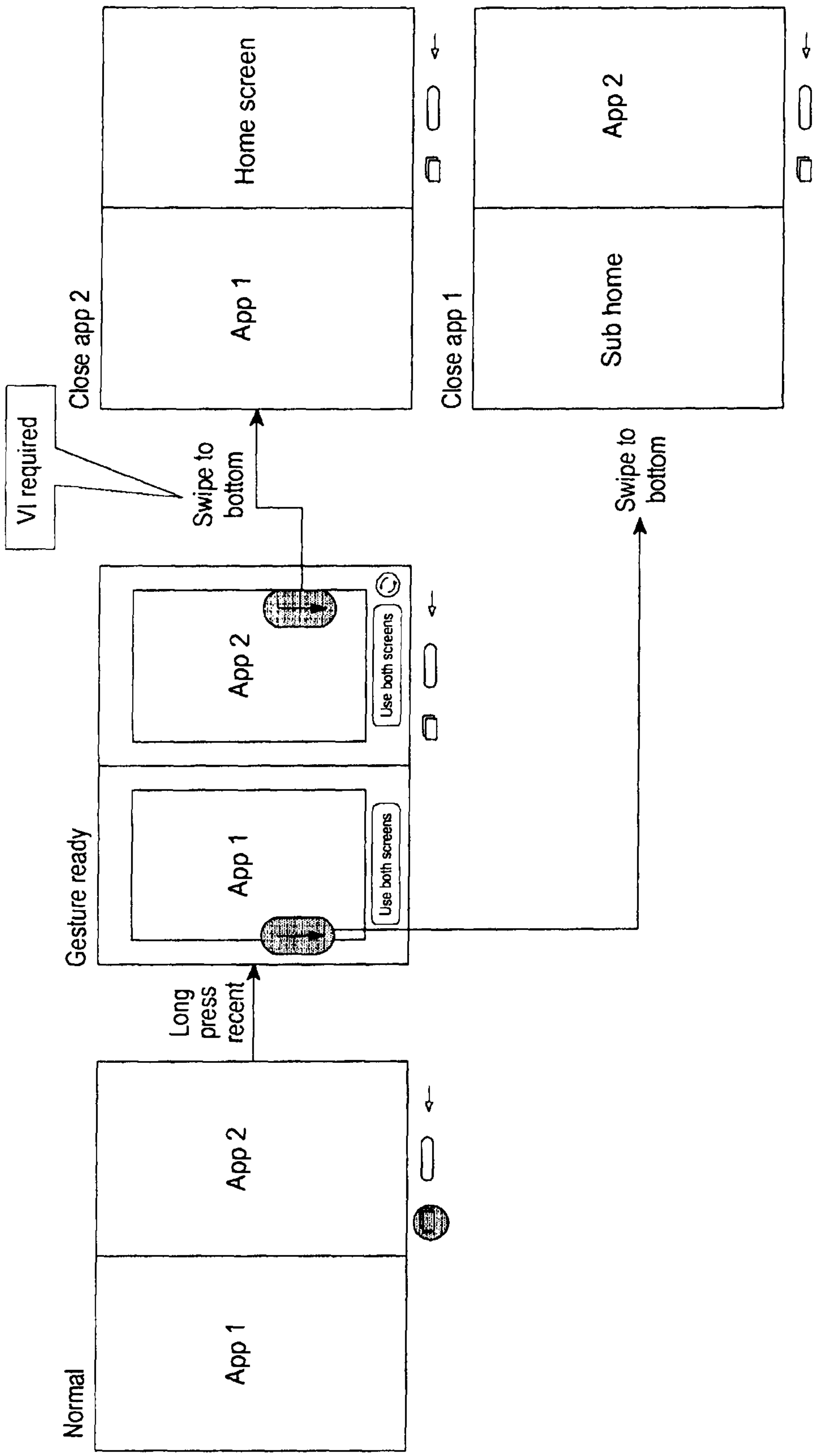

Referring to FIG. 116, according to an embodiment of the present disclosure, upon detecting a swipe gesture made downwards for the application running screen displayed as if it is floated, the electronic device may display the home screen on the display where the swipe gesture has been detected. In this case, the electronic device may be configured to select an operation corresponding to the swipe gesture as one of the termination of the application or the display of the home screen depending on the direction of the detected swipe gesture. For example, upon detecting a swipe gesture in a left or right direction, the electronic device may terminate the application. For example, upon detecting a swipe gesture in an upper or lower direction, the electronic device may display the home screen on the display.

2.10.5. Description of Use of Both Displays

Figure 117:
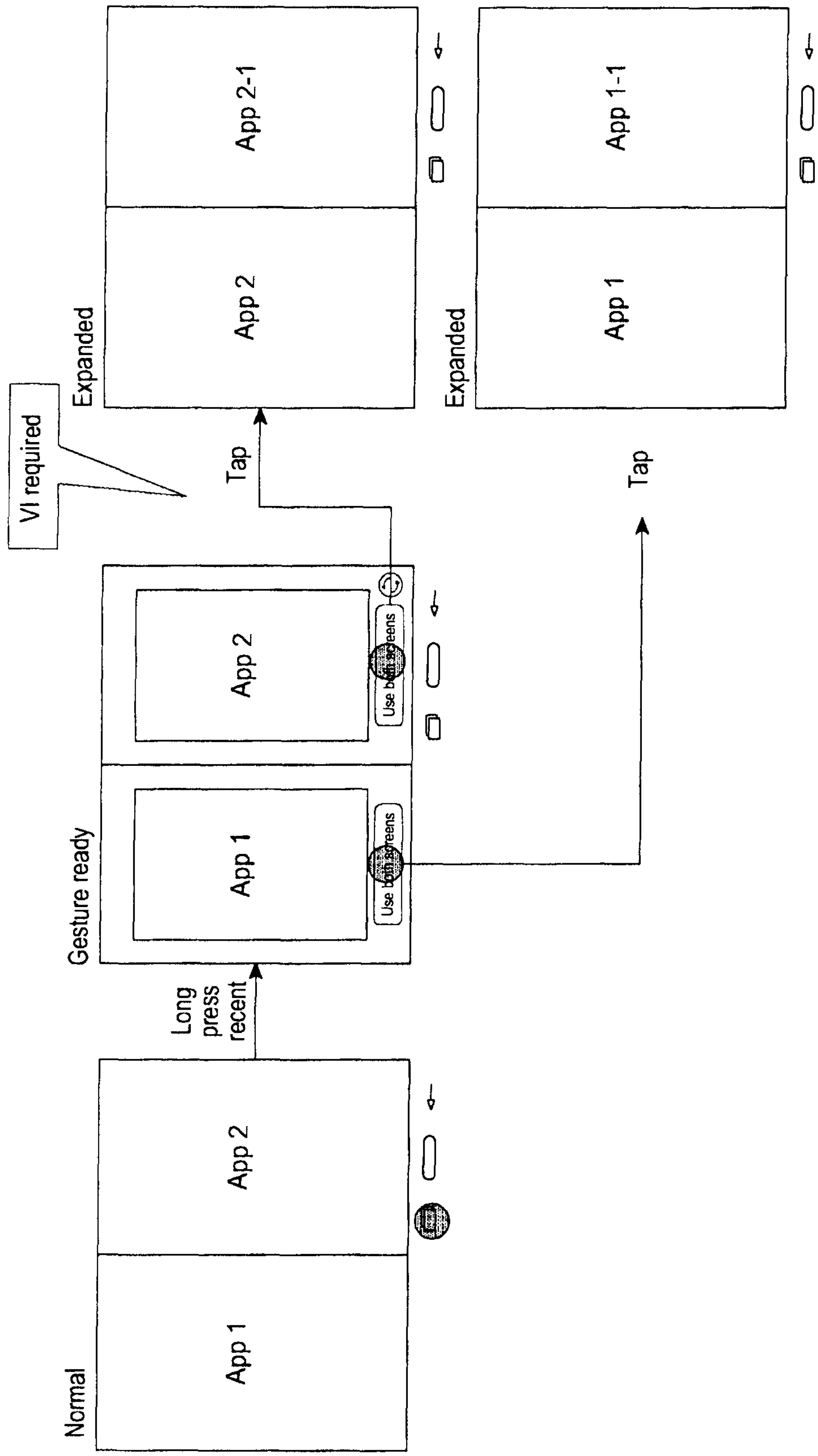

When an application supportive of the expand function runs, the electronic device, according to an embodiment of the present disclosure, may display a "User both screens" or "expand" button, along with an application running screen, as shown in FIG. 117. Upon detecting a designation for the button, the electronic device may display an expanded running screen of the application on both the displays. Where an application not supporting the expand function runs or an expanded running screen has already been displayed, the electronic device may abstain from displaying the "User both screens" button.

2.10.6. Description of Use of One Display

Figure 118:
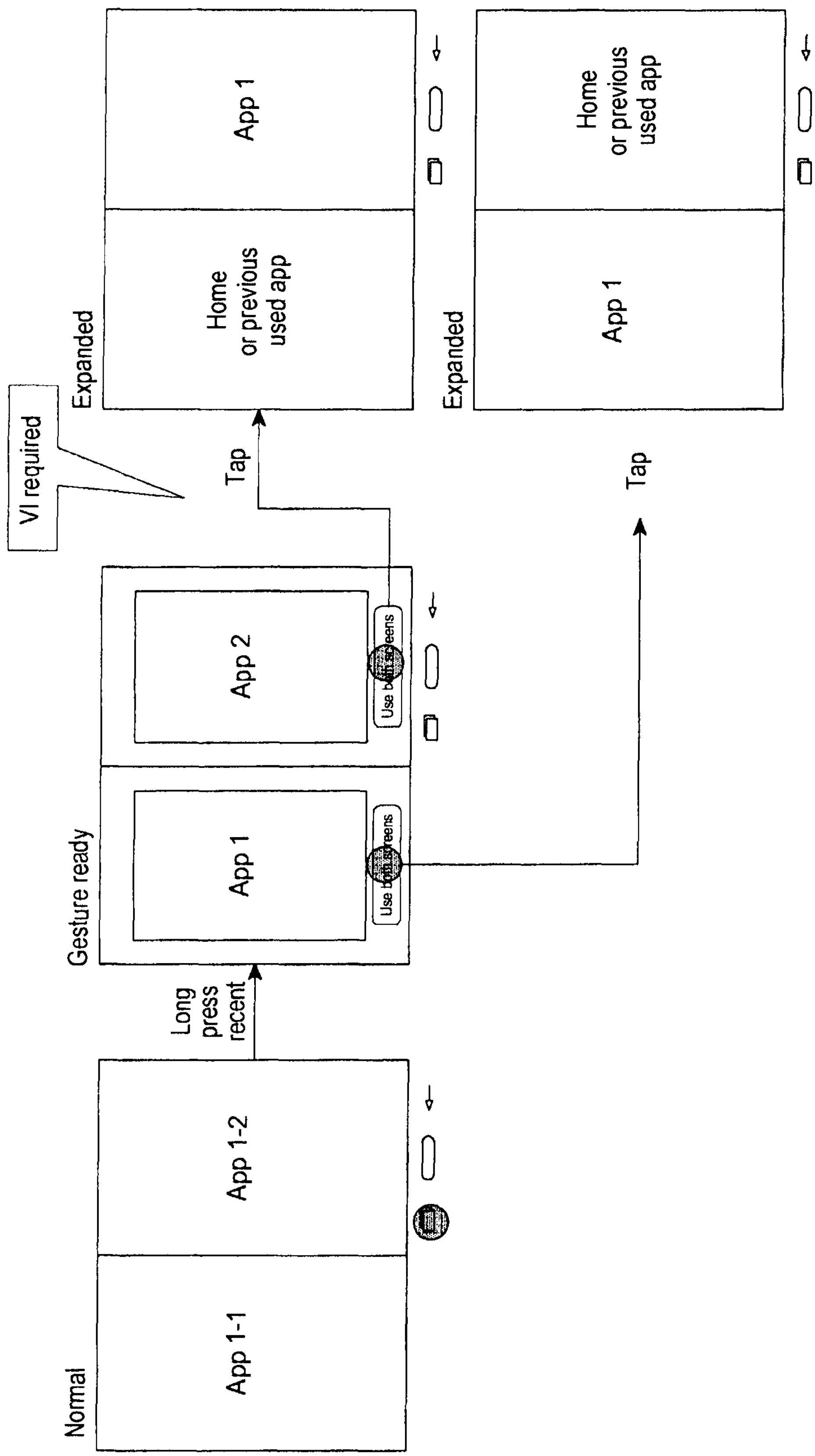

Referring to FIG. 118, the electronic device in the expand mode may display a "Use this screen only" along with an expanded running screen as shown in FIG. 118, according to an embodiment of the present disclosure. Upon detecting a designation of the "Use this screen only" button, the electronic device may display a shrunken running screen on one display, e.g., the display where the designation has been detected. Meanwhile, the electronic device may not provide the swipe function in the expand mode.

2.10.7. Description of Interaction of Application Displayed Expanded

Figure 119:
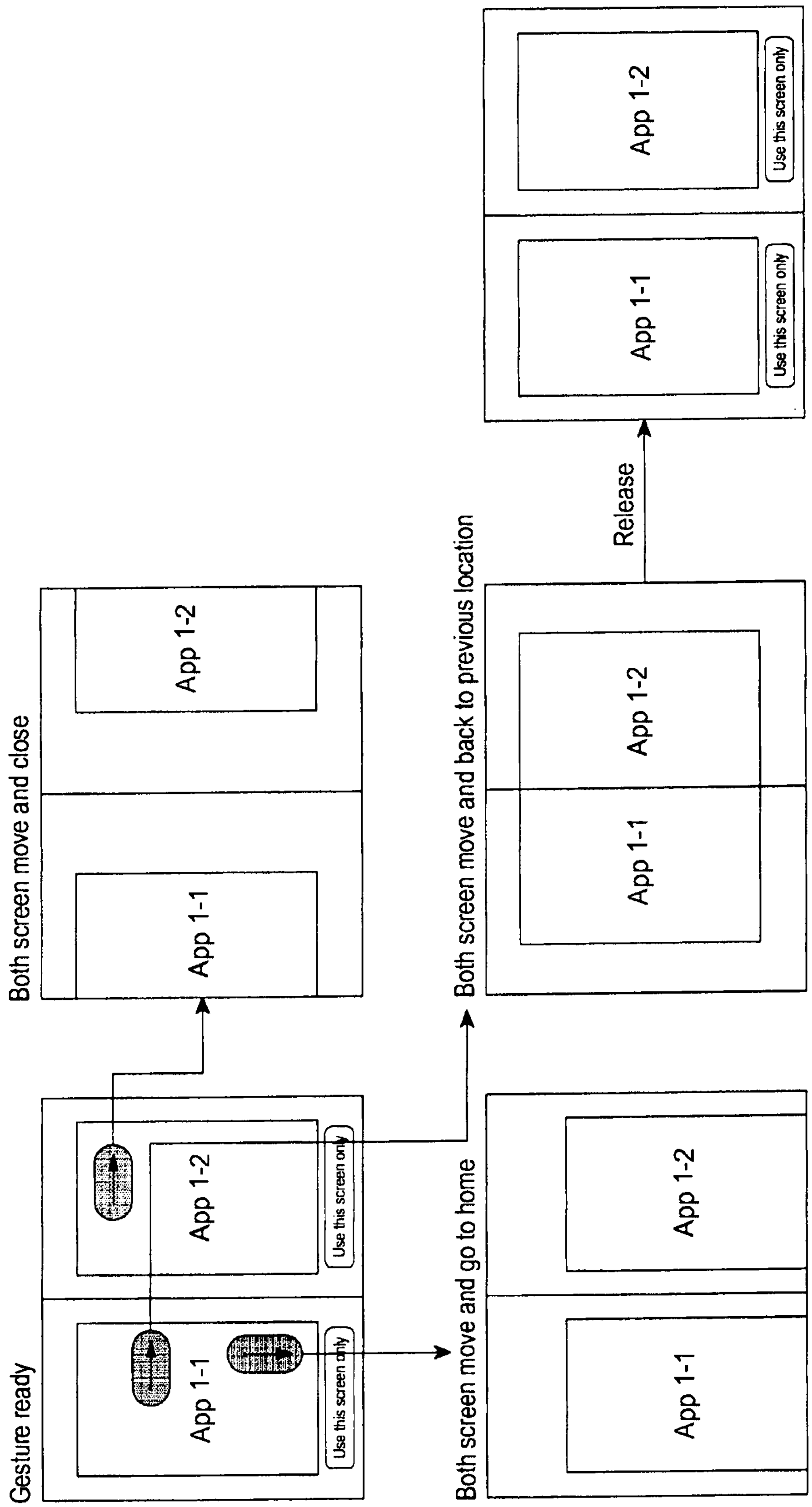

FIG. 119 is a view illustrating an example of processing a swipe gesture input on an application running screen displayed expanded, according to an embodiment of the present disclosure.

According to an embodiment of the present disclosure, upon detecting a swipe gesture to the outside on the application running screen displayed as if it is floated in the expand mode, the electronic device may display such a graphic effect as if both the execution screens together move and then terminate the application. Upon detecting a swipe gesture to the inside on the application running screen displayed as if it is floated in the expand mode, the electronic device may display such a graphic effect as if both the screens together move to the inside and then bounce back to their original position. Upon detecting a swipe gesture downwards on the application running screen displayed as if it is floated in the expand mode, the electronic device may display such a graphic effect as if both the screens together move down and then display the home screen instead of the application running screen.

2.10.8. Description of Swap Screen

Figure 120:
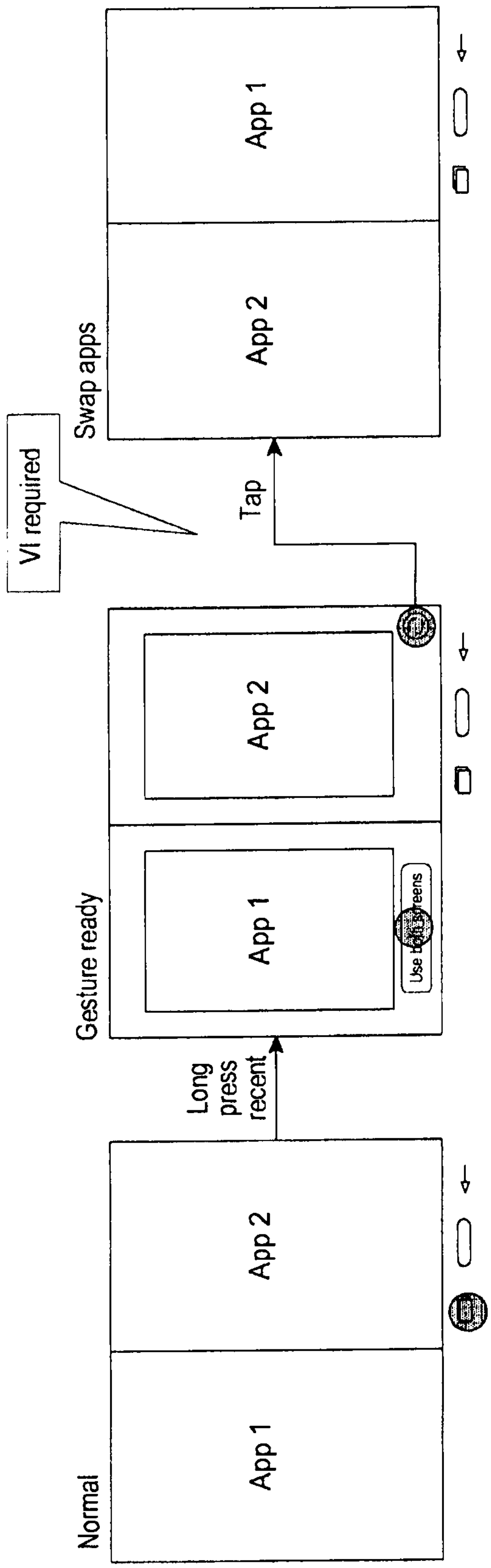

Referring to FIG. 120, according to an embodiment of the present disclosure, the electronic device in the dual mode may display a swap button along with an application running screen which is displayed as if it floats. Upon detecting a designation of the button, the electronic device swap the respective positions of the two screens. Specifically, referring to FIG. 120, an execution screen of the second application (App2) may be displayed on the main display, and an execution screen of the first application (App1) may be displayed on the sub display. The electronic device, as entering the gesture mode, may display the application running screen as if it floats and may display a swap button on the main display. When the swap button is designated, the electronic device may display the execution screen of the second application (App2) on the sub display and the execution screen of the first application (App1) on the main display.

2.10.9. Description of Visual Effect and Guide Text

Figure 121:
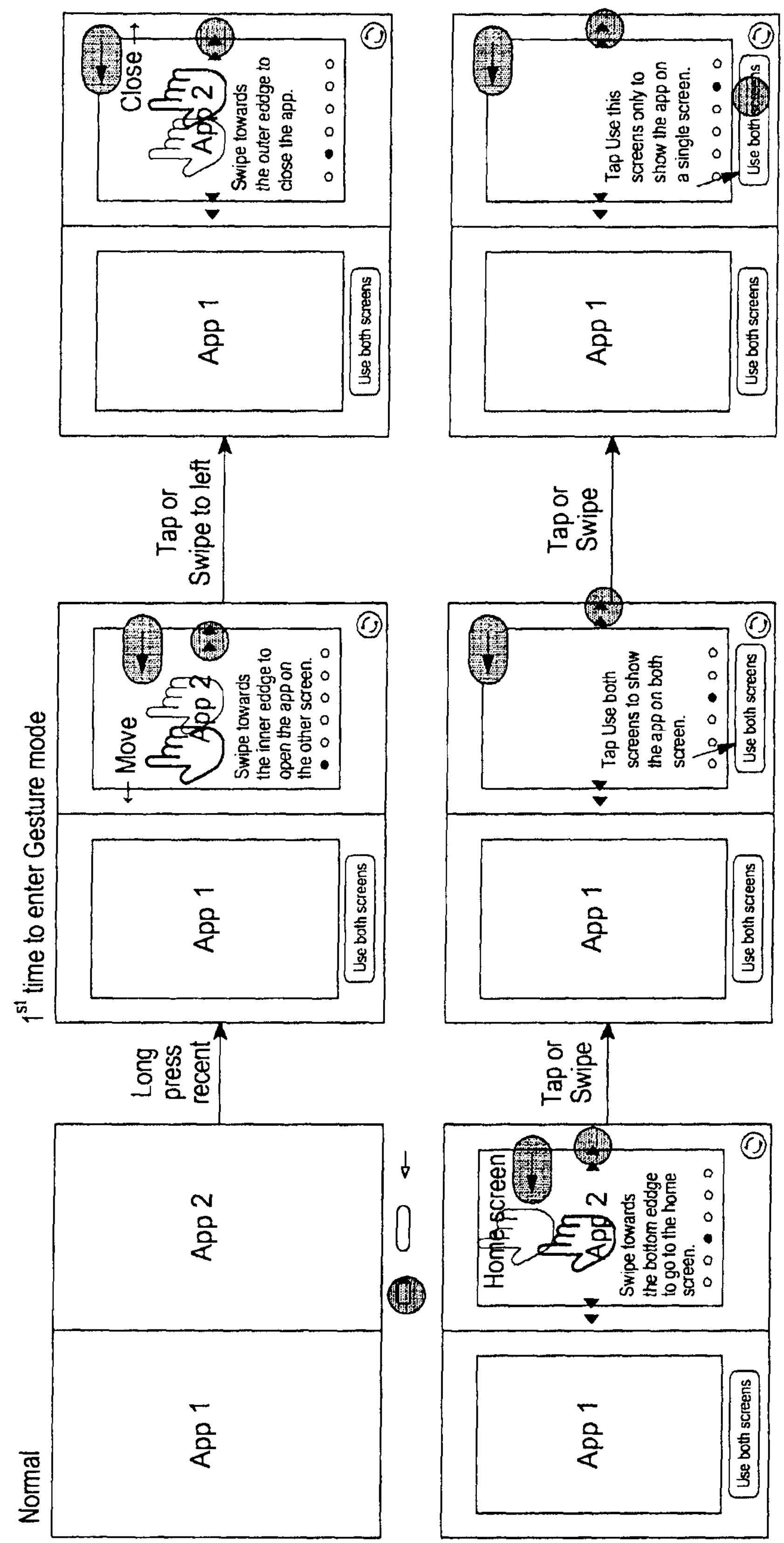

Referring to FIG. 121, according to an embodiment of the present disclosure, upon initial entry, the electronic device may provide an overlay help text to give a description of each function. For example, text for a swipe or various buttons may be provided together with a visual effect describing the gesture.

2.11 Description of Android Pin

Figure 122:
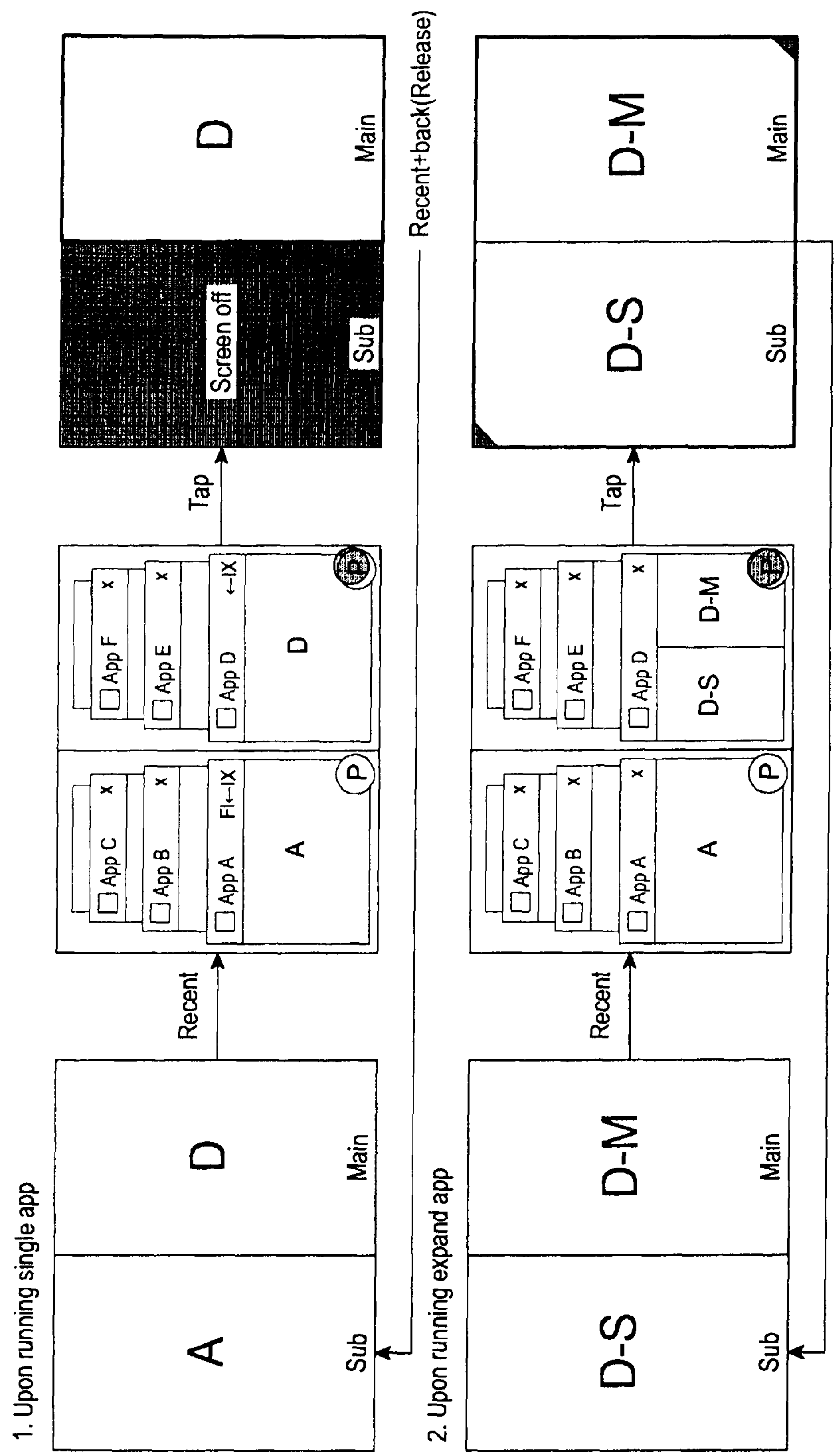
FIGS. 122 and 123 are concept views illustrating an android pin according to an embodiment of the present disclosure.
Figure 123:
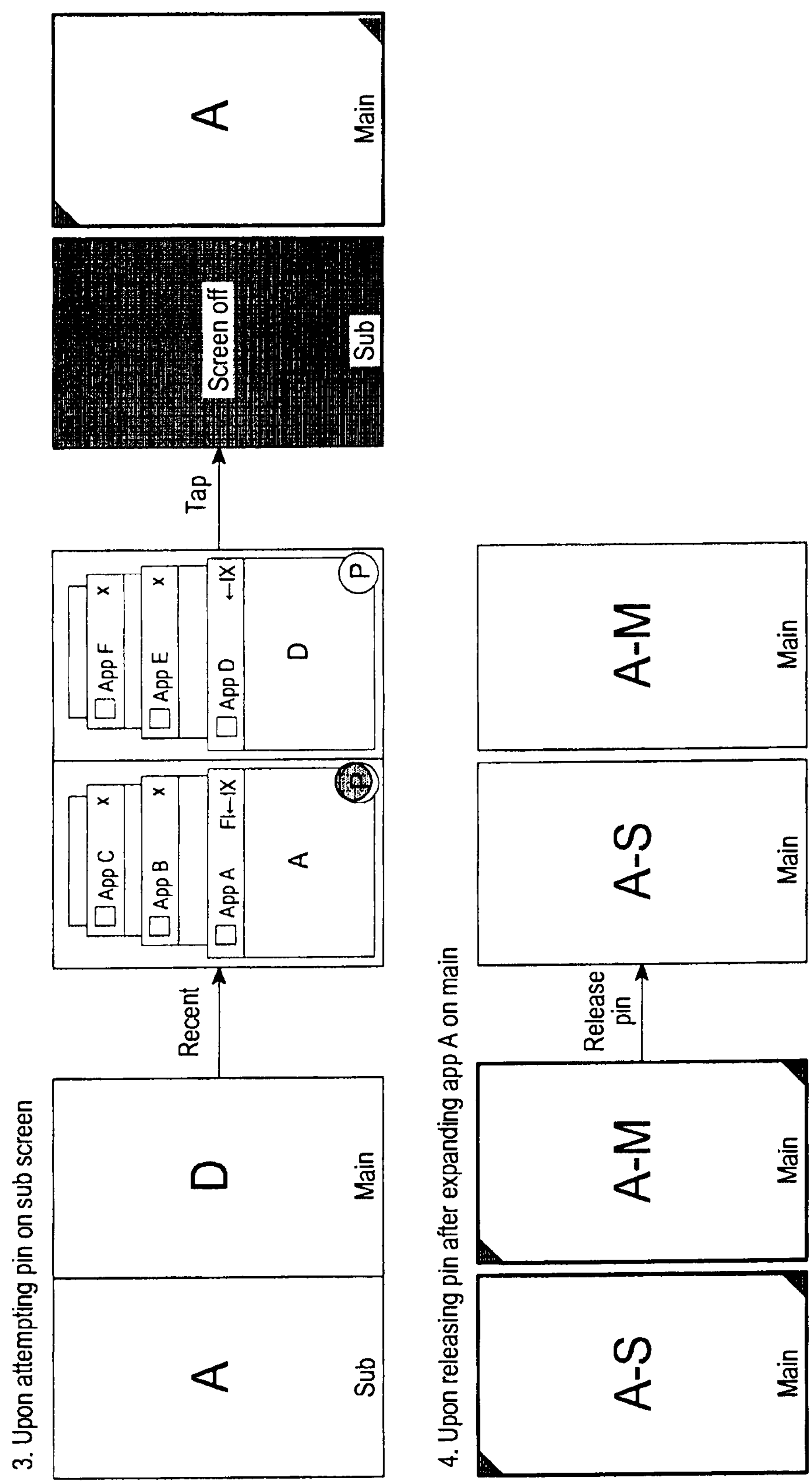

The operation of setting/releasing the Android pin may be performed basically similar to the default operation of the (fixing) pin defined in the Android OS. Referring to FIG. 122, according to an embodiment of the present disclosure, the setting of a pin application may be performed through the selection of a pin icon (P) on a screen (e.g., a screen containing an application stack) entered by designating a recent-run application list call key. Further, the release of the pin application may be performed upon detecting a long press on the back key and the recent-run application list call key. When a single application is designated as the pin application, the electronic device may control the sub display in the off state and may display the application on the main display. According to an embodiment of the present disclosure, the electronic device may perform an expand/shrink operation on the pin application. Specifically, as shown on the lower part of FIG. 112, the electronic device may display an expanded running screen of application D on both the displays. Upon detecting a designation of the recent-run application list call key, the electronic device may display the screen including the application stack. The application stack may include such an image as if the screen is split so as to indicate that application D is being displayed in the expanded screen. Upon detecting a designation of the pin application, the electronic device may set the corresponding application, i.e., application D, as the pin application and display the expanded screen. Thus, the electronic device may abstain from controlling the sub display in the off state. FIG. 123 illustrates a configuration for performing a designation of a pin application on the sub display. Referring to FIG. 123, where a pin application is designated for an application (e.g., application A) displayed on the sub display, the electronic device may display the display screen of the application on the main display. The electronic device may control the sub display in the off state. As shown on the lower part of FIG. 123, the electronic device may display an expanded running screen for the application used to be displayed on the main display and perform a pin designation for the expanded application. When the pin is released, the electronic device may keep displaying the expanded running screen on each display. The electronic device may stop displaying the visual cue to display the pin designation in response to the release of the pin. According to an embodiment of the present disclosure, where an accessibility function is on, the electronic device may set a long press for the recent-run application list call key as a trigger to release the pin. Or, where the accessibility function is off, the electronic device may set a simultaneous long press for the recent-run application list call key and back key as a trigger to release the pin.

2.12 Description of Various Operational Scenarios of Electronic Device 2.12.1. Description of Private/Public Display According to an embodiment of the present disclosure, the electronic device including two displays may create various expressions through the inactive display in the folded mode, i.e., the opposite (or backside) display of the display that faces the user.

Figure 124:
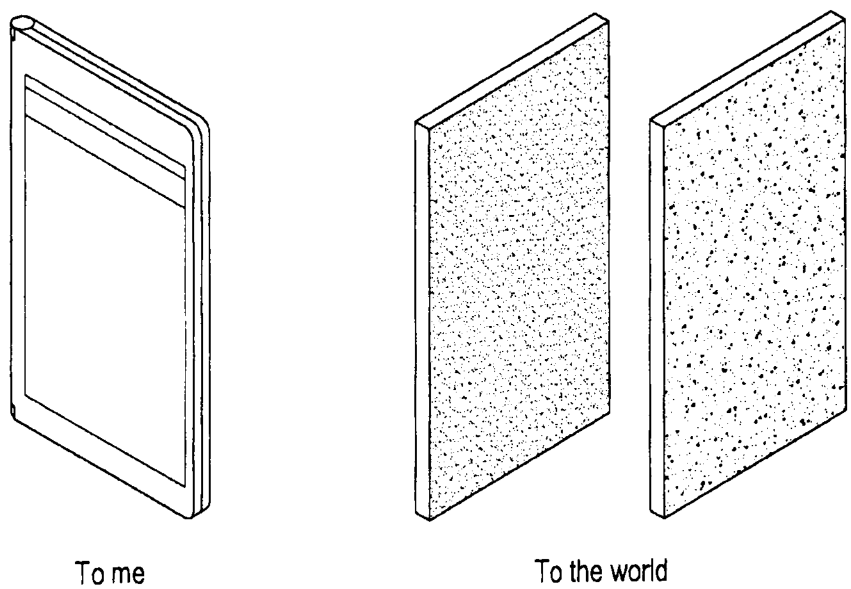
FIGS. 124 to 158 are concept views illustrating an application execution scenario according to an embodiment of the present disclosure.

For example, the electronic device may express the user's sentiment to others by dynamically changing screens displayed on the inactive display. Referring to FIG. 124, upon detecting the user's contact, approach, or grasp in the folded mode, the electronic device may display an application running screen on the main display and a different screen, e.g., one looking like a case, from the application running screen, on the opposite display. As such, the use of the electronic device allows the user's sentiment to appeal to nearby people in a distinct way.

Figure 125:
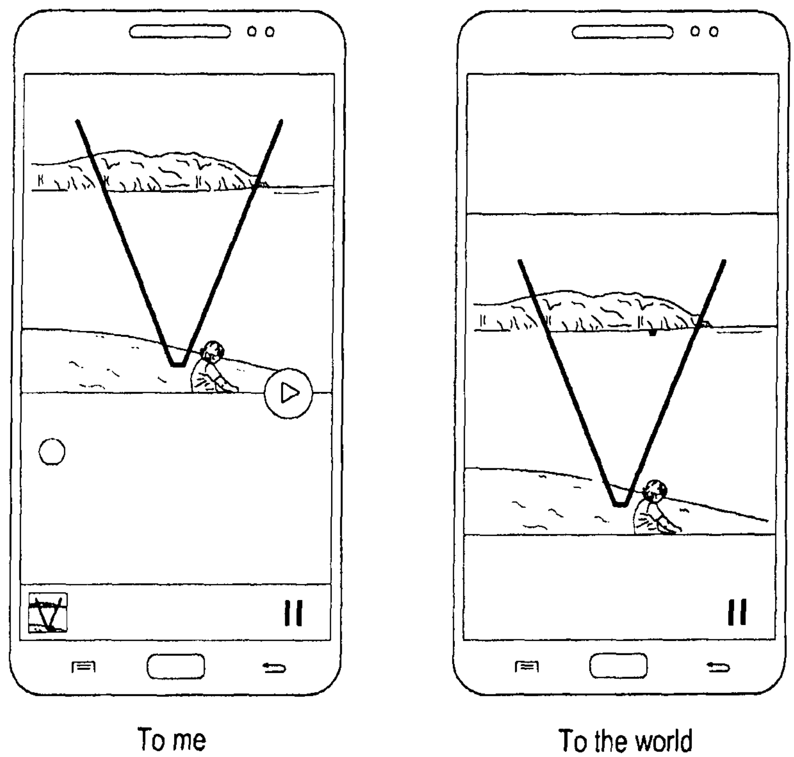

According to an embodiment of the present disclosure, as shown in FIG. 125, the electronic device may change the attribute and content of the screen displayed on the opposite display depending on what is displayed on the main display, i.e., contents used by the user. For example, when the user is in use of an audio file player application, the electronic device may display information related to the audio file, e.g., the album cover of the audio file being currently played back, on the opposite display. Hence, the user's taste and sentiment may appeal to others.

Figure 126A:
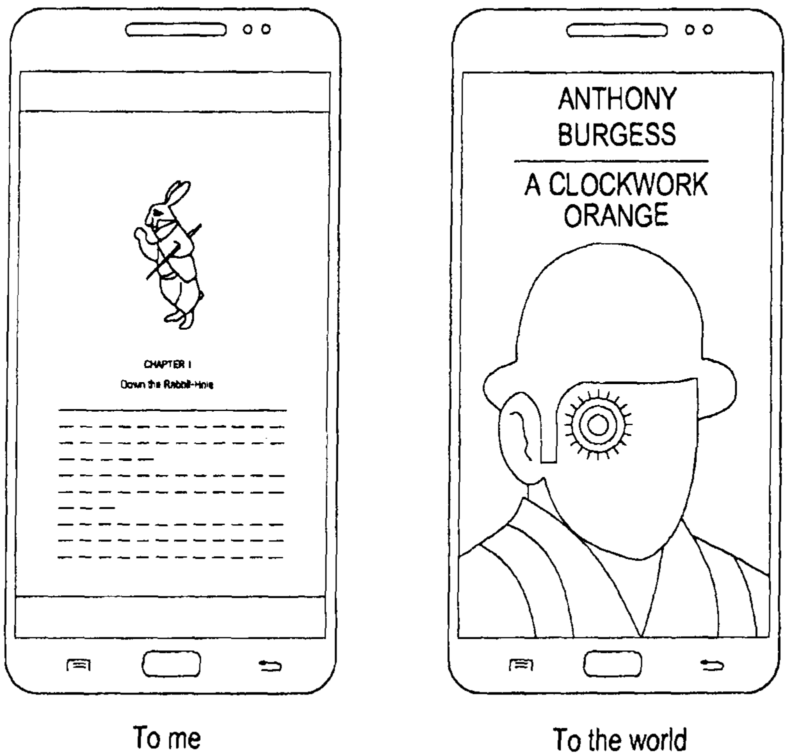

According to an embodiment of the present disclosure, as shown in FIG. 126*a*, the electronic device may display an execution screen of an ebook application on the active display simultaneously with displaying a book cover image of the ebook now in display on the inactive display.

Figure 126B:
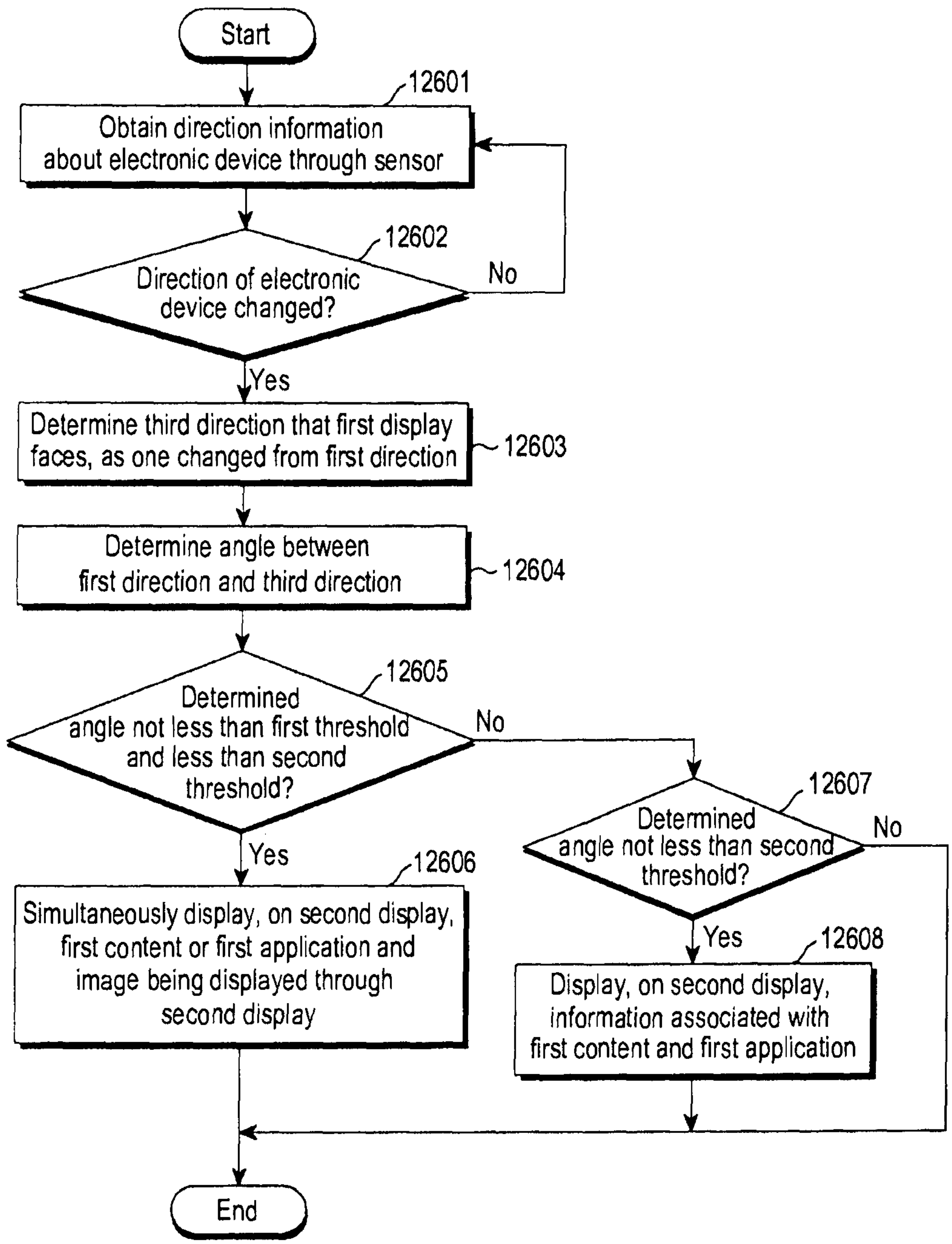

FIG. 126*b* is a flowchart illustrating a method for determining a screen displayed on one of a plurality of displays by an electronic device according to an embodiment of the present disclosure.

In operation 12601, according to an embodiment of the present disclosure, the electronic device 101 may obtain direction information about the electronic device through a sensor included in the electronic device 101. For example, the electronic device 101 may obtain the direction information about the electronic device 101 through a gyro sensor included in the electronic device 101.

In operation 12602, the electronic device 101 may sense whether the direction of the electronic device 101 changes depending on the obtained direction information.

In operation 12603, the electronic device 101, upon sensing a change in the direction of the electronic device 101, may determine a third direction that the first display faces, which has been changed from the first direction due to the change in the direction of the electronic device 101.

In operation 12604, the electronic device 101 may determine the angle between the first direction and the third direction based on a result of the determination.

In operation 12605, the electronic device 101 may determine whether the determined angle is a first threshold value or more and less than a second threshold value. The first threshold value may be set based on an angle at which the user may view the second display. Further, the second threshold may be set based on an angle for determining whether the electronic device 101 is flipped.

In operation 12606, when the determined angle is the first threshold value or more and less than the second threshold value, the electronic device 101 may simultaneously display, on the second display, information associated with the first content or the first application and the image being displayed through the second display.

Further, the electronic device 101 may determine a first area where the image is displayed through the second display and a second area where the information associated with the first content and the first application is displayed depending on the determined angle.

In operation 12607, the electronic device 101 may determine whether the determined angle is the second threshold value or more.

In operation 12608, when the determined angle is the second threshold value or more, the electronic device 101 may display the information associated with the first content or the first application on the second display. For example, upon determining that the electronic device 101 has been flipped, the processor 120 may display the information associated with the first content or the first application instead of the image being displayed through the second display.

Figure 126C:
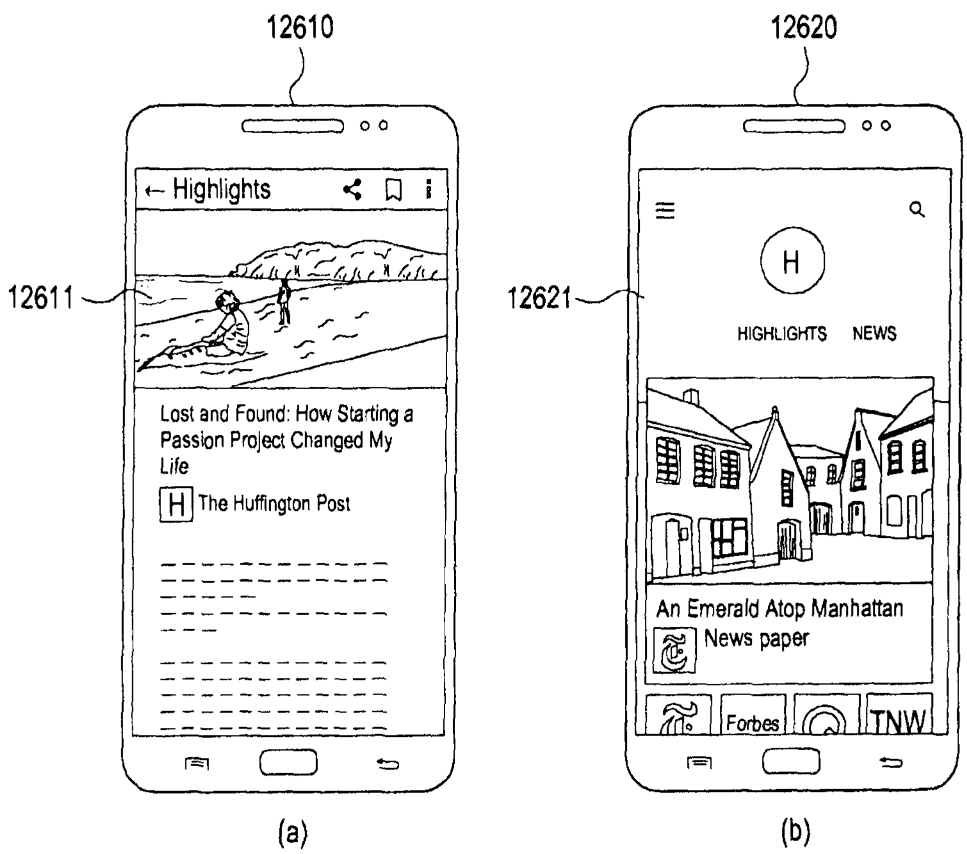

Referring to FIG. 126*c*, the electronic device 101 may display a webpage providing news through a web browser application through the first display 12611 as shown in FIG. 126*c*(*a*). In this case, as shown in FIG. 126*c*(*b*), the electronic device 101 may display, through the second display 12621, an image associated with the webpage, e.g., a webpage providing a headline news served by the provider of the webpage or a webpage displaying a title of the provider. The provider of the webpage may set a webpage to be served through the second display 12621, and if the provider desires, the webpage to be served through the second display 12621 may be changed in real-time.

Figure 127:
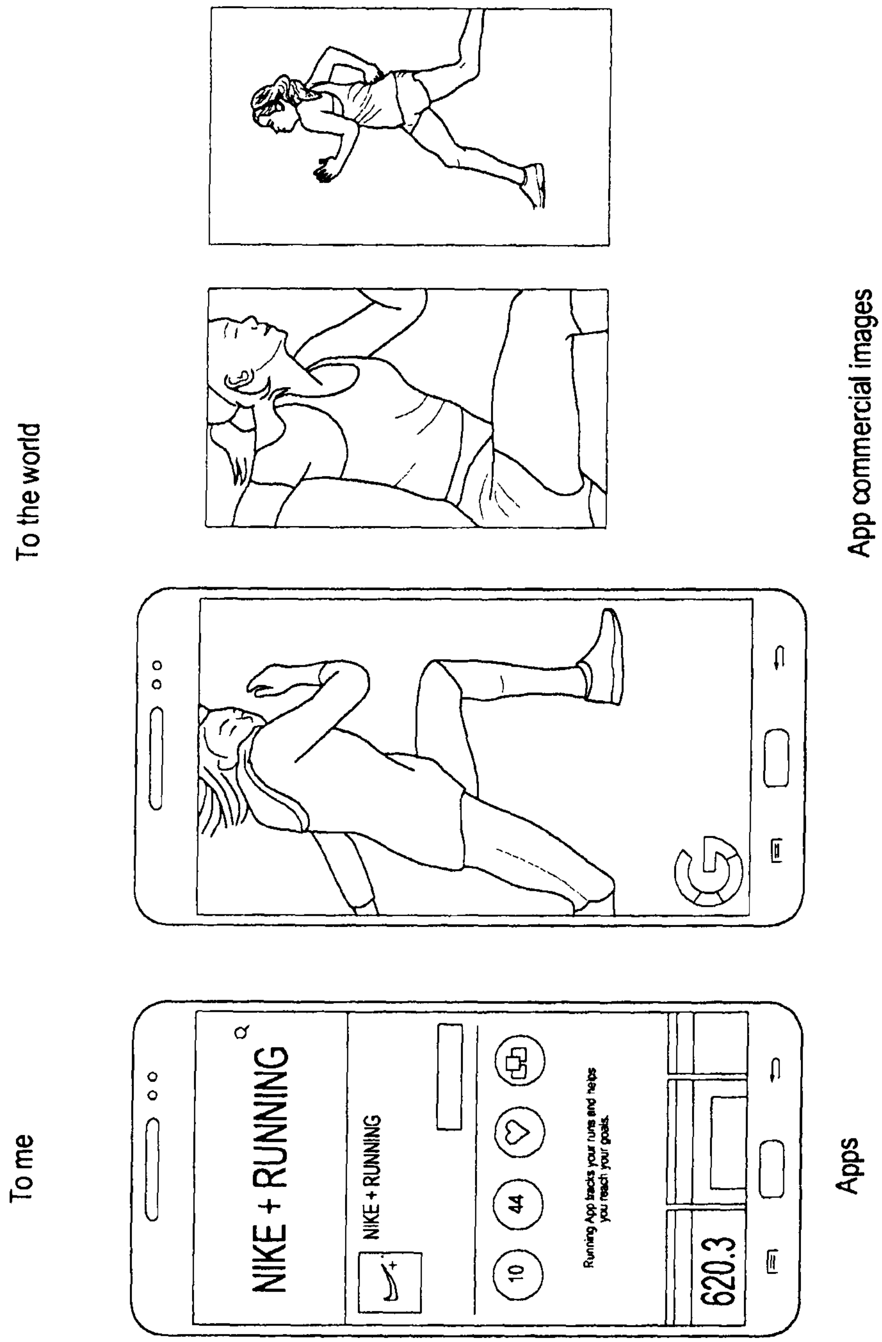
Figure 128:
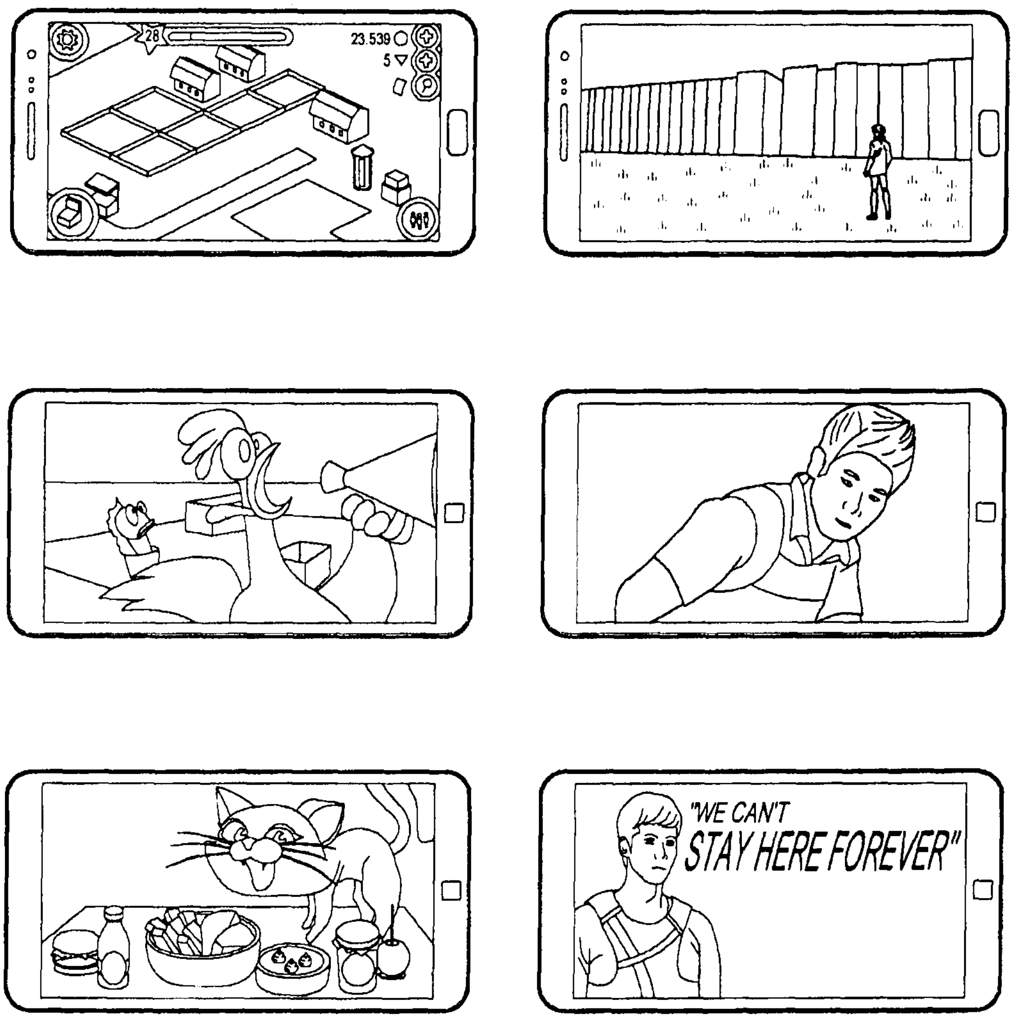

As another example, as shown in FIGS. 127 and 128, the electronic device may display an application running screen, game screen, and content on the active display while simultaneously displaying, on the inactive display, an image provided from an application producer, game producer, or content producer. By doing so, the application, game, or content producer may naturally advertise it near the user, prompting to purchase the content.

Figure 129:
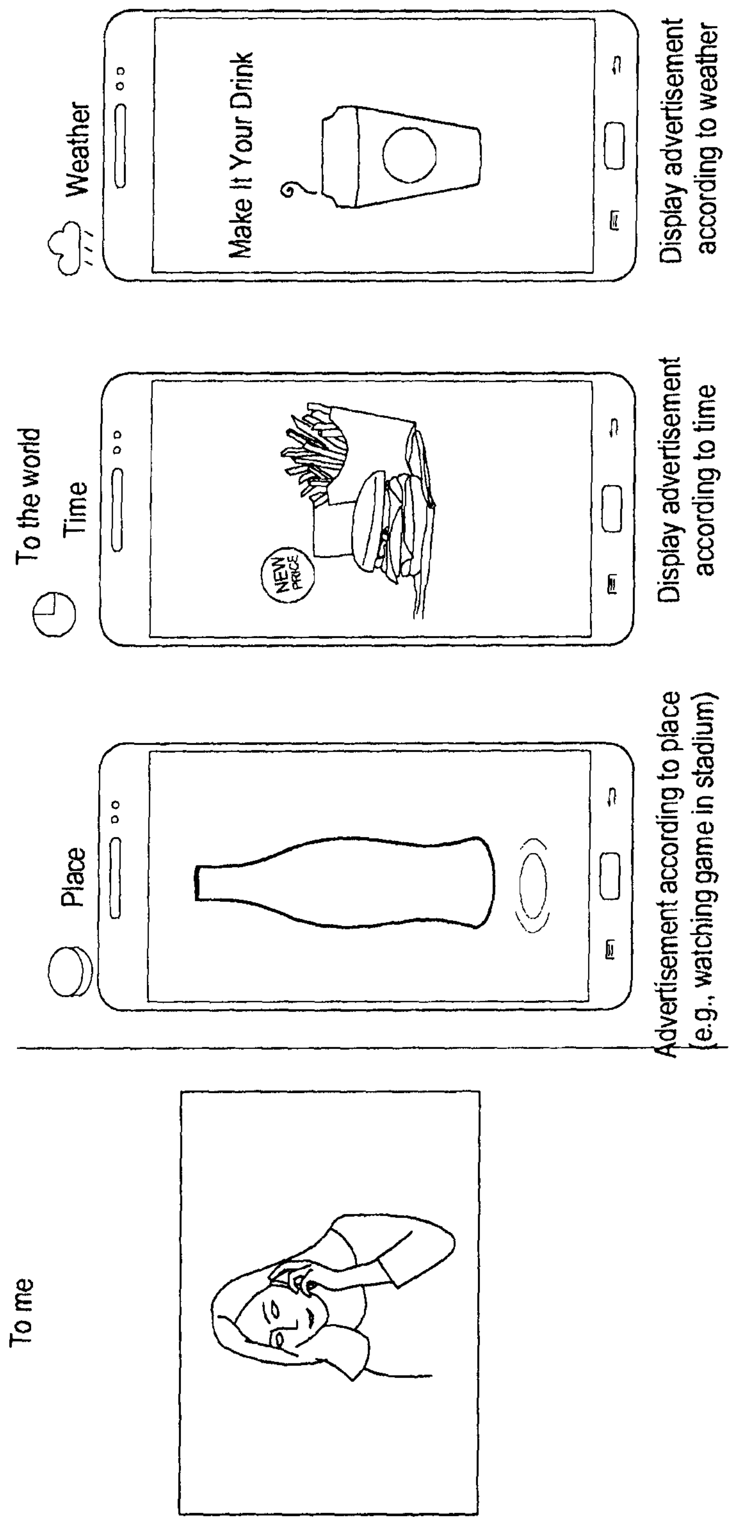

According to an embodiment of the present disclosure, as shown in FIG. 129, the electronic device may display an advertisement set depending on time, weather, or place, on the inactive display regardless of the function of the application displayed on the active display or screen displayed on the active display.

2.12.2. Description of Multi-Tasking

According to an embodiment of the present disclosure, the electronic device including the two displays enables various functions to be simultaneously used on a single electronic device using various UI structures.

2.12.2.1. Description of Folded Mode

Figure 130:
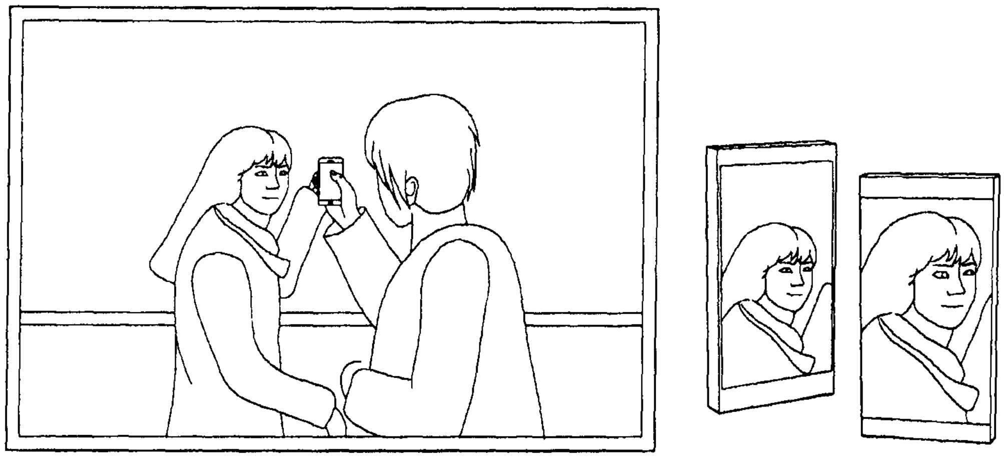

According to an embodiment of the present disclosure, the electronic device in the folded mode may simultaneously use the two displays, presenting the user with more satisfaction. For example, where a camera application runs as shown in FIG. 130, the electronic device may display a preview image captured through the camera on the main display and may also display a preview image captured through the camera on the sub display.

In this case, the electronic device may create different screen configurations depending on the current use mode and user's intention of the image capturing. For example, where the user takes an image of an object which is a figure in the folded mode, the electronic device may display a preview image on the display that faces the object, helping the object to take a pose while checking the captured image. According to an embodiment of the present disclosure, upon taking an image of a figure, the electronic device may display an image other than the preview image on the display facing the object by the user's selection. According to an embodiment of the present disclosure, upon taking an image of a figure, the electronic device may display the other image (e.g., an image including a certain model pose) through the display facing the object, guiding the object to take such pose. According to an embodiment of the present disclosure, upon taking an image of a figure, the electronic device may display an image or moving picture that may draw the object's attention through the display facing the object, allowing the object to pay more attention. Such method enables an image capturing to be efficiently performed even for less attentive objects, such as infants or toddlers. According to an embodiment of the present disclosure, the electronic device may attract the object's attention by generating a sound, as well as an image or moving picture. According to an embodiment of the present disclosure, upon taking a picture of a figure, the electronic device may provide a synthesized image of the object and another image through the display facing the object, allowing the object to take a pose as natural as possible. According to an embodiment of the present disclosure, upon determining that the user takes a picture of himself using a selfie function in the folded mode, the electronic device need not provide a preview image on the opposite display, allowing the opposite display to be controlled in the off state. By contrast, according to an embodiment of the present disclosure, upon determining that the user takes a picture of the background or thing, not a human figure, in the folded mode, the electronic device need not use the display facing the object, and thus, the electronic device may control the display facing the object in the off state.

Figure 131:
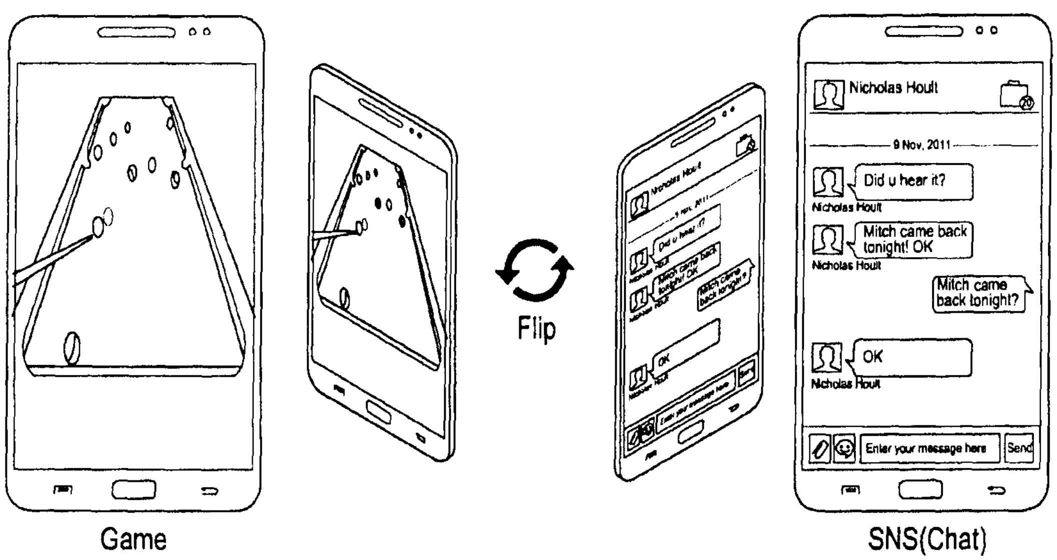

In the folded mode, the electronic device may, as default, enable a quick move and return of the display where an application is displayed in response to detection of, e.g., a flip, as shown in FIG. 131. Further, the electronic device may perform a quick switch as it detects a gesture also in case of one application having several contexts.

Figure 132:
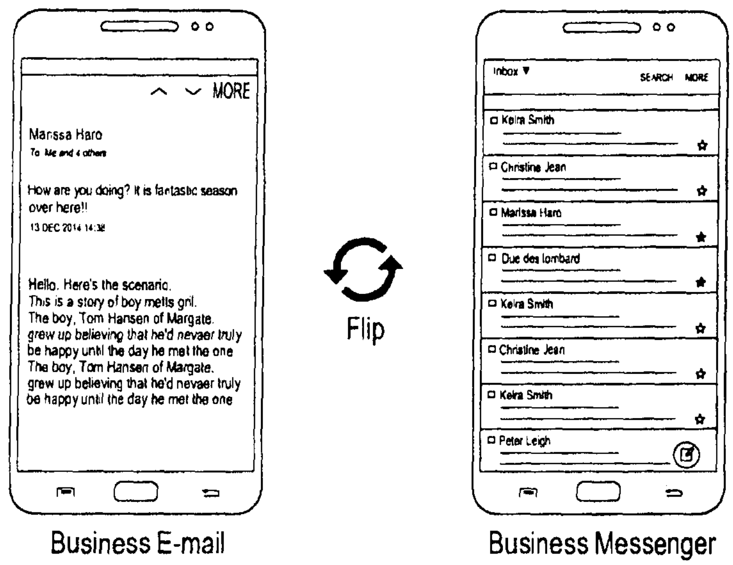

For example, as shown in FIG. 132, the electronic device may display an execution screen of an email application on the main display while displaying an execution screen of a messenger application on the sub display, according to an embodiment of the present disclosure. Accordingly, the user may check work-related emails using the main display while immediately giving a work-related instruction or entering a command for, e.g., sharing emails, using the sub display.

Further, upon detecting a flip of the electronic device by the user while the execution screen of the email application is displayed on the main display and the home screen is displayed on the second display, the electronic device may recommend, through the sub display, an application highly related to the application, e.g., email application, used to be displayed on the main display. For example, upon detecting a flip of the electronic device while the email application is being displayed on the main display, the electronic device may recommend, through the sub display, an application, e.g., a messenger application or document application, that was frequently used by the previous context of the user or set to be highly associated with the email application. A method for such recommendation may be to generate a popup, sort the applications differently, or put them in an overlay display.

Figure 133:
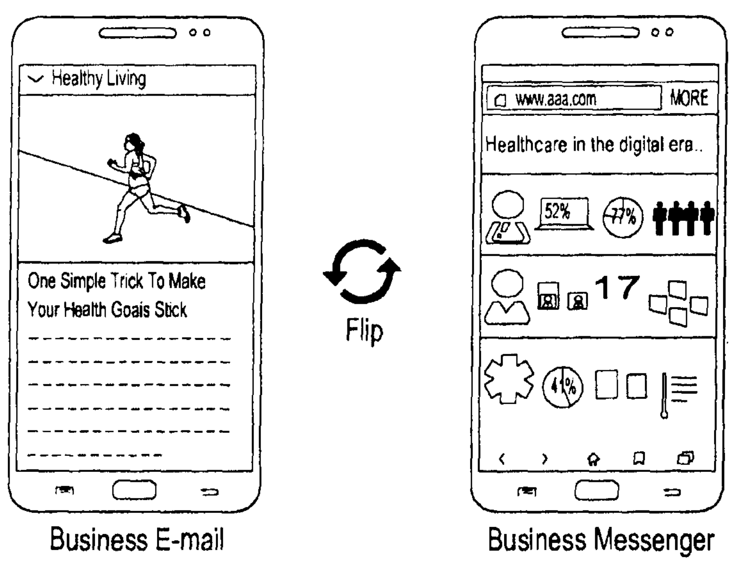

Another example may be found from a visiting hyperlinked site. Referring to FIG. 133, the electronic device may display an execution screen of a web browser application on a single display. The user may desire to temporarily visit the hyperlinked site, with the current context maintained, while web browsing. Upon detecting a designation for the hyperlink, the electronic device may display a screen for the hyperlink on the sub display while maintaining the current context on the main display. Here, the designation for a hyperlink may be obtained through the user's touch input or through the user's iris recognition and flip. In other words, as an event associated with the user intuitiveness, the electronic device may detect a designation for the hyperlink. For example, the electronic device may display an execution screen of a news application on the main display and may detect the user's view for the hyper link contained in the news application. Upon detecting a flip while detecting the user's view facing the hyper link, the electronic device may determine that a designation of the hyper link has occurred and may display a screen associated with the hyperlinked site on the sub display.

Figure 134:
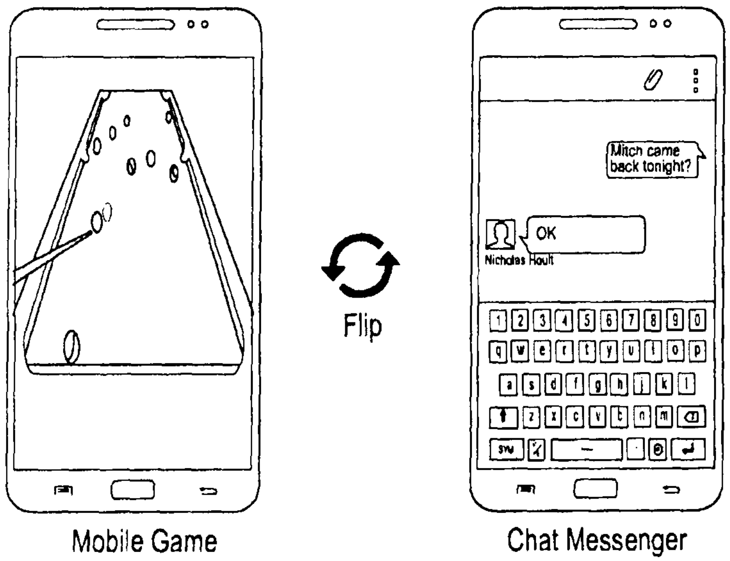

According to an embodiment of the present disclosure, as shown in FIG. 134, the electronic device may display an execution screen of a chat application on one display while displaying a game screen on the other display. For example, during an online game where multiple users involve, the participants sometimes need to chat. The electronic device enables the users to chat without interrupting the game using the multiple displays.

Another example is easier access to contents in a card-based service. For example, when the electronic device uses such a device structure and UI as those proposed in a card-based service, e.g., Google Now™, the electronic device may display a card UI on the main display, and upon detecting a flip, display detailed information about a selected card on the sub display. The selection of a card may be detected by the user's touch input, user's iris recognition, or flip.

Figure 135:
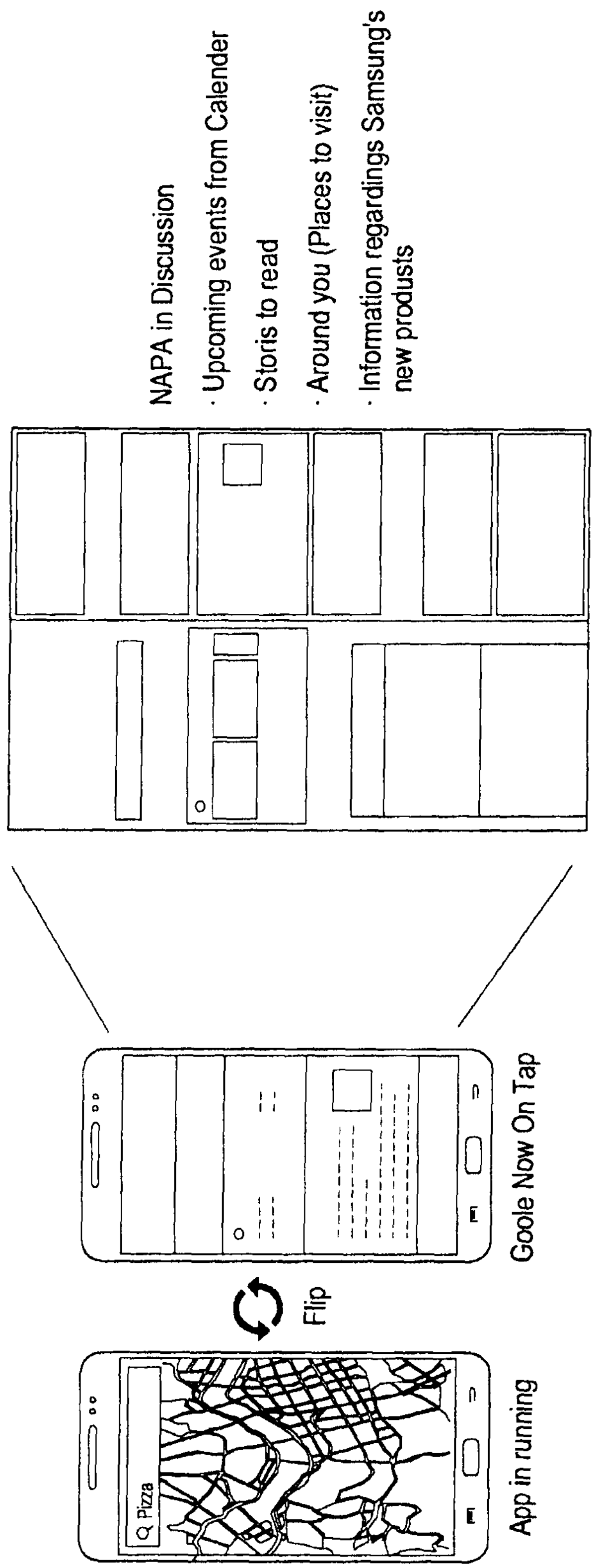

As another example, as shown in FIG. 135, the electronic device may provide easy access to the Google Now™ service. The electronic device may display a screen for the Google Now™ service immediately when detecting a flip while displaying a display screen of other application.

According to an embodiment of the present disclosure, upon detecting a flip, the electronic device may display a notification bar on the display, enhancing the user controllability. Further, the electronic device may set an operation of the electronic device mapped to a flip based on the user's selection. For example, the electronic device may previously set a function, e.g., a quick camera operation or quick access to the recorder, mapped to a flip, based on the user's selection. Further, upon detecting a flip, the electronic device may display, on the sub display, a group of operation candidates mapable, e.g., applications, or may display, on the sub display, a function associated with the application being currently displayed on the main display.

Figure 136:
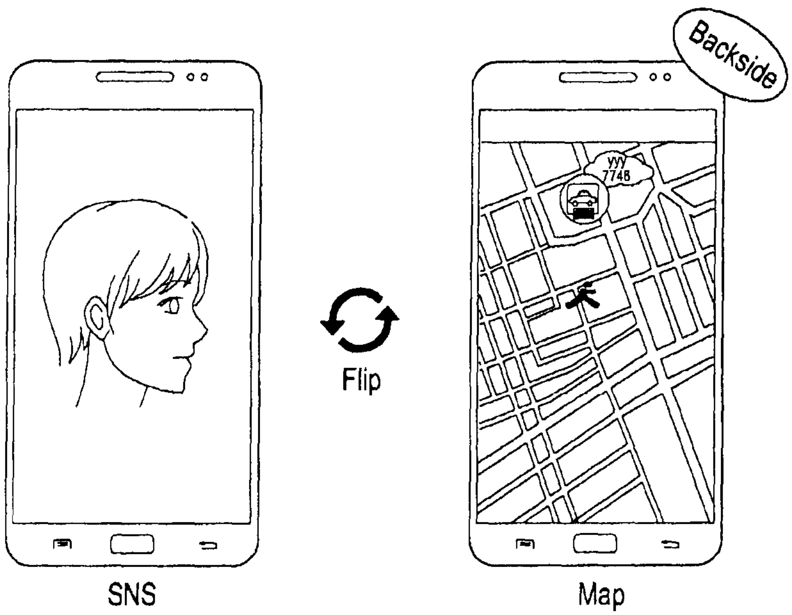

A fix application is another example. "Fix an application" may mean holding or fastening the display of an execution screen of a particular application on the sub display. Thus, although the function displayed on the main display changes, the electronic device may display a fixed application running screen on the sub display. FIG. 136 illustrates an example in which a map application is fixed. The electronic device may fix the display of an execution screen of the map application on the sub display.

According to an embodiment of the present disclosure, the electronic device may set, e.g., a planner application, email application, SNS application, or other various applications, as well as the map application, as the fix application by the user's selection.

Figure 137:
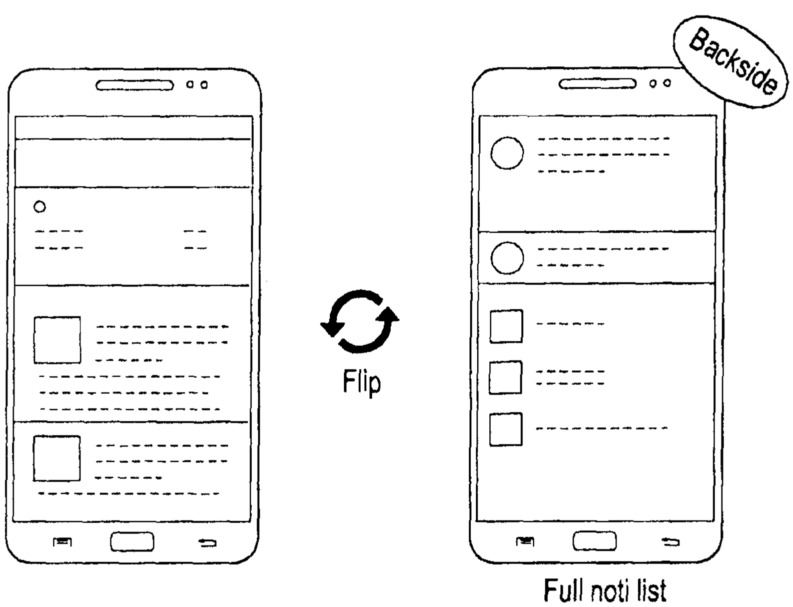

According to an embodiment of the present disclosure, the electronic device may gather at least some of notifications generated and display them on the sub display. Thus, the user may easily check at least some notifications generated from the electronic device with a simple flip. Referring to FIG. 137, the electronic device may display at least some notifications even without directly running a corresponding application to display an execution screen.

Figure 138:
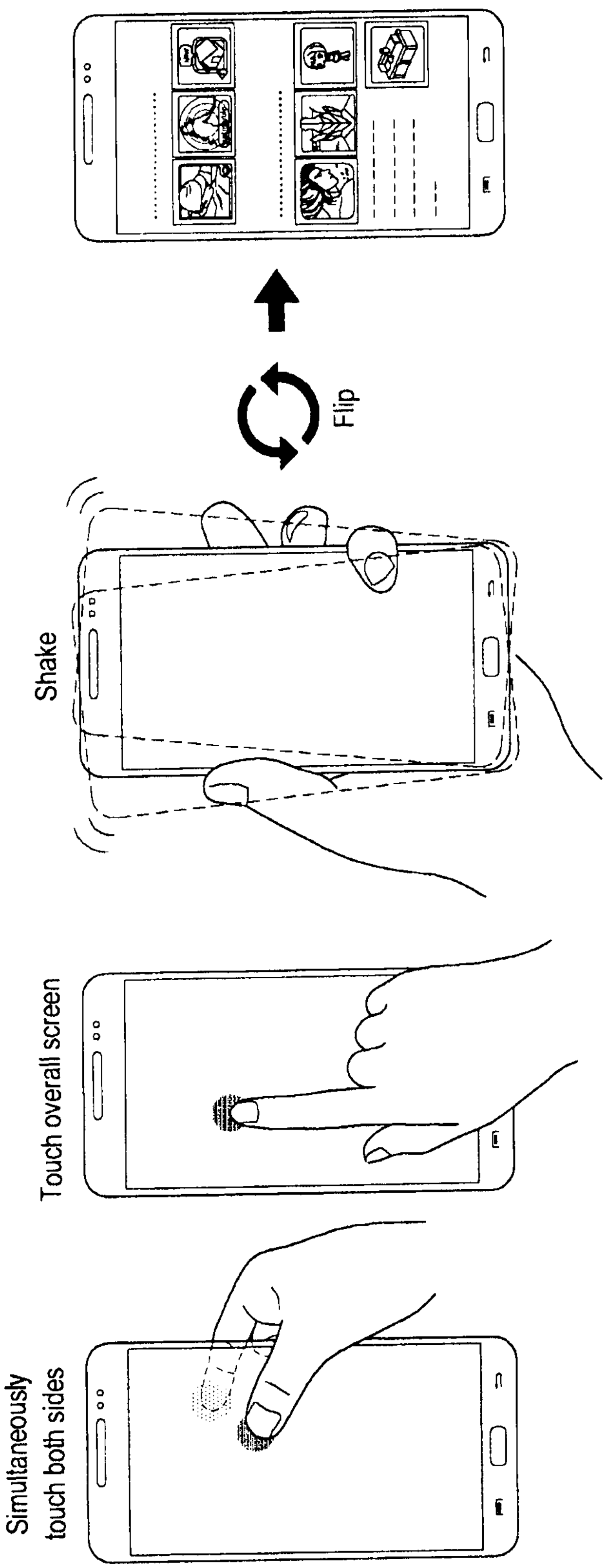

According to an embodiment of the present disclosure, as shown in FIG. 138, the electronic device may select information displayed on the sub display based on a user gesture detected before a flip is detected or a user gesture detected together with a flip. For example, the electronic device may select and display different pieces of information respectively for when detecting simultaneous touches on both the displays before a flip, when detecting a touch on one display, and when detecting a shake gesture. For, even where the electronic device displays the same application running screen on the main display, when a flip is detected after simultaneously touching both the displays, the electronic device may display content-based information, such as time, place, or weather, on the sub display. When a flip is detected after a touch on one display, the electronic device may display a UI for performing mobile payment while simultaneously operating a corresponding function, and upon detecting a flip after a shake gesture, the electronic device may display a stored gifticon or coupon on the sub display.

Figure 139:
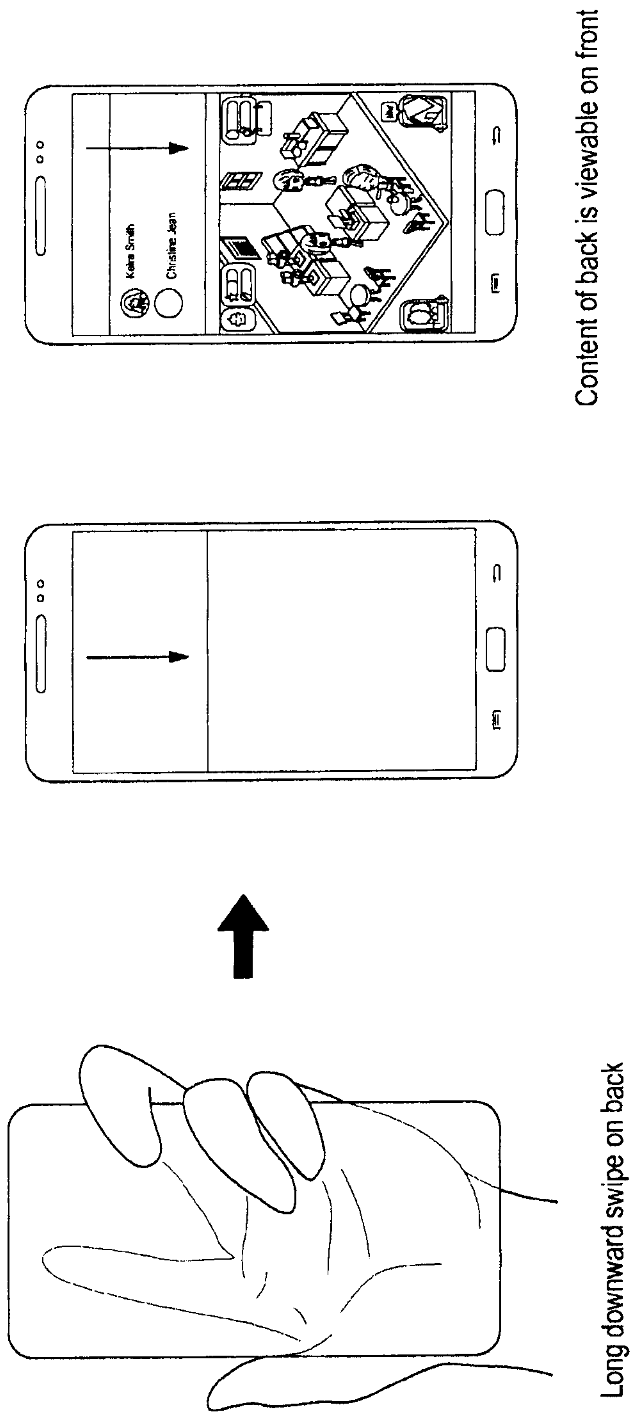

According to an embodiment of the present disclosure, the use may check the state of the application running on the sub display while using the main display of the electronic device in the folded mode. For example, as shown in FIG. 139, the electronic device, upon detecting a swipe gesture (e.g., an up-to-down swipe gesture) on the sub display in the folded mode, the electronic device may display information related to the application assigned to be displayed on the sub display on the main display.

The information related to the application assigned to be displayed on the sub display may be at least a portion of an image or content of the screen assigned to be displayed on the sub display.

According to an embodiment of the present disclosure, upon selection of the information related to the application assigned to be displayed on the sub display, the electronic device may swap the screen displayed on the main display with the screen displayed on the sub display. For example, where a game screen is displayed on the main display, and an execution screen of a messenger application is displayed on the sub display, the electronic device may display the information related to the application assigned to be displayed on the sub display on the main display in response to a user input detected on the sub display. Upon detecting the user's designation of the information related to the application assigned to be displayed on the sub display through the main display, the electronic device may swap the two screens, displaying the execution screen of the messenger application on the main display and the game screen on the sub display.

According to an embodiment of the present disclosure, the electronic device may directly transfer a user input detected on a display window of the information related to the application assigned to be displayed on the sub display to the application assigned to be displayed on the sub display without screen swapping. Where a game screen is displayed on the main display, and an execution screen of a messenger application is displayed on the sub display, the electronic device may display the information (e.g., a chat state display window) related to the application assigned to be displayed on the sub display on the main display in response to detection of a shake gesture. In this case, upon detecting a user input through the information related to the application assigned to be displayed on the sub display from the user, the electronic device may transfer the detected user input (e.g., a text input) to the messenger application.

According to an embodiment of the present disclosure, the sub display-related information displayed on the main display may include information related to the application (i.e., the active application) displayed on the foreground of the sub display, alone, or include the active application together with the information related to the application assigned to be displayed on the background of the sub display. As such, the user may select a portion of various pieces of sub display-related information displayed on the front display, i.e., the main display, and the electronic device may operate based on the detected selection.

Figure 140:
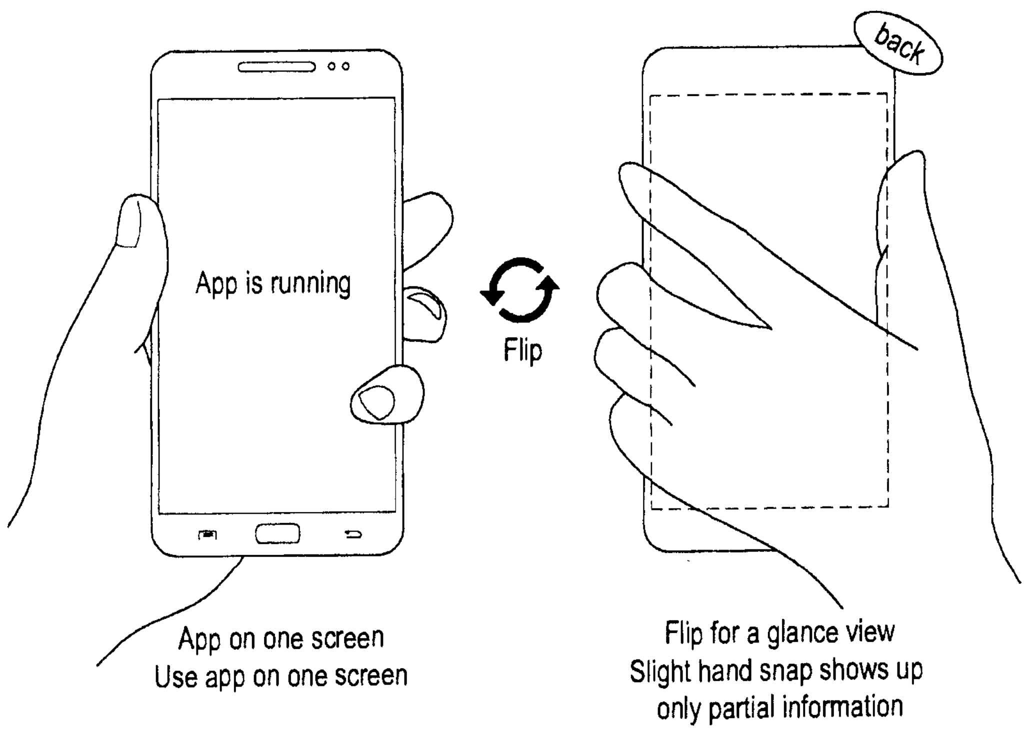

According to an embodiment of the present disclosure, upon detecting a flip, the electronic device may perform various operations depending on the way the user grasps the electronic device while flipping. For example, the user may flip the electronic device with the electronic device in his hand while covering at least a portion of the rear display, e.g., the sub display, as shown in FIG. 140. The electronic device may detect the user's state of grasping along with detecting the flip, and accordingly, the electronic device may determine that the view type of the sub display is a glance view.

Figure 141:
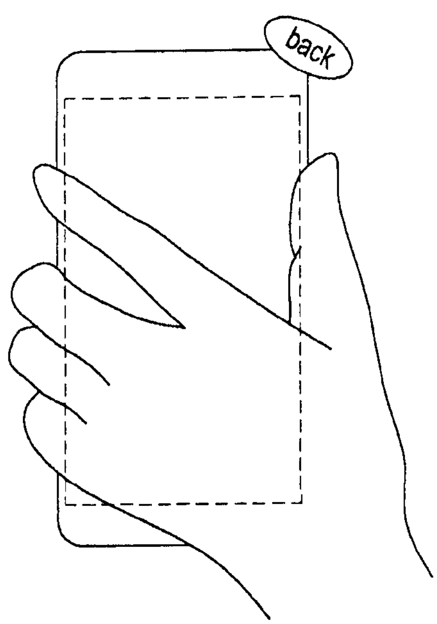

Specifically, the user may previously make such a setting that flipping the electronic device, with at least a portion of the sub display hidden, as shown in FIG. 141 corresponds to the user's need for checking brief information rather than utilizing the overall rear display. Accordingly, the electronic device may provide brief information on the rear display which is not hidden by the grasp. The information exposed may be information associated with the information displayed on the front display or may be information set by the user, e.g., a notification bar.

Figure 142:
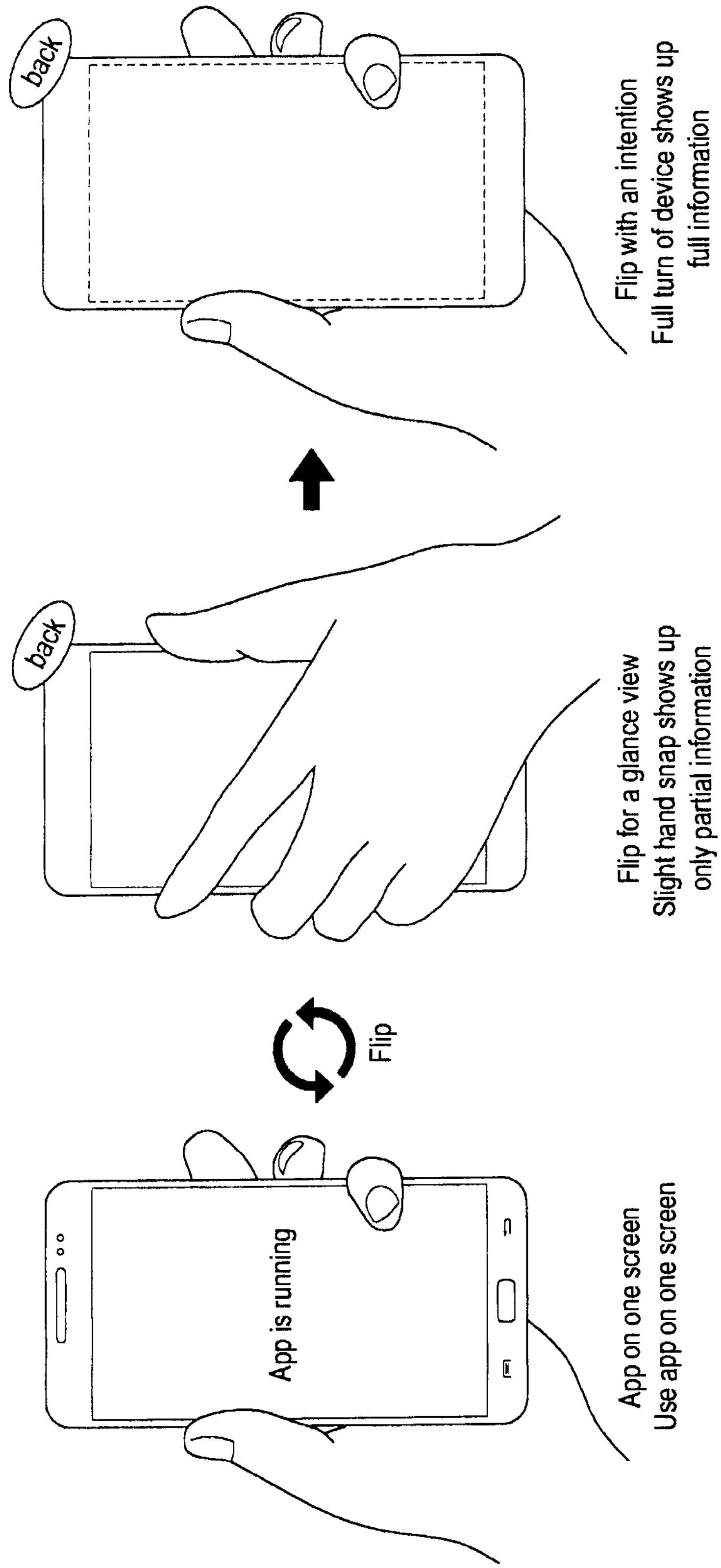

According to an embodiment of the present disclosure, the electronic device may control the operation of an application displayed on the rear display, e.g., the sub display, based on a change in the state of grasping detected after detecting the flip as shown in FIG. 142. As shown in FIG. 142, the electronic device may change information displayed on the rear display, e.g., the sub display, depending on the change in the state of grasping detected after the flip.

According to an embodiment of the present disclosure, the electronic device may configure the type, duration, or time of change of a grasp, speed of a flip, and the content, position, and way of exposure of information displayed on the rear display, e.g., the sub display.

Figure 143:
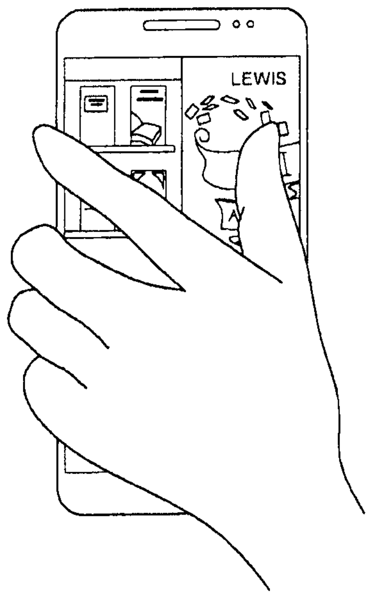

According to an embodiment of the present disclosure, as shown in FIG. 143, the electronic device may change information displayed on the front display, e.g., the main display, depending on tilts of the electronic device. For example, upon detecting a tilt at an angle between 15 degrees and 30 degrees but not a complete flip, the electronic device may display a portion of a first image displayed on the rear display, e.g., the sub display, on the front display, e.g., the main display, in proportion to the tilted angle of the electronic device Thus, the electronic device may display, on the front display, e.g., the main display, the portion of the first image along with a portion of a second image that used to originally be displayed on the main display. By the operations of the electronic device as set forth above, the user may simply check an image indicating the operational state on the rear display, e.g., the sub display, before screen swapping by a full flip action.

Figure 144:
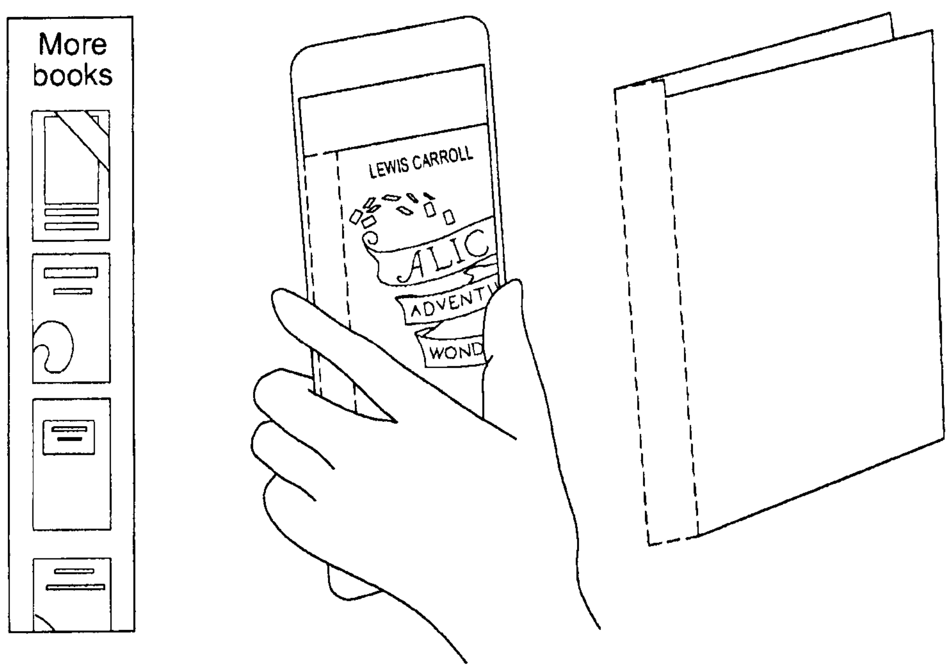

According to an embodiment of the present disclosure, the electronic device may display information associated with a service provided from the front display, e.g., the main display, on a portion of the main display, an edge display, or a side display, depending on its tilt. For example, as shown in FIG. 144, the electronic device may display an execution screen of an e-book application on the main display. The electronic device may detect a tilt and may accordingly display, on a left side of the main display, additional information related to the e-book currently displayed. Where the electronic device includes an edge display or a side display, the electronic device may display the additional information related to the e-book on the edge display or the side display.

2.12.2.2. Description of Outspread Mode

According to an embodiment of the present disclosure, where the electronic device is, as default, in the outspread mode, the user may simultaneously view the two displays of the electronic device. The outspread mode may include an expand mode in which an expanded running screen of one application is displayed on both the displays and a dual mode in which different application running screens are respectively displayed on the two displays.

In the expand mode, the electronic device, according to an embodiment of the present disclosure, may display a screen of a list a an email application, a planner application, a contact management application, or a messenger application and at least one item on the list on the two displays, respectively. The user may thus view both the list and the detail view, which contributes to convenience in control and use.

Figure 145:
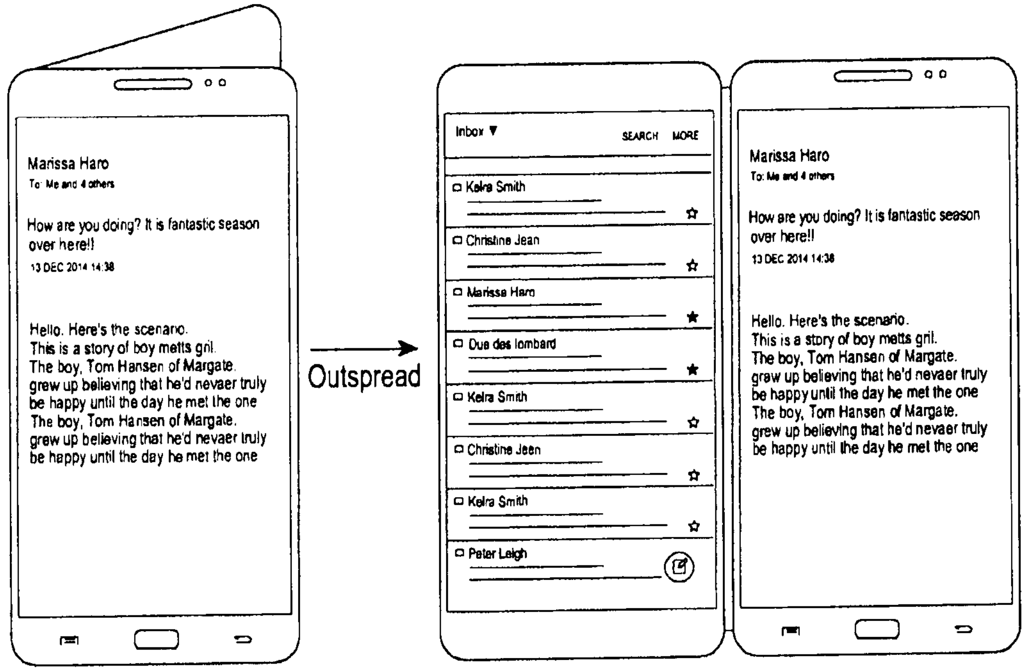

FIG. 145 is a concept view illustrating an electronic device when the form type changes from the folded mode to the outspread mode, according to an embodiment of the present disclosure. Referring to FIG. 145, the electronic device which used to display an application running screen on one display may display an expanded running screen on both the displays. In the folded mode, the electronic device displays only a detail view for one email of the email application. However, as the form type changes into the outspread mode, the electronic device may display a list including email items on one display and a detail view for an email selected from the list on the other display. The user may conveniently use a plurality of screens related to the email application in a broad user space.

Figure 146A:
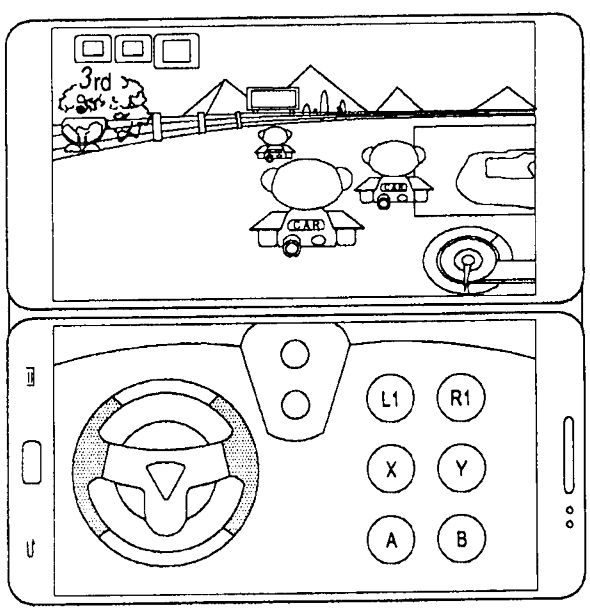

As shown in FIG. 146*a*, the electronic device, according to an embodiment of the present disclosure, may display a game screen and a gamepad for game control on the two displays, respectively.

Figure 146B:
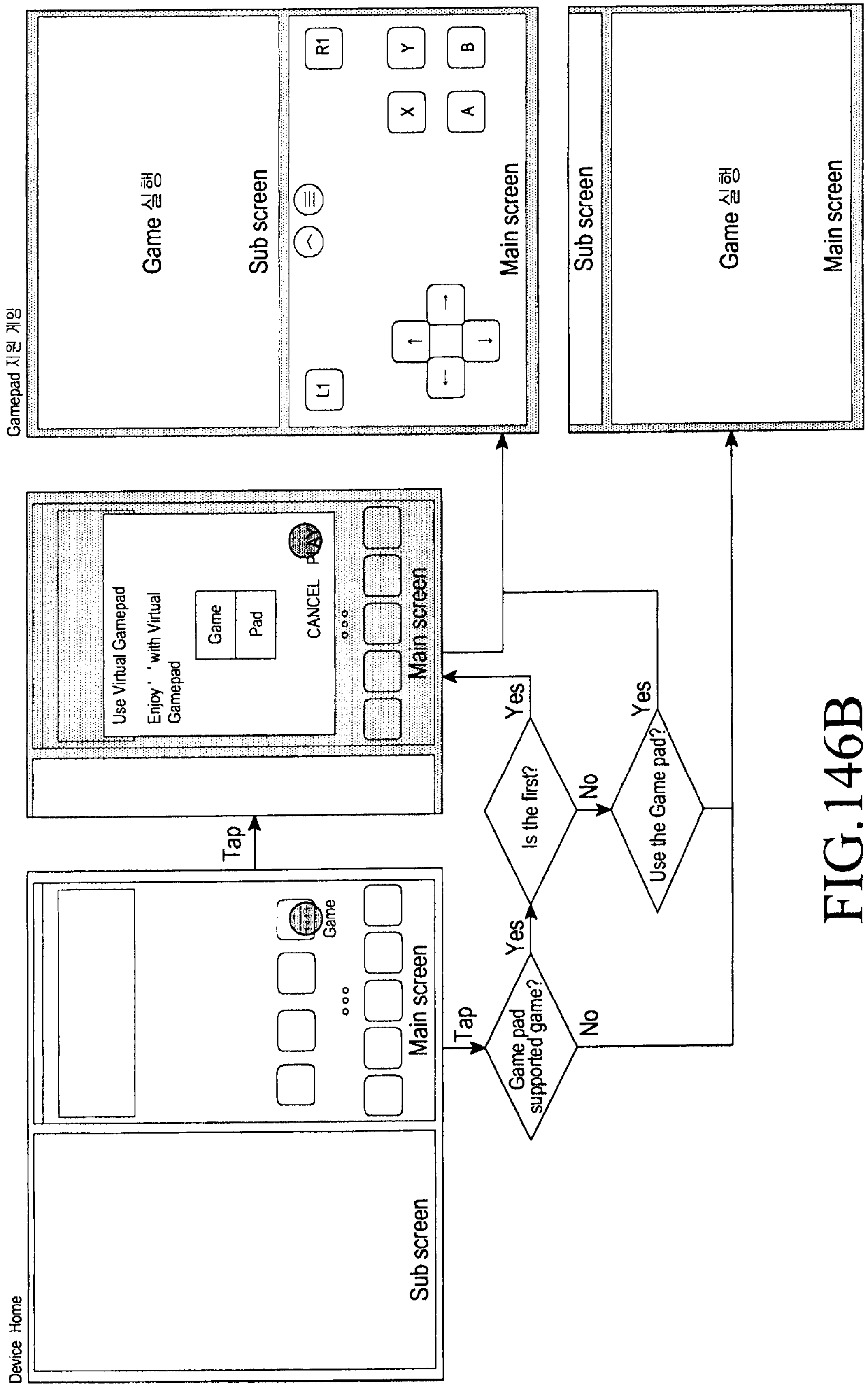

Referring to FIG. 146*b*, according to an embodiment of the present disclosure, the electronic device may detect a designation for a game application icon and may accordingly run the game application. The electronic device may identify whether the game application supports the gamepad. When the game application does not support the gamepad, the electronic device may display a game running screen on one display (e.g., the main display). When the game application supports the gamepad, the electronic device may identify whether the game application runs for the first time. Where the game application runs for the first time, the electronic device may provide a screen for receiving confirmation as to whether to display the gamepad, and upon detecting the confirmation of displaying the gamepad, the electronic device may display the game screen on the sub display and the gamepad on the main display. On the other hand, under the setting made so that the running is not one for the first time but the gamepad runs, the electronic device may immediately display the game screen on the sub display and the gamepad on the main display. Where the gamepad is set not to run, the electronic device may immediately display the game screen alone.

Figure 146C:
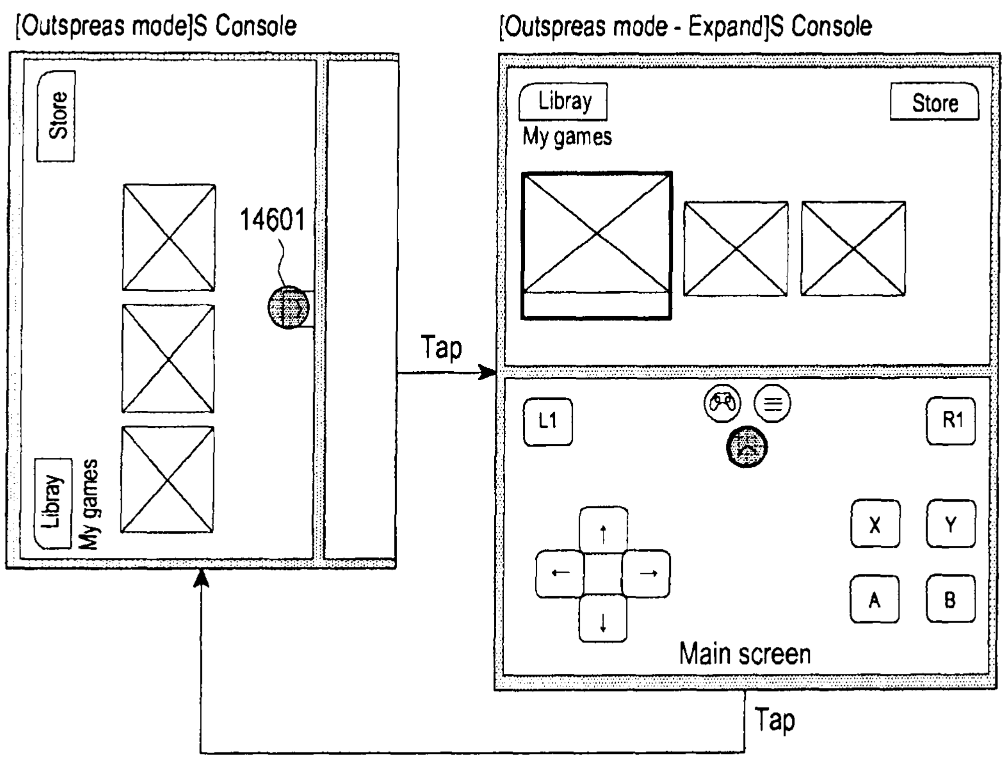
Figure 146D:
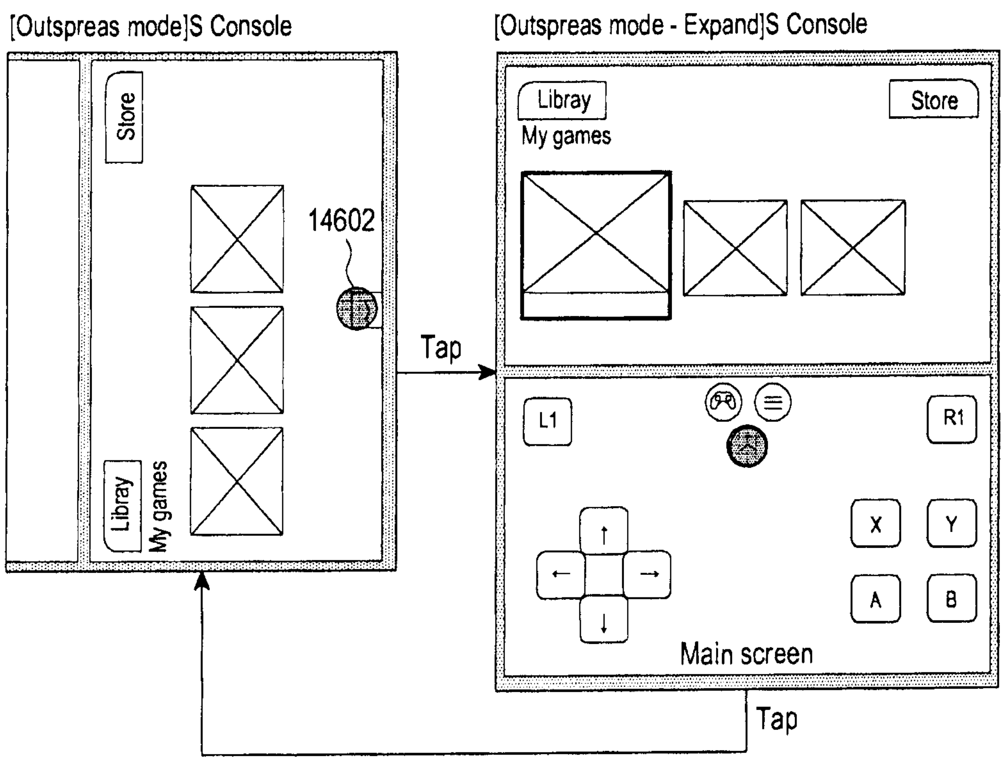

Referring to FIGS. 146*c* and 146*d*, the electronic device, according to an embodiment of the present disclosure, may display the game screen on one of the main display or the sub display. Further, the electronic device may display a gamepad call up key 14601 or 14602 on the game screen and display a gamepad screen in response to designation of the call up key 14601 or 14602. Regardless of whether the game screen is displayed on the main display or the sub display, the electronic device may display the game screen on the sub display and the gamepad screen on the main display.

Figure 146E:
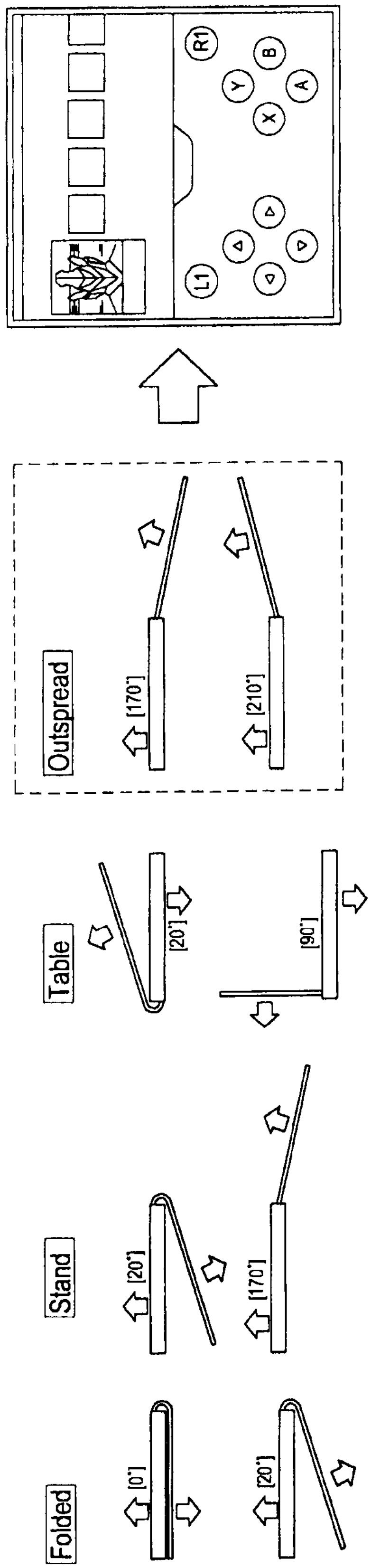
Figure 146F:
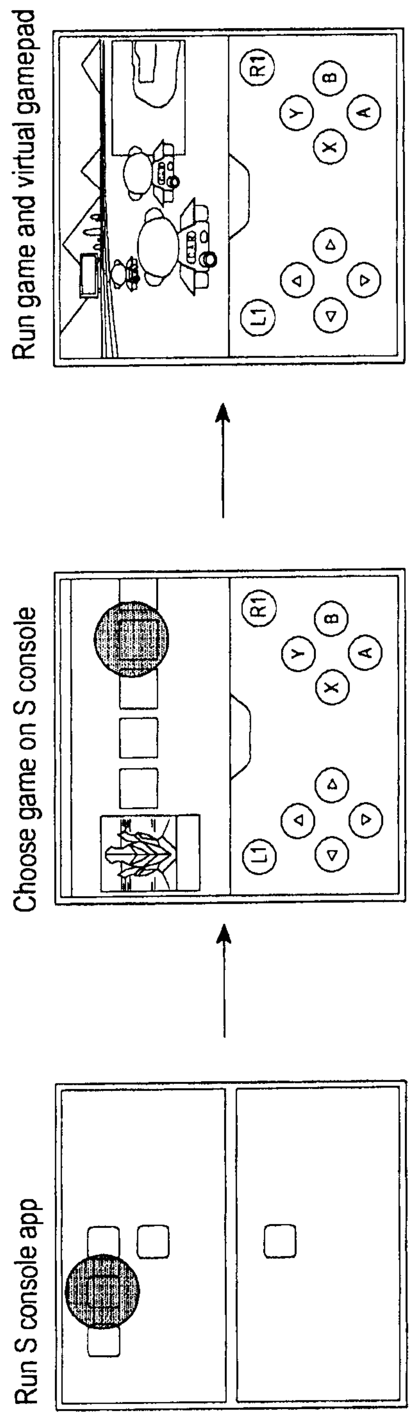
Figure 146G:
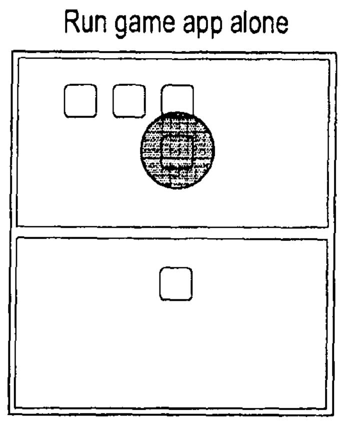
Figure 146H:
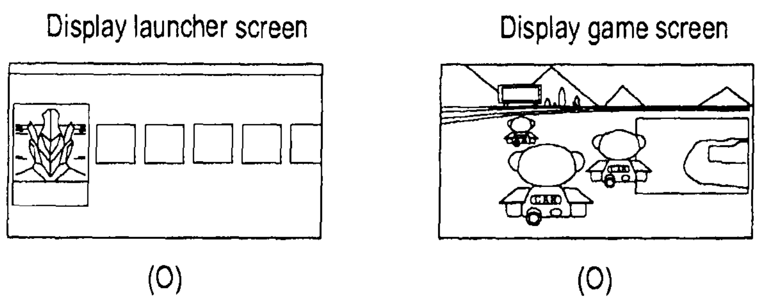
Figure 146I:
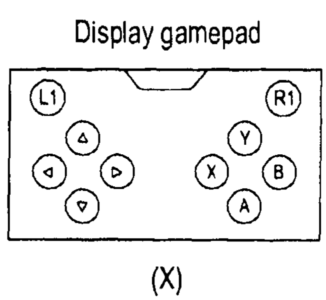
Figure 146J:
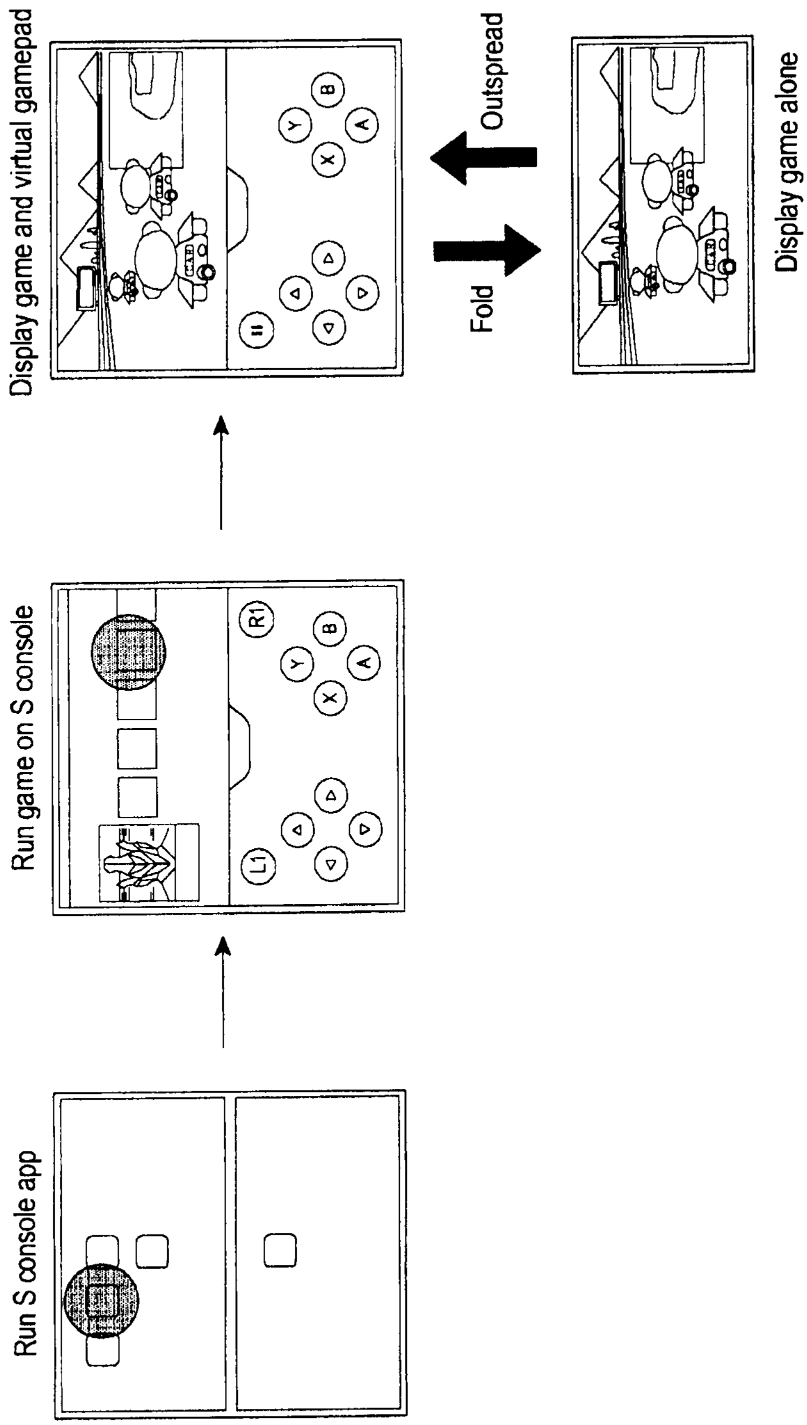

Referring to FIG. 146*e*, the electronic device, according to an embodiment of the present disclosure, may display the gamepad screen on the main display in the outspread mode alone among various form types. Referring to FIG. 146*f*, the electronic device, upon detecting a designation of a console, may display a game application icon. In other words, when running the game application through the console, the electronic device may display the gamepad screen. Referring to FIG. 146*g*, when running the game application without via the console, the electronic device, according to an embodiment of the present disclosure, may display the game screen but not the gamepad. Referring to FIG. 146*h*, the electronic device, according to an embodiment of the present disclosure, may display a launcher screen or game screen in a single-display mode. As shown in FIG. 146*i*, the electronic device, according to an embodiment of the present disclosure, may display a gamepad screen alone in the single-display mode. Referring to FIG. 146*j*, the electronic device, when the game application runs through the console, may display the game screen and the gamepad screen on the sub display and the main display, respectively. Meanwhile, upon detecting a change of the form type into the folded mode, the electronic device may display the game screen alone on the active display. Further, upon detecting a change in form type from the folded mode back to the outspread mode, the electronic device may display the game screen and the gamepad screen on the sub display and the main display, respectively.

Figure 147:
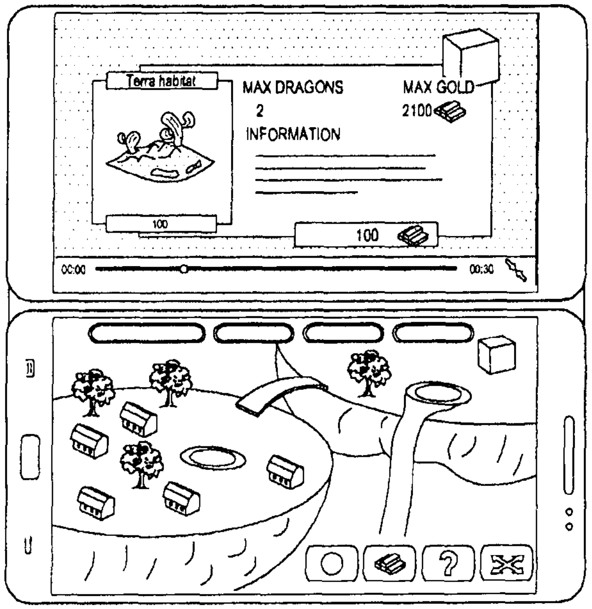

According to an embodiment of the present disclosure, the electronic device may display an application running screen and a help screen of the application on the two displays, respectively. For example, as shown in FIG. 147, the electronic device may simultaneously display the game screen and the game help on the two displays, respectively, allowing the user to easily used to new games.

Figure 148:
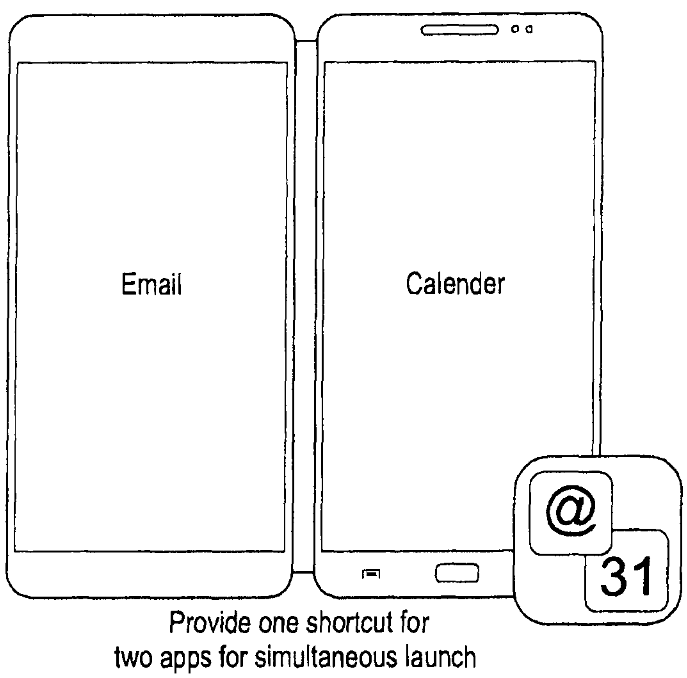

The dual mode refers to a mode in which the respective running screens of two applications are displayed on the two displays, respectively. For example, as shown in FIG. 148, the electronic device, according to an embodiment of the present disclosure, may set coupled applications based on the user's selection. The coupled applications mean applications that are simultaneously run. Where the electronic device runs one of the coupled applications based on the user's selection, the other of the coupled applications may also run or be activated.

Figure 149:
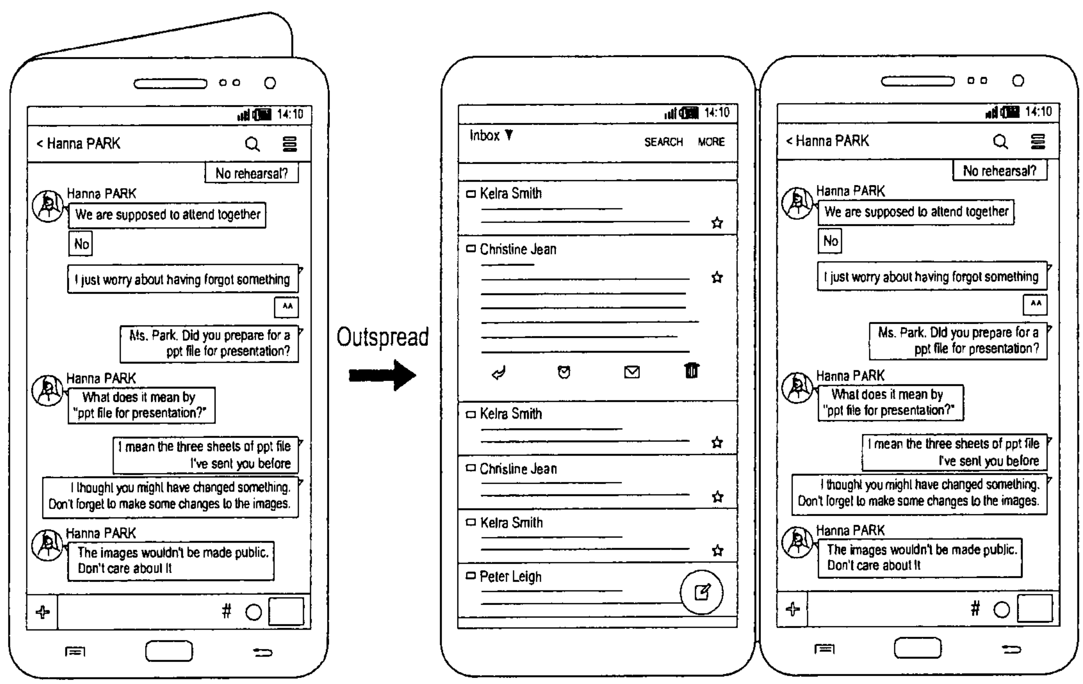

For example, when the form type changes into the outspread mode while a chat application is being displayed on one display in the folded mode as shown in FIG. 149, the electronic device, according to an embodiment of the present disclosure, may run or activate an email application set to be an application coupled with the chat application or may display an execution screen of the email application on the other display.

As another example, where the chat application is run in the outspread mode by the user's selection, the electronic device may run or activate the email application and display the email application on the sub display.

Figure 150:
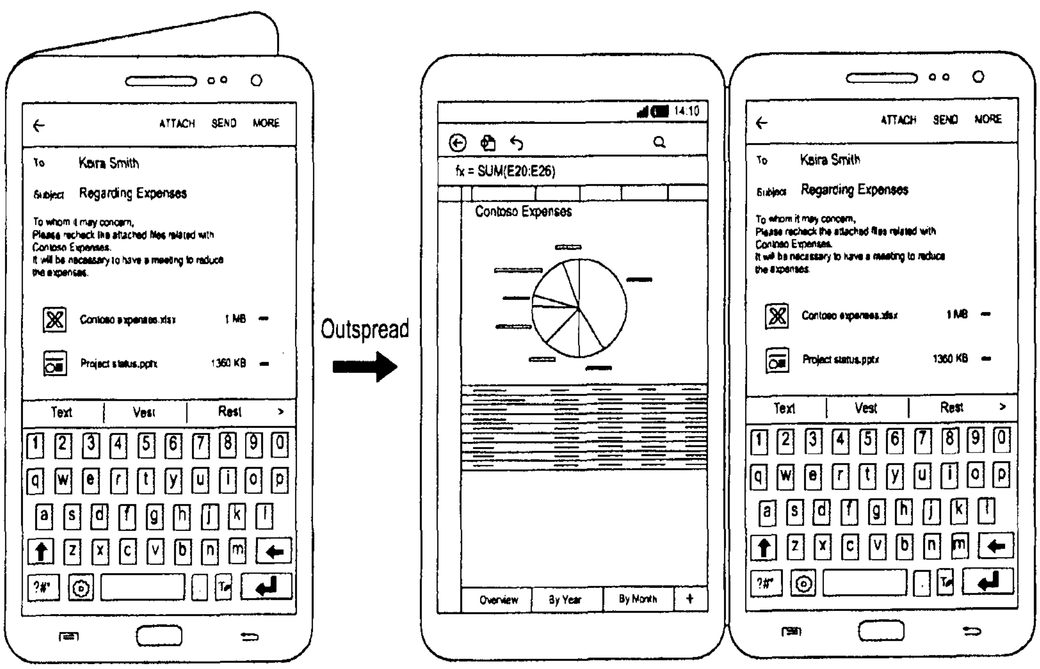

As another example, when the form type changes into the outspread mode while an execution screen of the email application is being displayed in the folded mode as shown in FIG. 150, the electronic device may run an attachment file included in the email being read on the email application and display an execution screen of the attachment file on the sub display.

Figure 151:
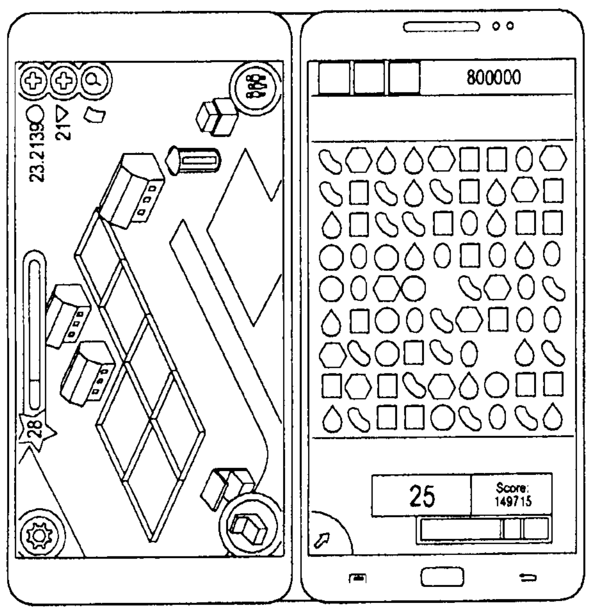

As another example, the electronic device may the respective running screens of two applications unrelated to each other on the two displays, respectively. For example, as shown in FIG. 151, the electronic device may the respective screens of different games on the two displays, respectively.

In this case, the respective sounds for the different game applications may be provided through different routes.

For example, the electronic device may perform control so that a sound generated by a first game is transmitted to another electronic device connected via short-range communication, e.g., bluetooth, and a sound generated by a second game is outputted through the speaker or receiver in the electronic device. As another example, the electronic device may output the sound generated by the first game through an earphone connected to the electronic device and the sound generated by the second game through an external speaker connected through a universal serial bus (USB).

Figure 152:
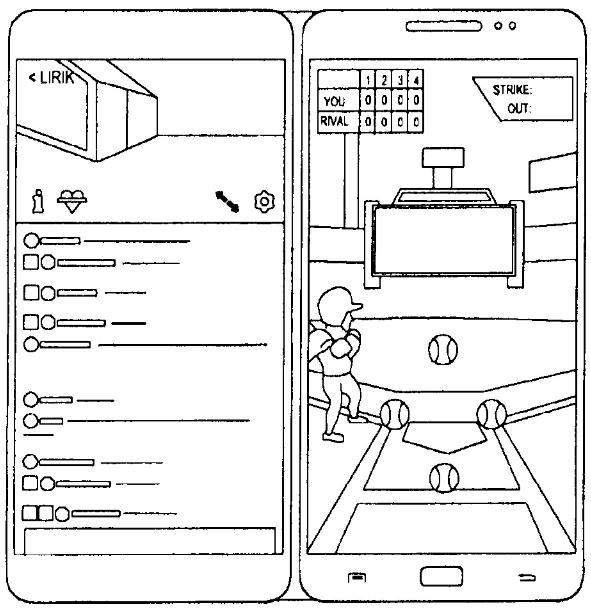

As another example, the electronic device may simultaneously display a video and a game as shown in FIG. 152. The electronic device may display an execution screen of a game casting application or game-related video on the sub display and the game screen on the main display.

Figure 153:
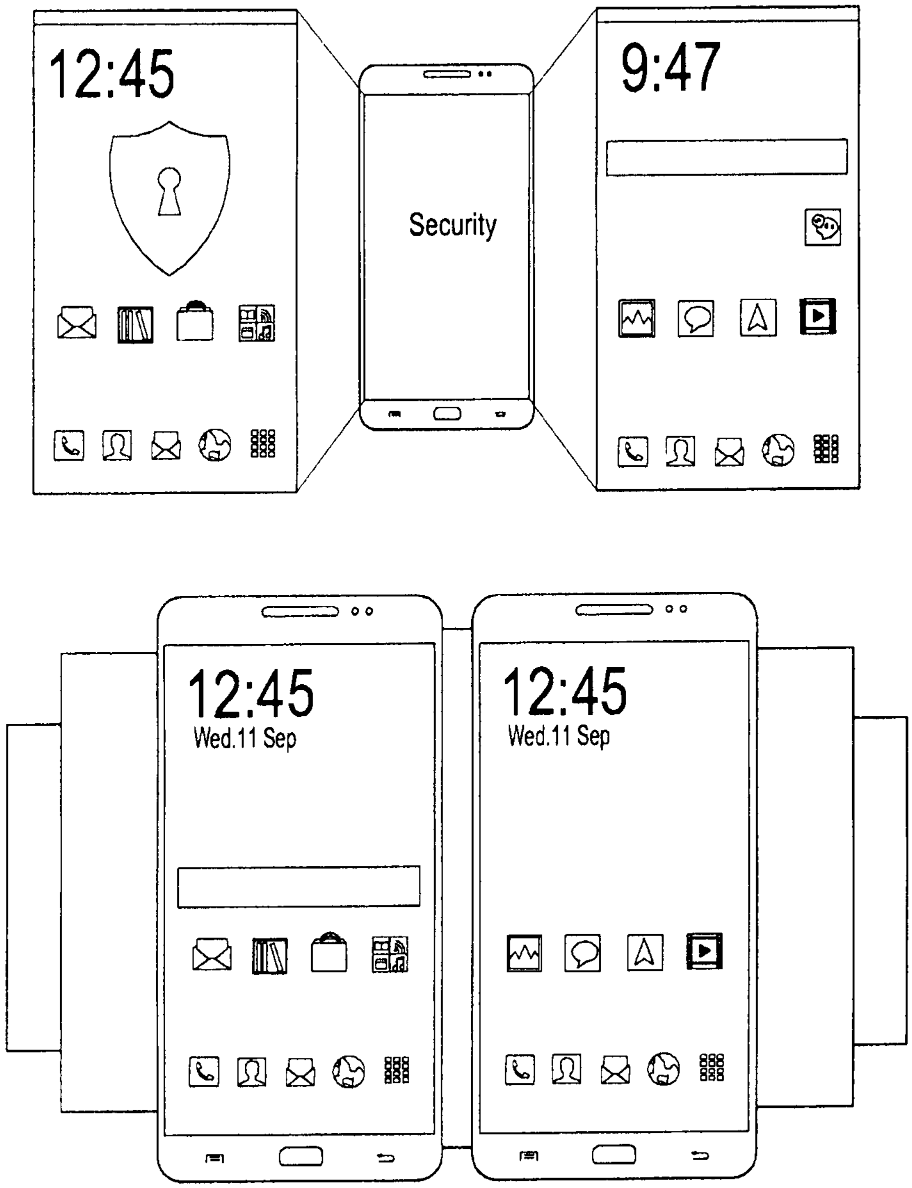

According to an embodiment of the present disclosure, the electronic device may run applications respectively displayed on the two displays in different operating systems (OSs). Specifically, as shown in FIG. 153, the electronic device may run the application displayed on the sub display in a secured operating system, e.g., KNOX™, and the application displayed on the main display on a normal, unsecured operating system. In other words, the electronic device may run any one applications in, e.g., a sand box area. The electronic device may display an application running in a secured area, such as the sand box area, on one of the displays.

Figure 154:
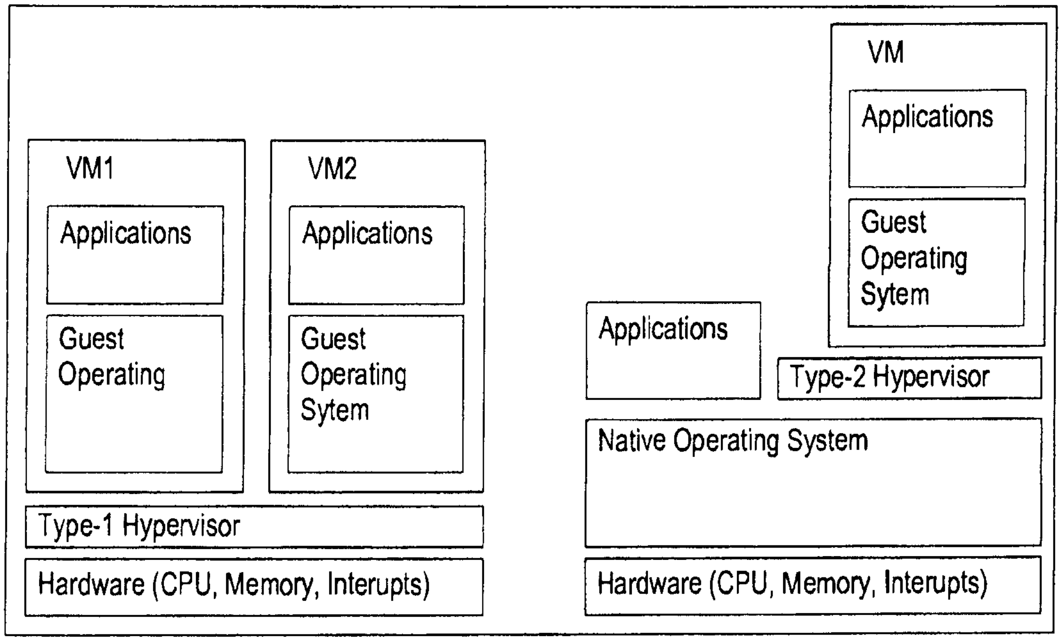

According to an embodiment of the present disclosure, the electronic device may run applications respectively displayed on the two displays through different operating systems. For example, as shown in FIG. 154, the electronic device may run a first application through a native operating system and a second application through a hypervisor of, e.g., second type. Thus, the electronic device may run the application displayed on one of the plurality of displays through a virtual machine (VM). The electronic device may display an execution screen of the first application on the sub display and an execution screen of the second application on the main display. For example, the electronic device may assign the sub display to the display of an application running through Android™ operating system and the main display to the display of an application running through a Window Mobile™-based operating system.

According to an embodiment of the present disclosure, as shown on the left side of FIG. 154, the electronic device may run a first type of hypervisor, and the electronic device may run a first virtual machine VM1 to display the first application on the sub display and run a second virtual machine (VM2) to display the second application on the main display.

Such heterogeneous operating systems may operate fully independently while exchanging information through mutual interworking.

2.12.3. Description of Dual SIM

According to an embodiment of the present disclosure, the electronic device may provide a dual subscriber identity module (SIM) using one or more SIMs, allowing the user more convenience.

Figure 155:
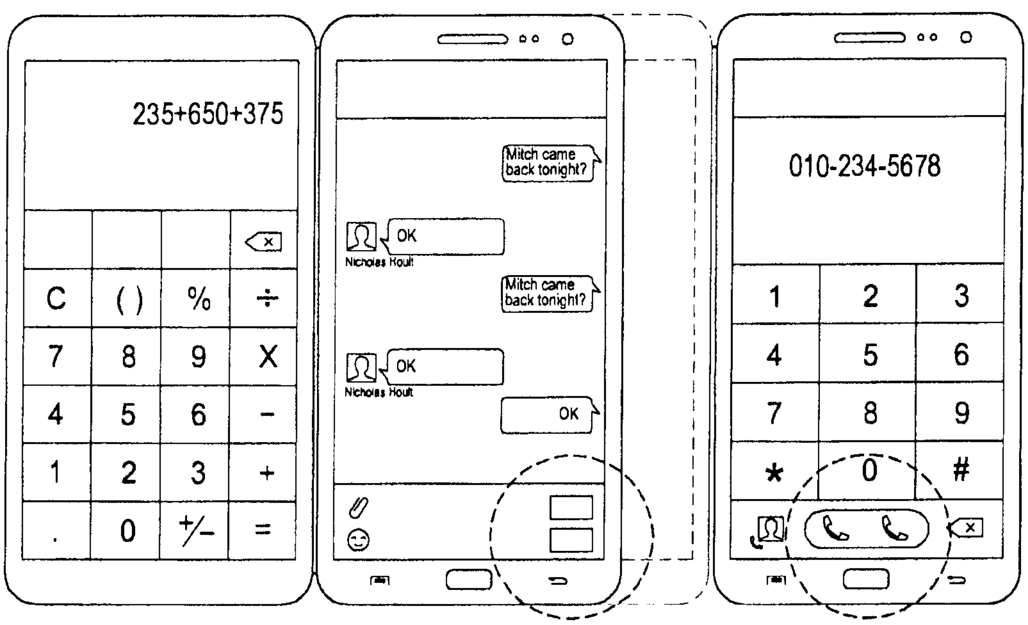

A most fundamental operating method is, e.g., to display multiple SIMs for individual operations related to the SIMs to enable the user to select as shown in FIG. 155. Where an application required to interwork with an SIM, e.g., a messenger application or phone application, runs as shown in the figure, the electronic device may provide a UI indicating the number of SIMs embedded. Based on the user's selection entered through the UI, the electronic device may run the corresponding application using at least one of the plurality of SIMs.

Figure 156:
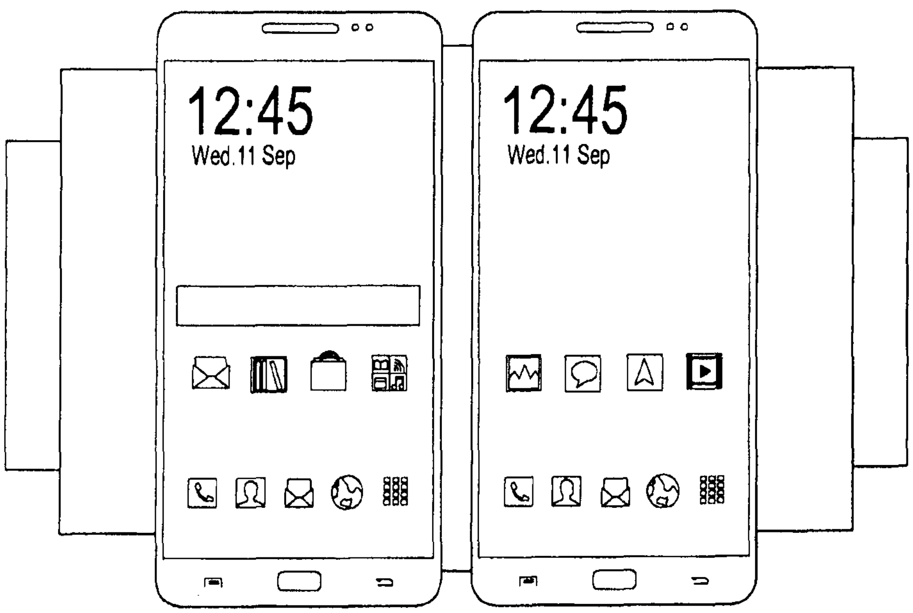

For example, the electronic device may display an execution screen of an application interworking with a first SIM on a first display and an execution screen of an application interworking with a second SIM on a second display. In other words, as shown in FIG. 156, the electronic device may enable various applications, but not just the displays or the phone application, to interwork with different SIMs, allowing the user to use two independent electronic devices.

Figure 157:
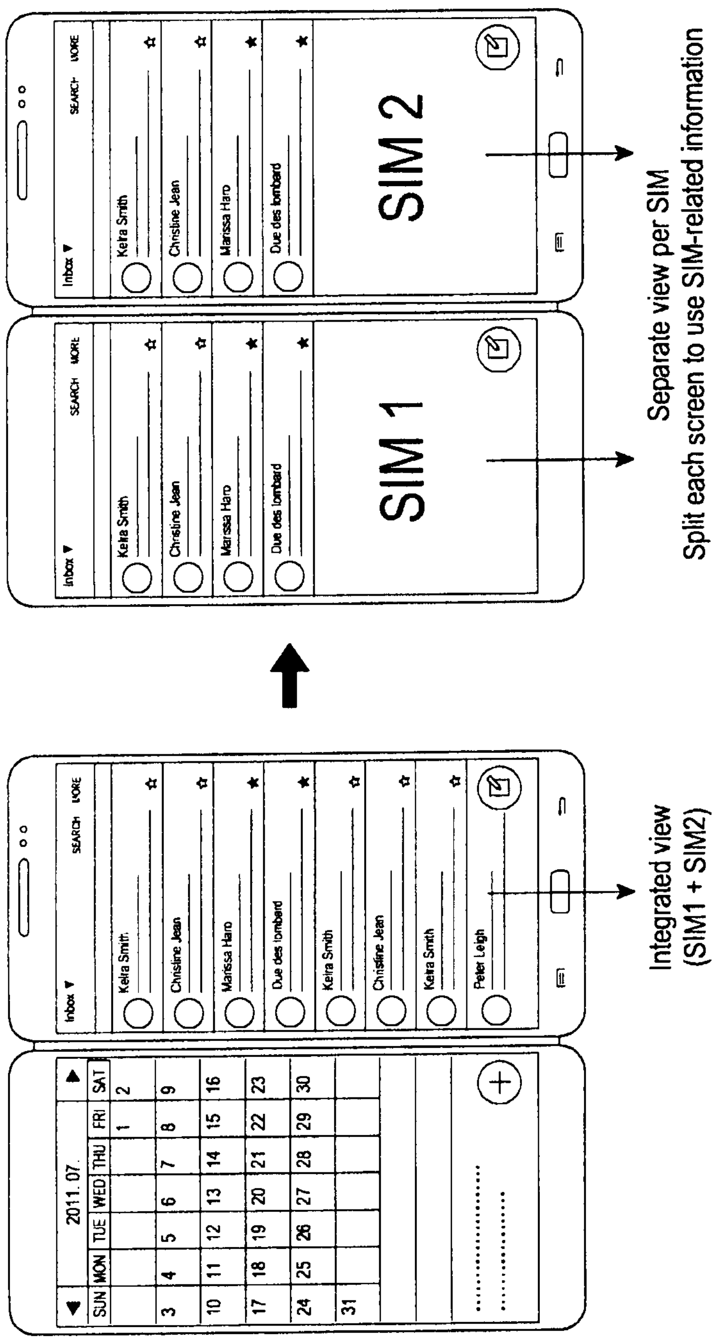

As another example, the electronic device may selectively use the two displays only for functions related to the phone application. Where a contact manager application runs as shown in FIG. 157, the electronic device may display a contact related to the first SIM on the first display and a contact related to the second SIM on the second display.

Figure 158:
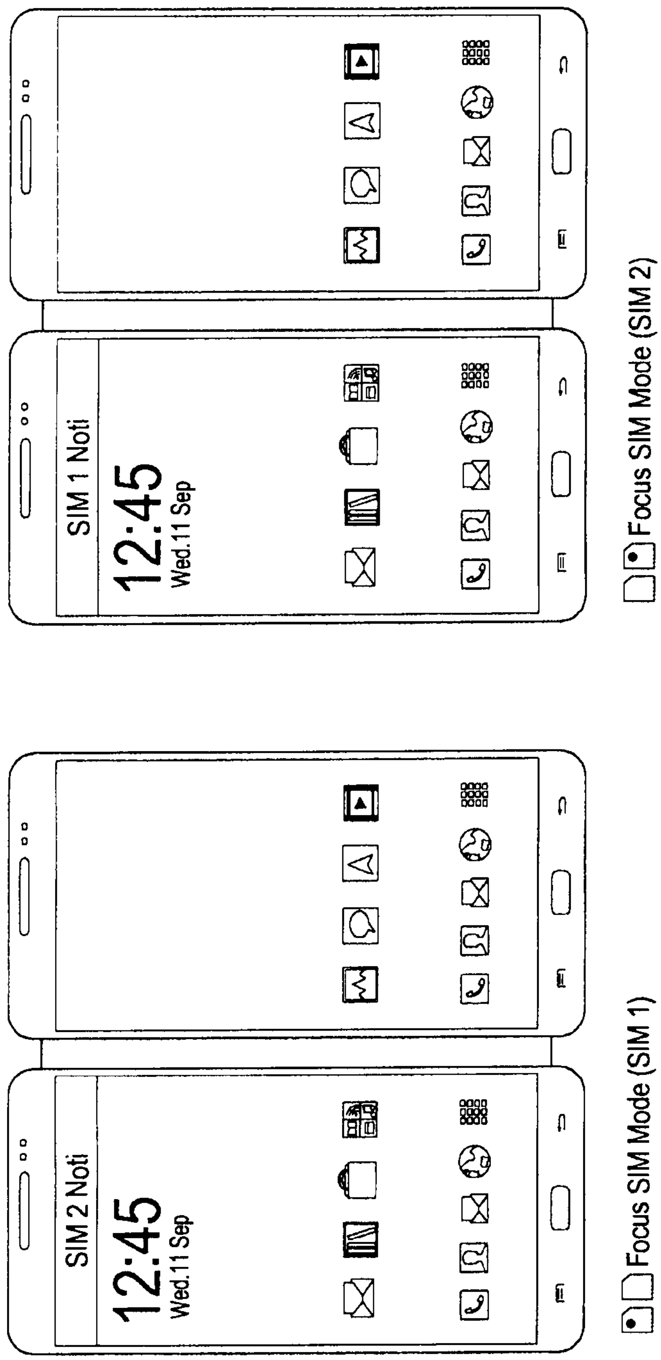

According to an embodiment of the present disclosure, a concentrated SIM mode may be provided. When the user selects one of the two SIM modes, the electronic device may operate focusing on the selected first SIM. Meanwhile, where an event related to the second SIM not selected occurs, the electronic device may provide a type of notification as shown in FIG. 158.

The above-described various dual SIM operations may be used in a single fixed form or may also be used while switching into one or more forms under the user's selection or terminal operation.

Chapter 3—Description of Accessories and Other Devices.

Further, the electronic device having the multiple displays may have additional features regarding interwork with and control of a peripheral device (e.g., a wearable watch).

Figure 159:
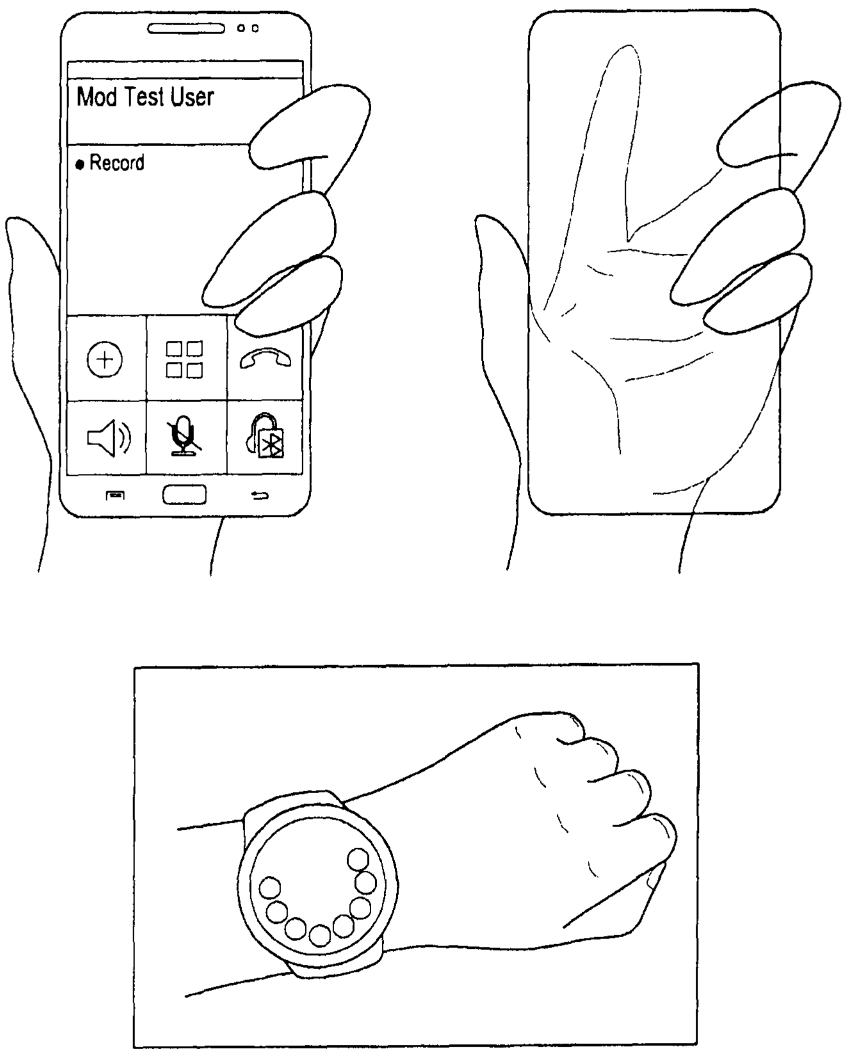
FIG. 159 is a concept view illustrating an electronic device according to an embodiment of the present disclosure.

According to an embodiment of the present disclosure, while the user proceeds with a phone call using the electronic device with a wearable watch connected with the electronic device having the plurality of displays, the user may be viewing the wearable watch to use the wearable watch (e.g., Gear S2). In this case, according to what has been mentioned above in Chapter 2, the electronic device may provide a call-related function through the main display and may detect the user's touch through the sub display having the TSP function activated at the backside. The electronic device may control the wearable device using the user input detected on the rear sub display as shown in FIG. 159.

Chapter 4—Description of Operation of Various Applications 4.1. Overview

According to an embodiment of the present disclosure, the electronic device having the multiple displays may run various types of applications and provide various screens depending on form types. This chapter deals with operations of the electronic device in each form type when various types of applications run.

4.2. Description of Home Screen 4.2.1. Overview of Home Screen

According to an embodiment of the present disclosure, the electronic device may display the home screen on at least one of the plurality of displays. The electronic device may run an application (e.g., a launcher application) for the home screen and may display the home screen, which is an execution screen, on at least one display.

4.2.2. Description of Rotation

Figure 160:
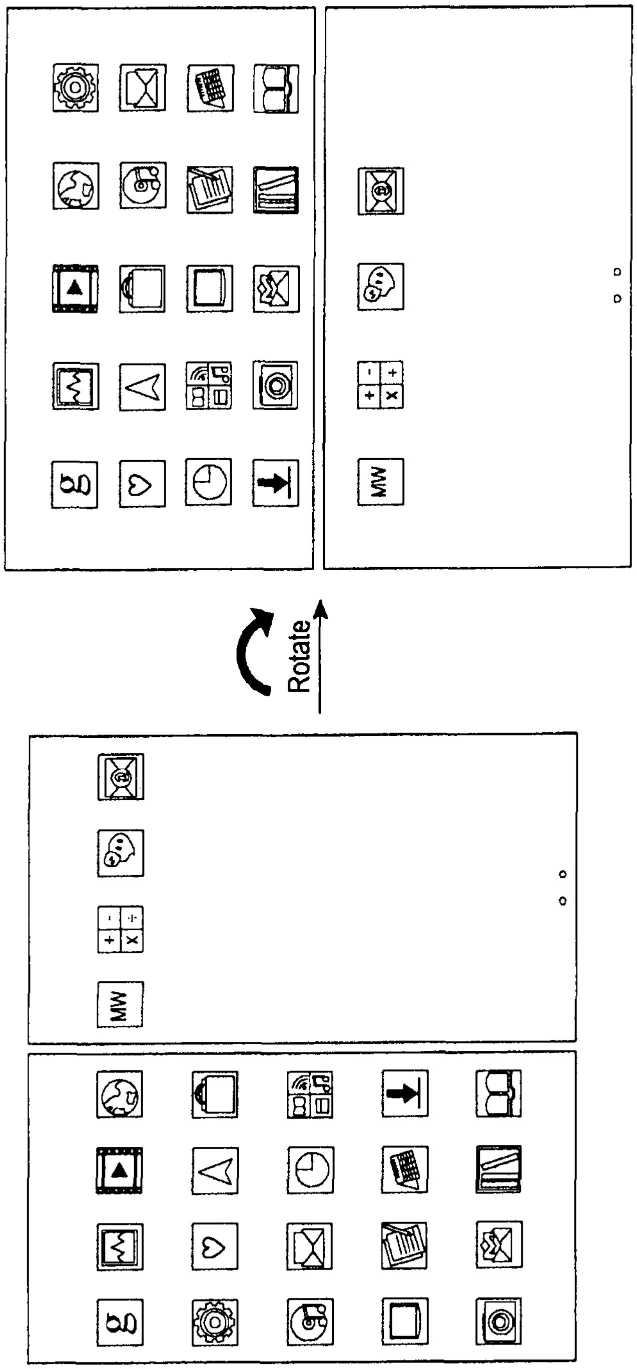
FIGS. 160 to 206 are concept views illustrating a home screen according to an embodiment of the present disclosure.

Referring to FIG. 160, the electronic device, according to an embodiment of the present disclosure, may display an expanded home screen on both the displays. The electronic device may display the home screen expanded in the portrait mode on both the displays. The electronic device may display a first page of the home screen on the left side (e.g., the sub display) and a second page of the home screen on the right side (e.g., the main display). Here, the "page" is the unit for dividing the home screen. One page may be displayed on one display. Further, each page by the home screen may have its turn. Accordingly, upon entry of a page switch command, such as a swipe, on one display, the electronic device may display the screen corresponding to the page set prior or subsequent to the page of the home screen.

Referring back to FIG. 160, according to an embodiment of the present disclosure, the electronic device may detect a rotation of the electronic device while displaying the home screen on both the displays in the portrait mode. For example, the electronic device may detect the rotation using sensing data obtained from various motion sensors (e.g., a gyro sensor or a three-axis acceleration sensor) included in the electronic device. The electronic device may display the home screen in the landscape mode in response to the detection of the rotation. For example, as shown on the right side of FIG. 160, the electronic device may display each page of home screen, in the landscape mode, on each of the sub display and the main display. Specifically, the electronic device sorts and displays four icons on one page in a right direction in the portrait mode. The electronic device may sort and display five icons in a right direction on one page in the landscape mode. Accordingly, although the "Samsung Pay™" icon is placed in the second line in the portrait mode, it may be placed in the first line in the landscape mode. That is, the icons may be sorted differently in the portrait mode and the landscape mode.

Figure 161:
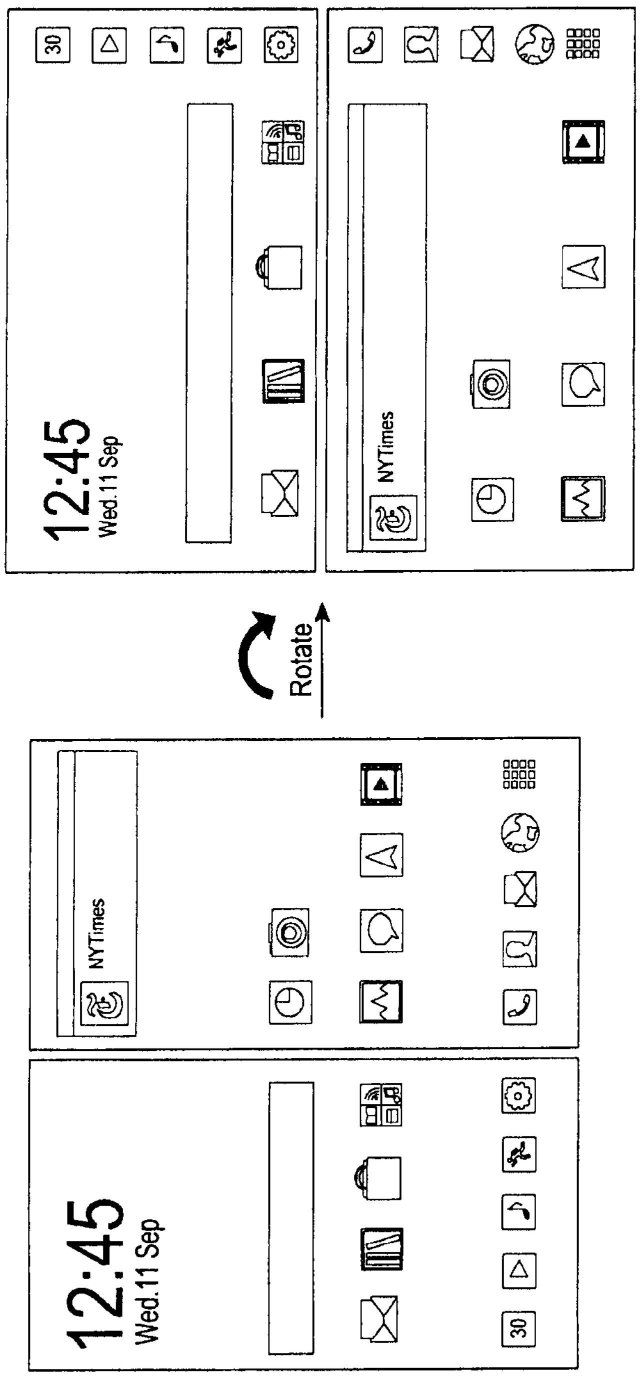

FIG. 161 illustrates an example in which the home screen includes widgets and a fixed icon bar according to an embodiment of the present disclosure. Here, the fixed icon bar is a portion configured independently of the icons arranged on each page on the home screen, which mean an area in which icons stay on even when a page switch occurs. As shown in FIG. 161, the electronic device may a first page of the home screen on the sub display. The first page may include a clock widget, a search widget, and a fixed icon bar separately including applications frequently used, as well as icons. The electronic device may display the widgets on an upper portion or middle portion of the display and display the icons under the widgets. The electronic device may display a fix application bar on a lower portion of the display. That is, in the portrait mode, widgets, and the fixed icon bar may sequentially be displayed from the upper portion to the lower portion. The electronic device may also display objects (widgets, icons, and fixed icon bar) in the above order on the main display.

According to an embodiment of the present disclosure, the electronic device may detect a rotation and display the home screen in the landscape mode in response to the detection. As shown on the right side of FIG. 161, the home screen in the landscape mode may include a widget at an upper and left portion and icons at a lower portion. The home screen in the landscape mode may include a fixed icon bar at a right side. As described above, according to an embodiment of the present disclosure, the electronic device, upon detecting a rotation, may switch the home screen between the landscape mode and the portrait mode and display the same.

Figure 162:
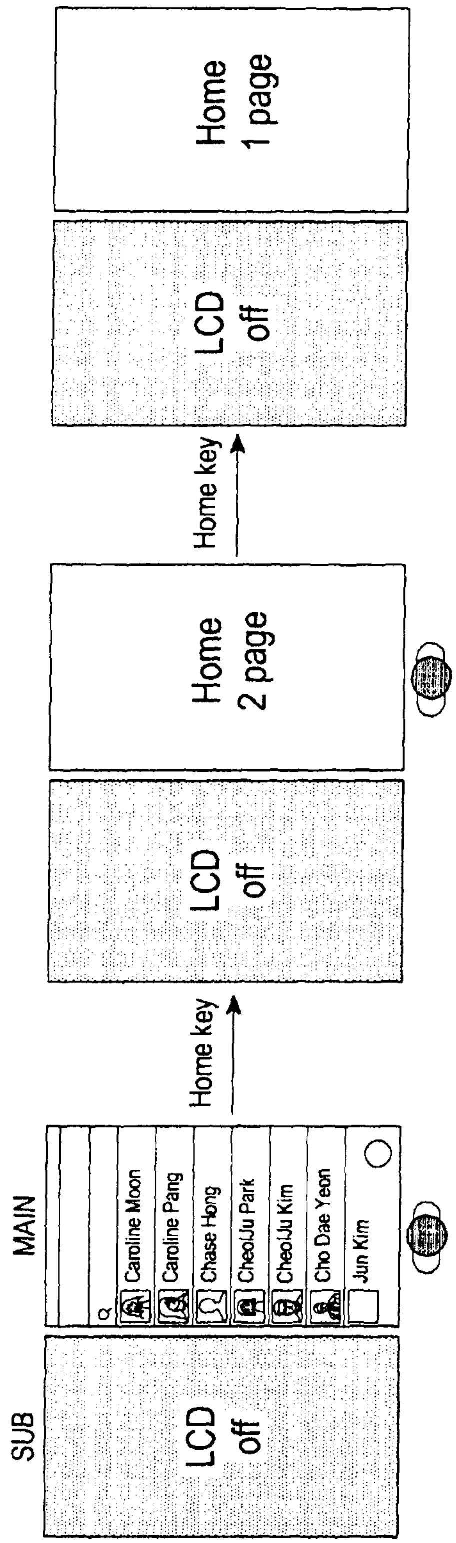

4.2.3. Description of Home Screen in Various Form Types 4.2.3.1. Description of Home Screen in Folded Mode Referring to FIG. 162, according to an embodiment of the present disclosure, the electronic device in the folded mode may control the sub display in the off state and the main display in the on state. The electronic device may display an execution screen of, e.g., a contact manager application, on the main display. In this case, the electronic device may detect a press of the home key provided in the body having the main display. In response to the press of the home key, the electronic device may display the home screen instead of the application running screen on the main display. According to an embodiment of the present disclosure, the electronic device may display the second page of the home screen on the main display. This is related to the default in which the first page of the home screen is displayed on the sub display, and the second page of the home screen is displayed on the main display, as set forth above in connection with 4.2.2. In this case, the electronic device may display the first page of the home screen of the sub display as the background on the sub display. Meanwhile, upon detecting another pressure of the home key, the electronic device may display the first page of the home screen on the main display.

Figure 163:
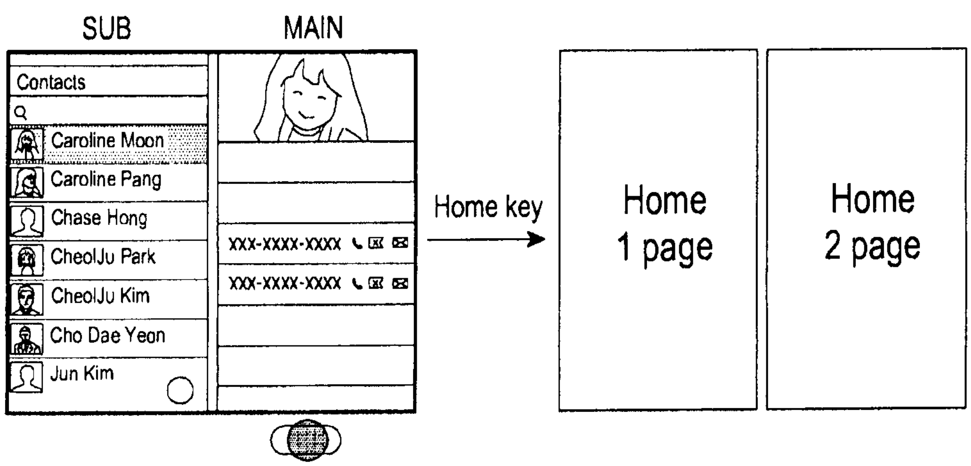

4.2.3.2. Description of Home Screen in Outspread Mode 4.2.3.2.1 Description of Home Screen in Expand Mode Referring to FIG. 163, according to an embodiment of the present disclosure, the electronic device may display an expanded application running screen (e.g., an expanded running screen of the contact manager application). The electronic device may detect a pressure of the home key, and in response, display the expanded home screen on both the displays. For example, the electronic device may display the first page of the home screen on the sub display and the second page of the home screen on the main display.

Figure 164:
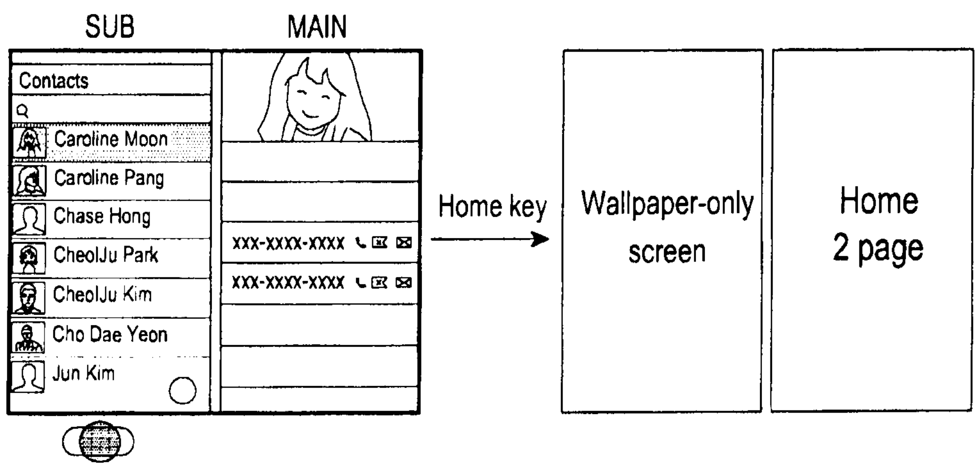

FIG. 164 is a concept view illustrating an execution screen of a third party launcher application that does not support an expanded running screen according to an embodiment of the present disclosure> As shown in FIG. 164, the electronic device may display an expanded application running screen (e.g., an expanded running screen of the contact manager application). The electronic device may detect a pressure of the home key, and in response, display the home screen on one display. For example, the electronic device may display the home screen on the display included in the body where the pressure of the home key has been detected; in the example of FIG. 164, the electronic device may display the home screen on the main display. As described above, the home screen displayed on the main display may be the second page as default, and accordingly, the electronic device may display the second page of the home screen on the main display. Further, the electronic device may display a background screen where only the wall paper is present on the sub display. According to an embodiment of the present disclosure, the electronic device may display a shrunken running screen of the application (e.g., the contact manager application) that used to be displayed on the sub display.

4.2.3.2.2 Description of Home Screen in Dual Mode

Figure 165:
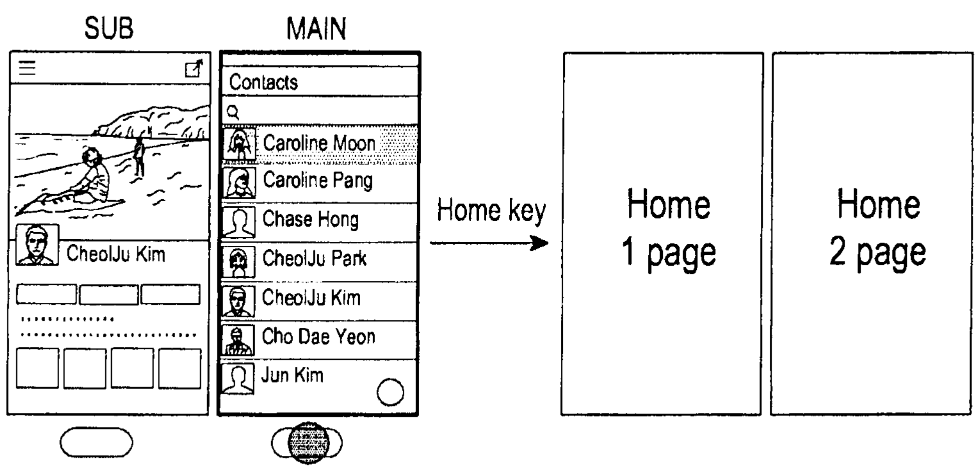

FIG. 165 illustrates an example of running the home screen in the dual mode according to an embodiment of the present disclosure. The electronic device may display different application running screens on the displays, respectively, in the dual mode. The electronic device may detect a press of the home key, and in response, display an expanded home screen on both the displays. Specifically, the electronic device may display the first page of the home screen on the sub display and the second page of the home screen on the main display.

4.2.3.2.3 Description of Single Home Screen

Figure 166:
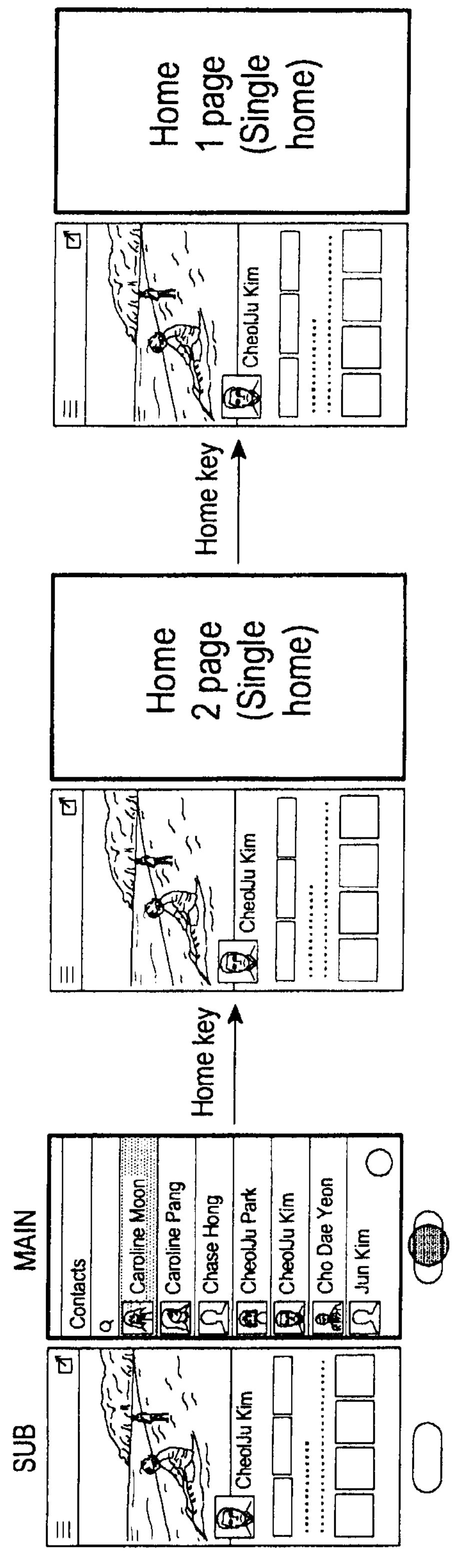
Figure 167:
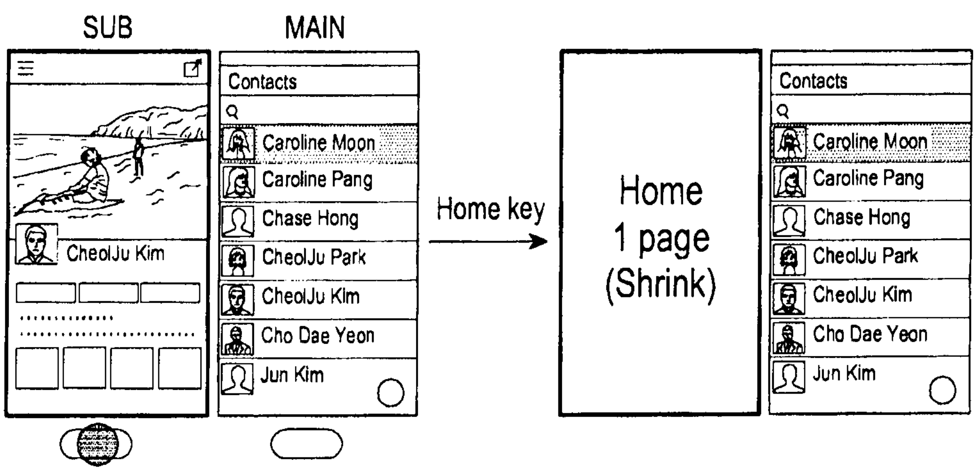
Figure 168:
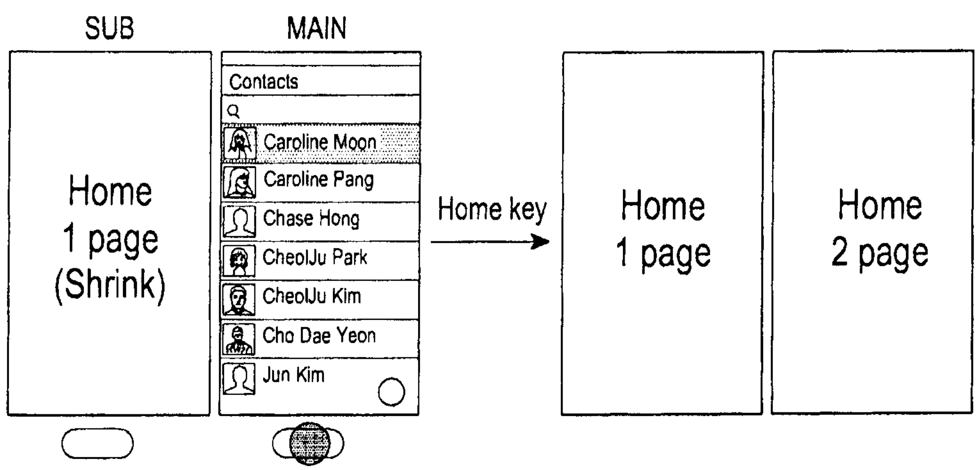

FIGS. 166 to 168 illustrate examples of displaying a single home screen according to various embodiments of the present disclosure. Referring to FIG. 166, the electronic device in the dual mode may display two application running screens on the two displays, respectively. The electronic device may detect a press of the home key, and in response, display a single-screen home screen on the main display. The electronic device may display the home screen on the display included in the body where the pressure of the home key has been detected. As described above, the home screen displayed on the main display may be the second page as default, and accordingly, the electronic device may display the second page of the home screen on the main display. Meanwhile, upon detecting another pressure of the home key, the electronic device may display the first page of the home screen on the main display.

Referring to FIG. 167, according to an embodiment of the present disclosure, the electronic device in the dual mode may display two application running screens on the two displays, respectively. The electronic device may detect a press of the home key, and in response, display a single-screen home screen on the main display. Referring to FIG. 167, as the electronic device detects a pressure of the home key disposed in the body having the sub display, the electronic device may display the home screen on the sub display. As described above, the home screen displayed on the sub display may be the first page as default, and accordingly, the electronic device may display the first page of the home screen on the sub display.

Referring to FIG. 168, according to an embodiment of the present disclosure, the electronic device in the dual mode may display an application running screen on the main display and the home screen (e.g., the first page) on the sub display. Meanwhile, the electronic device may detect a press of the home key, and in response, display a single-screen home screen on the main display. Referring to FIG. 168, as the electronic device detects a pressure of the home key disposed in the body having the main display, the electronic device may display the home screen on the main display. As described above, the home screen displayed on the main display may be the second page as default, and accordingly, the electronic device may display the second page of the home screen on the main display.

4.2.3.2.4 Description of Home Screen Shrinking

Figure 169:
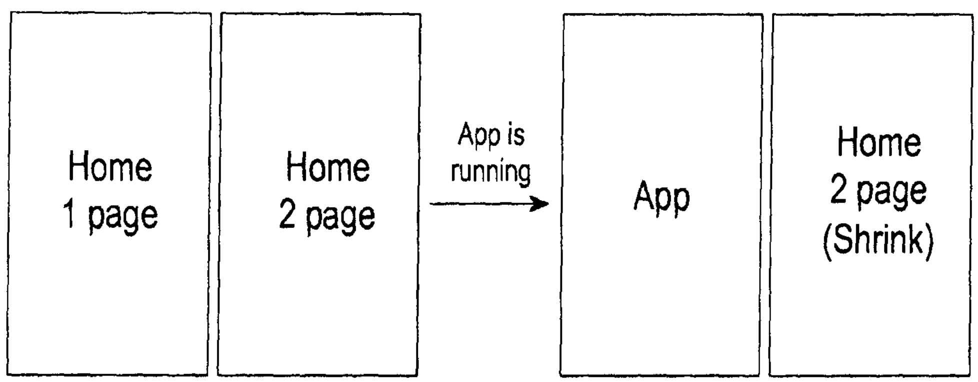

FIGS. 169 to 173 illustrate examples in which the home screen shrinks according to various embodiments of the present disclosure. Referring to FIG. 169, the electronic device may an expanded home screen on the sub display and the main display both. Specifically, the electronic device may display the first page of the home screen on the sub display and the second page of the home screen on the main display. The electronic device may run an application depending on, e.g., the user's selection. The electronic device may display an execution screen of the application on the sub display and a shrunken home screen on the main display. In this embodiment, the shrunken home screen may be a single page, and accordingly, the electronic device may display the second page of the home screen on the main display.

Figure 170:
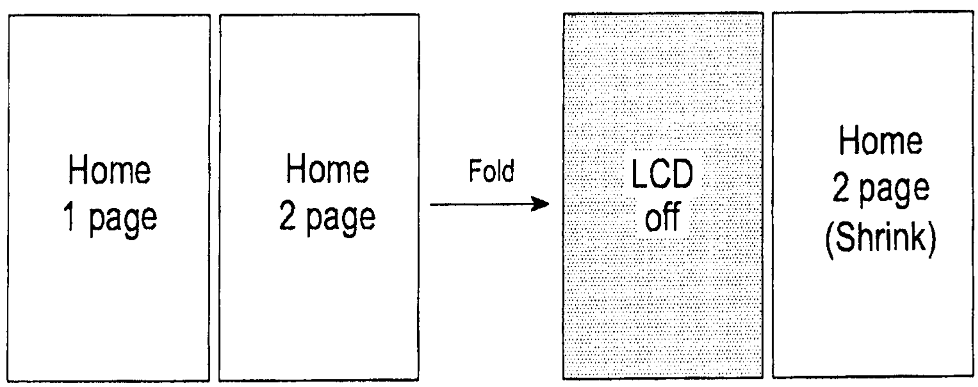

Referring to FIG. 170, according to an embodiment of the present disclosure, the electronic device may an expanded home screen on the sub display and the main display both. Specifically, the electronic device may display the first page of the home screen on the sub display and the second page of the home screen on the main display. The electronic device may detect a change in form type from the outspread mode to the folded mode. In response to the form type change, the electronic device may control the inactive display (e.g., the sub display) in the off state and may display a shrunken home screen on the active display (e.g., the main display). In FIG. 170, the eye-like image may denote that the display is the active display. (??) In this embodiment, the shrunken home screen may be a single page, and accordingly, the electronic device may display the second page of the home screen on the main display.

Figure 171:
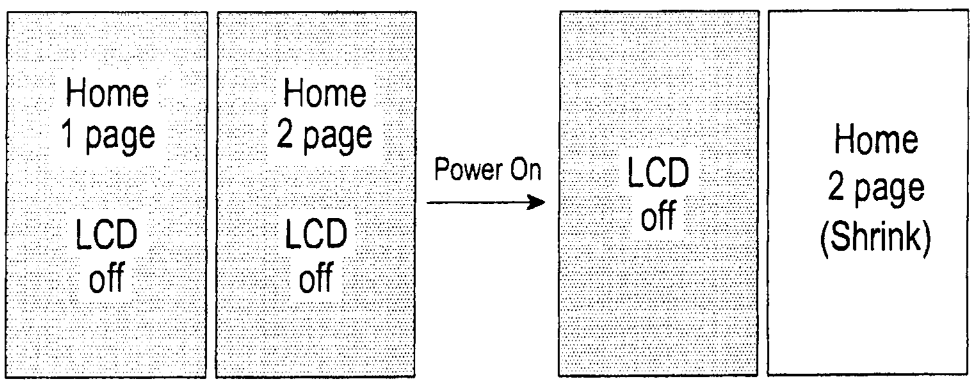

Referring to FIG. 171, according to an embodiment of the present disclosure, the electronic device in the folded mode may control both the displays in the off state. Upon power-on, the electronic device may control the active display (e.g., the main display) in the on state and maintain the inactive display (e.g., the sub display) in the off state. The electronic device may display a shrunken home screen on the active display that has been switched into the on state. In this embodiment, the shrunken home screen may be a single page, and accordingly, the electronic device may display the second page of the home screen on the main display. Although not shown, where the active display is the sub display, the electronic device may display the first page of the home screen on the sub display and maintain the main display in the off state.

Figure 172:
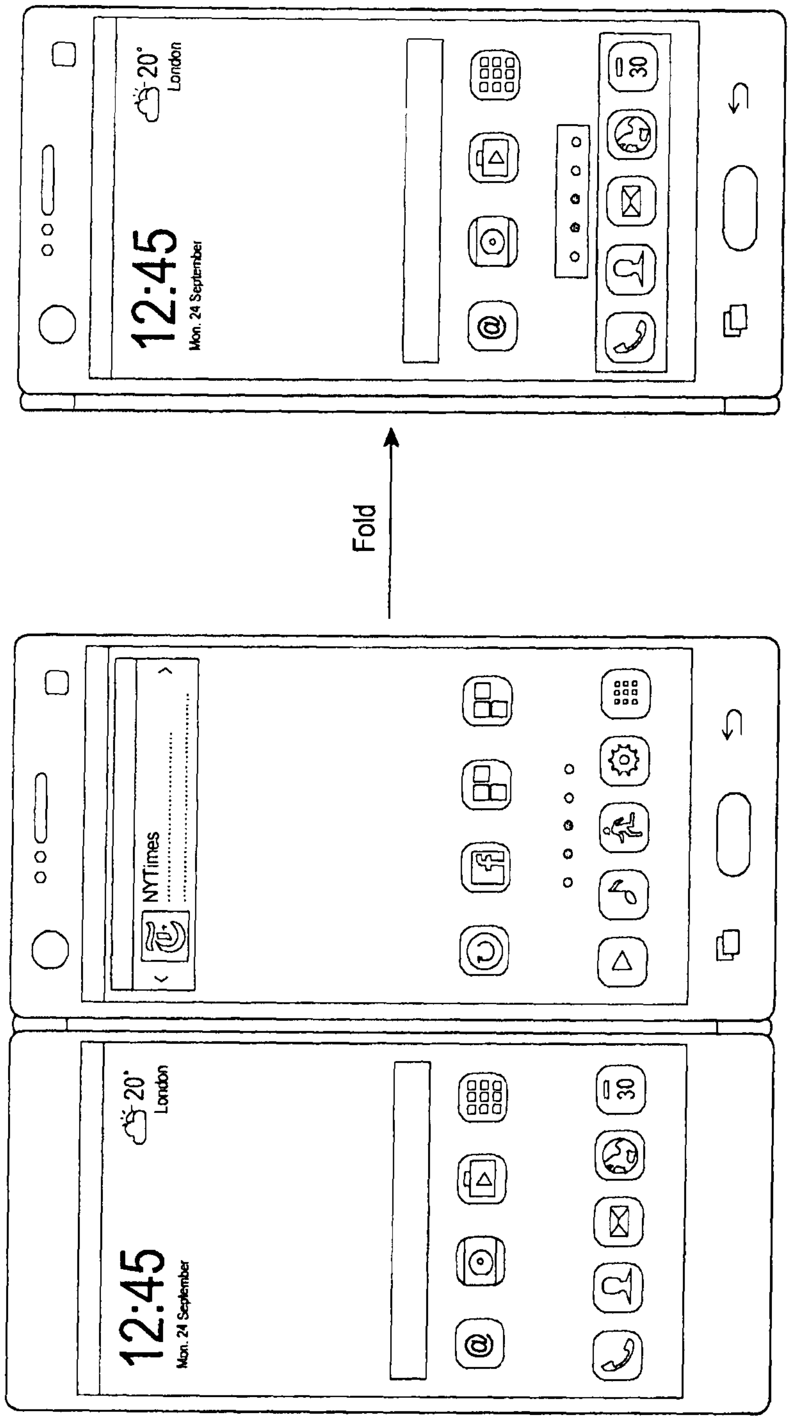

Referring to FIG. 172, according to an embodiment of the present disclosure, the electronic device may an expanded home screen on the sub display and the main display both. Specifically, the electronic device may display the second page of the home screen on the sub display and a third page of the home screen on the main display. The second page may include a first icon (e.g., an email, camera, appstore, or Google™ icon) and a first fixed icon bar (e.g., a phone, contact, message, internet, or planner icon). The third page may include a second icon (e.g., a smart manager, Facebook™, social media, or Microsoft™ icon) and a second fixed icon bar (e.g., a video, music, healthcare, settings, or shortcut to application icon).

Figure 173:
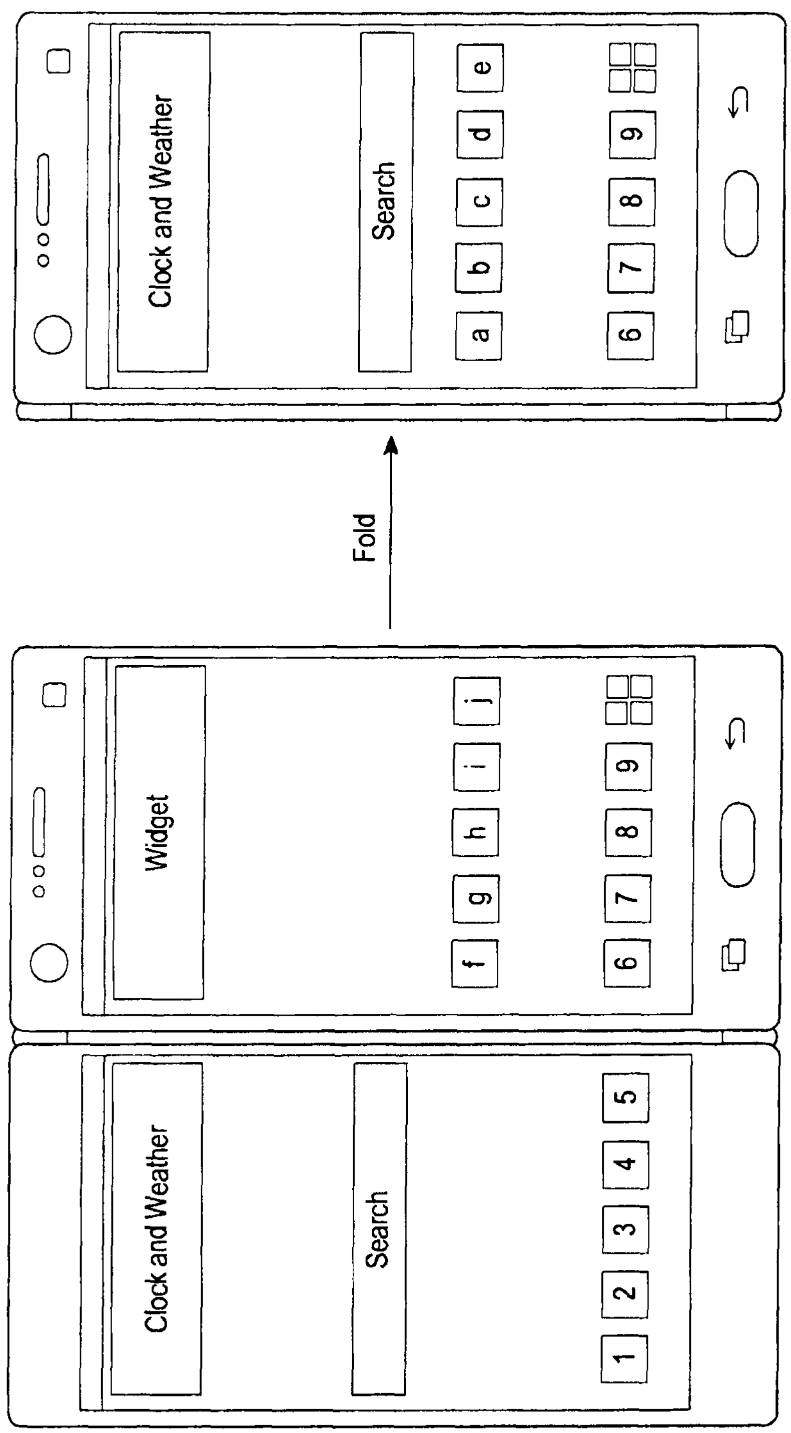

According to an embodiment of the present disclosure, the electronic device may detect a change in form type from the outspread mode to the folded mode. In response to the form type change, the electronic device may control the inactive display (e.g., the sub display) in the off state and may display a shrunken home screen on the active display (e.g., the main display). In this embodiment, the shrunken home screen may be a single page in which case the icon of the page may include an icon (e.g., an email, camera, appstore, or Google™ icon) of the second page, and the fixed icon bar may include the fixed icon bar (e.g., a video, music, healthcare, settings, or shortcut to application icon) of the third page. FIG. 173 may be a normalized view of FIG. 172. As shown in FIG. 173, the shrunken home screen may include the icons (e.g., icons a, b, c, d, and e) used to be displayed on the sub display, and the fixed icon bar may include the fixed icon bar (e.g., icons 6, 7, 8, and 9) used to be displayed on the main display. Further, the shrunken home screen may include the widgets (e.g., the clock and weather widget and Google Search™ widget) used to be displayed on the sub display.

4.2.3.2.5 Description of Home Screen Expanding

Figure 174:
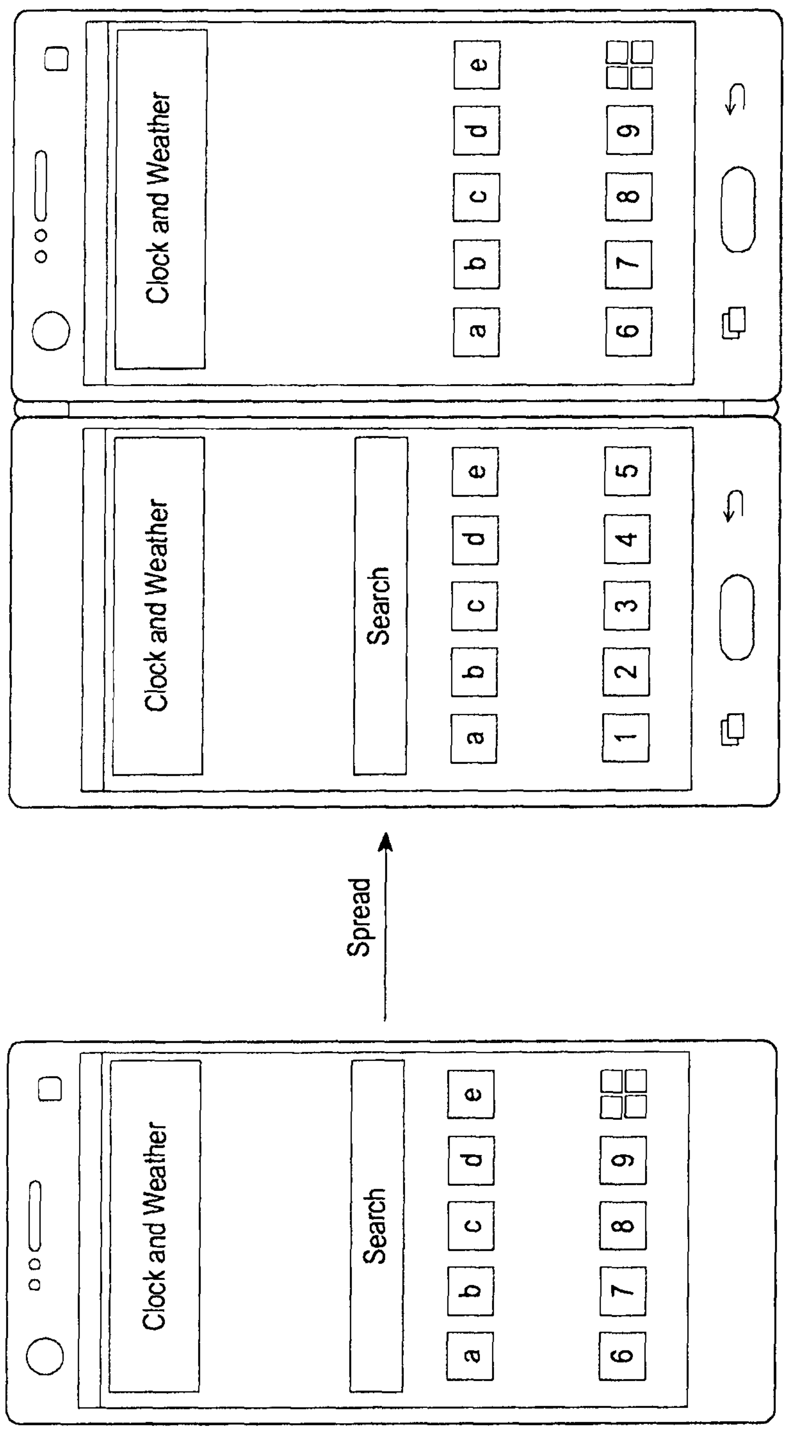

Referring to FIG. 174, according to an embodiment of the present disclosure, the electronic device in the folded mode may display a shrunken home screen on the active display. The electronic device may display the shrunken home screen, e.g., by the form type change shown in FIG. 173. The electronic device may display a change in form type from the folded mode back to the outspread mode. In response to the form type change, the electronic device may display an expanded home screen on both the displays. For example, as shown in FIG. 174, the electronic device may display the icons a, b, c, d, and e and the fixed icon bar including the icons 1, 2, 3, 4, and 5 on the sub display. The electronic device may display the icons f, g, h, i, and j and the fixed icon bar including the icons 6, 7, 8, and 9 on the main display. That is, the electronic device may display the expanded home screen as shown in FIG. 173. Thus, the processes of FIGS. 173 and 174 may be reversely performed.

Figure 175:
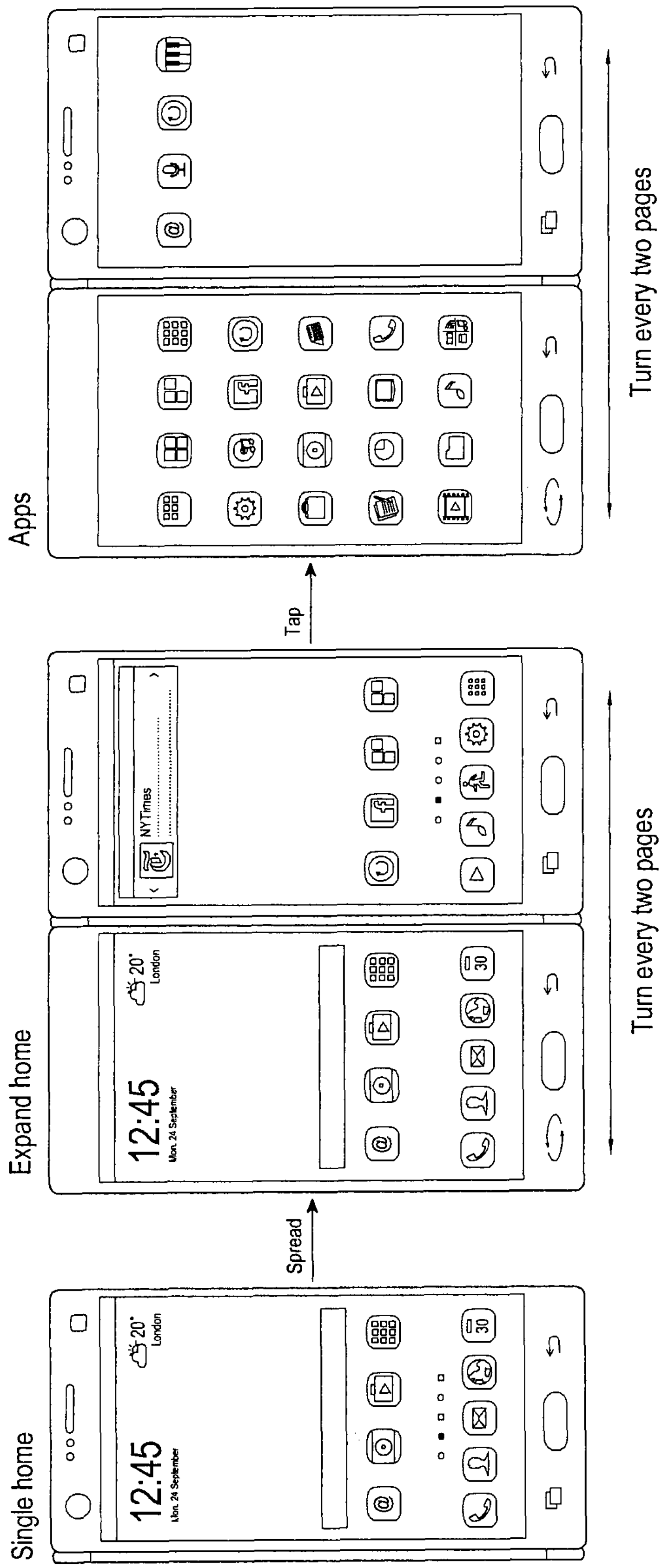

Referring to FIG. 175, according to an embodiment of the present disclosure, the electronic device in the folded mode may display a shrunken home screen. The electronic device may detect a change in form type between the folded mode to the outspread mode. Upon detecting a form type change, the electronic device may display the expanded home screen on both the displays. For example, the electronic device may display the first page of the home screen on the sub display and the second page of the home screen on the main display. Thereafter, the electronic device may detect a switch home screen page command. According to an embodiment of the present disclosure, a tap for at least one of the displays may be set as the switch home screen page command. The electronic device, upon detecting the tap for the display, may determine that the switch home screen page command has been detected. The electronic device may switch home screens per two pages. For example, the electronic device may switch the first page of the home screen used to be displayed on the sub display into the third page of the home screen and display the third page, and the electronic device may switch the second page of the home screen used to be displayed on the main display into a fourth page of the home screen and display the fourth page. Thus, the electronic device which used to display the first and second page of the function screen as the expanded home screen may display the third and fourth page as switched expanded home screen.

4.2.3.2.6 Description of Home Screen Upon Detecting Flip

Figure 176:
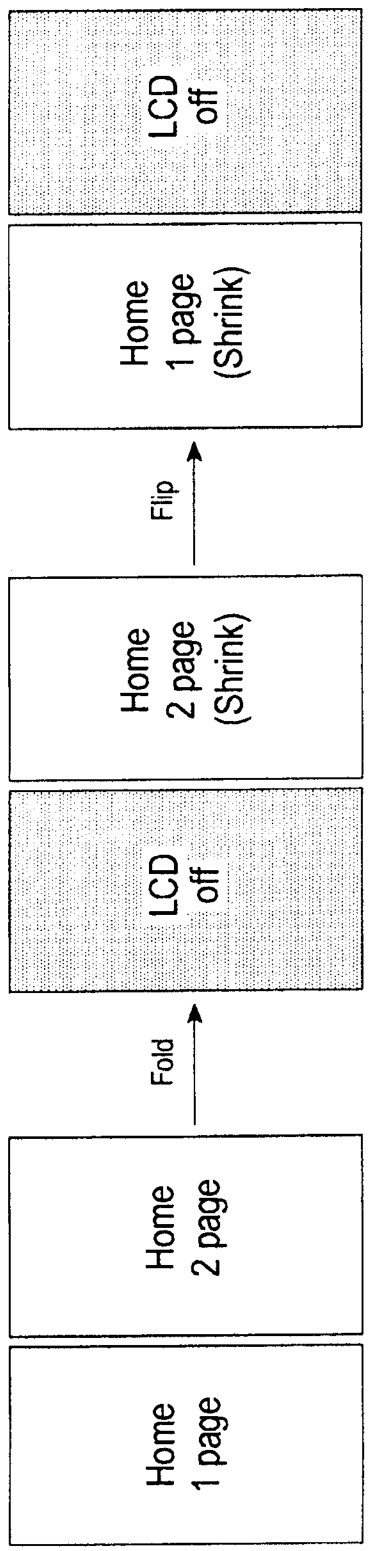

Referring to FIG. 176, the electronic device, according to an embodiment of the present disclosure, may display an expanded home screen on both the displays in the outspread mode. The electronic device may detect a change in form type from the outspread mode to the folded mode, and in response, control the inactive display (e.g., the sub display) in the off state. The electronic device may display a shrunken home screen while maintaining the active display (e.g., the main display) in the on state. For example, the electronic device may display the second page of the home screen as the shrunken home screen on the active display. In this case, the electronic device may detect a flip of the electronic device. In response to the flip of the electronic device, the electronic device may switch the active display and the inactive display. Specifically, the electronic device may determine that the sub display is the active display and control it in the on state, and the electronic device may determine that the main display is the inactive display and control it in the off state. The electronic device may display a shrunken home screen on the sub display. The electronic device may display the first page of the home screen as the shrunken home screen on the sub display. According to an embodiment of the present disclosure, the electronic device may display the second page of the home screen on the sub display. That is, the electronic device may fix the screen displayed on the active display.

Although not shown, in the table mode according to an embodiment of the present disclosure, the electronic device may determine that the sub display is first the active display and that the main display is the inactive display, and the electronic device may display the first page of the home screen on the sub display. Further, upon detecting a flip, the electronic device may change the main display into the active display and display the second page of the home screen on the main display.

Figure 177:
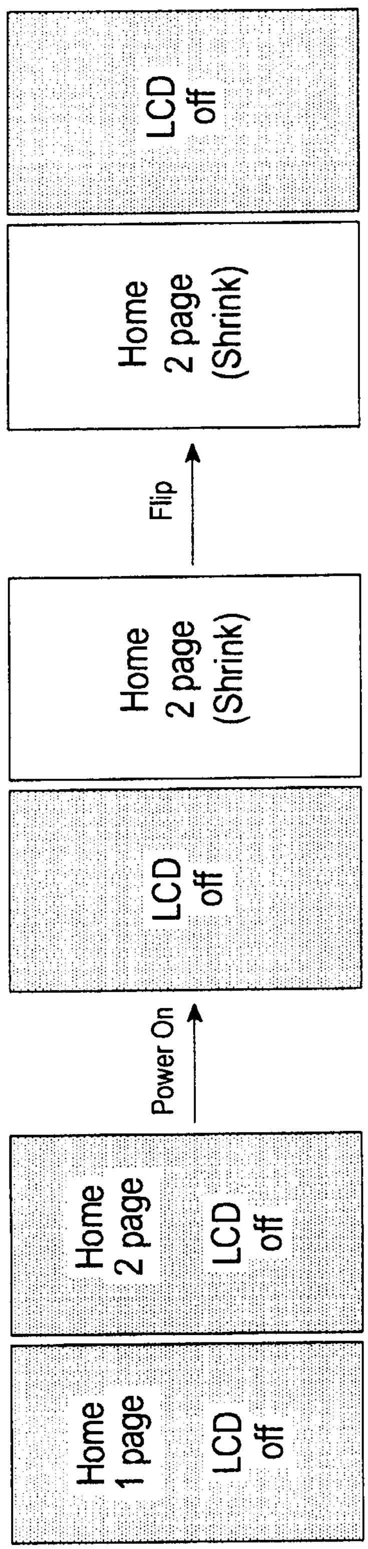

Referring to FIG. 177, according to an embodiment of the present disclosure, the electronic device in the outspread mode may control both the displays in the off state. In this case, the electronic device may be running an application (e.g., a launcher application) associated with the home screen. That is, the electronic device may display the first page and second page of the home screen which are the expanded home screen on the background. Upon power-on, the electronic device may control the active display (e.g., the main display) in the on state and maintain the inactive display (e.g., the sub display) in the off state. The electronic device may display the second page of the home screen, which is the shrunken home screen, on the active display, i.e., the main display. In this case, the electronic device may detect a flip of the electronic device. In response to the flip of the electronic device, the electronic device may switch the active display and the inactive display. Specifically, the electronic device may determine that the sub display is the active display and control it in the on state, and the electronic device may determine that the main display is the inactive display and control it in the off state. The electronic device may display a shrunken home screen on the sub display. The electronic device may display the second page of the home screen as the shrunken home screen on the sub display. Although not shown, in the table mode, the electronic device may determine that the sub display is first the active display and that the main display is the inactive display, and the electronic device may display the first page of the home screen on the sub display. Further, upon detecting a flip, the electronic device may change the main display into the active display and display the first page of the home screen on the main display.

4.2.4. Description of Home Screen Upon Running Application

Figure 178:
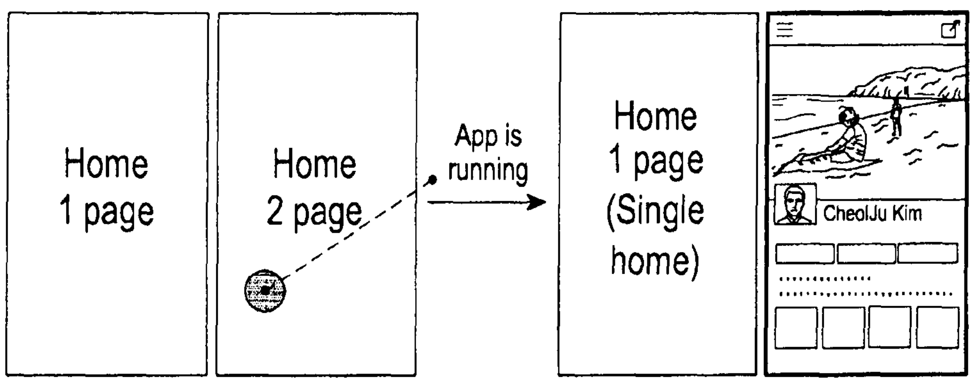

Referring to FIG. 178, the electronic device, according to an embodiment of the present disclosure, may display an expanded home screen on both the displays. The electronic device may detect a run application command by detecting a designation for an icon included in the home screen. The electronic device may run a corresponding application in response to the run application command. The electronic device may assign the display of the application running screen to the display where the run application command has been detected. In the embodiment of FIG. 178, the electronic device may detect a designation for the icon used to be displayed on the main display, and accordingly, the electronic device may run the application corresponding to the designated icon and display an application running screen on the main display. The electronic device may display a shrunken home screen on the sub display. For example, the electronic device may display the first page of the home screen, as the shrunken home screen, on the sub display. That is, the electronic device may keep displaying the first page of the home screen on the sub display.

Figure 179:
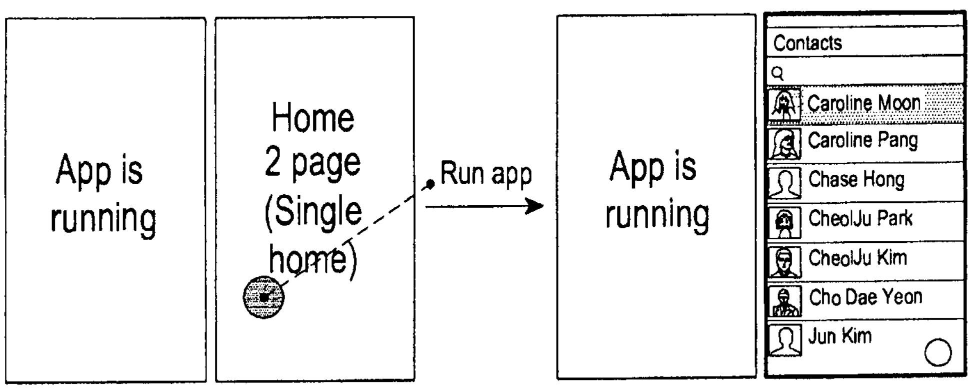

Referring to FIG. 179, according to an embodiment of the present disclosure, the electronic device may display the shrunken home screen on the main display while displaying the application running screen on the sub display. For example, the electronic device may display the second page of the home screen as the shrunken home screen. In the embodiment of FIG. 179, the electronic device may detect a designation for the icon used to be displayed on the main display, and accordingly, the electronic device may run the application corresponding to the designated icon and display an application running screen on the main display. That is, the electronic device may display different application running screens on the plurality of displays, respectively, in the dual mode. In particular, although a newly running application provides the expand function, the electronic device may display the shrunken application running screen on the main display.

4.2.5. Description of Switching Fixed Icon Bars on Shrunken Home Screen

Figure 180:
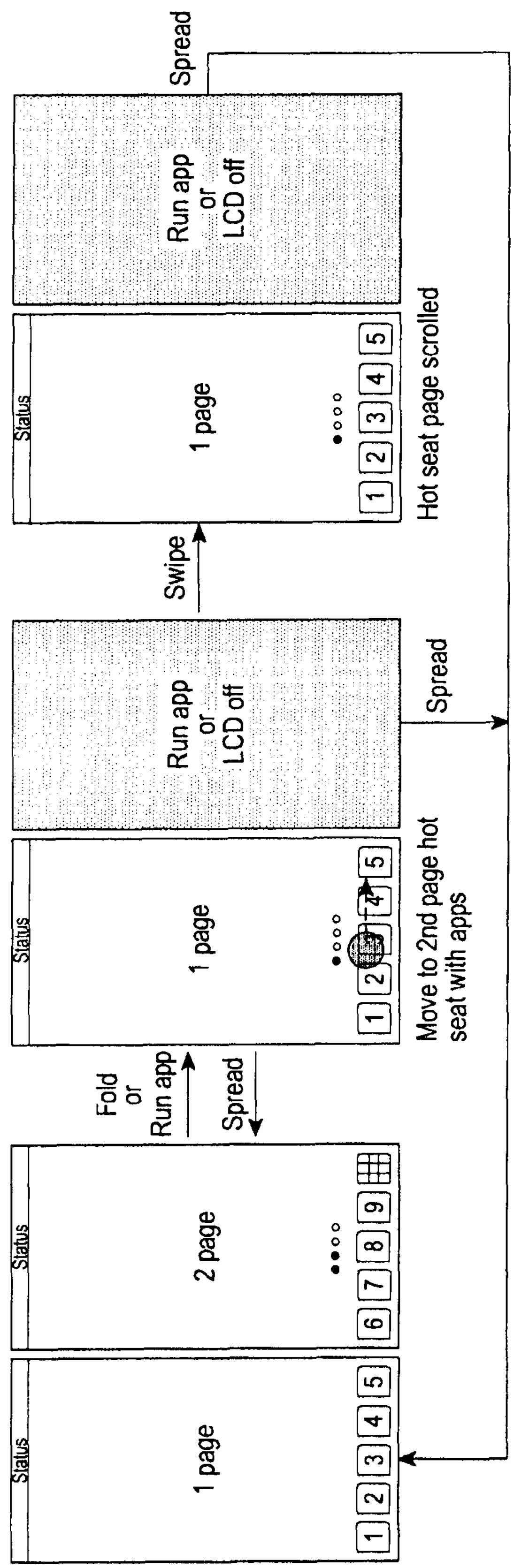

Referring to FIG. 180, the electronic device, according to an embodiment of the present disclosure, may display an expanded home screen. For example, the electronic device may display the first page of the home screen on the sub display and the second page of the home screen on the main display. The electronic device may display the first fixed icon bar (e.g., including icons 1, 2, 3, 4, and 5) on the sub display while displaying the second fixed icon bar (e.g., including icons 6, 7, 8, and 9) on the main display. The electronic device may detect a change of the form type into the folded mode or detect a run application command. Thus, the electronic device may control the main display in the off state or may display an execution screen of the newly running application on the main display. The electronic device may display a shrunken home screen on the sub display. As set forth above, the electronic device may display the first page of the home screen and the second fixed icon bar, as the shrunken home screen.

According to an embodiment of the present disclosure, the electronic device may detect a switch fixed icon bar command. According to an embodiment of the present disclosure, a swipe for the fixed icon bar may be set as the switch fixed icon bar command. The electronic device, upon detecting the switch fixed icon bar command, may switch and display the icons included in the fixed icon bar. For example, the electronic device may switch icons 6, 7, 8, and 9 into icons 1, 2, 3, 4, and 5 and display the same as shown in FIG. 180. That is, the electronic device may switch per five icons and display. Meanwhile, the unit of switch of icons, every five icons above, is a mere example, and is not limited thereto.

Figure 181:
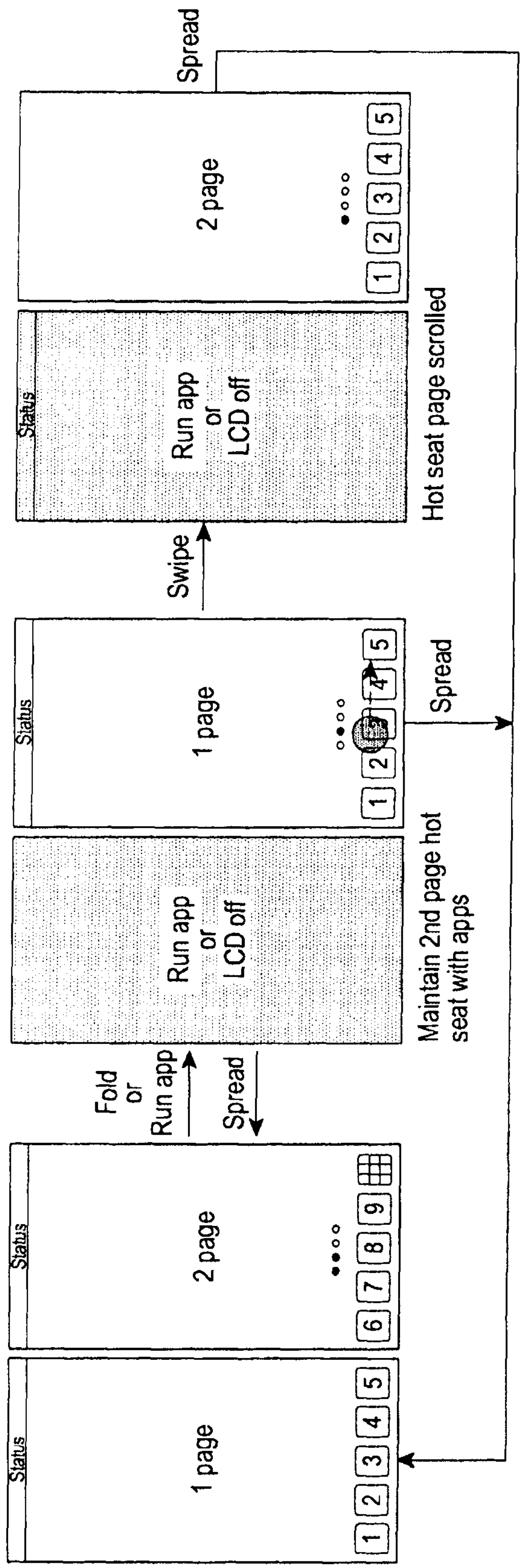

FIG. 181 illustrates an example in which the main display is determined to be the active display according to an embodiment of the present disclosure. For example, the electronic device may display the first page of the home screen on the sub display and the second page of the home screen on the main display. The electronic device may display the first fixed icon bar (e.g., including icons 1, 2, 3, 4, and 5) on the sub display while displaying the second fixed icon bar (e.g., including icons 6, 7, 8, and 9) on the main display. The electronic device may detect a change of the form type into the folded mode or detect a run application command. Thus, the electronic device may control the sub display in the off state or may display an execution screen of the newly running application on the sub display. The electronic device may display a shrunken home screen on the main display. As set forth above, the electronic device may display the second page of the home screen and the first fixed icon bar, as the shrunken home screen.

According to an embodiment of the present disclosure, the electronic device may detect a switch fixed icon bar command. The electronic device, upon detecting the switch fixed icon bar command, e.g., a swipe, may switch and display the icons included in the fixed icon bar. For example, the electronic device may switch icons 1, 2, 3, 4, and 5 into icons 6, 7, 8, and 9 and display the same as shown in FIG. 181.

4.2.6. Description of Editing Home Screen

Figure 182:
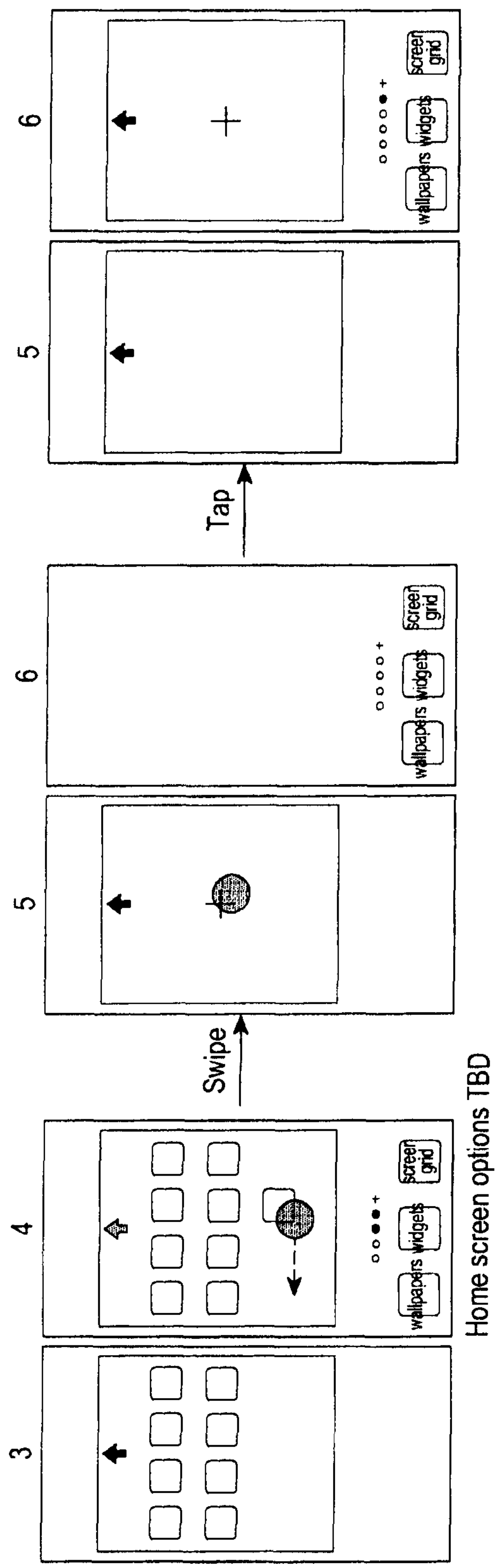

Referring to FIG. 182, the electronic device, according to an embodiment of the present disclosure, may display an expanded home screen. For example, the electronic device may display the third page of the home screen on the sub display and the fourth page of the home screen on the main display. Meanwhile, the electronic device may detect a switch home screen page command, e.g., a swipe. The electronic device may switch the home screen every two pages in response to the detected switch home screen page command. Meanwhile, the home screen may be set to have up to fourth page, but not a fifth page. Thus, the electronic device may display an add page screen. When adding a page for the home screen is selected, the electronic device may add one page, i.e., the fifth page. The electronic device may display the added fifth page on the sub display and display the add page screen on the main display.

Figure 183:
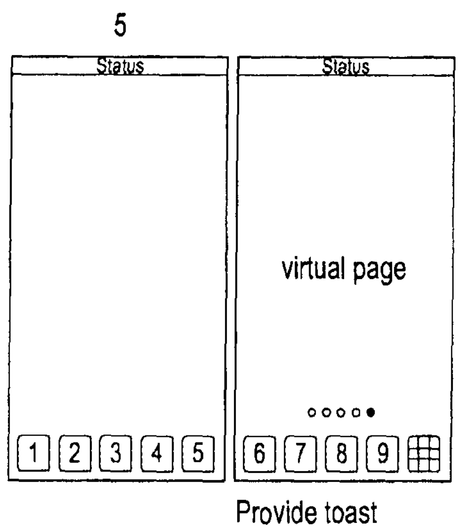

Referring to FIG. 183, according to an embodiment of the present disclosure, where the number of home screen pages is set to be an odd number, the electronic device may display a virtual page on the main display so that they are paired. In this case, the electronic device may abstain from reflecting the virtual page on the indicator.

Figure 184:
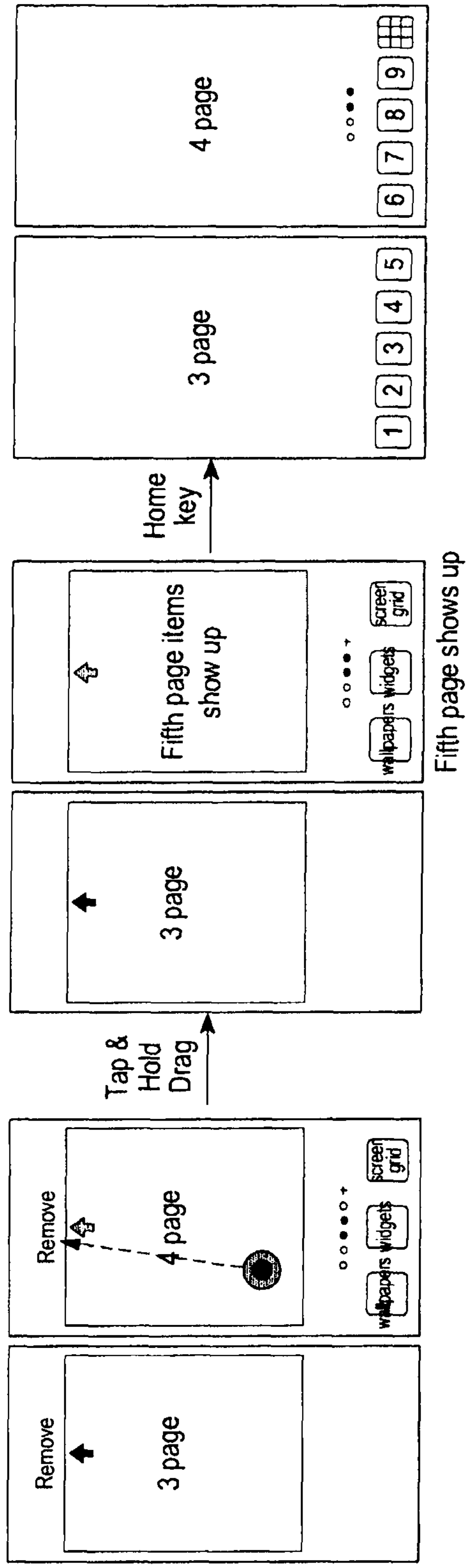

Referring to FIG. 184, according to an embodiment of the present disclosure, the electronic device may provide a delete home screen page function. The electronic device may display the third and fourth page of the home screen, as the expanded home screen, on the sub display and the main display. The electronic device may detect a delete page command. According to an embodiment of the present disclosure, a tap, hold, or drag gesture on the home screen may previously be set as the delete page command. The electronic device may delete the page of the home screen for which the delete page command has been detected. The electronic device may substitute a page (e.g., the fifth page) set to come subsequent to the deleted page for the deleted page and display the same. Accordingly, the electronic device may display the third page of the home screen on the sub display and the fifth page of the home screen on the main display. Meanwhile, upon detecting a pressure of the home key, the electronic device may display back the default home screen. For example, the electronic device may display the third and fourth page of the home screen, as the initial expanded home screen, on the sub display and the main display.

Figure 185:
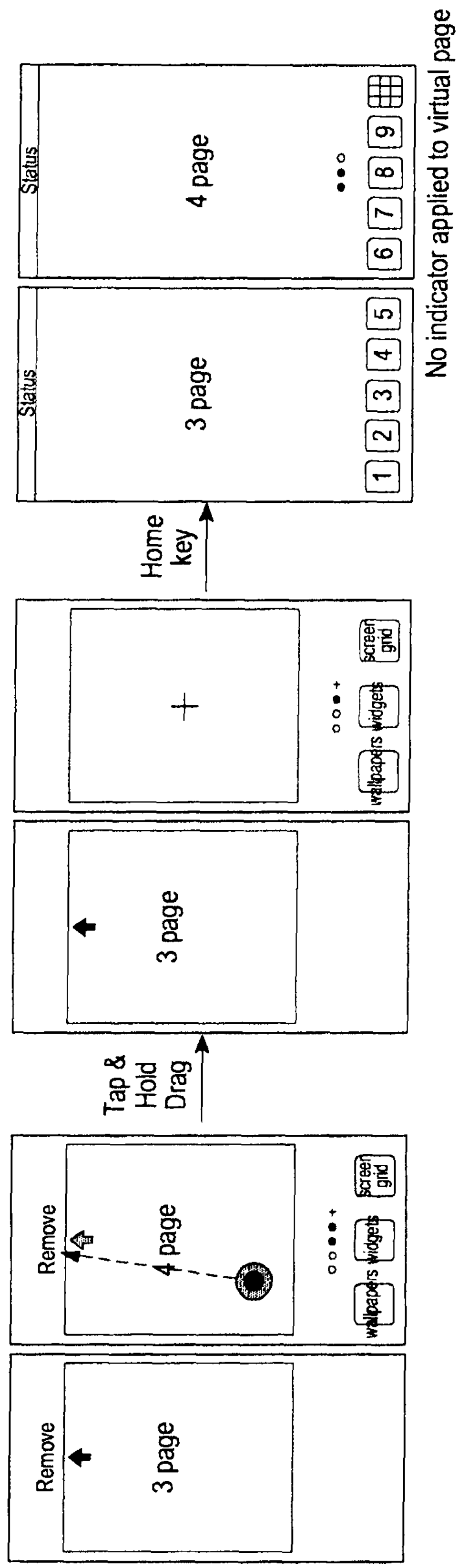

Referring to FIG. 185, according to an embodiment of the present disclosure, the electronic device may display the third and fourth page of the home screen, as the expanded home screen, on the sub display and the main display. The electronic device may detect a delete page command. According to an embodiment of the present disclosure, a tap, hold, or drag gesture on the home screen may previously be set as the delete page command. The electronic device may delete, e.g., the fourth page. Meanwhile, the electronic device may set the home screen to have up to the fourth page but not the fifth page. In this case, the electronic device may display, on the main display, the add page screen instead of the deleted fourth page of the home screen. Meanwhile, upon detecting a pressure of the home key, the electronic device may display back the default home screen. For example, the electronic device may display the third and fourth page of the home screen, as the initial expanded home screen, on the sub display and the main display.

4.2.7. Description of Navigation of Home Screen

Figure 186:
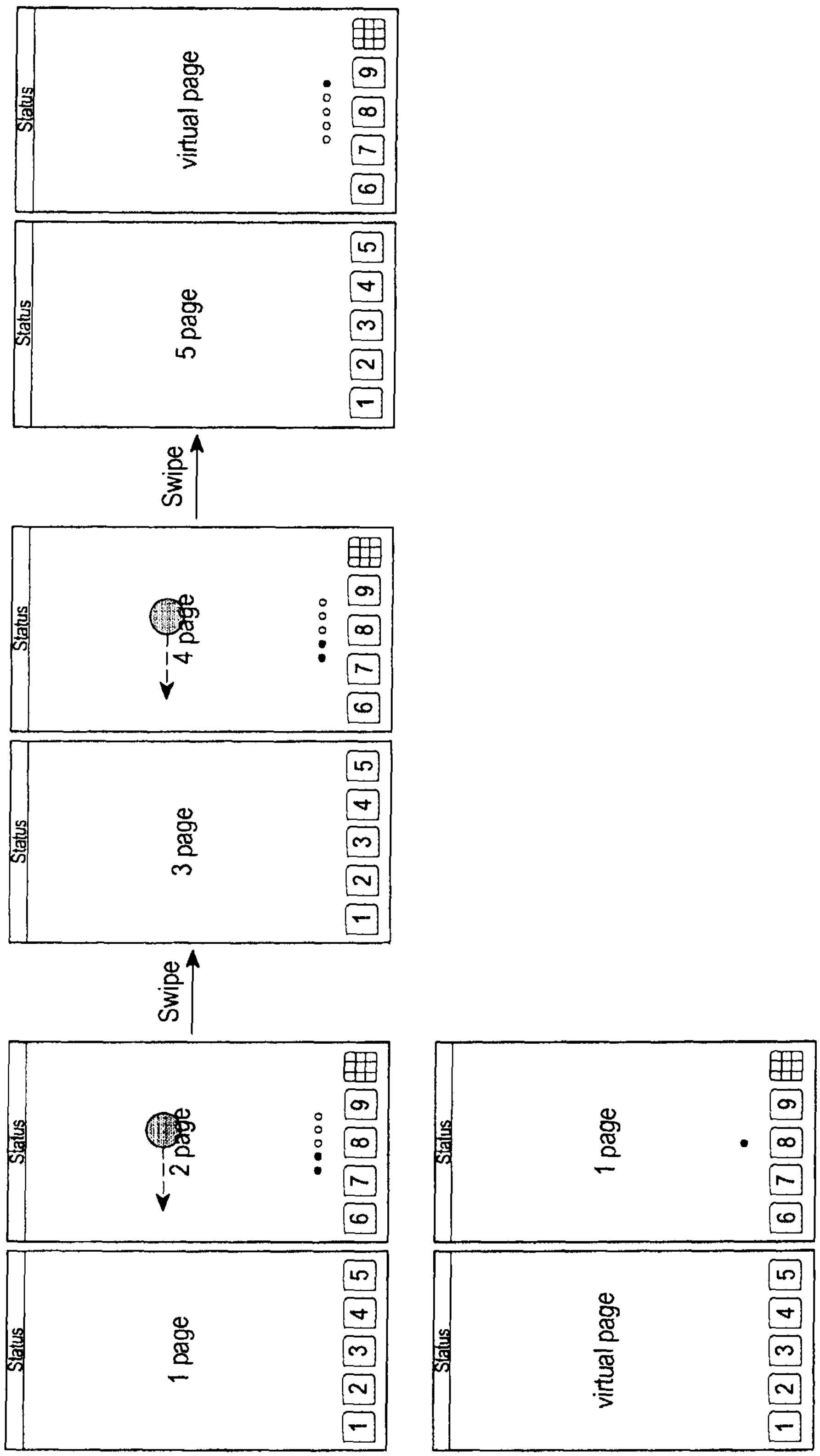

Referring to FIG. 186, according to an embodiment of the present disclosure, the electronic device may provide a function of navigation between home screen pages. For example, the electronic device may display the first page and second page of the home screen, as the initial expanded home screen, on the sub display and the main display. Meanwhile, the electronic device may previously set a drag gesture on the home screen page as an inter-home screen page navigation command, and change home screen pages according to the drag gesture. For example, upon detecting a drag gesture to the left as shown in FIG. 186, the electronic device may switch home screen pages every two pages and display the page set relatively at the right side. Accordingly, the electronic device may display the third and fourth page of the home screen, as the expanded home screen, on the sub display and the main display. The electronic device may detect again an inter-home screen page navigation command and accordingly switch and display the page. Meanwhile, it is assumed that the electronic device may previously set the home screen to have up to the fifth page but not a sixth page. In this case, the electronic device may display the fifth page on the sub display and display a virtual page on the main display. Where the electronic device sets the home screen to have a single page, the electronic device may display the first page of the home screen on the main display and a virtual page on the sub display.

4.2.8. Description of Wall Paper of Home Screen

Figure 187:
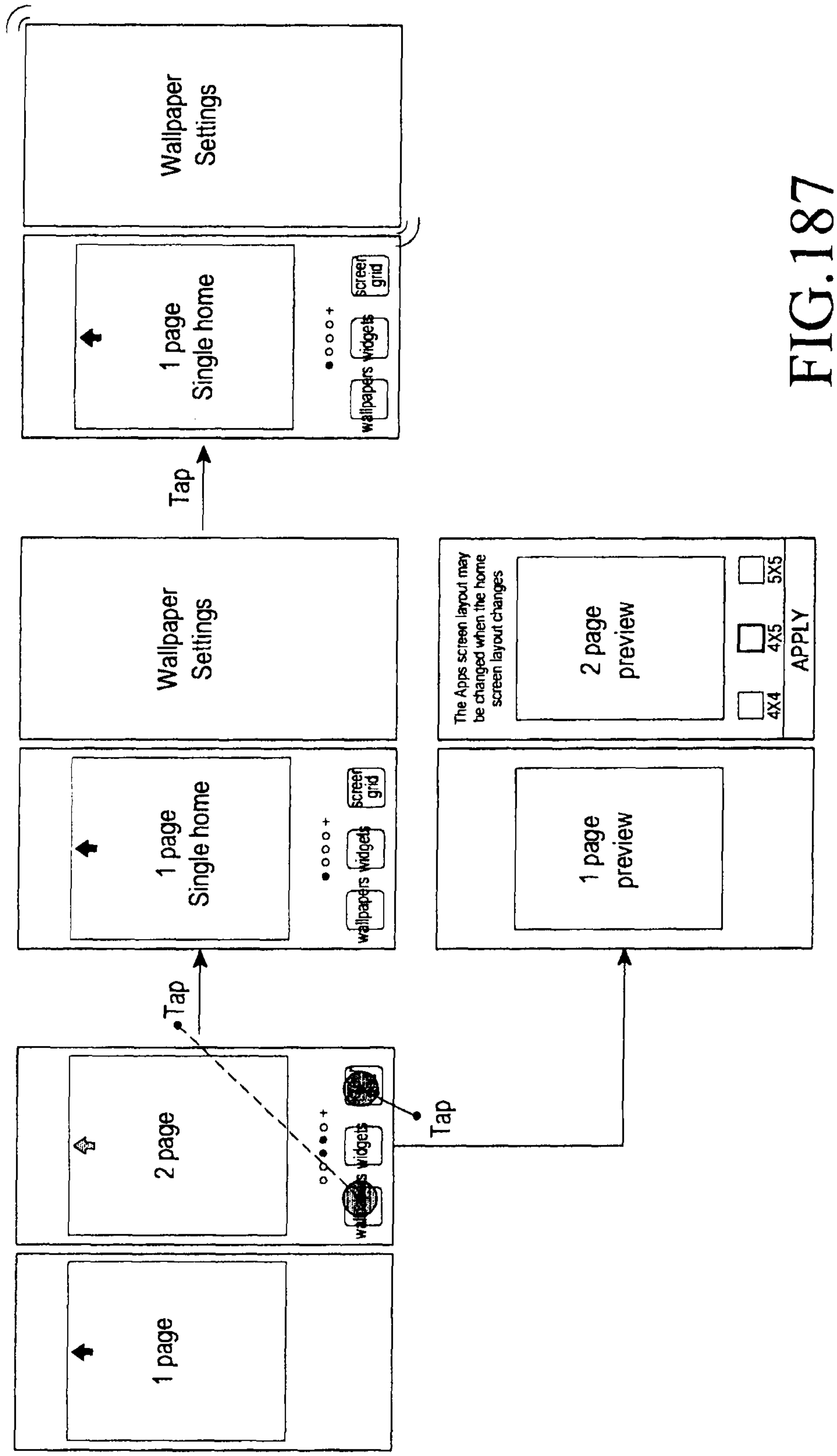

Referring to FIG. 187, according to an embodiment of the present disclosure, the electronic device may display an expanded home screen, e.g., the first and second page of the home screen on the sub display and the main display, respectively. Meanwhile, the electronic device may further display additional icons to edit the home screen on the main display. According to an embodiment of the present disclosure, the additional icons may include an edit wallpaper icon, an edit widget icon, and an edit screen grid icon.

Upon detecting a designation of the edit wallpaper icon, the electronic device may display a shrunken single page (e.g., the first page) of the home screen on the sub display while displaying a wallpaper setting screen on the main display. The electronic device may make settings to the wallpaper based on a user input for the wallpaper setting. Meanwhile, the electronic device may further display additional icons to edit the home screen on the sub display that displays the shrunken home screen When the edit wallpaper icon among the additional icons runs, the electronic device may indicate, through a vibration, that the corresponding application (i.e., an edit wallpaper application) is already being run and displayed on the main display.

Upon detecting a designation of the edit screen grid icon, the electronic device may display a shrunken single page (e.g., the first page) of the home screen on the sub display while displaying a screen grid setting screen on the main display. According to an embodiment of the present disclosure, the screen grid setting screen may include various layouts (e.g., 4×4, 4×5, or 5×5), and the electronic device may array the icons on the home screen in a selected layout.

Figure 188:
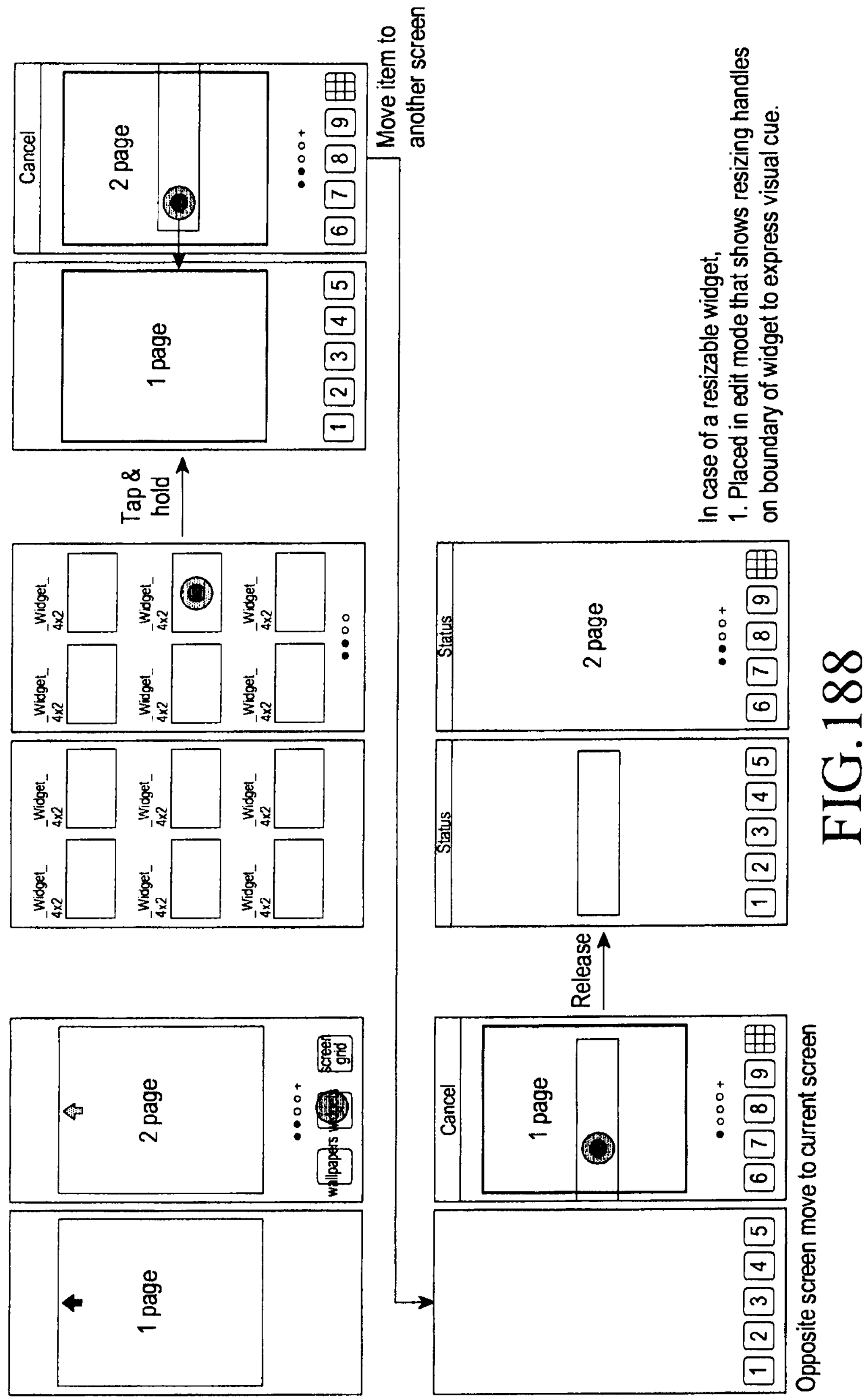

FIG. 188 illustrates an example of editing a widget. Referring to FIG. 188, according to an embodiment of the present disclosure, the electronic device may detect a designation of the edit widget icon. Upon detecting a designation of the edit widget icon, the electronic device may display various widgets that may be arrayed on the home screen. The user may select at least one of the widgets. The electronic device may determine that a tap and hold on at least one of the arrayable widgets displayed is the selection of the widget. The electronic device may display the selected widget on the home screen in a movable state. Here, the movable state may mean that the widget is in the state of being relocated based on a gesture detected as the position of the widget being not determined. The electronic device may detect a command to move the selected widget from the second page to the first page, for example. The electronic device, upon detecting that a drag on the widget is made up to a left end of the main display, may determine that this is the inter-page movement of the widget. In response thereto, the electronic device may display the first page of the home screen, which is the destination of the moving widget, on the main display. When the drag is released, the electronic device may determine that the move widget command is done, determining that the position of the widget is the first page of the home screen. The electronic device may display the first page of the home screen including the widget back on the sub display and the second page of the home screen on the main display.

Figure 189:
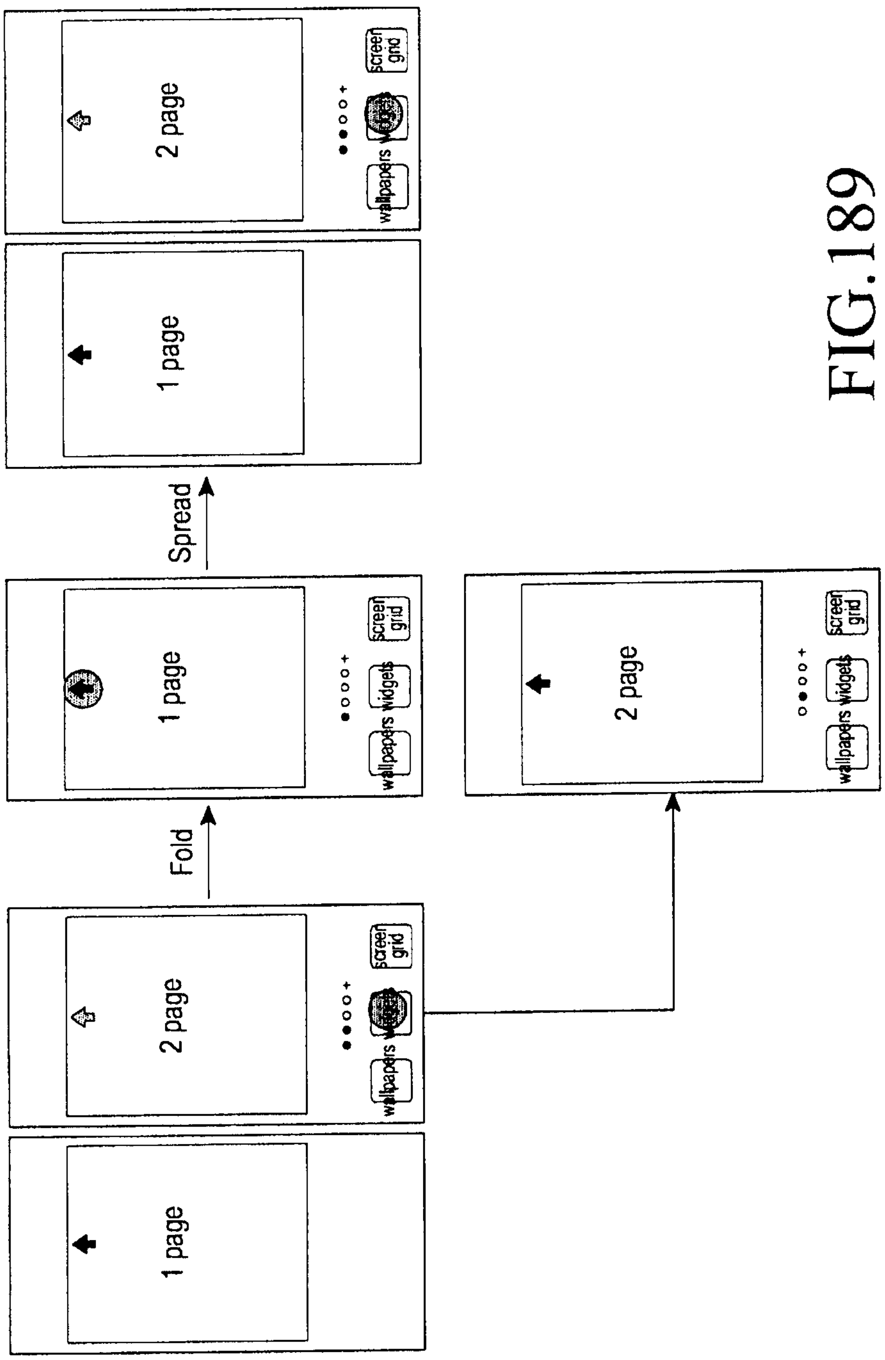

FIG. 189 illustrates an example of changing the position of an additional icon for editing the home screen depending on a form type change according to an embodiment of the present disclosure. Referring to FIG. 189, the electronic device may display an expanded home screen, e.g., the first and second page of the home screen on the sub display and the main display, respectively. Meanwhile, the electronic device may further display additional icons to edit the home screen on the main display. Upon detecting a change of the form type from the outspread mode to the folded mode, the electronic device may control the inactive display in the off state and display the shrunken home screen on the active display. FIG. 189 illustrates a scenario in which the sub display is determined to be the active display and a scenario in which the main display is determined to be the active display. The electronic device may display additional icons for editing the home screen on the active display. For example, where the sub display is determined to be the active display, the electronic device may further display additional icons for editing the home screen on the sub display while keeping displaying the first page of the home screen on the sub display. In this case, upon detecting a change of form type from the folded mode back to the outspread mode, the electronic device may display the additional icons for editing the home screen back on the main display, as it did for the first time, while displaying the expanded home screen.

4.2.9. Description of Icon Move on Home Screen

FIGS. 190 to 195 illustrate a move of an icon on the home screen according to an embodiment of the present disclosure.

Figure 190:
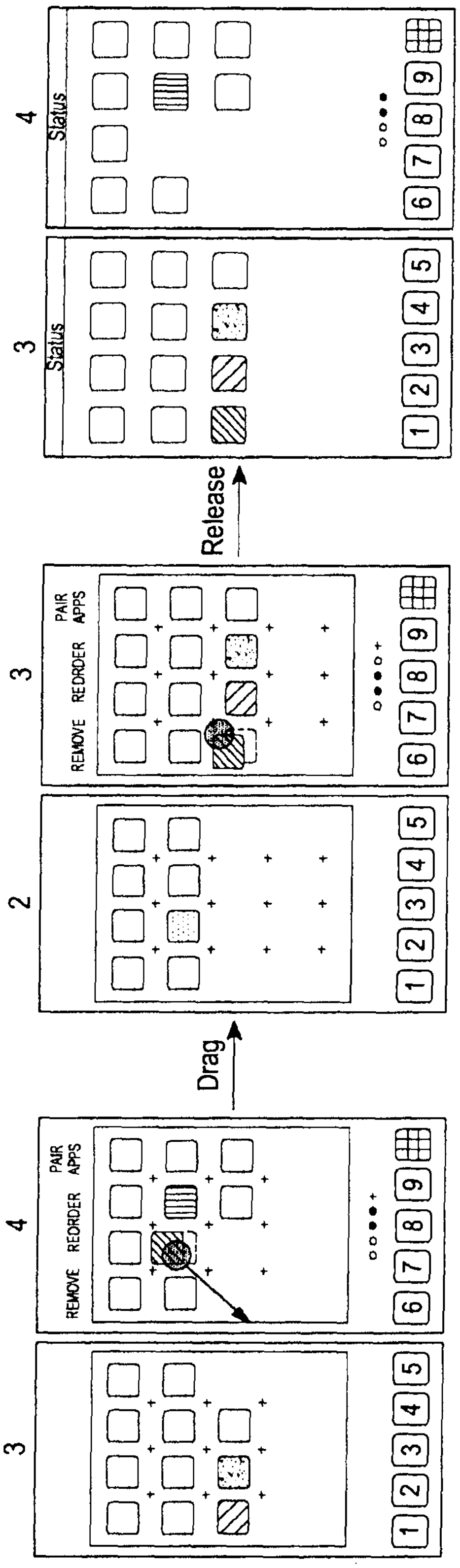

Referring to FIG. 190, the electronic device, according to an embodiment of the present disclosure, may display an expanded home screen in the expand mode. For example, the electronic device may display the third page of the home screen on the sub display and the fourth page of the home screen on the main display. The electronic device may detect a designation distinct from a run application command, such as a long press on an icon on the fourth page, and in response, enter the edit mode. The electronic device may display the selected icon as if it floats, which may mean that the icon is movable. The electronic device may relocate and display the icon as per a drag gesture on the icon. For example, the electronic device may relocate the icon to the position where the drag gesture is released and display the icon, and resort and display the remaining icons. Meanwhile, the electronic device may provide a function of moving the icon to a different page.

Upon detecting that the drag gesture on the selected icon is not released but continue to the left end of the main display, the electronic device may treat this as an inter-page move of the icon. Specifically, the electronic device may treat the drag gesture to the left end as a move to the left page of the selected icon. Thus, the electronic device may replace the fourth page of the home screen with the third page of the home screen and display the third page on the main display. The electronic device may display the second page of the home screen on the sub display. The electronic device may detect a release of the drag gesture in the third page. The electronic device may move the icon to the point where the release of the drag gesture is detected and may display the third and fourth page of the home screen, which reflects the icon move, on the sub display and the main display, respectively.

Figure 191:
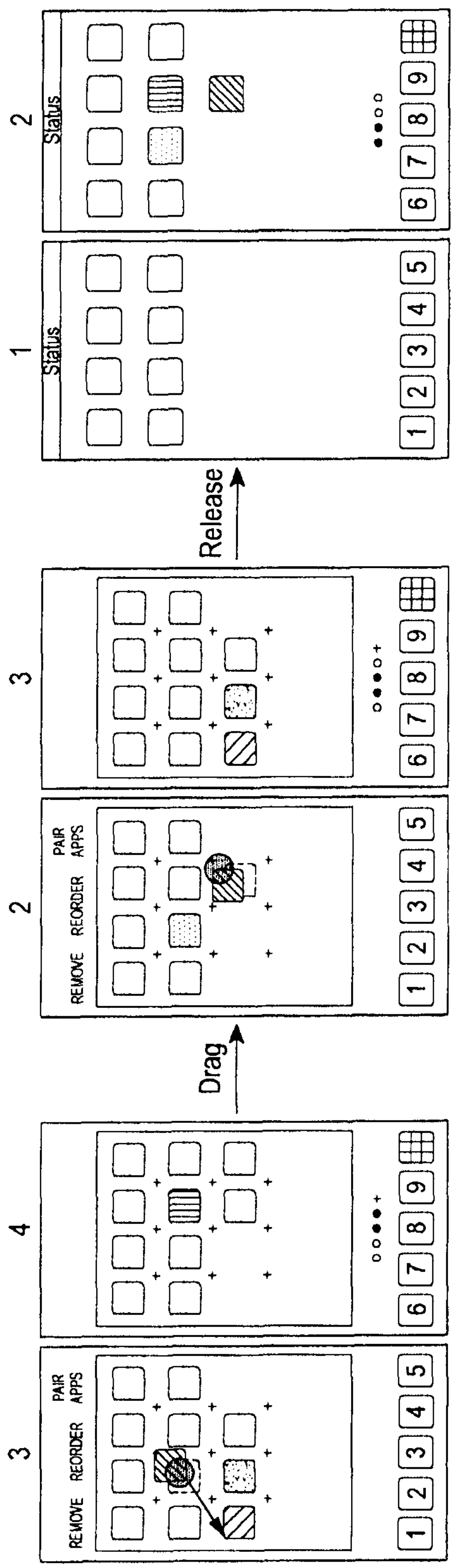

Referring to FIG. 191, according to an embodiment of the present disclosure, the electronic device may detect selection of one icon on the sub display. Upon detecting that the drag gesture on the selected icon is not released but continue to the left end of the sub display, the electronic device may treat this as an inter-page move of the icon. Specifically, the electronic device may treat the drag gesture to the left end as a move to the left page of the selected icon. Thus, the electronic device may replace the third page of the home screen with the second page of the home screen and display the second page on the sub display. The electronic device may display the third page of the home screen on the main display. The electronic device may detect a release of the drag gesture in the second page. The electronic device may move the icon to the point where the release of the drag gesture is detected and may display the first and second page of the home screen, which reflects the icon move, on the sub display and the main display, respectively. The electronic device may make a setting to display the icon completely moved and thus display the second page of the home screen on the main display. This may come from the fact that the electronic device is configured to display paired screens (e.g., the first page and second page or the third page and fourth page).

Figure 192:
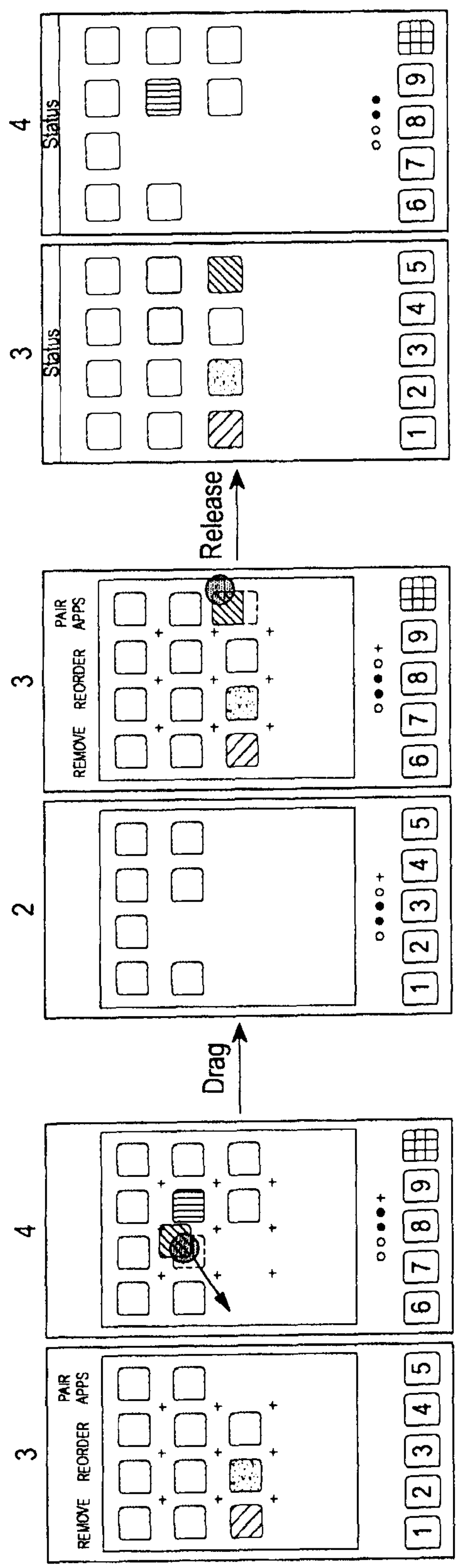

FIG. 192 illustrates a move of an icon according to an embodiment of the present disclosure. Similar to what is described in connection with FIG. 190, upon detecting a drag gesture on an icon going on up to the left end of the main display, the electronic device may display the second and third page on the sub display and main display, respectively. In this case the electronic device may display an indicator for the second and third page on the sub display and an indicator for the third and fourth page on the main display. The electronic device may detect a release of the drag gesture in the third page. The electronic device may move the icon to the point where the release of the drag gesture is detected and may display the third and fourth page of the home screen, which reflects the icon move, on the sub display and the main display, respectively.

Figure 193:
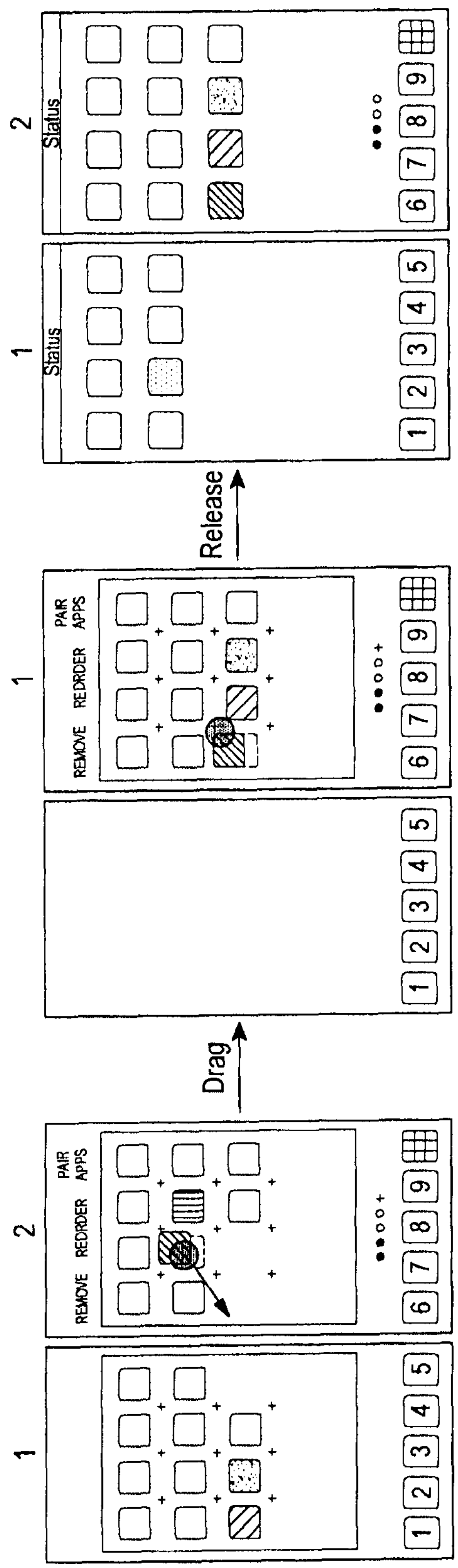

FIG. 193 illustrates a move of an icon according to an embodiment of the present disclosure. The electronic device may display the expanded home screen on both the displays. For example, as shown in FIG. 193, the electronic device may display the first page of the home screen on the sub display and the second page of the home screen on the main display. The electronic device may detect selection of one icon on the main display. Upon detecting that the drag gesture on the selected icon is not released but continue to the left end of the main display, the electronic device may treat this as an inter-page move of the icon. Specifically, the electronic device may treat the drag gesture to the left end as a move to the left page of the selected icon. Thus, the electronic device may replace the second page of the home screen with the first page of the home screen and display the first page on the main display. The electronic device may abstain from displaying any other screen on the sub display, which may originate from the fact that there is no page set to come ahead of the first page.

The electronic device may detect a release of the drag gesture in the first page. The electronic device may move the icon to the point where the release of the drag gesture is detected and may display the first and second page of the home screen, which reflects the icon move, on the sub display and the main display, respectively. The electronic device may make a setting to display the icon completely moved and thus display the second page of the home screen on the main display. This may come from the fact that the electronic device is configured to display paired screens (e.g., the first page and second page or the third page and fourth page).

Figure 194:
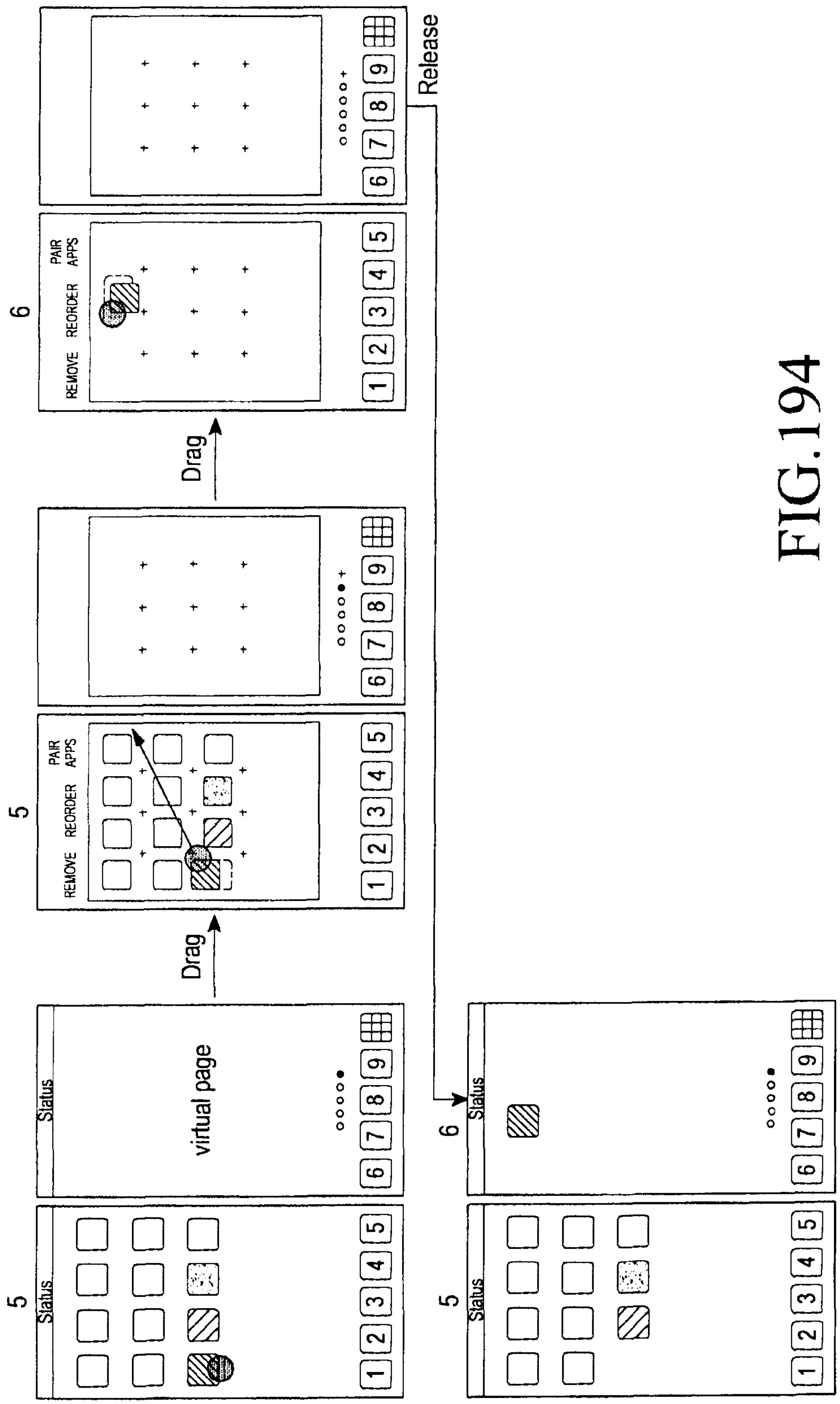

FIG. 194 illustrates a move of an icon according to an embodiment of the present disclosure. The electronic device may display the expanded home screen on both the displays. For example, as shown in FIG. 194, the electronic device may display the fifth page of the home screen on the sub display and a virtual page on the main display. This may stem from the fact that the electronic device sets the home screen to have up to the fifth page but not the sixth page or its successors. The electronic device may detect selection of one icon on the sub display. Upon detecting that the drag gesture on the selected icon is not released but continue to the right end of the sub display, the electronic device may treat this as an inter-page move of the icon. Specifically, the electronic device may treat the drag gesture to the right end as a move to the right page of the selected icon. Meanwhile, since the electronic device has not set the sixth page as mentioned above, the electronic device may generate the sixth page of the home screen. Further, the electronic device may substitute the sixth page of the home screen for the fifth page of the home screen and display the sixth page on the sub display. The electronic device may display an icon-free page on the main display.

The electronic device may detect a release of the drag gesture in the sixth page. The electronic device may move the icon to the point where the release of the drag gesture is detected and may display the fifth and sixth page of the home screen, which reflects the icon move, on the sub display and the main display, respectively. The electronic device may make a setting to display the icon completely moved and thus display the sixth page of the home screen on the main display. This may come in light that the electronic device is configured to display paired screens.

Figure 195:
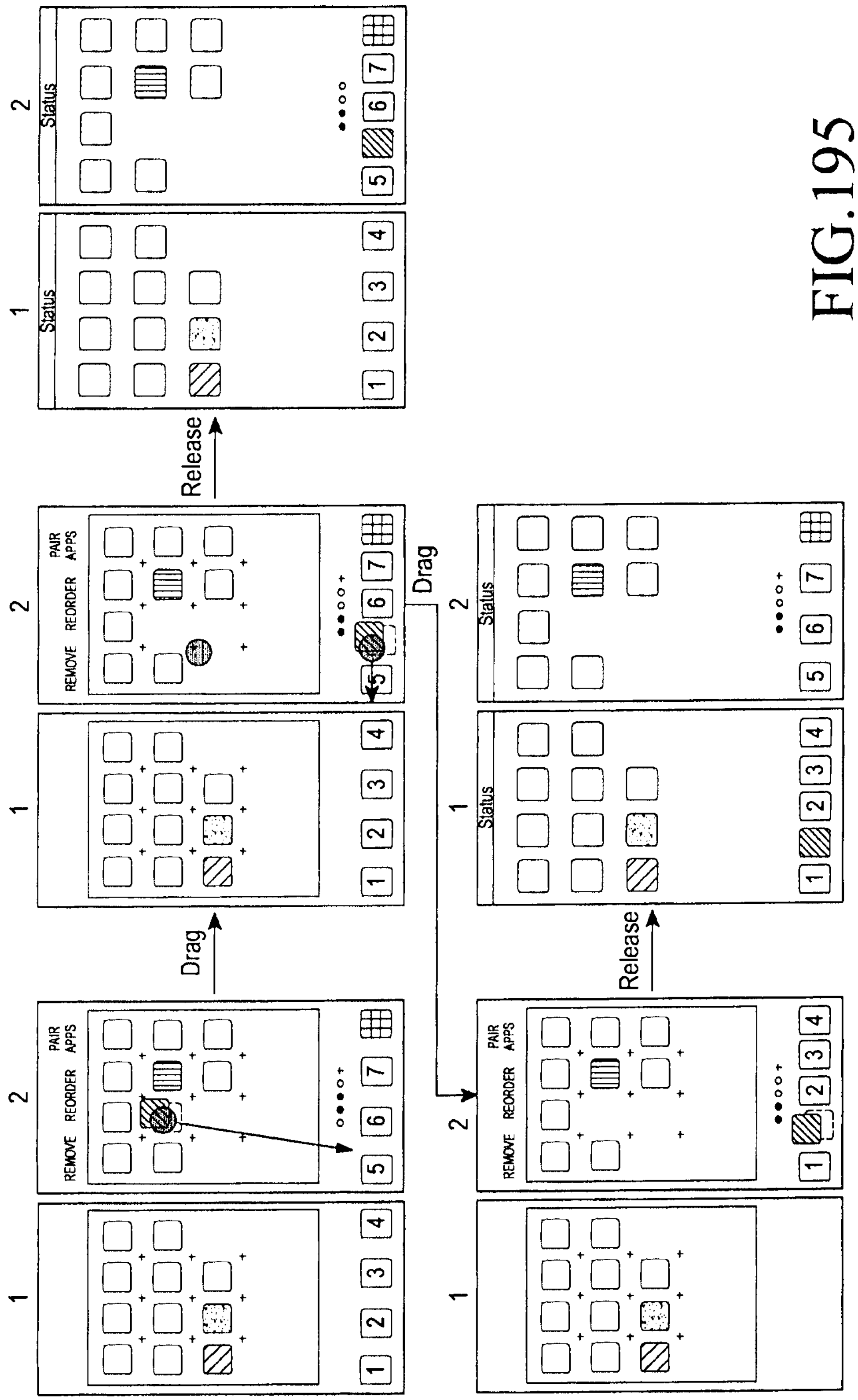

FIG. 195 illustrates a move of an icon according to an embodiment of the present disclosure. The electronic device may display the expanded home screen on both the displays. For example, as shown in FIG. 195, the electronic device may display the first page of the home screen on the sub display and the second page on the main display. Further, the electronic device may display the first fixed icon bar (e.g., including icons 1, 2, 3, and 4) on the sub display while displaying the second fixed icon bar (e.g., including icons 5, 6, and 7) on the main display.

The electronic device may detect selection of one icon on the main display. Upon detecting that the drag gesture on the selected icon is not released but continue on to the lower end, i.e., to the second fixed icon bar, of the main display, the electronic device may treat this as a move to the fixed icon bar of the icon. Upon detecting a release of the drag gesture at a point on the second fixed icon bar, the electronic device may move and display the icon at the release-detected point.

According to an embodiment of the present disclosure, the electronic device may detect the drag connecting to the second fixed icon bar being not released and continuing up to the left end of the second fixed icon bar. The electronic device may treat this as an inter-page move of the icon in the fixed icon bar. Specifically, the electronic device may treat the drag gesture to the left end of the second fixed icon bar as a move of the selected icon to the fixed icon bar of the left-hand page. Accordingly, the electronic device may display the first fixed icon bar of the left-hand page which is the destination of the move on the main display. The electronic device may detect a release of the drag gesture at a point in the first fixed icon bar. The electronic device may move the icon to the point where the release of the drag gesture has been detected and may display the first fixed icon bar reflecting the icon move back on the sub display. Further, the electronic device may display the second fixed icon bar on the main display.

4.2.10. Description of Reordering Icons on Home Screen

FIGS. 196 to 199 illustrate the reordering of icons according to embodiments of the present disclosure.

Figure 196:
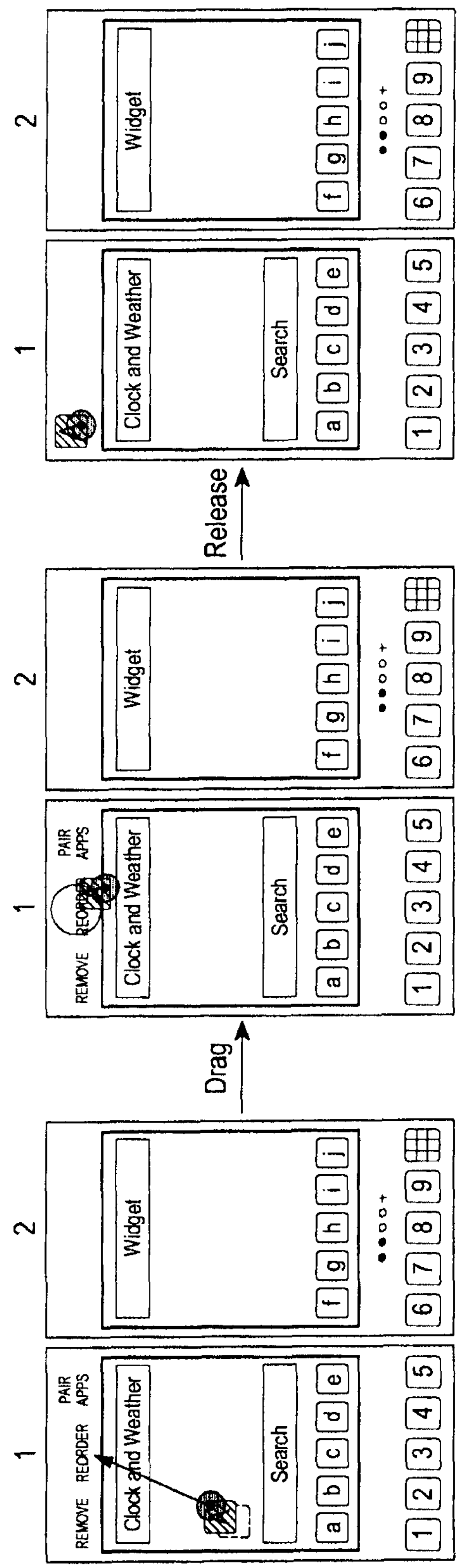

Referring to FIG. 196, according to an embodiment of the present disclosure, the electronic device may detect a designation distinct from a run application command, e.g., a long press, on icon A, and in response thereto, may enter into the edit mode. The electronic device may display the selected icon as if it floats, which may mean that the icon is movable. Upon entry into the edit mode, the electronic device may display function keys for removing icon (REMOVE), reordering icons (REORDER), and setting linked application (PAIR APPS)) on an upper end of the sub display. The electronic device may detect a drag-and-drop from icon A to the reorder function key, and in response thereto, move the icon to an icon tray set on the sub display. Here, the icon tray may mean an area where icons may be placed and which is set separately from the home screen.

Figure 197:
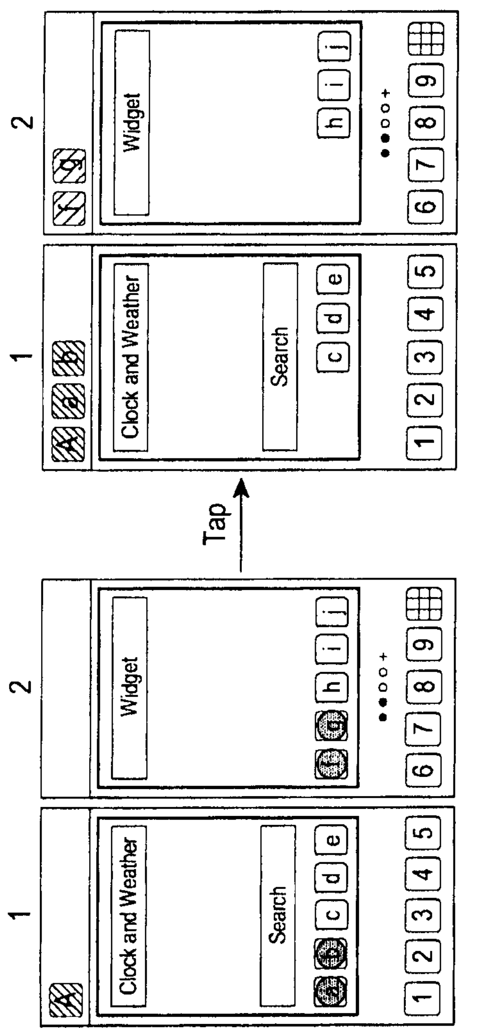

Referring to FIG. 197, according to an embodiment of the present disclosure, the electronic device may detect a move command for icons a and b on the sub display to the icon tray and move the icons to the icon tray on the sub display. Further, the electronic device may detect a move command for icons f and g on the main display to the icon tray and display the icons on the icon tray on the main display. Here, the respective icon trays of the sub display and the main display may be set independent from each other.

Figure 198:
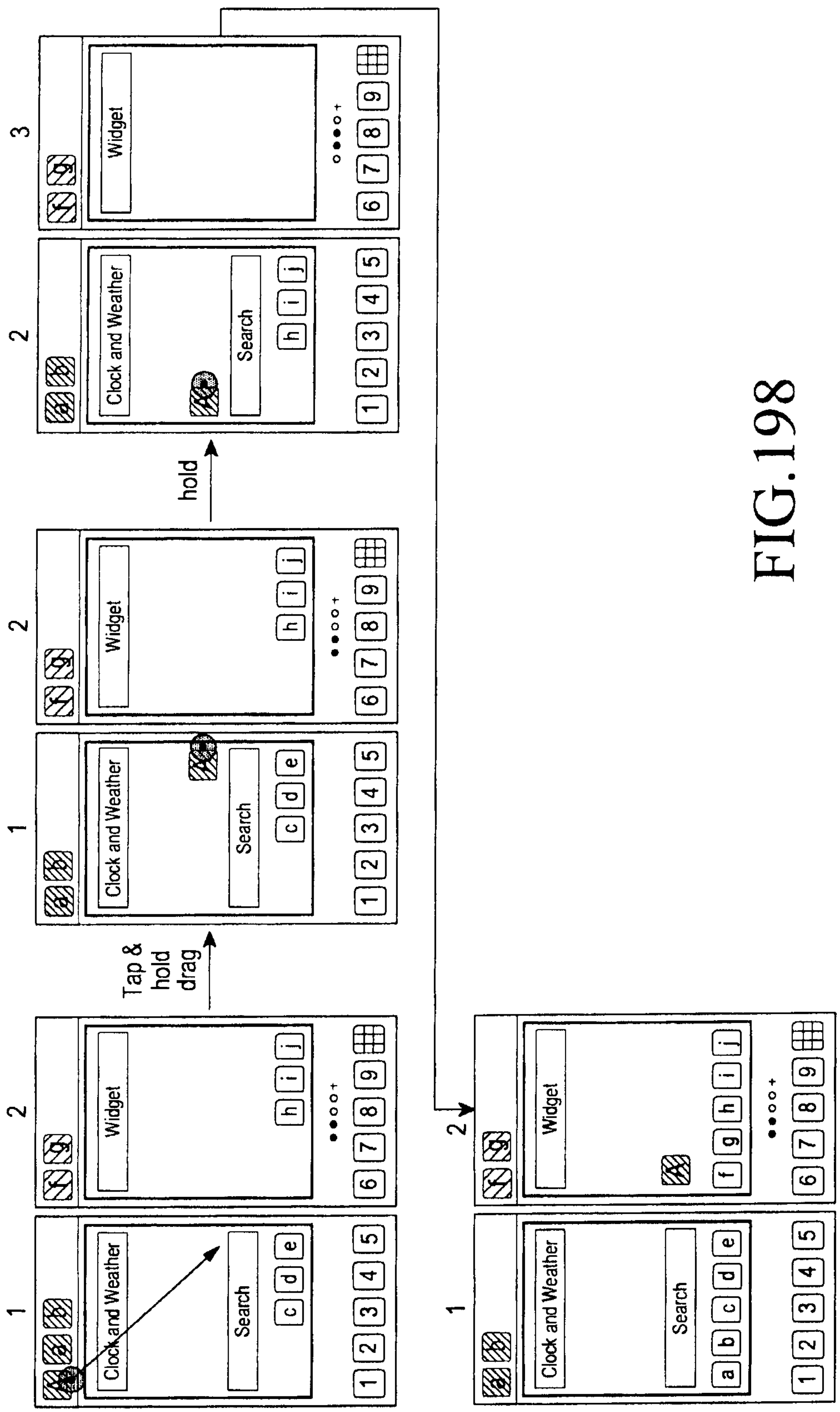

Referring to FIG. 198, according to an embodiment of the present disclosure, the electronic device may detect a drag gesture from the icon tray to a point on the home screen and may detect a release of the drag gesture at the point on the home screen. The electronic device may move a corresponding icon (e.g., icon A) to the point where the drag gesture has been released. Meanwhile, upon detecting that the drag gesture on the selected icon is not released but continue to the right end of the sub display, the electronic device may treat this as an inter-page move of the icon. Specifically, the electronic device may treat the drag gesture to the right end as a move to the right page of the selected icon. Thus, the electronic device may replace the first page of the home screen with the second page of the home screen and display the second page on the sub display. The electronic device may display the third page of the home screen on the main display. The electronic device may detect a release of the drag gesture in the second page. The electronic device may move the icon to the point where the release of the drag gesture is detected and may display the first and second page of the home screen, which reflects the icon move, on the sub display and the main display, respectively. The electronic device may make a setting to display the icon completely moved and thus display the second page of the home screen on the main display. This may come in light that the electronic device is configured to display paired screens.

Figure 199:
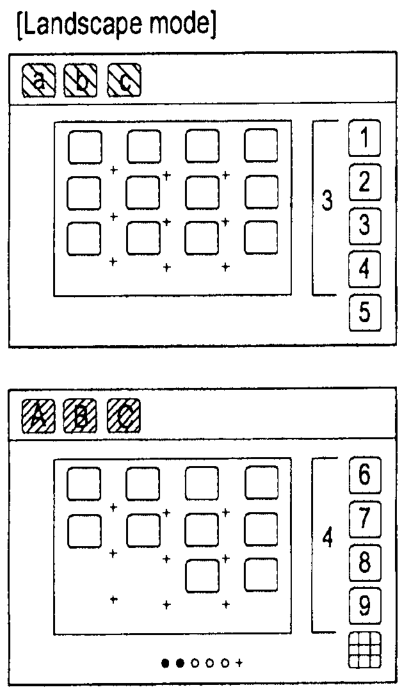

FIG. 199 illustrates an icon tray in the landscape mode according to an embodiment of the present disclosure. In the landscape mode, the electronic device may display a per-display icon tray on an upper end of each display.

4.2.11. Description of Linked Application

Figure 200:
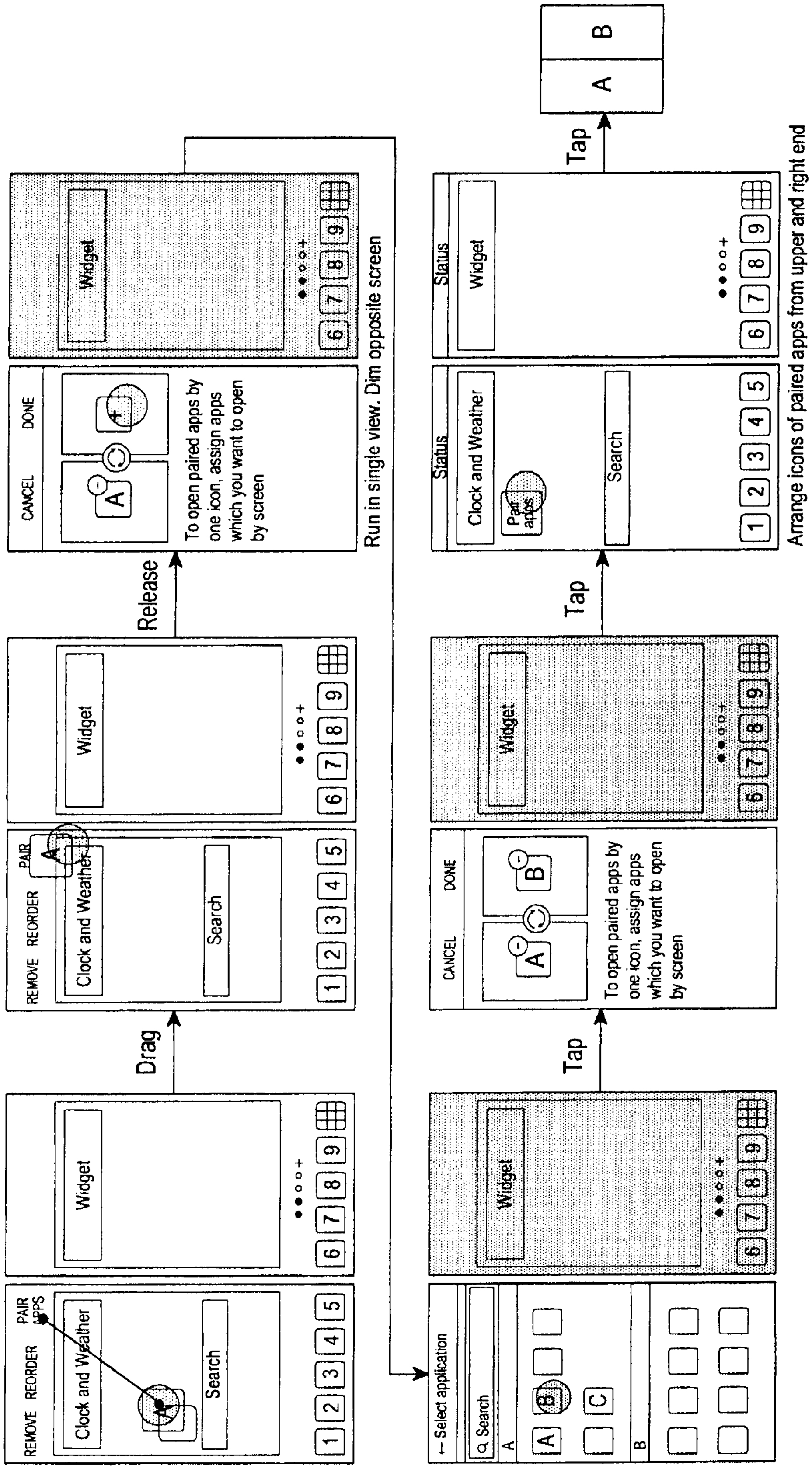
Figure 201:
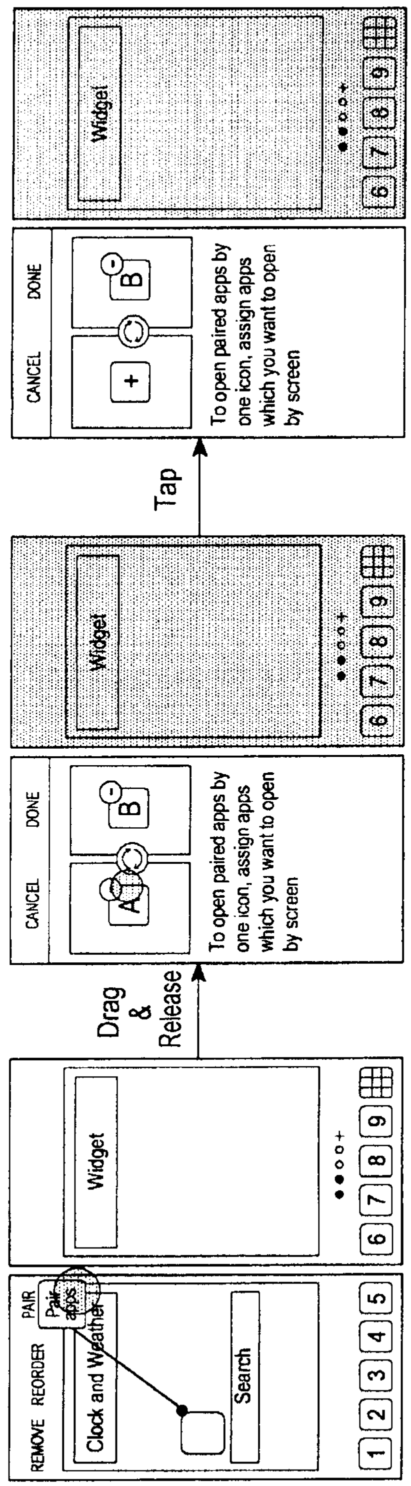
Figure 202:
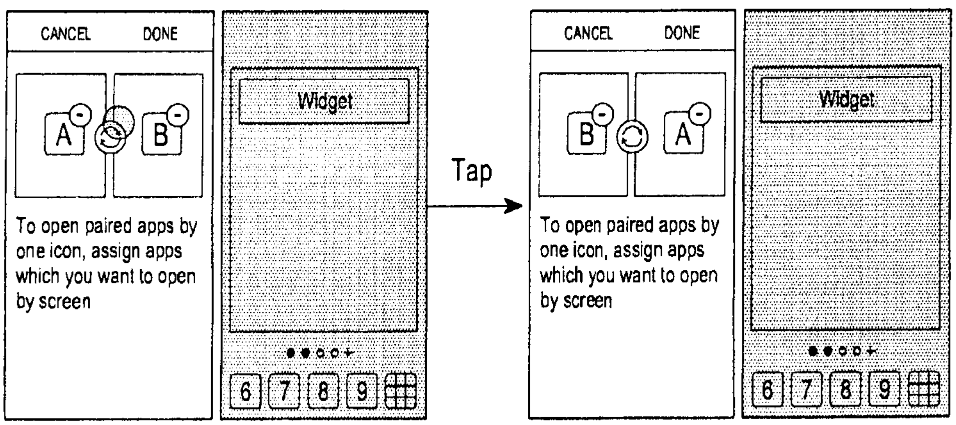

FIGS. 200 to 202 illustrate linked applications according to an embodiment of the present disclosure. Here, the linked applications may also be termed coupled applications.

Referring to FIG. 200, according to an embodiment of the present disclosure, the electronic device may generate the respective icons for the linked applications. As set forth above, the electronic device may display function keys for removing icon (REMOVE), reordering icons (REORDER), and setting linked applications (PAIR APPS) on an upper end of the sub display. The electronic device may detect a drag-and-drop from icon A to the set linked application function key (PAIR APPS). Upon detecting a release of the drag gesture on the pair apps function key, the electronic device may display a screen for generating linked applications. The electronic device may display one application (e.g., application A) as one of the linked applications and may display a message requesting to designate another application or a message containing a description of the linked applications. During the course, the electronic device may control the other display (e.g., the main display) in the off state.

According to an embodiment of the present disclosure, the electronic device may display a screen for selecting the other application constituting the linked applications. In this case, the electronic device may display a message intending that an application be selected—denoted 'select application.' Upon selecting an icon (e.g., icon B) for the other application, the electronic device may display the selected icon on the screen for generating the linked applications configured with the other application constituting the linked applications Upon detecting the user's confirmation (e.g., a tap), the electronic device may generate the linked applications and display a linked application icon (Pair apps) on the sub display. Upon designating the linked application icon (Pair apps), the electronic device may display the respective running screens of the two applications constituting the linked applications on the sub display and the main display, respectively. Thus, the electronic device may display an execution screen of application A on the sub display and an execution screen of application B on the main display.

Referring to FIG. 201, according to an embodiment of the present disclosure, the electronic device may display icon A and icon B on the screen for generating linked applications configured with the two applications configuring the linked applications as described above in connection with FIG. 200. Meanwhile, the electronic device may detect a designation (e.g., a tap) of icon A on the screen for generating linked applications. In this case, the electronic device may remove icon A from the screen for generating linked applications. Accordingly, the user may select another application as one constituting the linked applications.

Referring to FIG. 202, according to an embodiment of the present disclosure, the electronic device may display icon A and icon B on the screen for generating linked applications configured with the two applications configuring the linked applications as described above in connection with FIG. 200. Meanwhile, the electronic device may detect a designation of a change button between the two icons, and in response thereto, change the position of the two icons. Thus, where the linked applications are generated, the electronic device may display an execution screen of application B on the sub display and an execution screen of application A on the main display.

4.2.12. Description of Application Tray

Figure 203:
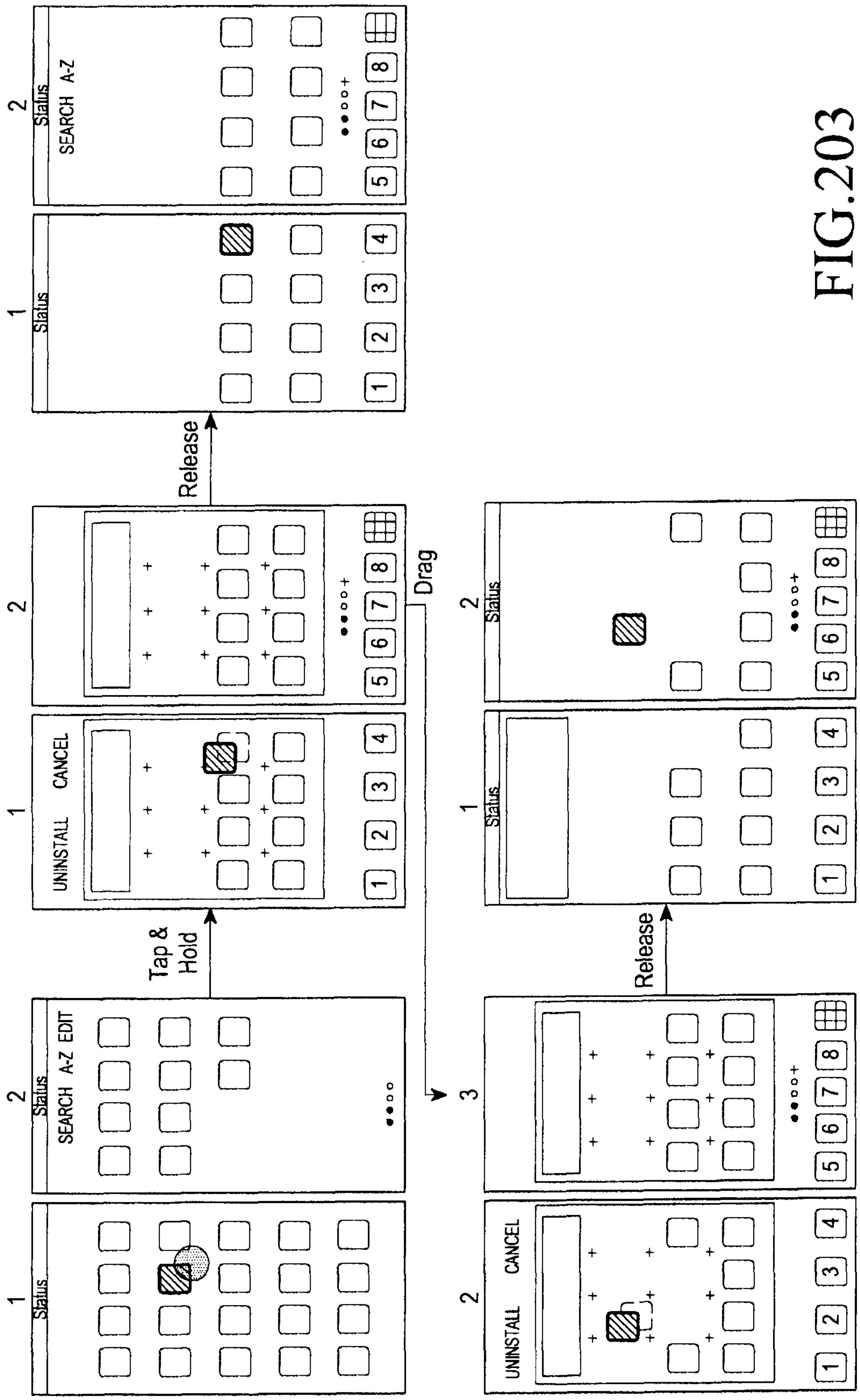

Referring to FIG. 203, according to an embodiment of the present disclosure, the electronic device may display a first and second page of the application tray on the sub display and main display, respectively. The electronic device may detect a designation (e.g., a tap-and-hold) of one of the icons arranged on the application tray and in response may enter into the edit mode. The electronic device may display the first and second page of the home screen on the sub display and main display, respectively, while entering into the edit mode. The electronic device may detect a release of the drag gesture on the first page of the home screen in which case the electronic device may move the icon to the point where the release of the drag gesture has been detected and may display the first and second page of the home screen reflecting the icon move on the sub display and the main display, respectively. Meanwhile, the electronic device may detect the drag gesture on the icon not stopping but continuing up to the right end of the first page of the home screen. The electronic device may treat this as an inter-page move of the icon and thus the electronic device may display the second page of the home screen, which is the destination of the move, on the sub display. The electronic device may display the third page, which is set as the next page to the second page, on the main display. The electronic device may detect a release of the drag gesture on the second page and move the icon to the point where the release of the drag gesture has been detected. As displaying the paired screens, the electronic device may display the first page and second page reflecting the icon move on the sub display and the main display, respectively.

Figure 204:
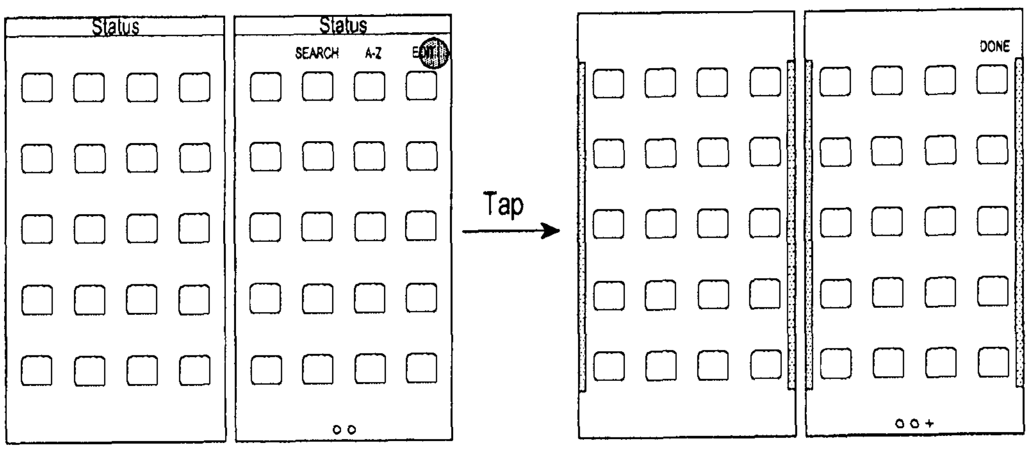

Referring to FIG. 204, according to an embodiment of the present disclosure, the electronic device, when displaying the application tray, may display the edit function key (EDIT). Upon detecting a designation of the edit function key, the electronic device may enter into the edit mode and display the application tray in the edit mode. In the edit mode, the electronic device may also display a delete function key (−) for an icon deletable among the icons arranged on the application tray. Further, the electronic device in the edit mode may display an add page function key (+) on the application tray.

Figure 205:
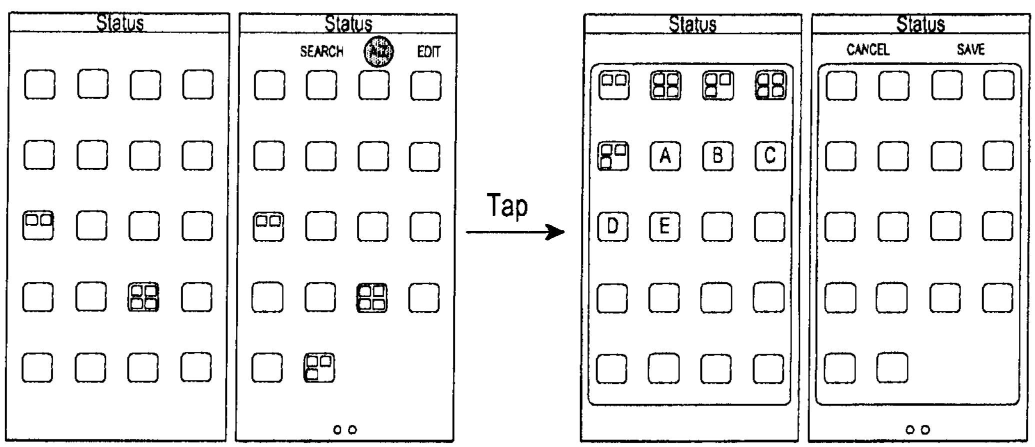

Referring to FIG. 205, according to an embodiment of the present disclosure, the electronic device, when displaying the application tray, may display a sort function key (A-Z). Upon detecting a designation of the sort function key, the electronic device may sort and display the icons arranged on the application tray in a particular order (e.g., alphabetical order).

Figure 206:
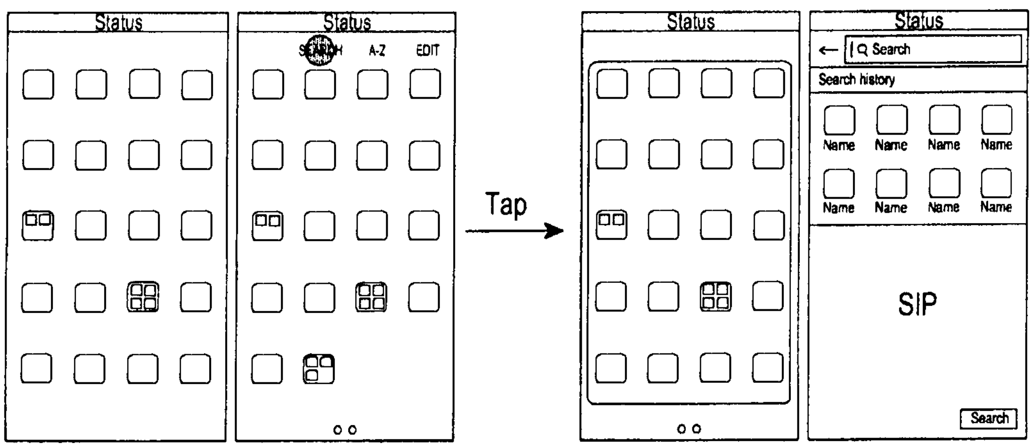

Referring to FIG. 206, according to an embodiment of the present disclosure, the electronic device, when displaying the application tray, may display a search function key (SEARCH). Upon detecting a designation of the search function key, the electronic device may display, on the main display, a search window and a soft input panel (SIP) for entry to the search window. The user may enter a search item through the soft input panel. The electronic device do search based on the user's entry and output a result of the search. The electronic device may further display a search history.

4.3. Description of Indicator and Quick Panel 4.3.1. Overview of Indicator

Figure 207:
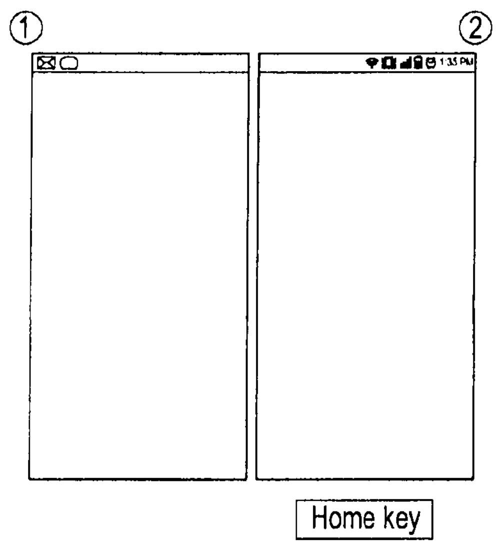
FIGS. 207 to 211 are concept views illustrating an indicator and quick panel according to an embodiment of the present disclosure.

Referring to FIG. 207, according to an embodiment of the present disclosure, the electronic device in the portrait mode may display a first indicator on the sub display and a second indicator on the main display. According to an embodiment of the present disclosure, the first indicator may include an icon indicating notifications generated from various applications. According to an embodiment of the present disclosure, the second indicator may include information related to the system, e.g., icons indicating remaining battery, Bluetooth™ connected or not, or signal strength for communication.

Figure 208:
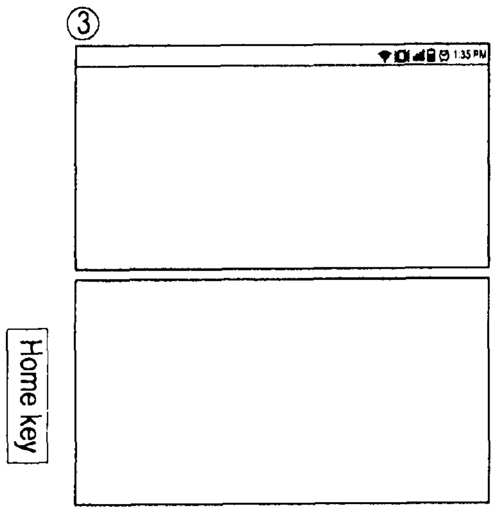

Referring to FIG. 208, according to an embodiment of the present disclosure, the electronic device in the landscape mode may display the indicator on the display positioned relatively at an upper side (e.g., the sub display). In the landscape mode, the display of the indicator on the display positioned relatively at a lower side may be optional. The indicator may include icons indicating notifications generated from various applications at its left side and icons indicating the system-related information at its right side.

4.3.2. Overview of Quick Panel

Figure 209:
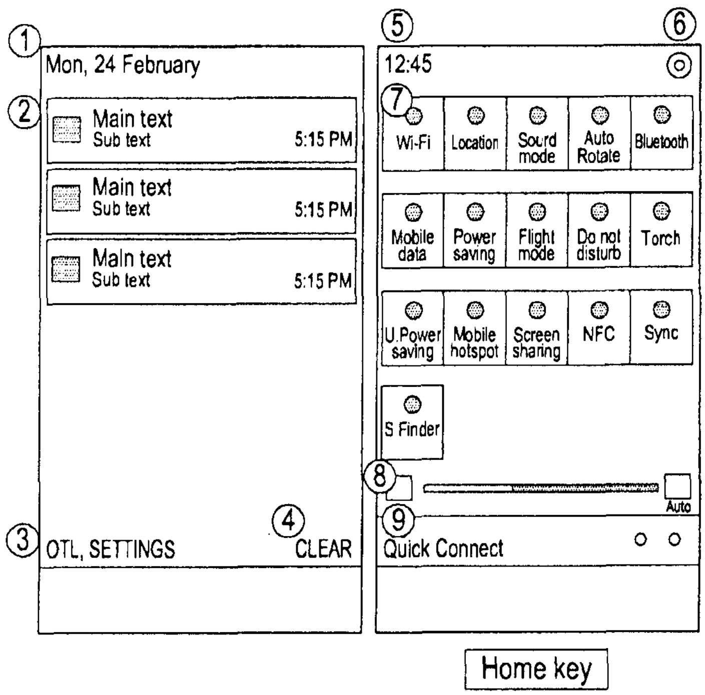

Referring to FIG. 209, according to an embodiment of the present disclosure, the electronic device may display a first quick panel on the sub display and a second quick panel on the main display. The first quick panel may include date information (e.g., Moon, 24 February). The first quick panel may include notifications generated from various applications, which may include a main text, a sub text, and a notification occurrence time, respectively. When a new event occurs, the electronic device may display a notification describing the event on the quick panel. The first quick panel may include a set notification function key (Noti.settings). The first quick panel may include a release notification function key (clear). Upon designation of the release notification function key (clear), the electronic device may delete all of the notifications being displayed.

The second quick panel may include a time. The time included in the second quick channel may be a default time or local time. The time may be the same local time as the time included in a notification displayed on the first quick panel. The second quick panel may include a settings function key for the overall electronic device. The second quick panel may include function keys for various functions of the electronic device. For example, the second quick panel may include a Wi-Fi function key, a location function key, a sound mode function key, an auto rotate function key, a bluetooth function key, a mobile data management function key, a power saving function key, a flight mode function key, a do not disturb function key, a torch function key, a ultra-power saving (U.power saving) function key, a mobile hotspot function key, a screen sharing function key, a NFC function key, a Sync function key, and a search (S finder) function key. The second quick panel may include a screen brightness control function key that may include a screen brightness and indicator implemented in the form of a bar. Further, the screen brightness control function key may include an Auto check key, a designation of which enables the electronic device to be set to a pre-designated brightness. The second quick panel may include a quick connection function key, a designation of which enables the electronic device to enter into a quick connect board.

Figure 210:
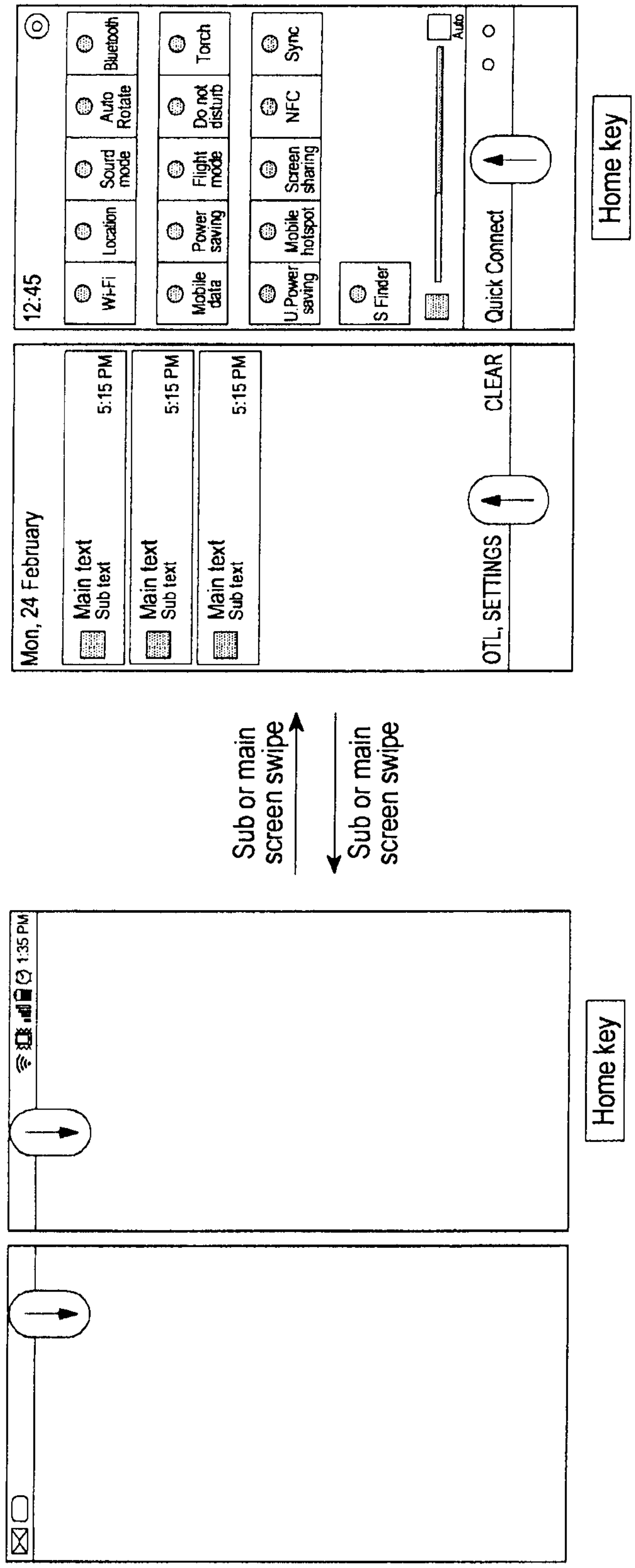

FIG. 210 illustrates a call up of the quick panel in the portrait mode. Referring to FIG. 210, according to an embodiment of the present disclosure, the electronic device may display the first indicator and the second indicator on the sub display and the main display, respectively. The electronic device may detect a drag gesture starting from the first indicator and proceeding downwards. The electronic device may previously set the drag gesture downwards from the indicator as a quick channel command. Thus, the electronic device may display the first quick panel on the sub display. Meanwhile, the electronic device may detect a drag gesture starting from the second indicator and proceeding downwards and in response display the second quick panel on the main display.

Meanwhile, the electronic device may also detect a drag gesture starting from a lower end of the first quick panel and proceeding upwards. The electronic device may previously set the drag gesture proceeding upwards from the lower end of the quick panel as an end quick panel command. Accordingly, the electronic device may stop displaying the first quick panel and display the first indicator back. Meanwhile, the electronic device may detect a drag gesture starting from a lower end of the second quick panel and proceeding upwards and in response stop displaying the second quick panel on the main display and display the second indicator.

Figure 211:
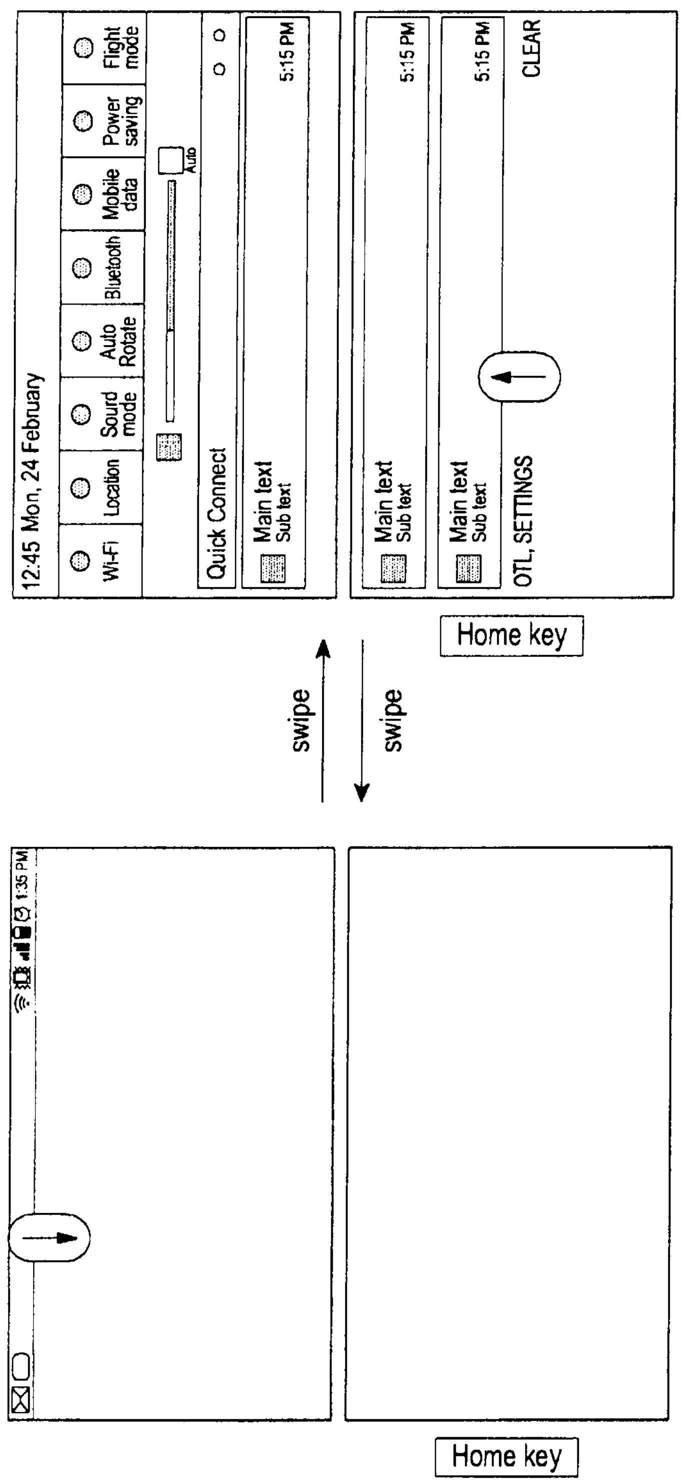

FIG. 211 illustrates a call up of the quick panel in the landscape mode.

According to an embodiment of the present disclosure, the electronic device in the landscape mode may display the indicator on the display positioned relatively at an upper side (e.g., the sub display). The electronic device may detect a drag gesture starting from the indicator and proceeding downwards. The electronic device may previously set the drag gesture downwards from the indicator as a quick channel command. Accordingly, the electronic device may display the quick panel on both the sub display and the main display. In the landscape mode, the quick panel may be of the form in which an expanded screen of the quick panel is displayed on both the sub display and the main display. Meanwhile, the electronic device may also detect a drag gesture starting from a lower end of the quick panel and proceeding upwards. The electronic device may previously set the drag gesture proceeding upwards from the lower end of the quick panel as an end quick panel command. Thus, the electronic device may stop displaying the quick panel and displaying the indicator on the display (e.g., the sub display) positioned at the upper side.

4.4. Description of Task Manager 4.4.1. Overview of Task Manager

According to an embodiment of the present disclosure, the task manager may be an application that may provide and edit the running state of at least one application running on the electronic device. According to an embodiment of the present disclosure, the task manager may provide the priority of display (application stack) of a running application. The task manager may independently provide the priority of display of an application for each of the plurality of displays.

4.4.2. Description of Running Screen of Task Manager

Figure 212:
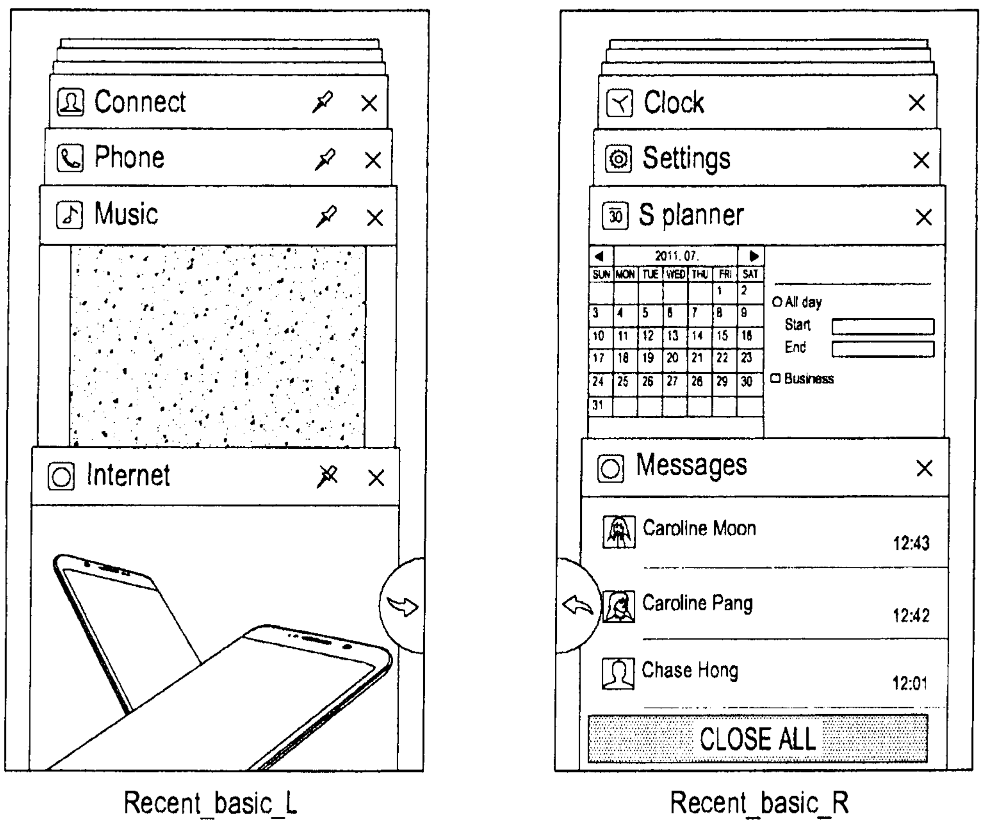
FIGS. 212 and 213 are concept views illustrating a task manager according to an embodiment of the present disclosure.

FIG. 212 illustrates an execution screen of the task manager in the portrait mode according to an embodiment of the present disclosure. Referring to FIG. 212, the electronic device may display, on the sub display, the application stack that has recently been displayed on the sub display. The electronic device may display, on the main display, the application stack that has recently been displayed on the main display. Here, the application stack may be configured to be overlapped by a still image for an execution screen of the application displayed. The order of the application stack may be determined to be chronological order, starting from the application displayed latest, in which the applications are displayed. Thus, the electronic device may display an execution screen of the application displayed latest (e.g., an Internet application running screen) to cover another application, e.g., so that an execution screen of the music player application displayed later is covered by the execution screen of the Internet application running screen. In other words, the application stack may be displayed as if the application running screens are stacked vertically on the sub display. In the portrait mode, the application stack may be displayed as if the applications are stacked up to down on the sub display. Meanwhile, the electronic device may also display, on the main display, an application stack reflecting the order of display in which the application running screens have been displayed on the main display.

Figure 213:
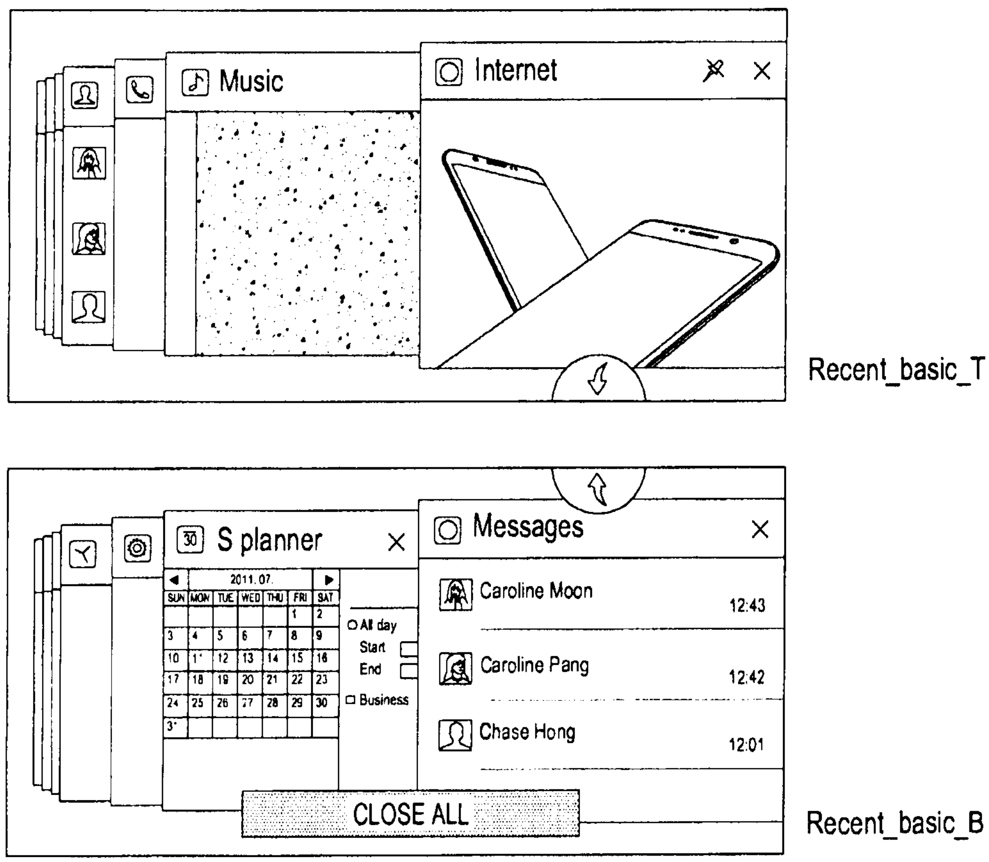

FIG. 213 illustrates an execution screen of the task manager in the landscape mode according to an embodiment of the present disclosure. Also in the landscape mode, the electronic device may display an independent application stack for each of the sub display and the main display. Also in the landscape mode, the application stack may be displayed as if the application running screens are stacked vertically on the sub display. Further, in the landscape mode, the application stack may be displayed on the sub display as if the application running screens are stacked left-to-right on the sub display. Meanwhile, in the landscape mode, the application stack may be displayed on the main display as if the application running screens are stacked left-to-right on the sub display.

Figure 214:
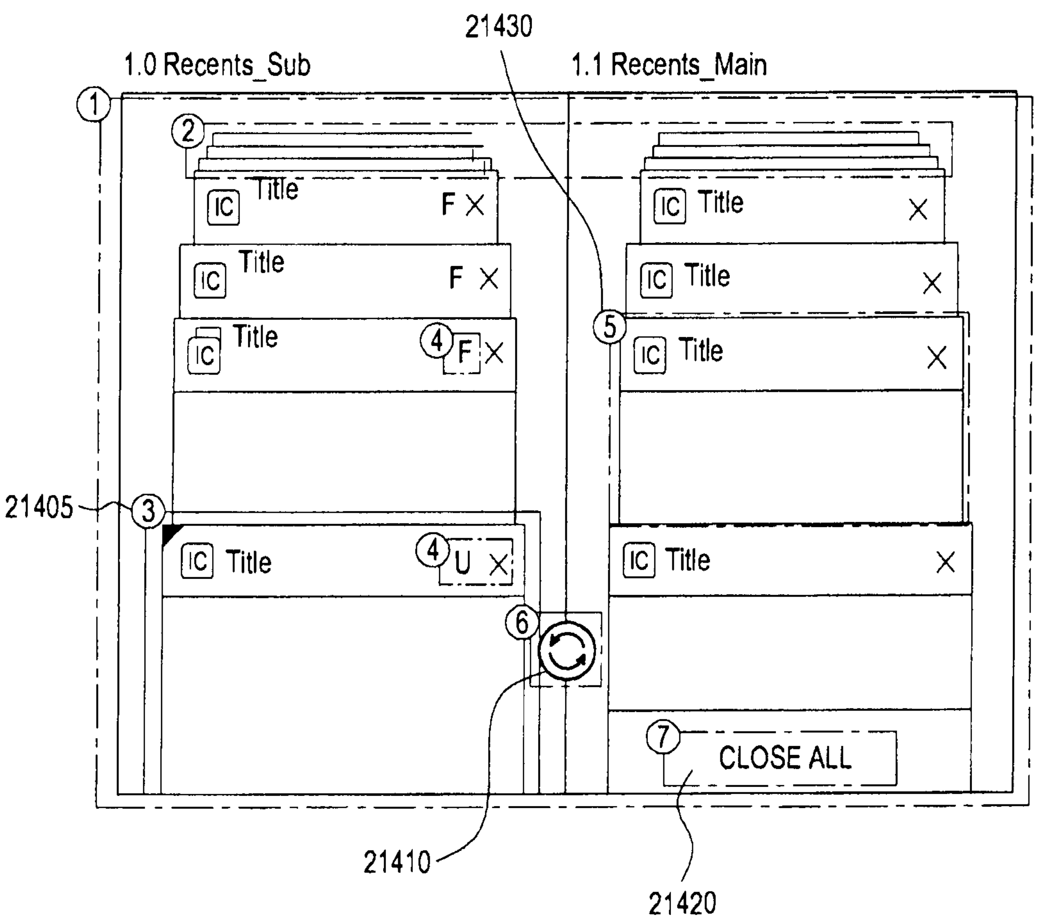
FIGS. 214 to 217 are concept views illustrating a message application according to an embodiment of the present disclosure.

FIG. 214 illustrates an execution screen of the task manager according to an embodiment of the present disclosure. When the task manager runs, the electronic device may display a first application stack on the sub display and a second application stack on the main display. As described above, the first application stack may be of the form in which the execution screen of at least one application used to be displayed on the sub display is stacked. Meanwhile, the application running screen of a portion of the first application stack is not substantially displayed but the indication that it stays in the first application, alone, may be displayed.

According to an embodiment of the present disclosure, the electronic device may display a title (e.g., an application name) along with the application running screen of the first application stack and may display a fix running screen function key (F) and a unfix running screen function key (U). When the fix running screen function key (F) is previously designated, the electronic device may fix the corresponding application running screen. Meanwhile, the electronic device may display a visual cue 21405 for a fixed application running screen. Further, the electronic device may substitute the unfix running screen function key (U) for the fix running screen function key (F), for the fixed application running screen, and display the unfix running screen function key (U). Meanwhile, the electronic device may display a switch application stack function key 21410. When the switch application stack function key 21410 is designated, the electronic device may switch the position of the topmost application of the first application stack with the position of the topmost application of the second application stack.

According to an embodiment of the present disclosure, the electronic device may display the second application stack on the main display. The second application stack may include an execution screen 21430 of a coupled application. The coupled application may be displayed on both the displays but may be included on the main display side in the application stack. The electronic device may display an end all function key 21420 together with the second application stack. When the end all function key 21420 is designated, the electronic device may terminate all of the applications running.

Figure 215:
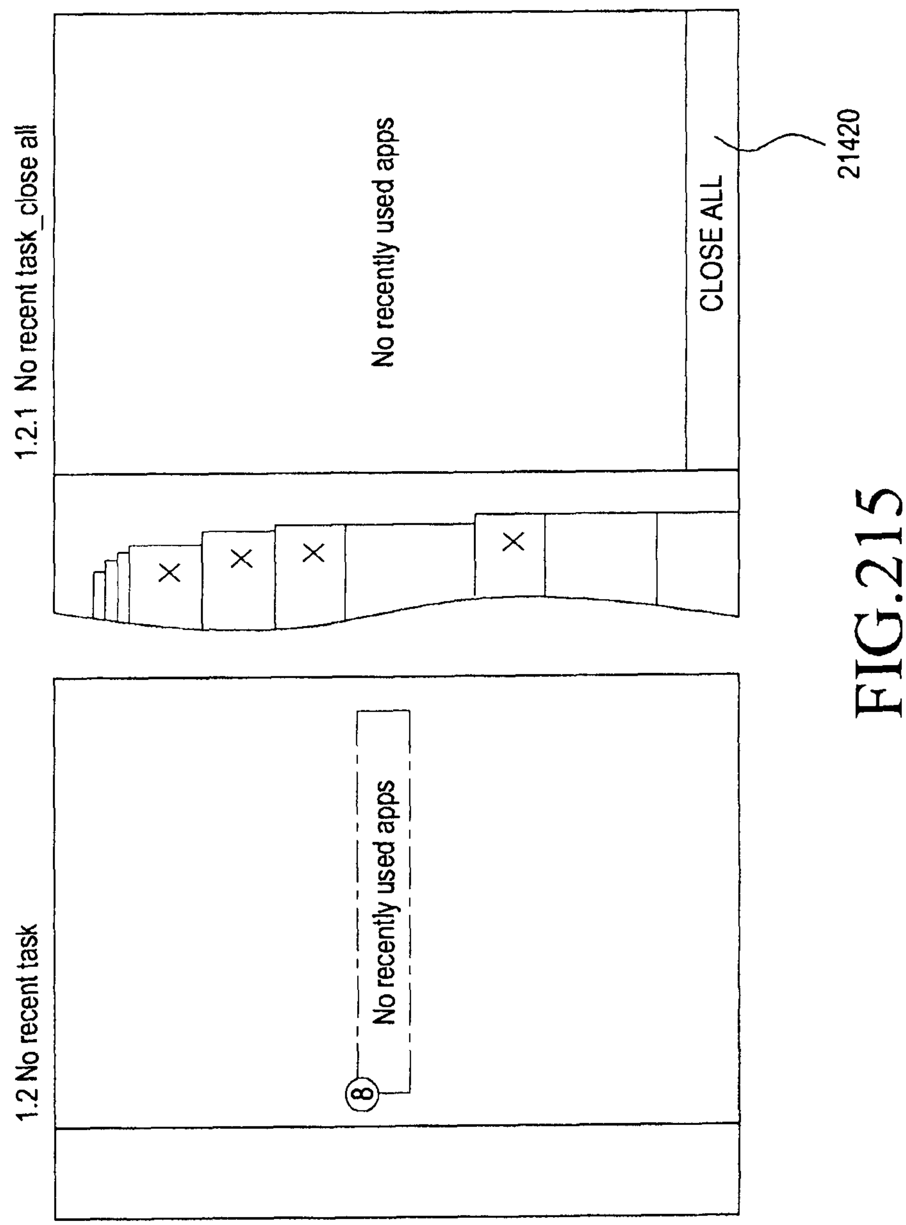

Referring to FIG. 215, according to an embodiment of the present disclosure, where there is no application displayed on the sub display, the electronic device may display a message 'No recently used apps' instead of the application stack. Where there is no application recently displayed on the main display, the electronic device may display a message, 'No recently used apps,' instead of the application stack and may display the end all function key 21420.

4.5. Description of Message Manager Application 4.5.1. Overview of Message Manager Application According to an embodiment of the present disclosure, 'message manager application' may mean an application capable of displaying a message transmitted from the electronic device or received from another electronic device.

4.5.2. Description of Running Screen of Message Manager Application in Folded Mode FIGS. 216*a* to 216*d* illustrate running screens of the message manager application in the folded mode according to an embodiment of the present disclosure.

Figure 216A:
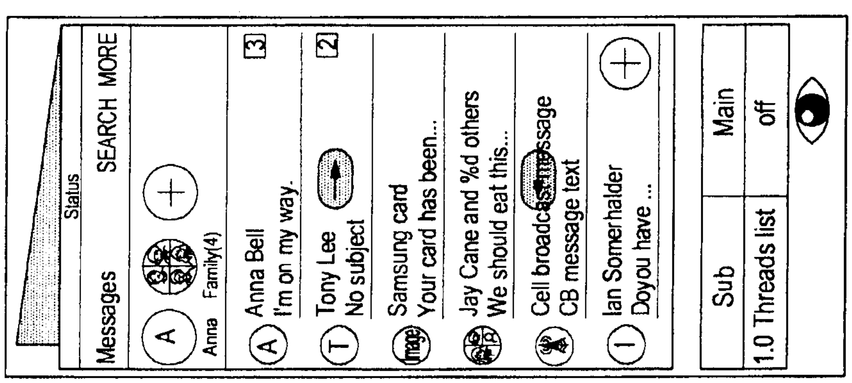
Figure 216B:
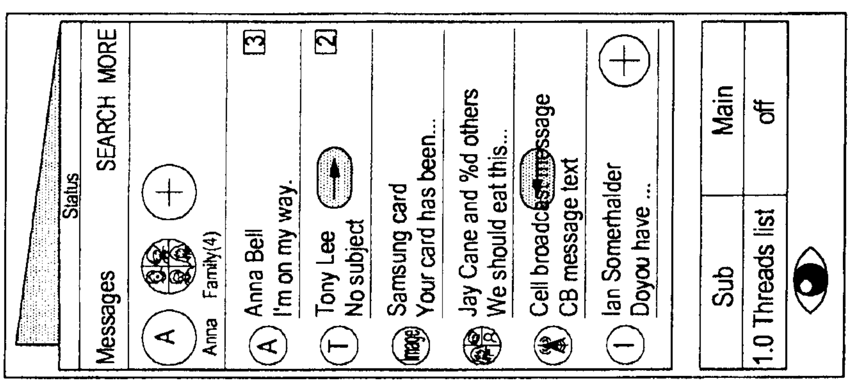

Referring to FIG. 216*a*, according to an embodiment of the present disclosure, the electronic device may classify transmitted/received messages as per opposite parties of the chat and may display a list of the opposite parties on the active display (e.g., the main display). The list may be at 1 depth. Upon detecting a drag gesture to the right on one item on the list, the electronic device may attempt to send a call to the electronic device of the corresponding opposite party of the chat. Upon detecting a drag gesture to the left on one item on the list, the electronic device may display a screen for drafting a message to be sent to the corresponding opposite party. FIG. 216*b* relates to the case where the sub display is determined to be the active display in the folded mode, according to an embodiment of the present disclosure. The electronic device may display the list on the sub display. Further, the electronic device may attempt to call and display a message drafting screen for the drag gesture, respectively, for drag gestures to the left and right on one item on the list.

Figure 216C:
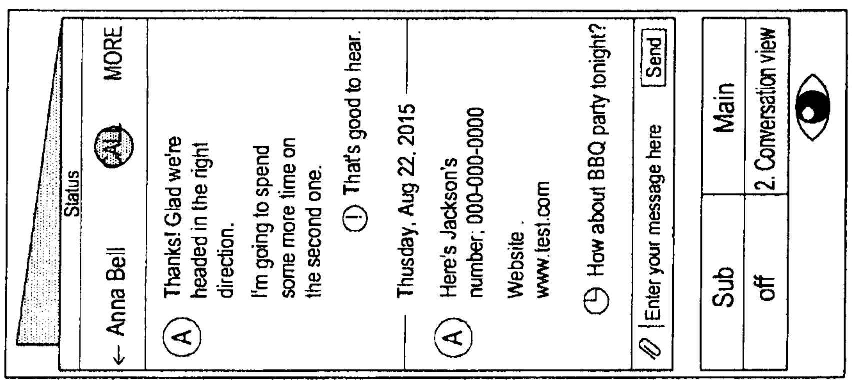
Figure 216D:
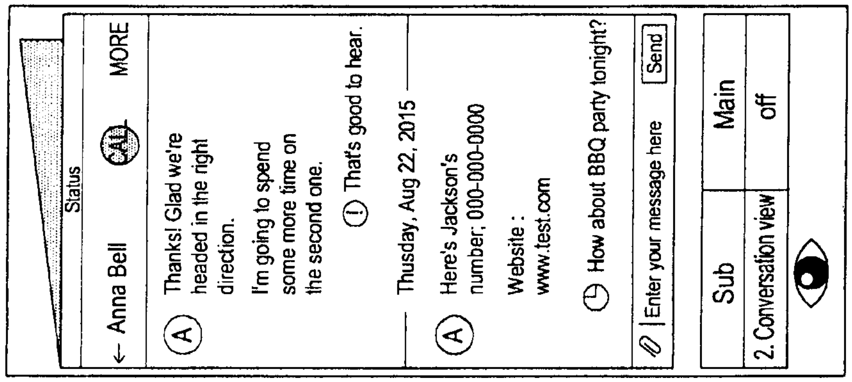

Referring to FIG. 216*c*, according to an embodiment of the present disclosure, the electronic device may display a conversation view with a particular opposite party of the chat on the active display (e.g., the main display). The conversation view may be at the two depths. For example, the electronic device may detect a designation of one item on the list, and in response thereto, the electronic device may display the conversation view with the opposite party as shown in FIG. 216*c*. The conversation view may be displayed so that the messages transmitted and received are separated for the senders or recipients, and the electronic device may display a CALL function key. Upon detecting a designation of the CALL function key, the electronic device may attempt to send a call to the electronic device of the corresponding opposite party of the chat. FIG. 216*d* relates to the case where the sub display is determined to be the active display in the folded mode. The electronic device may display the conversation view.

Figure 217:
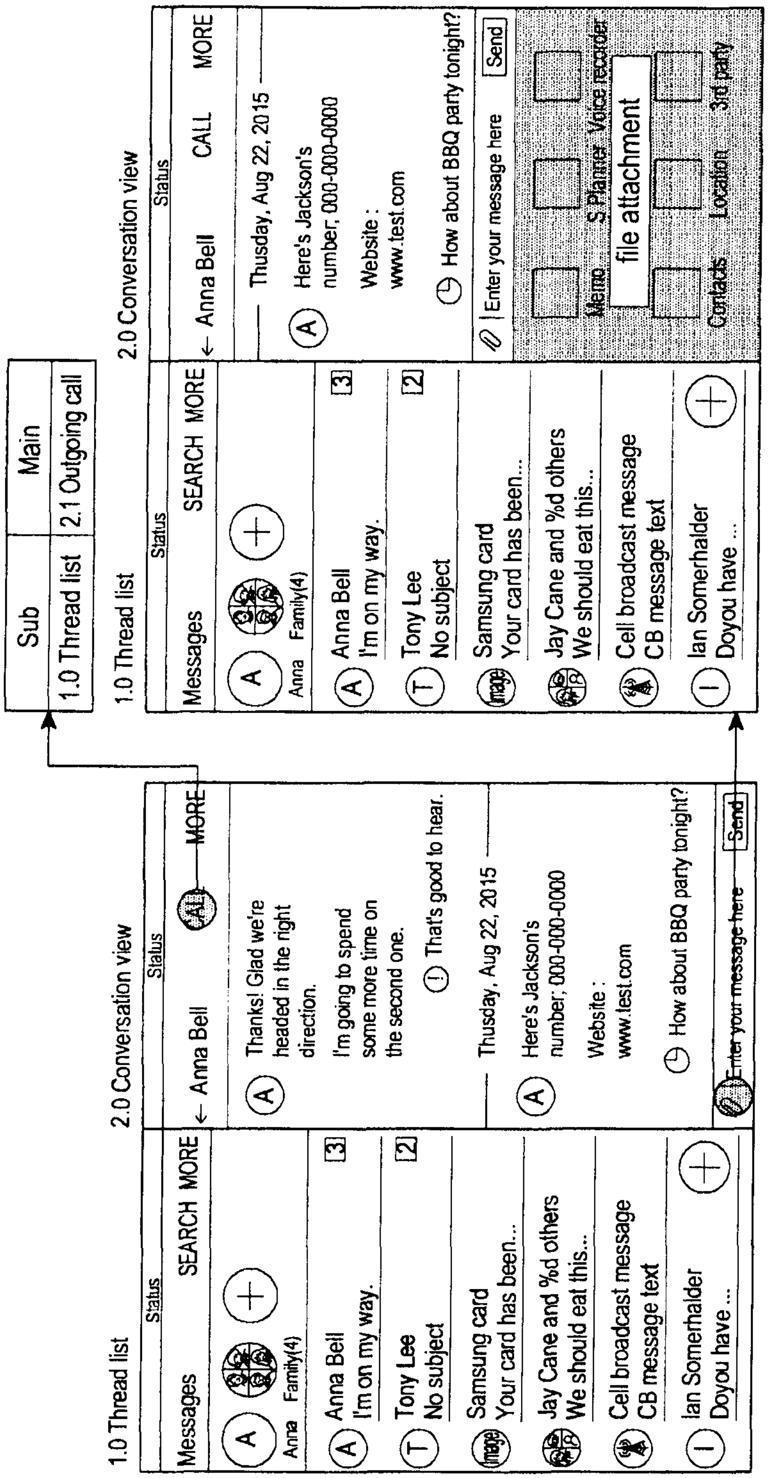

4.5.3. Description of Running Screen of Message Manager Application in Outspread Mode FIG. 217 illustrates an execution screen of the message manager application in the outspread mode according to an embodiment of the present disclosure.

The electronic device may display the list on the sub display and display a conversation view for one item in the list on the main display. When the CALL function key is designated on the main display, the electronic device may attempt to call. The call attempt may be at the depth as set forth above in 2.1. Or, when the attach file function key displayed on the main display is designated, the electronic device may display a screen for file attachment.

4.6. Description of Contact Manager Application

Figure 218:
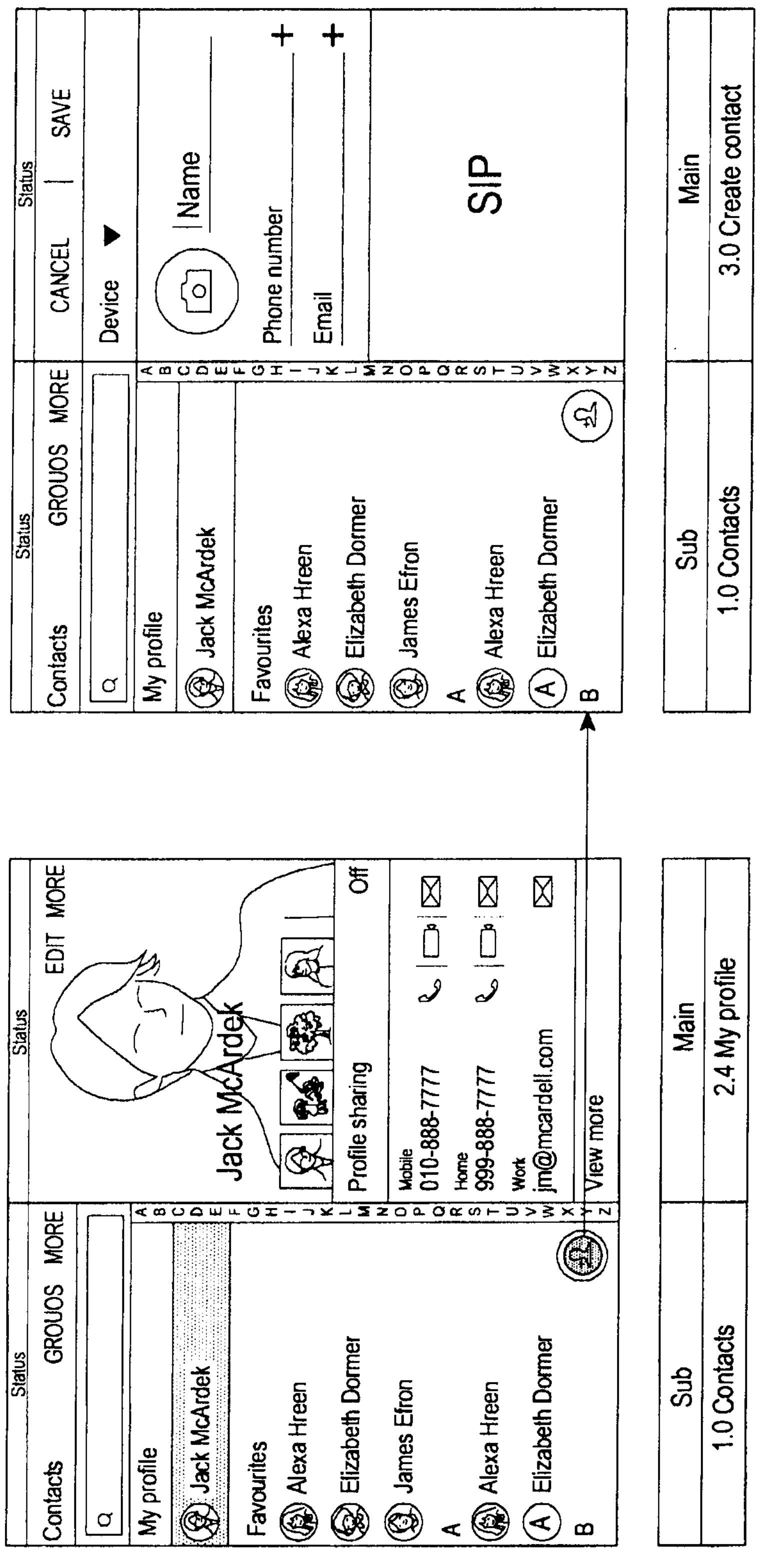
FIG. 218 is a concept view illustrating a contact manager application according to an embodiment of the present disclosure.

Referring to FIG. 218, according to an embodiment of the present disclosure, the electronic device may display a list including items classified per name on the sub display. The electronic device may display a detail view corresponding to one item in the list on the main display. The detail view may be, e.g., at 2.0 depth.

Meanwhile, when the add contact function key that has been displayed on the main display is designated, the electronic device may display a screen for adding contact on the main display. For example, the screen for adding contact may include various items, such as name, phone number, and email address, and an SIP for entering each item. The screen for adding contact may be at 3depth.

4.7. Description of Email Application

Figure 219:
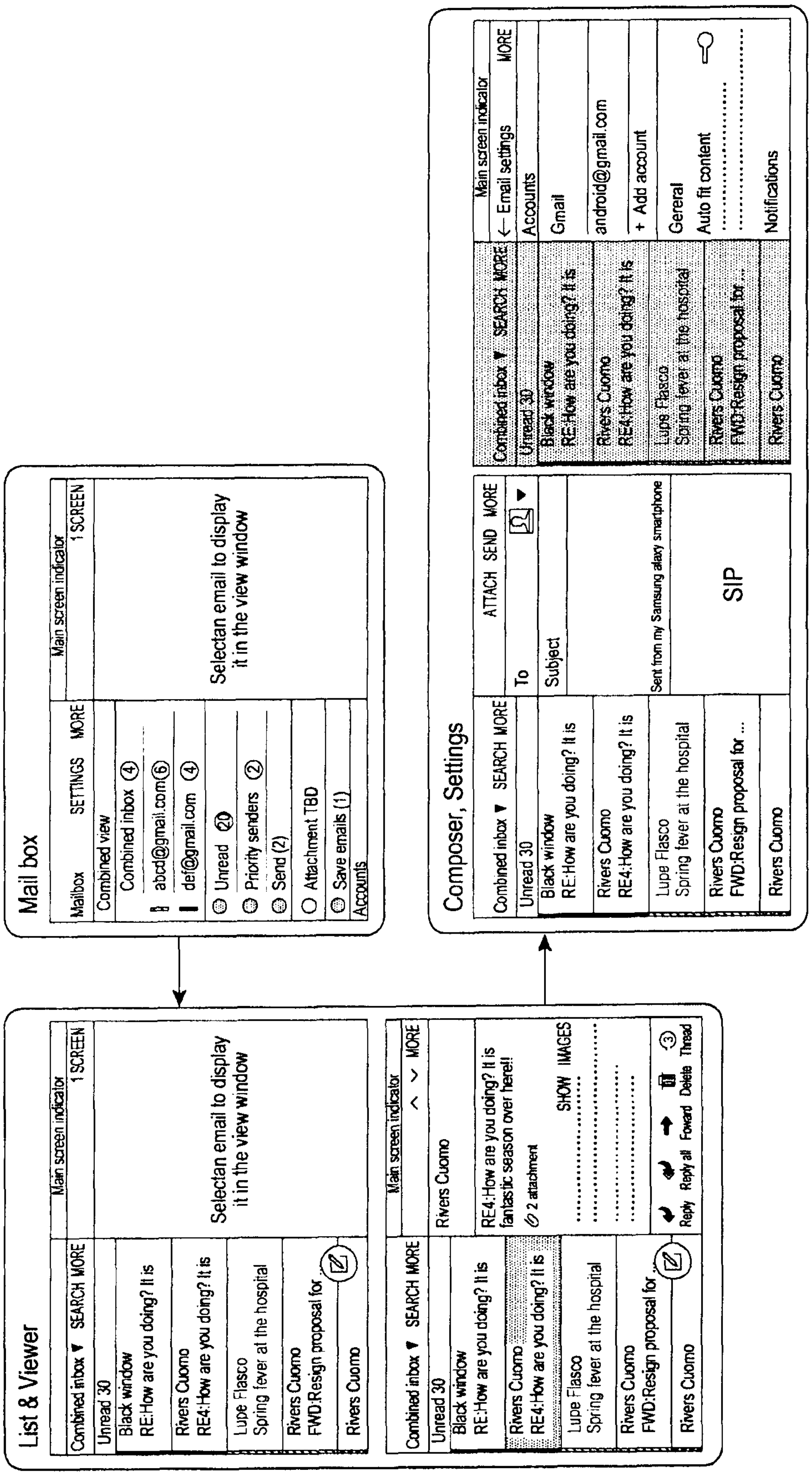
FIG. 219 is a concept view illustrating an email application according to an embodiment of the present disclosure.

Referring to FIG. 219, according to an embodiment of the present disclosure, the electronic device may display an initial screen of the email application on the sub display. The initial screen of the email application may be divided into a combined view, unread, priority senders, and starred item. Further, the electronic device may display a message, 'select an email to display it in the view window,' on the main display. When one item (e.g., unread) is selected on the initial screen, the electronic device may display a list for the selected item on the sub display. For example, the list for the unread item may be a list including items classified per email sender. The electronic device may detect selection of one of the items classified per email sender, and in response thereto, the electronic device may display a detail view (e.g., the email body) of the selected item on the main display. Meanwhile, when a draft email command is detected, the electronic device may display an email drafting screen on the main display. Upon detecting a set email application command, the electronic device may display an email application setting screen in which case the sub display may be subjected to the 'dim' process.

4.8. Description of Character Input Application 4.8.1. Overview of Soft Input Panel (SIP)

Figure 220A:
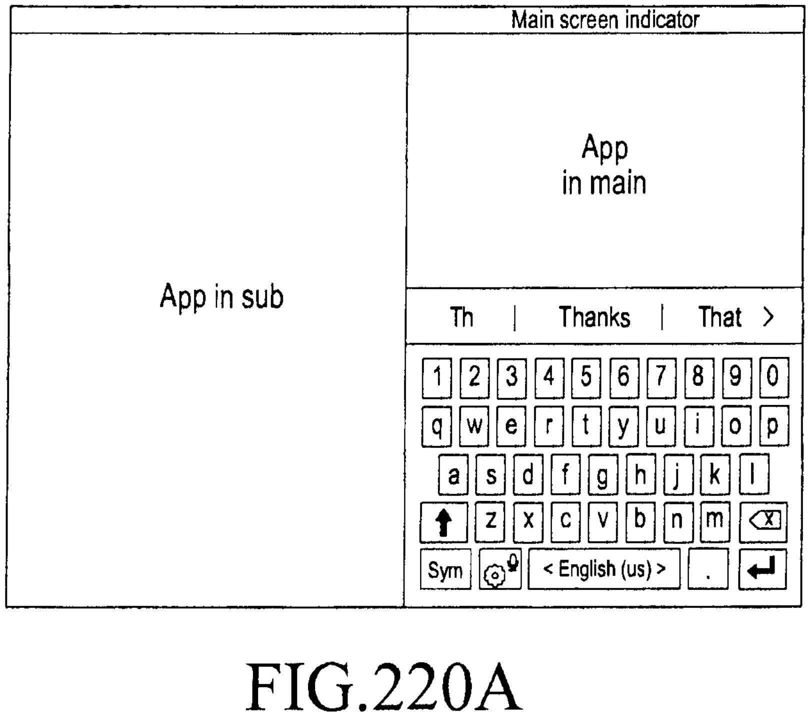
FIGS. 220*a* to 226 are concept views illustrating a soft input panel according to an embodiment of the present disclosure.
Figure 220B:
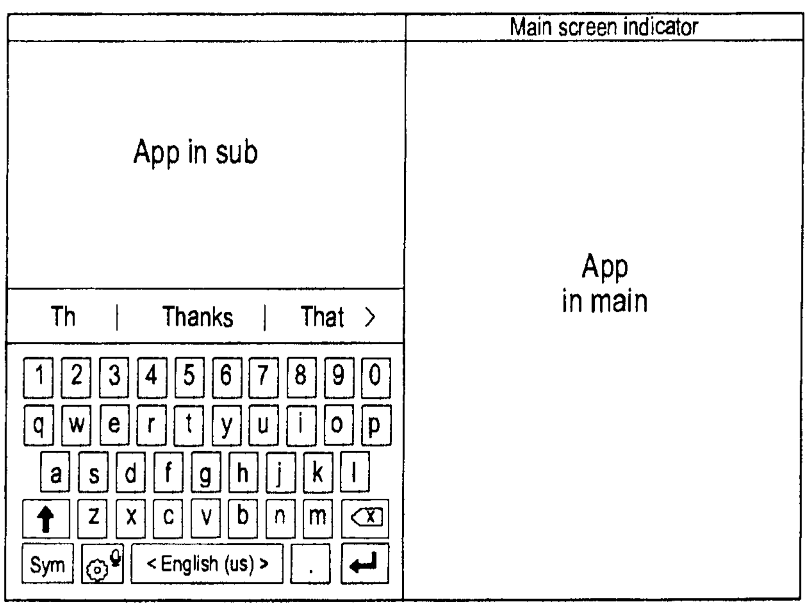

Referring to FIG. 220*a*, according to an embodiment of the present disclosure, the electronic device may display a soft input panel (SIP) on the main display in the portrait mode of the outspread modes. The soft input panel may be an object configured to receive entry of various characters, such as letters, diagrams, numbers, emoticons, or handwritings, various embodiments of which are described below. The electronic device may display an application running screen on, e.g., the main display. The application displayed on the main display is an application capable of receiving and processing entry of characters, e.g., a word processor application, a web browser application, an email application, or other various applications capable of entry of characters, but not limited thereto. Upon input of a command requesting to enter a character, the application may be configured to provide the soft input panel in response thereto. For example, the electronic device may run a web browser application and display an execution screen on the main display. The execution screen may include a URL entry window. Upon detecting a designation of the URL entry window, the electronic device may display the soft input panel to cover the application running screen. In other words, the electronic device may display the soft input panel on the display where an event calling up the soft input panel has been detected. Referring to FIG. 220*b*, the electronic device may display the soft input panel on the sub display. For example, upon detecting an event calling up the soft input panel (e.g., a designation of the URL entry window of the web browser) on the sub display, the electronic device may display the soft input panel on the sub display in response thereto.

4.8.2. Description of Various Display Positions of Soft Input Panel (SIP)

Figure 221A:
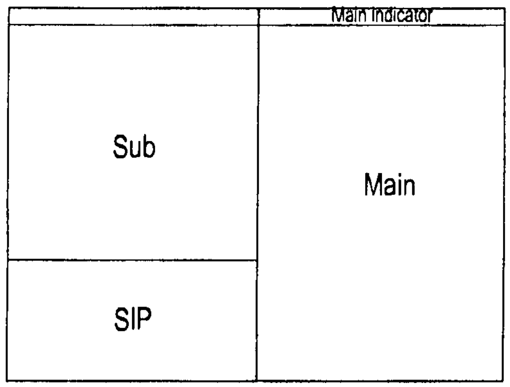
Figure 221B:
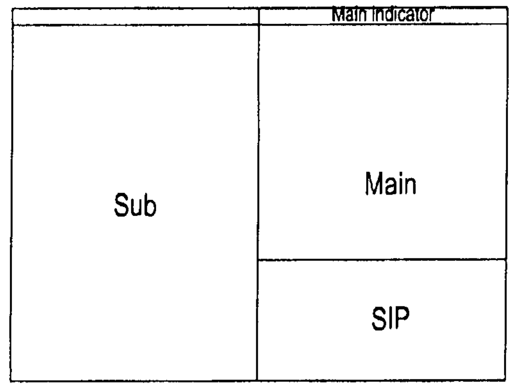
Figure 221C:
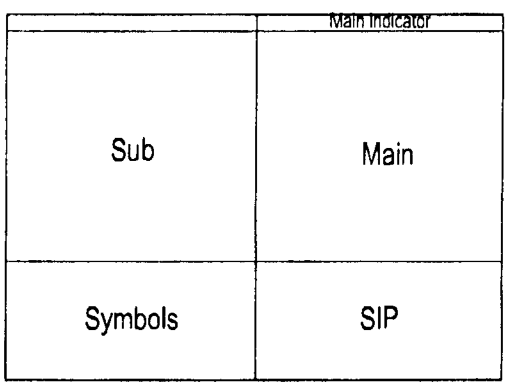

FIGS. 221*a* to 221*g* illustrate display positions of the soft input panel according to various embodiments of the present disclosure. Referring to FIG. 221*a*, according to an embodiment of the present disclosure, the electronic device may display the soft input panel on some lower portion of the sub display in the portrait mode. For example, upon detecting an event calling up the soft input panel on the sub display, the electronic device may display the soft input panel to cover the application running screen being already displayed on the sub display. Referring to FIG. 221*b*, according to an embodiment of the present disclosure, the electronic device may display the soft input panel on some lower portion of the main display in the portrait mode. For example, upon detecting an event calling up the soft input panel on the main display, the electronic device may display the soft input panel to cover the application running screen being already displayed on the main display. Referring to FIG. 221*c*, according to an embodiment of the present disclosure, the electronic device may display the soft input panel on some lower portion of the main display in the portrait mode. The displayed soft input panel may be a soft input panel for entry of characters or numbers. Further, the electronic device may display a soft input panel for entry of symbols on some lower portion of the sub display. That is, the electronic device may separately display the soft input panel for entry of characters or numbers and the soft input panel for entry for symbols on the two displays, respectively.

Figure 221D:
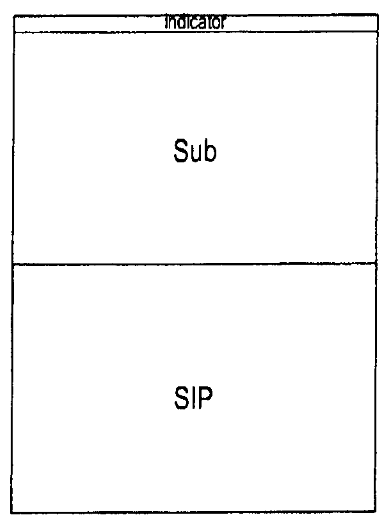
Figure 221E:
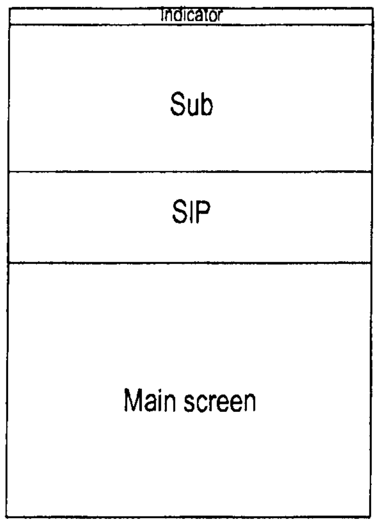
Figure 221F:
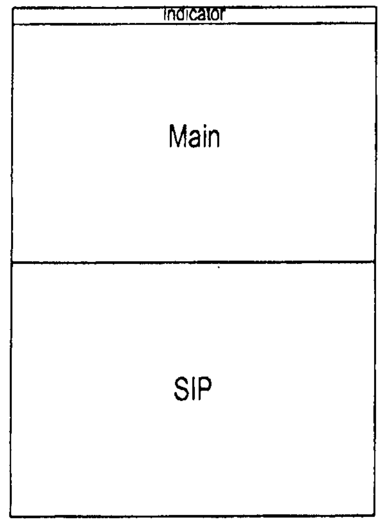
Figure 221G:
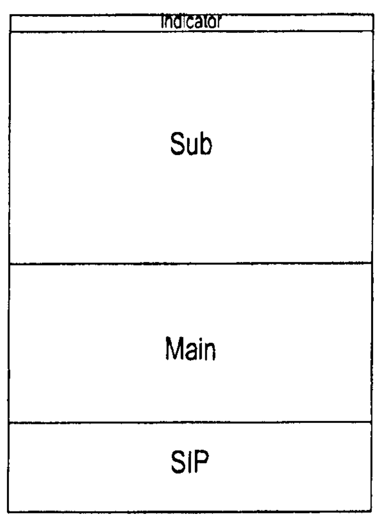

Referring to FIG. 221*d*, according to an embodiment of the present disclosure, the electronic device in the landscape mode may display the application running screen on the sub display while displaying, on the main display, the soft input panel for entry of characters to the application displayed on the sub display. Referring to FIG. 221*e*, according to an embodiment of the present disclosure, the electronic device in the landscape mode may display, on a portion of the sub display, the soft input panel for entry of characters to the application displayed on the sub display. Specifically, the electronic device may display the soft input panel to cover the application running screen being displayed on the sub display. Meanwhile, the electronic device may display, on the main display, an application running screen independent of the application on the sub display. Referring to FIG. 221*f*, according to an embodiment of the present disclosure, the electronic device in the landscape mode may display the application running screen on the main display while displaying, on the sub display, the soft input panel for entry of characters to the application displayed on the main display. Referring to FIG. 221*g*, according to an embodiment of the present disclosure, the electronic device in the landscape mode may display, on a portion of the main display, the soft input panel for entry of characters to the application displayed on the main display. Specifically, the electronic device may display the soft input panel to cover the application running screen being displayed on the main display. Meanwhile, the electronic device may display, on the sub display, an application running screen independent of the application on the main display.

4.8.3. Description of Various Types of Soft Input Panel (SIP)

Figure 222:
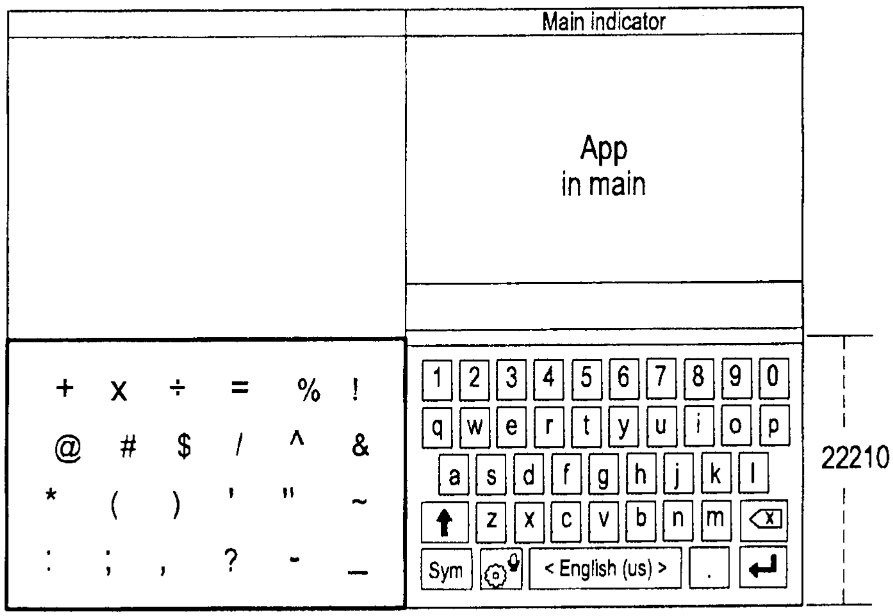

Referring to FIG. 222, according to an embodiment of the present disclosure, the electronic device may display the soft input panel for entry of numbers or letters on the main display and the soft input panel for entry of symbols on the sub display. The height 22210 of the soft input panels may be set to existing heights of the soft input panels. Further, the height 22210 may be adjustable. Meanwhile, entry on the soft input panels displayed on the main display and the sub display may be assigned to the application displayed on the main display. For example, when the user designates the "!" button on the soft input panel displayed on the sub display, the electronic device may reflect the entry of "!" to the application running screen displayed on the main display.

Figure 223A:
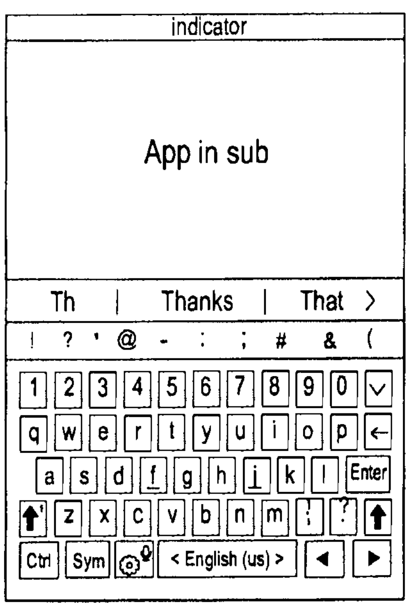
Figure 223B:
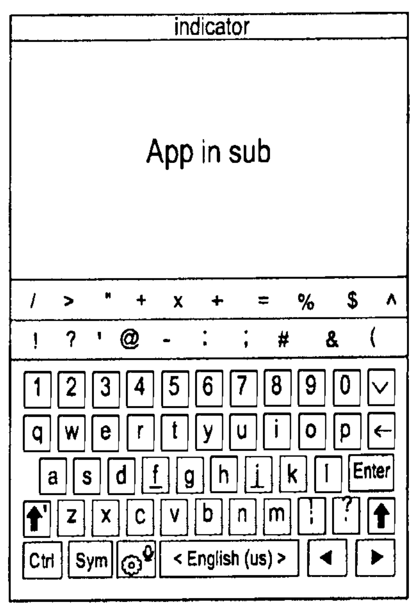

Referring to FIG. 223*a*, according to an embodiment of the present disclosure, the electronic device may display an application running screen on the sub display in the landscape mode. The electronic device may display, on the main display, a soft input panel for entry to the application displayed on the sub display. In the embodiment of FIG. 223*a*, the soft input panel may be one for entry of numbers or letters, e.g., a QWERTY keyboard. Meanwhile, the electronic device may display candidates (e.g., The, Thanks, and That) for word autocomplete on the main display. FIG. 223*b* illustrates a screen where the word autocomplete function has been released according to an embodiment of the present disclosure, wherein in contrast to that shown in FIG. 223*a*, no autocomplete candidates show up.

Figure 223C:
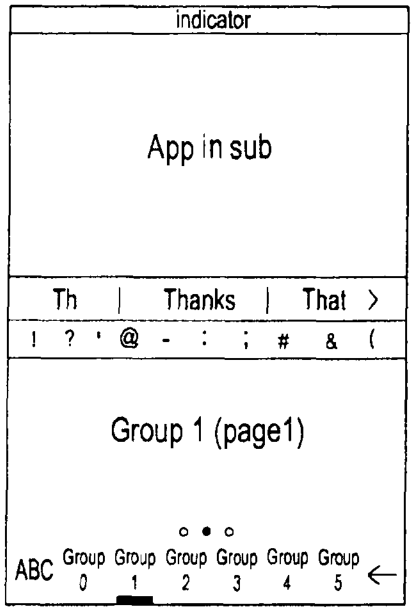
Figure 223D:
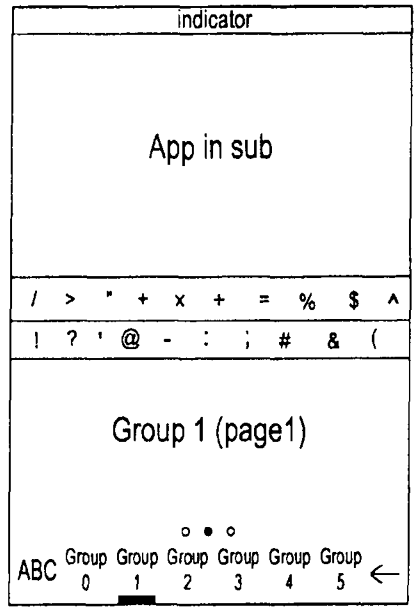

Referring to FIG. 223*c*, according to an embodiment of the present disclosure, the electronic device may display an application running screen on the sub display in the landscape mode. The electronic device may display, on the main display, a soft input panel for entry to the application displayed on the sub display. In the embodiment of FIG. 223*c*, the soft input panel may be one for entry of emoticons. Meanwhile, the electronic device may display candidates (e.g., The, Thanks, and That) for word autocomplete on the main display. FIG. 223*d* illustrates a screen where the word autocomplete function has been released according to an embodiment of the present disclosure, wherein in contrast to that shown in FIG. 223*c*, no autocomplete candidates show up.

Figure 223E:
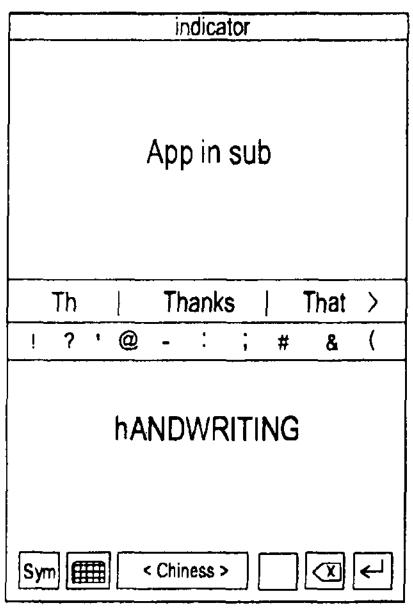
Figure 223F:
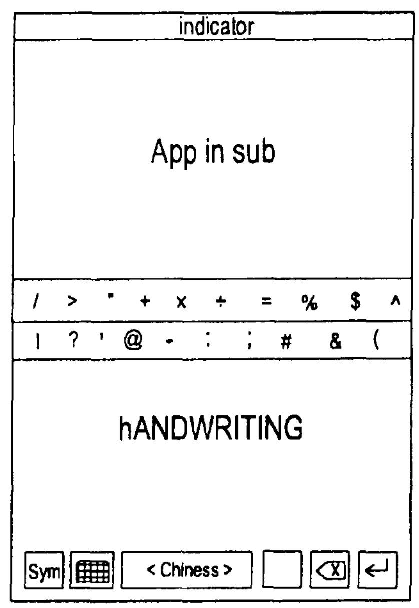

Referring to FIG. 223*e*, according to an embodiment of the present disclosure, the electronic device may display an application running screen on the sub display in the landscape mode. The electronic device may display, on the main display, a soft input panel for entry to the application displayed on the sub display. In the embodiment of FIG. 223*e*, the soft input panel may be one for entry of handwritings. Meanwhile, the electronic device may display candidates (e.g., The, Thanks, and That) for word autocomplete on the main display. FIG. 223*f* illustrates a screen where the word autocomplete function has been released according to an embodiment of the present disclosure, wherein in contrast to that shown in FIG. 223*e*, no autocomplete candidates show up.

Figure 223G:
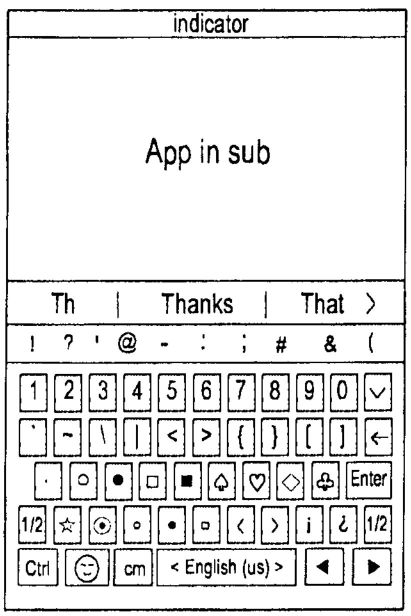
Figure 223H:
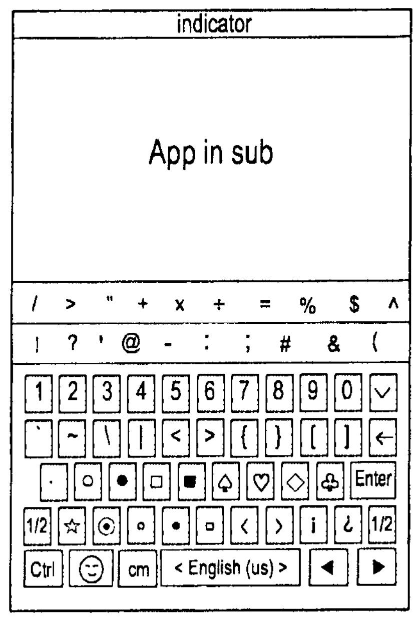

Referring to FIG. 223*g*, according to an embodiment of the present disclosure, the electronic device may display an application running screen on the sub display in the landscape mode. The electronic device may display, on the main display, a soft input panel for entry to the application displayed on the sub display. In the embodiment of FIG. 223*g*, the soft input panel may be one for entry of symbols. Meanwhile, the electronic device may display candidates (e.g., The, Thanks, and That) for word autocomplete on the main display. FIG. 223*h* illustrates a screen where the word autocomplete function has been released according to an embodiment of the present disclosure, wherein in contrast to that shown in FIG. 223*g*, no autocomplete candidates show up.

Figure 224:
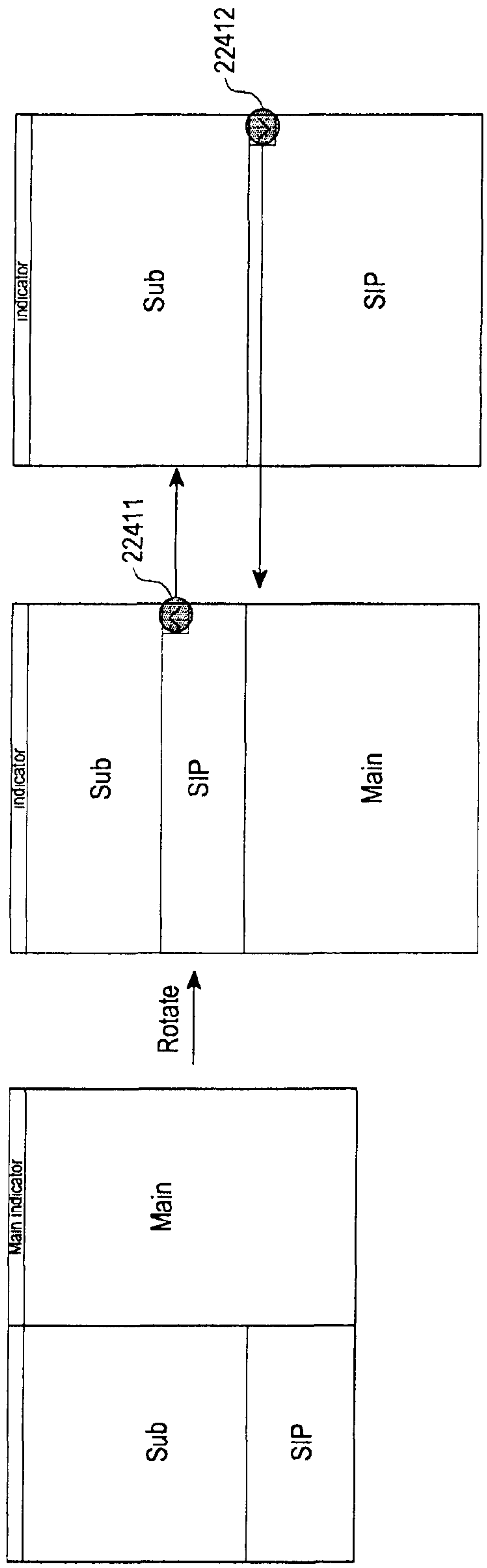

4.8.4. Description of Change of Soft Input Panels (SIPs) Responsive to Move of Electronic Device Referring to FIG. 224, according to an embodiment of the present disclosure, the electronic device in the portrait mode may display, on the sub display, a portrait mode running screen of a first application and a portrait mode soft input panel for entry to the first application. The electronic device may display a portrait mode running screen of the second application on the main display. In this case, the electronic device may detect a rotation and accordingly enter into the landscape mode. The electronic device may display, on a portion of the sub display, a landscape mode running screen of the first application and a landscape mode soft input panel for entry to the first application. The electronic device may display a landscape mode running screen of the second application on the main display. Meanwhile, upon designating an expand soft input panel button 22411, the electronic device may display the soft input panel on the main display. Further, the electronic device may display a landscape mode running screen of the first application on the sub display. The electronic device may reflect entry through the soft input panel displayed on the main display to the first application. Meanwhile, upon designating a shrink soft input panel button 22411, the electronic device may display the soft input panel along with the landscape mode running screen of the first application on the sub display as shown on the middle of FIG. 224.

Figure 225:
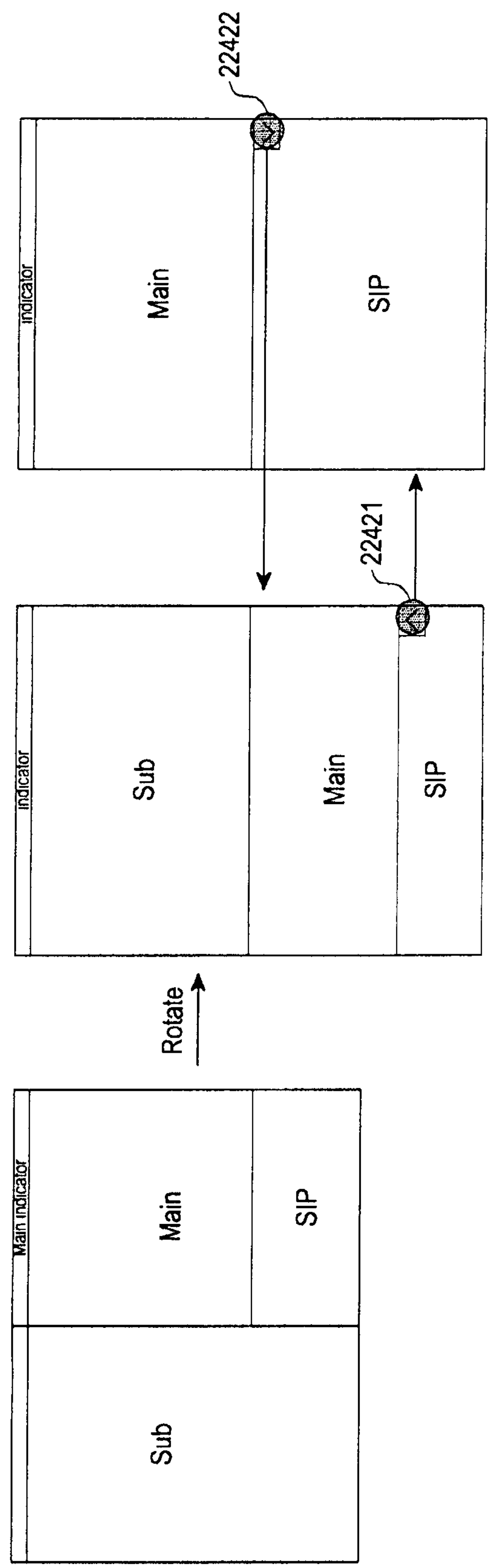

Referring to FIG. 225, according to an embodiment of the present disclosure, the electronic device in the portrait mode may display, on the main display, a portrait mode running screen of a first application and a portrait mode soft input panel for entry to the first application. The electronic device may display a portrait mode running screen of the second application on the sub display. In this case, the electronic device may detect a rotation and accordingly enter into the landscape mode. The electronic device may display, on a portion of the main display, a landscape mode running screen of the first application and a landscape mode soft input panel for entry to the first application. The electronic device may display a landscape mode running screen of the second application on the sub display. Meanwhile, upon designating an expand soft input panel button 22421, the electronic device may display the soft input panel on the main display. Further, the electronic device may display a landscape mode running screen of the first application on the sub display. The electronic device may reflect entry through the soft input panel displayed on the main display to the first application. Meanwhile, upon designating a shrink soft input panel button 22411, the electronic device may display the soft input panel along with the landscape mode running screen of the first application on the main display as shown on the middle of FIG. 225.

4.8.5. Description of Shrinking and Displaying Soft Input Panel (SIP)

Figure 226:
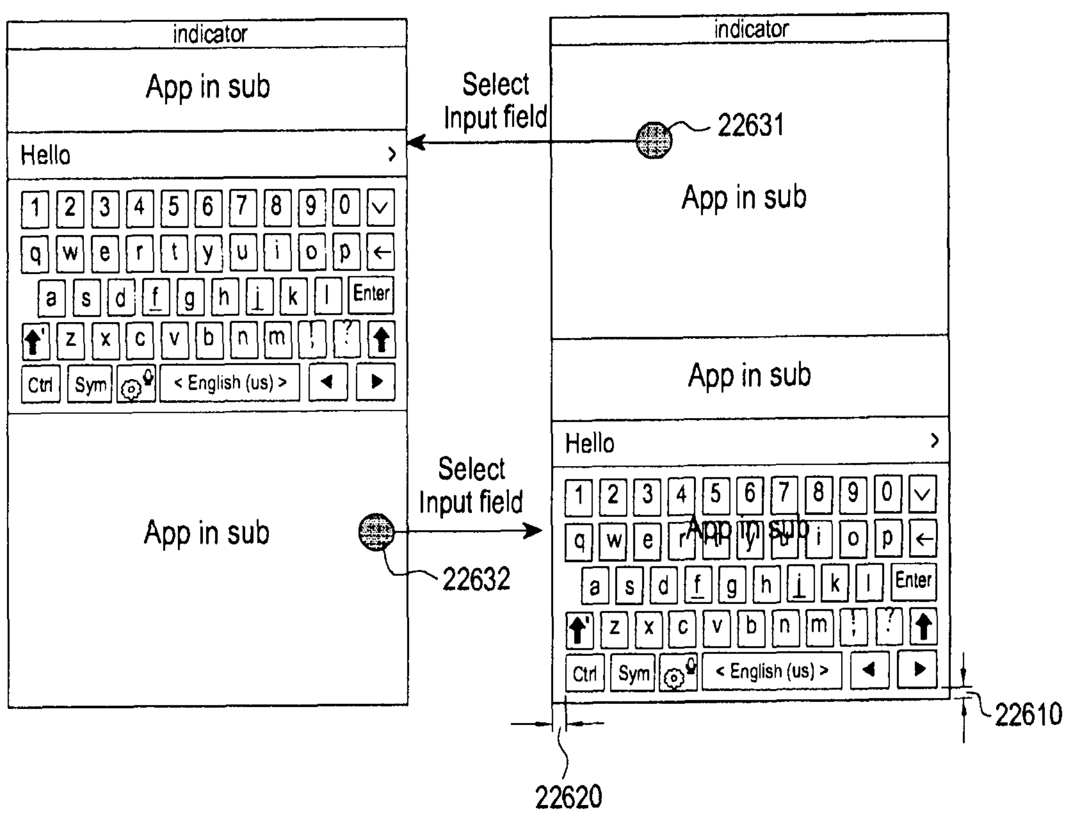

Referring to the left-hand side of FIG. 226, according to an embodiment of the present disclosure, the electronic device in the landscape mode may display, on a portion of the sub display, a landscape mode running screen of the first application and a landscape mode soft input panel for entry to the first application. The electronic device may display a landscape mode running screen of the second application on the main display. Meanwhile, upon detecting a soft input panel call up event 22632, the electronic device may display, on the main display, a landscape mode running screen of the second application and a landscape mode soft input panel for entry to the second application, as shown on the right-hand side of FIG. 226, according to an embodiment of the present disclosure. Further, the electronic device may shrink the soft input panel being displayed on the sub display. According to an embodiment of the present disclosure, the electronic device may adjust the size of the soft input panel up to 0, stopping displaying. Meanwhile, upon detecting a soft input panel call up event 22631, the electronic device may display, on a portion of the sub display, a landscape mode running screen of the first application and a landscape mode soft input panel for entry to the first application, as shown on the left-hand side of FIG. 226. Further, the electronic device may shrink the soft input panel being displayed on the main display or may stop displaying the soft input panel.

Figure 227:
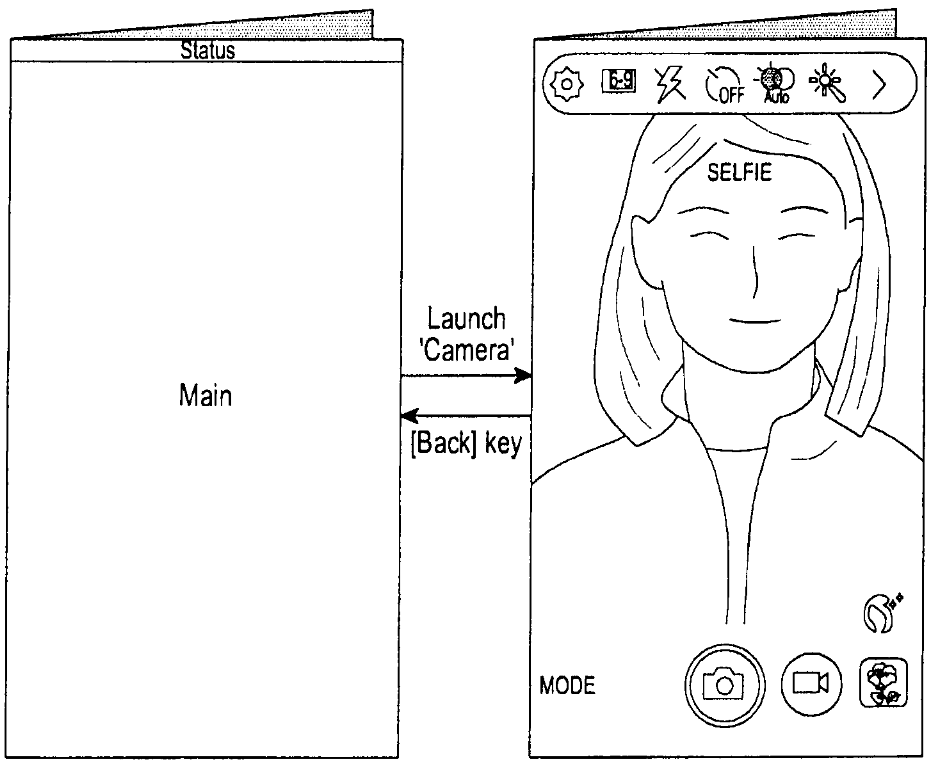
FIGS. 227 to 236 are concept views illustrating a camera application according to an embodiment of the present disclosure.

4.9. Description of Camera Application 4.9.1. Overview of Camera Application Running Screen in Folded Mode Referring to FIG. 227, according to an embodiment of the present disclosure, the electronic device may run the camera application and display an execution screen of the camera application. According to an embodiment of the present disclosure, the camera application running screen may display a preview image allowing an image obtained through the camera to be seen in advance. The electronic device may obtain a run camera application command on the main display and display, on the main display, the camera application running screen including the preview image. In this case, the electronic device may enter into the selfie mode and display a preview image captured by the camera in the body having the main display on the main display. Meanwhile, upon detecting a designation of the back key, the electronic device may stop displaying the camera application running screen and display a previous screen on the main display. In FIG. 227, as the user stares at the main display, the user may see the preview image taken of the user.

Figure 228:
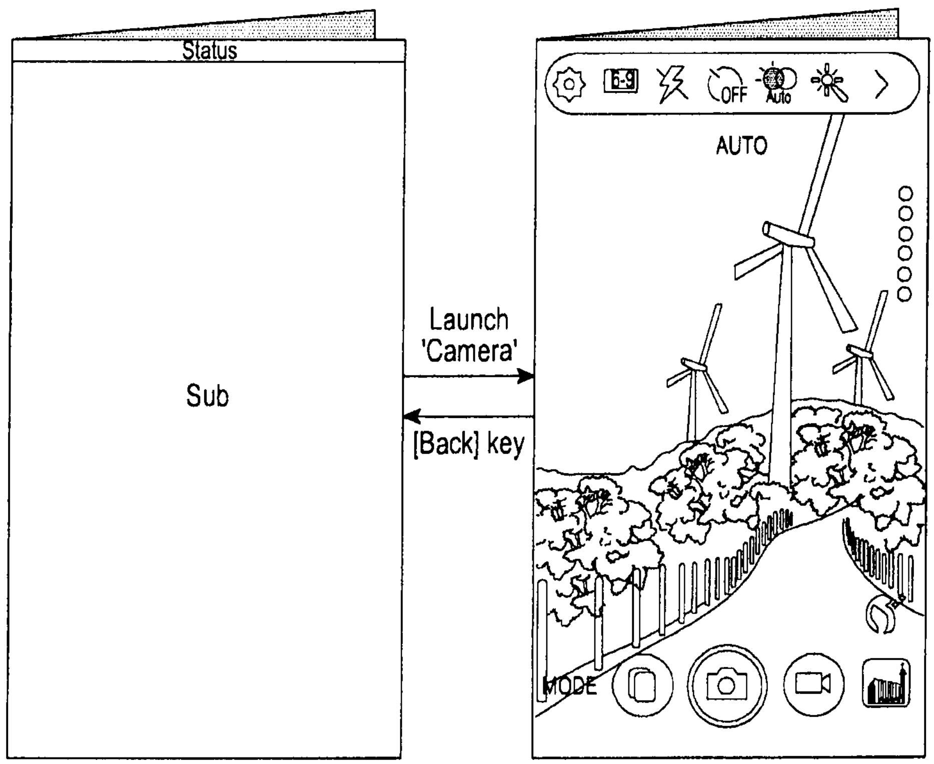

Referring to FIG. 228, according to an embodiment of the present disclosure, the electronic device may obtain a run camera application command on the sub display and display, on the sub display, the camera application running screen including the preview image. In this case, the electronic device may enter into an outlook capture mode and display a preview image captured by the camera in the body having the main display on the sub display. Meanwhile, upon detecting a designation of the back key, the electronic device may stop displaying the camera application running screen and display a previous screen on the sub display. In FIG. 228, as the user stares at the sub display, the user may see a preview image of an outlook, e.g., a preview image taken of the opposite side of the user.

Figure 229:
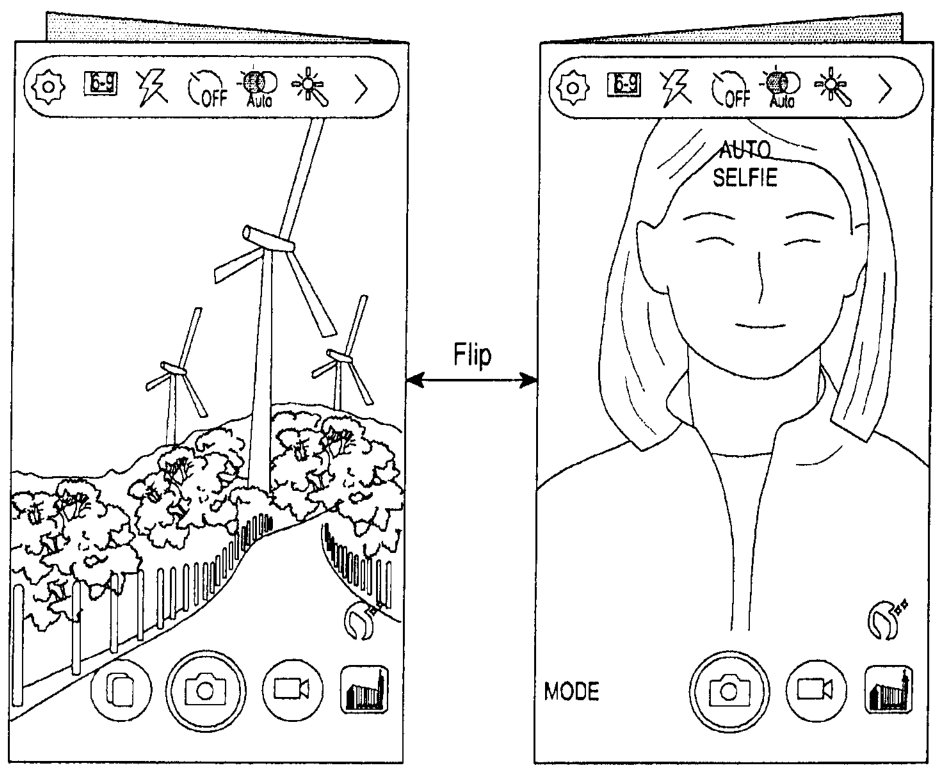

4.9.2. Description of Camera Application Running Screen Corresponding to Flip in Folded Mode Referring to FIG. 229, according to an embodiment of the present disclosure, the electronic device may display a camera application running screen on the sub display. As set forth above, the electronic device may enter into an outlook capture mode and display a preview image captured by the camera in the body having the main display on the sub display. Meanwhile, the electronic device may detect a flip of the electronic device. Accordingly, the display facing the user may be changed from the sub display to the main display. The electronic device may enter into the selfie mode in response to the detection of the flip. The electronic device may display a preview image captured by the camera in the body having the main display on the main display. Upon detecting another flip, the electronic device may enter back into the outlook capture mode and display a preview image captured by the camera in the body having the main display on the sub display.

Figure 230:
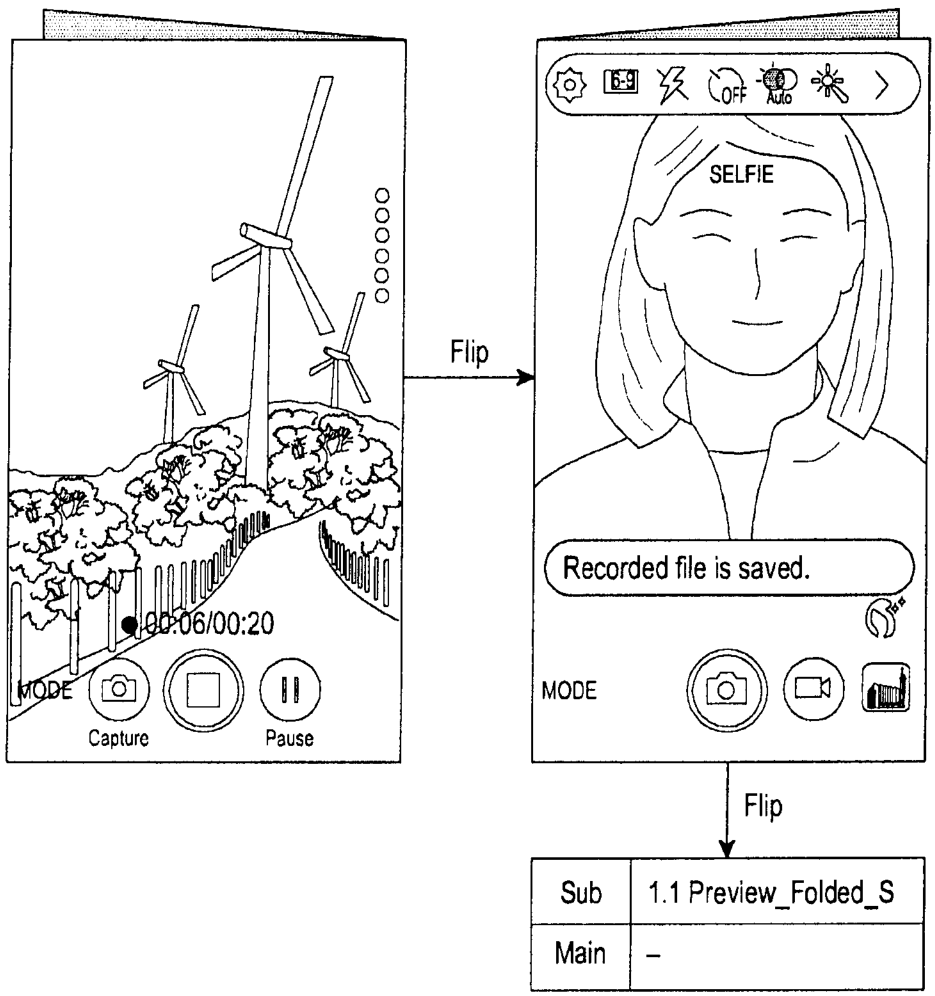

Referring to FIG. 230, according to an embodiment of the present disclosure, the electronic device may enter from the outlook capture mode to the selfie mode in response to detecting a flip. The electronic device may display a preview image captured by the camera in the body having the main display on the main display. When the flip is detected while a video is captured, the electronic device may stop the video capture and automatically save the captured result. The same may apply where the flip is detected while capturing a panorama, video collage, slow motion, virtual shot, hyperlapse, surround shot, or animated picture (e.g., a graphics interchange format (GIF) image), and the electronic device may automatically save the result captured up to the detection of the flip. The electronic device may display a toast popup indicating that the captured result has automatically been save—e.g., 'recorded file is saved.' Upon detecting another flip, the electronic device may enter back into the outlook capture mode and display a preview image captured by the camera in the body having the main display on the sub display. The depth of the camera application displayed on the sub display may be, e.g., 1.1.

4.9.3. Overview of Camera Application Running Screen in Outspread Mode

Figure 231:
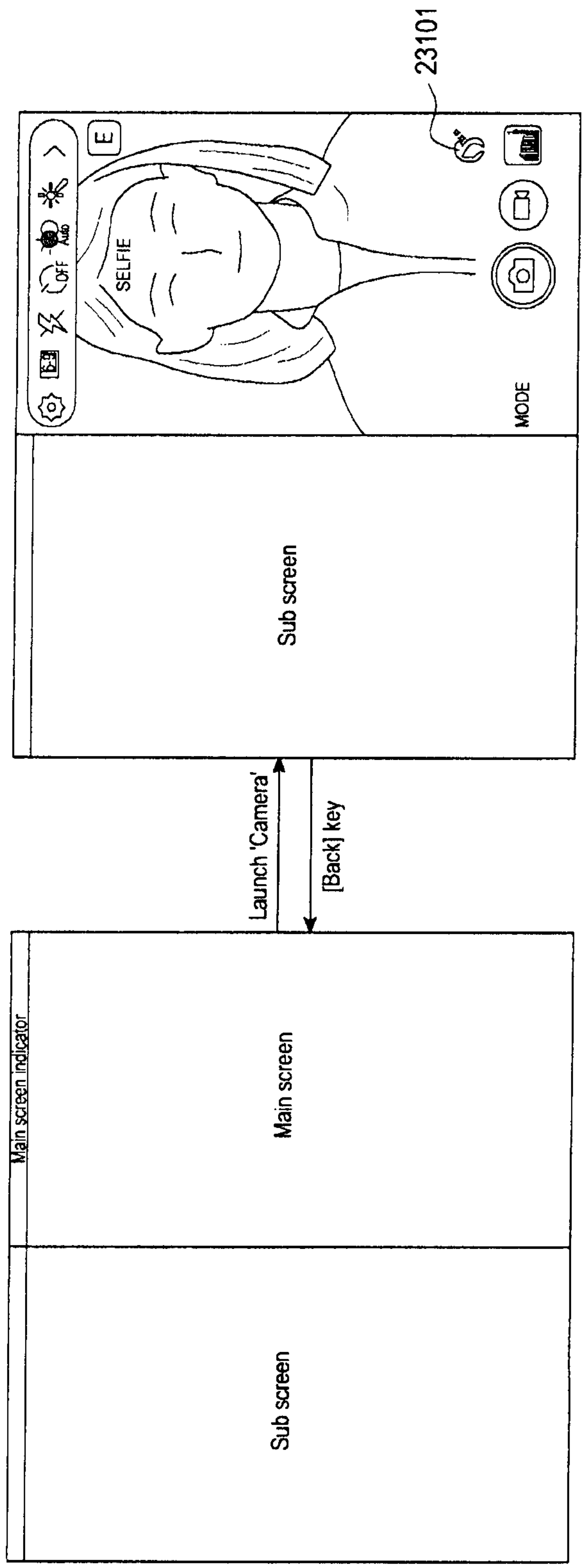

Referring to FIG. 231, according to an embodiment of the present disclosure, the electronic device in the outspread mode may run or launch the camera application. The electronic device may display an execution screen of the camera application on the main display. The electronic device may enter into the selfie mode and display a preview image captured by the camera in the body having the main display on the main display. Meanwhile, although the camera application is expandable, the electronic device, upon initial launch, may display a shrunken running screen of the camera application on the main display alone. The electronic device may display an expand camera application button 23101 on the main display. Upon detecting a designation for the expand camera application button 23101, the electronic device may display an expanded running screen of the camera application on both the displays. In this case, the electronic device may display a shrink camera application button (not shown). Upon detecting a designation for the shrink camera application button (not shown), the electronic device may display a shrunken running screen of the camera application on the main display.

4.9.4. Description of Dual-Preview Function

Figure 232:
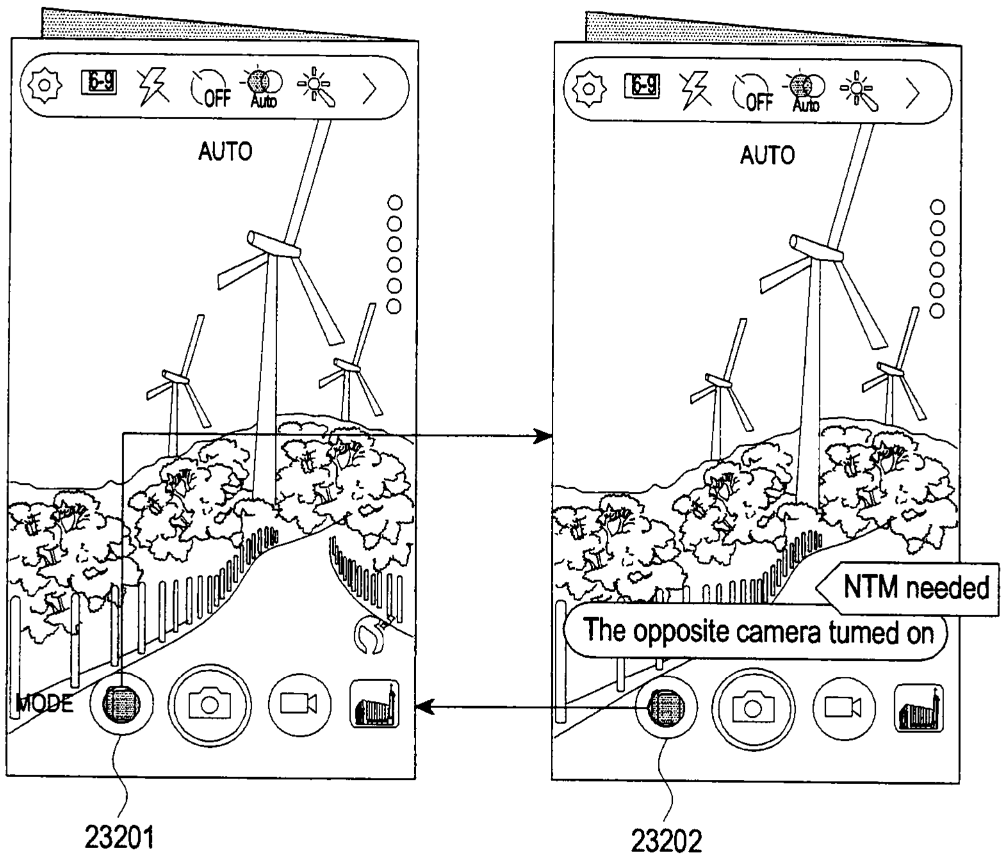
Figure 233:
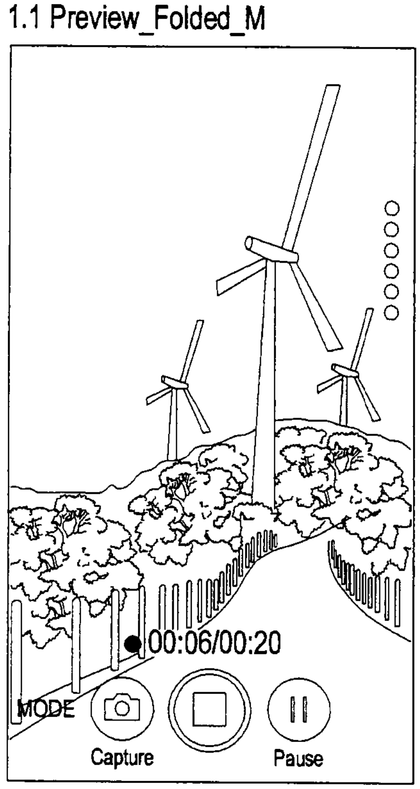

Referring to FIG. 232, according to an embodiment of the present disclosure, the electronic device may display a camera application running screen including a preview image on the sub display. In this case, the electronic device may enter into an outlook capture mode and display a preview image captured by the camera in the body having the main display on the sub display. The electronic device may display a dual preview image function key 23201 on the sub display. Upon detecting a designation of the dual preview image function key 23201, the electronic device, according to an embodiment of the present disclosure, may control the main display in the on state and may display the preview image on the main display as well, as shown in FIG. 233. The electronic device may display a message 23210 indicating that the camera on the main display is on the sub display. When other text is already on display, the electronic device may display the message 23210 in the form of a toast popup covering the text. As described above, the person positioned opposite the user may also be put on notice how his image is being taken of through the preview image displayed on the main display.

While the dual preview works, the electronic device, according to an embodiment of the present disclosure, may display an end dual preview function key 23202. Upon detecting a designation of the end dual preview function key 23202, the electronic device may end the dual preview function and accordingly control the main display in the off state.

Figure 234:
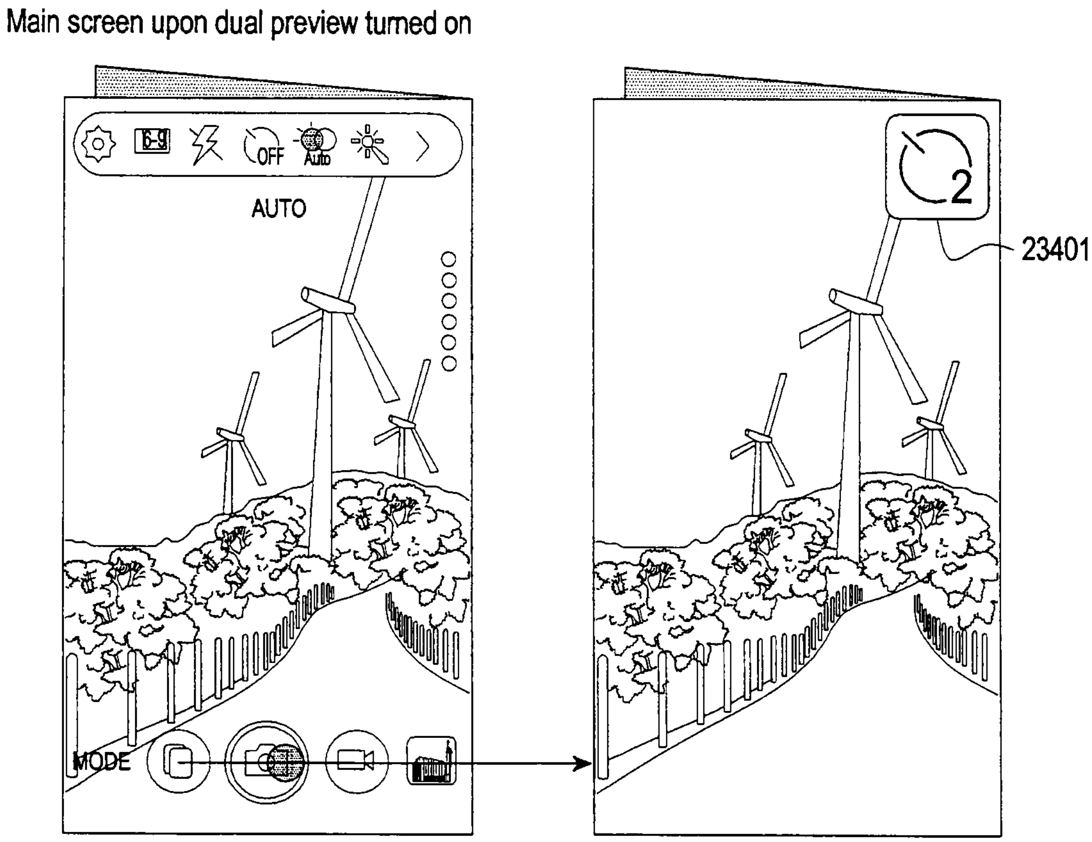
Figure 235:
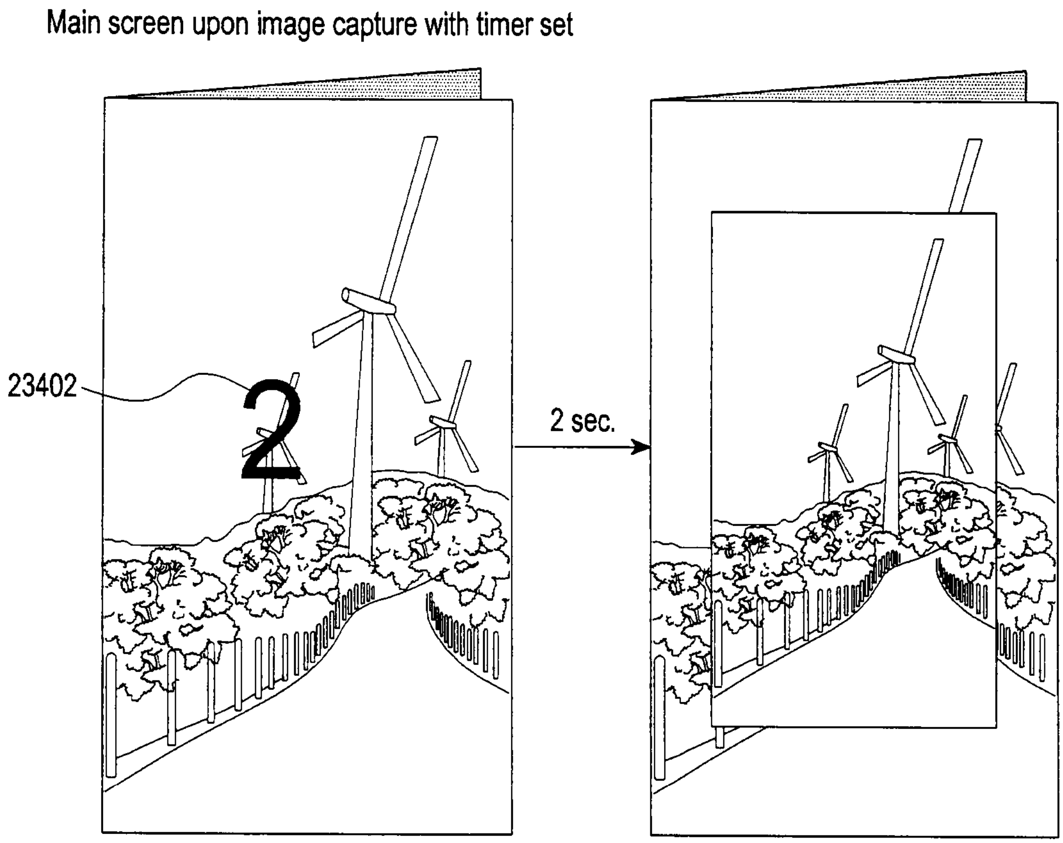

Meanwhile, referring to FIG. 234, according to an embodiment of the present disclosure, the electronic device may display a camera application running screen including a preview image on the sub display. In this case, the electronic device may enter into an outlook capture mode and display a preview image captured by the camera in the body having the main display on the sub display. The electronic device may set a timer. Accordingly, when the capture button is designated, the electronic device may start to capture not immediately but after the set timer expires. For example, the electronic device may display the timer 23401 on the sub display. FIG. 235 illustrates a timer 23402 displayed on the main display according to an embodiment of the present disclosure. The electronic device may display the timer 23402 also on the main display while the dual preview function is in operation.

4.9.5. Description of Switch of Turned-On Display

Figure 236:
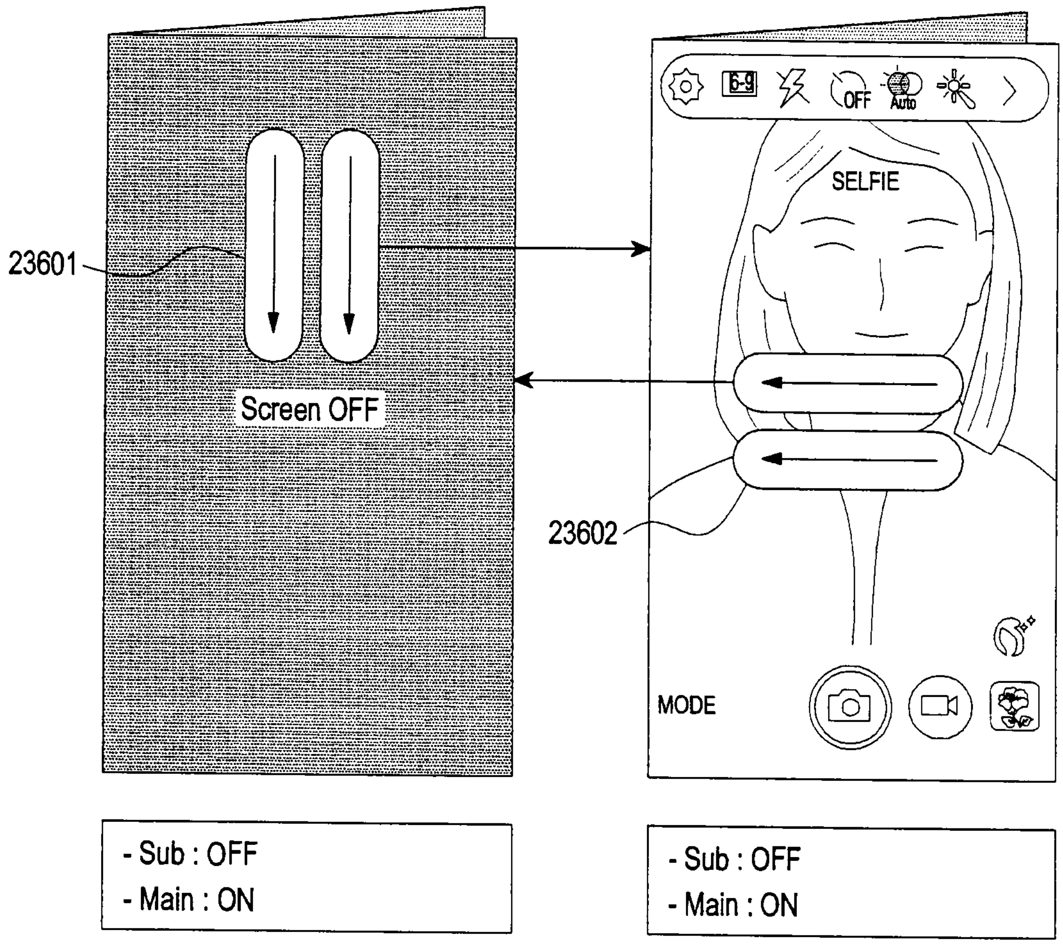

Referring to FIG. 236, according to an embodiment of the present disclosure, the electronic device in the folded mode may control the sub display in the on state and the main display in the off state. In this case, the electronic device may enter into an outlook capture mode and display a preview image captured by the camera in the body having the main display on the sub display. The electronic device may detect a switch turned-on display command 23601 on the main display. The switch turned-on display command 23601 may previously be set as, e.g., a downward multi-drag gesture, which may be set to control the sub display in the off state and the main display in the on state. Meanwhile, the direction of the multi-drag gesture is merely an example but is not limited thereto. In response, the electronic device may control the sub display in the off state and the main display in the on state. As controlling the main display in the on state, the electronic device may enter into the selfie mode and control the sub display in the off state. In this case, the electronic device may enter into an outlook capture mode and display a preview image captured by the camera in the body having the main display on the main display.

Meanwhile, the electronic device may detect another switch turned-on display command 23602 on the main display. The other switch turned-on display command 23602 may previously be set as, e.g., a leftward multi-drag gesture, which may be set to control the main display in the off state and the sub display in the on state. Meanwhile, the direction of the multi-drag gesture is merely an example but is not limited thereto. In response, the electronic device may control the main display in the off state and the sub display in the on state. As controlling the sub display in the on state, the electronic device may enter into the outlook capture mode and control the main display in the off state. In this case, the electronic device may enter into an outlook capture mode and display a preview image captured by the camera in the body having the main display on the main display.

Figure 237A:
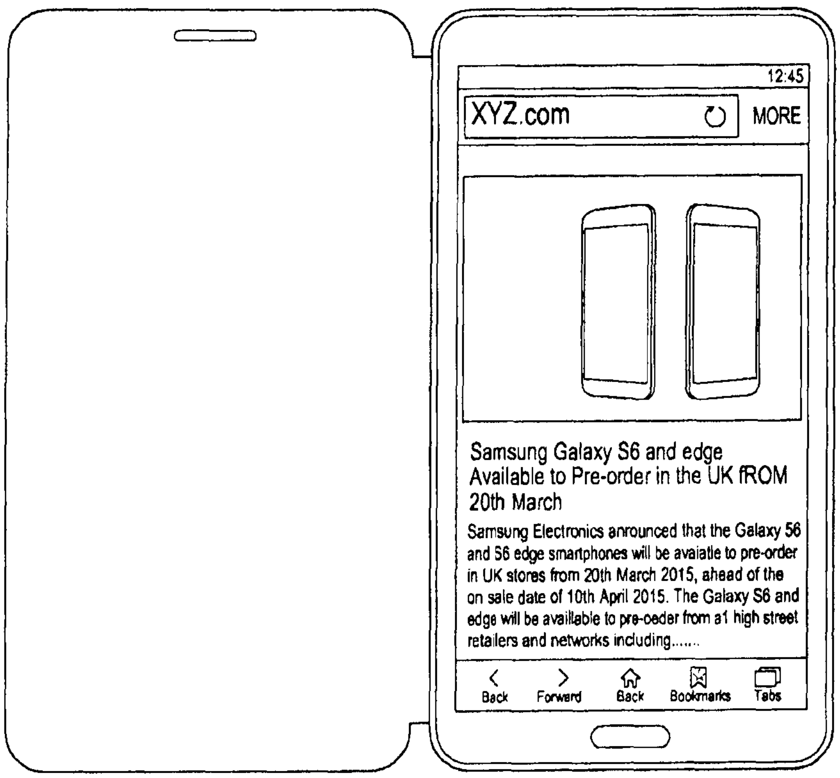
FIGS. 237*a* to 242 are concept views illustrating an internet application according to an embodiment of the present disclosure.
Figure 237B:
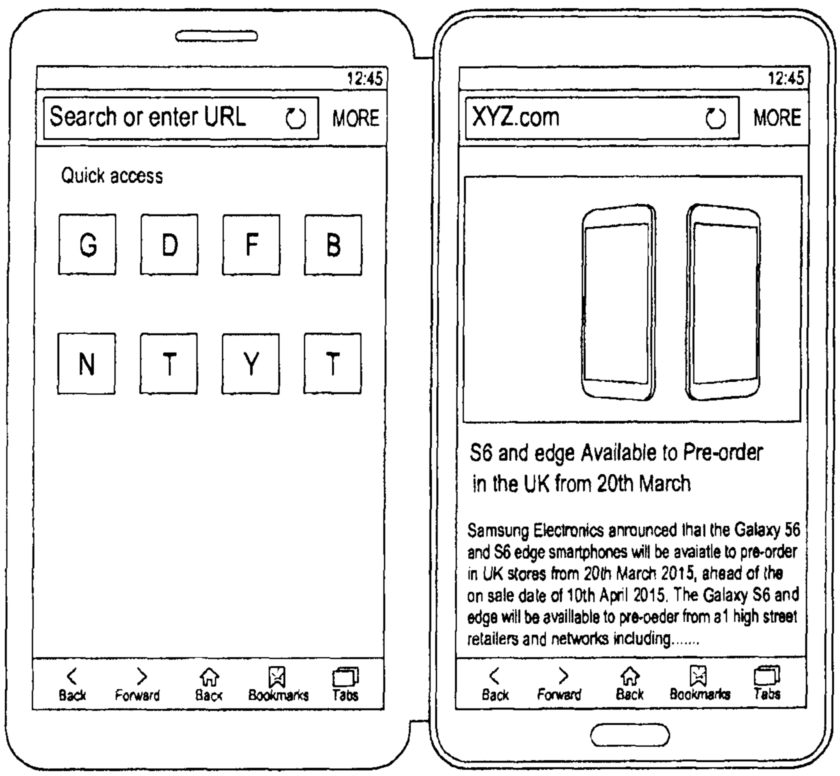

4.10. Description of Web Browser Application 4.10.1. Overview of Web Browser Application Running Screen Referring to FIG. 237*a*, according to an embodiment of the present disclosure, the electronic device in the outspread mode may run the web browser application. The electronic device may, as default, display a first running screen of the web browser application on the main display. As shown in FIG. 237*a*, the first running screen of the web browser application may include a URL address window and a URL access screen. The web browser application may provide the function of independently accessing a plurality of URLs. For example, the web browser application may configure a screen linked to a first URL as an independent page and a screen linked to a second URL as another independent page. Here, the term "first" may mean one of pages respectively linked to a plurality of URLs. Meanwhile, the electronic device may detect a command to display a second running screen of the web browser application. In response, the electronic device may display the second running screen of the web browser application on the sub display as shown in FIG. 237*b*, according to an embodiment of the present disclosure. According to an embodiment of the present disclosure, the second running screen of the web browser application may be an initial running screen before accessing the URL. The electronic device displays the web browser application running screens on both the main display and the sub display, but as set forth above, the execution screens respectively displayed on the displays may be independent from each other. Accordingly, two independent running screens of the web browser application being displayed on the plurality of displays, respectively, may be denoted as a dual mode of the web browser application.

4.10.2. Description of Web Browser Application Function Keys

Figure 238:
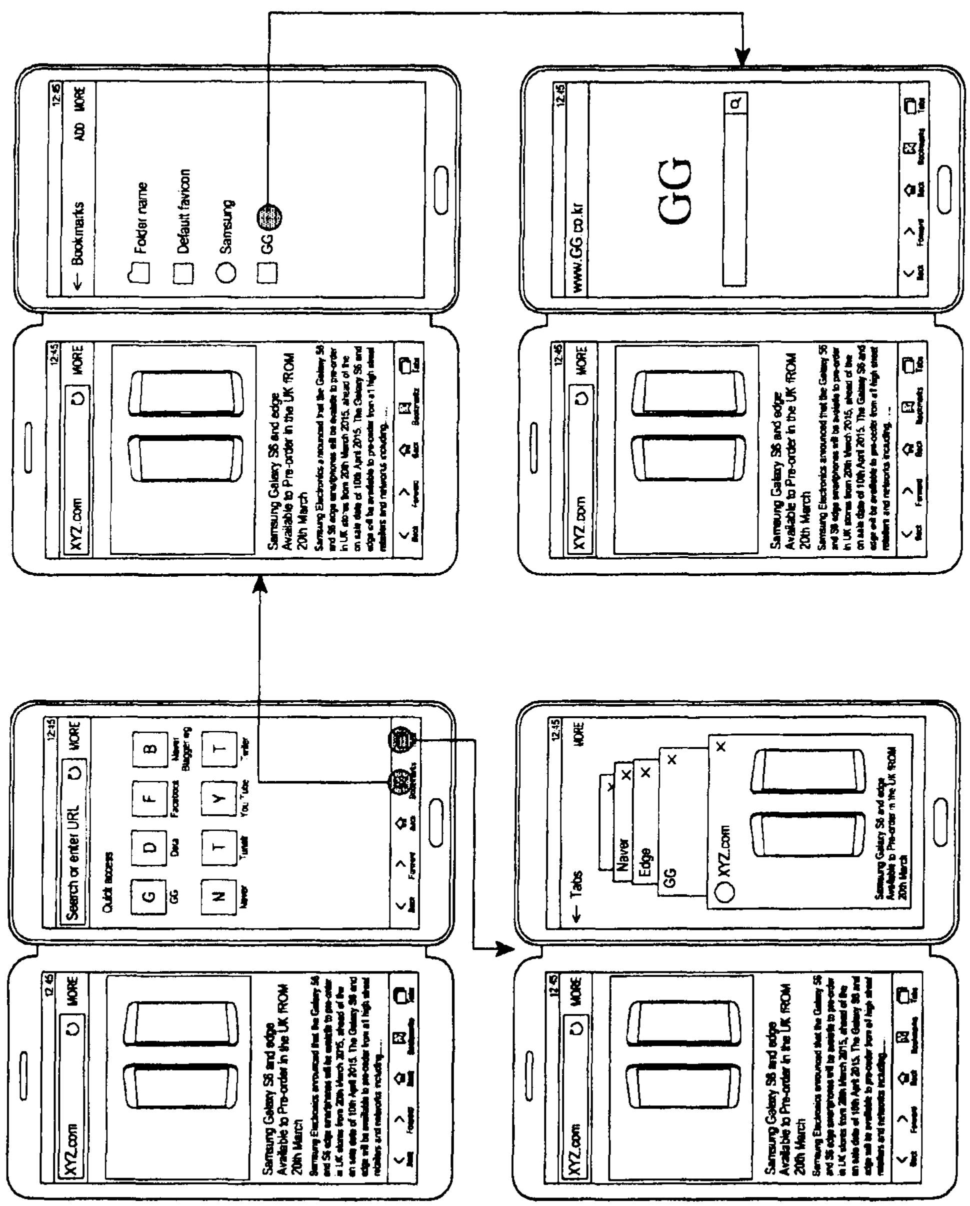

FIG. 238 illustrates web browser application running screens according to an embodiment of the present disclosure. Referring to the upper and left side of FIG. 238, the electronic device may display a first running screen of the web browser application on the sub display and a second running screen of the web browser application on the main display. For example, the first running screen may be a screen linked to a particular URL (e.g., "samsung.com"), and the second running screen may be an initial running screen before accessing the particular URL, which may be a screen including icons indicating default domain names. The first running screen and the second running screen may include function keys (e.g., go back, go forward, move to preset homepage, bookmark, and tab) on their lower ends. That is, the function keys may independently be displayed on each display.

When the bookmark function key is designated on the main display, the electronic device may display a bookmark screen on the main display as shown on the upper and right side of FIG. 238. The bookmark screen may include existing domain names or brand names marked. When one of the items on the bookmark screen is designated, the electronic device may display the screen linked to the URL of the designated item as shown on the lower and right side of FIG. 238. Meanwhile, when the tab function key is designated, the electronic device may display at least one independent web browser application running screen that used to be displayed on the main display, as shown on the lower and left side of FIG. 238. The electronic device may provide the function of navigating the, at least, one independent web browser application running screen used to be displayed as shown on the lower and left side of FIG. 238. This function enables any one web browser application running screen to be displayed when it is selected.

4.10.3. Description of Running of Web Browser Application

Figure 239A:
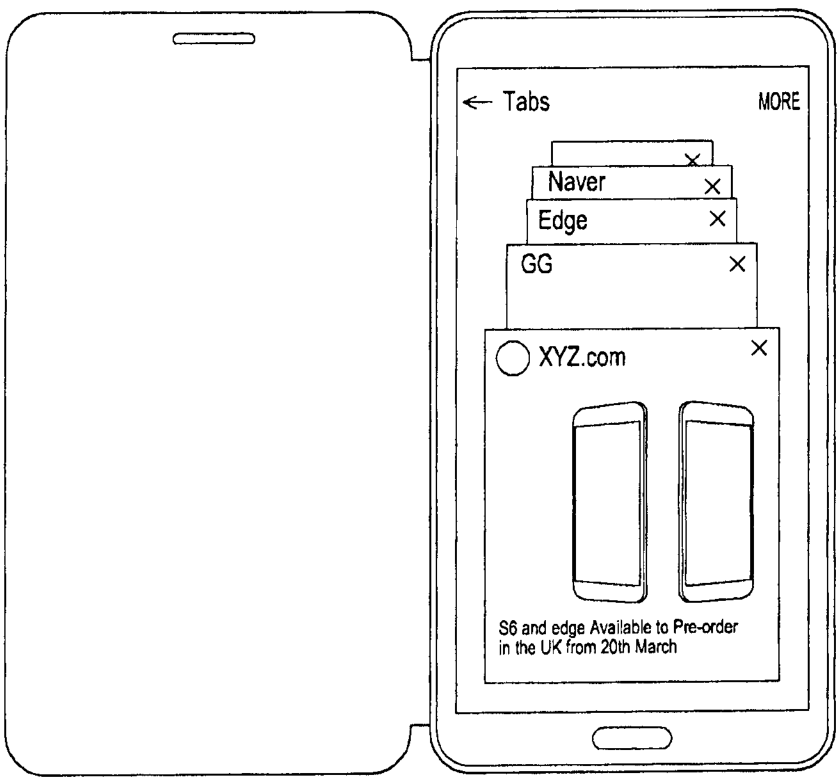
Figure 239B:
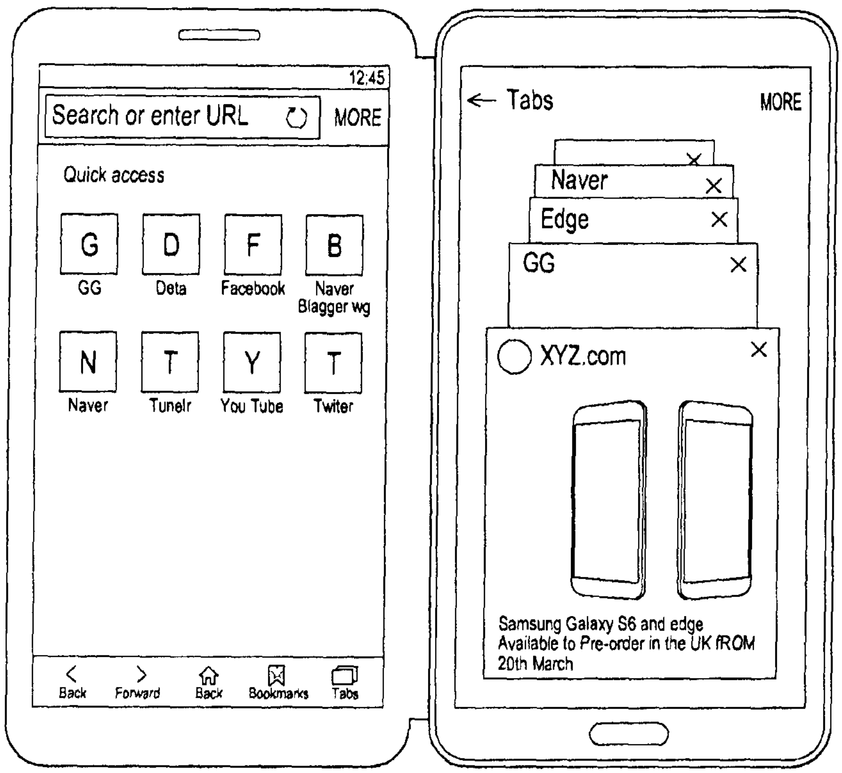

Referring to FIG. 239*a*, according to an embodiment of the present disclosure, the electronic device may display a run tab function key screen of a web browser application running screen on the main display. As described above, the electronic device may display at least one independent web browser application running screen that used to be displayed on the main display, as shown on the lower and left side of FIG. 238. The electronic device may control the sub display in the off state. Meanwhile, the electronic device may obtain a command to open a new window on the opposite display, i.e., the sub display. In response to the obtained command to open a new window on the opposite display, the electronic device, according to an embodiment of the present disclosure, may control the sub display in the on state and display a web browser application running screen (e.g., an initial screen) on the sub display as shown in FIG. 239*b*.

4.10.4. Description of Tab Function

Figure 240A:
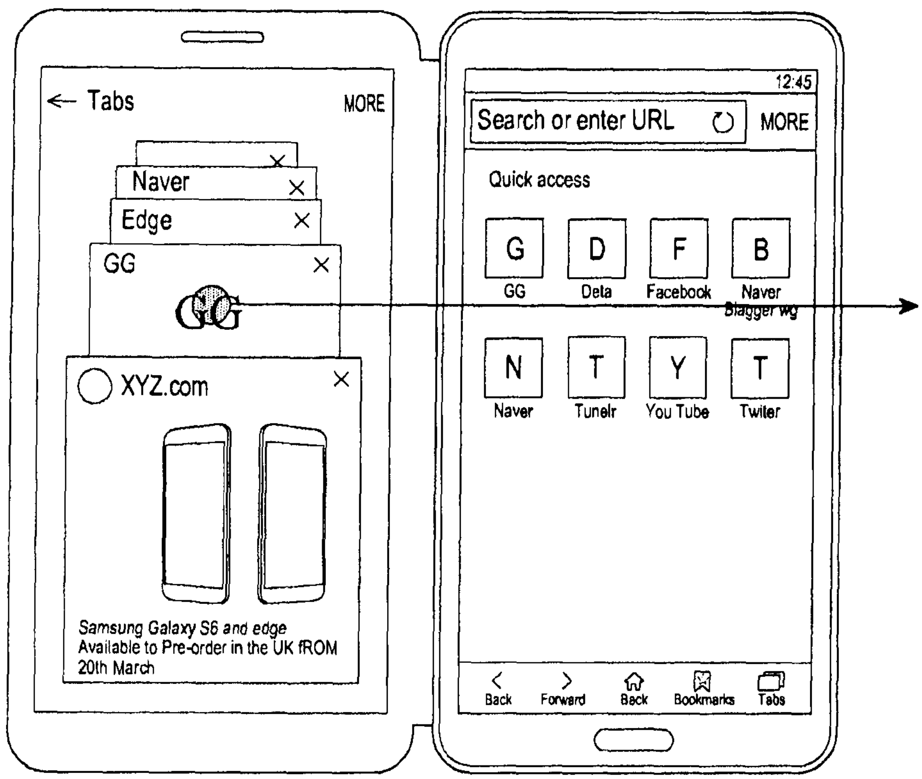
Figure 240B:
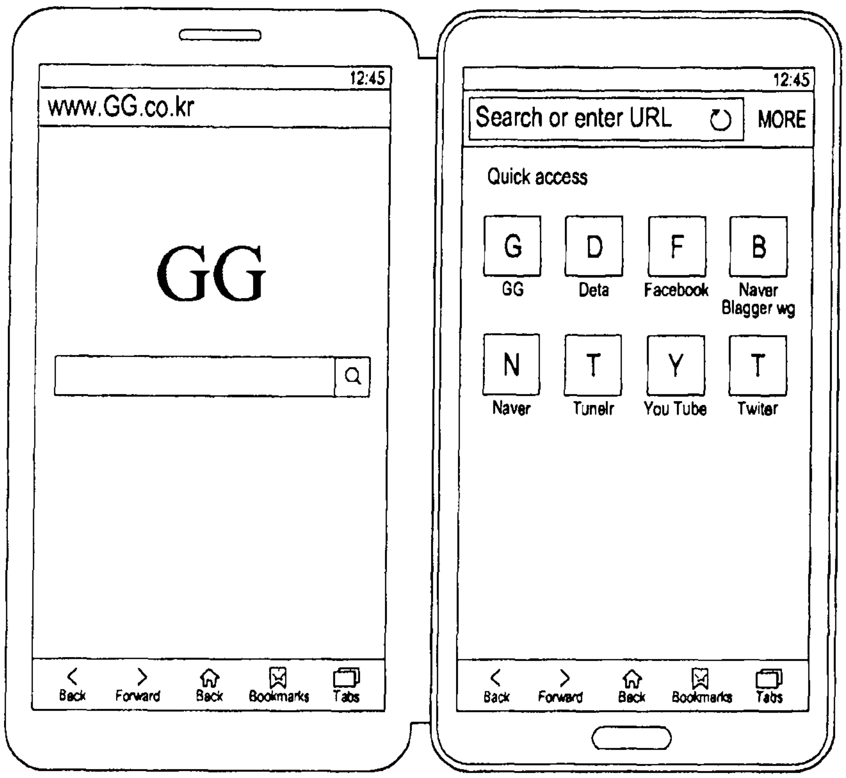

Referring to FIG. 240*a*, according to an embodiment of the present disclosure, the electronic device may display an initial running screen of the web browser application on the main display and a screen corresponding to the tab function on the sub display. Specifically, the electronic device may display web browser application running screens previously displayed on the main display. The electronic device may detect a designation of any one of the items on the screen corresponding to the tab function. Upon detecting the designation of one item, the electronic device, according to an embodiment of the present disclosure, may display the designated web browser application running screen on the sub display as shown in FIG. 240*b*. The electronic device may maintain the execution screen on the main display independently from the above-described operation.

Figure 241A:
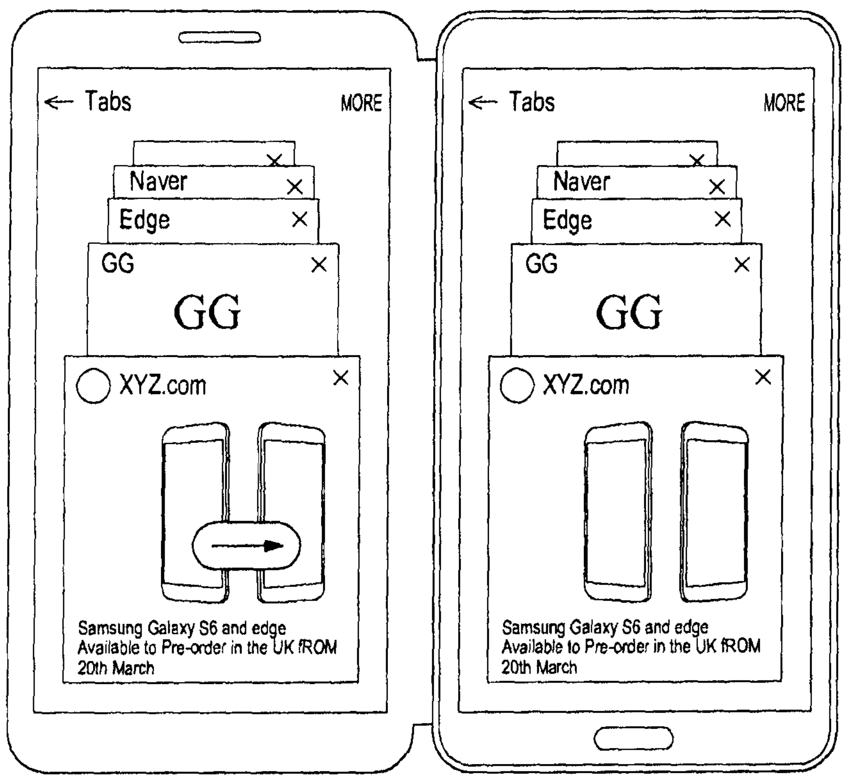
Figure 241B:
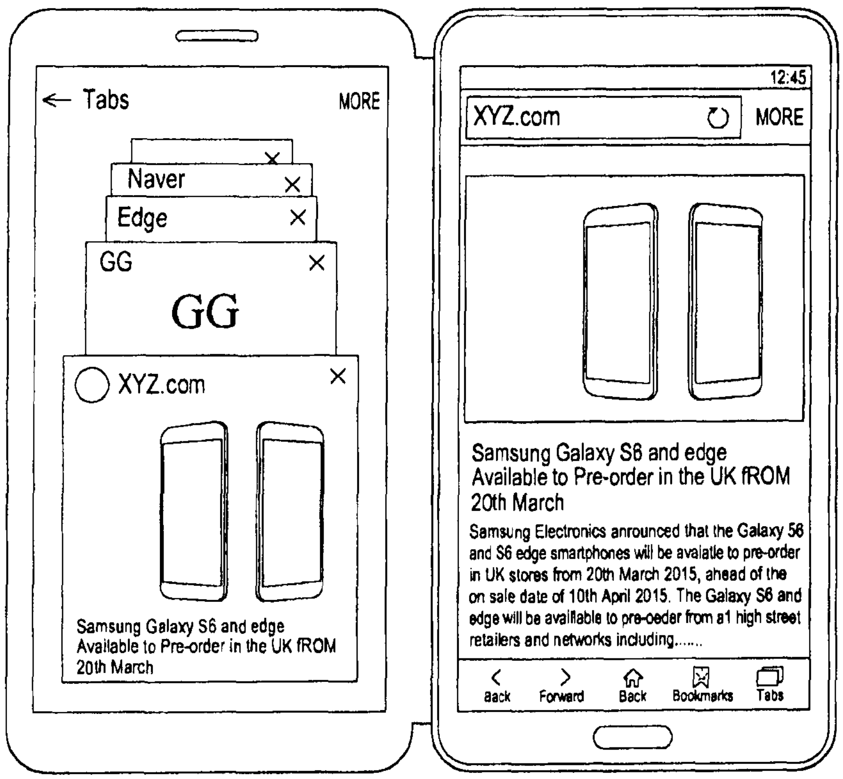

Referring to FIG. 241*a*, according to an embodiment of the present disclosure, the electronic device may display a screen corresponding to the tab function of the web browser application on the main display and a screen corresponding to the tab function of the web browser application on the sub display. That is, the electronic device may display, in the dual mode, the screens corresponding to the tab function of the web browser application. According to an embodiment of the present disclosure, upon detecting a designation of one item on the screen corresponding to the tab function on the main display, the electronic device may display a designated application running screen as shown in FIG. 241*b*.

4.10.5. Description of Usage of Sub Display

Figure 242:
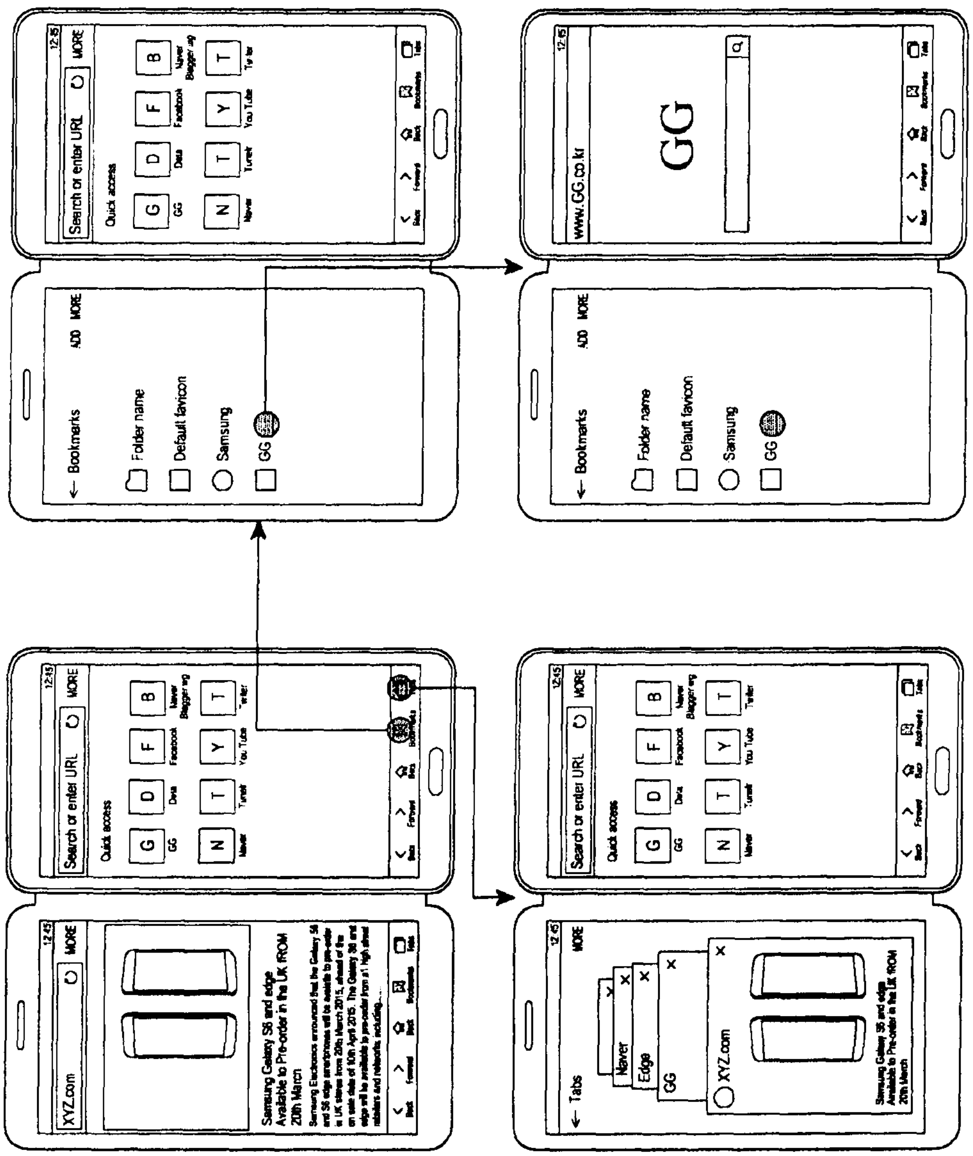

Referring to the upper and left side of FIG. 242, according to an embodiment of the present disclosure, the electronic device may display an execution screen of the web browser application, e.g., a screen linked to a particular URL, on the sub display and an initial screen of the web browser application on the main display. Meanwhile, upon detecting a designation of the bookmark function key on the main display, the electronic device may display a sub display bookmark screen as shown in FIG. 242. Meanwhile, upon detecting a designation of one item on the bookmark, the electronic device may display an application running screen corresponding to the designated item on the main display as shown on the lower and right side of FIG. 242. In the embodiment of FIG. 242, the electronic device may display a screen corresponding to a function key on the sub display and a screen related to a selection on the screen corresponding to the function key on the main display. Meanwhile, upon detecting a designation of the tab function key at an upper and left side of FIG. 242, the electronic device may display the screen corresponding to the tab function as shown on the lower and left side of FIG. 242.

4.11. Description of Lock Screen 4.11.1. Overview of Lock Screen

According to an embodiment of the present disclosure, the electronic device controls a display in the off state, and upon detecting a particular event, the electronic device may switch the display into the on state. For example, upon detecting a press on the home key or a touch on the display, the electronic device may control the off-state display in the on state. In this case, the electronic device may display a lock screen on the display controlled in the on state. The electronic device may run a lock function for security. The lock screen may include a UI requesting entry of security information, e.g., a password or pattern. Alternatively, the lock screen may not include a UI requesting entry of security information.

Figure 243A:
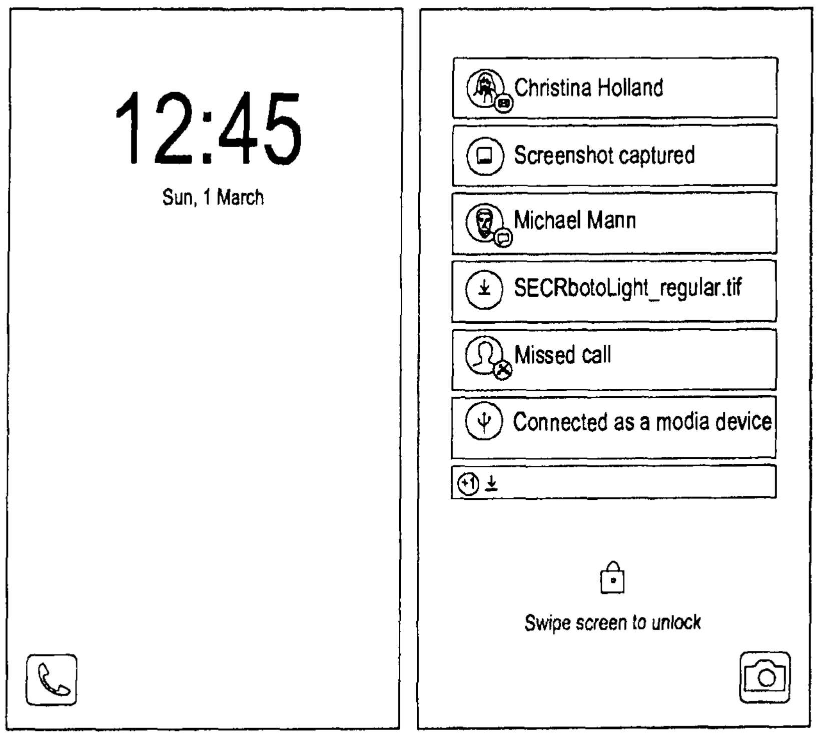
FIGS. 243*a* to 249 are concept views illustrating a lock screen according to an embodiment of the present disclosure.

Referring to FIG. 243*a*, according to an embodiment of the present disclosure, the electronic device in the outspread mode may display a first lock screen on the sub display and a second lock screen on the main display. The first lock screen may contain current time, weather, or other information. The second lock screen may include notifications indicating events generated from various applications and may include an unlock function key.

Figure 243B:
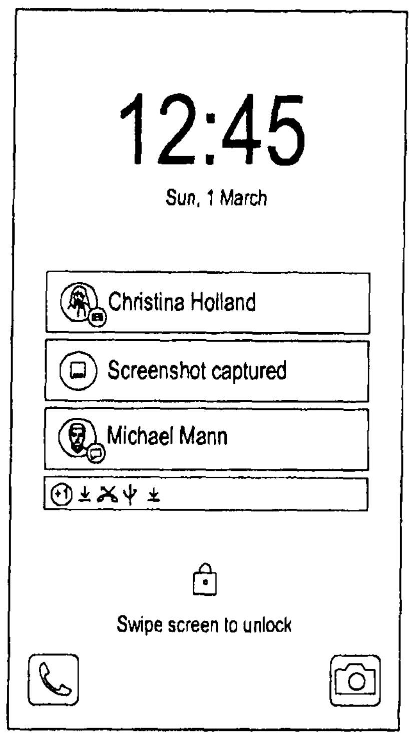

Referring to FIG. 243*b*, according to an embodiment of the present disclosure, the electronic device may display a third lock screen on the active display in the folded mode. The third lock screen may include notifications indicating events generated from various applications, together with current time, weather, or other information, or the third lock screen may be implemented to include an unlock function key together with the notifications.

4.11.2. Description of Form Type Change

Figure 244:
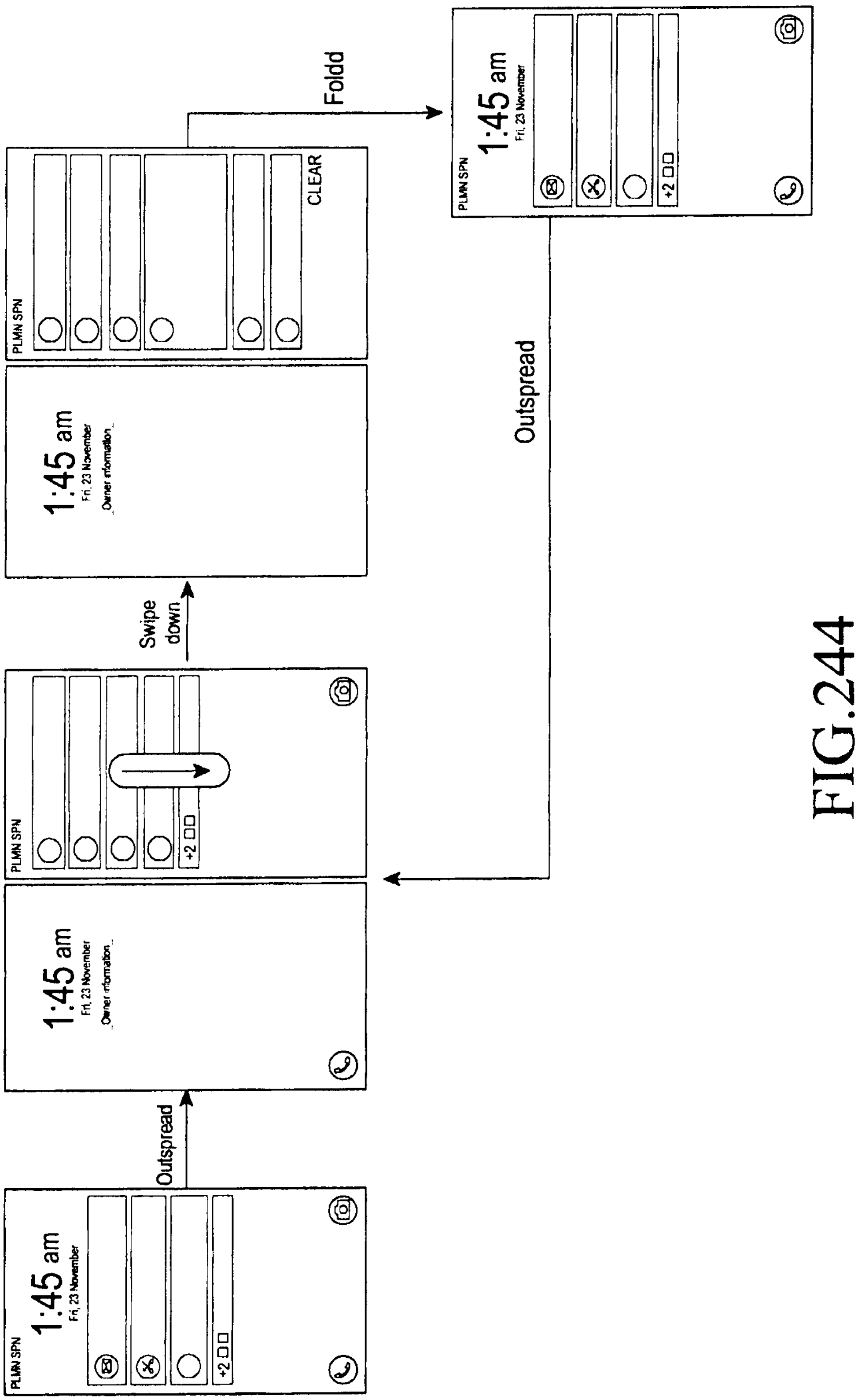

Referring to FIG. 244, according to an embodiment of the present disclosure, the electronic device in the folded mode may display the third lock screen on the active display (e.g., the main display). As described above, the third lock screen may include notifications indicating events generated from various applications, together with current time, weather, or other information, or the third lock screen may include an unlock function key together with the notifications. The electronic device may detect a change in form type between the folded mode to the outspread mode. In the outspread mode, the electronic device may display, on the main display, the second lock screen instead of the third lock screen. The second lock screen may include notifications indicating events generated from various applications and may include an unlock function key. The electronic device may control the inactive display (e.g., the sub display) and display the first lock screen. The first lock screen may contain current time, weather, or other information.

The electronic device may detect a designation of a notification on the second lock screen. For example, as shown in FIG. 244, the electronic device may detect a downward drag gesture for one notification on the second lock screen, and in response, display a detail view for the designated notification. In this case, the electronic device may detect a change of the form type from the outspread mode to the folded mode. In response to the detection, the electronic device may substitute the third lock screen for the second lock screen and display the third lock screen on the active display (e.g., the main display). Upon detecting a change of the form type from the folded mode back to the outspread mode, the electronic device may display, on the main display, the second lock screen instead of the third lock screen.

4.11.3. Description of Display On/Off

Figure 245:
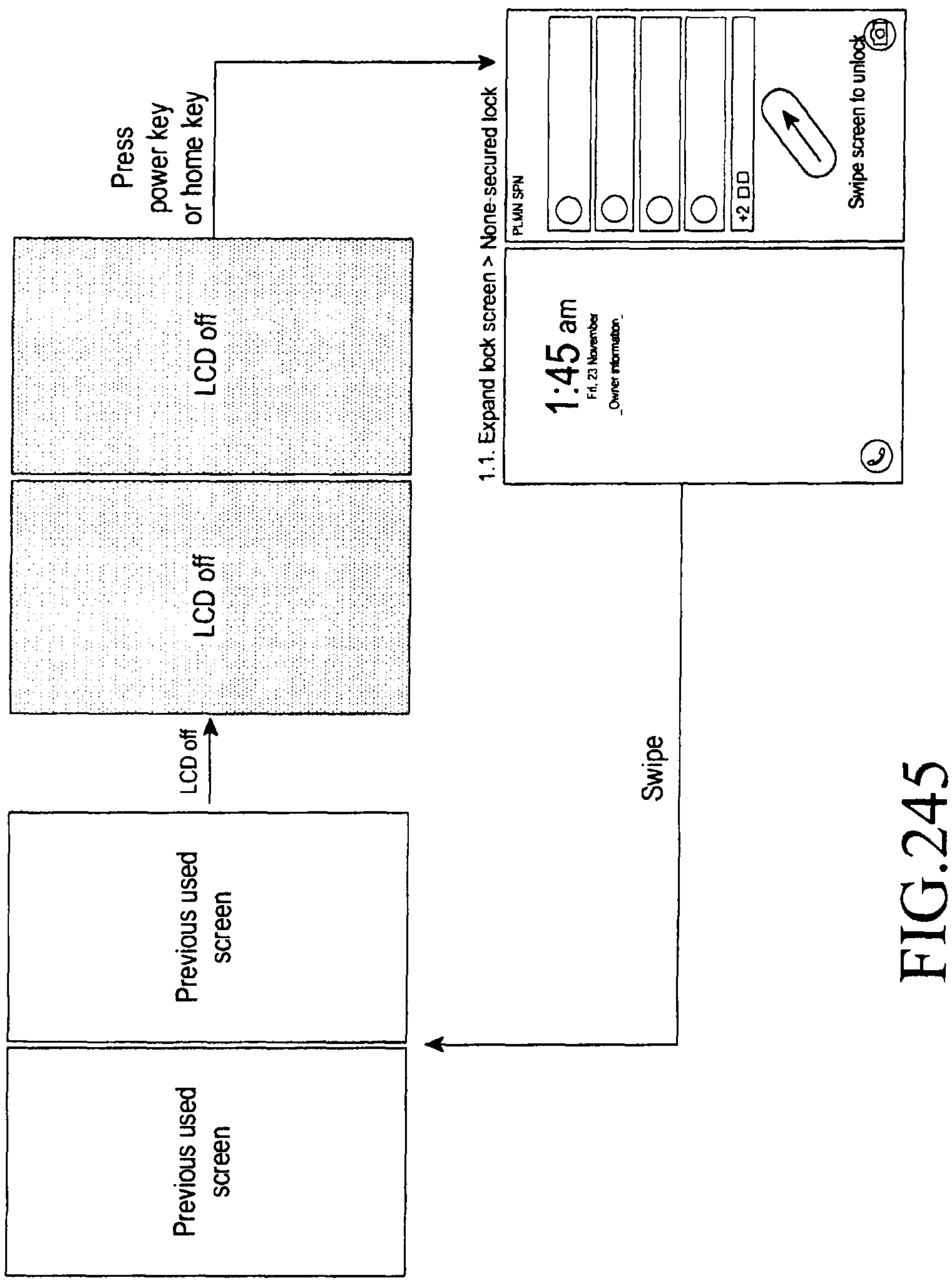

Referring to FIG. 245, according to an embodiment of the present disclosure, the electronic device may display a previously used screen on the sub display and a previously used screen on the main display. The electronic device may control both the displays in the off state. Further, the electronic device may detect a press on the power key or home key and may, in response, control both the displays in the on state. The electronic device may display the first lock screen on the sub display and the second lock screen on the main display. The electronic device may detect an input (e.g., a swipe) for unlocking on the second lock screen, and in response, the electronic device may display the previously used screens on the sub display and the main display, respectively.

4.12. Description of Wall Paper 4.12.1. Overview of Wall Paper

Figure 246:
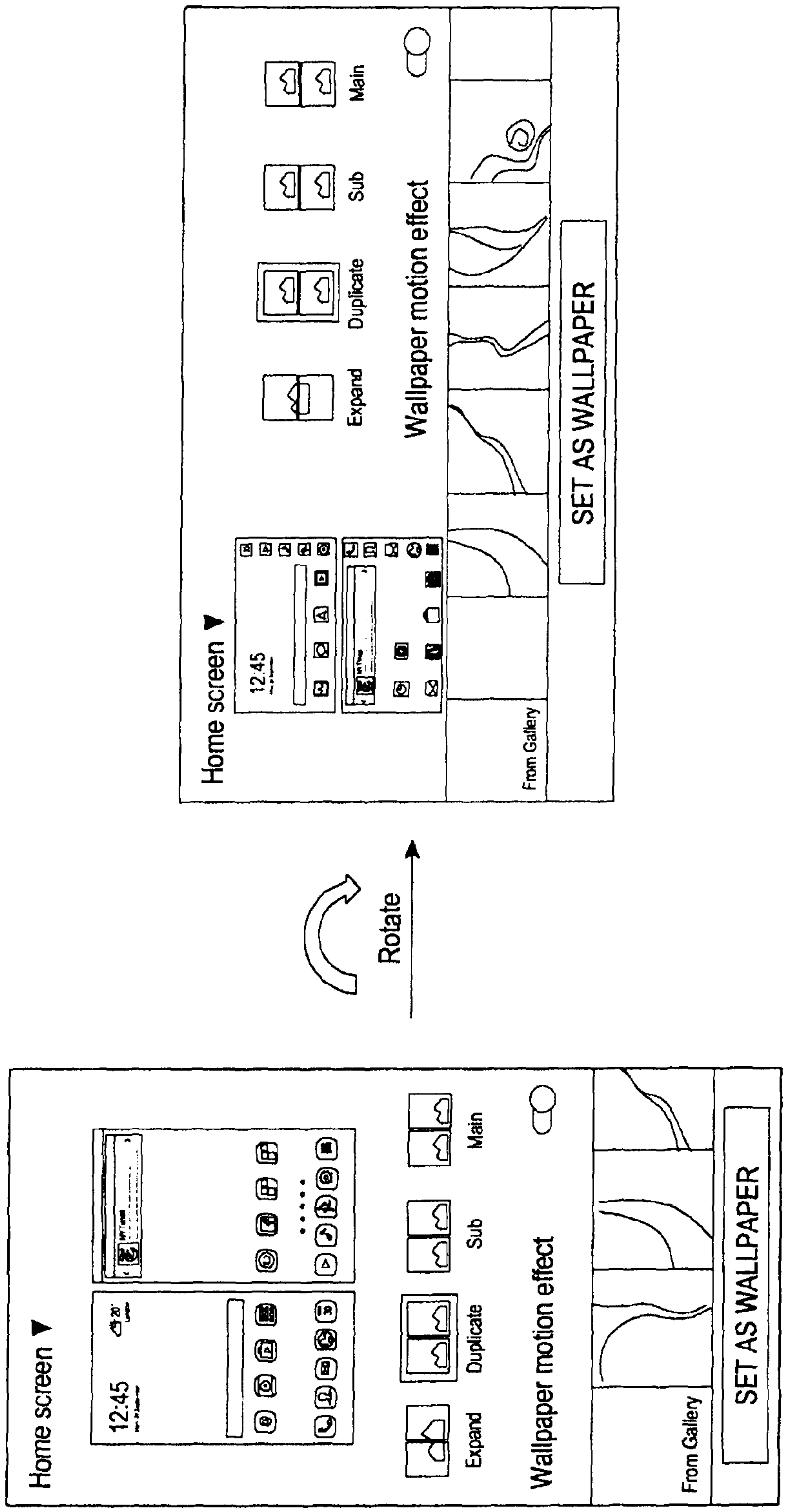

Referring to the left side of FIG. 246, according to an embodiment of the present disclosure, the electronic device may display a screen for setting a wall paper in the portrait mode. The electronic device may provide a UI for wallpaper settings per mode (e.g., expand, duplicate, sub display alone, or main display alone mode) Further, the electronic device may display candidate wallpapers. Referring to the right side of FIG. 246, the electronic device may display a screen for setting a wall paper in the landscape mode. While displaying the screen for wallpaper settings in the portrait mode, the electronic device may detect a rotation of the electronic device, and in response, display the screen for wallpaper settings in the landscape mode.

Figure 247:
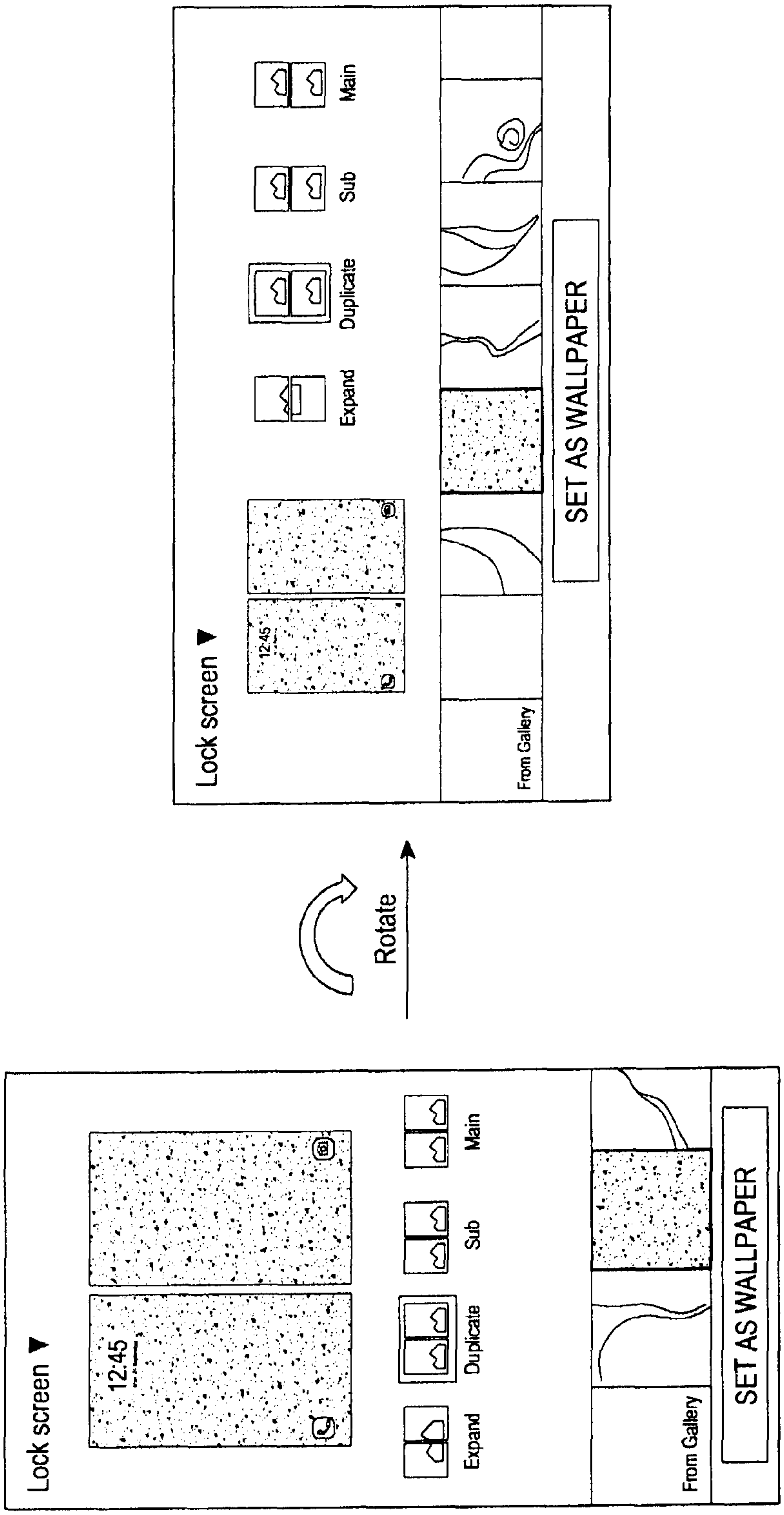

Referring to FIG. 247, according to an embodiment of the present disclosure, the electronic device may previously display a candidate wallpaper-applied screen for each of the portrait mode and the landscape mode. That is, upon detecting a selection of one of the candidate wallpapers displayed on the lower portion of the display, the electronic device may previously display an example to which the selected candidate wallpaper has applied (e.g., an example of application in the expand mode), helping the user's final choice. Upon detecting a rotation of the electronic device, the electronic device may switch between the landscape mode wallpaper setting screen and the portrait mode wallpaper setting screen and display the changed wallpaper setting screen.

4.12.2. Overview of Wall Paper Setting

Figure 248:
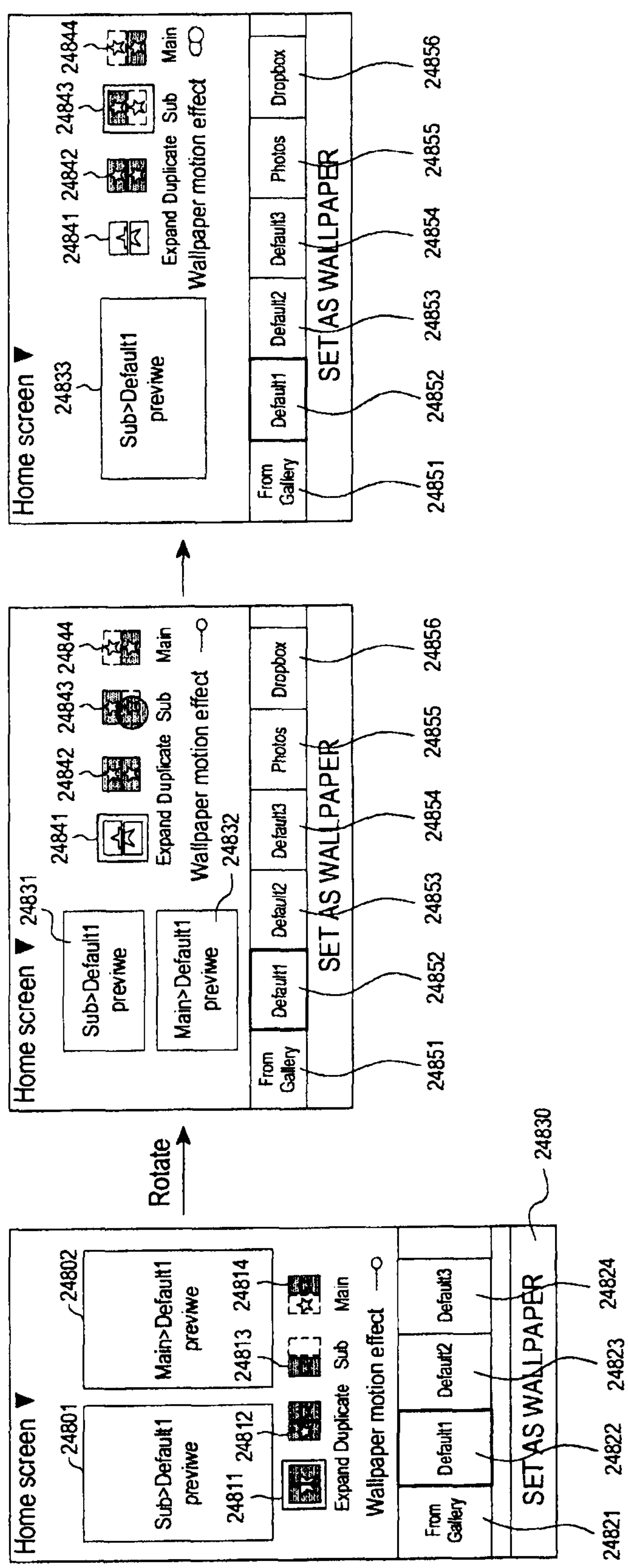

As shown on the left side of FIG. 248, according to an embodiment of the present disclosure, the electronic device may display a wallpaper setting screen including previews 24801 and 24802 for wallpaper-applied results, candidate modes 24811 to 24814 to which the wallpaper is to be applied, and candidate wallpapers 24821 to 24824. Upon selection of one of the candidate modes 24811 to 24814 to which the wallpaper is to be applied, the electronic device may reflect the selected candidate to the wallpaper-applied previews. For example, in the embodiment shown on the left side of FIG. 248, the electronic device may detect selection of the expand mode among the candidate modes 24811 to 24814 of application of the wallpaper, and the electronic device may thus display two display screens 24801 and 24802, as previews, according to the expand mode. Meanwhile, upon selection of one of the candidate wallpapers 24821 to 24824, the electronic device may reflect the selected candidate to the wallpaper-applied previews. For example, in the embodiment shown on the left side of FIG. 248, the electronic device may detect selection of a first default image (Default1) among the candidate wallpapers 24821 to 24824, and the electronic device may thus display the first default image on the two display screens 24801 and 24802 according to the expand mode.

Meanwhile, upon detecting a rotation of the electronic device, the electronic device may display the wallpaper setting screen in the landscape mode as shown on the middle of FIG. 248. The landscape mode wallpaper setting screen may include the previews 24831 and 24832 of application of wallpaper, candidate modes 24841 to 24844 of application of the wallpaper, and candidate wallpapers 24851 to 24856. Upon entry into the landscape mode, the electronic device may display more candidate wallpapers 24851 to 24856 than in the portrait mode. The electronic device may detect selection of the 'sub display alone' mode 24843 among the candidate modes 24841 to 24844 of application of the wallpaper. In response, the electronic device may change the preview 24833 of applied wallpaper into the 'sub display alone' mode as shown on the right side of FIG. 248. Further, the electronic device may apply the selected first default image 24852 to the preview 24833 of applied wallpaper.

Figure 249:
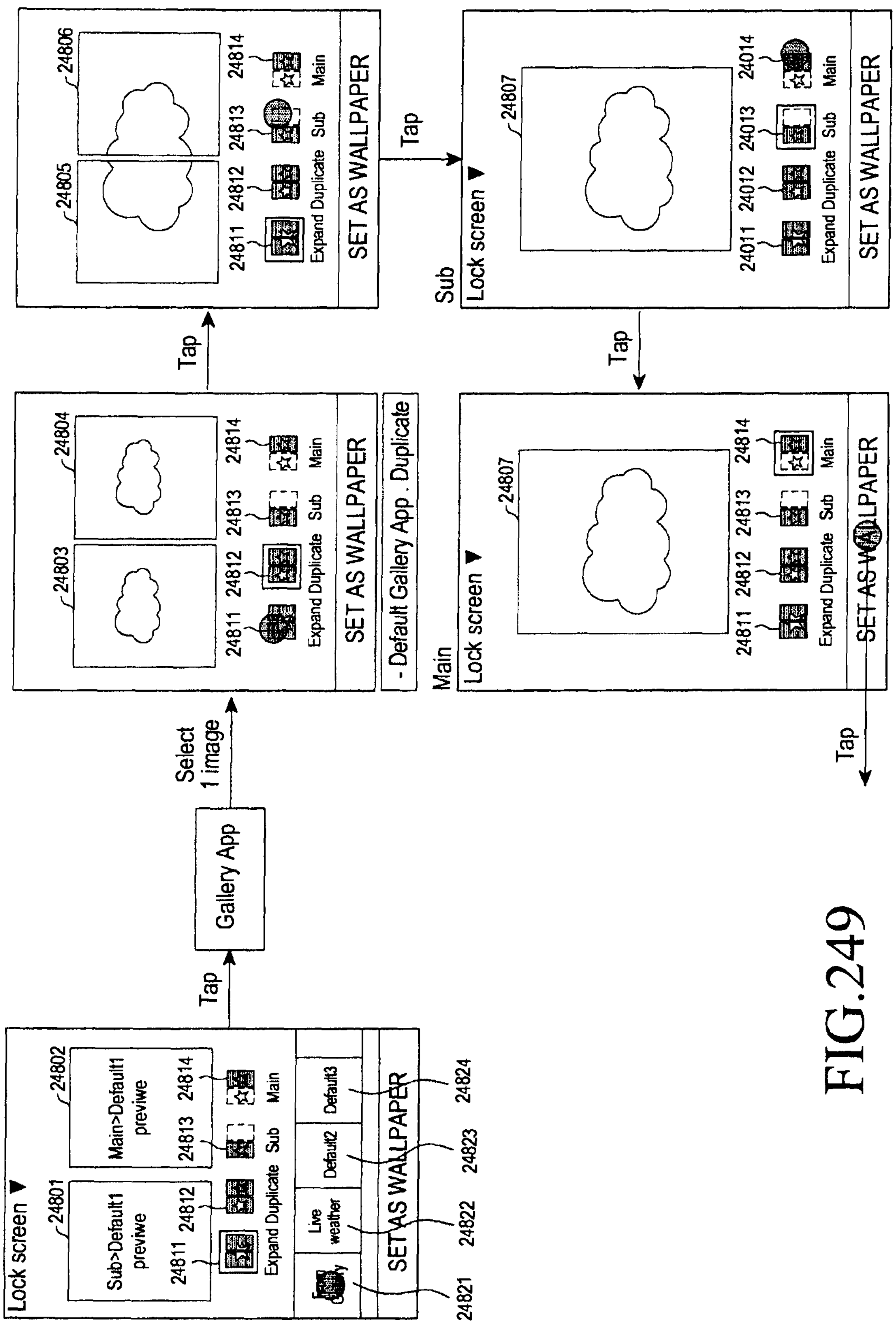

Referring to FIG. 249, according to an embodiment of the present disclosure, the electronic device may detect selection of a gallery application 24821 as a candidate wallpaper. The electronic device may display an execution screen of the gallery application and receive a selection of one image. The electronic device may display wallpaper-applied previews 24803 and 24804 including the selected image. In this case, the electronic device may detect the selection of the duplicate mode 24812 among the modes of application of the wallpaper. Accordingly, the electronic device may display the wallpaper-applied previews 24803 and 24804 including the same image on the main display and the sub display.

Meanwhile, upon detecting selection of the expand mode 24811, the electronic device may display wallpaper-applied previews 24805 and 24806 enabling the selected image to be displayed on both the displays. Meanwhile, upon detecting selection of the 'main display alone' mode 24814, the electronic device may display, on the main display, the wallpaper-applied preview 24807 indicating the selected display, together with a visual effect indicating that the 'main display alone' mode 24814 has been designated. Finally, upon detecting a designation of the 'set as wallpaper' button, the electronic device may set the wallpaper as the selected one.

4.13. Description of Gallery Application

Figure 250:
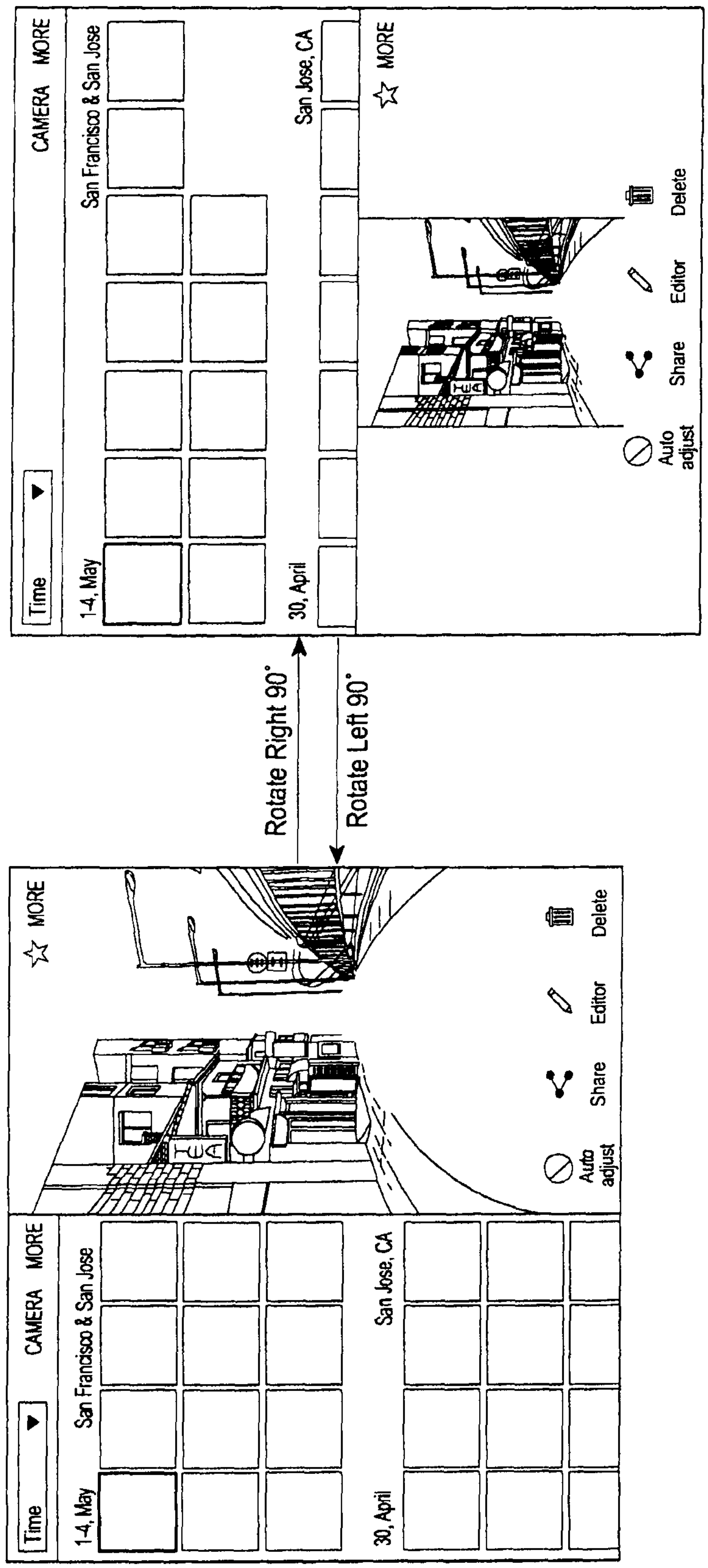
FIGS. 250 and 251 are concept views illustrating a gallery application according to an embodiment of the present disclosure.

Referring to the left side of FIG. 250, according to an embodiment of the present disclosure, the electronic device may display an execution screen of the gallery application in the portrait mode of the outspread modes. The electronic device may display a list of images stored on the sub display. For example, the electronic device may sort and display the images per date or place where they have been captured. The electronic device may display, on the full screen of the main display, an item (i.e., an image) selected from among the items in the list displayed on the sub display. Meanwhile, referring to the right side of FIG. 250, the electronic device may display an execution screen of the gallery application in the landscape mode of the outspread modes. The electronic device may display a list of images stored on the sub display. The electronic device may display an item, i.e., image, selected from the list, on the full screen of the main display. In this case, the electronic device may display the image in the landscape mode.

Figure 251:
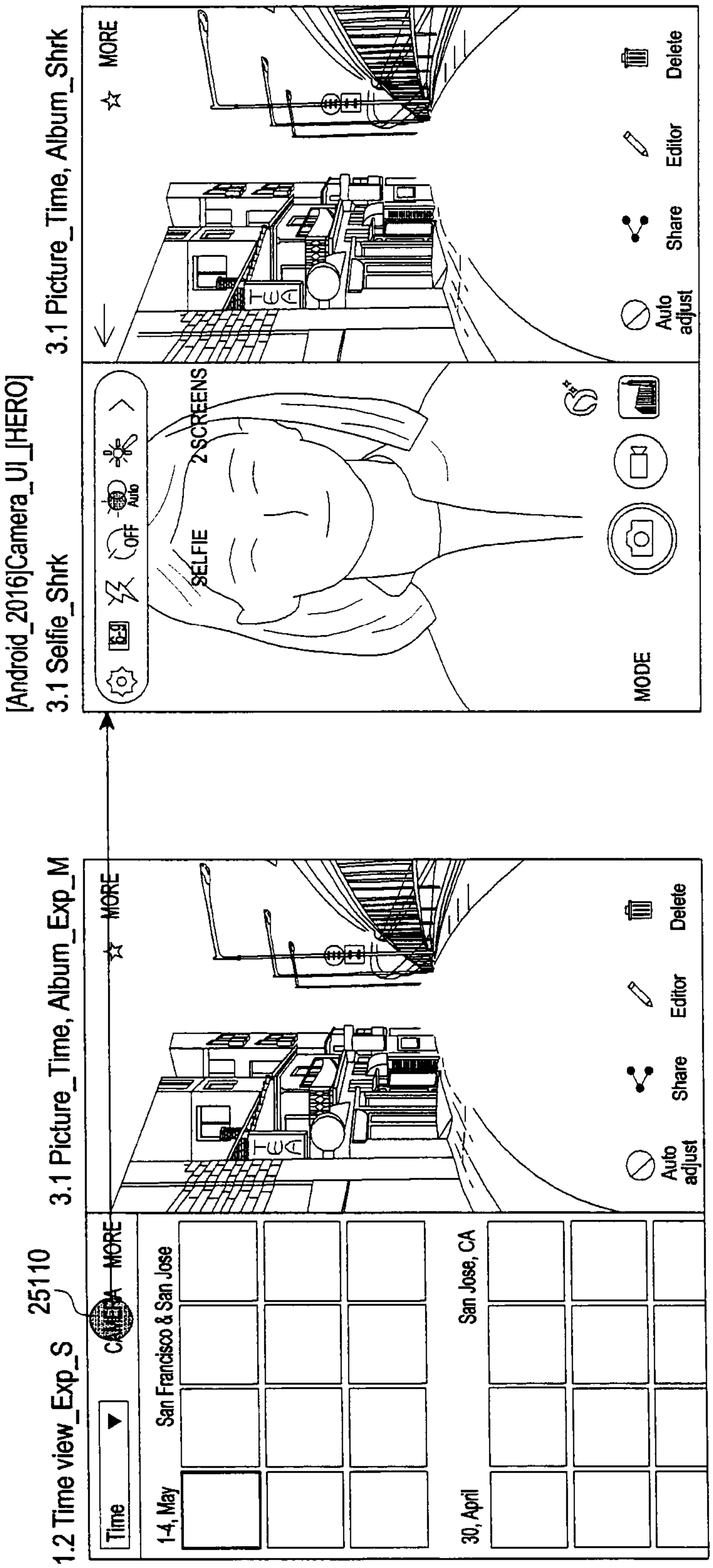

Referring to FIG. 251, according to an embodiment of the present disclosure, the electronic device may display a switch button 25110 for switching into the camera application on the sub display. Upon detecting a designation of the switch button 25110, the electronic device may display an execution screen of the camera application on the sub display. Further, the electronic device may maintain the screen displayed on the main display.

Figure 252:
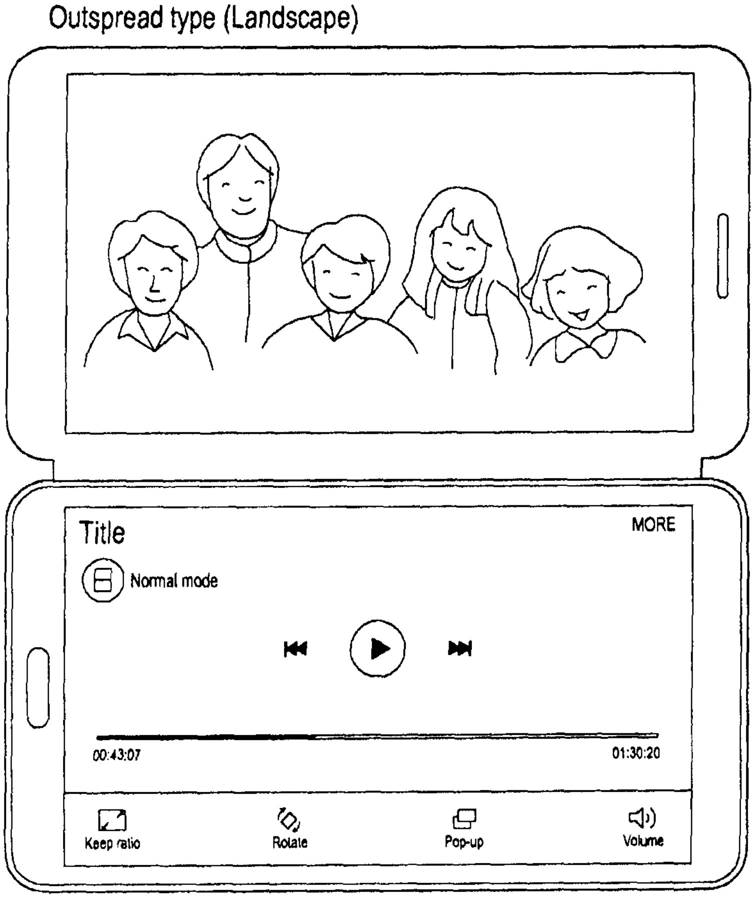
FIGS. 252 to 257 are concept views illustrating a video application according to an embodiment of the present disclosure.

4.14. Description of Video Application 4.14.1. Overview of Video Application Running Screen Referring to FIG. 252, according to an embodiment of the present disclosure, the electronic device may run the video application and display an execution screen of the video application. For example, the electronic device may display a video screen on the sub display and a controller screen for controlling the video on the main display. The controller screen may include various function keys, such as play, fast-forward, rewind, status bar, and playtime buttons. Upon designating at least one of the function keys displayed on the main display, the electronic device may control the video play in response to the function key and display the controlled video screen on the sub display.

Figure 253:
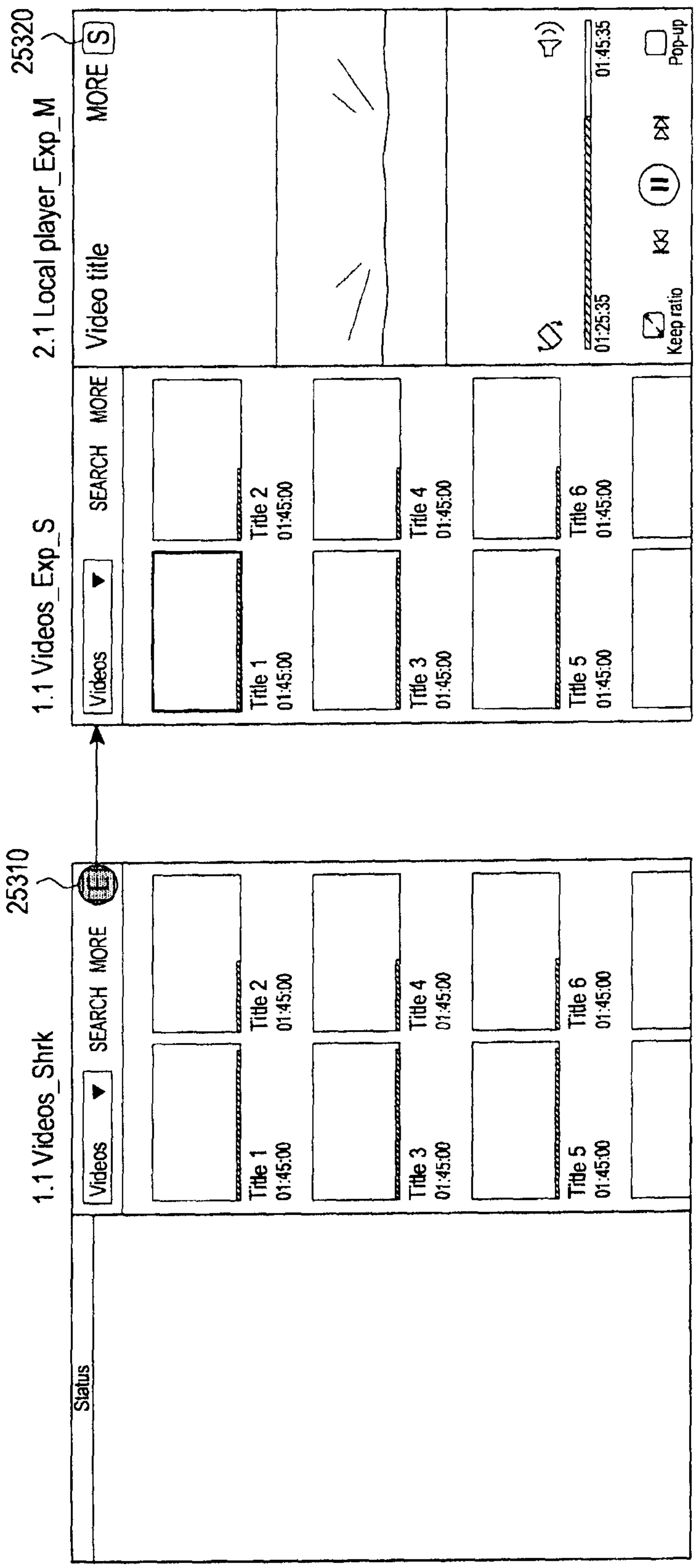

4.14.2. Description of Shrunken Running Screen and Expanded Running Screen of Video Application Referring to FIG. 253, according to an embodiment of the present disclosure, the electronic device may display a shrunken running screen of the video application on the main display. The electronic device may display another screen on the sub display. Meanwhile, the electronic device may display an expand function key 25310 on the shrunken running screen of the video application. Upon detecting a designation of the expand function key 25310, the electronic device may display the expanded running screen of the video application on both the displays. The electronic device may display a video file list on the sub display and a video play screen on the main display. Meanwhile, the electronic device may display a shrink function key 25320 on the main display, and upon detecting a designation of the shrink function key 25320, the electronic device may display the shrunken running screen back on the main display.

Figure 254:
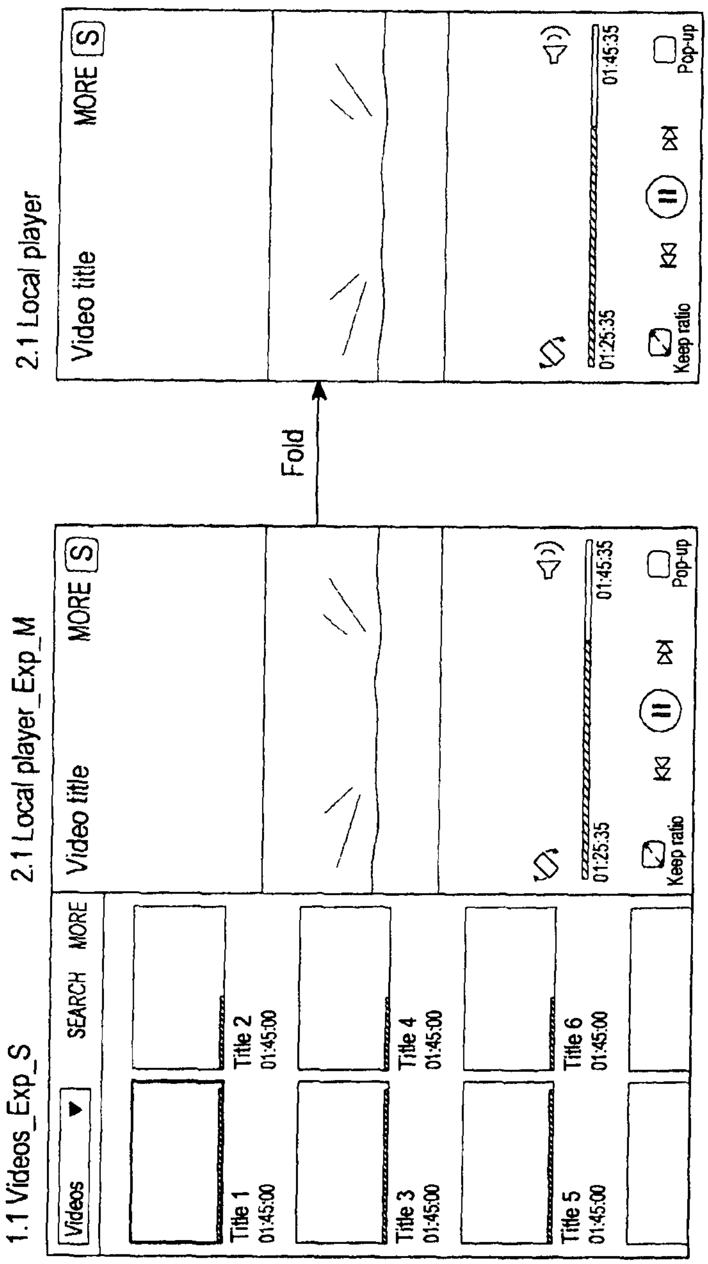

Referring to FIG. 254, according to an embodiment of the present disclosure, the electronic device in the outspread mode may display the expanded running screen of the video application on both the displays. Meanwhile, the electronic device may detect a change in form type from the outspread mode to the folded mode. In response to the form type change into the folded mode, the electronic device may display the video play screen on the active display and stops displaying the video file list.

Figure 255:
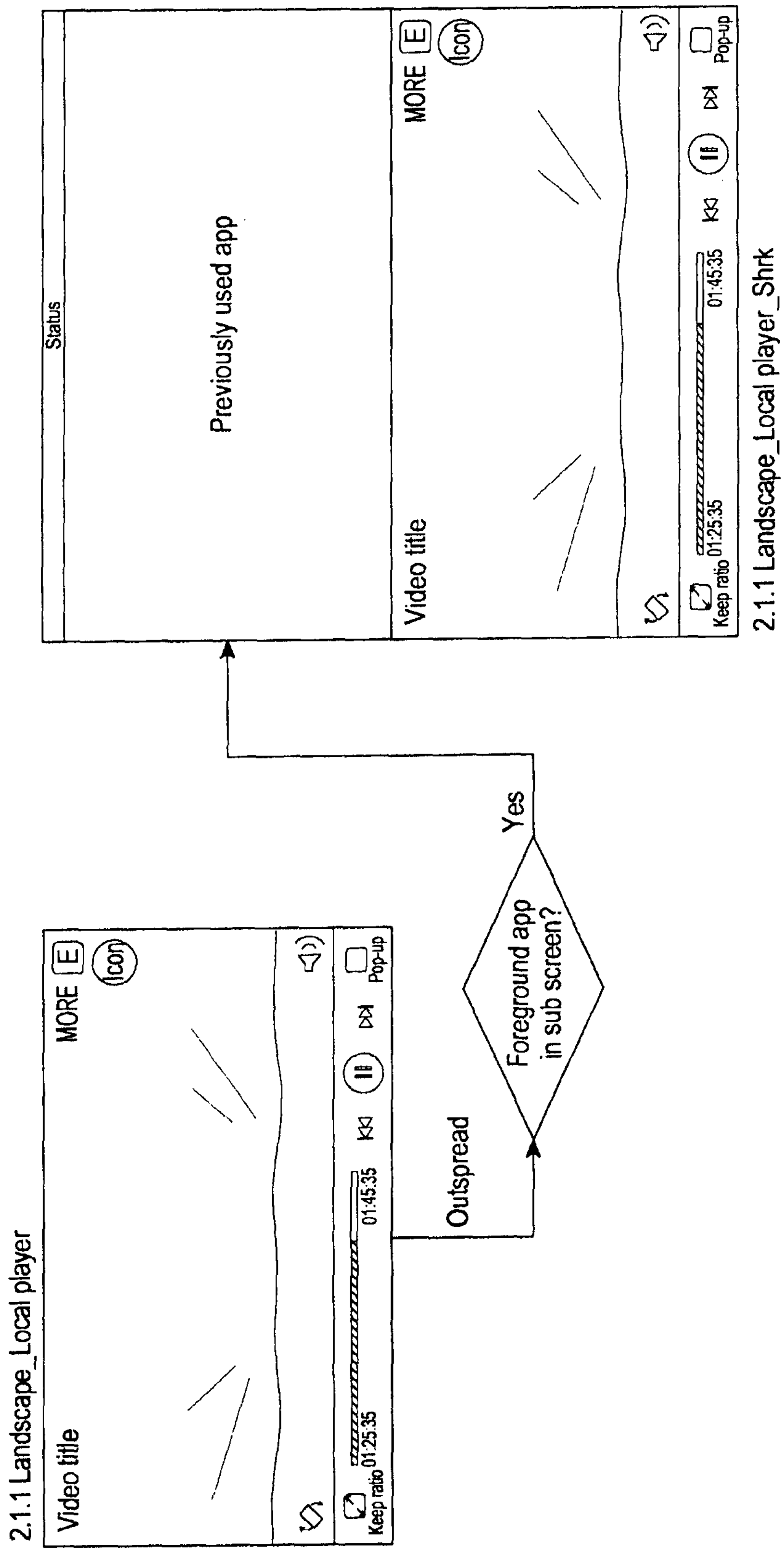

Referring to FIG. 255, according to an embodiment of the present disclosure, the electronic device may display the shrunken running screen (e.g., video play screen) of the video application on the main display in the landscape mode of the folded modes. Meanwhile, the electronic device may detect a change in form type between the folded mode to the outspread mode. The electronic device may determine whether the screen used to be displayed on the foreground was present on the sub display used to be the inactive display. When the existing screen was displayed, the electronic device may display the existing screen on the sub display while displaying the video play screen on the main display. When the existing screen was not displayed, the electronic device may display the video play screen on the sub display while displaying the controller screen for controlling video play on the main display.

Figure 256:
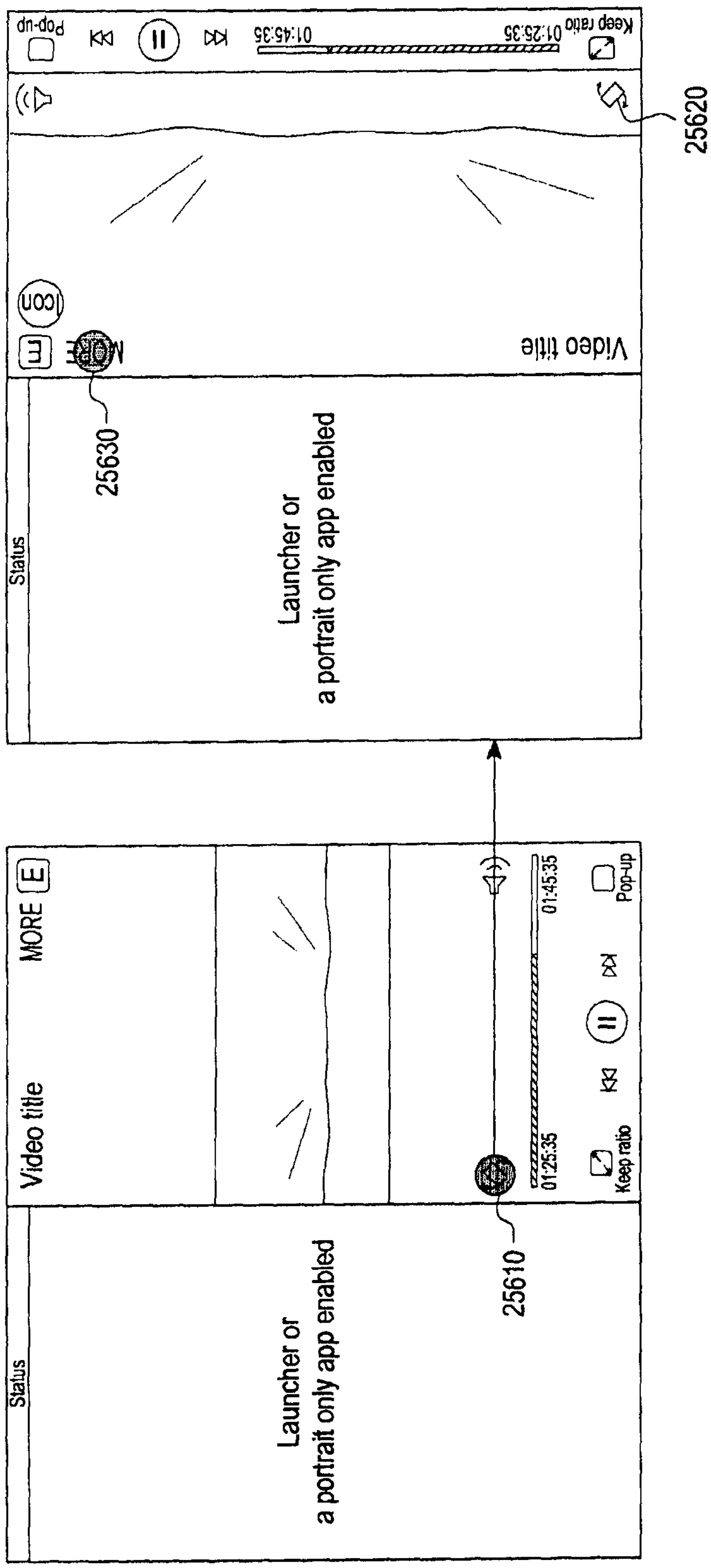

Referring to FIG. 256, according to an embodiment of the present disclosure, the electronic device may display the video play screen on the main display in the portrait mode of the outspread modes. Meanwhile, the electronic device may display, on the sub display, a screen (e.g., a launcher screen or portrait mode running screen) different from the execution screen of the video application. The electronic device may display a screen function key 25610 on the video play screen. Upon detecting a designation of the rotation function key 25610, the electronic device may rotate and display the video play screen. In this case, the electronic device may maintain the portrait mode display for the screen displayed on the sub display. The electronic device may display a rotation function key 25620 on the rotated video play screen, and upon detecting a designation, the electronic device may rotate and display the video play screen. The electronic device may further display an additional function key 25630 through which the electronic device may provide various functions.

Figure 257:
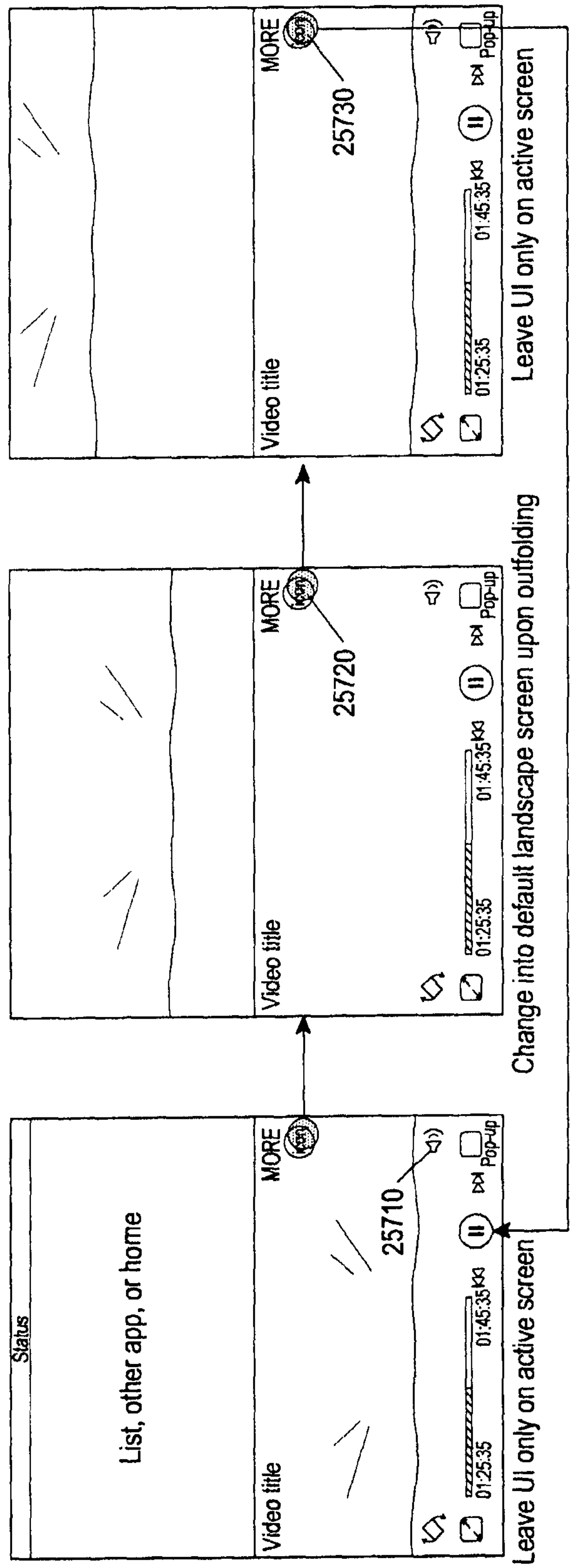

Referring to FIG. 257, according to an embodiment of the present disclosure, the electronic device in the landscape mode may display, on the sub display, a screen (e.g., a video file list or another application running screen) different from the video play screen. The electronic device may display the video play screen on the main display. The mode shown on the left side of FIG. 257 may be denoted a view mode. Meanwhile, upon detecting a designation of a switch mode function key 25710, the electronic device may switch the mode into an engross mode. In the engross mode, the electronic device may display the video play screen on the sub display and the controller screen for controlling video play on the main display. The electronic device may detect a swipe gesture of the switch mode function key 25720, and in response, the electronic device may switch the mode into a share mode. In the share mode, the electronic device may display the video play screen on both the sub display and the main display. The electronic device may detect a swipe gesture of the switch mode function key 25730, and in response, the electronic device may switch the mode back into the view mode.

Figure 258:
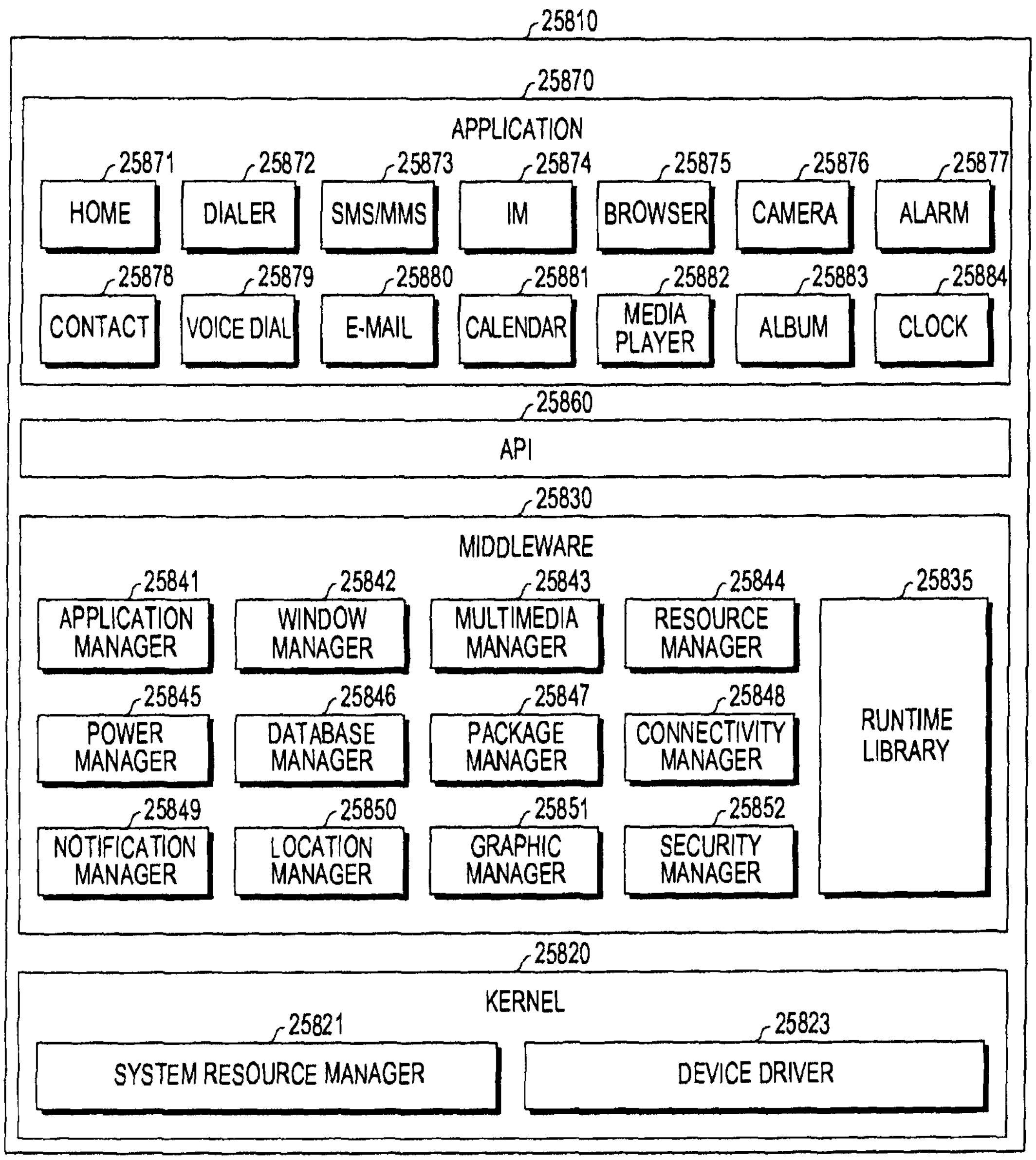
FIG. 258 is a block diagram illustrating a program module according to an embodiment of the present disclosure.

FIG. 258 is a block diagram illustrating a program module according to an embodiment of the present disclosure. According to an embodiment of the present disclosure, the program module 25810 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™. Referring to FIG. 3, the program module 25810 may include a kernel 25820 (e.g., the kernel 141), middleware 25830 (e.g., the middleware 143), an API 25860 (e.g., the API 145), and/or an application 25870 (e.g., the application program 147). At least a part of the program module 25810 may be preloaded on the electronic device or may be downloaded from an external electronic device (e.g., the electronic devices 102 and 104 or server 106).

The kernel 25820 may include, e.g., a system resource manager 25821 or a device driver 25823. The system resource manager 25821 may perform control, allocation, or recovery of system resources. According to an embodiment of the present disclosure, the system resource manager 25821 may include a process managing unit, a memory managing unit, or a file system managing unit. The device driver 25823 may include, e.g., a display driver, a camera driver, a Bluetooth driver, a shared memory driver, a USB driver, a keypad driver, a Wi-Fi driver, an audio driver, or an inter-process communication (IPC) driver. The middleware 25830 may provide various functions to the application 25870 through the API 25860 so that the application 25870 may use limited system resources in the electronic device or provide functions jointly required by applications 25870. According to an embodiment of the present disclosure, the middleware 25830 may include at least one of a runtime library 25835, an application manager 25841, a window manager 25842, a multimedia manager 25843, a resource manager 25844, a power manager 25845, a database manager 25846, a package manager 25847, a connectivity manager 25848, a notification manager 25849, a location manager 25850, a graphic manager 25851, or a security manager 25852.

The runtime library 25835 may include a library module used by a compiler in order to add a new function through a programming language while, e.g., the application 25870 is being executed. The runtime library 25835 may perform input/output management, memory management, or arithmetic function processing. The application manager 25841 may manage the life cycle of, e.g., the applications 25870. The window manager 25842 may manage GUI resources used on the screen. The multimedia manager 25843 may grasp formats necessary to play media files and use a codec appropriate for a format to perform encoding or decoding on media files. The resource manager 25844 may manage the source code or memory space of the application 25870. The power manager 25845 may manage, e.g., the battery capability or power and provide power information necessary for the operation of the electronic device. According to an embodiment of the present disclosure, the power manager 25845 may interwork with a basic input/output system (BIOS). The database manager 25846 may generate, search, or vary a database to be used in the applications 25870. The package manager 25847 may manage installation or update of an application that is distributed in the form of a package file.

The connectivity manager 25848 may manage, e.g., wireless connectivity. The notification manager 25849 may provide an event, e.g., arrival message, appointment, or proximity alert, to the user. The location manager 25850 may manage, e.g., locational information on the electronic device. The graphic manager 25851 may manage, e.g., graphic effects to be offered to the user and their related user interface. The security manager 25852 may provide system security or user authentication, for example. According to an embodiment of the present disclosure, the middleware 25830 may include a telephony manager for managing the voice or video call function of the electronic device or a middleware module able to form a combination of the functions of the above-described elements. According to an embodiment of the present disclosure, the middleware 25830 may provide a module specified according to the type of the operating system. The middleware 25830 may dynamically omit some existing components or add new components. The API 25860 may be a set of, e.g., API programming functions and may have different configurations depending on operating systems. For example, in the case of Android or iOS, one API set may be provided per platform, and in the case of Tizen, two or more API sets may be offered per platform.

The application 25870 may include an application that may provide, e.g., a home 25871, a dialer 25872, an SMS/MMS 25873, an instant message (IM) 25874, a browser 25875, a camera 25876, an alarm 25877, a contact 25878, a voice dial 25879, an email 25880, a calendar 25881, a media player 25882, an album 25883, or a clock 25884, a healthcare (e.g., measuring the degree of workout or blood sugar), or provision of environmental information (e.g., provision of air pressure, moisture, or temperature information). According to an embodiment of the present disclosure, the application 25870 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 25870 may include an application (e.g., a healthcare application of a mobile medical device) designated according to an attribute of the external electronic device. According to an embodiment of the present disclosure, the application 25870 may include an application received from the external electronic device. At least a portion of the program module 25810 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may be interchangeably used with other term, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

The invention claimed is:

1. A mobile apparatus comprising:

a first display disposed on a first surface of a cover;

a second display;

a third display disposed on a second surface of the cover which is a back side of the first surface; and at least one processor configured to:

in response to the mobile apparatus being folded such that the first display and the second display are facing each other, control to activate the third display to display at least one of a current time, a battery status, or at least one notification, wherein the third display is configured to be driven by a power less than a first power for driving the first display and a second power for driving the second display, control the first display and the second display to be inactive while the mobile apparatus is folded, and in response to the mobile apparatus being unfolded such that each of the first display and the second display is facing a direction, control to activate the first display to display a first screen and control to activate the second display to display a second screen, respectively.

2. The mobile apparatus of claim 1, wherein the at least one processor is further configured to:

in response to receiving an input while displaying at least one of the current time, the battery status, or the at least one notification on the third display, control the third display to display another screen.

3. The mobile apparatus of claim 1, wherein the at least one processor is further configured to:

control the first display to display an icon on the first display indicating whether the second display is active.

4. The mobile apparatus of claim 1, wherein the at least one processor is further configured to:

control the first display to display a quick panel including one or more menu items to control content displayed on the second display.

5. The mobile apparatus of claim 1, wherein the at least one processor is further configured to:

control the first display to display a first execution screen related to a first application, control the second display to display a second execution screen related to a second application, in response to an occurrence of a first event while the first execution screen is displayed on the first display, control the first display to display a virtual key pad on a part of the first display together with a part of the first execution screen, and in response to an occurrence of a second event while the part of the first execution screen and the virtual key pad are displayed on the first display, control the first display to display the first execution screen and control the second display to display the virtual key pad.

6. The mobile apparatus of claim 5, wherein the at least one processor is further configured to:

in response to a first user input for selecting a text field included in the first execution screen displayed on the first display, control the first display to display the virtual key pad on the part of the first display, in response to a rotation of the mobile apparatus, control the first display to display the first execution screen and the virtual key pad based on a landscape mode, wherein the virtual key pad displayed based on the landscape mode includes an icon, when selected, configured to cause the virtual key pad to be displayed on the second display, and in response to a second user input selecting the icon, control the first display to display the first execution screen based on the landscape mode and control the second display to display the virtual key pad based on the landscape mode.

7. The mobile apparatus of claim 6, wherein the virtual key pad displayed on the second display comprising a first icon, when selected, configured to cause the virtual key pad to be displayed on the first display;

wherein the at least one processor is further configured to:

in response to a third user input selecting the first icon, control the first display to display the virtual key pad based on the landscape mode.

8. The mobile apparatus of claim 5, wherein the at least one processor is further configured to:

in response to a first user input for selecting a text field included in the first execution screen displayed on the first display, control the first display to display the virtual key pad on the part of the first display, in response to a rotation of the mobile apparatus, control the first display to display the first execution screen based on a landscape mode and control the second display to display the virtual key pad based on the landscape mode.

9. The mobile apparatus of claim 1, wherein the at least one processor is further configured to:

in response to an execution of a first application among a plurality of applications stored in the mobile apparatus, control the first display to display a first execution screen corresponding to the first application including at least one graphic element, and in response to an occurrence of an event for providing a virtual pad, control the second display to display an execution screen of the virtual pad including a plurality of keys for controlling the at least one graphic element included in the first execution screen, wherein the virtual pad is configured to support the first application among the plurality of applications.

10. The mobile apparatus of claim 9, wherein a plurality of keys included in the first execution screen are configured to move a position of the at least one graphic element.

11. The mobile apparatus of claim 9, wherein the at least one processor is further configured to:

in response to identifying that the virtual pad is configured to support the first application among the plurality of applications, control the first display to display an icon, on a part of the first execution screen, for providing the virtual pad, and in response to user input for selecting the icon, control the second display to display the execution screen of the virtual pad including the plurality of keys for controlling the at least one graphic element included in the first execution screen.

12. The mobile apparatus of claim 9, wherein the at least one processor is further configured to:

in response to an angle between the first display and the second display falls within a first range while the first execution screen is displayed on the first display, control the second display to display the virtual pad.

13. A mobile apparatus comprising:

a first display;

a second display;

at least one processor; and at least one memory storing instructions, which when executed by the at least one processor, cause the mobile apparatus to:

control the first display to display a first execution screen related to a first application, control the second display to display a second execution screen related to a second application, in response to a first event while the first execution screen is displayed on the first display, control the first display to display a virtual key pad on the first display together with a part of the first execution screen; and in response to a second event while the part of the first execution screen and the virtual key pad are displayed on the first display, control the first display to display the first execution screen and control the second display to display the virtual key pad.

14. The mobile apparatus of claim 13, wherein the instructions, when executed, cause the mobile apparatus to:

in response to a first user input for selecting a text field included in the first execution screen displayed on the first display, control the first display to display the virtual key pad on a part of the first display, in response to a rotation of the mobile apparatus, control the first display to display the first execution screen and the virtual key pad based on a landscape mode, wherein the virtual key pad displayed based on the landscape mode includes an icon, when selected, configured to cause the virtual key pad to be displayed on the second display, and in response to a second user input selecting the icon, control the first display to display the first execution screen based on the landscape mode and control the second display to display the virtual key pad based on the landscape mode.

15. The mobile apparatus of claim 14, wherein the virtual key pad displayed on the second display comprising a first icon, when selected, configured to cause the virtual key pad to be displayed on the first display;

wherein the instructions, when executed, cause the mobile apparatus to:

in response to a third user input selecting the first icon, control the first display to display the virtual key pad based on the landscape mode.

16. The mobile apparatus of claim 13, wherein the instructions, when executed, cause the mobile apparatus to:

in response to a first user input for selecting a text field included in the first execution screen displayed on the first display, control the first display to display the virtual key pad on a part of the first display, in response to a rotation of the mobile apparatus, control the first display to display the first execution screen based on a landscape mode and control the second display to display the virtual key pad based on the landscape mode.

17. The mobile apparatus of claim 13, wherein the instructions, when executed, cause the mobile apparatus to:

in response to an execution of the first application among a plurality of applications stored in the mobile apparatus, control the first display to display the first execution screen corresponding to the first application including at least one graphic element, and in response to an occurrence of an event for providing a virtual pad, control the second display to display an execution screen of the virtual pad including a plurality of keys for controlling the at least one graphic element included in the first execution screen, wherein the virtual pad is configured to support the first application among the plurality of applications.

18. The mobile apparatus of claim 17, wherein a plurality of keys included in the first execution screen are configured to move a position of the at least one graphic element.

19. The mobile apparatus of claim 17, wherein the instructions, when executed, cause the mobile apparatus to:

in response to identifying that the virtual pad is configured to support the first application among the plurality of applications, control the first display to display an icon, on a part of the first execution screen, for providing the virtual pad, and in response to user input for selecting the icon, control the second display to display the execution screen of the virtual pad including the plurality of keys for controlling the at least one graphic element included in the first execution screen.

20. The mobile apparatus of claim 17, wherein the instructions, when executed, cause the mobile apparatus to:

in response to an angle between the first display and the second display falls within a first range while the first execution screen is displayed on the first display, control the second display to display the virtual pad.

21. A mobile apparatus comprising:

a first display;

a second display;

at least one processor; and at least one memory storing instructions, which when executed by the at least one processor, cause the mobile apparatus to:

based on an execution of a first application among a plurality of applications, control the first display to display a first execution screen corresponding to the first application including at least one graphic element, and based on an execution of a virtual gamepad, control the second display to display an execution screen of the virtual gamepad including a plurality of keys for controlling the at least one graphic element included in the first execution screen, wherein the virtual gamepad is configured to support the first application among the plurality of applications.

22. The mobile apparatus of claim 21, wherein the plurality of keys included in the virtual gamepad are configured to move a position of the at least one graphic element.

23. The mobile apparatus of claim 21, wherein the instructions, when executed, cause the mobile apparatus to:

in response to identifying that the virtual gamepad is configured to support the first application among the plurality of applications, control the first display to display an icon, on a part of the first execution screen, for providing the virtual gamepad, and in response to user input for selecting the icon, control the second display to display an execution screen of the virtual gamepad including the plurality of keys for controlling the at least one graphic element included in the first execution screen.

24. The mobile apparatus of claim 21, wherein the instructions, when executed, cause the mobile apparatus to:

in response to an angle between the first display and the second display falls within a first range while the first execution screen is displayed on the first display, control the second display to display the virtual gamepad.

25. The mobile apparatus of claim 21, wherein the instructions, when executed, cause the mobile apparatus to:

control the first display to display the first execution screen related to the first application, control the second display to display a second execution screen related to a second application, in response to an occurrence of a first event while the first execution screen is displayed on the first display, control the first display to display a virtual key pad on a part of the first display together with a part of the first execution screen, and in response to an occurrence of a second event while the part of the first execution screen and the virtual key pad are displayed on the first display, control the first display to display the first execution screen and control the second display to display the virtual key pad.

26. The mobile apparatus of claim 25, wherein the instructions, when executed, cause the mobile apparatus to:

in response to a first user input for selecting a text field included in the first execution screen displayed on the first display, control the first display to display the virtual key pad on the part of the first display, in response to a rotation of the mobile apparatus, control the first display to display the first execution screen and the virtual key pad based on a landscape mode, wherein the virtual key pad displayed based on the landscape mode includes an icon, when selected, configured to cause the virtual key pad to be displayed on the second display, and in response to a second user input selecting the icon, control the first display to display the first execution screen based on the landscape mode and control the second display to display the virtual key pad based on the landscape mode.

27. The mobile apparatus of claim 26, wherein the virtual key pad displayed on the second display comprising a first icon, when selected, configured to cause the virtual key pad to be displayed on the first display;

wherein the instructions, when executed, cause the mobile apparatus to:

in response to a third user input selecting the first icon, control the first display to display the virtual key pad based on the landscape mode.

28. The mobile apparatus of claim 25, wherein the instructions, when executed, cause the mobile apparatus to:

in response to a first user input for selecting a text field included in the first execution screen displayed on the first display, control the first display to display a virtual key pad on the part of the first display, in response to a rotation of the mobile apparatus, control the first display to display the first execution screen based on a landscape mode and control the second display to display the virtual key pad based on the landscape mode.

29. A mobile apparatus comprising:

a first display disposed on a first surface;

a second display;

a third display disposed on a second surface which is a back side of the first surface;

at least one processor; and at least one memory storing instructions, which when executed by the at least one processor, cause the mobile apparatus to:

while the mobile apparatus is unfolded, control the first display and the second display to be active, in which the first display is driven by a first power and the second display is driven by a second power;

in response to the mobile apparatus being folded such that the first display and the second display are facing each other, control to activate the third display to display at least one of a current time, a battery status, or at least one notification such that the third display is driven by a power less than the first power for driving the first display and the second power for driving the second display;

control the first display and the second display to be inactive while the mobile apparatus is folded; and in response to the mobile apparatus being unfolded, control to activate the first display to display a first screen and control to activate the second display to display a second screen, respectively.

* * * * *